US007769794B2

(12) United States Patent
Moore et al.

(10) Patent No.: US 7,769,794 B2
(45) Date of Patent: Aug. 3, 2010

(54) USER INTERFACE FOR A FILE SYSTEM SHELL

(75) Inventors: Jason F. Moore, Redmond, WA (US); Giampiero M. Sierra, Seattle, WA (US); Richard M. Banks, Egham (GB); Lyon King-Fook Wong, Issaquah, WA (US); Relja B. Ivanovic, Seattle, WA (US); Paul A. Gusmorino, Seattle, WA (US); Tyler K. Beam, Redmond, WA (US); Timothy P. McKee, Seattle, WA (US); Jeffrey C. Belt, Bellevue, WA (US); David G. De Vorchik, Seattle, WA (US); Chris J. Guzak, Kirkland, WA (US); Aidan Low, Bellevue, WA (US); Kenneth M. Tubbs, Bellevue, WA (US); Colin R. Anthony, Bothell, WA (US); Sasanka C. Chalivendra, Redmond, WA (US); Marieke Iwema Watson, Seattle, WA (US); Gerald Paul Joyce, Woodinville, WA (US); Alex D. Wade, Seattle, WA (US); Benjamin A. Betz, Redmond, WA (US); Ahsan S. Kabir, Seattle, WA (US); Donna B. Andrews, Shoreline, WA (US); Patrice L. Miner, Kirkland, WA (US); Paul L. Cutsinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 11/111,978

(22) Filed: Apr. 22, 2005

(65) Prior Publication Data

US 2006/0036568 A1 Feb. 16, 2006

Related U.S. Application Data

(63) Continuation-in-part of application No. 10/440,431, filed on May 16, 2003, now Pat. No. 7,409,644, and a continuation-in-part of application No. 10/950,075, filed on Sep. 24, 2004, now Pat. No. 7,421,438, and a continuation-in-part of application No. 10/684,263, filed on Oct. 12, 2003, and a continuation-in-part of application No. 10/395,533, filed on Mar. 24, 2003, and a continuation-in-part of application No. 10/395,560, filed on Mar. 24, 2003, now Pat. No. 7,234,114, and a continuation-in-part of application No. 10/440,035, filed on May 16, 2003, now Pat. No. 7,162,466, which is a continuation-in-part of application No. 10/403,341, filed on Mar. 27, 2003, now Pat. No. 7,627,552, application No. 11/111,978, which is a continuation-in-part of application No. 10/420,040, filed on Apr. 17, 2003, now Pat. No. 7,240,292.

(60) Provisional application No. 60/566,502, filed on Apr. 29, 2004.

(51) Int. Cl.
*G06F 12/00* (2006.01)
*G06F 17/30* (2006.01)

(52) U.S. Cl. ...................................... 707/831; 707/822

(58) Field of Classification Search ............. 707/1–206, 707/831; 709/200–253
See application file for complete search history.

(56) References Cited

U.S. PATENT DOCUMENTS

| | | | |
|---|---|---|---|
| 4,214,141 | A | 7/1980 | Okuda et al. |
| 4,438,505 | A | 3/1984 | Yanagiuchi et al. |
| 4,829,423 | A | 5/1989 | Tennant et al. |
| 4,881,179 | A | 11/1989 | Vincent |
| 4,931,935 | A | 6/1990 | Ohira et al. |
| 5,060,135 | A | 10/1991 | Levine et al. |
| 5,241,671 | A | 8/1993 | Reed et al. |
| 5,297,250 | A | 3/1994 | Leroy et al. |
| 5,327,529 | A | 7/1994 | Fults |
| 5,333,266 | A | 7/1994 | Boaz et al. |
| 5,333,315 | A | 7/1994 | Saether et al. |
| 5,388,196 | A | 2/1995 | Pajak et al. |
| 5,418,946 | A | 5/1995 | Mori |

| | | | | |
|---|---|---|---|---|
| 5,420,605 | A | | 5/1995 | Vouri |
| 5,461,710 | A | | 10/1995 | Bloomfield et al. |
| 5,499,364 | A | | 3/1996 | Klein et al. |
| 5,504,852 | A | | 4/1996 | Thompson-Rohrlich |
| 5,513,306 | A | | 4/1996 | Mills et al. |
| 5,544,360 | A | | 8/1996 | Lewak et al. |
| 5,546,527 | A | | 8/1996 | Fitzpatrick et al. |
| 5,550,852 | A | | 8/1996 | Patel et al. |
| 5,559,948 | A | | 9/1996 | Bloomfield et al. |
| 5,583,982 | A | | 12/1996 | Matheny et al. |
| 5,590,259 | A | | 12/1996 | Anderson et al. |
| 5,596,702 | A | | 1/1997 | Stucka |
| 5,598,524 | A | | 1/1997 | Johnston, Jr. et al. |
| 5,600,778 | A | | 2/1997 | Swanson et al. |
| 5,606,669 | A | | 2/1997 | Bertin et al. |
| 5,625,783 | A | | 4/1997 | Ezekiel |
| 5,630,042 | A | | 5/1997 | McIntosh et al. |
| 5,648,795 | A | | 7/1997 | Vouri |
| 5,652,876 | A | | 7/1997 | Ashe |
| 5,675,520 | A | | 10/1997 | Pitt |
| 5,675,663 | A | | 10/1997 | Koerner et al. |
| 5,680,563 | A | * | 10/1997 | Edelman ..................... 715/835 |
| 5,696,486 | A | | 12/1997 | Poliquin et al. |
| 5,696,914 | A | | 12/1997 | Nahaboo |
| 5,710,926 | A | | 1/1998 | Maurer |
| 5,721,908 | A | | 2/1998 | Lagarde et al. |
| 5,757,925 | A | | 5/1998 | Faybishenko |
| 5,760,770 | A | | 6/1998 | Bliss |
| 5,790,121 | A | | 8/1998 | Sklar et al. |
| 5,802,516 | A | | 9/1998 | Shwarts et al. |
| 5,828,376 | A | | 10/1998 | Solimene et al. |
| 5,831,606 | A | | 11/1998 | Nakajima et al. |
| 5,835,094 | A | | 11/1998 | Ermel et al. |
| 5,838,317 | A | | 11/1998 | Bolnick et al. |
| 5,838,322 | A | | 11/1998 | Nakajima et al. |
| 5,855,446 | A | | 1/1999 | Disborg |
| 5,864,844 | A | | 1/1999 | James et al. |
| 5,867,163 | A | | 2/1999 | Kurtenbach |
| 5,870,088 | A | | 2/1999 | Washington |
| 5,875,446 | A | | 2/1999 | Brown et al. |
| 5,875,448 | A | | 2/1999 | Boys |
| 5,878,410 | A | | 3/1999 | Zbikowski et al. |
| 5,886,694 | A | | 3/1999 | Breinberg et al. |
| 5,899,995 | A | | 5/1999 | Millier et al. |
| 5,905,973 | A | | 5/1999 | Yonezawa et al. |
| 5,907,703 | A | | 5/1999 | Kronenberg |
| 5,907,837 | A | | 5/1999 | Ferrel et al. |
| 5,909,540 | A | | 6/1999 | Carter et al. |
| 5,923,328 | A | | 7/1999 | Griesmer |
| 5,924,090 | A | | 7/1999 | Krellenstein |
| 5,929,854 | A | | 7/1999 | Ross |
| 5,930,801 | A | | 7/1999 | Falkenhainer |
| 5,933,139 | A | | 8/1999 | Feigner et al. |
| 5,935,210 | A | | 8/1999 | Stark |
| 5,973,686 | A | | 10/1999 | Shimogori |
| 5,987,454 | A | | 11/1999 | Hobbs |
| 5,987,506 | A | | 11/1999 | Carter et al. |
| 6,003,040 | A | | 12/1999 | Mital et al. |
| 6,008,806 | A | | 12/1999 | Nakajima et al. |
| 6,014,137 | A | | 1/2000 | Burns |
| 6,016,692 | A | | 1/2000 | Schaenzer et al. |
| 6,021,262 | A | | 2/2000 | Cote et al. |
| 6,023,708 | A | | 2/2000 | Mendez et al. |
| 6,024,843 | A | | 2/2000 | Anderson |
| 6,025,843 | A | | 2/2000 | Sklar |
| 6,037,944 | A | | 3/2000 | Hugh |
| 6,055,540 | A | | 4/2000 | Snow |
| 6,055,543 | A | | 4/2000 | Christensen et al. |
| 6,061,059 | A | | 5/2000 | Taylor |
| 6,061,692 | A | | 5/2000 | Thomas et al. |
| 6,061,695 | A | * | 5/2000 | Slivka et al. ................ 715/513 |
| 6,065,012 | A | | 5/2000 | Balsara et al. |
| 6,078,924 | A | | 6/2000 | Ainsbury et al. |
| 6,097,389 | A | | 8/2000 | Morris et al. |
| 6,101,509 | A | | 8/2000 | Hanson |
| 6,144,968 | A | | 11/2000 | Zellweger |
| 6,147,601 | A | | 11/2000 | Sandelman et al. |
| 6,160,552 | A | | 12/2000 | Wilsher |
| 6,175,364 | B1 | | 1/2001 | Wong et al. |
| 6,181,342 | B1 | | 1/2001 | Niblack |
| 6,182,068 | B1 | | 1/2001 | Culliss |
| 6,195,650 | B1 | | 2/2001 | Gaither et al. |
| 6,202,061 | B1 | | 3/2001 | Khosla et al. |
| 6,208,985 | B1 | | 3/2001 | Krehel |
| 6,216,122 | B1 | | 4/2001 | Elson |
| 6,237,004 | B1 | | 5/2001 | Dodson et al. |
| 6,237,011 | B1 | | 5/2001 | Ferguson et al. |
| 6,240,407 | B1 | | 5/2001 | Chang et al. |
| 6,240,421 | B1 | | 5/2001 | Stolarz |
| 6,243,094 | B1 | | 6/2001 | Sklar |
| 6,243,724 | B1 | | 6/2001 | Mander et al. |
| 6,246,411 | B1 | | 6/2001 | Strauss |
| 6,256,031 | B1 | * | 7/2001 | Meijer et al. ................ 715/854 |
| 6,268,852 | B1 | | 7/2001 | Lindhorst et al. |
| 6,271,846 | B1 | | 8/2001 | Martinez et al. |
| 6,275,829 | B1 | | 8/2001 | Angiulo et al. |
| 6,279,016 | B1 | * | 8/2001 | De Vorchik et al. ......... 715/210 |
| 6,301,586 | B1 | | 10/2001 | Yang et al. |
| 6,308,173 | B1 | | 10/2001 | Glasser et al. |
| 6,317,142 | B1 | | 11/2001 | Decoste et al. |
| 6,324,541 | B1 | | 11/2001 | de l'Etraz et al. |
| 6,324,551 | B1 | | 11/2001 | Lamping et al. |
| 6,326,953 | B1 | | 12/2001 | Wana |
| 6,330,007 | B1 | | 12/2001 | Isreal |
| 6,339,767 | B1 | | 1/2002 | Rivette et al. |
| 6,341,280 | B1 | | 1/2002 | Glass et al. |
| 6,342,907 | B1 | | 1/2002 | Petty |
| 6,356,863 | B1 | | 3/2002 | Sayle |
| 6,356,915 | B1 | | 3/2002 | Chtchetkine et al. |
| 6,363,377 | B1 | | 3/2002 | Kravets et al. |
| 6,363,400 | B1 | | 3/2002 | Chtchetkine et al. |
| 6,369,840 | B1 | | 4/2002 | Barnett et al. |
| 6,377,283 | B1 | | 4/2002 | Thomas |
| 6,393,429 | B1 | | 5/2002 | Yagi et al. |
| 6,401,097 | B1 | | 6/2002 | McCotter et al. |
| 6,405,265 | B1 | | 6/2002 | Kronenberg |
| 6,408,298 | B1 | | 6/2002 | Van |
| 6,411,311 | B1 | | 6/2002 | Rich et al. |
| 6,425,120 | B1 | | 7/2002 | Morganelli et al. |
| 6,425,121 | B1 | | 7/2002 | Phillips |
| 6,430,575 | B1 | | 8/2002 | Dourish et al. |
| 6,437,807 | B1 | | 8/2002 | Berquist et al. |
| 6,438,590 | B1 | | 8/2002 | Gartner |
| 6,448,985 | B1 | | 9/2002 | McNally |
| 6,453,311 | B1 | | 9/2002 | Powers, III |
| 6,453,319 | B1 | | 9/2002 | Mattis et al. |
| 6,462,762 | B1 | | 10/2002 | Ku |
| 6,466,228 | B1 | | 10/2002 | Ulrich |
| 6,466,238 | B1 | | 10/2002 | Berry et al. |
| 6,466,932 | B1 | | 10/2002 | Dennis et al. |
| 6,470,344 | B1 | | 10/2002 | Kothuri et al. |
| 6,473,100 | B1 | | 10/2002 | Beaumont et al. |
| 6,480,835 | B1 | | 11/2002 | Light |
| 6,483,525 | B1 | | 11/2002 | Tange |
| 6,484,205 | B1 | | 11/2002 | Byford |
| 6,505,233 | B1 | | 1/2003 | Hanson et al. |
| 6,513,038 | B1 | | 1/2003 | Hasegawa et al. |
| 6,519,612 | B1 | | 2/2003 | Howard et al. |
| 6,526,399 | B1 | | 2/2003 | Coulson et al. |
| 6,535,229 | B1 | | 3/2003 | Kraft |
| 6,535,230 | B1 | | 3/2003 | Celik |
| 6,539,399 | B1 | | 3/2003 | Hazama et al. |
| 6,544,295 | B1 | | 4/2003 | Bodnar |
| 6,549,217 | B1 | | 4/2003 | De Greef et al. |
| 6,549,916 | B1 | | 4/2003 | Sedlar |
| 6,563,514 | B1 | | 5/2003 | Samar |

6,571,245 B2 5/2003 Huang et al.
6,573,906 B1 6/2003 Harding et al.
6,573,907 B1 6/2003 Madrane
6,583,799 B1 6/2003 Manolis et al.
6,590,585 B1 7/2003 Suzuki et al.
6,606,105 B1 8/2003 Quartetti
6,613,101 B2 9/2003 Mander et al.
6,628,309 B1 9/2003 Dodson et al.
6,636,238 B1 10/2003 Amir et al.
6,636,250 B1 10/2003 Gasser
6,638,313 B1 10/2003 Freeman
6,658,406 B1 12/2003 Mazner et al.
6,662,198 B2 12/2003 Satyanarayanan et al.
6,684,222 B1 1/2004 Cornelius et al.
6,721,760 B1 4/2004 Ono
6,735,623 B1 5/2004 Prust
6,738,770 B2 * 5/2004 Gorman ......................... 707/7
6,745,206 B2 6/2004 Mandler et al.
6,745,207 B2 6/2004 Reuter et al.
6,751,611 B2 6/2004 Krupin et al.
6,751,626 B2 6/2004 Brown et al.
6,754,829 B1 6/2004 Butt et al.
6,760,721 B1 7/2004 Chasen et al.
6,760,722 B1 7/2004 Raghunandan
6,762,776 B2 7/2004 Huapaya
6,762,777 B2 7/2004 Carroll
6,763,458 B1 7/2004 Watanabe et al.
6,763,777 B1 7/2004 Rosenberg
6,768,999 B2 7/2004 Prager et al.
6,784,900 B1 8/2004 Dobronsky et al.
6,784,925 B1 8/2004 Tomat et al.
6,795,094 B1 9/2004 Watanabe et al.
6,801,909 B2 10/2004 Delgado et al.
6,801,919 B2 10/2004 Hunt et al.
6,803,926 B1 10/2004 Lamb et al.
6,810,404 B1 10/2004 Ferguson et al.
6,813,474 B2 11/2004 Robinson et al.
6,816,863 B2 11/2004 Bates et al.
6,820,083 B1 11/2004 Nagy et al.
6,823,344 B1 11/2004 Isensee et al.
6,826,443 B2 11/2004 Makinen
6,847,959 B1 1/2005 Arrouye et al.
6,853,391 B2 2/2005 Bates et al.
6,865,568 B2 3/2005 Chau
6,871,348 B1 3/2005 Cooper
6,876,900 B2 4/2005 Takeda et al.
6,876,996 B2 4/2005 Czajkowski et al.
6,880,132 B2 4/2005 Uemura
6,883,009 B2 4/2005 Yoo
6,883,146 B2 4/2005 Prabhu et al.
6,885,860 B2 4/2005 Bahl
6,906,722 B2 6/2005 Hrebejk et al.
6,910,049 B2 6/2005 Fenton et al.
6,922,709 B2 7/2005 Goodman
6,925,608 B1 8/2005 Neale et al.
6,938,207 B1 8/2005 Haynes
6,944,647 B2 9/2005 Shah et al.
6,947,959 B1 9/2005 Gill
6,948,120 B1 9/2005 Delgobbo
6,950,818 B2 9/2005 Dennis et al.
6,950,989 B2 9/2005 Rosenzweig
6,952,714 B2 10/2005 Peart
6,952,724 B2 10/2005 Prust
6,980,993 B2 12/2005 Horvitz et al.
6,983,424 B1 1/2006 Dutta
7,010,755 B2 3/2006 Anderson et al.
7,024,427 B2 4/2006 Bobbitt et al.
7,028,262 B2 4/2006 Estrada et al.
7,043,472 B2 5/2006 Aridor et al.
7,047,498 B2 5/2006 Lui
7,051,291 B2 5/2006 Sciammarella et al.
7,058,891 B2 6/2006 O'Neal et al.
7,062,500 B1 6/2006 Hall et al.
7,062,718 B2 6/2006 Kodosky et al.
7,068,291 B1 6/2006 Roberts et al.
7,100,150 B2 8/2006 Polk
7,106,843 B1 9/2006 Gainsboro
7,139,811 B2 11/2006 Lev Ran et al.
7,149,729 B2 12/2006 Kaasten et al.
7,162,466 B2 1/2007 Kaasten et al.
7,168,051 B2 1/2007 Robinson et al.
7,194,743 B2 3/2007 Hayton
7,203,948 B2 4/2007 Mukundan et al.
7,216,289 B2 5/2007 Kagle
7,216,301 B2 5/2007 Moehrle
7,219,302 B1 5/2007 O'Shaughnessy et al.
7,240,292 B2 7/2007 Hally et al.
7,243,334 B1 7/2007 Berger et al.
7,275,063 B2 9/2007 Horn
7,278,106 B1 10/2007 Mason
7,290,245 B2 10/2007 Skjolsvold
7,293,031 B1 11/2007 Dusker et al.
7,383,494 B2 6/2008 Krolczyk et al.
7,409,382 B2 8/2008 Kido
7,409,644 B2 8/2008 Moore et al.
7,415,484 B1 8/2008 Tulkoff et al.
7,499,925 B2 3/2009 Moore et al.
7,512,586 B2 3/2009 Kaasten et al.
7,526,483 B2 4/2009 Samji et al.
7,536,386 B2 5/2009 Samji et al.
7,536,410 B2 5/2009 Wong
7,587,411 B2 9/2009 De Vorchik
7,614,016 B2 11/2009 Wong
7,627,552 B2 12/2009 Moore et al.
7,650,575 B2 1/2010 Cummins
2001/0034733 A1 10/2001 Prompt et al.
2001/0034771 A1 10/2001 Hutsch et al.
2001/0047368 A1 11/2001 Oshinsky et al.
2001/0049675 A1 12/2001 Mandler et al.
2001/0053996 A1 12/2001 Atkinson
2001/0056434 A1 12/2001 Kaplan et al.
2001/0056508 A1 12/2001 Arneson et al.
2002/0010736 A1 1/2002 Marques et al.
2002/0019935 A1 2/2002 Andrew et al.
2002/0021828 A1 2/2002 Papier et al.
2002/0033844 A1 3/2002 Levy et al.
2002/0046209 A1 4/2002 De Bellis
2002/0046232 A1 4/2002 Adams et al.
2002/0046299 A1 4/2002 Lefeber et al.
2002/0049717 A1 4/2002 Routtenberg et al.
2002/0052885 A1 5/2002 Levy
2002/0054167 A1 5/2002 Hugh
2002/0059199 A1 5/2002 Harvey
2002/0062310 A1 5/2002 Marmor et al.
2002/0063734 A1 5/2002 Khalfay et al.
2002/0070965 A1 6/2002 Austin
2002/0075310 A1 6/2002 Prabhu et al.
2002/0075312 A1 6/2002 Amadio et al.
2002/0075330 A1 6/2002 Rosenzweig et al.
2002/0087652 A1 7/2002 Davis et al.
2002/0087740 A1 7/2002 Castanho et al.
2002/0087969 A1 7/2002 Brunheroto et al.
2002/0089540 A1 7/2002 Geier et al.
2002/0091679 A1 7/2002 Wright
2002/0091697 A1 7/2002 Huang et al.
2002/0091739 A1 7/2002 Ferlitsch et al.
2002/0095416 A1 7/2002 Schwols
2002/0097278 A1 7/2002 Mandler et al.
2002/0100039 A1 7/2002 Iatropoulos et al.
2002/0103998 A1 8/2002 DeBruine
2002/0104069 A1 8/2002 Gouge et al.
2002/0107973 A1 8/2002 Lennon et al.
2002/0111942 A1 8/2002 Campbell et al.
2002/0113821 A1 8/2002 Hrebejk et al.
2002/0120505 A1 8/2002 Henkin et al.
2002/0120604 A1 8/2002 LaBarge et al.

2002/0120757 A1* 8/2002 Sutherland et al. .......... 709/229
2002/0129033 A1 9/2002 Hoxie et al.
2002/0138552 A1 9/2002 DeBruine et al.
2002/0138582 A1 9/2002 Chandra et al.
2002/0138744 A1 9/2002 Schleicher et al.
2002/0144155 A1 10/2002 Bate et al.
2002/0149888 A1 10/2002 Motonishi et al.
2002/0152262 A1 10/2002 Arkin et al.
2002/0152267 A1 10/2002 Lennon
2002/0156756 A1 10/2002 Stanley et al.
2002/0156895 A1 10/2002 Brown
2002/0161800 A1 10/2002 Eld et al.
2002/0163572 A1 11/2002 Center et al.
2002/0169678 A1 11/2002 Chao et al.
2002/0174329 A1 11/2002 Bowler et al.
2002/0181398 A1 12/2002 Szlam
2002/0184357 A1 12/2002 Traversat et al.
2002/0188605 A1 12/2002 Adya et al.
2002/0188621 A1 12/2002 Flank et al.
2002/0188735 A1* 12/2002 Needham et al. ............ 709/229
2002/0194252 A1 12/2002 Powers, III
2002/0196276 A1 12/2002 Corl et al.
2002/0199061 A1 12/2002 Friedman et al.
2003/0001964 A1 1/2003 Masukura et al.
2003/0009484 A1 1/2003 Hamanaka et al.
2003/0014415 A1 1/2003 Weiss et al.
2003/0018657 A1 1/2003 Monday
2003/0018712 A1 1/2003 Harrow et al.
2003/0028610 A1* 2/2003 Pearson ..................... 709/213
2003/0033367 A1 2/2003 Itoh
2003/0037060 A1 2/2003 Kuehnel
2003/0041178 A1 2/2003 Brouk et al.
2003/0046011 A1 3/2003 Friedman
2003/0046260 A1 3/2003 Satyanarayanan et al.
2003/0063124 A1 4/2003 Melhem et al.
2003/0069893 A1 4/2003 Kanai et al.
2003/0069908 A1 4/2003 Anthony et al.
2003/0074356 A1 4/2003 Kaier et al.
2003/0076322 A1 4/2003 Ouzts et al.
2003/0078918 A1 4/2003 Souvignier et al.
2003/0079038 A1 4/2003 Robbin et al.
2003/0081002 A1 5/2003 De Vorchik et al.
2003/0081007 A1 5/2003 Cyr et al.
2003/0084425 A1 5/2003 Glaser
2003/0085918 A1 5/2003 Beaumont et al.
2003/0093321 A1 5/2003 Bodmer et al.
2003/0093531 A1 5/2003 Yeung et al.
2003/0093580 A1 5/2003 Thomas et al.
2003/0097361 A1 5/2003 Huang et al.
2003/0098881 A1 5/2003 Nolte et al.
2003/0098893 A1 5/2003 Makinen et al.
2003/0098894 A1 5/2003 Sheldon et al.
2003/0101200 A1* 5/2003 Koyama et al. ............. 707/200
2003/0105745 A1 6/2003 Davidson et al.
2003/0107597 A1 6/2003 Jameson
2003/0110188 A1 6/2003 Howard et al.
2003/0115218 A1 6/2003 Bobbitt et al.
2003/0117403 A1 6/2003 Park et al.
2003/0117422 A1 6/2003 Hiyama et al.
2003/0120678 A1 6/2003 Hill et al.
2003/0120928 A1 6/2003 Cato et al.
2003/0120952 A1 6/2003 Tarbotton et al.
2003/0122873 A1 7/2003 Dieberger et al.
2003/0126136 A1 7/2003 Omoigui
2003/0126212 A1 7/2003 Morris et al.
2003/0135495 A1 7/2003 Vagnozzi
2003/0135513 A1 7/2003 Quinn et al.
2003/0135517 A1 7/2003 Kauffman
2003/0135659 A1 7/2003 Bellotti et al.
2003/0140115 A1 7/2003 Mehra
2003/0154185 A1 8/2003 Suzuki et al.
2003/0158855 A1 8/2003 Farnham et al.
2003/0177422 A1 9/2003 Tararoukhine et al.
2003/0184587 A1 10/2003 Ording et al.
2003/0195950 A1 10/2003 Huang et al.
2003/0210281 A1 11/2003 Ellis et al.
2003/0212664 A1 11/2003 Breining
2003/0212680 A1 11/2003 Bates et al.
2003/0212710 A1 11/2003 Guy
2003/0222915 A1 12/2003 Marion et al.
2003/0225796 A1 12/2003 Matsubara
2003/0227480 A1 12/2003 Polk
2003/0227487 A1 12/2003 Hugh
2003/0233419 A1 12/2003 Beringer
2004/0001106 A1 1/2004 Deutscher et al.
2004/0002993 A1 1/2004 Toussaint et al.
2004/0003247 A1 1/2004 Fraser et al.
2004/0004638 A1 1/2004 Babaria
2004/0006549 A1 1/2004 Mullins et al.
2004/0008226 A1 1/2004 Manolis et al.
2004/0019584 A1 1/2004 Greening et al.
2004/0019655 A1 1/2004 Uemura et al.
2004/0019875 A1 1/2004 Welch
2004/0030731 A1 2/2004 Iftode et al.
2004/0044696 A1 3/2004 Frost
2004/0044776 A1 3/2004 Larkin
2004/0054674 A1 3/2004 Carpenter et al.
2004/0056894 A1 3/2004 Zaika et al.
2004/0056896 A1 3/2004 Doblmayr et al.
2004/0059755 A1 3/2004 Farrington
2004/0068524 A1 4/2004 Aboulhosn et al.
2004/0070612 A1 4/2004 Sinclair et al.
2004/0073705 A1 4/2004 Madril, Jr.
2004/0083433 A1 4/2004 Takeya
2004/0085581 A1 5/2004 Tonkin
2004/0088374 A1 5/2004 Webb et al.
2004/0091175 A1 5/2004 Beyrouti
2004/0098370 A1 5/2004 Garland et al.
2004/0098379 A1 5/2004 Huang
2004/0098742 A1 5/2004 Hsieh et al.
2004/0103073 A1 5/2004 Blake et al.
2004/0103280 A1 5/2004 Balfanz et al.
2004/0105127 A1 6/2004 Cudd et al.
2004/0117358 A1 6/2004 Von Kaenel et al.
2004/0117405 A1 6/2004 Short et al.
2004/0128322 A1 7/2004 Nagy
2004/0133572 A1 7/2004 Bailey et al.
2004/0133588 A1 7/2004 Kiessig et al.
2004/0133845 A1 7/2004 Forstall et al.
2004/0142749 A1 7/2004 Ishimaru et al.
2004/0143349 A1 7/2004 Roberts et al.
2004/0148434 A1 7/2004 Matsubara et al.
2004/0153451 A1 8/2004 Phillips et al.
2004/0153968 A1 8/2004 Ching et al.
2004/0167942 A1 8/2004 Oshinsky et al.
2004/0168118 A1 8/2004 Wong et al.
2004/0174396 A1 9/2004 Jobs et al.
2004/0177116 A1 9/2004 McConn et al.
2004/0177148 A1 9/2004 Tsimelzon, Jr.
2004/0177319 A1 9/2004 Horn
2004/0181516 A1 9/2004 Ellwanger et al.
2004/0183824 A1 9/2004 Benson et al.
2004/0189694 A1 9/2004 Kurtz et al.
2004/0189704 A1 9/2004 Walsh et al.
2004/0189707 A1 9/2004 Moore et al.
2004/0193594 A1 9/2004 Moore et al.
2004/0193599 A1 9/2004 Liu et al.
2004/0193600 A1 9/2004 Kaasten et al.
2004/0193621 A1 9/2004 Moore et al.
2004/0193672 A1 9/2004 Samji et al.
2004/0193673 A1 9/2004 Samji et al.
2004/0199507 A1 10/2004 Tawa
2004/0205168 A1 10/2004 Asher
2004/0205625 A1 10/2004 Banatwala et al.
2004/0205633 A1 10/2004 Martinez et al.
2004/0205698 A1 10/2004 Schliesmann et al.

| | | | |
|---|---|---|---|
| 2004/0215600 | A1 | 10/2004 | Aridor et al. |
| 2004/0220899 | A1 | 11/2004 | Barney et al. |
| 2004/0223057 | A1 | 11/2004 | Oura et al. |
| 2004/0225650 | A1 | 11/2004 | Cooper et al. |
| 2004/0230572 | A1 | 11/2004 | Omoigui |
| 2004/0230599 | A1 | 11/2004 | Moore et al. |
| 2004/0230917 | A1 | 11/2004 | Bales et al. |
| 2004/0233235 | A1 | 11/2004 | Rubin et al. |
| 2004/0243597 | A1 | 12/2004 | Jensen et al. |
| 2004/0249902 | A1 | 12/2004 | Tadayon et al. |
| 2004/0255048 | A1 | 12/2004 | Ran et al. |
| 2004/0257169 | A1 | 12/2004 | Nelson |
| 2005/0004928 | A1 | 1/2005 | Hamer et al. |
| 2005/0010860 | A1 | 1/2005 | Weiss et al. |
| 2005/0015405 | A1 | 1/2005 | Plastina et al. |
| 2005/0022132 | A1 | 1/2005 | Herzberg et al. |
| 2005/0027757 | A1 | 2/2005 | Kiessig et al. |
| 2005/0050470 | A1 | 3/2005 | Hudson et al. |
| 2005/0055306 | A1 | 3/2005 | Miller et al. |
| 2005/0071355 | A1 | 3/2005 | Cameron et al. |
| 2005/0080807 | A1 | 4/2005 | Beilinson et al. |
| 2005/0097477 | A1 | 5/2005 | Camara et al. |
| 2005/0114672 | A1 | 5/2005 | Duncan et al. |
| 2005/0120242 | A1 | 6/2005 | Mayer et al. |
| 2005/0131903 | A1 | 6/2005 | Margolus et al. |
| 2005/0131905 | A1 | 6/2005 | Margolus et al. |
| 2005/0138567 | A1 | 6/2005 | Smith et al. |
| 2005/0149481 | A1 | 7/2005 | Hesselink et al. |
| 2005/0165753 | A1 | 7/2005 | Chen et al. |
| 2005/0166159 | A1 | 7/2005 | Mondry et al. |
| 2005/0166189 | A1 | 7/2005 | Ma |
| 2005/0171947 | A1 | 8/2005 | Gautestad |
| 2005/0188174 | A1 | 8/2005 | Guzak |
| 2005/0192953 | A1 | 9/2005 | Neale et al. |
| 2005/0192966 | A1 | 9/2005 | Hilbert et al. |
| 2005/0207757 | A1 | 9/2005 | Okuno |
| 2005/0240880 | A1 | 10/2005 | Banks |
| 2005/0243993 | A1 | 11/2005 | McKinzie et al. |
| 2005/0246331 | A1 | 11/2005 | De Vorchik et al. |
| 2005/0246643 | A1 | 11/2005 | Gusmorino et al. |
| 2005/0246664 | A1 | 11/2005 | Michelman et al. |
| 2005/0256909 | A1 | 11/2005 | Aboulhosn et al. |
| 2005/0257169 | A1 | 11/2005 | Tu |
| 2005/0283476 | A1 | 12/2005 | Kaasten et al. |
| 2005/0283742 | A1 | 12/2005 | Gusmorino |
| 2006/0004692 | A1 | 1/2006 | Kaasten et al. |
| 2006/0004739 | A1 | 1/2006 | Anthony et al. |
| 2006/0020586 | A1 | 1/2006 | Prompt et al. |
| 2006/0036568 | A1 | 2/2006 | Moore et al. |
| 2006/0053066 | A1 | 3/2006 | Sherr et al. |
| 2006/0053388 | A1 | 3/2006 | Michelman |
| 2006/0059204 | A1 | 3/2006 | Borthakur |
| 2006/0080308 | A1 | 4/2006 | Carpentier et al. |
| 2006/0090137 | A1 | 4/2006 | Cheng |
| 2006/0129627 | A1 | 6/2006 | Phillips et al. |
| 2006/0173873 | A1 | 8/2006 | Prompt et al. |
| 2006/0200455 | A1 | 9/2006 | Wilson |
| 2006/0200466 | A1 | 9/2006 | Kaasten et al. |
| 2006/0200832 | A1 | 9/2006 | Dutton |
| 2006/0218122 | A1 | 9/2006 | Poston et al. |
| 2006/0242122 | A1 | 10/2006 | De Vorchik |
| 2006/0242164 | A1 | 10/2006 | Evans |
| 2006/0242585 | A1 | 10/2006 | Cutsinger |
| 2006/0242591 | A1 | 10/2006 | Van Dok |
| 2006/0242604 | A1 | 10/2006 | Wong |
| 2006/0277432 | A1 | 12/2006 | Patel et al. |
| 2007/0088672 | A1 | 4/2007 | Kaasten et al. |
| 2007/0129977 | A1 | 6/2007 | Forney |
| 2007/0130170 | A1 | 6/2007 | Forney |
| 2007/0130182 | A1 | 6/2007 | Forney |
| 2007/0168885 | A1 | 7/2007 | Muller et al. |
| 2007/0168886 | A1 | 7/2007 | Hally |
| 2007/0180432 | A1 | 8/2007 | Gassner et al. |
| 2007/0186183 | A1 | 8/2007 | Hudson |
| 2008/0222547 | A1 | 9/2008 | Wong |
| 2009/0171983 | A1 | 7/2009 | Samji et al. |

FOREIGN PATENT DOCUMENTS

| | | | |
|---|---|---|---|
| CN | 1421800 | | 11/2001 |
| EP | 1235137 | A2 | 8/2002 |
| GB | 2329492 | | 3/1999 |
| JP | 2001067250 | | 8/1996 |
| JP | 09244940 | | 9/1997 |
| JP | 2005089173 | | 9/1999 |
| JP | 2001142766 | | 11/1999 |
| JP | 2001154831 | | 11/1999 |
| JP | 2001188702 | | 12/1999 |
| JP | 2002099565 | | 9/2000 |
| JP | 2002182953 | | 12/2000 |
| JP | 2002269145 | | 12/2000 |
| JP | 2002334103 | | 5/2001 |
| JP | 2001297022 | | 10/2001 |
| JP | 2002140216 | | 5/2002 |
| NO | 20042749 | | 8/2004 |
| RU | 2347258 | | 2/2009 |
| WO | 9322738 | | 3/1993 |
| WO | 9412944 | | 6/1994 |
| WO | 9414281 | | 6/1994 |
| WO | 9938092 | | 7/1999 |
| WO | 9949663 | | 9/1999 |
| WO | 0051021 | | 2/2000 |
| WO | 01/63919 | A1 | 8/2001 |
| WO | 0157867 | | 8/2001 |
| WO | 0167668 | | 9/2001 |
| WO | WO 0225420 | | 3/2002 |
| WO | 03001720 | | 1/2003 |
| WO | WO 2004107151 | | 9/2004 |
| WO | 2004/097680 | A1 | 11/2004 |
| WO | 2004097680 | | 11/2004 |

OTHER PUBLICATIONS

Wikipedia, File Allocation Table, 2006, <http://en.wikipedia.org/wiki/File__Allocation__Table>.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Microsoft Press Pass, "Windows XP is Here!", New York, Oct. 25, 2001.

Microsoft, "Microsoft Windows XP Professional Product Documentation" section: (1) To Change how you view items in a folder, (2)

Viewing files and folders overview, (3) To associate a file with a program, (4) To Change or remove a program, copyright 2006, publication date unknown.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia—printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
Written Opinion of Singapore Application No. 200403220-7 dated May 18, 2006.
McFedries, Paul; "The Complete Idiot's Guide to Windows XP", Table of Contents, Oct. 3, 2001; Alpha Books, Ch. 6: Using My Computer to Fiddle w/h Files and Folder—printed p. 1-6, Finding a File in Mess p. 103.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
International Search Report and Written Opinion of PCT/US04/25931 dated Apr. 3, 2007.
Kuchinsky, et al., "FotoFile: A Consumer Multimedia Organization and Retrieval System,", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
Bott, et al., Book titled "Special Edition Using Windows 98, Second Edition", Dec. 21, 1999, second edition, pp. 1-7.
Supplementary European Search Report for EP 04780390 dated Jun. 18, 2007.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualIFS: A New Journaling File System Without Meta-Data Duplication," Conference Proceedings of the 2002 International Conference on Supercomputing, New York, Jun. 22-26, 2002, p. 137-146.
Manber, U., and S. Wu, "GLIMPSE: A Tool to Search Through Entire File Systems," Proceedings of USENIX Winter 1994 Conference, San Francisco, CA, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Prodeedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE—Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.
Templin, P.J., Jr., "Providing a Centralized File Sharing Resource at Bucknell University", Proceedings of the User Services Conference for College and University. Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
"Predefined Properties" http://help.sap.comlsaphelp - ep50sp5/helpdata/en/la/9a4a3b80f2ec40aa7456bc87a94259/content.htm.
"Info Vision Infonnation Management System" http://66.1 02. 7.1 04/search?q=cache:m IXV6K6sQOQJ:www.amlib.netlproducts/infovision.htm+customised+multi+property+file+navigation&hl=en.
"Previewing Files in the Common Dialog" http://www .elitevb.comlcontentiO 1,0084,0 II.
"TdcFolderListView component" http://www.appcontrols.comlmanualsldiskcontrols/index.htm1?tdcfolderlistview.htm.
"Previewing Files" http://developer.apple.comldocumentation/QuickTimeIINMAC/QT/iqMovieToolbox.1a.htm.
"Text File Previewer 2.0 Beta" http://www . freedownloadscentercomlUtilitiesIText- ViewerslText- File ] reviewer.html.
"Your Next OS: Windows 2006?" http://www.pcworld.com/newsiarticle/O,aid,II3'63I,OO.asp.
"GetOpenFileName Function," downloaded from <http://msdn.microsoft.com>; date of first publication prior to Mar. 28, 2005; 2 pages.
"GetSaveFileName Function," downloaded from <http://msdn.microsoft.com>; date of first publication prior to Mar. 28, 2005; 2 pages.
"Using Common Dialog Boxes," downloaded from <http://msdn.microsoft.com>; date of first publication prior to Mar. 28, 2005; 8 pages.
"How to Use a Common Dialog File Open Dialog with Win32 API," downloaded from <http://support.microsoft.com>; date of first publication prior to Mar. 28, 2005; 3 pp.
"Creating an Enhanced Metafile," downloaded from <http://msdn.microsoft.com>; date of first publication prior to Mar. 28, 2005; 2 pages.
"Common Dialog Box Library," downloaded from <http://msdn.microsoft.com>: date of first publication prior to Mar. 28, 2005; 8 pages.
"OPENFILENAME Structure," downloaded from <http://msdn.microsoft.com>; date of first publication prior to Mar. 28, 2005; 7 pages.
"Open and Save as Dialog Boxes," downloaded from <http://msdn.microsoft.com>; date of first publication prior to Mar. 29, 2005; 9 pages.
"Customizing common dialog boxes," downloaded from http://msdn.microsoft.com; date for first publication prior to Apr. 20, 2005, 4 pages.
G.D. Venolia, et al., Supporting Email Workflow. Microsoft Research Technical Report MSR-TR-2001-88. Revised Dec. 2001 (Original Sep. 2001). Microsoft Corporation, Redmond, WA.
G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).
Microsoft Digital Image Suite User's Manual, Version 9.0. pp. 105-118, Available: http://www.microsoft.com/products/imaging/guides/SuiteManual.pdf, Apr. 30, 2004.
"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn"Features from Within Your Application" (CLI 391); downloaded from http://msdn.microsoft.com/longhorn/pdcmaterials/pdctalksavalon/>; date of first publication prior to Mar. 31, 2005; 27 pages.
MessageBox Function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files"; downloaded from <http://msdn.microsoft.com>; date of first publication prior to Feb. 21, 2005; 4 pages.
"About Dialog Boxes"; downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"PROPSHEETPAGE"; downloaded from <http://msdn.microsoft.com>; date of first publication prior to Feb. 21, 2005; 3 pages.
"DialogProc Function"; downloaded from <http://msdn.microsoft.com>; date of first publication prior to Feb. 21, 2005; 2 pages.
"Creating Wizards"; downloaded from <http://msdn.microsoft.com>; date of first publication prior to Mar. 31, 2005; 17 pages.
"Property Sheets"; downloaded from <http://msdn.microsoft.com>; date of first publication prior to Mar. 31, 2005; 7 pages.
"Property Sheet Reference"; downloaded from <http://msdn.microsoft.com>; date of first publication prior to Mar. 31, 2005; 5 pages.
"DRAWITEMSTRUCT Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN_QUERYCANCEL Notification"; downloaded from <http://msdn.microsoft.com>; date of first publication prior to Mar. 31, 2005; 1 page.
"PSN_RESET Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.
"PSN_WIZFINISH Notification" ; downloaded from <http://msdn.microsoft.com>; date of first publication prior to Mar. 31, 2005; 1 page.
"PSN_WIZNEXT Notification"; downloaded from <http://msdn.microsoft.com>; date of first publication prior to Mar. 31, 2005; 3 pages.
"PSM_ADDPAGE Message"; downloaded from <http://msdn.microsoft.com>; date of first publication prior to Mar. 31, 2005; 2 pages.
"PSM_IDTOINDEX Message"; downloaded from <http://msdn.microsoft.com>; date of first publication prior to Mar. 31, 2005; 1 page.
"PSM_INDEXTOHWND Message"; downloaded from <http://msdn.microsoft.com>; date of first publication prior to Mar. 31, 2005; 1 page.
"PSM_INDEXTOID Message"; downloaded from <http://msdn.microsoft.com>; date of first publication prior to Mar. 31, 2005; 1 page.
"PSM_INDEXTOPAGE"; downloadedd from <http://msdn.microsoft.com>; date of first publication prior to Mar. 31, 2005, 1 page.
"PSM_PAGETOINDEX Message"; downloaded from <http://msdn.microsoft.com>; date of first publicatoin prior to Mar. 31, 2005, 1 page.
"PSM_PRESSBUTTON Message"; downloaded from <http://msdn.microsoft.com>; date of first publicatoin prior to Mar. 31, 2005, 1 page.
"PSM_QUERYSIBLINGS Message"; downloaded from <http://msdn.microsoft.com>; date of first publicatoin prior to Mar. 31, 2005, 1 page.
"PSM_SETCURSEL Message"; downloaded from <http://msdn.microsoft.com>; date of first publicatoin prior to Mar. 31, 2005, 1 page.
"PSM_SETCURSELID Message"; downloaded from <http://msdn.microsoft.com>; date of first publicatoin prior to Mar. 31, 2005, 1 page.
"PSM_SETFINISHTEXT Message"; downloaded from <http://msdn.microsoft.com>; date of first publicatoin prior to Mar. 31, 2005, 1 page.
"PSM_SETHEADERTITLE Message"; downloaded from <http://msdn.microsoft.com>; date of first publicatoin prior to Mar. 31, 2005, 1 page.
"PSM_SETWIZBUTTONS Message"; downloaded from <http://msdn.microsoft.com>; date of first publicatoin prior to Mar. 31, 2005, 2 pages.
"PROPSHEETHEADER Message"; downloaded from <http://msdn.microsoft.com>; date of first publicatoin prior to Mar. 31, 2005, 5 pages.
"PROPSHEETPAGE Message"; downloaded from <http://msdn.microsoft.com>; date of first publicatoin prior to Mar. 31, 2005, 4 pages.
"PSHNOTIFY Structure"; downloaded from <http://msdn.microsoft.com>; date of first publicatoin prior to Mar. 31, 2005, 1 page.
"BCM_GETIDEALSIZE Message"; downloaded from <http://msdn.microsoft.com>; date of first publicatoin prior to Mar. 31, 2005, 1 page.
"PSM_SETTITLE Message"; downloaded from <http://msdn.microsoft.com>; date of first publicatoin prior to Mar. 31, 2005, 1 page.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) dated Nov. 11, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
Olivie, et al., "A Generic Metadata Query Tool", 1999, pp. 1-8.
Rathbone, Windows XP for Dummies, 2001, Wiley Publishing, Inc., pp. 145, 203 and 204.
Microsoft Windows XP Professional, 1985-2001.
"PSHNOTIFY"; downloaded from <http://msdn.microsoft.com>' date of first publication prior to Feb. 21, 2005; 3 pages.
"PSM_ADDPAGE Message"; downloaded from <http://msdn.microsoft.com>' date of first publication prior to Feb. 21, 2005; 2 pages.
"PSM_HWNDTOINDEX Message"; downloaded from <http://msdn.microsoft.com>; date of first publication prior to Mar. 31, 2005; 1 page.
"PSM_IDTOINDEX Message"; downloaded from <http://msdn.microsoft.com>' date of first publication prior to Feb. 21, 2005; 1 page.
"PSM_INDEXTOHWND Message"; downloaded from <http://msdn.microsoft.com>' date of first publication prior to Feb. 21, 2005; 1 page.
Revelle, A Visual Search Tool for Early Elementary Science Students, Mar. 2002, Journal of Science Education and Technology, vol. 11, pp. 49-57.
"Survey of Some Mobile Agent System"—Zhujun (James) Xu—Feb. 10, 2003 (p. 1-22).
Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.
Verhoeven et al., A Generic Metadata Tool, 10-19999, pp. 1-8.
Windows Commander, <http://web.archive.org/web.archive.org/web/20021017022627/www.ghisler.com/addons.htm> and <http://web.archive.org/web/20021017022627/www.ghisler.com/addons.htm>, first date of publication unknown but, prior to Feb. 19, 2003, 30 pages.
Windows Commander, <http://web.archive.org/web/20021017022627/www.ghisler.com/addons.htm> and <http://web.archive.org/web/20021017022627/www.ghisler.com/addons.htm>, first date of publication unknown but, prior to Jul. 31, 2006, 7 pages.

Domoto, Kenji et al., "The Power of Fast Full Text Search," Nikkei Byte, No. 156, pp. 142-167, Nikkei Business Publications, Inc., Japan, Sep. 22, 1996 (Previously delivered.) JP 139605—Sep. 11, 2009 OA.
Takane, Hideya et al., "Control of Access to Folders and Files," Windows NT World, vol. 5, No. 5, pp. 160-165, IDG Japan, Inc., Japan, May 1, 2000. JP 139605—Sep. 11, 2009 OA.
Tanaka, Yuji, "Utilization Report, Introduction of 'Convenient Techniques' Which Are Unexpectedly Unknown, Advanced Techniques for 'Compression and Decompression,'" Nikkei PC 21, vol. 7, No. 21, pp. 100-105, Nikkei Business Publications, Inc., Japan, Nov. 1, 2002. JP 139605—Sep. 11, 2009 OA.
Nishimasa, Makoto, "Easily Creating a Network by Using Standard Features, Home Network Easily Realized Using Windows 2000," Windows 2000 World, vol. 6, No. 2, pp. 126-133, IDG Japan, Inc., Japan, Feb. 1, 2001. JP 139605-13 Sep. 11, 2009 OA.
"How Easy! Introduction to 'Storage Idea,'" NIKKEI PC 21, vol. 6, No. 1, pp. 46-53, Nikkei Business Publications, Inc., Japan, Jan. 1, 2001.
"An Object-Oriented Model for a Multi-media Patient Folder Management System"—Fernando Ferri, Domenico M. Pisanelli & Fabrizio L. Ricci—ACM SIBGIO Newsletter, vol. 16, Issue 1, (Jun. 1996), (pp. 2-18).
Anonymous, "Organize Your Digital Media Collection," www.microsoft.com/windowsxp/using/windowsmediaplayer/getstarted/organize.mspx, Jun. 30, 2003, 3 pages.
"A Tamper-Resistant and Portable Healthcare Folder"—Anciaux et al.—Hindawai Publishing Corporation, International Journal of Telemedicine and Applications—vol. 1995, Article ID 763534, (pp. 1-9).
Australian Search Report for SG 200301757-1 dated Dec. 1, 2004.
Cohen, J., "The Unofficial Guide to the Workplace Shell," Apr. 5, 1992, XP002227246, 45 pp., retrieved from Internet, http://www.verfasser.de/web/web.nsf/c5.
Cooper, A., About Face The Essentials of User Interface Design, IDG Books, 1995, p. 141.
David Campbell, "Extending the Windows Explorer with Name Space Extensions," Microsoft Systems Journal, Microsoft Co., vol. 5, No. 6, Jul. 1996, pp. 89-96.
Dorot V., Explanatory Dictionary on Modern Computer Vocabulary, S. Petersburg, BHV-Petersburg, pp. 218-219. (Attached).
Ed Bott et al., "Master Your Music Library," www.microsoft.com/windowsxp/using/windowsmediaplayer/expert/bott_03may05.mspx, May 5, 2003, 7 pages.
Esposito, Dino, More Windows 2000 UI Goodies: Extending Explorer Views by Customizing Hypertext Template Files, first date of publication unknown, but prior to Jun. 16, 2006, 15 pages.
European Patent Office, "Supplemental European Search Report," Nov. 20, 2007, 1 pg.
European Search Report dated Sep. 20, 2007 for European Patent Application No. 05 10 3492, 9 pages.
Examination Report and Written Opinion for New Zealand Patent No. 534665 dated Jul. 27, 2007.
International Search Report of PCT/US05/26655 dated Jun. 23, 2005.
"MessageBox Function"; downloaded from from <http://msdn.microsoft.com>; date of first publication prior to Mar. 31, 2005; 4 pages.
Eiji Sugasawa, "When and What of Pictures Become Clear! How to Readily Organize Images from Digital Cameras," Nikkei PC Beginers, vol. 2, pp. 78-95, vol. *, No. 4, Nikkei Business Publications, Inc., Japan.
Grosky, et al., "Using Metadata for Intelligent Browsing of Structured Media Objects", Dec. 1994, Sigmond Record, vol. 23, No. 4, pp. 49-56.
"How knowledge workers use the web"—Abigail J. Sellen, Rachel Murphy and Kate L. Shaw—conference on Human Factors in Computing Systems, Proceedings of the SIGCHI conference on Human Factors in Computing Systems: Changing our world, changing ourselves—ACM—2002 (pp. 227-234).
"Implementing Windows Terminal Server and Citrix MetaFrame on IBM @server x Series Servers"—Darryl Miles—Apr. 2003 (pp. 1-62).
International Search Report and Written Opinion of PCT/US04/25931 dated Apr. 3, 2007.
International Search Report dated Dec. 7, 2005 for PCT Application Serial No. PCT/US05/13589, 5 pages.
International Search Report for PCT/US06/26854 dated Sep. 25, 2007.
International Search Report of EP 03007786 dated Aug. 6, 2004.
International Search Report of EP 0315717 dated Aug. 26, 2003.
International Search Report of EP 03007909 dated Jun. 13, 2006.
International Search Report of PCT/US03/15625 dated Aug. 8, 2003.
International Search Report of PCT/US05/27258 dated Aug. 1, 2005.
Jamsa, K., 1001 Windows 98 Tips, Jamsa Press, 1998, 2 pages.
Microsoft Press, Windows 98 Step by Step, Microsoft Corporation, p. 63, 1998.
Kumiko Sekiguchi, "Visual Basic Q&A," msdn magazine 2001, No. 16, pp. 97-103, ASCII Inc., Japan, Jul. 18, 2001.
Luiz F. Capretz et al., "Component-Based Software Development," IECON'01: The 27th Annual Conference of the IEEE Industrial Electronics Society, IEEE, Nov. 2001, pp. 1834-1837.
Mark Russionovich, "Internal Structure of NTFS4.0—Second Volume," NIKKEI Windows 2000, No. 53. pp. 176-182, Nikkei Business Publications, Inc., Japan, Aug. 1, 2001.
Michael Halvorson and Michael Young, Microsoft Office XP, Processional Official Manual, 1st Ed., Nikkei BP Soft Press, Jul. 23, 2001, pp. 78-80.
Microsoft: "Microsoft Windows 2000 Professional Step by Step—Lesson 3—Managing Files and Folders" <http://www.microsoft.com/mspress/books/sampshap/1589.asp>, first date of publications unknown, but prior to Jun. 12, 2006, 12 pages.
Microsoft, Windows XP Professional, Screen Shots 1-8, copyright (1985-2001).
Microsoft Windows XP Verison 2002 Screen Dumps.
MOZILLA.ORG, "Mozilla Firebird's Features", Dec. 4, 2003, Section—Find as you Type.
Netscape Corporation, "Mozilla.org Find As You Type," Sep. 12, 2003, pp. 1-4.
Pogue, David, "Windows XP Home Edition: The Missing Manual", O'Reilly, 2001.
"Presto: an experimental architecture for fluid interactive document spaces"—Paul Dourish, W. keith Edwards, Anthony LaMarca and Michael Salisbury—ACM Transactions on Computer-human Interaction (TOCHI) vol. 6, Issue 2 ACM Jun. 1999 (pp. 133-161).

* cited by examiner

*Primary Examiner*—John E Breene
*Assistant Examiner*—Joshua Bullock
(74) *Attorney, Agent, or Firm*—Shook, Hardy & Bacon, LLP.

(57) ABSTRACT

A file system shell is provided. One aspect of the shell provides virtual folders which expose regular files and folders to users in different views based on their metadata instead of the actual physical underlying file system structure on the disk. Users are able to work with the virtual folders through direct manipulation (e.g., clicking and dragging, copying, pasting, etc.). Filters are provided for narrowing down sets of items. Quick links are provided which can be clicked on to generate useful views of the sets of items. Libraries are provided which consist of large groups of usable types of items that can be associated together, along with functions and tools related to the items. A virtual address bar is provided which comprises a plurality of segments, each segment corresponding to a filter for selecting content. A shell browser is provided with which users can readily identify an item based on the metadata associated with that item. An object previewer in a shell browser is provided which is configured to display a plurality of items representing multiple item types.

37 Claims, 161 Drawing Sheets

FIG. 132
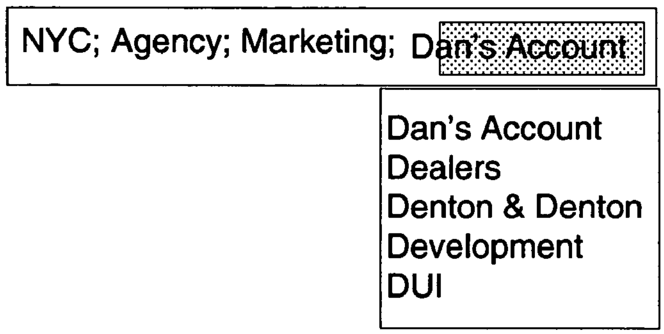
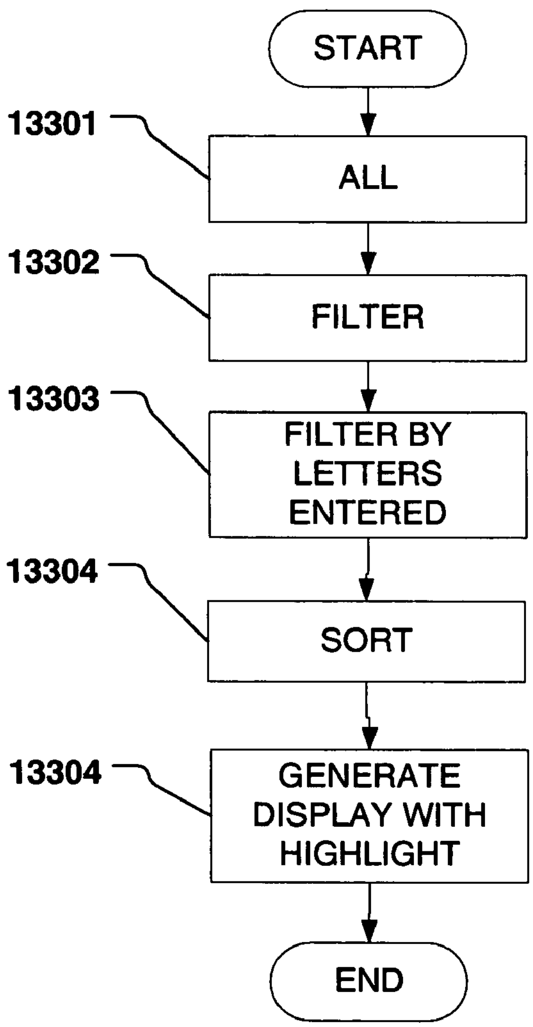
FIG. 133

FIG. 145K
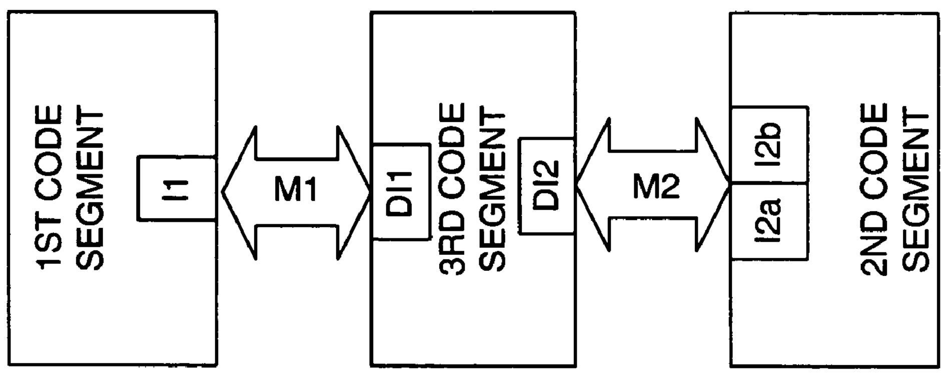
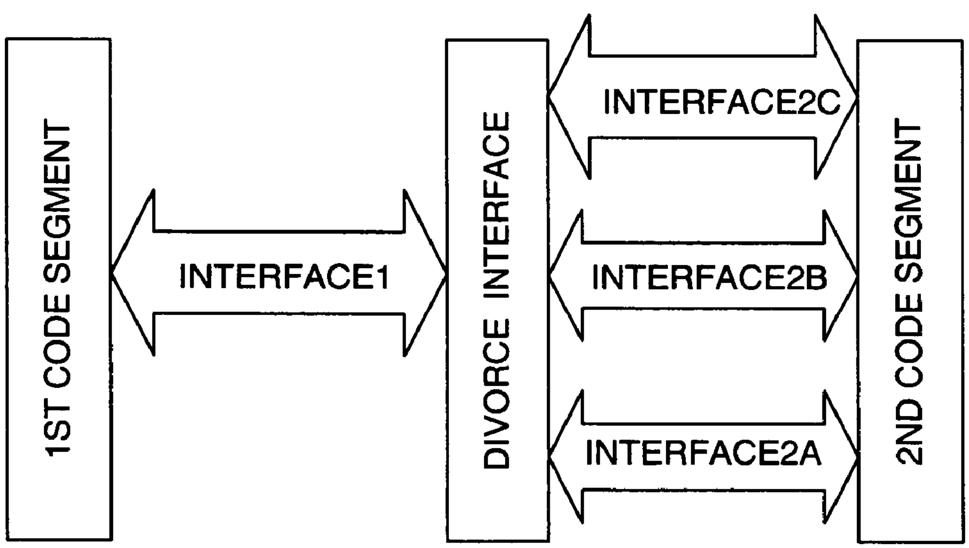
FIG. 145J

USER INTERFACE FOR A FILE SYSTEM SHELL

CROSS-REFERENCE(S) TO RELATED APPLICATION(S)

This application is a continuation-in-part of U.S. application Ser. No. 10/440,431, filed May 16, 2003 now U.S. Pat. No. 7,409,644, of the same title.

This application claims the benefit of U.S. Provisional Patent Application Ser. No. 60/566,502, entitled "Metadata Editing Control," and filed Apr. 29, 2004, and is a continuation-in-part of U.S. patent application Ser. No. 10/950,075, entitled "Metadata Editing Control," and filed Sep. 24, 2004 now U.S. Pat. No. 7,421,438, the specifications for which are hereby incorporated by reference.

This application is a continuation-in-part of, and claims priority from, co-pending application Ser. No. 10/684,263, filed Oct. 12, 2003, and having the title "Extensible Creation and Editing of Integrated Collections."

This application is a continuation-in-part of copending U.S. patent application Ser. No. 10/395,533, filed Mar. 24, 2003, entitled "System and Method for User Modification of MetaData in a Shell Browser," and U.S. patent application Ser. No. 10/395,560, filed Mar. 24, 2003 now U.S. Pat. No. 7,234,114, entitled "Extensible Object Previewer in a Shell Browser," the specifications for which are hereby incorporated by reference.

This application is a continuation-in part of U.S. patent application Ser. No. 10/440,035, filed May 16, 2003 now U.S. Pat. No. 7,162,466, which is a continuation-in-part of U.S. patent application Ser. No. 10/403,341, filed Mar. 27, 2003 now U.S. Pat. No. 7,627,552.

This application is a continuation in part of prior U.S. application Ser. No. 10/420,040, filed Apr. 17, 2003 now U.S. Pat. No. 7,240,292, the entire contents of which are incorporated herein.

FIELD OF THE INVENTION

The present invention relates to file systems, and more particularly, to a file system shell.

BACKGROUND OF THE INVENTION

Present computer file systems have a number of undesirable limitations. One limitation is that users are generally unable to control the structure that they are shown. In other words, when folders are organized, a user must choose a structure, and that structure is then difficult to change. As a specific example, for a "music" folder, a user may choose to organize the music files in an artist/album format, wherein all of the album folders for each artist are grouped into that particular artist's folder, and all of the songs on a particular album are grouped into that album's folder. The artist/album format is not conducive to playing a type of music (e.g., playing two jazz songs from two different artists), or for playing a selection of albums from different artists.

As another issue, a user may have a large number of files which are difficult to organize. Some users implement a rigid sense of placement for the files, and thus create strict hierarchies for them. The management of such files become increasingly complex and difficult as the number of available documents grows, making search and retrieval also difficult. This problem is further exacerbated when additional files are utilized from other locations, such as shared files, etc.

Users also have to deal with files being in different locations, such as on different devices, on other PCs, or online. For example, users can select to listen to their music on the computer (as may be accessible to a music program) or can go online and listen to music from Web sites, however there is a strict division between these two sources. Music coming from different locations is organized differently, and not kept in the same fashion or place. As another example, files stored on a corporate network may inherently be separated from files a user has on a current machine.

Users also have to keep track not only of what file data is stored, but where it is stored. For example, for music files, users are forced to keep copies on various systems and to try to track which music files are located where. This can make files difficult to locate, even when they are locally stored.

It is also sometimes difficult to find and return to files that a user has. A user may find it difficult to recall where and how they stored certain files. Given a set of folders and even a group of similar files, users often find it difficult to quickly find the one that they are looking for. For files stored in a difficult place to find, it is that much more complex to locate. In addition, once users have enough files in a folder, it becomes more difficult to parse the folder quickly, especially if the contents are similar.

It is also sometimes difficult for users to find or return to files on a network. Sharing and publishing files is often hard to do, and it may often be even more difficult to retrieve such a file from someone who makes it available. Users typically have to memorize or map the various sites and names that they need for finding files on a network.

Name spaces may vary, which can cause confusion to the user as to what is "correct." This is particularly true on a network where there are different naming conventions, limitations, and so on. For example, certain operating systems may require short names with no spaces in order for them to be visible.

Programs also often save files to their own directory or other name spaces, which can make it difficult for users to find their way back to the files. Programs often have default directories and places they save documents. A user often has to search through their hard disk and make guesses about where a file is stored.

Related items are also often stored in separate places. Related files that a user has may be stored on different parts of the hard disk, etc. This problem becomes more common with the developments of digital media services that have multiple content types (e.g., pictures, music, video).

Another issue with file systems is related to the address bar. As users navigate within a file system on a computer, a conventional graphical interface control, referred to as an address bar, shows the users where they are in the file system hierarchy. The conventional address bar shows the current location in terms of the file system's hierarchical structure of folders, subfolders, and files. Altering the user's location displayed in the conventional address bar is typically performed in one of two manners. The first is to manually edit the address in the address bar. Manually editing the address in the address bar permits a user to relocate to any number of locations in the file system hierarchy, but requires the user to have specific information regarding the organization of the file system on the computer, i.e., a specific file system location. The second method involves using external navigation tools which, when manipulated, update the address bar to reflect the new address or location. While bypassing the manual edit of the address in the address bar, manipulating external navigation tools still requires the user to have specific information concerning the organization of the file system and traverse the hierarchical structure. However, conventional address bars cannot reference files or data stored among multiple file system locations, such as folders or drives, due to a one-to-one relationship between the address in the address bar and a specific location in the file system hierarchy.

The prior art lacks an address bar that allows users to specify addresses that display files stored among multiple file system locations or having any of various properties. The prior art further lacks an address bar that also permits users to easily modify the address of the address bar without manually editing the address, or requiring specific knowledge concerning the organization of the underlying file system. Also lacking in the prior art is an address bar that presents alternative selections of files to the user from which the user may select to navigate to those selections of files. Such an address bar could also selectively present a conventional address bar interface to the user enabling the user to interact with the address bar according to previous experience according to user preferences.

Another issue with file systems is related to the identification of items stored on a computer. The need to readily identify items stored in a computing environment such as a personal computer (PC) is dramatically increasing as more individuals utilize computers in their daily routines and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WINDOWS® EXPLORER™ is an operating system utility which enables users to browse the file system.

Many users find it difficult to correctly identify a file based on the information currently available in conventional file system browsers. Of course the contents of a file can be verified by opening it with an application program, but this method of browsing files is extremely inefficient. The ability to view metadata about a file within a file system browser can greatly assist a user in identifying a particular file without having to open it. In Microsoft Corporation's WINDOWS® 9X operating systems, for example, a user can view object metadata by accessing the property sheet for a particular object. A property sheet presents the user with a list of the attributes or settings of an object in the form of a tabbed, index-card-like selection of property pages, each of which features standard dialog-style controls for customizing parameters. However, using the property sheet to locate an item can be slow and cumbersome, and some users find it difficult to locate the relevant metadata in a property sheet. Similarly, the use of infotips to locate an item can be slow and cumbersome because a user must hover the mouse over each file in order to view the limited metadata displayed in an infotip.

Conventional file system browsers do not allow users to enter and edit metadata relating to files and folders, which would significantly enhance a user's ability to later locate a file. To date, the ability of users to enter and edit metadata has been limited to special purpose software programs. For example, media players for electronic music files present users with the ability to edit metadata associated with music albums and artists. Another example of such programs includes application programs for electronic picture files. However, the utility of media players and other such programs is limited to the particular type of file supported by the program, as opposed to a general purpose file system browser which supports multiple file types.

Microsoft Corporation's WINDOWS® XP operating system includes an image browser for use in the My Pictures folder. The My Pictures folder is endowed with special features which enable users to view pictures as photos, not just as document icons. My Picture's image browsing features include the ability to view thumbnail-size and large versions of photos, rotate photos that are sideways, and create a slide show. A user can also view a photo's details, such as its dimensions, the date and time it was taken, and the name of the camera that took it. The preview control area in the My Picture's folder contains an enlarged preview image of a user-selected image, iterator buttons to assist a user in iterating through a series of pictures and controls for rotating pictures in a clockwise or counterclockwise direction. While the image browsing features in WINDOWS® XP have advanced the state of the art by alleviating the need to invoke an application program to view and manipulate pictures, users still cannot enter and edit metadata associated with the pictures.

Accordingly, there is a need for an improved user experience within a shell or file system browser which enables users to readily locate an item based on the metadata associated with that item. There is also a need for a system and method which allow users to enter and edit metadata associated with items of various types within a shell browser without the need to invoke an application program. There is also a need for a file system or shell browser which offers users improved file content recognition features so that users can readily locate their files. A need also exists for an improved graphical user interface for a shell browser which allows for the selection of a previewer for a particular file type from a plurality of available previewers. There is also a need for an extensible shell browser which would allow software developers to provide additional information and functionality to users on a file type basis. There is also a need to provide a similar UI experience across different collections of items.

SUMMARY OF THE INVENTION

In accordance with one aspect of the invention, a system and method utilizing virtual folders is provided. The virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

In accordance with another aspect of the invention, the virtual folders are provided according to a method that is utilized in a computer system having a display and a memory for storing the items. In accordance with the method, a metadata property is selected. The system then searches for items that have the selected metadata property, and a virtual folder display object is provided that represents the collection of items that have the metadata property.

In accordance with another aspect of the invention, the system includes a folder processor that obtains queries from a user and a relational database for storing information about the items. The folder processor first obtains a query from a user and passes the query to the relational database. The relational database provides results back to the folder processor, and based on the results from the relational database, the folder processor provides the results to the user as virtual folders. In one embodiment, the results that are provided back to the folder processor include database rows and columns.

The database rows and columns are converted by the folder processor into an enumerator structure, which is then used to populate the display with the resulting virtual folders.

In accordance with another aspect of the invention, users are able to work with the virtual folders through direct manipulation. In other words, the mechanisms that are provided for manipulating the virtual folders are similar to those that are currently used for manipulating conventional physical folders (e.g., clicking and dragging, copying, pasting, etc.).

In accordance with another aspect of the invention, the method for performing the direct manipulation of the virtual folders is provided in a computer system having a display and a memory for storing the items. In accordance with the method, groups of items are represented as virtual folders. Defined actions are provided that can be performed for direct manipulation of the virtual folders, wherein when a defined action is performed, the virtual folder is manipulated as directed by the defined action. An example of a defined action would be clicking and dragging a virtual folder. In one embodiment, the action of clicking and dragging a first virtual folder to a second virtual folder performs the function of copying the items from the first virtual folder to the second virtual folder. The copying of items to a virtual folder may involve adding or otherwise altering selected metadata properties that are associated with the items.

In accordance with another aspect of the invention, filters are provided for manipulating the virtual folders. The filters are essentially tools for narrowing down a set of items. In one embodiment, the filters are dynamically generated based on the properties of the separate items. For example, for a set of items, the filter mechanism may review the properties, and if the items generally have "authors" as a property, the filter can provide a list of the authors. Then by clicking on a particular author, the items that don't have the author disappear. This allows the user to narrow the contents.

In accordance with another aspect of the invention, a method for filtering items is provided in a computer system having a display and a memory for storing items with metadata properties. Display objects are provided on the display that each represent one or more items. The metadata properties of the items that are represented by the display objects are evaluated. A filter term is provided on the display that corresponds to a metadata property that is shared by a plurality of the items, wherein the selection of the filter term causes the items that are represented on the display to be reduced to those items that share the specified metadata property.

In accordance with another aspect of the invention, a plurality of items is represented on the display, and a filter term is dynamically generated based on the metadata properties of the items. When the filter term is selected, it reduces the items that are represented on the display to those that have the metadata property that corresponds to the filter term.

In accordance with another aspect of the invention, a plurality of items is represented on the display, and a filter area is provided in which a user can select a filter term by selecting a checkbox control. When a checkbox control is selected by the user, the items that are represented on the display are reduced to those that contain the filter term. As the user types the filter term, additional items may be filtered as each new character is added to the filter term.

In accordance with another aspect a graphical user interface is provided including a plurality of display objects, each display object representing one or more items and a property control corresponding to a property that is shared by a plurality of the items. Selection of the property control causes a list of filter terms to be presented on the display. In one aspect the filter terms may be presented in a drop down menu in which each filter has a corresponding checkbox control.

In another aspect of the invention, selection of a first check box control may cause the items that are represented on the display to only include items that satisfy the filter term corresponding to the first check box control. Selection of a second check box control when the first check box control is currently selected causes the items that are represented on the display to include items that satisfy either the first respective filter term corresponding to the first check box control or a second respective filter term corresponding to the second check box control. In other words, the filter terms cause a logical OR operation to be performed on the items in the view.

In still another aspect, the second check box control may be deselected causing the items represented on the display to include only items that satisfy at least one respective filter term corresponding to a currently selected check box control.

In another aspect, selection of a property control may cause a list of arrangement commands to be presented on the display separated from the list of filter terms. The selection of an arrangement command may cause the items to be rearranged on the display. Illustrative arrangement commands including sorting, stacking or group by the property associated with the selected property control.

In yet another aspect, the property control may be a split button. According to this aspect, selection of a first button portion may cause the list of filter terms to be presented on the display and selection of the second button portion may cause the display objects to be sorted by the property.

In accordance with another aspect of the invention, a scope is utilized in a method for displaying items in a computer system having a display. The method involves defining a scope of the physical memory locations from which items are to be drawn, the scope comprising the present computer memory and at least one other physical location. Once a query is received, in response to the query items are drawn from the physical locations as defined in the scope, and the items that are drawn from the query are then presented in a view on the display. In one embodiment, the at least one other physical location may be another computer, a location on a network, or an external storage device. In one embodiment, the view on the display can be switched to a physical folder view which indicates the physical locations where the items are physically stored.

In accordance with another aspect of the invention, non-file items may be represented in the virtual folders. In other words, files that are stored in memory are located in a physical store. The virtual folders can be made to include items that are not currently represented in the physical store. Examples of non-file items are e-mails, and contacts.

In accordance with another aspect of the invention, a method for presenting non-file items is implemented in a computer system with a display and a memory for storing items. The method includes providing a database that allows both non-file items and file items to be searched by a query. Once a query is received, both non-file items and file items that match the query are drawn, and the items that match the query are then presented on the display. In one embodiment, a relational database is provided that includes selected information about file items, and which may hold certain non-file items in their entireties.

According to another aspect of the invention an address bar is provided for selecting content stored in a physical or virtual location. The address bar may comprise a plurality of segments. Each segment may correspond to a filter or selection criteria for selecting stored content. A segment may include more than one filter or selection criteria, where the content corresponding to each of the filters or selection criteria in a segment may be represented. In this instance, a logical "or" operation referred to as "OR" filtering occurs where content corresponding to separate selection criteria from two or more different locations, whether virtual or physical, can be accessed. Collectively, the corresponding filters of the segments in the address bar represent an address for selecting content stored on a computer file system.

Each segment is an interactive segment that can respond to user interactions to modify the address of the address bar. Selecting a segment in the address bar causes those segments subsequent to the selected segment to be removed from the address bar.

According to one aspect, selecting a child control associated with a segment in the address bar causes a list of selectable child filters or selection criteria to be displayed to the user. The child filters or selection criteria are children of the filter(s) or selection criteria included with the segment. Selecting one of the child filters or selection criteria from the list of child filters or selection criteria causes the current (child) filter or selection criteria of the segment displayed in the address bar, if different from the selected child filter or selection criteria, to be replaced with the selected child filter or selection criteria. Additionally, those segments subsequent to the segment of the replaced child filter or selection criteria are removed from the address bar.

In accordance with another aspect of the invention, a shell browser is provided which includes a window and an edit control. The window displays a group of items and also displays metadata values associated with one or more of the displayed items. The edit control permits user modification of at least a portion of the metadata values displayed in the window.

In accordance with another aspect of the invention, a graphical user interface is embodied on a computer-readable medium and is executable on a computer. The graphical user interface includes a first screen area which displays a set of items in a shell browser and a second screen area which displays metadata associated with one or more of the displayed items. The graphical user interface also presents the user with means within the shell browser for modifying the displayed metadata.

In accordance with a further aspect of the invention, computer-implemented methods are provided for enabling a user to modify metadata within a shell browser. One such method includes displaying a plurality of items, receiving a first input from the user representing a selection of at least one displayed item, displaying metadata associated with the selected item(s) and providing an edit control for user modification of the displayed metadata. Another such method includes displaying a welcome pane and metadata associated with the welcome pane and providing an edit control for user modification of the displayed metadata.

In accordance with another aspect of the invention, a data structure containing metadata associated with one or more items is displayed in a shell browser. The data structure, which is stored on one or more computer-readable media, includes a field containing user modifiable metadata associated with the one or more displayed items, and the user modifiable metadata contained in the data structure is also displayed in the shell browser.

In accordance with another aspect of the invention, a shell browser is provided which includes a default previewer and an extensibility mechanism. The default previewer provides a standard level of functionality for multiple item types. The extensibility mechanism enables functionality beyond the standard level provided by the default previewer for one or more of the item types.

In accordance with another aspect of the invention, a shell browser is provided which includes a first previewer and a second previewer. The first previewer provides a standard level of functionality for multiple item types, and the second previewer provides an alternative or extended level of functionality for one or more of the multiple item types. The shell browser is configured to selectively deploy either the first previewer or the second previewer for the one or more item types.

In accordance with another aspect of the present invention, a graphical user interface for a shell browser which supports multiple item types is provided. The graphical user interface includes a first screen area for displaying a set of items in the shell browser and means for selecting a previewer for the displayed items from a plurality of available previewers.

In accordance with another aspect of the invention, a computer-implemented method is provided for selecting a previewer in a shell browser which supports multiple item types. The method includes providing a plurality of previewers in the shell browser for a particular item type and selecting one of the previewers for the particular item type. The method then associates the selected previewer with the particular item type.

In accordance with another aspect of the invention, a computer-implemented method is provided for enabling the use of third party previewers in a shell browser which supports multiple item types. The method includes providing a shell browser having a default previewer for the multiple item types and providing an extensibility mechanism which enables a third party to develop an alternative previewer for at least one of the multiple item types.

In accordance with another aspect of the invention, a data structure is provided which contains information indicative of a plurality of previewers in a shell browser. The data structure, which is stored on one or more computer-readable media, includes a first field containing information indicative of a default previewer which supports multiple item types. A second field contains information indicative of an alternative previewer for a first item type, and a third field contains information indicative of whether to invoke the default previewer or the alternative previewer when items of the first item type are displayed in the shell browser.

In accordance with another aspect of the invention, different types of items are grouped into libraries for which a similar set of basic UI features are provided. In other words, a similar set of basic UI features is provided for different types of libraries, such as a document library, a photo library, and a music library. This set of basic UI features may include features such as filtering, creating new categories, editing the metadata of the items, altering the pivots, etc. The similar set of basic UI features for the libraries allows a user to process and organize different types of items using attributes and features they are already familiar with.

Another aspect of the invention provides a method of specifying a scope of items on a computer system or network via a graphical user interface dual-component control by displaying a first component including a tree-like display of a plurality of hierarchically arranged items, where each item can be explicitly selected by a user for inclusion and/or exclusion from the scope. The GUI also displays a second component including a basket, or list, identifying the items explicitly included in and/or explicitly excluded from the scope. When the user explicitly selects a specific item, the control changes a state of the specific item from a previous state to a new state, and changes a state of each descendant of the specific item to a new implicit state based on the new state of the specific item.

In an illustrative embodiment, a state of each item of the plurality of hierarchically arranged items may indicate any of an unselected state, an explicitly included state, an implicitly included state, an explicitly excluded state, and an implicitly excluded state. The list of items may identify an explicitly included item corresponding to each explicitly excluded item.

According to an aspect of the invention, one or more computer readable media store computer executable instructions which, when executed, cause a computer system to provide on a video display a graphical user interface control for specifying a user-defined scope. The GUI control exhibits certain behavior, including displaying a plurality of hierarchically arranged items, e.g., in an expandable/collapsible tree-like manner, where each item of the plurality of hierarchically arranged items can be explicitly selected by a user for inclusion and/or exclusion from the scope. When the user explicitly selects an item for inclusion in or exclusion from the scope, the control implicitly selects all descendants of the explicitly selected item for inclusion in or exclusion from the scope, respectively. The control also displays, separately from the plurality of hierarchically arranged items, a first list of items explicitly included in the scope and a second list of items explicitly excluded from the scope, where each item in the second list corresponds to an item in the first list.

According to another aspect of the invention, when the user explicitly selects an unselected or implicitly excluded item, the control changes a state of the explicitly selected item to be explicitly included in the scope, and changes a state of each descendant of the explicitly selected item to be implicitly included in the scope. When the user explicitly selects an implicitly included item, the control changes the state of the explicitly selected item to be explicitly excluded from the scope, and changes the state of each descendant of the explicitly selected item to be implicitly excluded from the scope.

In some illustrative embodiments, the control may present a first inclusion indicator corresponding to each displayed explicitly included item, a second inclusion indicator, less prominent than each first inclusion indicator, corresponding to each displayed implicitly included item, and an exclusion indicator corresponding to each displayed explicitly excluded item.

Advantageously, various examples of the invention provide a tool for creating integrated collections. With some implementations of the invention, the tool may include a "basket" control that receives objects to be included in a collection. The basket control, also referred to as a list pane, may, for example, include interfaces for receiving and displaying the data objects that are selected by a user to be included in a collection. A user may thus build a collection of data objects simply by providing the data objects to the basket control. A collection creation component then provides a collection with one or more data items corresponding to the objects submitted to the basket control. With various aspects of the invention, a collection can be compiled with any desired data objects, including discrete data (such as text), data files, pointers to data files, queries or exclusions for identifying data files based upon designated criteria, both virtual and physical folders containing one or more data objects, and even other collections of data objects.

The basket control may be employed by itself to make collections, or it may be hosted by another software object. For example, various implementations of the invention may additionally include a "listmaker" control that conveniently contains both the basket control and one or more user interfaces that a user can employ to provide data objects to the basket control. For example, the listmaker control may include a viewing graphical user interface (such as a file browser) for viewing data objects and a navigation toolbar for navigating the viewing graphical user interface. The listmaker control may then be hosted as desired by software developers in a variety of software applications.

One or more aspects of the invention may be directed to computer systems, stored software, and/or methods for creating a static list of data objects stored on a computer system. Aspects of the invention may display on a computer display device a graphical user interface (GUI) frame, e.g., an explorer frame, comprising a primary view pane and a list pane. The primary view pane displays data objects stored on the computer system in a first predefined location, e.g., a virtual or physical folder identified by a user, and the list pane displays information corresponding to items in a static list associated with the list pane. Each item in the static list corresponds to a data object, and includes information pertaining to the data object, e.g., a pointer to the data object, the item's order in the list, annotations regarding the item, etc. A user may provide input identifying a first data object displayed in the primary view pane to be added to the static list such that an item corresponding to the first data object is added to the static list. Information about the first item, e.g., icon, name, annotations, etc., may be displayed in the list pane. The user can specify a second predefined location, causing the primary view pane to display data objects stored in the second predefined location without changing the static list with which the list pane is associated.

According to various illustrative aspects of the invention, each static list may have a persistence model where the contents of the static list are discarded unless the user has expressed an intent, explicit or implied, to save the static list. Implied intent can be indicated by the user renaming the static list from a default name to a user-defined name.

Aspects of the present invention provide a system and method in which the user is given a preview representation of a file that is about to be created. The preview may appear as part of a save file dialog, and may show an indicia corresponding to the new to-be-created file, and may show how the new file may be visually represented in the GUI after the save is performed. The preview may exhibit certain behaviors, such as having a unique appearance, always appearing as a first element, to be easily noticed by the user. Users may also interact with the preview to manage the file and/or edit its properties even before the file is saved. The preview may also intelligently guide the user through the save process by, for example, refusing to allow the user to save the file to an invalid location, or automatically populating metadata fields based on user navigation through the GUI.

Another aspect of the present invention may provides a system and method in which the user is given an improved file browsing interface by specializing an explorer or shell browser view. The browsing interface may vary depending on the contents to be displayed. In some instances, the browsing interface may customize the user interface options presented in the browser panel in accordance with the contents to be displayed. The browser may rearrange, remove, and/or add displayed properties in accordance with the contents. Other aspects of the browser's features, appearance, and/or organization may be customized based on the contents. One or more templates may be provided and/or created to provide a predetermined set of criteria for generating a browser panel. Software interfaces may be provided to allow development of additional browser panels by users and/or applications. User interaction with such a browser may cause further alterations in the browser's appearance and/or functionality.

According to other aspects of the present invention a shell browser with an integrated page space control provides navigational tools for storage systems of computers, their operating systems, networks, and the like. In accordance with at least some examples of the invention, navigation tools and/or their corresponding user interfaces and displays may be provided in multiple different windows, application programs, and the like. In at least some examples of this invention, navigation tools or and/or their corresponding user interfaces and display panel(s) may include windows or panes that include "links" to various different files, lists, folders, pages, and/or other storage elements. If desired, navigational tools in accordance with at least some aspects of this invention may be customized for different application programs, for portions of applications programs, for portions of operating systems, by different users, and the like (e.g., by independent software providers from those providing the computer operating system) to be better suited or targeted for navigating information relating to that set of files, etc., and/or to that user. The navigational tools in accordance with at least some examples of this invention also may provide useful ways of organizing and/or displaying information regarding the user's files, e.g., by hierarchical properties, lists, auto lists, folders, etc. Systems and methods according to at least some examples of the invention also may make it easy for users to assign properties to files, change assigned properties associated with files, and the like, optionally with the use of hierarchical properties. Additionally, in accordance with at least some examples of the invention, navigational tools may be provided for searching, locating, and viewing information relating to stored or accessible files, e.g., in a query-based file and/or retrieval system.

Additional aspects of the invention relate to computer-readable media including computer-executable instructions stored thereon for performing various methods and/or operating various systems, including systems and methods having navigational tools for organizing, searching, locating, and/or displaying information relating to files located in a computer storage system and/or accessible through a computer system as described above (and as will be described in more detail below).

One or more illustrative aspects of the present invention provide a method and system of creating and customizing multiple roots in a navigation pane or panel or page space control. With such a system, a user may be able to bypass needless navigation by allowing direct access to relevant documents, applications and other data through such alternative roots. A user may customize a navigation pane by dragging a desired root or structure to a specific position in the navigation pane. The user may organize and reorganize the roots in a navigation pane by clicking and dragging the roots to particular positions relative to the other roots on the pane. Dragging the roots to the desktop may further create a shortcut to that root. Users may further have the option of adjusting the properties of each root, allowing further customizability.

According to an aspect of the invention, the multiple roots system permits roots to comprise other types of nodes beyond the typical physical locations (i.e., physical folders) used in current systems. More specifically, the multiple roots system allows users to define lists and autolists as roots in the navigation pane. These lists and autolists may comprise files or other data that satisfy a specified set of rules or filters. Additionally, roots may comprise custom extensions that correspond to a user's email (e.g., MSN® Hotmail Drive). These enhancements to the navigation system permit the user significantly greater flexibility in customizing a preferred set of navigation controls in a variety of applications.

Aspects of the present invention may provide a system and method for user modification of properties (or metadata). In one aspect, a shell browser is provided which includes a display of file properties that may include multi-value properties. The user may edit the multi-value property, and the system may intelligently assist the user in editing the multi-value property. The system may tokenize the multi-value property values, and may provide persistent prompt text within a multi-value property field as a reminder to the user of the field's options.

The system may display aggregated property values, and may incorporate visual differences to associate aggregated values with the files to which they apply. Editing of the aggregated values is possible, and when editing aggregated multi-value properties, the system may intelligently assist the user in selecting (or avoiding) entries based on a variety of factors, such as the entries already in use and the context in which the property values are used. When aggregating multi-value properties for multiple selected files, the system may also take steps to help preserve the order in which particular values appeared in the various files. Values that tended to appear more often in the beginning of a file's multi-value property will tend to appear towards the beginning of the corresponding aggregated multi-value property.

Another aspect of the invention provides a method and system for dynamic navigation of data based on user navigation. The method automatically dynamically scrolls data in a second dimension while a user is manually navigating in a first dimension. The method includes displaying a view of content in a predetermined viewable area in a window pane. The method further includes determining whether a user input will result in a relevant node being at least partially obscured. The method also includes automatically dynamically horizontally scrolling a view of content for a predetermined distance so that a relevant node is entirely visible, or has increased visibility. In various embodiments of the invention, the relevant node may be a node in a tree control (e.g., navigation pane, navigation panel, page space control, or the like) that has input or view focus or a node that is closest in proximity to a user's mouse pointer or other input indicia. While it is understood that the invention may be implemented as a method, it may also be implemented as a system for user navigation in a folder tree control or for navigation of other data, as described herein.

Various aspects of the invention may communicate with other code modules via one or more programming interfaces or other interfaces for accessing data files. For example, and aspect of the invention provides a file dialog having a dedicated extensibility region for inclusion of one or more user interface (UI) controls. The controls which can be included in an extensibility region are selectable from a predefined collection of UI control types. When an application requests the OS to display a file dialog, the application can request inclusion of one or more controls of the types in the predefined collection. The OS then places the requested controls in the extensibility region of the displayed dialog. The application need not provide data explicitly indicating the positions within the dialog of the identified controls. The application may also request that the controls be placed in groups and/or that separators be included between groups.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 130 depicts an example of a multi-value property field.

FIG. 131 depicts an example process for an autoselect feature.

FIG. 132 depicts an example of a multi-value property field with the autocomplete feature.

FIG. 133 depicts an example process for an autocomplete feature.

FIG. 134 is a flow diagram illustrative of a child filter selection routine for selecting child filters in a virtual address bar according to aspects of the present invention; and FIGS. 135A-135D are pictorial diagrams illustrating selecting a child filter associated with a segment of a virtual address in a virtual address bar.

FIG. 136 illustrates a conventional prior art folder tree control displayed in a window pane.

FIG. 137 illustrates a view of a hierarchical tree control structure implemented in accordance with various illustrative aspects of the invention.

FIGS. 138A and 138B illustrate a screenshot of a folder tree control implemented in accordance with various illustrative aspects of the invention.

FIG. 139 is a flowchart describing a method for providing content for display to a user navigating through the content in accordance with various illustrative embodiments of the invention.

FIG. 140 is a diagram illustrative of a details view with grouping in a conventional operating system;

FIG. 141A is a diagram illustrative of a property header including property controls in a details view according to aspects of the present invention;

FIG. 141B is a diagram illustrative of a split button property control in a property header in a details view according to aspects of the present invention;

Figure 141A:
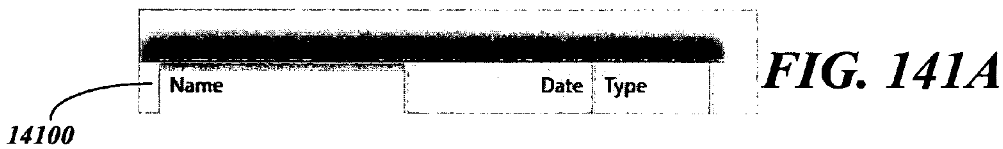
Figure 141B:
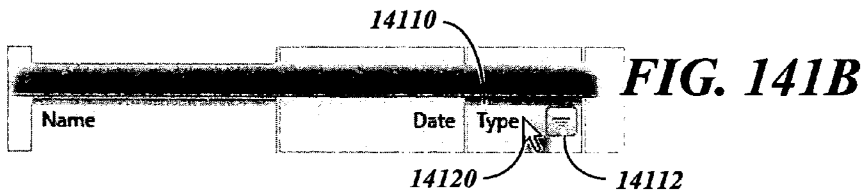
Figure 141C:
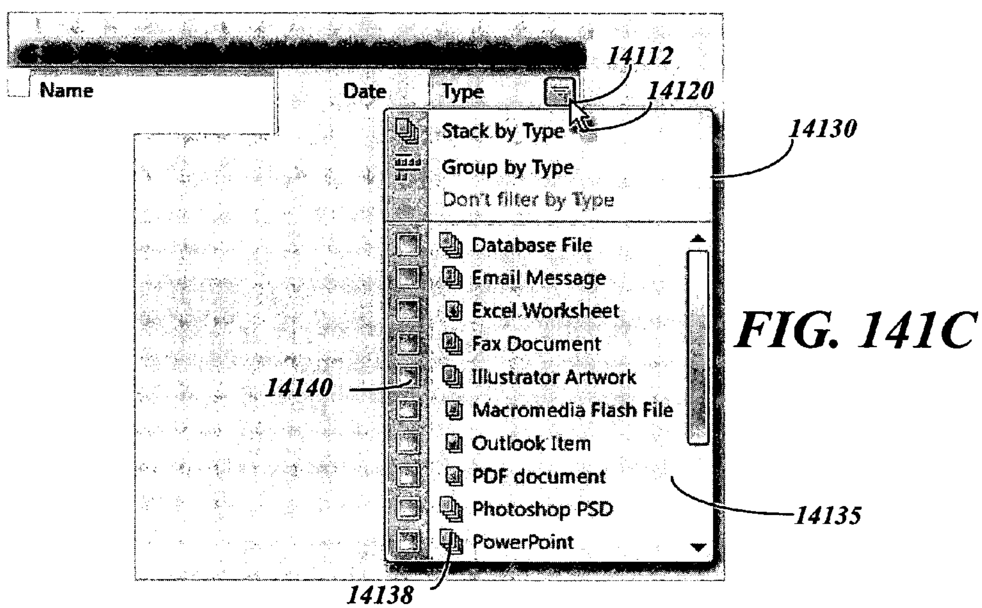
Figure 141D:
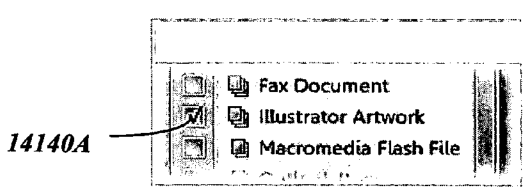
Figure 142A:
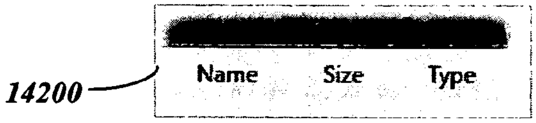
Figure 142B:
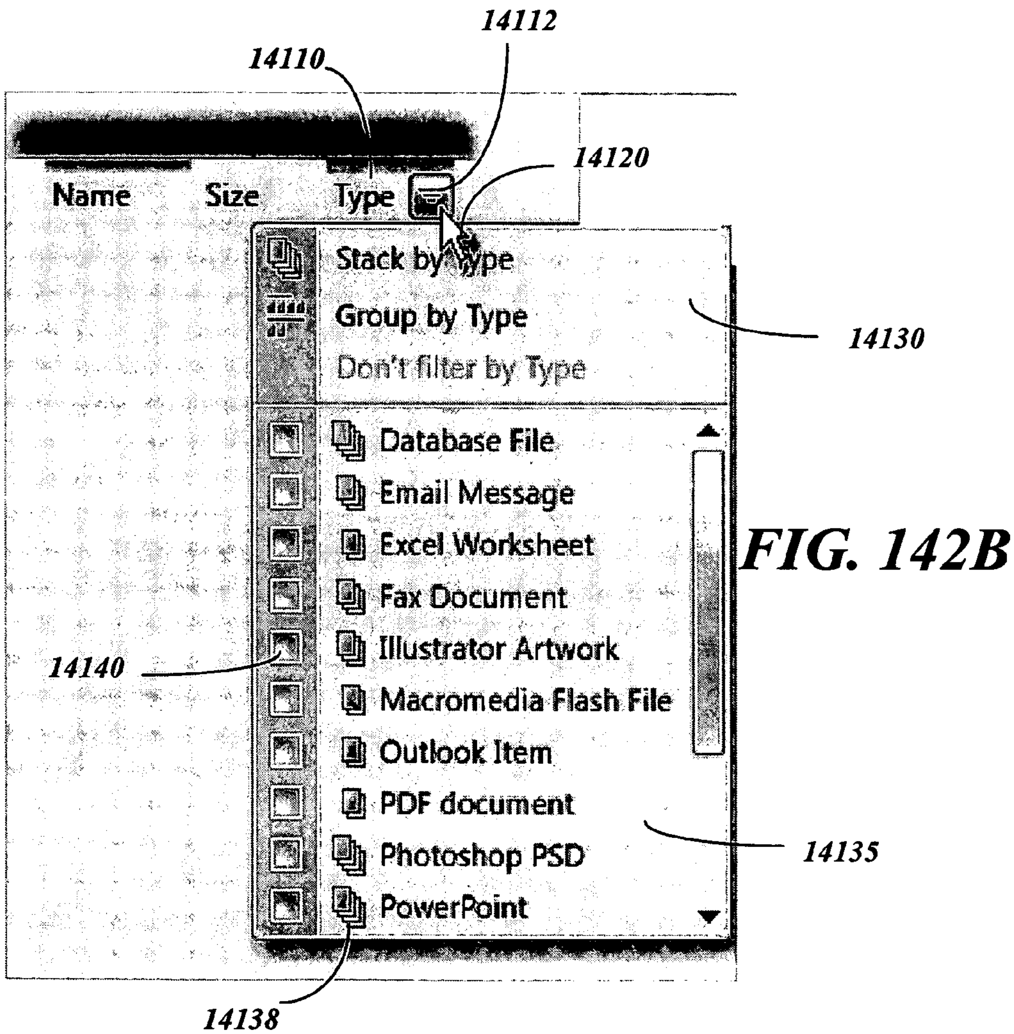
Figure 142C:
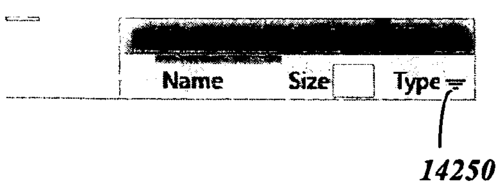
Figure 143:
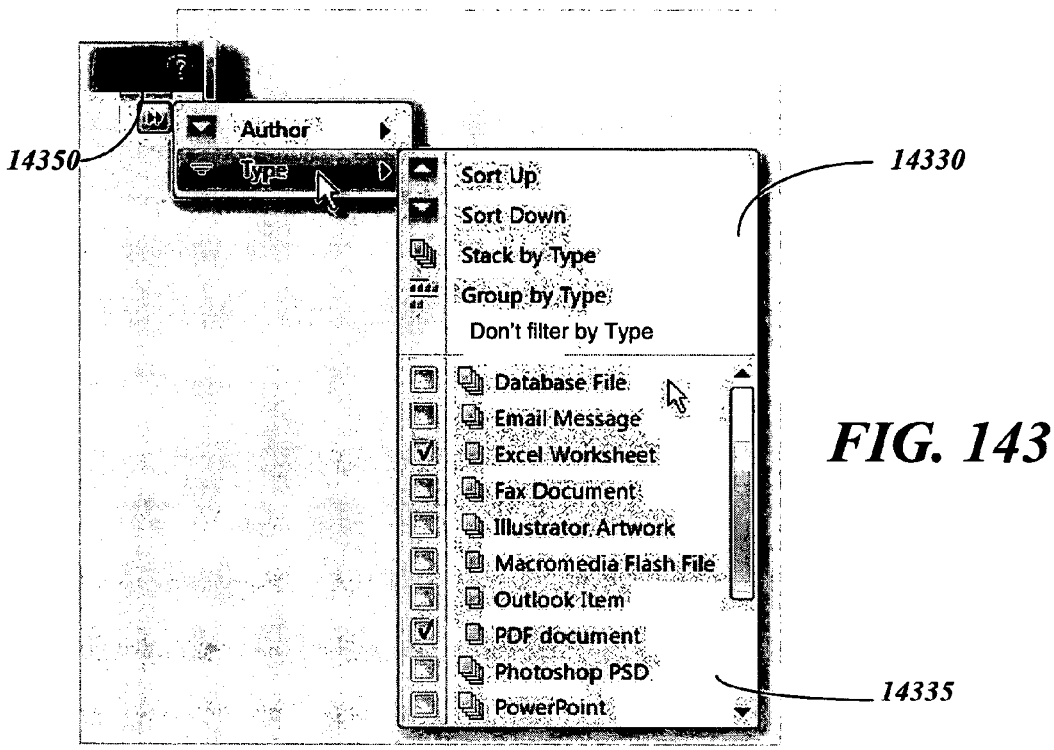
Figure 144:
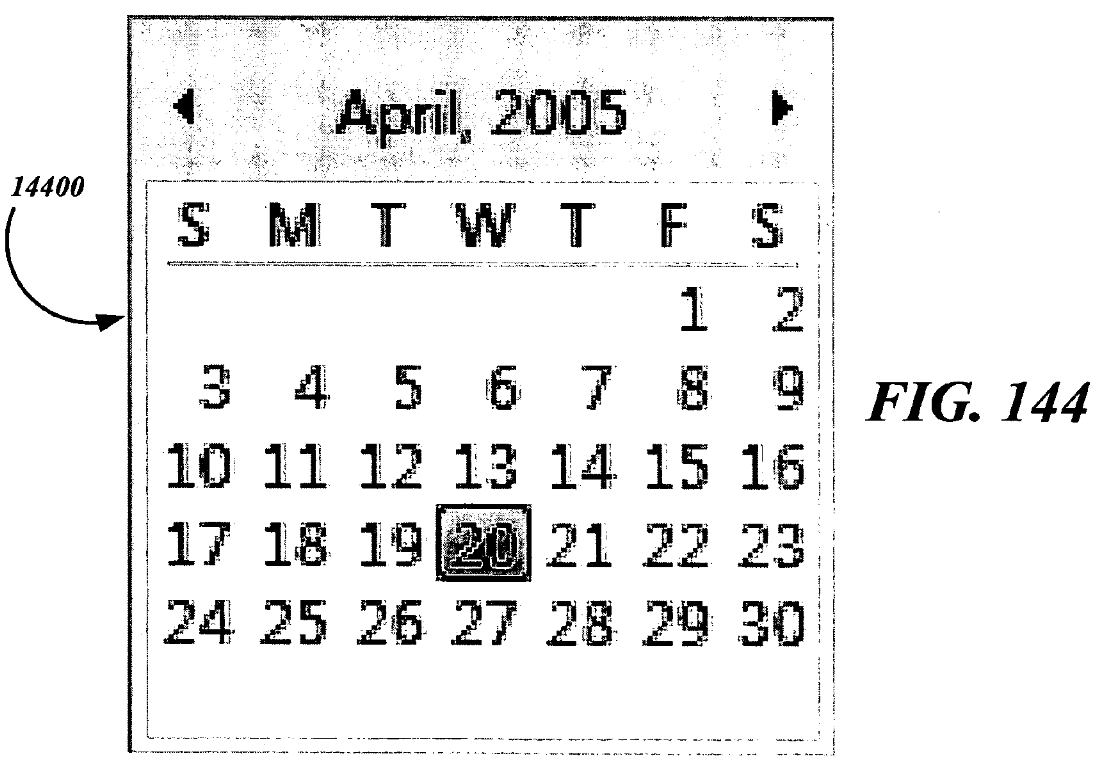

FIG. 141C is a diagram illustrative of an arrange and filter drop down menu of the a property control in a property header in a details view according to aspects of the present invention;

FIG. 141D is a diagram illustrative of part of a filter portion of an arrange and filter drop down menu according to aspects of the present invention;

FIG. 142A is a diagram illustrative of a property header including property controls in a view other than a details view according to aspects of the present invention;

FIG. 142B is a diagram illustrative of an arrange and filter drop down menu of a property control in a property header in a view other than a details view according to aspects of the present invention;

FIG. 142C is a diagram illustrative of a property header where the view has been filtered by one of the property controls in the property header in a view other than a details view according to aspects of the present invention;

FIG. 143 is a diagram illustrative of an arrange and filter drop down menu of an overflow property control in a view according to aspects of the present invention; and FIG. 144 is a diagram illustrative of a calendar control according to aspects of the present invention.

FIGS. 145A through 145M show programming interfaces, in a general-purpose computer environment, with which one or more embodiments of the present invention may be implemented.

Figure 146:
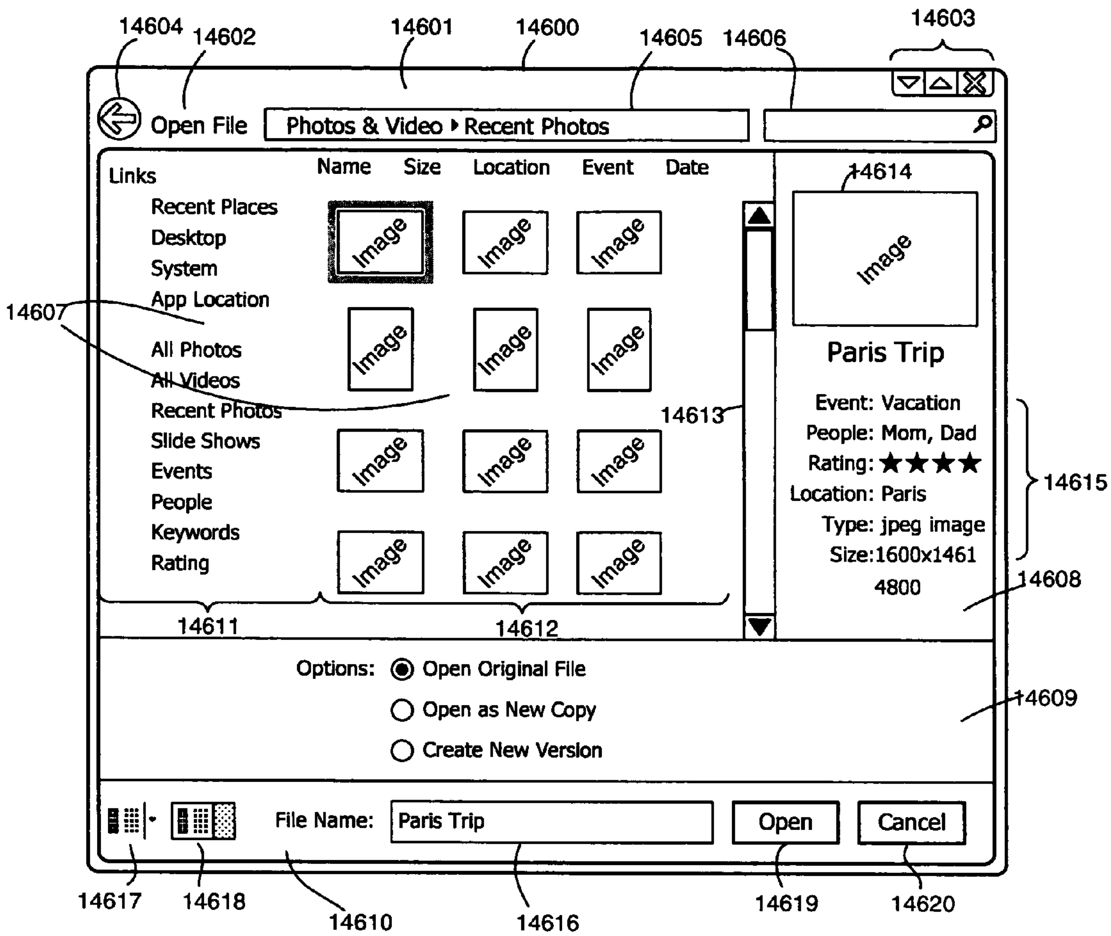
Figure 147:
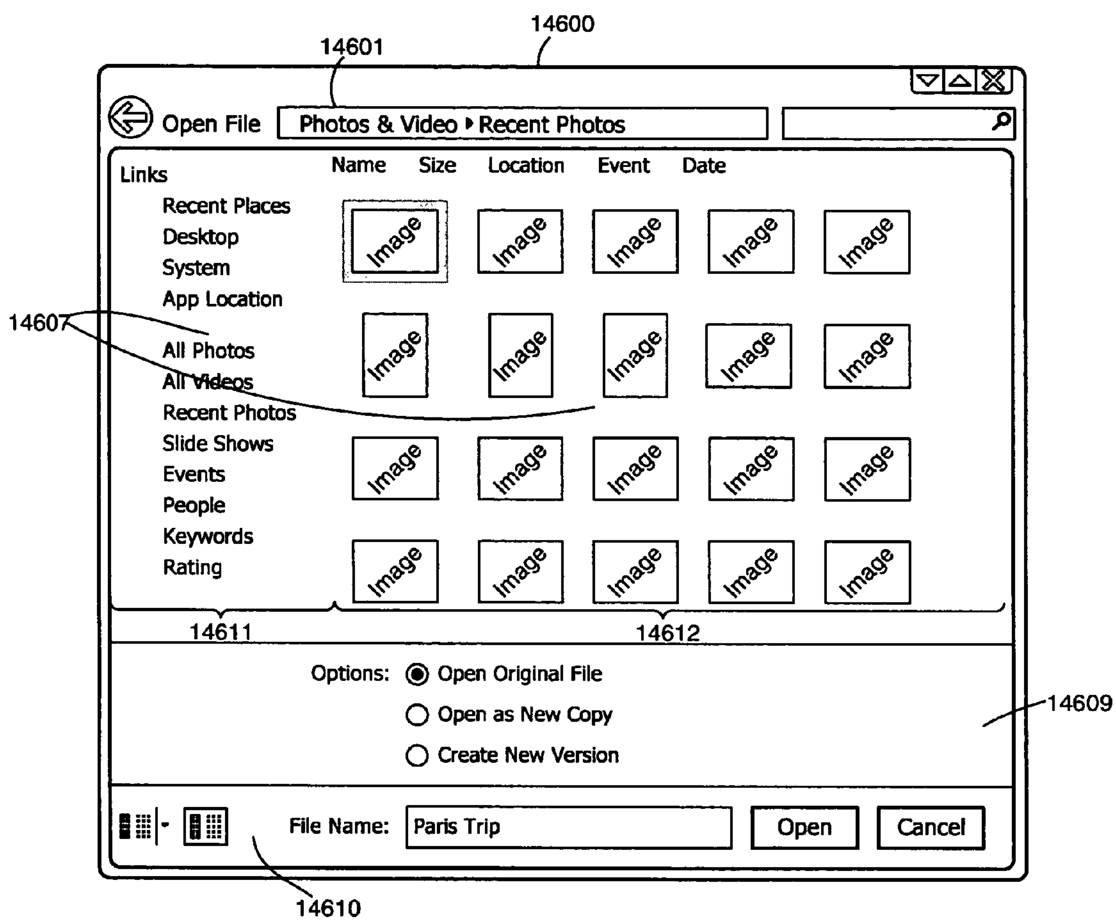

FIGS. 146 and 147 are examples of an "Open File" dialog according to at least some embodiments of the invention.

Figure 148:
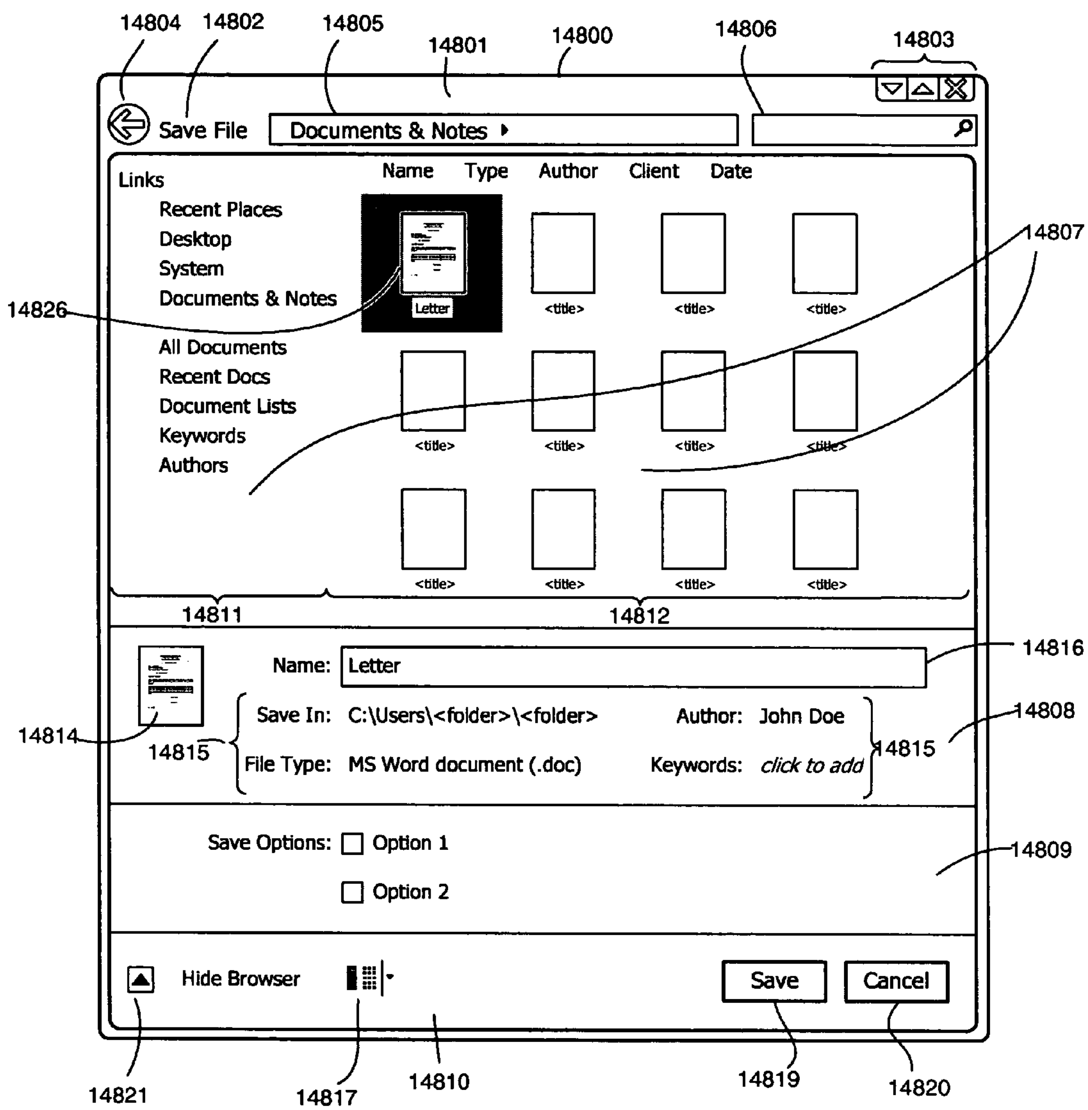
Figure 149:
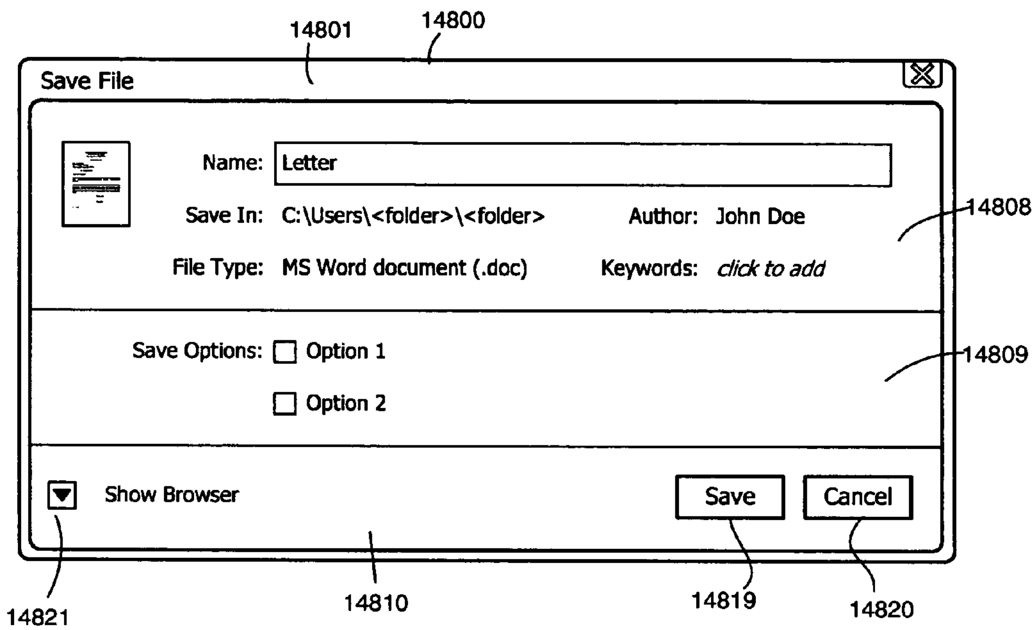

FIGS. 148 and 149 are examples of a "Save File" dialog according to at least some embodiments of the invention.

FIGS. 150-154B are examples of additional user interface (UI) controls which may be added to a file dialog according to at least some embodiments of the invention.

Figure 155:
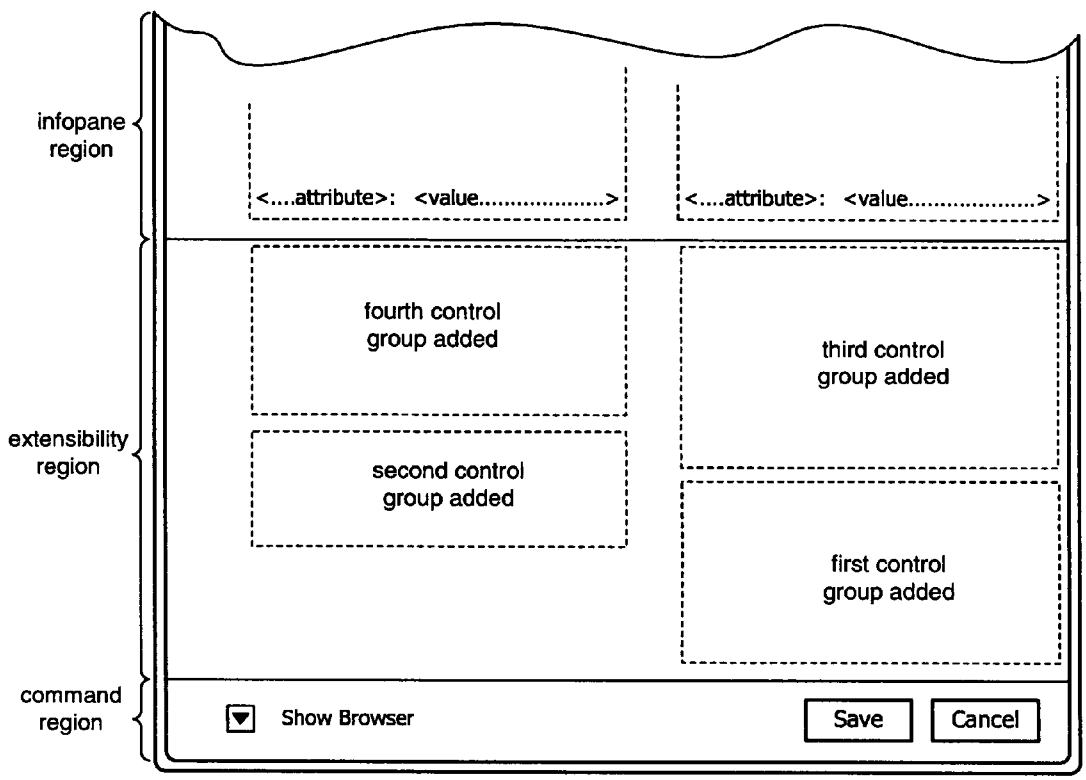
Figure 156:
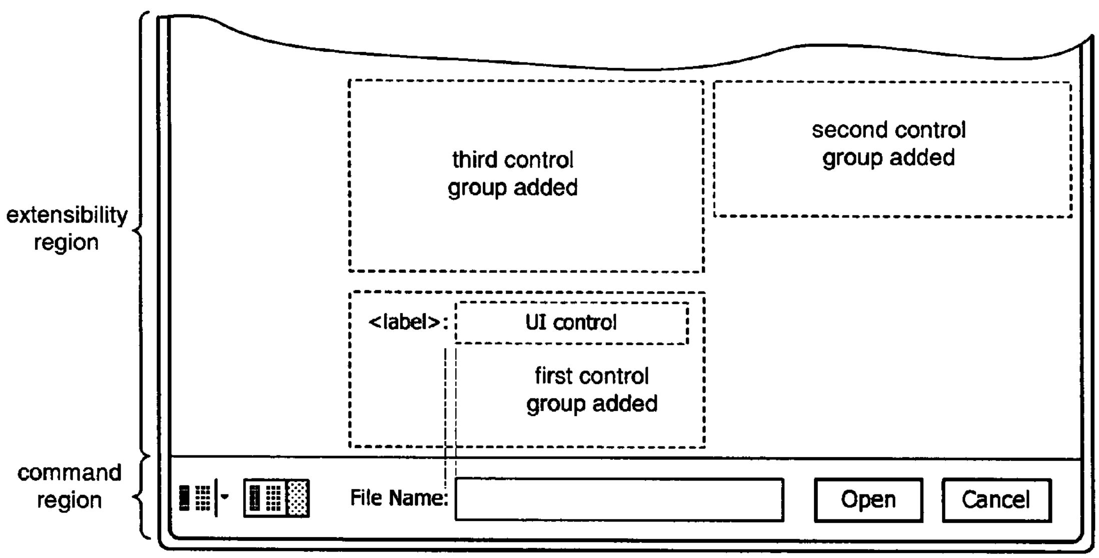

FIGS. 155 and 156 show automatic arrangement of UI controls according to at least some embodiments of the invention.

Figure 157:
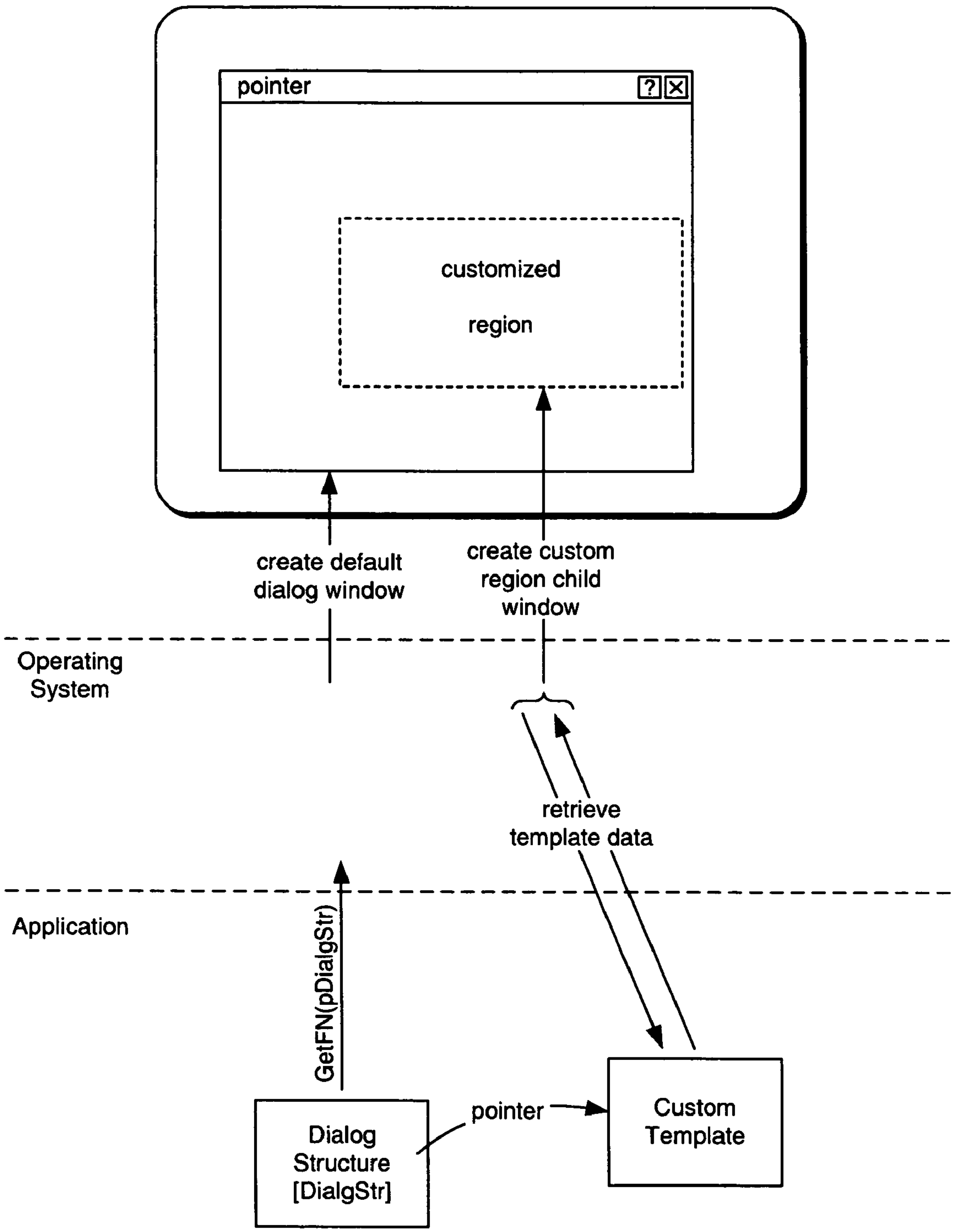
Figure 158:
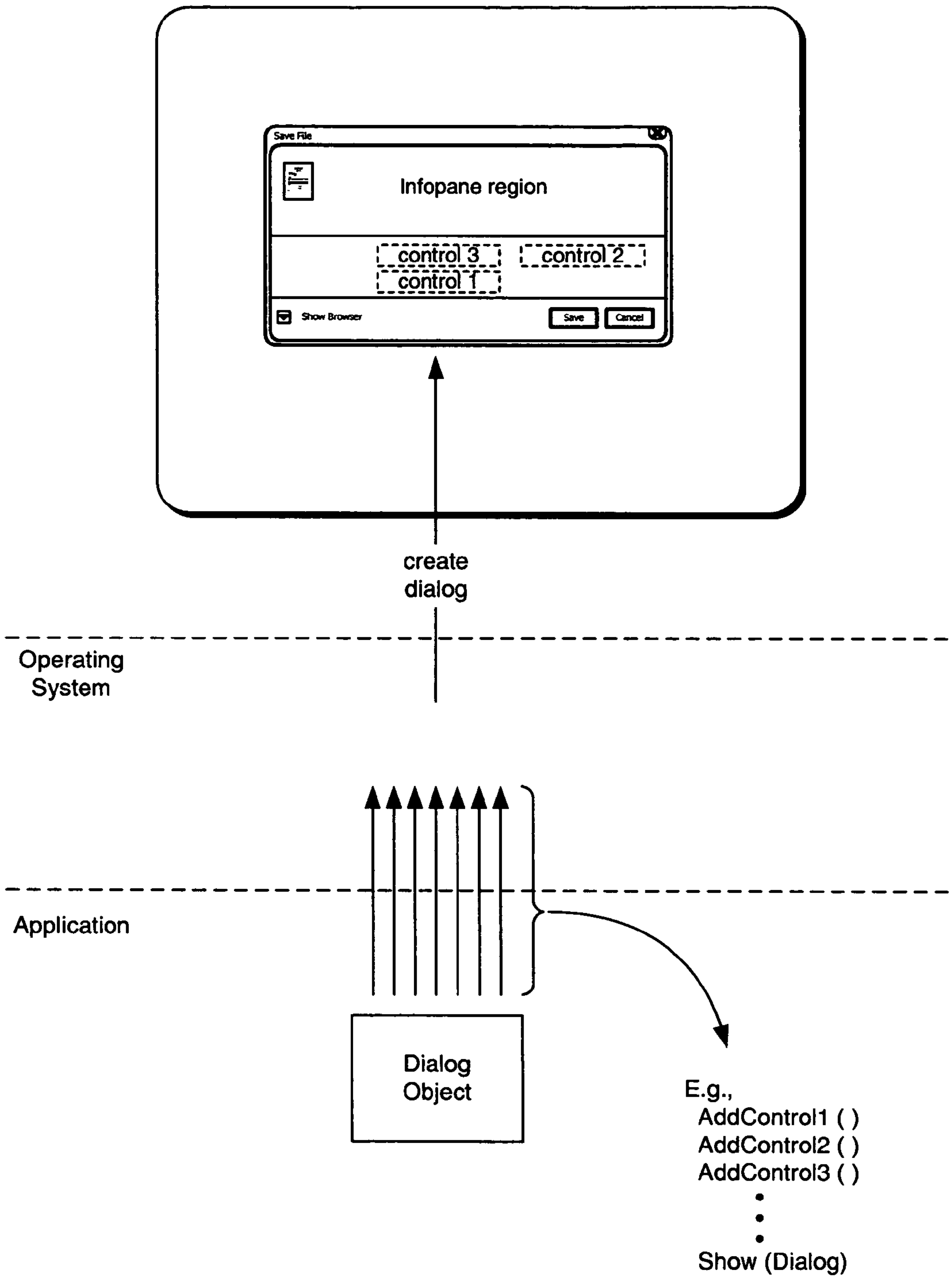

FIGS. 157 and 158 are block diagrams schematically illustrating differences between the manner in which an application requests generation of a file dialog according to embodiments of the invention and the manner in which a file dialog is requested in the prior art.

DETAILED DESCRIPTION OF THE PREFERRED EMBODIMENT

The present invention is directed to a file system shell which incorporates a number of desirable features. In essence, the shell provides users with the ability to view and manipulate files and other items that are stored on a computer. The following description first provides a summary of the features that are shown in the FIGS. 1-66, and then provides a detailed discussion.

Figure 19:
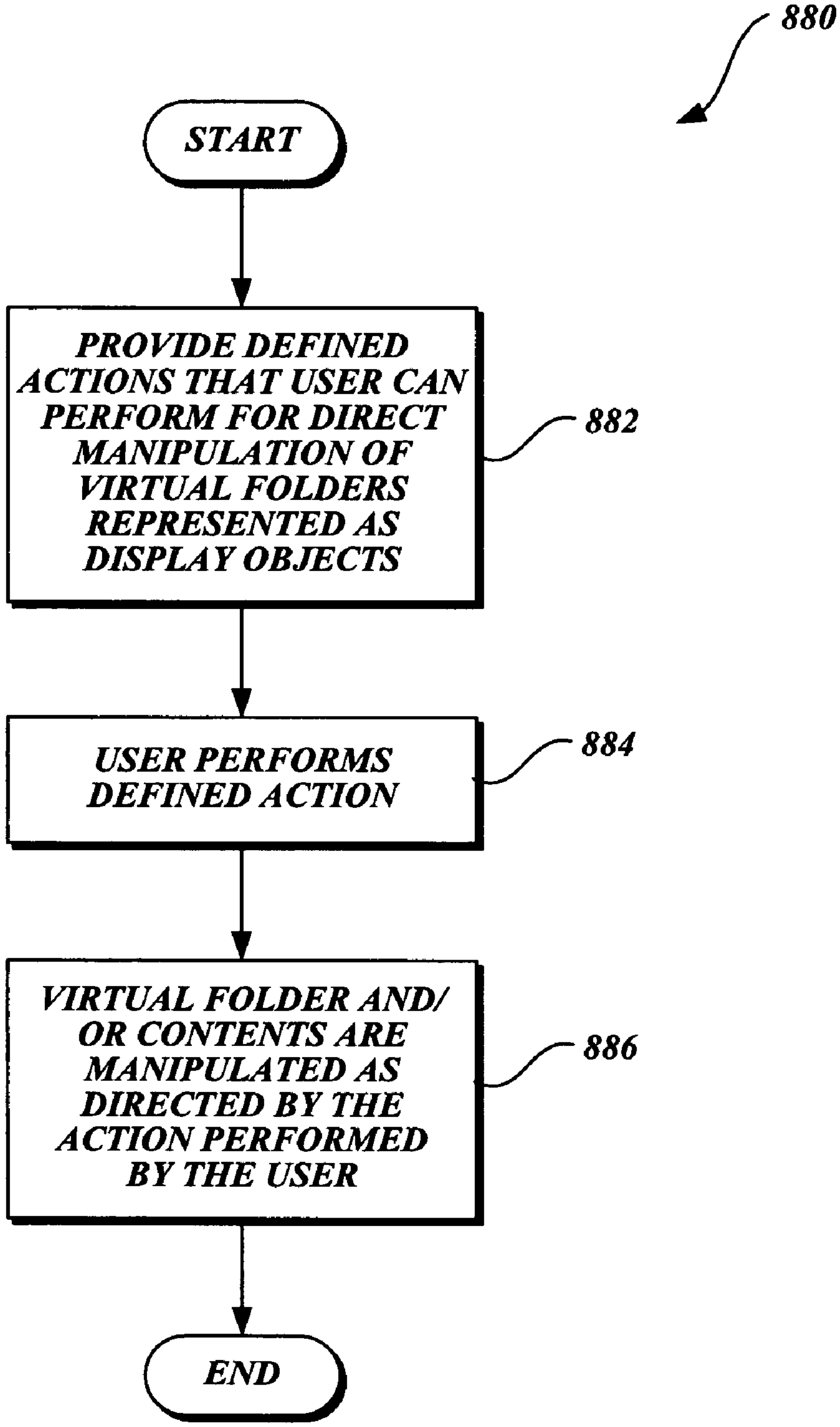
FIG. 19 is a flow diagram illustrative of a routine by which a user can directly manipulate virtual folders.
Figure 20:
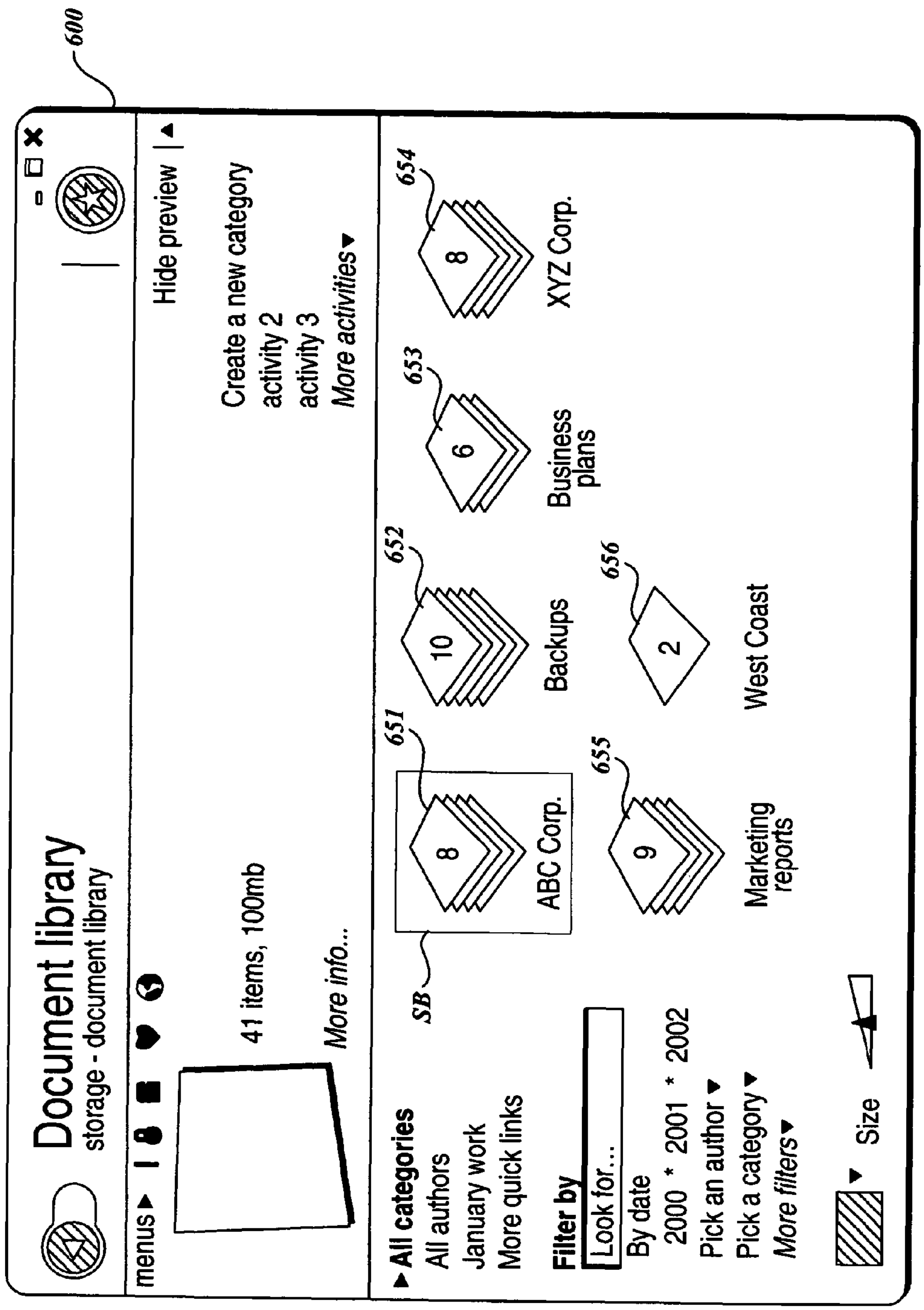
FIG. 20 is a diagram illustrative of a screen display in which a new "West Coast" stack has been added to the stacks of FIG. 10.
Figure 21:
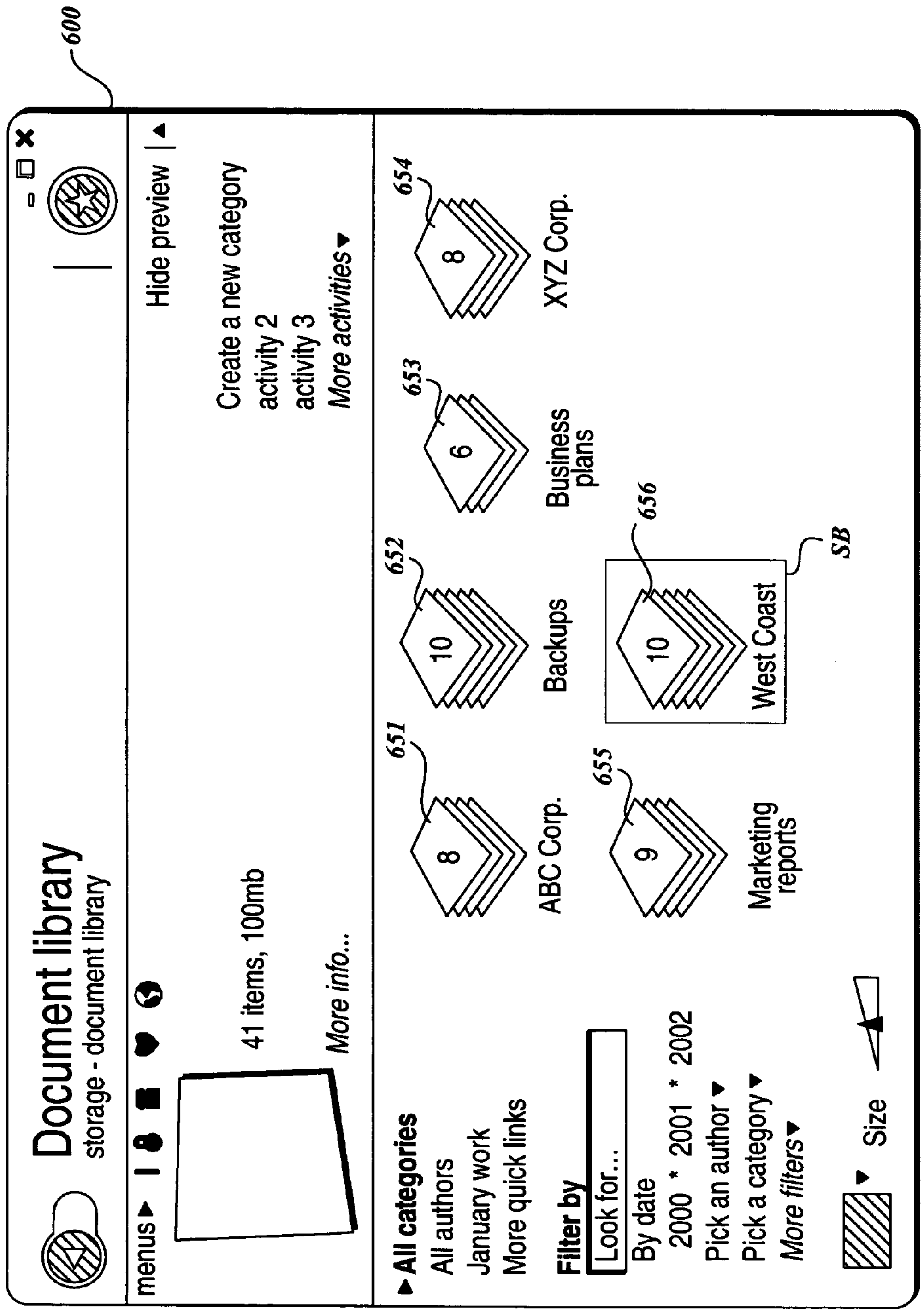
FIG. 21 is a diagram illustrative of a screen display in which direct manipulation is used for copying the files from the "ABC Corp." stack to the "West Coast" stack of FIG. 20.
Figure 35:
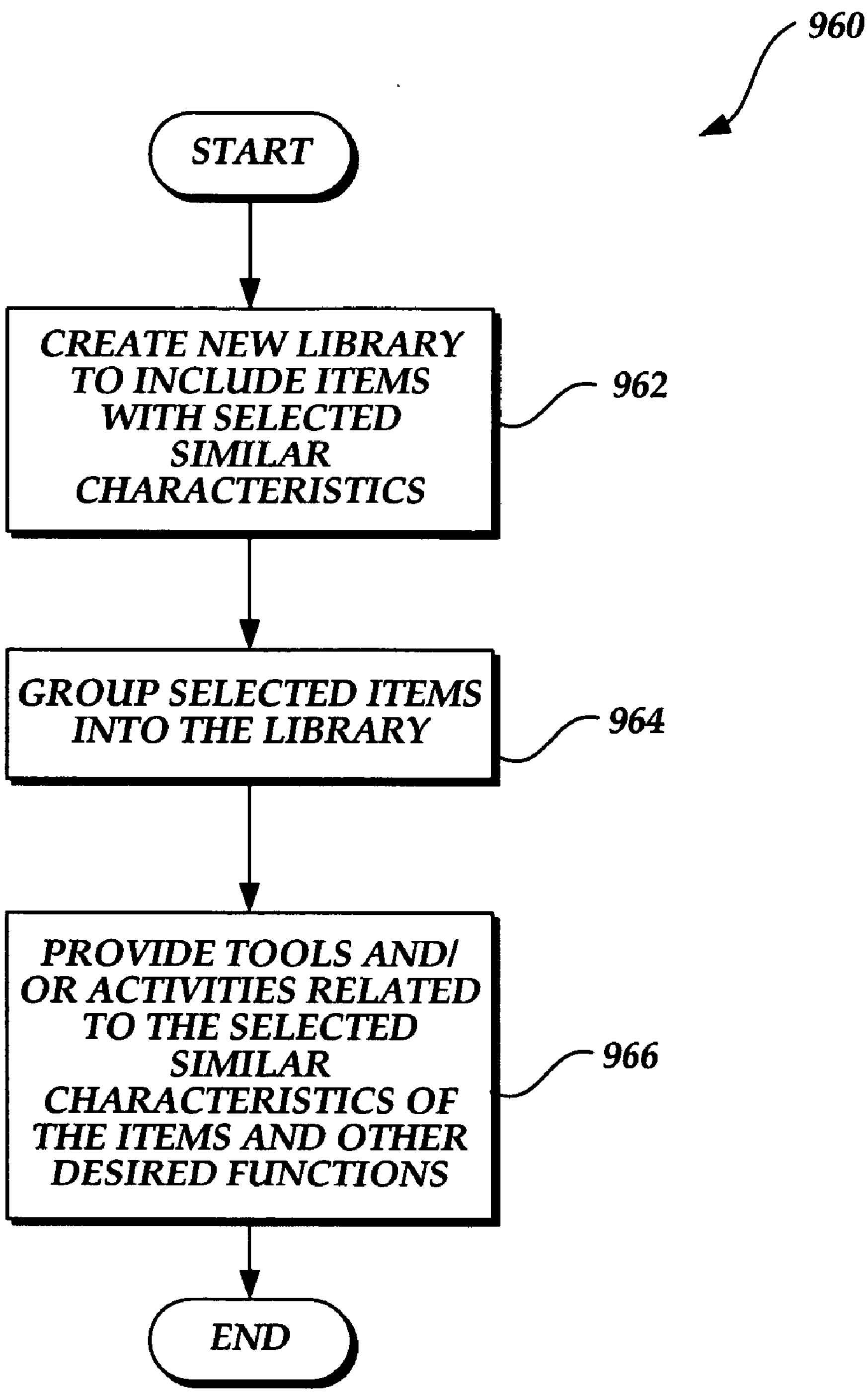
FIG. 35 is a flow diagram illustrative of a routine for creating a new library.
Figure 36:
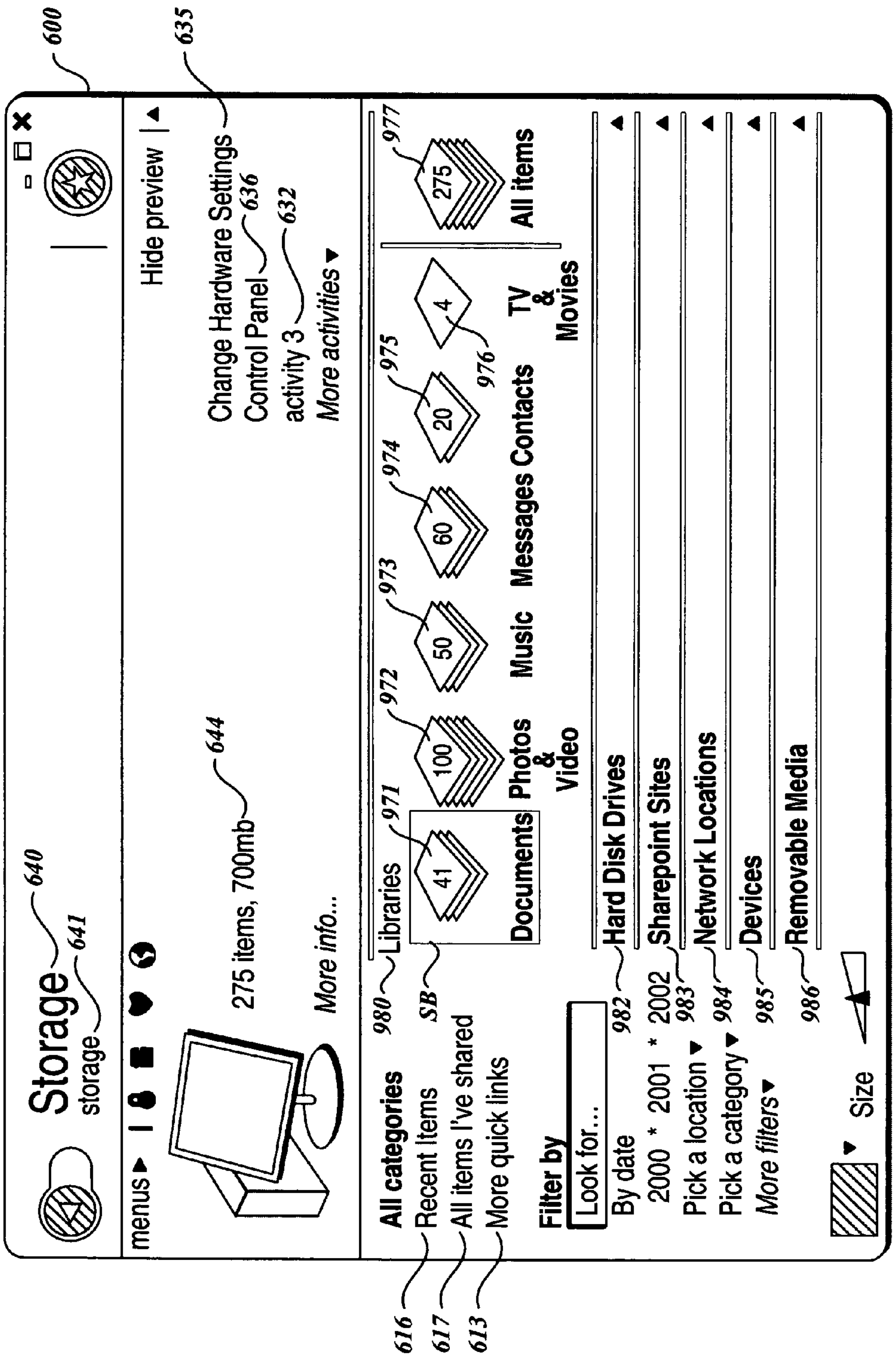
FIG. 36 is a diagram illustrative of a screen display in which a collection of various available libraries are shown.
Figure 37:
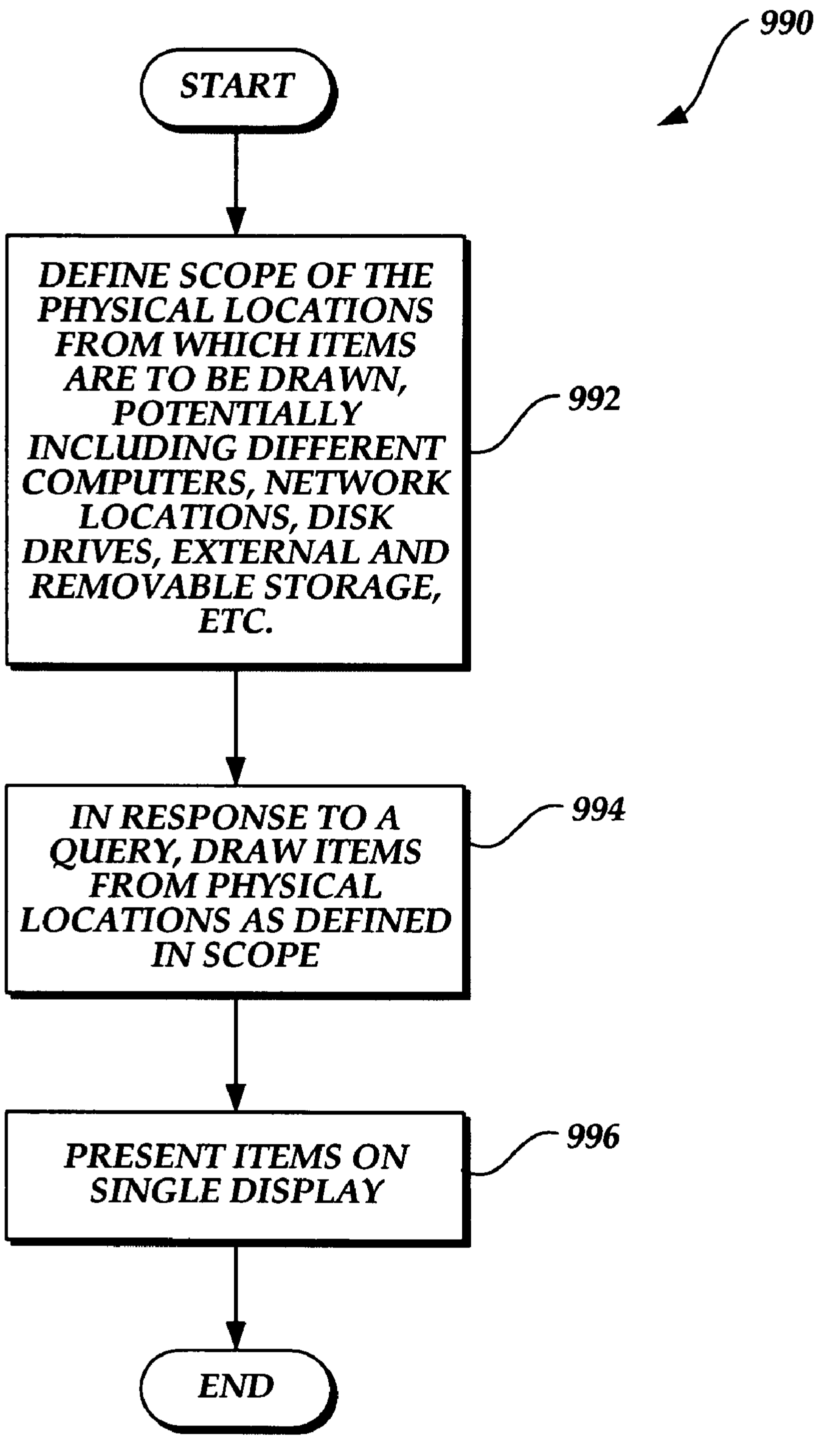
FIG. 37 is a flow diagram illustrative of a routine for defining the scope of a virtual folder collection.
Figure 38:
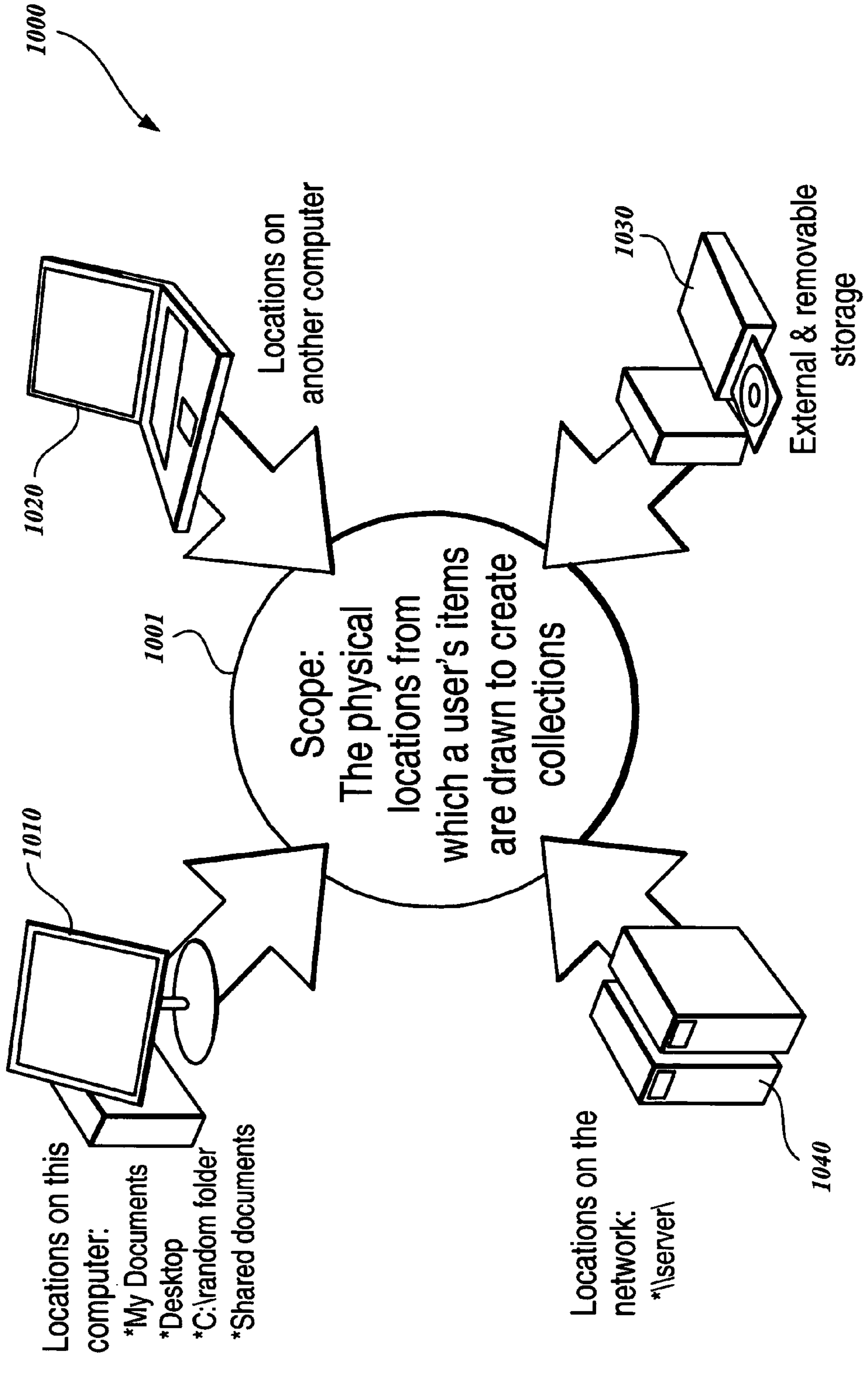
FIG. 38 is a block diagram illustrative of the various sources which may form the scope of a virtual folder collection.
Figure 39:
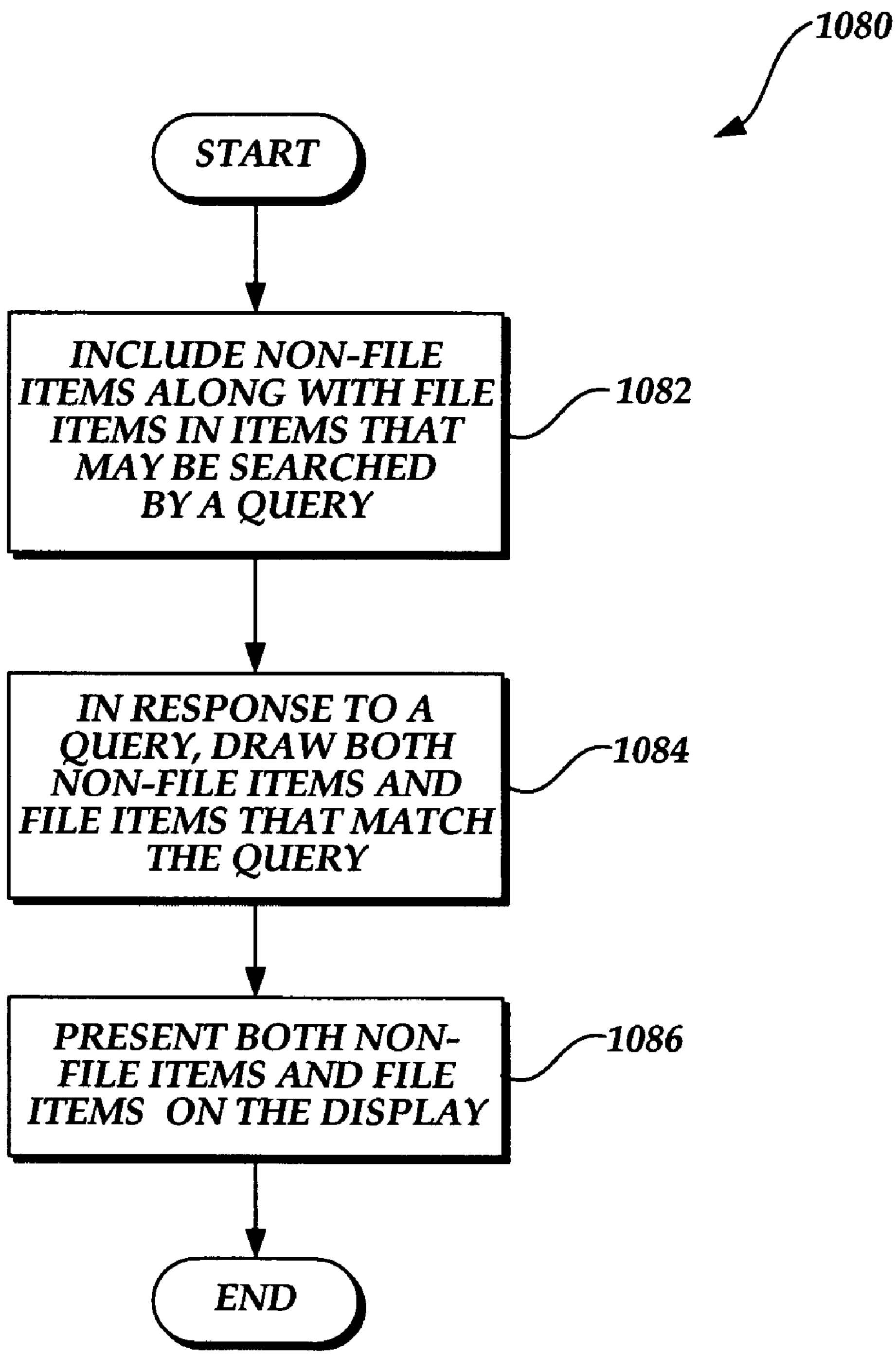
FIG. 39 is a flow diagram illustrative of a routine for including non-file items in a virtual folder collection.
Figure 40:
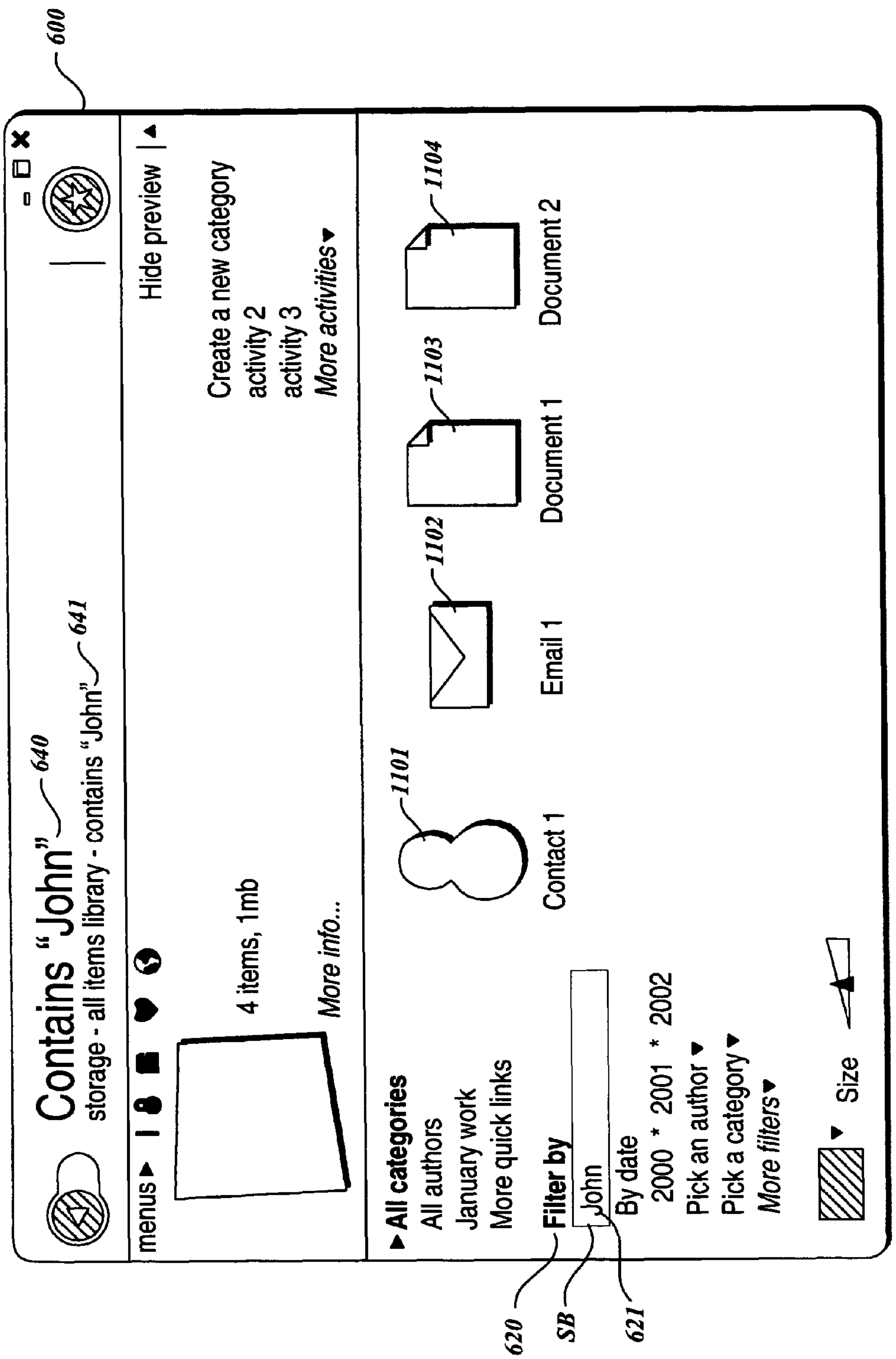
FIG. 40 is a diagram illustrative of a screen display showing various non-file items included in a virtual folder.

In summary, FIGS. 1-9 are generally directed to an overall system for virtual folders. Virtual folders provide a method for allowing a conventional user interface to expose regular files and folders (also known as directories) to users in different views based on their metadata instead of the actual physical underlying file system structure on the disk. FIGS. 10-18 are generally directed to stacks, which are related to the ability of the virtual folders to take any property that is stored in the database and represent it as a container that is like a folder. FIGS. 19-21 are generally directed to direct manipulation of virtual folders, which relates to providing mechanisms for manipulating virtual folders that are similar to the mechanisms currently used for manipulating standard folders (e.g., copying, pasting, clicking and dragging, etc.). FIGS. 22-29 are generally directed to filters, which provide a set of tools for narrowing down a set of files/items. FIGS. 30-34 are generally directed to quick links, which are a set of predefined links that can be clicked on to generate useful views of sets of files/items. FIGS. 35-36 are generally directed to libraries, which are related to the concept that groups of usable types of files can be associated together, and that tools and activities that are related to the particular types of items can be provided. FIGS. 37-38 are generally directed to scope which is related to the concept of being able to acquire files/items from multiple physical locations (e.g., different hard drives, different computers, from a computer in a network location, etc.) so that to the user all the files/items are presented with the same convenience as if they were being provided from one location. FIGS. 39-40 are generally directed to non-file items, which can be included in the database along with files, and which can include items such as emails and contacts. FIGS. 41-50 are generally directed to a virtual address bar which comprises a plurality of segments, each segment corresponding to a filter for selecting content. FIGS. 51-57 are generally directed to a shell browser, with which users can readily identify an item based on the metadata associated with that item. FIGS. 58-66 are generally directed to extending the functionality of an object previewer in a shell browser configured to display a plurality of items representing multiple item types. The following description provides a detailed discussion of each of these aspects of the invention.

As noted above, FIGS. 1-9 are generally directed to a system for implementing virtual folders. Virtual folders utilize the same or similar user interfaces that are currently used for file systems. The virtual folders expose regular files and folders (also known as directories) to users in different views based on their metadata instead of the actual physical underlying file system structure on the disk. Location-independent views are created which allow users to manipulate their files and folders utilizing similar controls as those presently used for managing file systems. In general, this means that users can organize and rearrange their files based on inherent properties in the files themselves, instead of the managing and organization being done as a separate part of the system. The virtual folders may represent files or items from different virtual or physical locations, such as from multiple disk drives within the same computer, between multiple computers, or different network locations, such that one view of files or items can expose files or items sitting at different physical locations. In one embodiment, the different items or files need only be connected via an IP network in order to be included.

The virtual folder modeling is also able to be used for traditionally non-file entities. An application of this is to have a set of user interfaces similar to files and folders (that is, objects and containers) to show traditionally non-file entities. One example of such non-file entities would be e-mails, while another would be contact information from a contact database. In this manner, virtual folders provide for a location-independent, metadata-based view system that works regardless of whether the data being shown is from files or non-file entities. In general, these aspects allow more flexibility in terms of letting users manipulate their files and data, using both common user interface techniques (drag and drop, double-click, etc.) as well as leveraging the rich integration of various data types.

Figure 1:
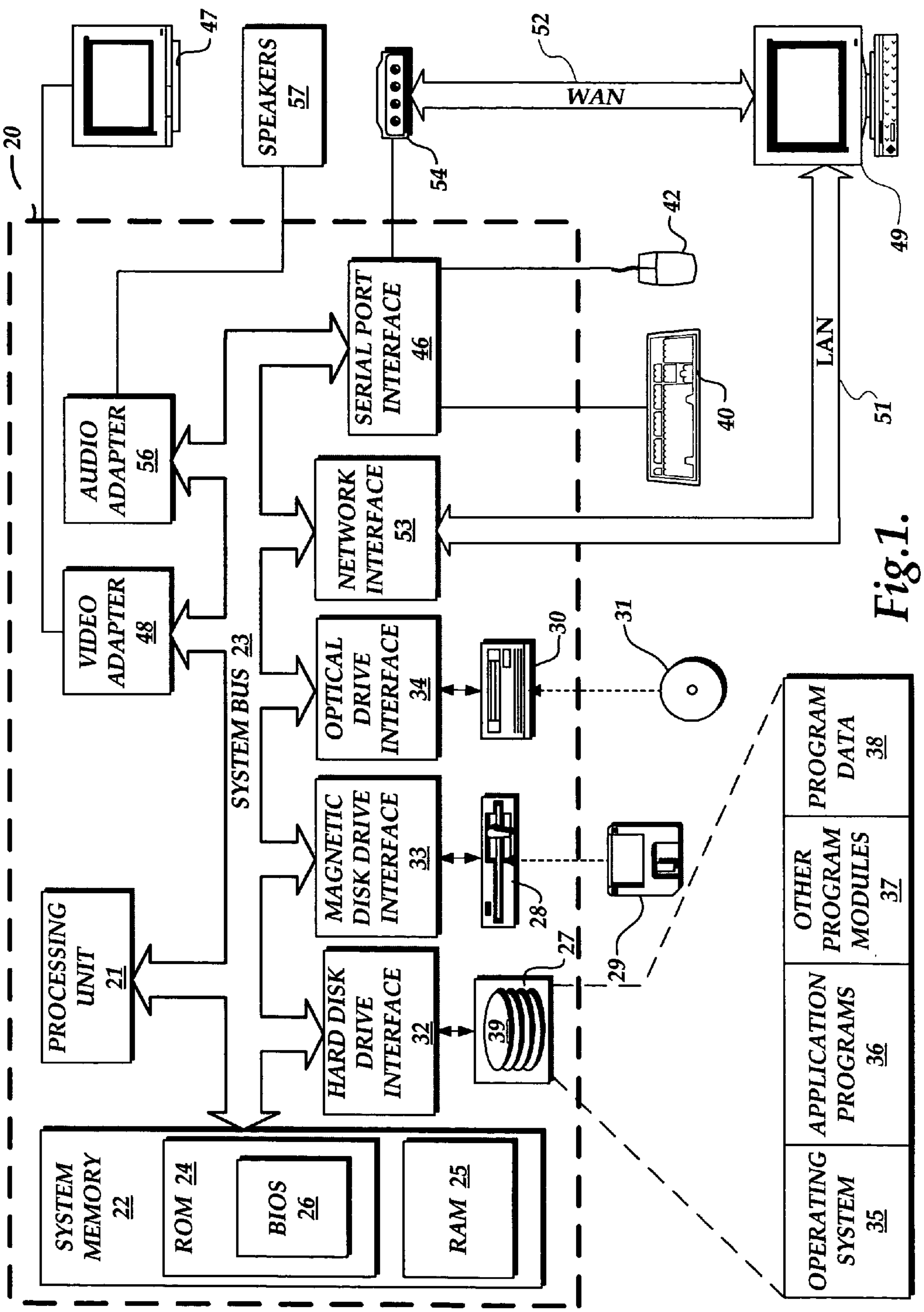
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

As implemented on a system of the type illustrated in FIG. 1, the present invention utilizes virtual folders which make it easier for users to perform basic tasks around file manipulation and folder navigation (browsing) and to provide higher level storage capabilities which can be leveraged in new features. The virtual folders expose files and items to users in different views based on their metadata instead of the actual physical underlying file system structure on the disk.

Figure 2:
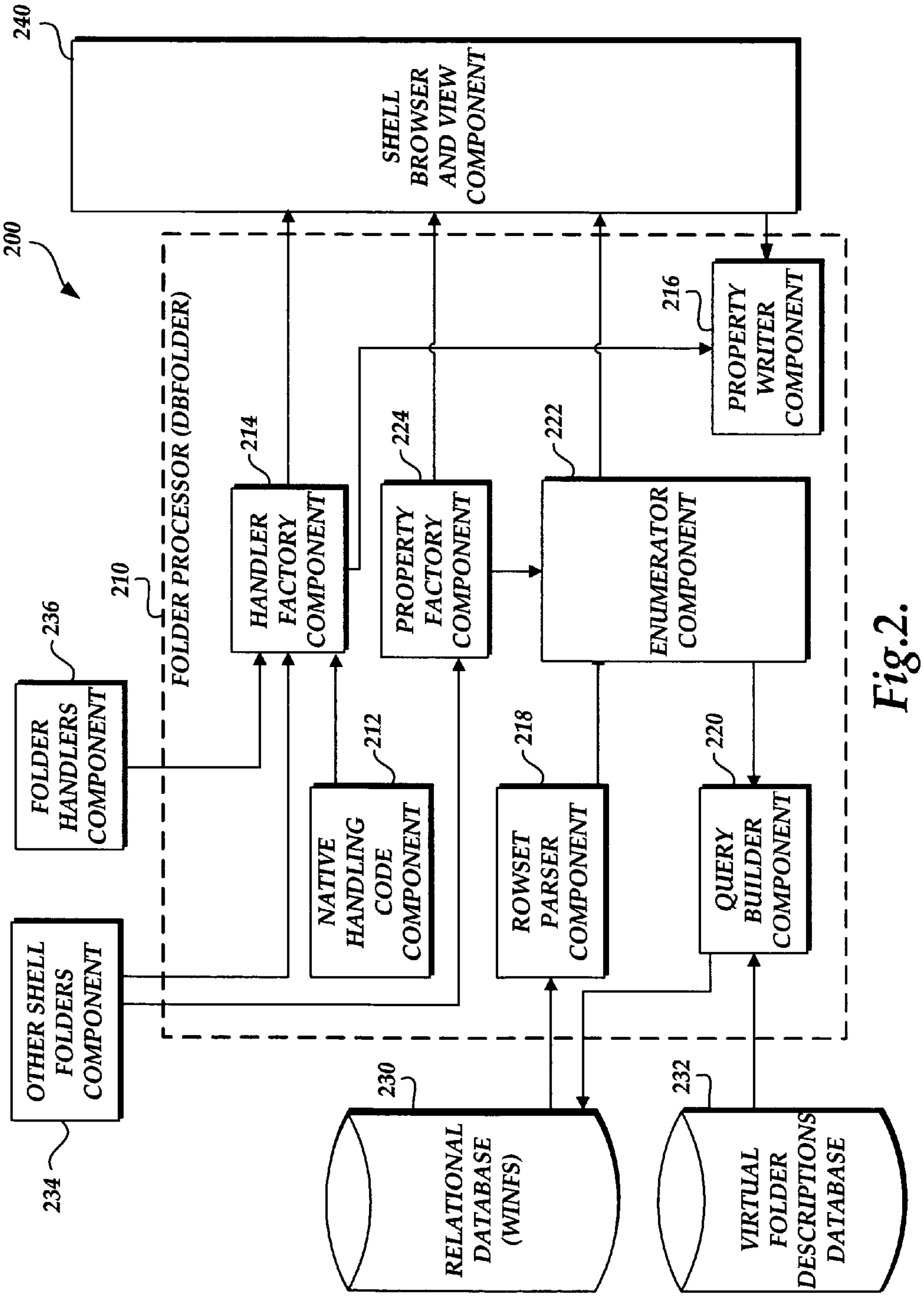
FIG. 2 is a block diagram of a virtual folder system in accordance with the present invention.

FIG. 2 is a block diagram of a virtual folder system 200 in accordance with the present invention. As will be described in more detail below, the virtual folders allow a user to change the "pivot" which controls the way the data is viewed. As an example, a user could view their music as a flat list of all the songs, which can be grouped by album. Alternatively, the user could switch the view to show only the genres or artists or years, etc. The user can tailor the view to see only the objects suited to the task at hand. This allows an improved browsing experience that negates the need for further navigation through folders (both down and back up). The same lessons and capabilities apply to modeling other data-types not stored as files. Contacts, for example, can be exposed to the user in this way, giving them familiar interface capabilities, as well as richer infrastructure for manipulating them than is provided by a flat address book.

As illustrated in FIG. 2, the virtual folder system 200 includes a folder processor 210, a relational database 230, a virtual folder descriptions database 232, an other shell folders component 234, a folder handler's component 236, and a shell browser and view component 240. The folder processor 210 includes a native handling code component 212, a handler factory component 214, a property writer component 216, a rowset parser component 218, a query builder component 220, an enumerator component 222, and a property factory component 224.

The relational database 230 stores properties about all files in the system. It also stores some items, like contacts (i.e., non-file items), entirely. In general, it stores metadata about the types of files and items that it contains. The relational database 230 receives SQL queries from the query builder 220. The relational database 230 also sends SQL rowsets to the rowset parser component 218, with one row per item column, columns being the item properties.

The virtual folder descriptions database 232 includes the virtual folder descriptions. The virtual folder descriptions database 232 sends data to the query builder component 220, including a list of types to display in the folder, the initial filter, and the physical locations to show results from (the scopes).

With regard to the other shell folders component 234, the folder processor 210 delegates to existing shell folders from many types of items, including all files, for handlers or properties. The other shell folders component 234 sends properties from other folders to the property factory 224. The other shell folders component also sends handlers to the handler factory 214.

The folder handlers component 236 provides code behavior for the items that exist only in the database, like contacts. This is what allows non-file items to behave akin to files. The folder handlers component 236 sends handlers to the handler factory 214.

For the native handling code component 212, the folder processor 210 directly implements certain handlers based on the properties of the items. The native handling code component 212 sends handlers to the handler factory 214. For the native handling code component 212 and the folder handlers component 236, like all namespaces, virtual folders have to provide a set of handlers (context menu, icon, thumbnail, infotip, . . . ) for their items. For most of these (infotip, data object, drag-drop handler, background context menu . . . ) the virtual folder provides a common (native) handler for all the types it holds. However there are others which the author of the type has to provide (context menu on the item itself, writable property store, . . . ). The default handler can also be overridden. Virtual folders reuse this for files and allow non-file items do the same.

The handler factory 214 takes ID lists and produces code behaviors that provide context menus, icons, etc. In general, the folder processor 210 may use native handlers, external handlers, or delegate to other shell folders to get handlers, as described above with respect to the native handling code component 212, the other shell folders component 234, and the folder handlers component 236. The handler factory component 214 sends handlers to the shell browser in view 240, as requested by the view. The handler factory component 214 sends a property handler to the property writer 216.

The property writer 216 converts user intentions such as cut, copy, and paste into property rights to the file or item. A shell browser and view component 240 sends data to the property writer 216, including direct manipulation (cut/copy/paste) or editing of metadata. In general, since virtual folders present an organization based on the properties of an item, operations such as move and copy (drag-drop) become an edit on those properties. For example, moving a document, in a view stacked by author, from Author 1 to Author 2, means changing the author. The property writer component 216 implements this function.

The rowset parser 218 takes database rowsets and stores all item properties into a shell ID list structure. A rowset takes the piecewise definition of the virtual folder and builds a SQL string which can then be issued to the database. The rowset parser component 218 sends ID lists to the enumerator component 222. As described above, the rowset parser component 218 also receives data from the relational database 230, including SQL rowsets, with one row per item, the columns being item properties.

The query builder component 220 builds SQL queries. The query builder component 220 receives data from the enumerator component 222, including new filters from the navigation. The query builder component 220 also receives data from the virtual folder descriptions database 232, including a list of the types to display in the folder, the initial filter, and the physical location to show results from (the scopes). The query builder component 220 sends the SQL queries to the relational database 230.

In general, the query builder component 220 includes a set of rows (in other words a table). This is what running the query yields. The rowset parser component 218 takes each row and using the column names transforms the row into an ID list. An ID list is a well-known shell structure which is used to reference items in a namespace. Doing this allows virtual folders to be just like any other namespace to the rest of the shell. Also caching this data helps keep database access, which can be costly, to a minimum.

The enumerator component 222 operates in response to navigation to a virtual folder. As described above, the enumerator component 222 receives ID lists from the rowset parser component 218, and sends new filters from the navigation to the query builder component 220. The enumerator 222 also sends data to the shell browser and view component 240, including ID lists that are returned to be inserted into the view after a navigation.

The property factory component 224 takes ID lists and property identifiers and returns values for those properties. The property factory component 224 receives data from the handler factory component 214 including the property handler. As described above, the property factory component 224 also receives data from the other shell folders component 234, including properties from other folders. The property factory component 224 also sends data to the shell browser and view component 240, including item properties, as requested by the view.

The shell browser and view component 240 displays the contents of a folder in a window, and handles all the user interaction with the displayed files or items, such as clicking, dragging, and navigating. Thus, the shell browser and view component 240 receives the user actions. The shell browser and view component 240 also gets the data regarding the code behaviors that it needs from the folder, in this case the folder processor 210.

As described above, the virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

Figure 3:
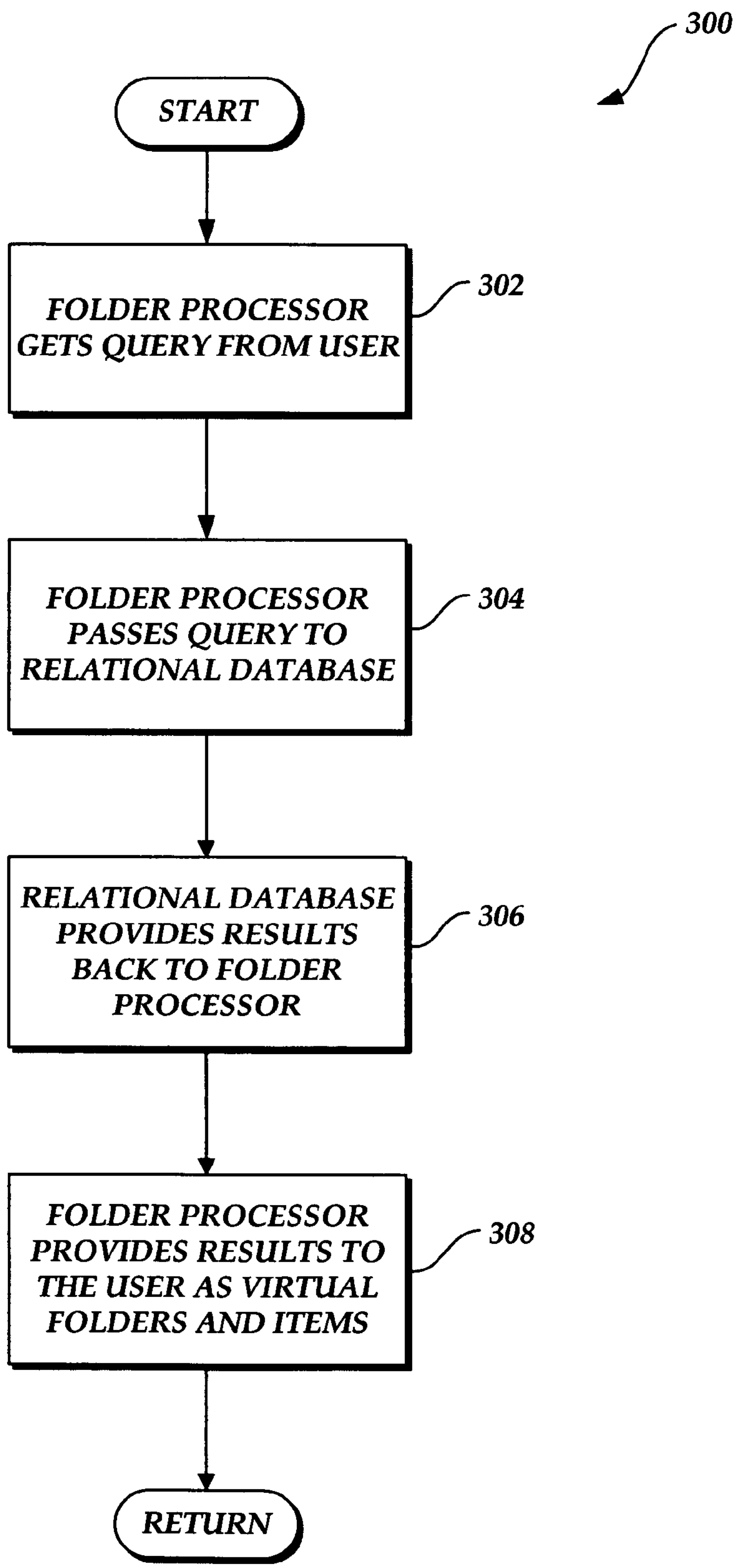
FIG. 3 is a flow diagram illustrative of a routine by which a user provides a query that draws back selected files and folders.

FIG. 3 is a flow diagram illustrative of a routine 300 by which a user provides a query that draws back selected items. At a block 302, the folder processor gets a query from the user. In a block 304, the folder processor passes the query to the relational database. At a block 306, the relational database provides the results back to the folder processor. At block 308, the folder processor provides the results to the user in the form of virtual folders and items.

Figure 4:
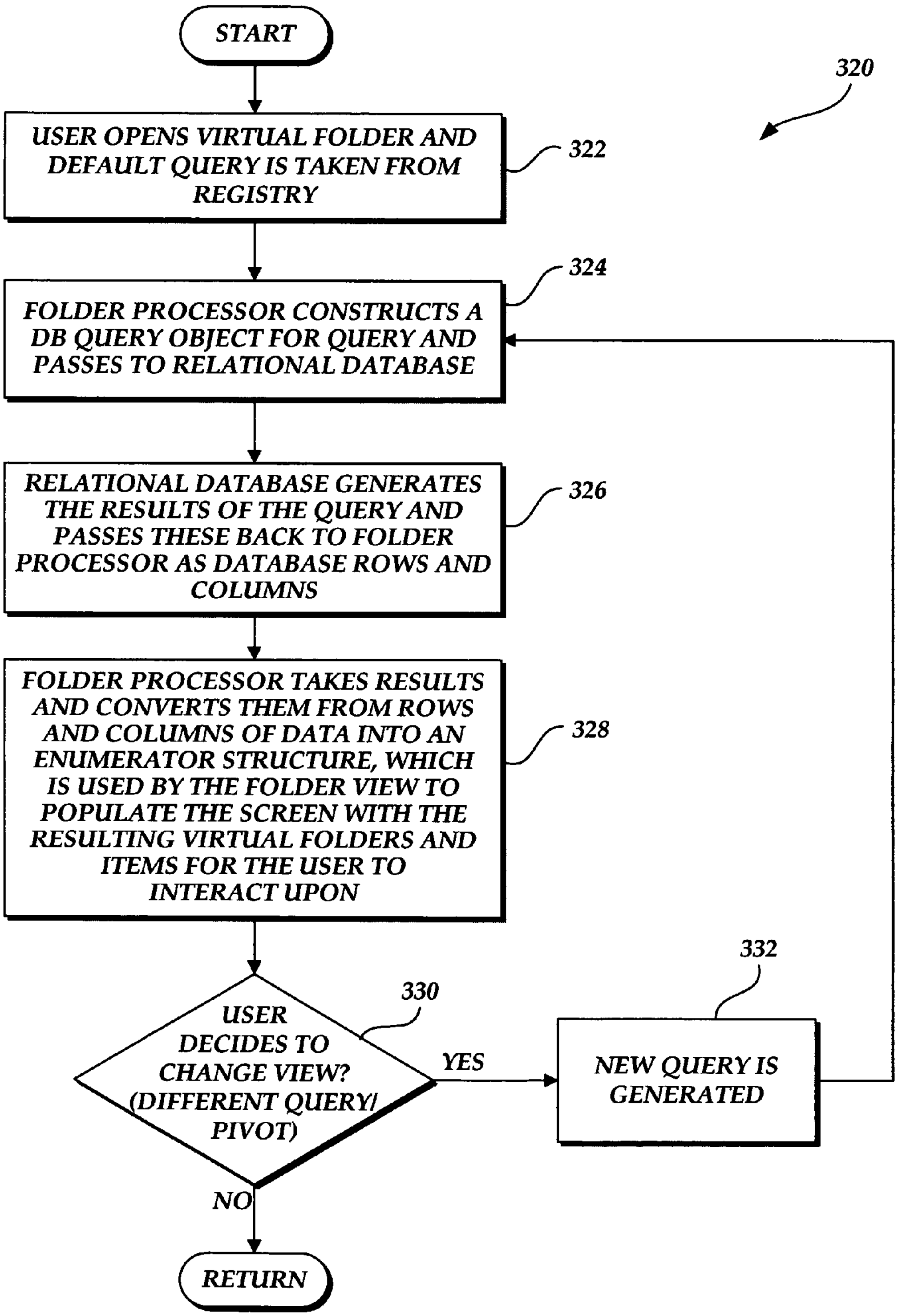
FIG. 4 is a flow diagram illustrative of a routine by which virtual folders are constructed and displayed on the screen in accordance with either a default query or a query from the user.

FIG. 4 is a flow diagram illustrative of a routine 320 by which virtual folders are constructed and displayed on the screen in accordance with either a default query or a query from the user. At a block 322, when a user first opens the virtual folder, a default query is used. This default query is taken from the registry. For example, the default query for a music library could be to show all the songs grouped by album. At a block 324, the folder processor constructs a query object for this query, and then passes this query to the relational database. At a block 326, the relational database generates the results of the query and passes these back to the folder processor as database rows and columns.

At a block 328, the folder processor takes these results and converts them from the rows and columns of data into an enumerator structure, which is used by the folder view to populate the screen with the resulting virtual folders and items for the user to interact upon. At a decision block 330, a user decides whether to change the view (by issuing a different query or "pivot"). For example, a user could issue a "show all artists" pivot. If the user does want to change the view, then the routine returns to block 324 where the folder processor passes this new query to the relational database, and receives back new rows and columns of results, and constructs a new enumerator structure. The process then continues as described above, as the folder view clears and updates, using the enumerator to draw the "artist" objects to the screen.

In one example, album objects are provided that represent containers that users can navigate into. For example, double-clicking the "Beatles" albums will navigate the view to see all of the Beatles' songs. The folder processor issues the "show all Beatles' songs" query to the relational database, which hands back the rows and columns of data for those songs. The folder processor creates an enumerator of all these songs, which then get drawn to the screen.

The user can also choose the view at any point while browsing virtual folders. From the above example, after narrowing down to just show Beatles songs, a user can change the view to only show the songs as albums. The process of changing the view of items into another representation is called "stacking". This is because the items are conceptually arranged into "stacks" based on that representation. In this case, the songs are rearranged into stacks for each of the various albums. Users can then navigate into one of these stacks, only seeing the songs from that particular album. Again, the user can rearrange the view of these remaining songs into stacks based on a property (e.g., a rating, for example). If the rating property were selected, the songs from that Beatles album would be shown in stacks for a one-, two-, or a three-star rating.

The results of each query depend on which physical or virtual locations are included in the scope. For example, the scope may be made to include only the folders in the user's "my documents" folder. Alternatively, the scope could include all folders on the computer, or even all folders on multiple network connected computers. The user is able to view and change the scope through a scope property sheet. In one example, the scope property sheet could be exposed by right-clicking on the virtual folder and choosing "properties." The user could add new folders to the scope, or remove folders that were previously added.

One group of users for which virtual folders will provide particular utility is knowledge workers. Virtual folders allow knowledge workers to easily switch between viewing documents by file type, project, case number, author, etc. Since knowledge workers each tend to have a different method for organizing documents, virtual folders can be used to accommodate these different preferences.

Figure 5:
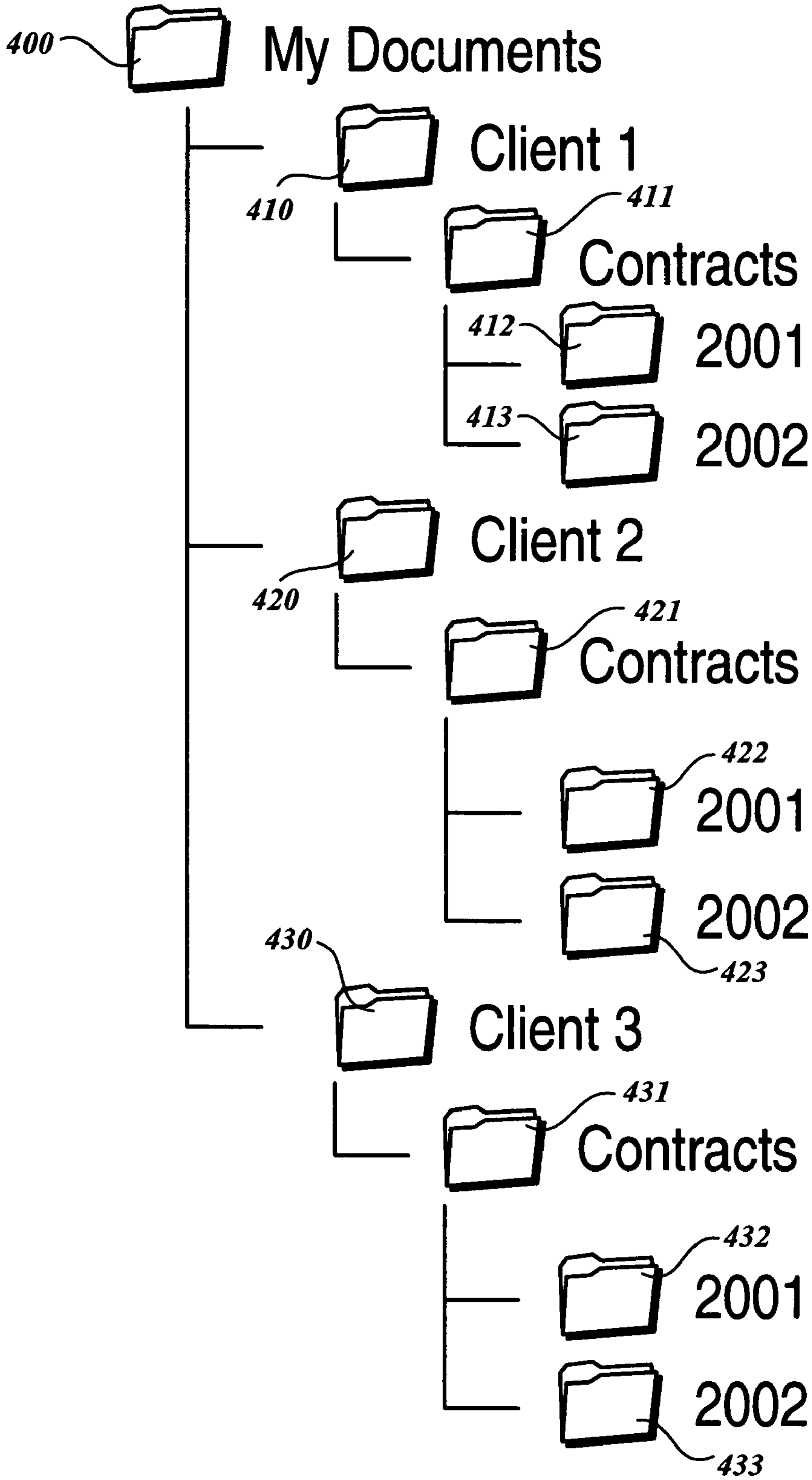
FIG. 5 is a tree diagram of a folder structure in accordance with a physical folder arrangement on a hard drive.

FIG. 5 is a tree diagram of a folder structure in accordance with a physical folder arrangement on a hard drive. This physical folder arrangement is based on the traditional implementation of folders, which may be based on NTFS or other existing file systems. Such folders are referred to as physical folders because their structuring is based on the actual physical underlying file system structure on the disk. As will be described in more detail below, this is in contrast to virtual folders, which create location-independent views that allow users to manipulate files and folders in ways that are similar to those currently used for manipulating physical folders.

As illustrated in FIG. 5, a folder 400 is a "my documents" folder. At a first level, the folder 400 includes folders 410, 420, and 430, corresponding to Clients 1, 2, and 3, respectively. At a second level, each of the folders 410, 420, and 430 contain a folder 411, 421, and 431, respectively, which each correspond to the contracts for the selected client. At a third level, each of the folders 411, 421, and 431 contains a folder 412, 422, and 432, respectively, each corresponding to the year 2001. At the third level, each of the folders 411, 421, and 431 also contains a folder 413, 423, and 433, respectively, each corresponding to the year 2002.

It will be appreciated that a number of obstacles are presented to a user who wishes to navigate a physical folder file structure such as that illustrated in FIG. 5. For example, if the user wishes to work with all of the contracts that the user has produced, the user will first need to navigate to the folder 411 to work with the contracts for Client 1, and then will have to renavigate to the folder 421 to reach the contracts for Client 2, and will again have to renavigate to the folder 431 for the contracts for Client 3. This arrangement makes it difficult for the user to access all of the contracts, and in general prevents simultaneous viewing and manipulation of all of the contracts. Similarly, if the user wishes to view all of the contracts produced in the year 2001, the user will have to navigate and renavigate to the folders 412, 422, and 432, respectively. As will be described in more detail below, the virtual folders of the present invention provide an improved file system structure.

Figure 6:
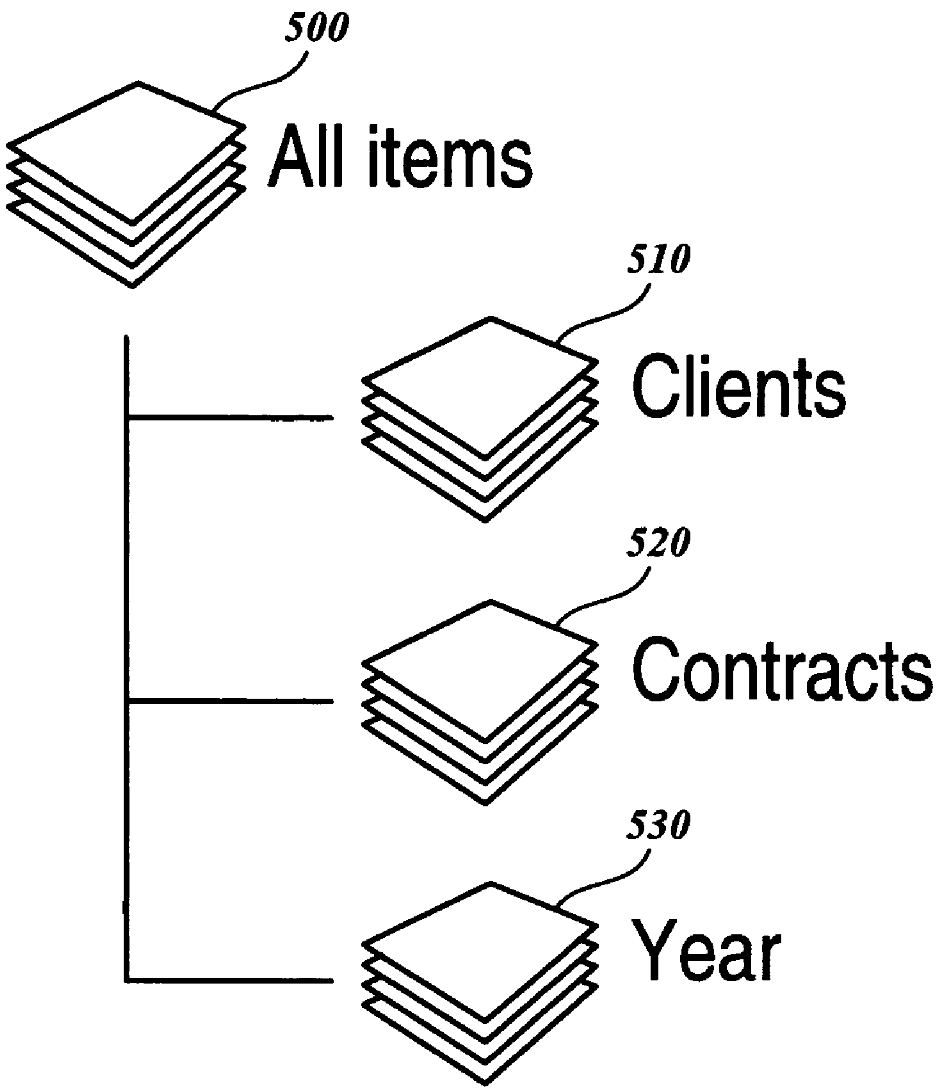
FIG. 6 is a tree diagram of a virtual folder structure.

FIG. 6 is a tree diagram of a virtual folder structure. As will be described in more detail below, virtual folders create location-independent views that allow users to manipulate their files and folders in convenient ways. As shown in FIG. 6, the virtual folders are represented as stacks. A virtual folder 500 is an "all items" folder. At a first level, the virtual folder 500 contains virtual folders 510, 520, and 530, corresponding to clients, contracts, and year, respectively. As will be described in more detail below, this structure allows a user to access files according to a desired parameter.

Figure 7:
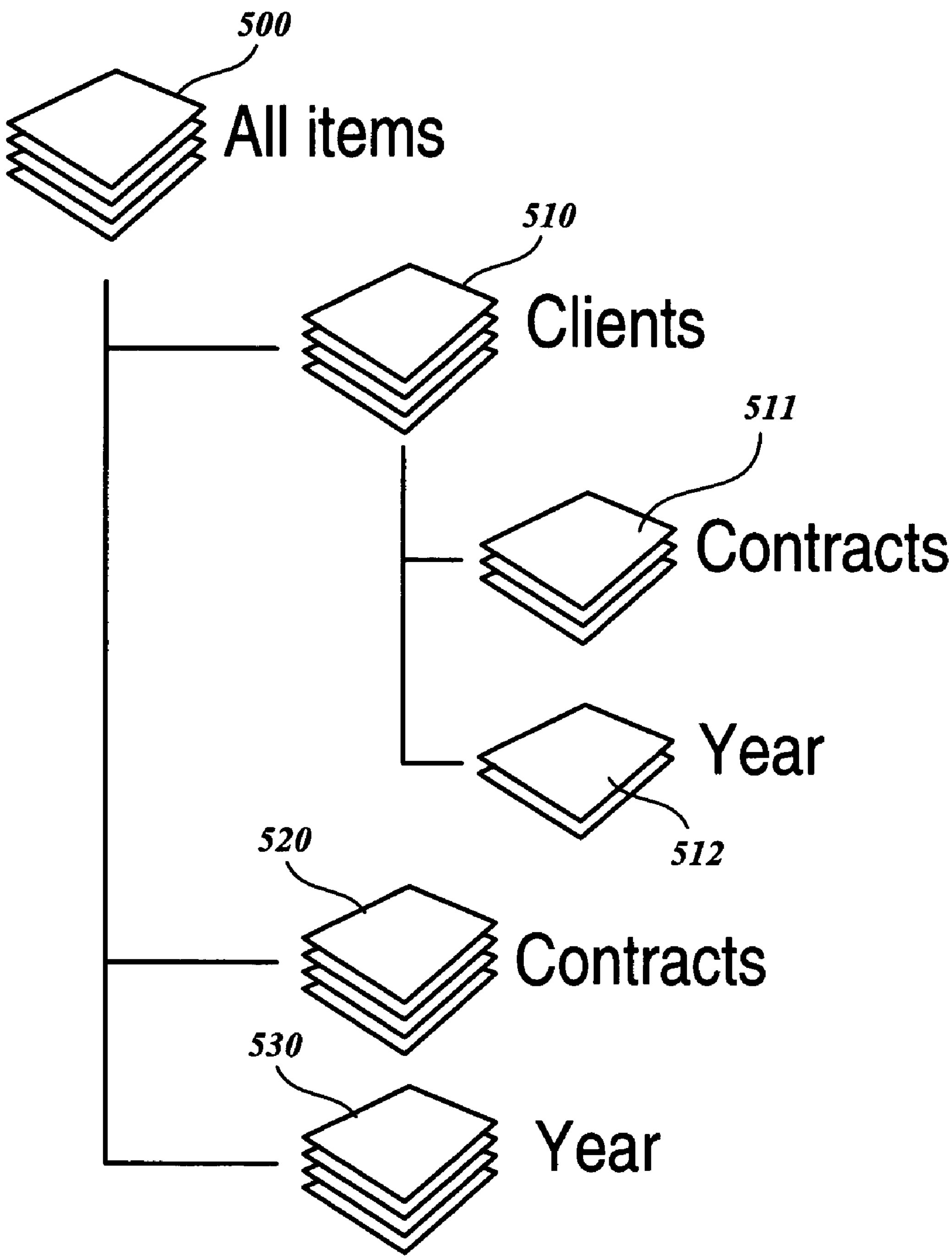
FIG. 7 is a tree diagram of the virtual folder structure of FIG. 6, wherein the clients stack is further filtered by contracts and year.

FIG. 7 is a tree diagram of the virtual folder structure of FIG. 6, wherein at a second level, the virtual folder 510 further includes virtual folders 511 and 512, which correspond to contracts and year, respectively. In other words, the clients stack of virtual folder 510 is further filtered by contracts and year. The process for determining which files and items are contained in each of the virtual folders will be described in more detail below.

Figure 8:
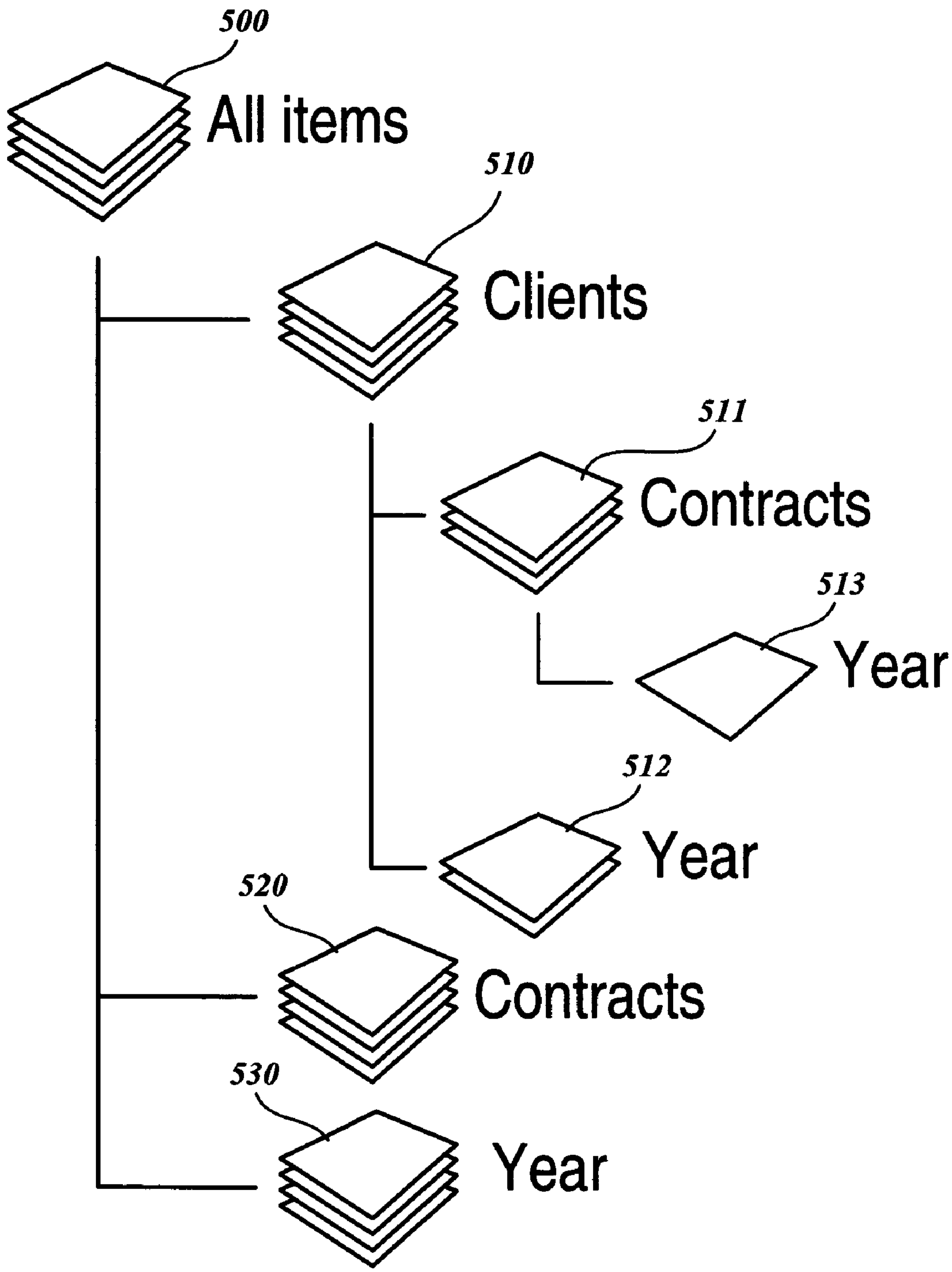
FIG. 8 is a tree diagram of the virtual folder structure of FIG. 7, wherein the contracts of the clients stack are further filtered by year.

FIG. 8 is a tree diagram of the virtual folder structure of FIG. 7, wherein at a third level, the virtual folder 511 contains a virtual folder 513, which corresponds to a year. In other words, the contracts stack of virtual folder 511 is further filtered by year. While the virtual folder structure for the virtual folders 510, 511, and 513 have been structured according to clients, contracts, and year, it will be appreciated that the virtual folders allow for other structuring sequences to occur, as will be described in more detail below with reference to FIG. 9.

Figure 9:
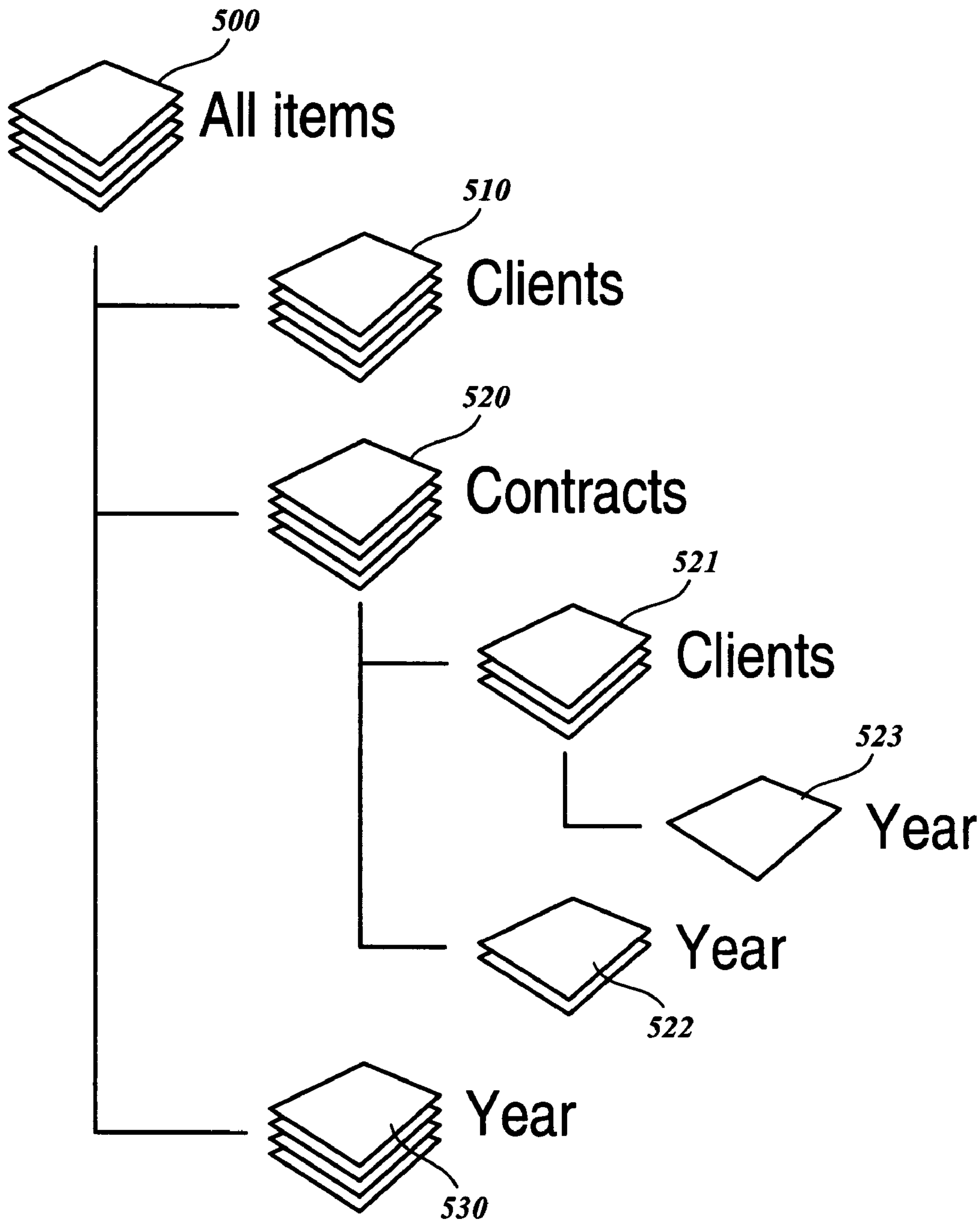
FIG. 9 is a tree diagram of the virtual folder structure of FIG. 6, wherein the contracts stack is further filtered by clients and year, of which the clients are still further filtered by year.

FIG. 9 is a tree diagram of the virtual folder structure of FIG. 6, wherein at a second level, the virtual folder 520 has been further filtered into virtual folders 521 and 522, corresponding to clients and year. At a third level, the virtual folder 521 has further been filtered to a virtual folder 523, corresponding to a year. The contrast between the organizational structures of FIGS. 8 and 9 helps illustrate the flexibility of the virtual folder system. In other words, in a virtual folder system, a user is able to navigate the virtual folders according to desired parameters, as opposed to being dependent on the location-dependent views of a physical file structure such as that illustrated in FIG. 5.

Figure 10:
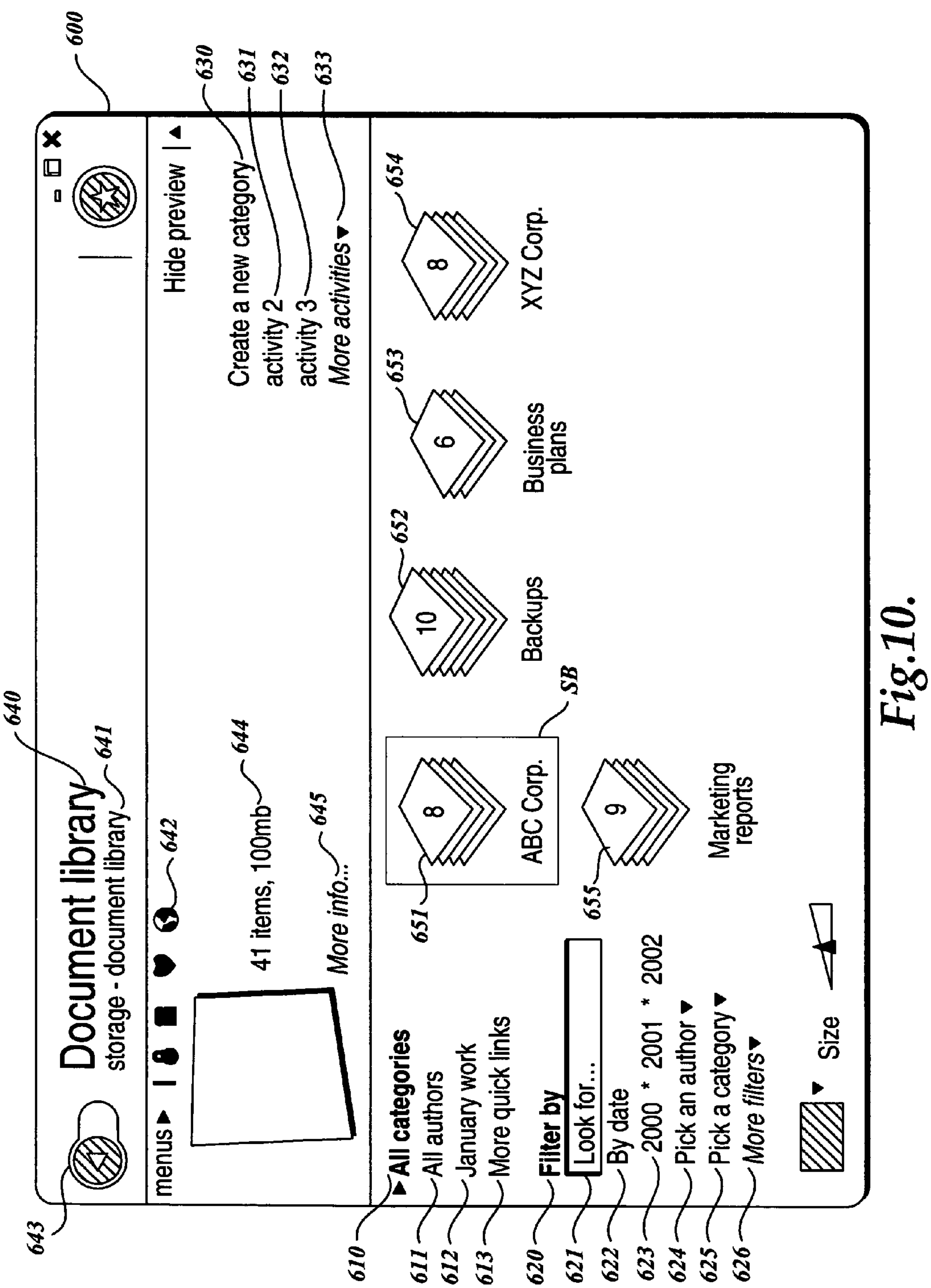
FIG. 10 is a diagram illustrative of a screen display showing the stacks of a document library.

FIG. 10 is a diagram illustrative of a screen display 600 showing the stacks of a document library. As noted above, stacks can be used to represent a type of virtual folder. As will be described in more detail below, the screen display 600 includes quick link elements 610-613, filter elements 620-626, activity elements 630-633, information and control elements 640-645, and virtual folder stacks 651-655.

The quick link elements include an "all categories" quick link 610, on "all authors" quick link 611, a "January work" quick link 612, and a selection for displaying additional quick links 613. As will be described in more detail below, quick links can be selected by a user to perform desired navigations of the virtual folders. Quick links may be provided by the system, and some quick links may be created and saved by a user.

The filter elements include a "filter by" indicator 620, an entry blank 621, a "by date" indicator 622, a "year" selector 623, a "pick an author" selector 624, a "pick a category" selector 625, and a "more filters" selector 626. The "filter by" indicator 620 directs a user to the fact that the items below can be used to filter the virtual folders or items. The entry blank 621 provides an area in which a user can type a desired new filter term. The "by date" indicator 622 directs a user to the fact that by selecting a date from the "year" selector 623, the virtual folders or items can be filtered by the selected year. The "pick an author" selector 624 allows a user to filter according to a specific author. The "pick a category" selector 625 allows a user to filter according to a selected category. The "more filters" selector 626 allows a user to pull up additional filters on the display.

The activity selectors include a "create a new category" selector 630, "activity" selectors 631 and 632, and a "more activities" selector 633. As will be described in more detail below, the activities that are presented may be for generally desirable functions, or may more specifically be directed to activities useful for the type of virtual folders that are currently being displayed. For example, the "create a new category" selector 630 can be selected by the user to create a new category which will be represented by a new stack.

As noted above, the activity selectors 631 and 632 may be more specifically directed to the type of folders or items that are being displayed. For example, the present display is of a document library, for which the "activity" selectors 631 and 632 may be directed to activities specifically tailored for documents, such as editing or creating attachments. If the present library had been a photo library, the "activity" selector 631 and 632 could be for activities specifically directed to photos, such as forming photo albums or sharing photos with other users.

The information and control elements include information line 640 and information line (address bar) 641, a control line 642, a backspace control 643, and information lines 644 and 645. The information line 640 and address bar 641 provide information as to the current navigation of the virtual folders or items. In the present example, the information line 640 indicates that the current navigation is to a document library, while the address bar 641 indicates the more complete navigation, showing that the document library is within the storage area. The control line 642 provides a number of standard controls, and the backspace button 643 allows a user to back up through a navigation. The information line 644 provides numerical information about the contents of the present navigation. In the present example, the information line 644 indicates that there are 41 items which take up 100 MB in the stacks of the document library. The information line 645 is available to provide additional information, such as additional information about a file that is selected.

The stacks of the document library include an "ABC Corp." stack 651, a "backups stack" 652, a "business plans" stack 653, an "XYZ Corp." stack 654, and a "marketing reports" stack 655. The numbers on top of each of the stacks indicate how many items are in each stack. For example, the "ABC Corp." stack 651 is shown to include 8 items. The total number of items of the stacks adds up to the number of items indicated in the information line 644, which as described above is 41 in the present example. A selection box SB is provided which can be utilized by a user to select a desired item. The selection of the "ABC Corp." stack 651 yields a view of the items of that stack, as will be described below with respect to FIG. 11.

Figure 11:
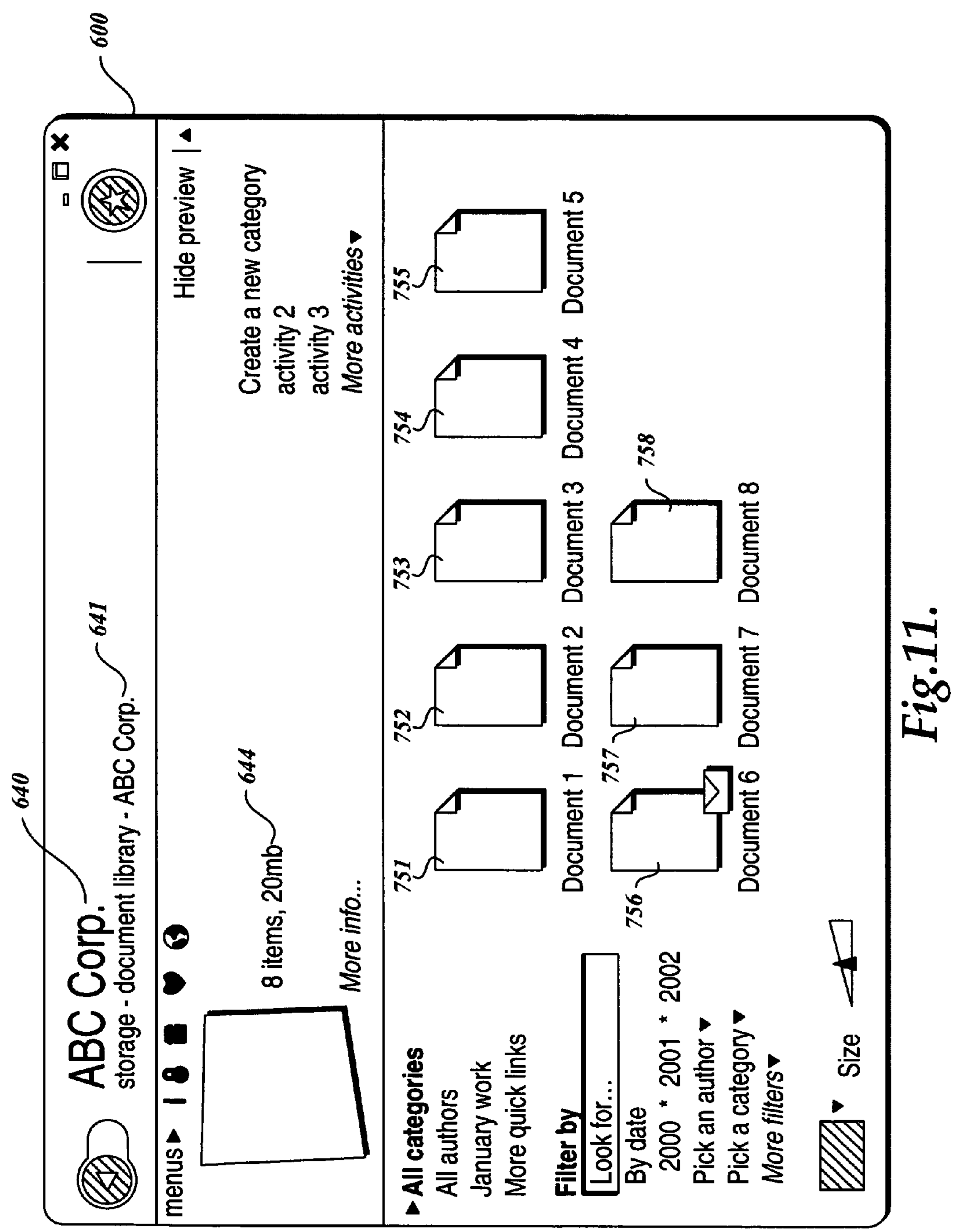
FIG. 11 is a diagram illustrative of a screen display showing the documents in the ABC Corp. stack of FIG. 10.

FIG. 11 is a diagram illustrative of a screen display showing the items in the "ABC Corp." stack 651 of FIG. 10. It should be noted that the information line 640 and address bar 641 now indicate that the present navigation is showing the "ABC Corp." stack. The "ABC Corp." stack 651 is shown to include 8 documents 751-758, corresponding to documents 1-8, respectively. The information line 644 correspondingly indicates that there are 8 items which take up 20 MB of memory. Documents of FIG. 11 may be further arranged into stacks within the ABC Corp. stack. In other words, within the virtual folder represented by the ABC Corp. stack 651, additional virtual folders may be organized to hold the documents, as will be described below with respect to FIGS. 12-16.

Figure 12:
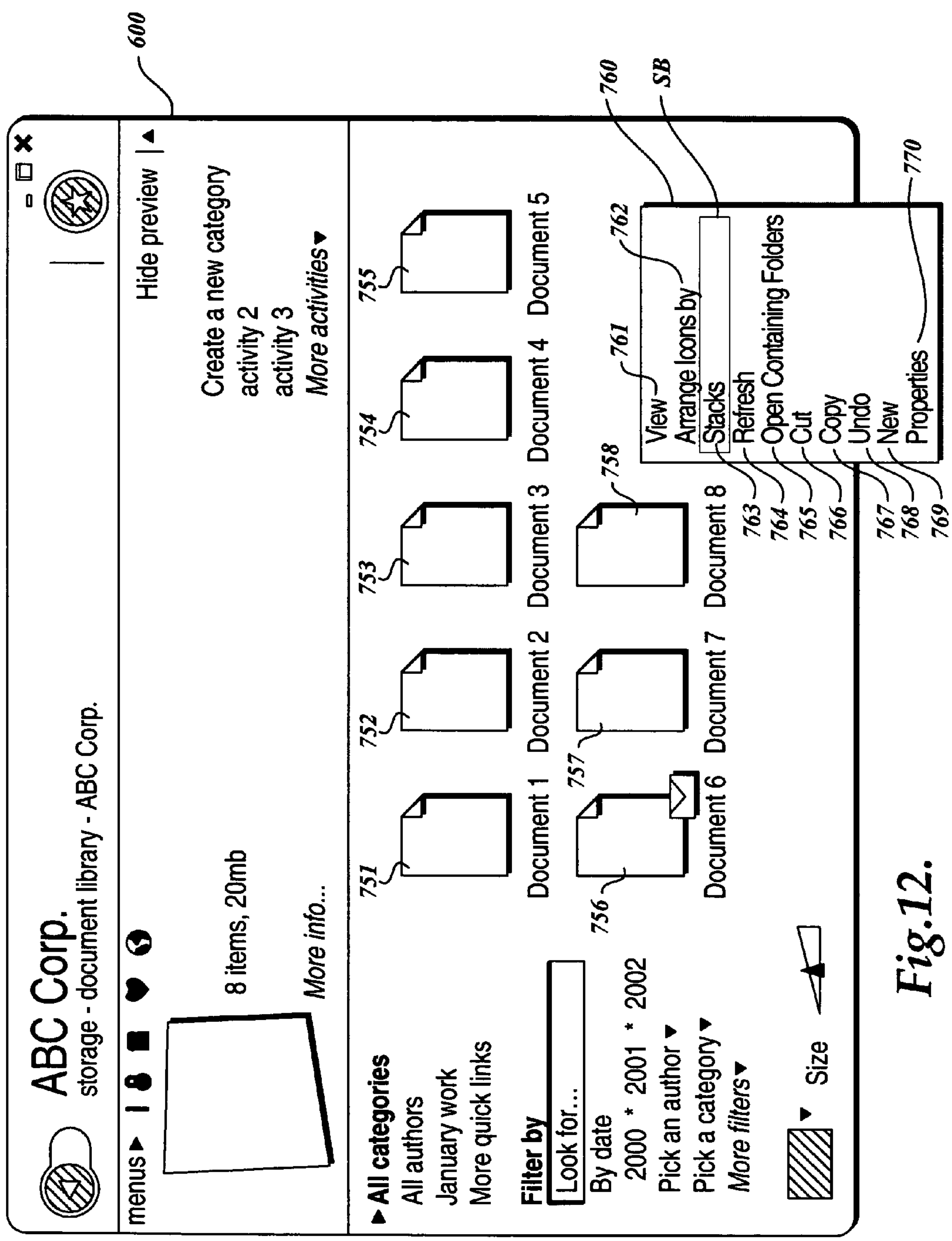
FIG. 12 is a diagram illustrative of a screen display in which a stacking function is selected for the documents of FIG. 11.

FIG. 12 is a diagram illustrative of a screen display in which a stacking function is selected for the documents of FIG. 11. As shown in FIG. 12, the user is able to pull up a function box 760. The function box 760 includes a "view" selection 761, an "arrange icons by" selection 762, a "stacks" selection 763, a "refresh" selection 764, an "open containing folders" selection 765, a "cut" selection 766, a "copy" selection 767, an "undo" selection 768, a "new" selection 769, and a "properties" selection 770. The selection box SB is shown to be around the "stacks" selection 763.

Figure 13:
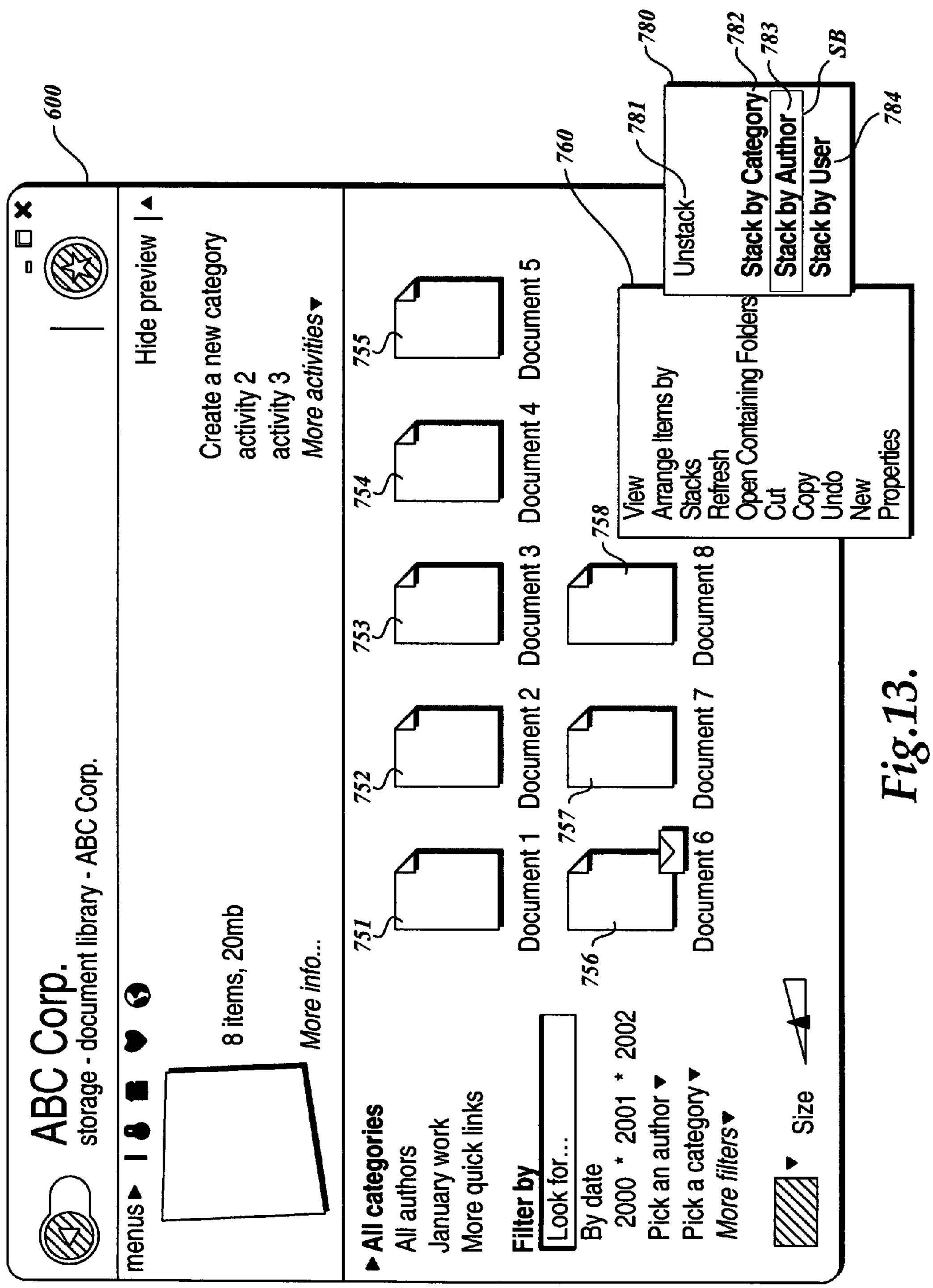
FIG. 13 is a diagram illustrative of a screen display in which a "stack by author" parameter is selected for the stacking function of FIG. 12.

FIG. 13 is a diagram illustrative of a screen display in which a "stack by author" parameter is selected for the stacking function of FIG. 12. As shown in FIG. 13, a box 780 is displayed which presents various stacking options. The stacking options include an "unstack" option 781, a "stack by category" option 782, a "stack by author" option 783, and a "stack by a user" option 784. The selection box SB is shown to be around the "stack by author" option 783.

Figure 14:
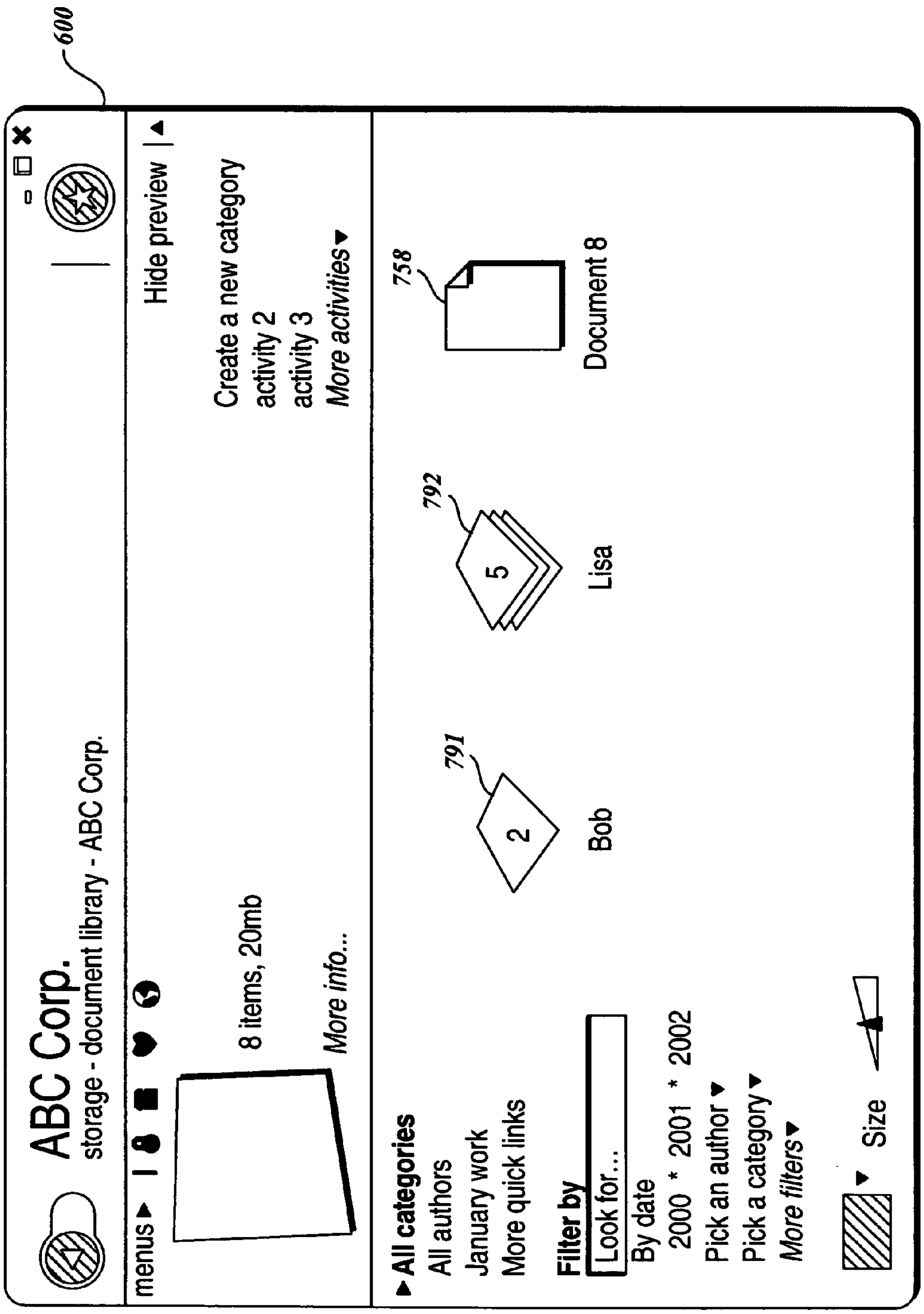
FIG. 14 is a diagram illustrative of a screen display in which the files of FIG. 13 have been stacked by author.

FIG. 14 is a diagram illustrative of a screen display in which the files of FIG. 13 have been stacked by author. As shown in FIG. 14, stacks 791 and 792 correspond to authors Bob and Lisa, respectively. As indicated by the numbers on top of each of the stacks, the Bob stack 791 includes two items, while the Lisa stack 792 includes five items. The item 758 (corresponding to document 8) did not have an author, and so is not included in an "author" stack. The stacks 791 and 792 illustrate that stacks may be organized at multiple levels, such as within the "ABC Corp." stack 651. Thus, the virtual folders may be formed at multiple levels, such as the "Lisa" stack 792 being within the "ABC Corp." stack 651 which is within the document library.

Figure 15:
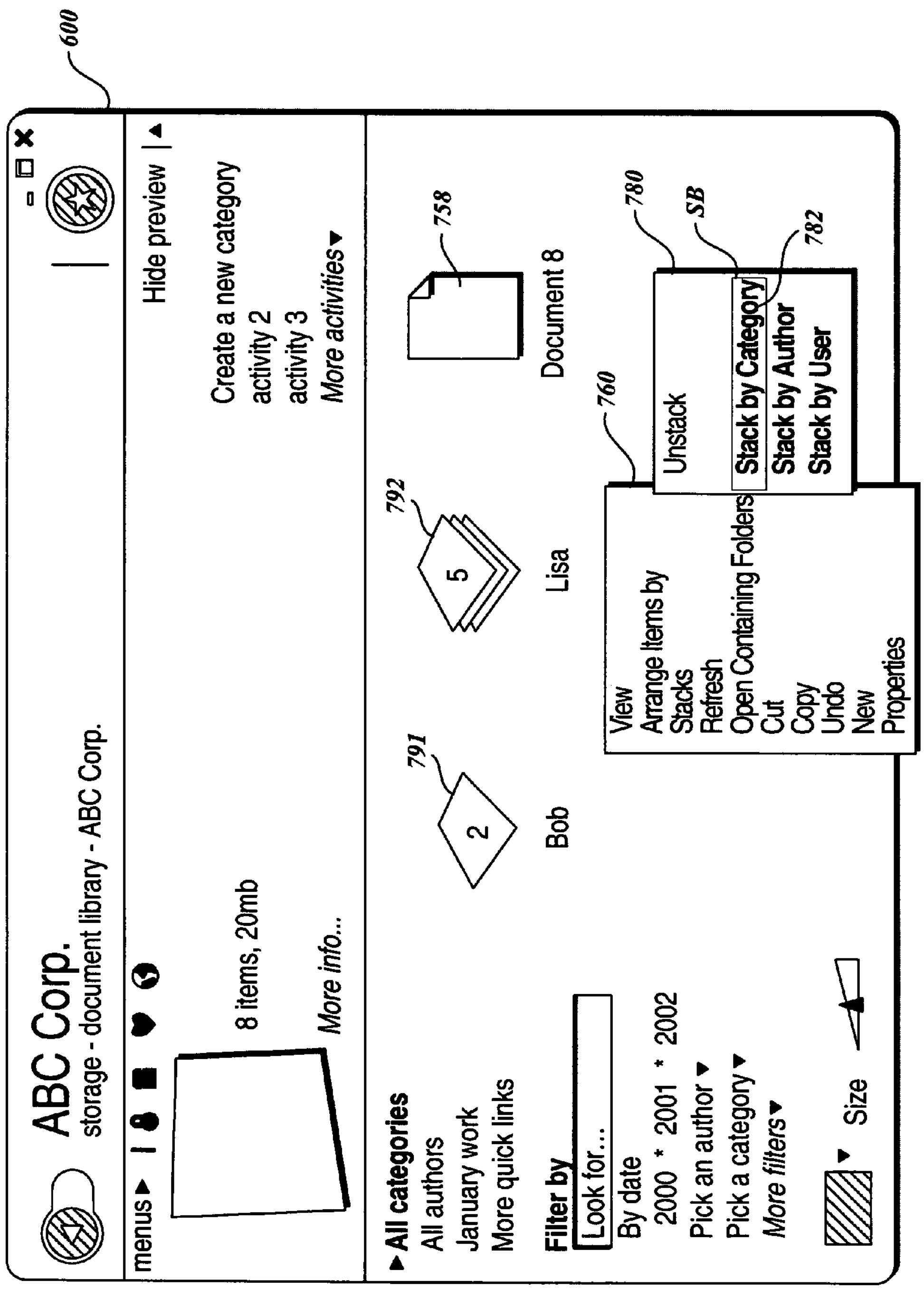
FIG. 15 is a diagram illustrative of a screen display in which a stacking function is selected and a "stack by category" option is further selected for restacking the files of FIG. 14.

FIG. 15 is a diagram illustrative of a screen display in which a "stack by category" option is further selected for restacking the files of FIG. 14. As shown in FIG. 15, the selection box SB is around the "stack by category" option 782. Since some of the items are already stacked in the stacks 791 and 792, the selection of the "stack by category" option 782 will restack the items, as will be described in more detail below with reference to FIG. 16.

Figure 16:
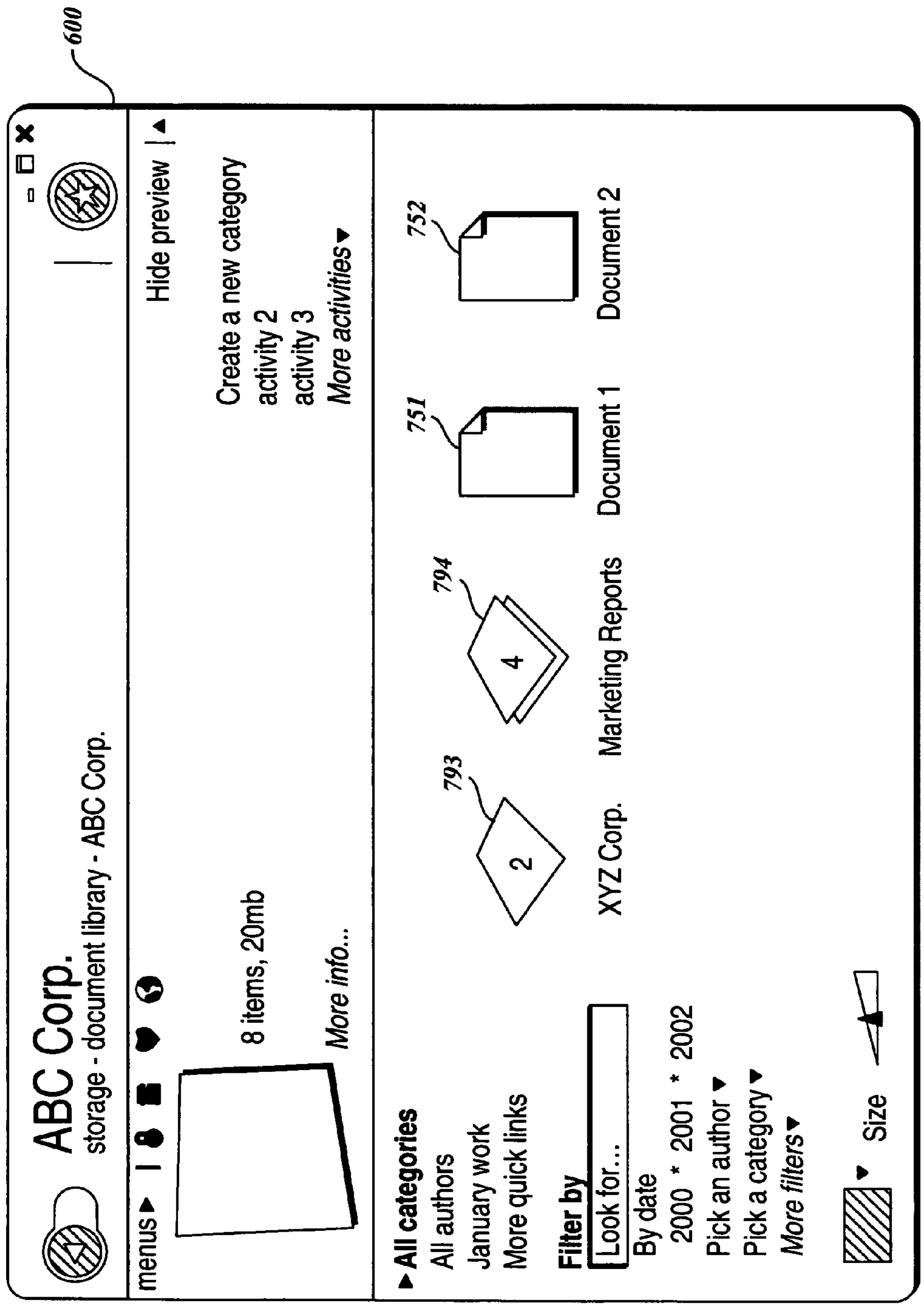
FIG. 16 is a diagram illustrative of a screen display in which the files of FIG. 14 have been restacked by category.

FIG. 16 is a diagram illustrative of a screen display in which the files of FIG. 14 are restacked by category. As shown in FIG. 16, the stacks 793 and 794 correspond to the "XYZ Corp." and "marketing reports" categories, respectively. The items 751 and 752, corresponding to documents 1 and 2, were not designated for any additional categories, and thus did not fall into any of the other category stacks.

Figure 17:
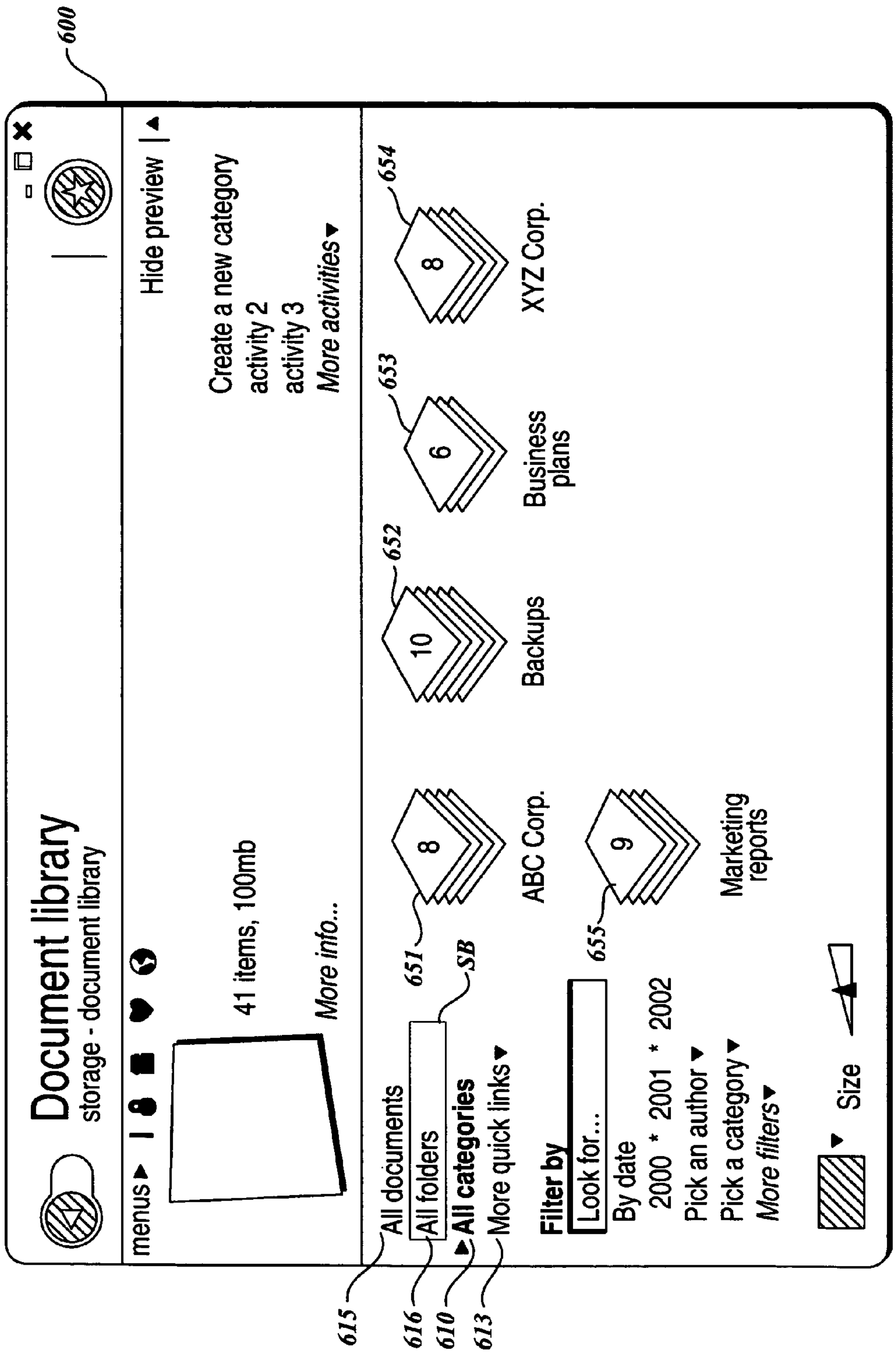
FIG. 17 is a diagram illustrative of a screen display in which a quick link for showing physical folders is selected.

FIG. 17 is a diagram illustrative of a screen display in which a quick link for physical folders is selected. The selection box SB is shown to be around the "all folders" quick link 616. As will be described in more detail below with respect to FIG. 18, the "all folders" quick link 616 provides for switching to a view of physical folders.

Figure 18:
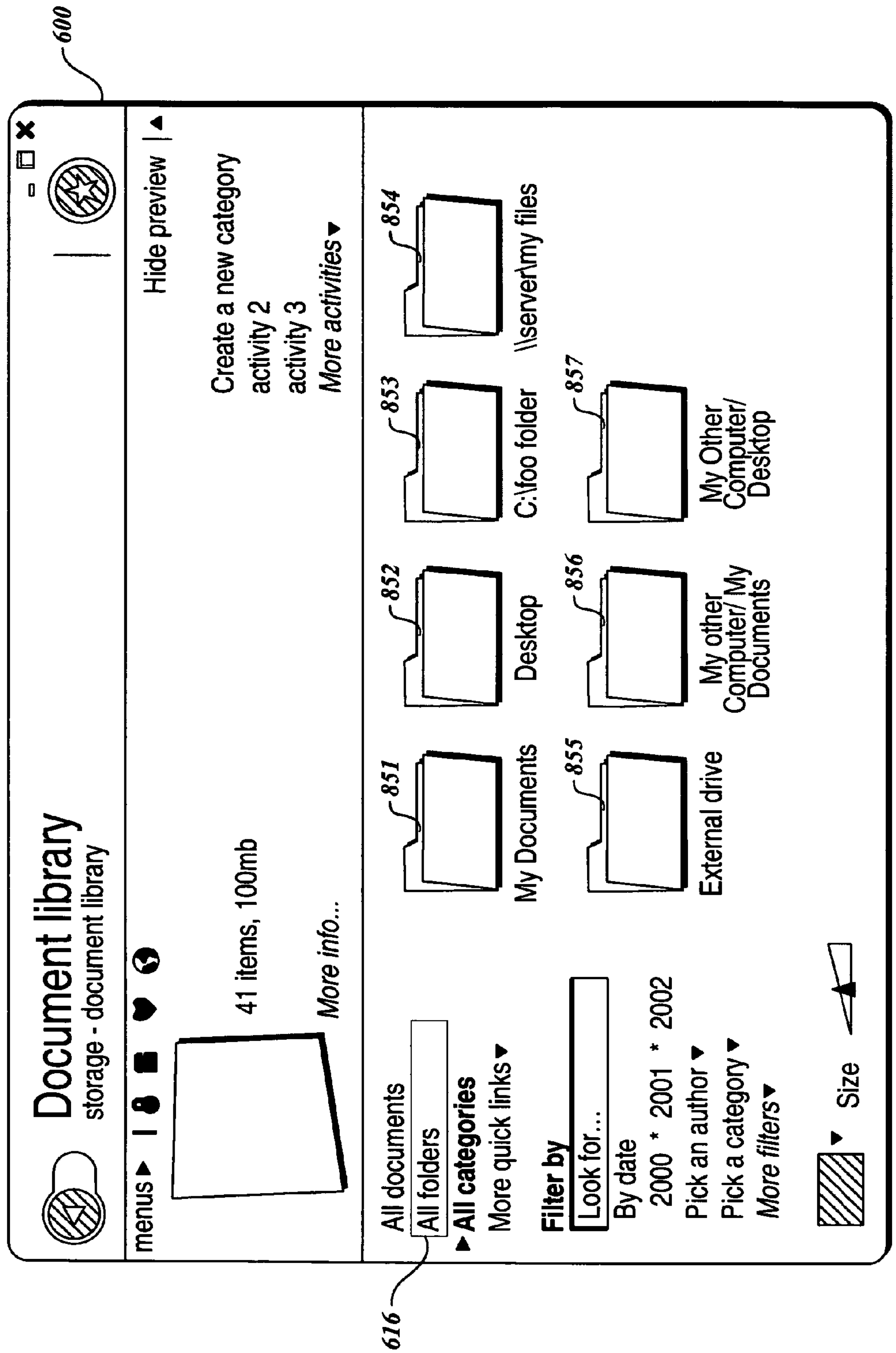
FIG. 18 is a diagram illustrative of a screen display in which the physical folders are shown which contain the files of the virtual folder stacks of FIG. 17.

FIG. 18 is a diagram illustrative of a screen display showing physical folders. The physical folders that are shown contain the files of the virtual folder stacks of FIG. 17. In other words, the items contained within the stacks 651-655 of FIG. 17 are also contained in certain physical folders in the system. These are shown in FIG. 18 as a "My Documents" folder 851 that is located on the present computer, a "Desktop" folder 852 that is located on the present computer, a "Foo" folder 853 that is located on the hard drive C:, a "My Files" folder 854 that is located on a server, an "External Drive" folder 855 that is located on an external drive, a "My Documents" folder 856 that is located on another computer, and a "Desktop" folder 857 that is located on another computer.

As shown in FIG. 18, a user is able to switch from the virtual files representation of FIG. 17 to the physical file representation of FIG. 18. This allows a user to toggle between virtual file representations and physical file representations, depending on which is desired for a current task. The different locations of the physical folders 851-857 also illustrate that the scope of the virtual file system may be relatively broad, as will be described in more detail below.

FIG. 19 is a flow diagram illustrative of a routine 880 by which a user can directly manipulate virtual folders. As will be described in more detail below, the mechanisms that are provided for manipulating the virtual folders are similar to those that are currently used for manipulating regular folders (e.g., clicking and dragging, copying, pasting, etc.). As shown in FIG. 19, at a block 882, the system provides defined actions that the user can perform for direct manipulation of the virtual folders that are represented as display objects. At a block 884, the user performs a defined action. As noted above, one example of this might be a user clicking and dragging a virtual folder to copy its contents to another virtual folder. At a block 886, the virtual folder and/or contents are manipulated as directed by the action performed by the user.

FIG. 20 is a diagram illustrative of a screen display in which a new West Coast stack 656 has been added to the stacks of FIG. 10. The West Coast stack 656 was formed by a user creating a new category of "West Coast." Upon its initial creation, the new West Coast stack 656 would be empty and have zero items. In the embodiment of FIG. 20, two items have been added to the West Coast stack 656. One method for adding items to a stack is to select a particular item, and either modify or add additional categories to the category metadata for the item, such as adding the category "West Coast" to two items as was done in the embodiment of FIG. 20. This process illustrates that the category data is a metadata property for an item that is a type of ad-hoc property. In other words, a property of this type does not have any implicit meaning, and can be assigned an arbitrary value by the user. For example, the category "property" can have any value whereas the "author" property should be the name of a person. As will be described in more detail below with reference to FIG. 21, items may also be clicked and dragged to be copied from other stacks to the West Coast stack 656 (in which case the categories of the items are automatically updated to include "West Coast"). In this regard, FIG. 20 shows that the selection box SB is around the ABC Corp. stack 651, in preparation for its contents being copied.

FIG. 21 is a diagram illustrative of a screen display in which direct manipulation is used for copying the files from the ABC Corp. stack 651 to the West Coast stack 656. In other words, as shown in FIG. 20, the user selected the ABC Corp. stack 651, and then as shown in FIG. 21 the user has clicked and dragged the stack to be copied to the West Coast stack 656. Thus, the West Coast stack 656 which had two items in FIG. 20, is now shown to include a total of ten items, including the additional eight items from the ABC Corp. stack 651. When the items from the ABC Corp. stack 651 were copied to the West Coast stack 656, this was accomplished by modifying the category descriptions of the eight items to also include the "West Coast" category in addition to including the original "ABC Corp." category. This illustrates one type of direct manipulation that may be performed.

Another example of direct manipulation is right clicking an item and selecting delete. In one embodiment, when a deleting function is selected by a user, the user is queried whether the item should be deleted all together, or simply removed from the present virtual folder. If the item is just to be removed from a present virtual folder category stack as noted above, this can be accomplished by removing the desired category from the metadata for the item. In other words, if one of the items that had been copied from the ABC Corp. stack 651 to the West Coast stack 656 was then to be removed from the West Coast stack 656, this could be accomplished by modifying the category data for the particular file to no longer include the "West Coast" category.

Figure 22:
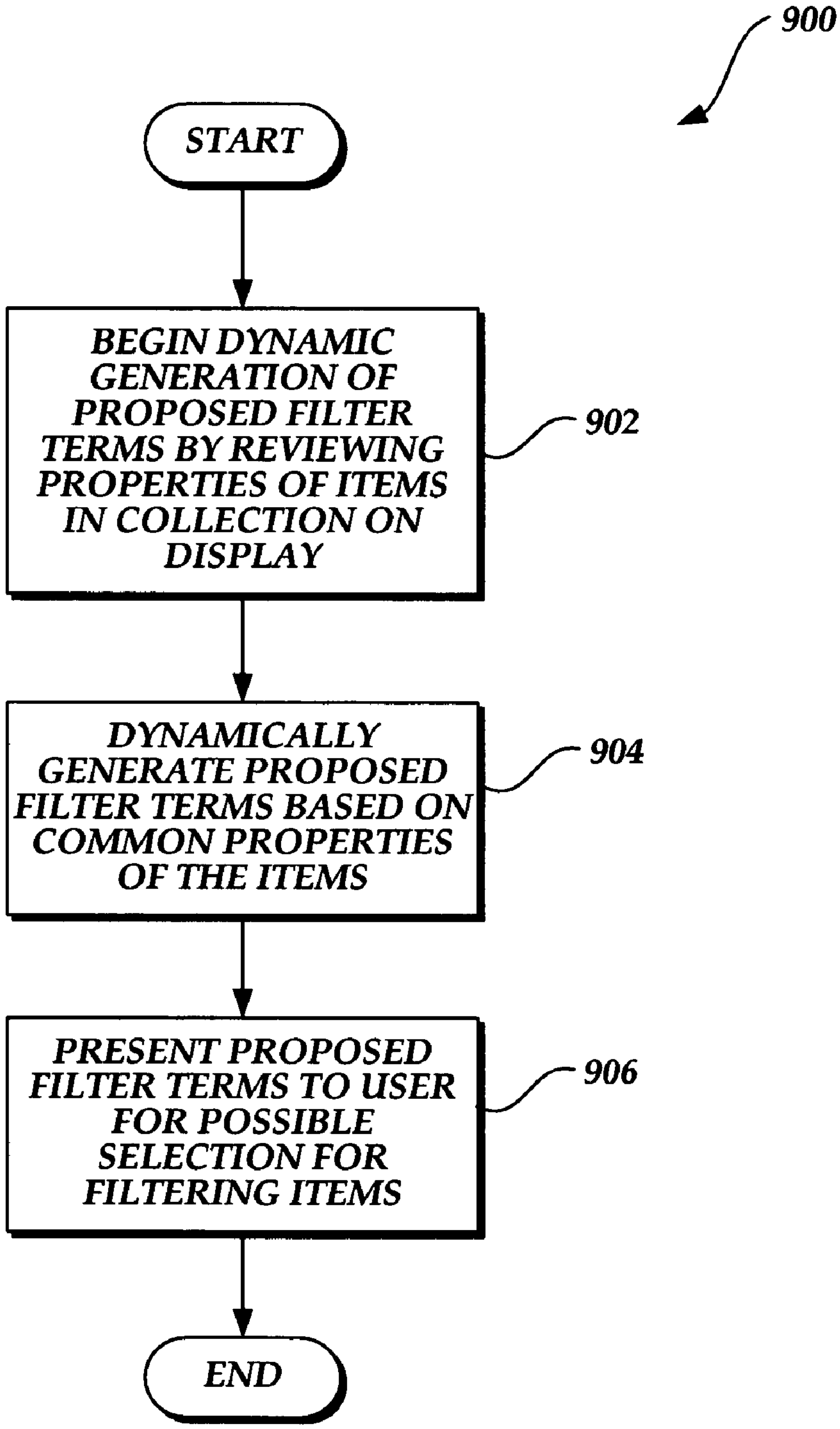
FIG. 22 is a flow diagram illustrative of a routine for the system dynamically generating new filter terms.

FIG. 22 is a flow diagram illustrative of a routine 900 for the system dynamically generating new filter terms. Filter terms are utilized for manipulating the virtual folders. The filtering terms are essentially utilized as a set of tools for narrowing down a set of items. In one embodiment, filters consist of metadata categories and their values (presented to the user in the user interface as clickable links or drop-down menus). Such an illustrative embodiment is described in connection with FIGS. 141 and 142 below. The user clicks on a filter term in order to filter down the current results set of items on the display.

FIG. 22 illustrates how filters may be dynamically generated. As shown in FIG. 22, at a block 902, the properties (from the metadata) of the items in a collection on the present display are reviewed. In a block 904, proposed filter terms are dynamically generated based on common properties of the items in the display. At a block 906, the proposed filter terms are presented to the user for possible selection for filtering items. As an example of this process, the system may review the properties of a set of items, and if the items generally have "Authors" as a property, the filter can provide a list of the authors to filter by. Then, by clicking on a particular Author, the items that don't have that Author are removed from the set on the display. This filtering process provides the user with a mechanism for narrowing the set of items on the display.

Figure 23:
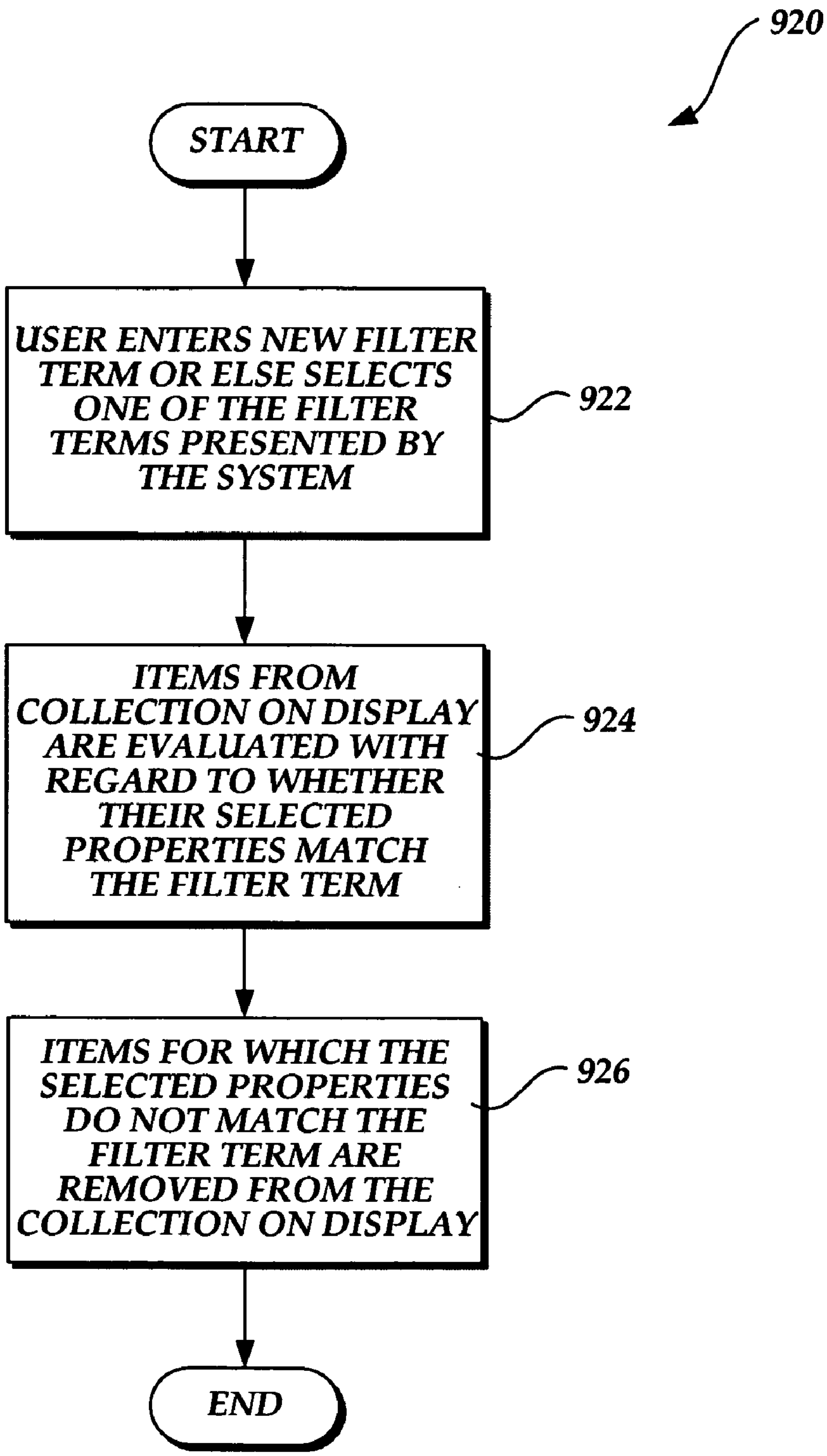
FIG. 23 is a flow diagram illustrative of a routine for the system filtering items based on the selection of a filter term.

FIG. 23 is a flow diagram illustrative of a routine 920 for the system filtering items based on the selection of a filter term. At a block 922, the user either enters a new filter term or else selects one of the filter terms that have been presented by the system. As noted above, the filter terms may be dynamically generated by the system, or they may be preset. At a block 924, the items from the collection on the display are evaluated with regard to whether their selected properties match the filter term. For example, if the filter term is for items that were authored by "Bob," then the items are evaluated in accordance with whether their author property includes "Bob". At block 926, the items for which the selected properties do not match the filter term are removed from the collection on the display.

FIGS. 24-29 generally illustrate how the filtering process appears on the screen display. As will be described below with reference to FIGS. 24-29, in one embodiment, the filtering may generally operate according to the following process. After the user clicks on a filter value, the items outside the filter range are animated off the screen. The animation is generally designed to make it obvious that items are being removed and that no new items are being added. The back button 643 may be selected by a user so as to undo the filter operations. In one embodiment, a navigation stack is created which contains the sequential filter actions, which is utilized to undo each of the filter actions when the back button 643 is selected. Each time a filter value is selected, the information area 640 and address bar 641 are updated to indicate the current filter value. In one embodiment, after a filter value is selected, a user is provided an option for saving a new quick link to the current filter navigation, as will be described in more detail below with respect to FIG. 30 or creating an autolist. As filter values are selected, the filter controls may be updated to be appropriate for the items remaining in the view.

Figure 24:
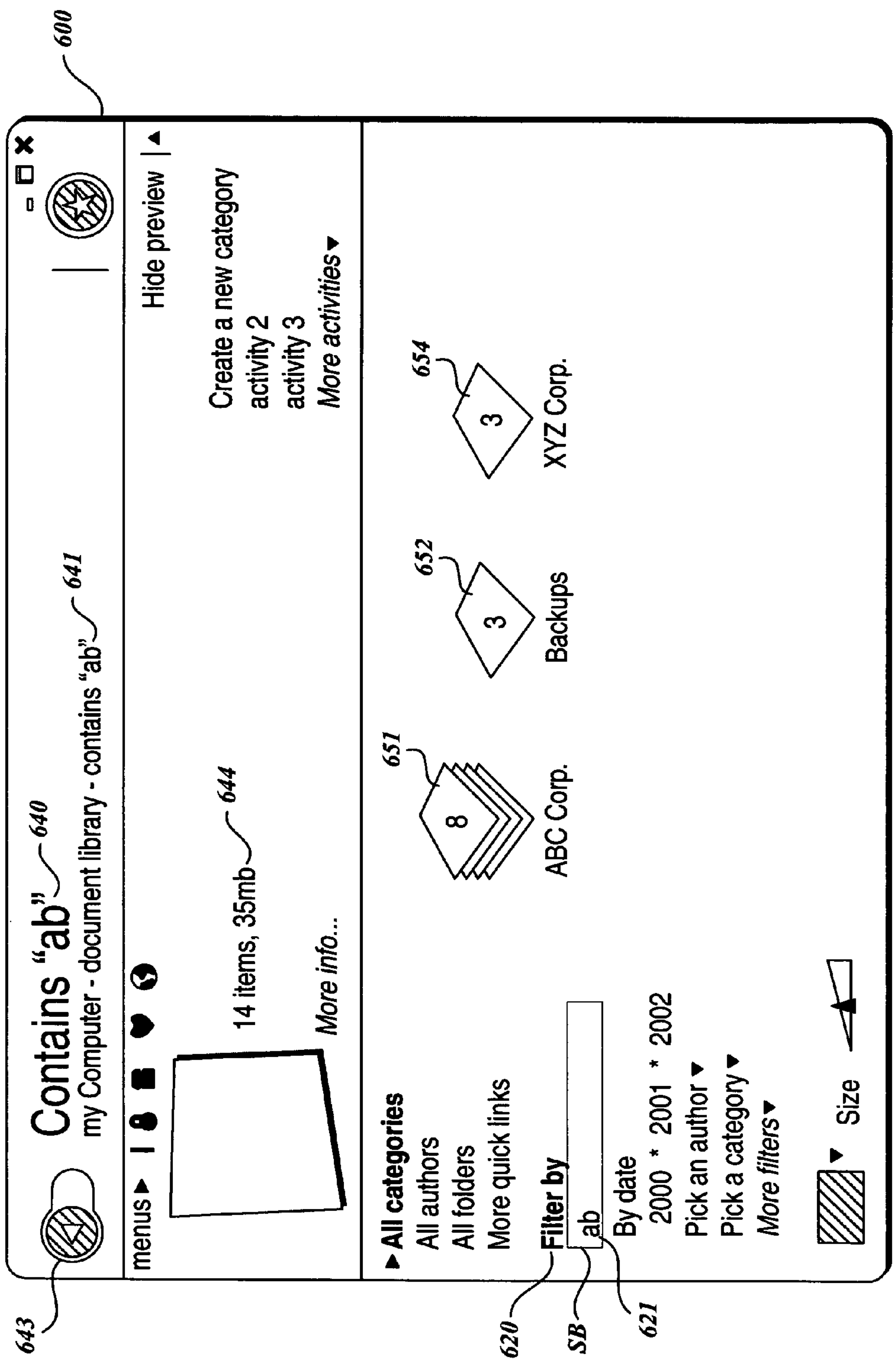
FIG. 24 is a diagram illustrative of a screen display in which the stacks of FIG. 10 have been filtered by the term "AB"

FIG. 24 is a diagram illustrative of a screen display in which the stacks of FIG. 10 have been filtered by the term "AB". As shown, in the filter area 621, the term "AB" has been typed by a user. The information line 640 and address bar 641 indicate that the items in the display are now those that have been filtered by the term "AB". As shown, the ABC Corp. stack 651 still contains eight items, while the Backups stack 652 now contains three items, and the XYZ Corp. stack 654 also contains three items. The information line 644 thus indicates that there are a total of 14 items, taking up a total of 35 MB of memory.

Figure 25:
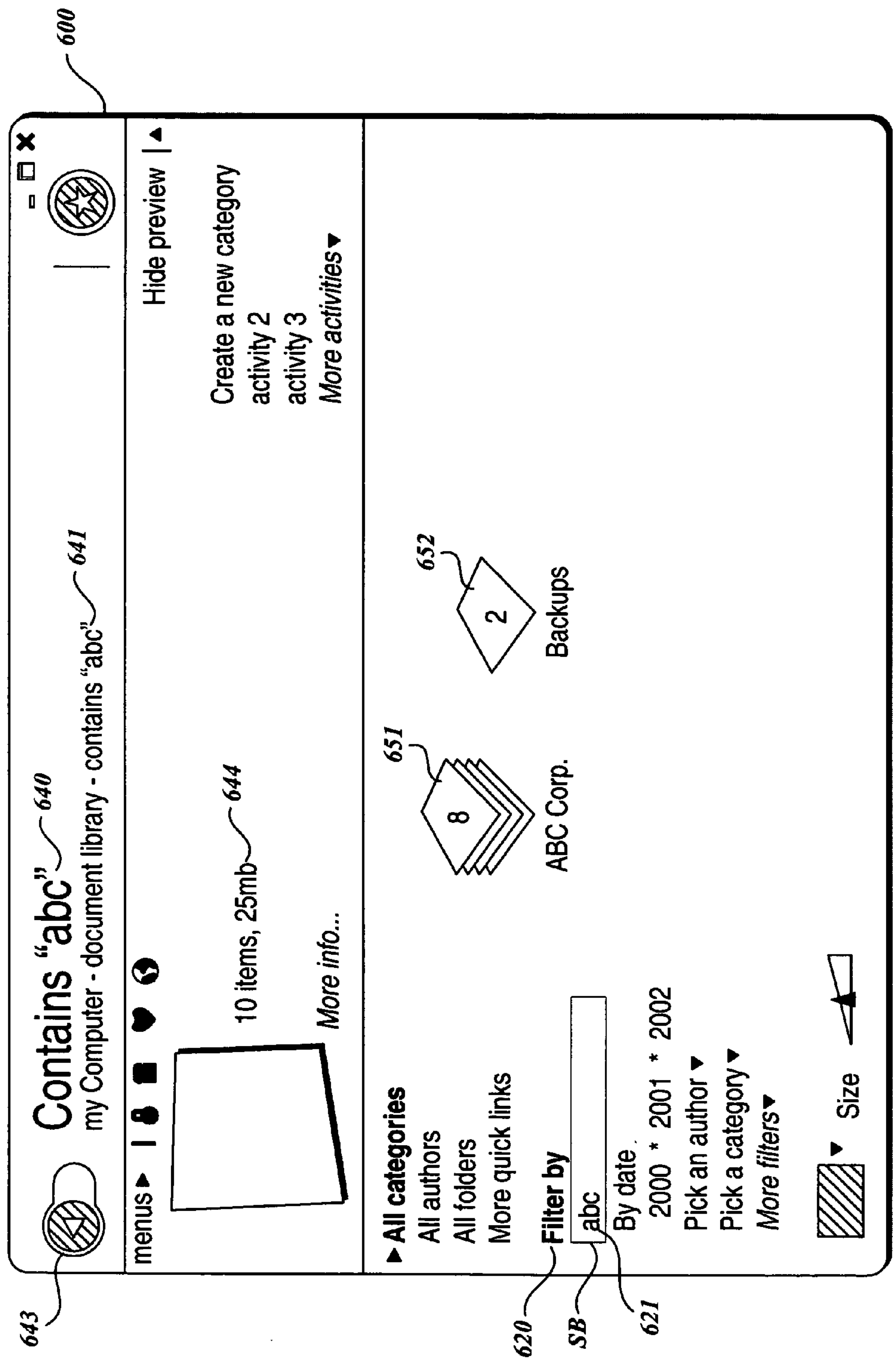
FIG. 25 is a diagram illustrative of a screen display in which the stacks of FIG. 10 have been filtered by the term "ABC"

FIG. 25 is a diagram illustrative of a screen display in which the stacks of FIG. 10 have been filtered by the term "ABC". With regard to the filter term "AB" of FIG. 24, the user has simply typed the additional letter "C" to make the total filter term "ABC". As shown in FIG. 25, the information line 640 and address bar 641 now indicate that the items on the display are those that contain the term "ABC". The ABC Corp. stack 651 is still shown to contain eight items, while the Backups stack 652 now contains only two items. The XYZ Corp. stack 654 has disappeared because none of its contents matched the "ABC" filter. The information line 644 now indicates that there are a total of 10 items in the stacks on the display, which take up a total of 25 MB of memory. FIGS. 24 and 25 thus provide examples of how a user may enter new filter terms, and how those filter terms are then used to filter the items that are shown on the display.

The back button 643 may be utilized by a user to back through the filtering process. As described above with respect to FIG. 10, the back button 643 allows a user to back up through a navigation. With regard to the examples of FIGS. 24 and 25, after filtering by the term "ABC" in FIG. 25, a user could select the back button 643 so as to back up one step of the filtering process, which would return to the state of FIG. 24. Alternatively, in another embodiment, the back button 643 may clear out the entire filter term, and may thus return to the state before that filtering occurred. In this case, by pressing the back button 643 in FIG. 25, a user would return to the state of FIG. 10.

In one embodiment, in addition to the back button, an additional means is provided for a user to back up in or otherwise modify the filtering navigation. This additional means involves allowing the user to directly access and modify the address bar 641, which correspondingly changes the filter navigation. In other words, by directly accessing and modifying the address bar 641, the user can remove one or more of the applied filters, or modify the values for any of the applied filters. This feature is described in greater detail in U.S. patent application Ser. No. 10/420,040, filed Apr. 17, 2003, which is commonly assigned and hereby incorporated by reference in its entirety.

A timer may also be utilized in conjunction with a user typing in filter terms such as those shown in FIGS. 24 and 25. The timer is used to monitor for a pause in the typing by the user. After a selected interval of no typing, the filter is applied. For example, in the state of FIG. 24, a user has typed the filter term "AB", with no significant time lag between the "A" and the "B." After typing the term "AB", the user pauses, thus producing the state shown in FIG. 24, where the filter term "AB" is applied. Sometime later, the user adds the letter "C" to complete the filter term "ABC", and then pauses again, at which point the filter term "ABC" is applied as illustrated in FIG. 25.

In one embodiment, after a user has typed a filter term in the filter area 621, and then chooses another filter or navigation, the navigation state is updated, and the filter term in the filter area 621 is made to be empty again. In addition, as will be described in more detail below with reference to FIGS. 26-29, other filter controls may be updated based on the selection of certain filter terms.

Figure 26:
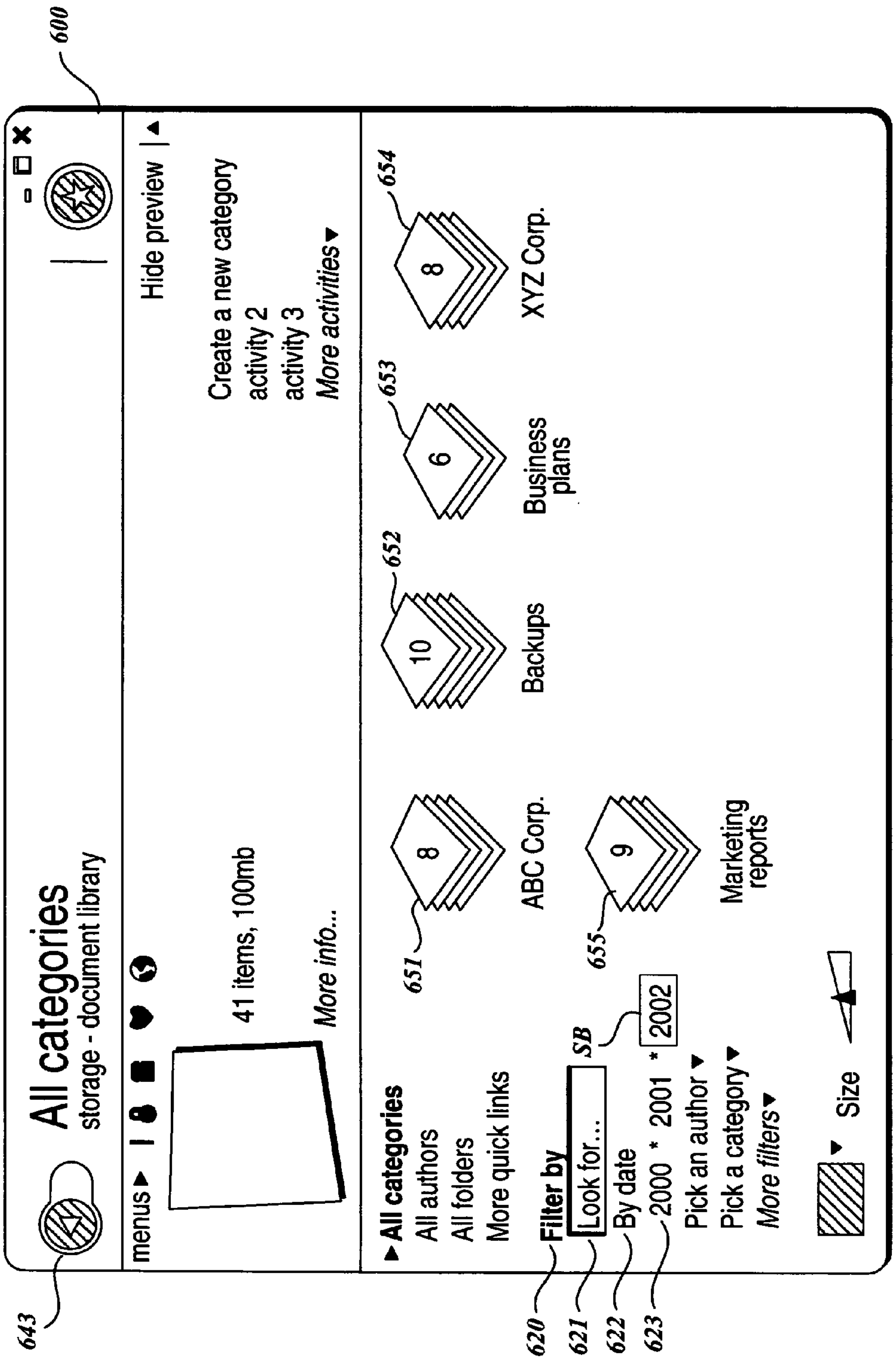
FIG. 26 is a diagram illustrative of a screen display in which the filter term "year 2002" is selected for the stacks of FIG. 10.

FIG. 26 is a diagram illustrative of a screen display in which the system provided filter term "year 2002" is selected. As noted above, under the by date indicator 622, the year selections 623 include the years 2000, 2001, or 2002. The selection box SB is shown to be around the year 2002, indicating that the user is selecting that as the desired filter term.

Figure 27:
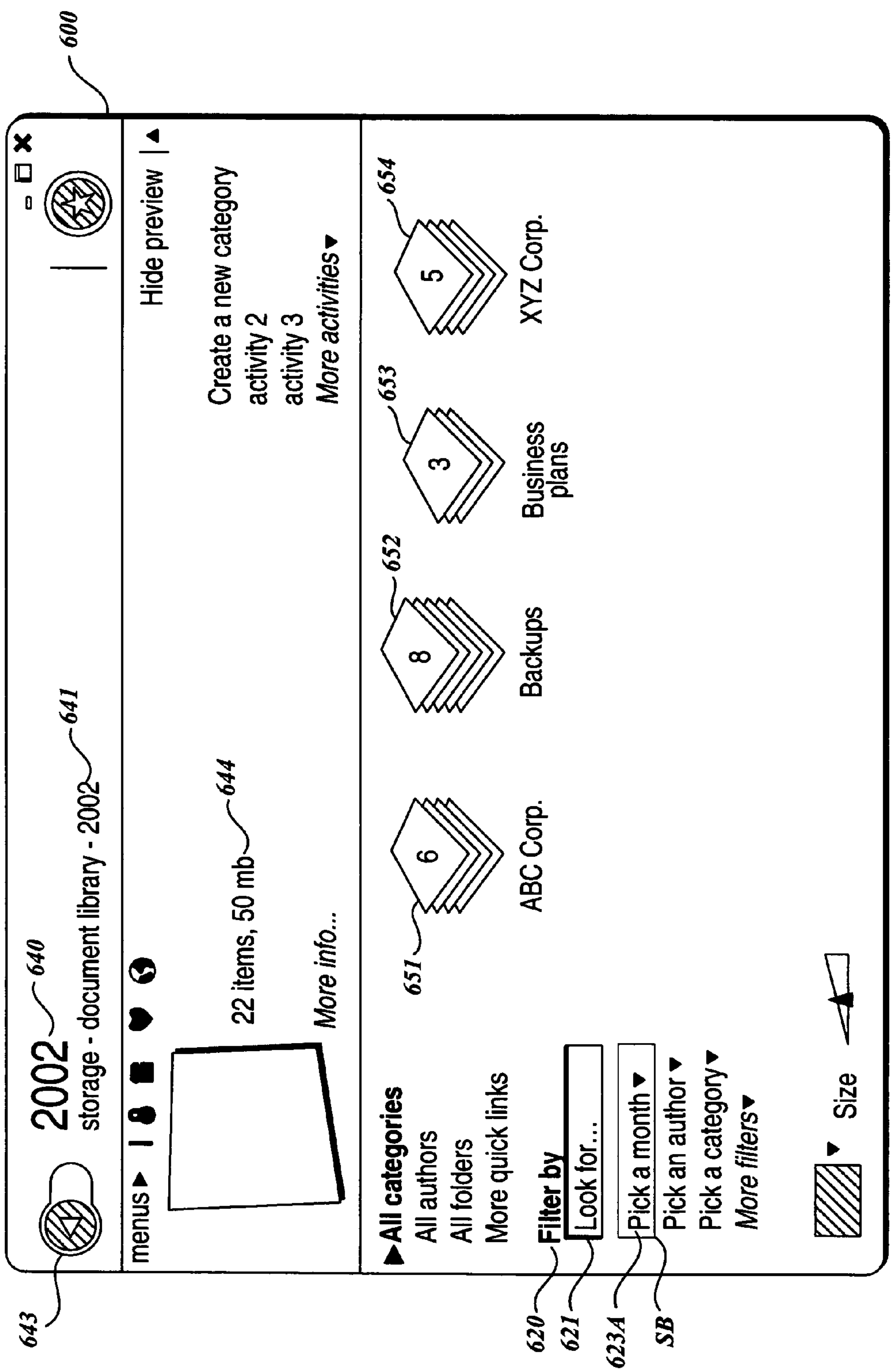
FIG. 27 is a diagram illustrative of a screen display in which the stacks of FIG. 10 have been filtered by the "year 2002" and the further selection of the filter term "month"

FIG. 27 is a diagram illustrative of a screen display in which the filter term "2002" has been applied. Also shown is the further selection of the "pick a month" selector 623A. As shown in FIG. 27, after applying the filter term "2002", the number of items in the stacks is reduced. More specifically, the ABC Corp. stack 651 now contains six items, the Backups stack 652 now contains eight items, the Business Plans stack 653 now contains three items, and the XYZ Corp. stack 654 now contains five items. The information line 644 now indicates a total of 22 items, taking up a total of 50 MB of memory. The information line 640 and address bar 641 now indicate that the items shown on the display are those that have been filtered to contain the filter term "2002".

Figure 28:
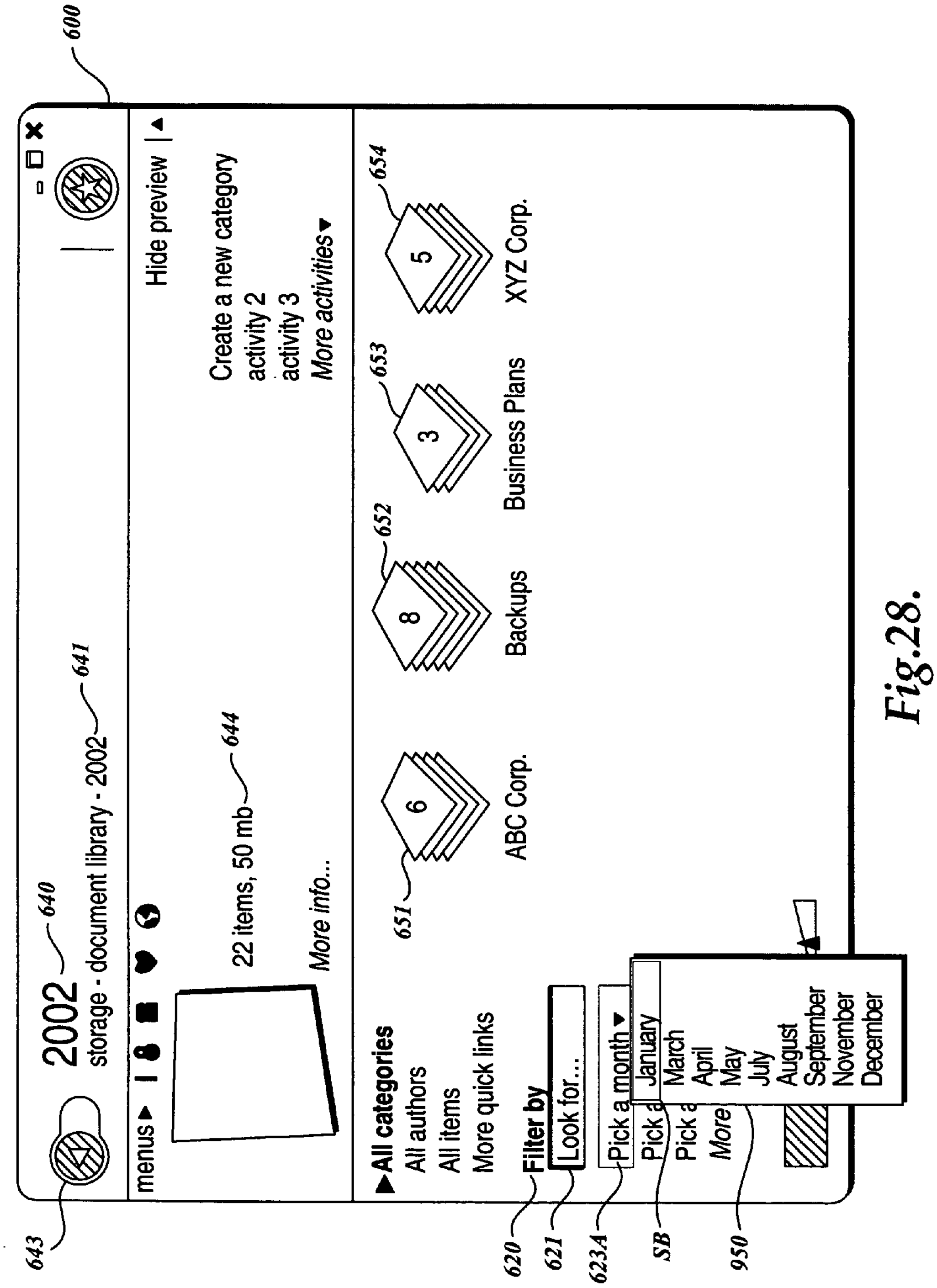
FIG. 28 is a diagram illustrative of a screen display in which a list is presented for selecting a month for filtering.

FIG. 28 is a diagram illustrative of a screen display in which a list is presented for selecting a month for filtering. A box 950 is provided which includes the list of the months. The box 950 has been provided on the display due to the user selecting the "pick a month" selector 623A. The selection box SB is shown to be around the month of January.

Figure 29:
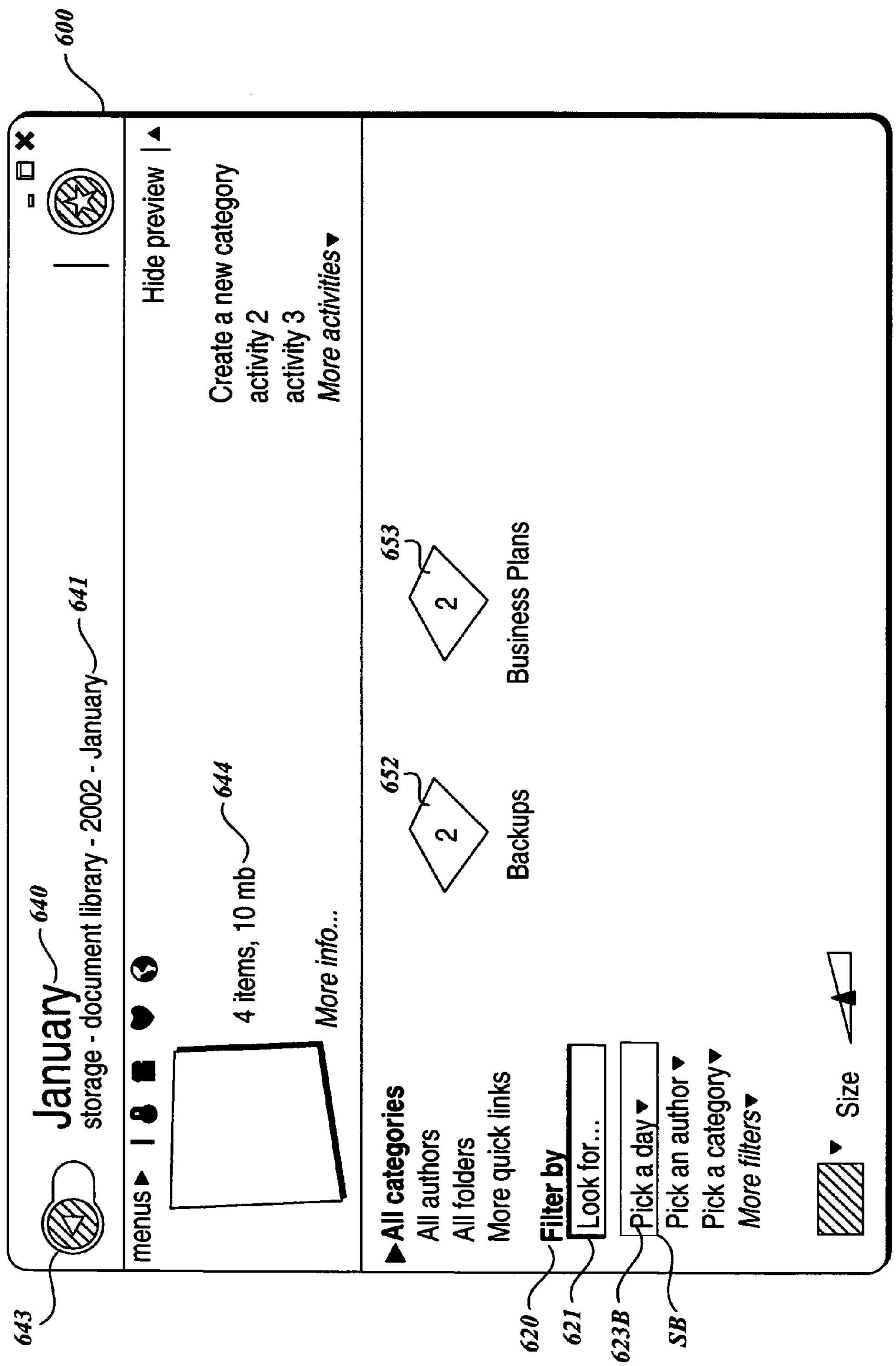
FIG. 29 is a diagram illustrative of a screen display wherein the stacks of FIG. 10 have been further filtered by the month of January, and further showing a filter term of "day"

FIG. 29 is a diagram illustrative of a screen display wherein the stacks of FIG. 28 have been further filtered by the month of January, and further showing a filter term of "day". As shown in FIG. 29, the information line 640 and address bar 641 now indicate that the items on the display are those that have been filtered by the term "January". The Backups stack 652 is now shown to contain two items, while the Business Plans stack 653 is also shown to contain two items. The information line 644 indicates that there are a total of four items on the display, which take up a total of 10 MB of memory. A "pick a day" selector 623B is provided, should the user wish to further filter the results to a specific day. An illustrative calendar control 14400 where a day or range of dates may be selected is shown in FIG. 144.

As described above with respect to FIGS. 24-29, filter terms may be presented by the system, or typed by a user. Once a filter term is selected, the remaining filter terms that are presented may be updated (e.g., after the year "2002" is selected in FIG. 26, in FIG. 27 the options for selecting a year are no longer presented and instead a "pick a month" option is provided). As noted above, the back button 643 may be selected by a user to back through the filtering process. For example, after the month of "January" has been selected in FIG. 29, the user may select the back button 643 to back up the filtering process to the year "2002", as illustrated in FIG. 27. The filter menu may also include a "stack by" function, which would work similarly to the stack by function described above with respect to FIGS. 15 and 16. For example, a "file type" filter could have choices for "Excel", "PowerPoint", "Word", and also "Stack by file type". Choosing the "stack by" function changes the view to show stacks for the various file types.

In general, the filters may be configured to apply to different properties of the files or items. In one embodiment, the filters may be classified according to different types, such as: alphabet index; discrete values; dates; and numerical ranges. Example properties for the alphabet index may include file name, author, artist, contact friendly name, owner, document author, document title, document subject, and description. Example properties for the discrete values may include location, file type (application name), genre, track, decade (for music), rating (for music), bit rate, protected, document category, document page count, document comments, camera model, dimensions, product name, product version, image X, image Y, and document created time. Example properties for the dates may include last accessed, last modified, created on, taken on (for pictures). An example property for the numerical range may be file size.

It will be appreciated that the filters described above with respect to FIGS. 24-29 allow users to reduce a list of items to find a particular item that is of interest. As a specific example, according to the processes described above, a user could narrow a current list of documents to only show Microsoft Word files, authored by a particular person and edited in the last week. This functionality allows a user to find a particular item in a list of many, and helps the user avoid having to manually scan each item in the list.

Figure 30:
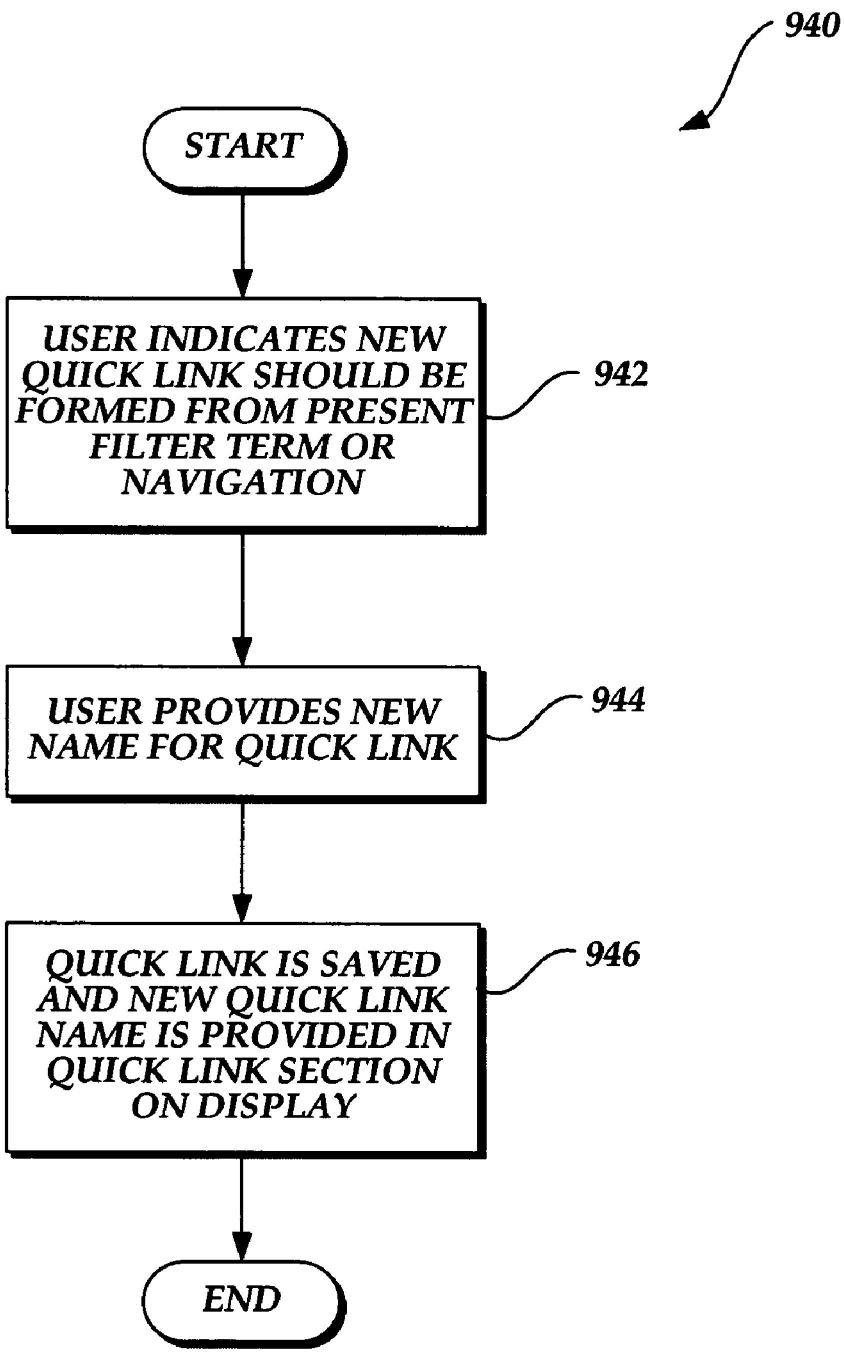
FIG. 30 is a flow diagram illustrative of a routine for creating a new quick link.

FIG. 30 is a flow diagram illustrative of a routine 940 for creating a new quick link. As will be described in more detail below, quick links are predefined links that can be clicked on by a user to create user selected views of the sets of items. In one embodiment, a quick link may be thought of as a type of pivot. Quick links provide a mechanism for retrieving a virtual folder. Clicking a quick link can take a user to a desired folder (in the same way that clicking a "favorites" may take a user to a Web site). The quick links can be predefined by the system, or can be set by a user. For example, clicking on "all authors" could return a view stacked by authors. Clicking on "all documents" may return a flat view for all of the documents for all of the storage areas. Users can also create their own quick links.

As shown in FIG. 30, at a block 942, a user makes a selection on the display to indicate that a new quick link should be formed from the present filter term or navigation. At a block 944, the user provides a new name for the new quick link. At a block 946, the new quick link is saved and the new quick link name is provided in the quick link section on the display.

Figure 31:
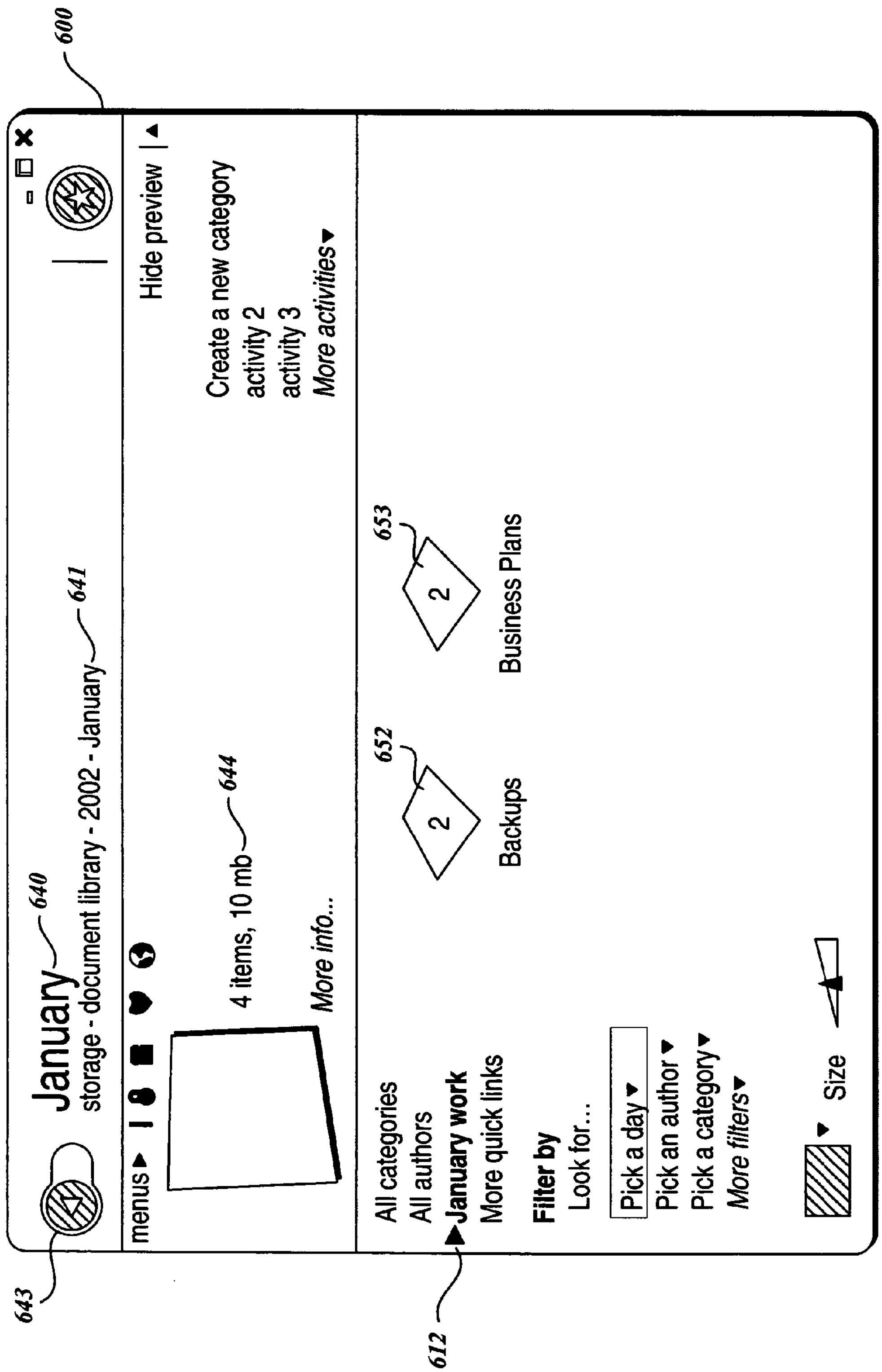
FIG. 31 is a diagram illustrative of a screen display for creating a new quick link called "January Work" based on the filtering of FIG. 29.

FIG. 31 is a diagram illustrative of a screen display for creating a new quick link called "January Work" based on the filtering of FIG. 29. As described above, in FIG. 29, the stacks have been filtered by the month of January. In FIG. 31, the user has indicated that the filtering of FIG. 29 should be saved as a new quick link, and has named the new quick link "January work". Thus, the new January work quick link 612 is shown in the quick links section of the display. With regard to forming new quick links, the user is generally provided with an option such as "save this collection as a quick link".

Figure 32:
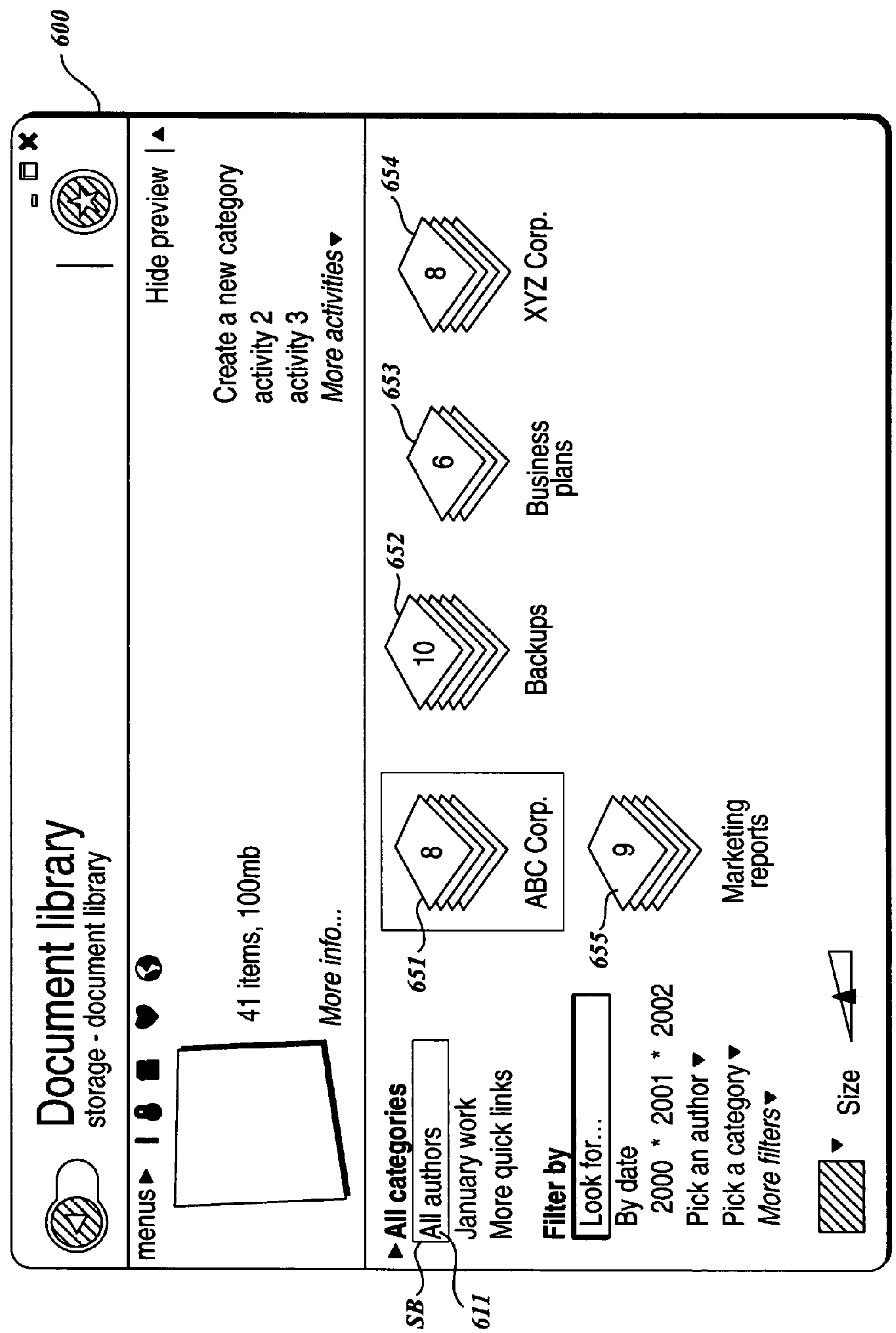
FIG. 32 is a diagram illustrative of a screen display in which a quick link of "All Authors" is selected.

FIG. 32 is a diagram illustrative of a screen display in which a quick link of "All Authors" is selected. As shown in FIG. 32, the selection box SB is shown around the All Authors selection 611. Other examples of collections that might be accessible by quick links include "all authors", "recent documents", "all documents I've shared", "all documents I've authored", "all documents not authored by me", "desktop", and "all types".

Figure 33:
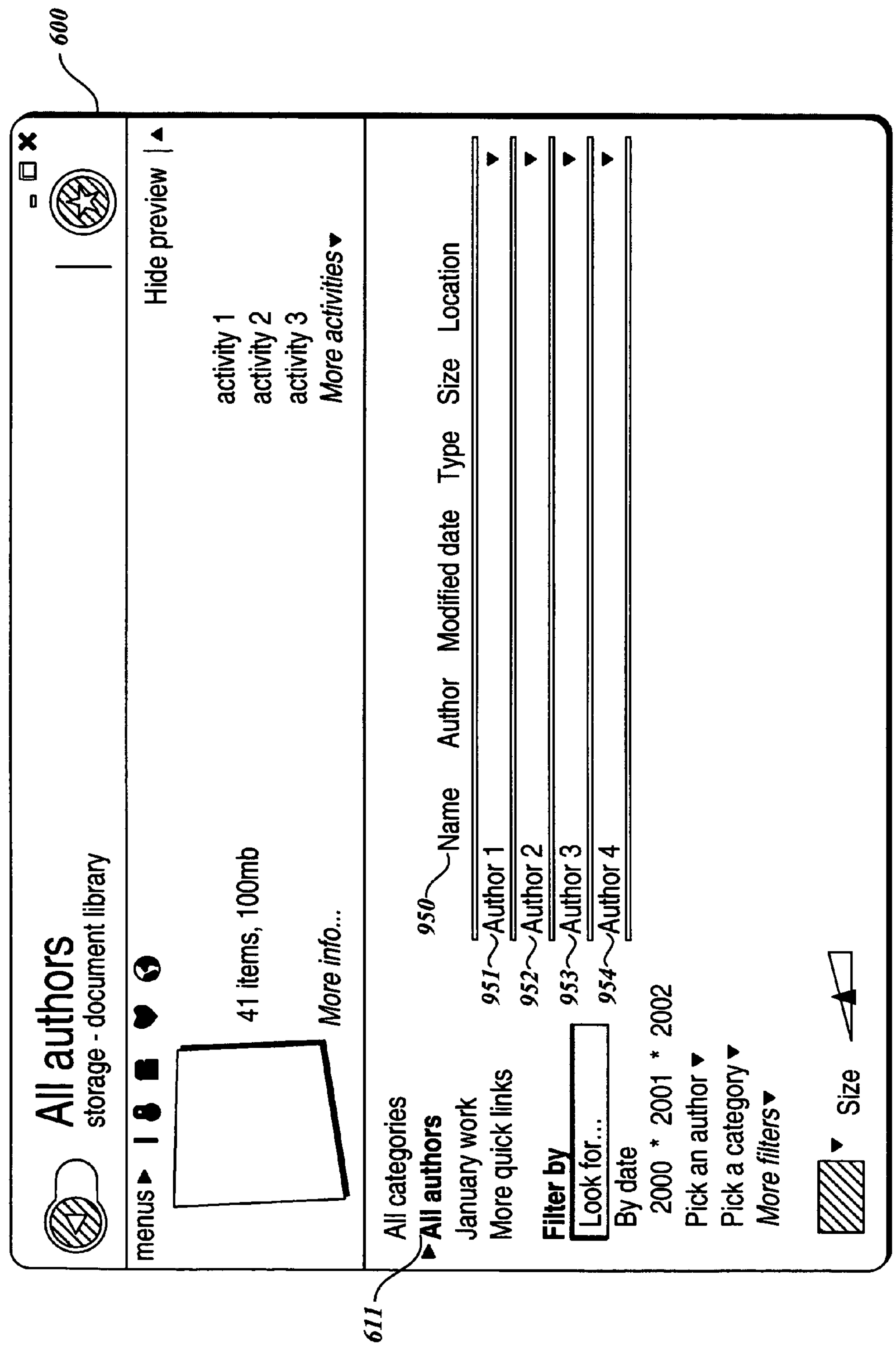
FIG. 33 is a diagram illustrative of a screen display in which a list of all of the authors of FIG. 32 is presented.

FIG. 33 is a diagram illustrative of a screen display in which a list of all of the authors of the items of FIG. 32 is presented. As shown in FIG. 33, an information line 950 is provided, which indicates columns for showing the name of an item, the author, the modified date, the type, the size, and the location of an item. A list of Authors 951-954 is shown, corresponding to Authors 1-4, respectively.

Figure 34:
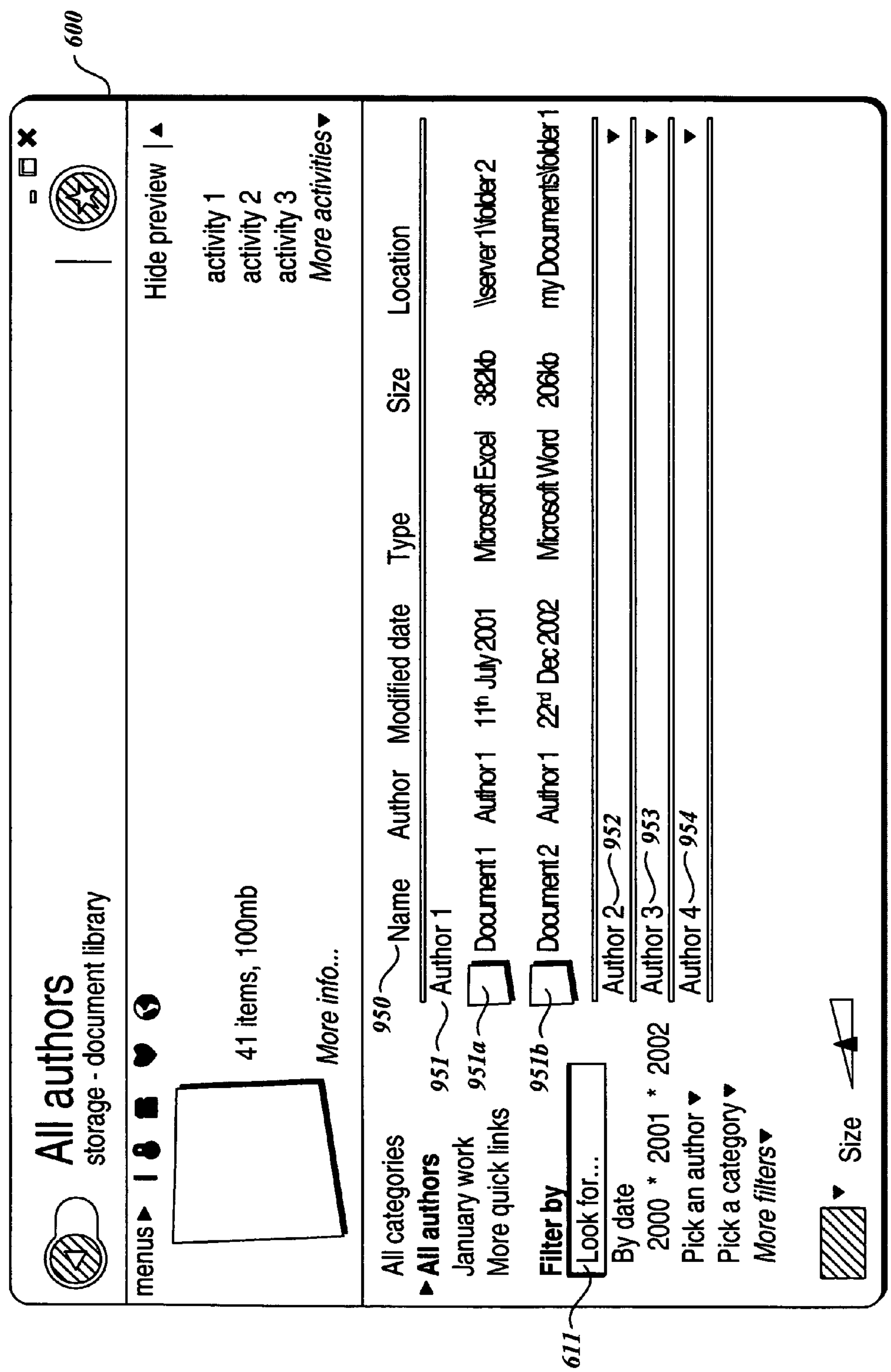
FIG. 34 is a diagram illustrative of a screen display in which "Author 1" has been selected from the list of FIG. 33 and all of the Author 1's documents are shown.

FIG. 34 is a diagram illustrative of a screen display in which "Author 1" has been selected from the list of FIG. 33. The Author 1's documents include documents 951A and 951B, corresponding to documents 1 and 2, respectively. The document 951A is shown to have been authored by Author 1, was modified on 11 Jul., 2001, is a Microsoft Excel file, takes up 282 Kb of memory, and was obtained from the location \\server1\folder2. The document 951B is shown to have been authored by Author 1, was modified on 22 Dec., 2002, is a Microsoft Word file, takes up 206 kilobytes of memory, and is physically stored in the location My Documents\folder1. The locations of the documents 951A and 951B also illustrate that the virtual folders of the present invention may contain items from different physical locations, as will be described in more detail below.

FIG. 35 is a flow diagram illustrative of a routine 960 for creating a new library. One example of a library is the documents library described above with reference to FIG. 10. In general, libraries consist of large groups of usable types of files that can be associated together. For example, photos may be one library, music may be another, and documents may be another. Libraries may provide tools and activities that are related to the particular types of items. For example, in the photo library, there may be tools and filters that relate to manipulating photos, such as for creating slide shows or sharing pictures. As shown in FIG. 35, at a block 962, a new library is created which is to include items with selected characteristics. At a block 964, the selected items are grouped into the library. At a block 966, the tools and/or activities related to the selected characteristics of the items or to other desired functions are provided.

FIG. 36 is a diagram illustrative of a screen display in which a collection of available libraries are shown. As shown in FIG. 36, the libraries include a documents library 971, a photos and video library 972, a music library 973, a messages library 974, a contacts library 975, and a TV and movies library 976, as well as an all items library 977. The all items library 977 is shown to include 275 items, which is the total number of items from all of the other libraries combined. The information line 644 indicates a total of 275 items, which take up a total of 700 MB of memory. It should be noted that the documents library 971 is the library that was described above with respect to FIG. 10.

FIG. 37 is a flow diagram illustrative of a routine 990 for defining the scope of a virtual folder or auto list collection. As will be described in more detail below, a virtual folder system is able to represent items from multiple physical locations (e.g., different hard drives, different computers, different networks locations, etc.) so that to a user, all of the items are readily accessible. For example, a user can be presented with music files from multiple physical locations on a single display, and manipulate the files all at once.

As shown in FIG. 37, at a block 992, a scope is defined for the physical locations from which items are to be drawn. At a block 994, in response to a query, the items are drawn from the physical locations as defined in the scope. At a block 996, all of the items drawn by the query are presented on a single display.

FIG. 38 is a block diagram illustrative of the various sources which may form the scope of a virtual folder collection. As shown in FIG. 38, the system 1000 may include a present computer 1010, an additional computer 1020, external and removable storage 1030, and locations on a network 1040. The overall scope 1001 is described as including all of the physical locations from which a user's items are drawn to create collections. The scope may be set and modified by a user. As noted above, other figures have illustrated that items may come from different physical locations, such as FIG. 34 showing different documents coming from a server and a My Documents folder on a present computer, and in FIG. 18 showing physical folders that are physically stored in multiple locations.

FIG. 39 is a flow diagram illustrative of a routine 1080 for including non-file items in a virtual folder collection. Non-file items are contrasted with file items that are typically located in a physical file storage. Examples of non-file items would be things like e-mails, or contacts. As shown in FIG. 39, at a block 1082 a database is utilized to include non-file items along with file items that may be searched by a query. At a block 1084, in response to a query, both non-file items and file items are drawn to match the query. At a block 1086, both the non-file items and the file items that matched the query are presented on the display.

FIG. 40 is a diagram illustrative of a screen display showing various non-file items. As shown in FIG. 40, the items have been filtered to those that include "John". The items are shown to include a contact item 1101, an e-mail item 1102, and document items 1103 and 1104. The contact item 1101 and e-mail item 1102 are non-file items. The present system allows such non-file items to be included with regular file items, such that they can be organized and manipulated as desired by a user. As was described above with respect to FIG. 2, such non-file items may be contained entirely within the relational database 230, which otherwise includes information about the properties of files.

In another aspect of the invention, a graphical user interface is provided where a different type of filter control is implemented. According to this aspect, metadata property controls corresponding to properties that are shared by a plurality of the items is provided in the listview mode. It will be appreciated that the description above applies to the following discussion where applicable and without specific reference thereto.

Figure 140:
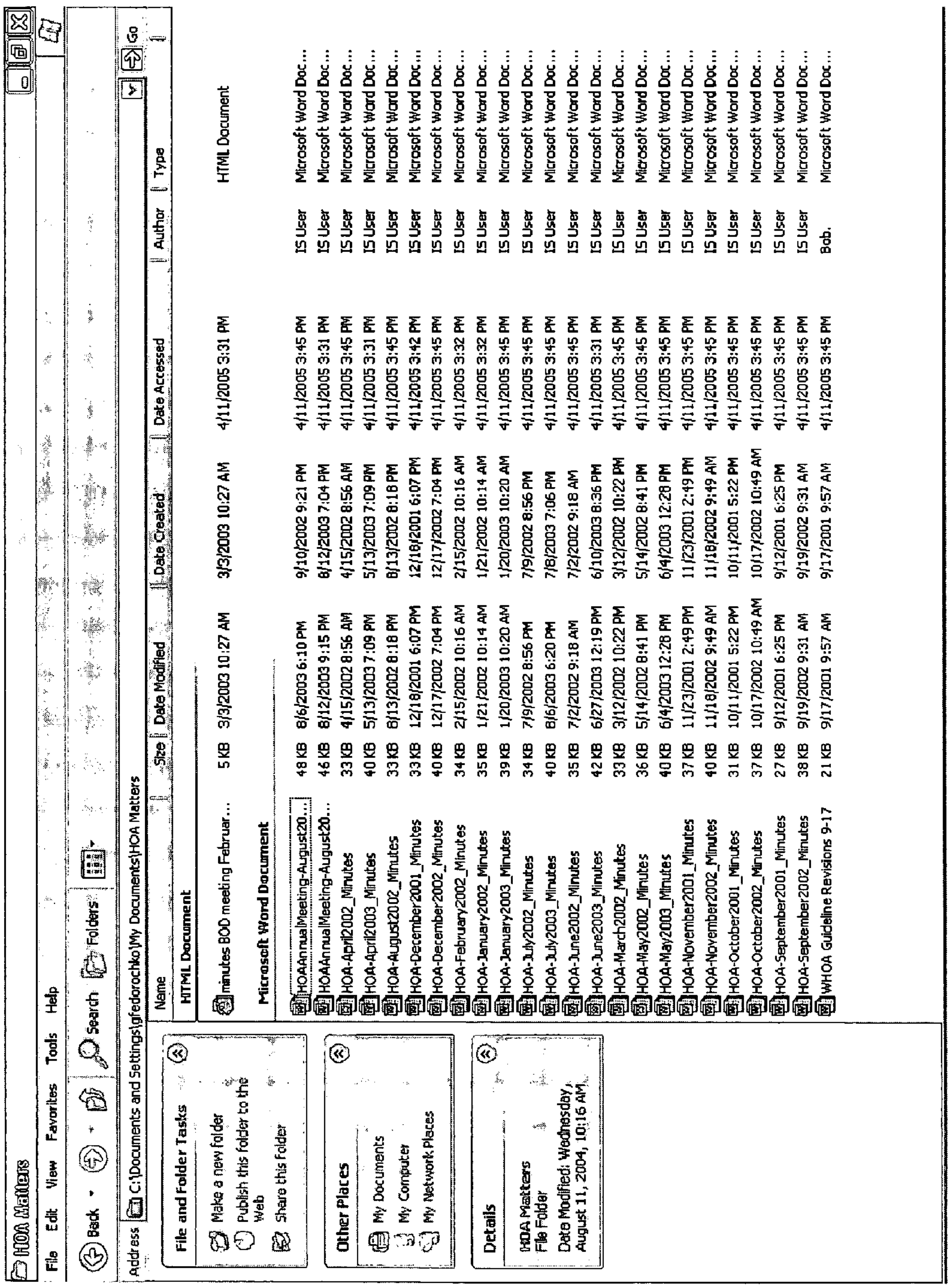

In the Microsoft Windows XP brand operating system by Microsoft Corporation of Redmond, Wash., users are provided with different views for viewing display a list of folders and files that are currently identified in the tree structure. The views include a details view, icon view, thumbnail view, list view and tiles view. The objects identified in these views can be sorted or grouped by a number of different metadata properties. FIG. 140 provides an illustrative screen shot of details view in the Windows XP brand operating system. In details view, each row corresponds to a particular object and each column corresponds to a particular property of the object. The properties may be listed in any desired order. In this example, the properties identified from left to right include Name, Size, Date Modified, Date Created, Date Accessed, Author and Type. The objects and their associated information have been divided into two separate groups according to Type—HTML Document and Microsoft Word Document. The "Show in Groups" command is accessible by drilling down to the "Arrange Icons By" drop down menu, via the "View" drop down menu at the top of the screen. Selection of a property, such as author, would causes the objects to be regrouped according to author. If grouping was not activated, selection of a property causes the objects to be sorted by the selected property.

Aspects of the present invention build upon some of the core functionality of the user interface in the Windows XP brand operating system. Certain aspects of the invention provide and arrange and filter control that enables a user to filter a view using properties shared by a plurality of items. The filter control in some aspects allows a user to easily add, change or remove a filter term from an address bar, such as address bar 641 shown previously in, for example, FIG. 24. In one implementation applying the filter control, a user may filter a view of display objects by a disjunction, "ORing" multiple values of a single property (e.g., author="Bill" or "Bob"). In other aspects applying the filter control, a user can sort, group or stack a view of display objects by a property.

According to aspects of the invention, a property header appears as a set of labels along the top of the listview in each of the view modes. The view modes may include any view of the physical or virtual files including the icons view, details view, list view, tiles view and thumbnail view. Each of the properties in the property header functions as a property control and may be invoked by user selection, such as by clicking on the property control to access associated control functionality. There will likely be numerous properties that may be available to the user. As such, it may be practical to display a relevant subset of properties that is most useful to the user. In this regard, the set of properties displayed in the display header may be customizable by the user, may be part of a default template or may be a function of the query on the address bar. One way to select a set of properties to be displayed is on an individual shell folder (i.e., page) basis, so that for each virtual folder (autolist), list, file folder, etc. where the set of properties may be customized by default. For example, for a virtual folder called "Recent Documents" that shows all documents viewed recently, the "Date Last Accessed" property would be useful, whereas in other virtual folders, it may not be useful. Also, properties may be reordered within the property header or removed by, for example, dragging and dropping.

FIG. 141A shows a property header 14100 for a details view according to an illustrative implementation of the invention and FIG. 142A shows a property header 14200 for other listview modes such as a tiles view or thumbnails view. As can be seen the primary difference between the property headers in FIGS. 141A and 142A is that the individual property controls in the header 14100 in details view map to the column sizes in the details view, whereas the individual property controls in the header 14200 occupy only the space required to fit the property name. Below the property header is an area of the listview mode (not shown) in which the display objects (e.g., physical files and folders, virtual files and folders) are displayed.

Each property control in the respective header may include a split button divided into a main portion 14110 and a split portion 14112 as shown in details view in FIG. 141B and the other listview modes in FIG. 142B. The split button state may be revealed to the user when she positions the cursor 14120 over a portion of the property control or in the property header 14100, or may be revealed when the property control is initially displayed.

Positioning the cursor 14120 over the main portion 14110 of the property control and selecting (e.g., clicking) causes the display objects to be sorted in accordance with the property associated with property control. In the example shown in FIG. 141B, the property is "Type", selection of the main portion 14110 of the property control would cause the display objects to be sorted alphabetically. Alternatively, all physical folders may be displayed, followed by all Microsoft Excel documents, followed by all Microsoft PowerPoint documents, followed by all Microsoft Word documents, followed by all virtual folders (autolists) etc. When the display objects are sorted by a property, the property control may provide a visual indication that the display objects have been sorted by the property. For example, the property control may take on a visual appearance as being a depressed button or other appearance differentiating it from the other property controls. If prior to sorting by "Type", the display objects were sorted by another property such as "Date", that property would become the secondary sort term, such that within the document type the display objects would be secondarily sorted by date.

As shown in FIGS. 141C and 142B, positioning the cursor 14120 over the split portion 14112 of the property control and selecting causes an arrange and filter dropdown menu for the property corresponding to the property control to be presented. The arrange and filter drop down menu provides various controls which allow a user to group, stack or filter the view of display objects by the property corresponding to the property control. The arrange and filter drop down menu includes an arrangement portion 14130 including a list of arrangement commands and a filter portion 14135 including a list of filter terms. The two lists may be separated by a visual divider as shown in FIGS. 141C and 142B.

In the example of FIGS. 141C and 142B, the filter terms correspond to various "Type" properties of the items. The set of specific filters provided in the filter portion 14135 is the subset of possible filter terms for which at least one item in the view satisfies the filter term. For example, if one of the display objects in the view were a photo with "vacation" as a keyword, then "vacation" would appear in the arrange and filter drop down menu for the keyword property control corresponding to the keyword property. It will be appreciated that all filter terms may not fit into the arrange and filter drop down menu. As shown, in FIGS. 141C and 142B, a scroll bar control is provided to allow the user to view other available filter terms. It will be appreciated that items may be moved into or out of the view by operations such as dragging and dropping. Each time an item is added or removed from the view, the set of specific filters provided in the filter portion 14135 is updated to account for the added or removed item.

The filter terms may be preset or dynamically generated based on evaluation of the property corresponding to the property control and the items displayed in the view. FIG. 22, described above and its accompanying description, provides an illustrative routine for dynamically generating new filter terms. The set of possible filters and their display order may depend on how the particular property categorizes the items. With a multi-valued property such as keyworks, each individual value may have its own bucket. Thus, if an item has keywords "vacation; Hawaii; beach", three separate buckets will be created, one for "vacation", one for "Hawaii", and one for "beach", for filtering. The same process applies to the operations of grouping and stacking, which will be discussed further below.

For the property date, assuming today's date is Friday, Nov. 19, 2004, dates may be categorized in the following categories: Long Time Ago; Two Years Ago; Last Year; 2004 January; 2004 February; . . . ; 2004 August; 2004 September; Last Month; Three Weeks Ago; Two Weeks Ago; Last Week; Sunday; Monday; Tuesday; Wednesday; Yesterday; Today; Tomorrow; Two Days From Now; Later This Week; Later This Month; Next Year; Some Future Date. Other properties such as "Size" and "Type" may have the same bucketization as found in the Windows XP Brand Operating System.

According to one aspect, the list of filter terms in filter portion for properties relating to dates (e.g., date created, date modified, etc.) include an additional filtering option, which may be at the top of the list of filter terms referred to as "Pick a Date". Selecting this filter term causes a calendar picker control 14400 to be displayed from which a user can select a specific date or date range. FIG. 14400 provides an example of such a control where the date April 20 has been selected.

Certain properties may not be divided or bucketized such as Filename, Comment, Description. For these properties, there may be no useful breakdown of the property into discrete buckets for grouping, stacking and filtering purposes. In this instance, the only option presented in the arrange and filter drop down menu may be sort.

Each filter term in the arrange and filter drop down menu may include a corresponding indicator that provides an indication as to the number of items which satisfy the respective filter term. As shown in FIGS. 141C and 142B, icon 14138 is provided adjacent to the filter term "PowerPoint" and represents a stack of paper. Inspection of the other icons positioned adjacent to the other filter terms indicates that they also represent stacks of papers. However, the stack of paper icons vary in appearance and are dynamically generated, where the number of papers stacked in the icon represent, relatively, the number of items which satisfy the corresponding filter term. For example, icon 14138 shows more papers stacked then the icon corresponding to the filter term "Email Message," which shows more papers stacked then the icon corresponding to the filter term "Outlook Document." Thus, more items satisfy the filter term "PowerPoint" then the filter term "Email Message," and more items satisfy the filter term "Email Message" then the filter term "Outlook Document."

The filter portion 14135 also may include a checkbox control corresponding to each filter term in the list of filter terms. For example, the checkbox control 14140 corresponds to the filter term "Illustrator Artwork." Selecting the checkbox control next to a filter term causes that filter term to be added to the current selection by placing a check in the selected checkbox control, and leaves the checkbox controls corresponding to the other filter terms in the filter portion 14135 of the arrange and filter drop down menu in their previous state, selected or unselected. Also, selection of the checkbox control may show a live preview of the filter operation in the area containing the display objects. Thus, selection of the checkbox control causes the items that are represented on the display to include items that satisfy the filter term corresponding to the check box control. If no other checkbox control is selected, then only display objects which satisfy the selected checkbox control will be represented on the display. It will be appreciated that selection or de-selection of a check box control may occur in any number of ways including using a pointing device, a keyboard input, voice input, and combinations of the same. For example, if a user holds down the <SHIFT> key, she can select a range of filter terms similar to how the Windows XP brand operating system allows multiple selections.

Referring to FIGS. 141C and 142B, each display object in the display area (not shown) will satisfy the current query in the address bar (not shown) in a manner similar to described above, for example with respect to FIG. 21. Selection of the checkbox control 14140 causes the checkbox control 14140 to be presented as a checked checkbox control 14140A as shown in FIG. 141D, and causes only those items which satisfy the filter term "Illustrator Artwork" to be presented on the display. A routine similar to the routine described in FIG. 23 may be employed for selection of a checkbox control when no other checkbox control is selected, where step 922 in this scenario would correspond to a user selection of a checkbox control corresponding to one of the filter terms.

After selecting a checkbox control, selecting an <enter> command or otherwise issuing a command outside the arrange and filter drop down menu (e.g., clicking elsewhere on the graphical user interface) causes the arrange and filter drop down menu to close and applies the currently selected filter(s). Also, selecting a filter term or an icon associated with a filter term deselects any other checkbox controls, closes the arrange and filter drop down menu and applies the filter term. In these instances, the address bar (similar to address bar 641 shown in other figures such as FIG. 24) is updated to include the filter term in the query.

While a checkbox control is selected (checked), selection of another checkbox control corresponding to a second filter term adds that filter term to the current selection. Selection of the additional checkbox control causes the additional checkbox control to be presented as a checked checkbox control, and causes only those items which satisfy each of the filter terms corresponding to checked checkbox controls to be presented on the display. Referring to FIG. 143, selection of the checkbox control corresponding to the filter term "Excel Worksheet" when the checkbox control corresponding to the filter term "PDF document" has already been selected causes the display to be updated to include those items that satisfy the query in the address bar and which satisfy either the filter term "Excel Worksheet" or "PDF document." Thus, according to this aspect of the invention, when multiple checkbox controls each corresponding to a respective filter term are selected from a single arrange and filter drop down menu then a logical OR operation is performed. As discussed, selecting an <enter> command or otherwise issuing a command outside the arrange and filter drop down menu (causes the arrange and filter drop down menu to close and applies the currently selected filters. In these instances, the query shown in the address bar is updated to include a single filter including the logical OR combination of the filter terms. For the example discussed, the filter added to the next segment in the address bar may be "Excel Worksheet, PDF document".

De-selection of a checkbox control causes the checkbox control to be presented as unchecked, and causes those items which satisfy filter terms corresponding to the remaining checked checkbox controls to be presented on the display. When checkbox controls are selected (checked) in the arrange and filter drop down menu, each selected check box may be unchecked by selecting the command "Don't filter by <PROPERTY NAME>" in the arrangement portion of the arrange and filter drop down menu. Referring to FIG. 143, the arrangement portion 14330 of the arrange and filter drop down menu includes the command "Don't filter by Type," selection of which will cause the selected checkbox controls in the filter portion 14335 to be deselected and unchecked. When there are no selected (checked) checkbox controls in the filter portion, the "Don't filter by <PROPERTY>" command is disabled and appears grayed out or faded as represented in the arrangement portion 14130 in FIGS. 141C and 142B.

When a user closes the arrange and filter drop down menu corresponding to a first property when at least one checkbox control is selected, the first property control may provide an indicator that the view of display objects on the display has been filtered. Referring to FIG. 142C, a symbol 14250 appears in the property control corresponding to the property "Type" to indicate that the view of display objects has been filtered by the property "Type".

When a user closes the arrange and filter drop down menu corresponding to a first property when at least one checkbox control is selected corresponding to a respective filter term by selecting a second property control from the property header, an arrange and filter drop down menu corresponding to the second property control is provided. In this instance, the set of filter terms in the arrange and filter drop down menu is the subset of possible filter terms for which at least one item in the view satisfies the filter term for the second property control as well as the filter for the first property control. Also, the set of filter terms may include any filter that was already selected from the arrange and filter drop down menu associated with the first property control. For example, if a user were to select the checkbox control for the filter term "PowerPoint" from the arrange and filter drop down menu associated with the first property control "Type" and then select the second property control for the second property "Author" causing the arrange and filter drop down menu for "Author" to appear, the filter terms "Hamlet" and "Horatio" would both appear if "Hamlet" and "Horatio" each were an author on one or more "PowerPoint" files. However, if "Horatio" did not author any "PowerPoint" files, then "Horatio" would not appear in the arrange and filter drop down menu. If both "Horatio and "Hamlet were proper filter terms the if the checkbox control for each were then selected, the view would be updated with items that satisfied the logical operation: Type=PowerPoint AND (Author=Hamlet OR Author=Horatio). If the <enter> command were selected, the aforesaid logical operation would be applied and the address bar would be modified to include the segment "PowerPoint" followed by the segment "Hamlet, Horatio" and the view would be updated to reflect the items which satisfy the query. Generally speaking, values from different properties are combined with a logical AND operation when added to the query in the address bar.

According to another aspect, if all the property columns in the property header cannot be seen, then the columns that do not fit on the property header are truncated and may be accessed through an overflow control such as a chevron, as is common with toolbars. Selecting the chevron button displays a menu providing the truncated property controls. FIG. 143 provides an example of an arrange and filter drop down menu being activated from an overflow property control. Specifically, FIG. 143 depicts the right edge of the property header where a chevron 14350 represents that additional properties are accessible. Selection of the chevron 14350 results in the presentation of two additional property controls corresponding to the properties "Author" and "Type". The cursor is positioned over the "Type" property control and the control corresponding to the arrange and filter drop down menu is selected presenting the arrange and filter drop down menu including an arrangement portion 14330 and a filter portion 14335.

The arrangement commands present in the arrange and filter drop down menu include "Stack by <PROPERTY>" and "Group by <PROPERTY>" as well as the "Don't Filter by <PROPERTY>" command discussed above. In the examples of the arrange and filter drop menus shown in FIGS. 141C, 142B and 143, the property is "Type." Hence, the arrangement commands includes "Stack by Type" and "Group by Type."

When items in view are not stacked by the property associated with arrange and filter drop down menu, the "Stack by <PROPERTY>" command is enabled. Selection of the "Stack by <PROPERTY> command causes stacks of items to be created in the view according to the categorization applied to generate the filter terms. Thus, with respect to the property "Type", stacks may include "Microsoft Word Documents," "PowerPoint," "Excel Worksheet," and other filter terms included in the list of filter terms in the filter portion 14135 of the arrange and filter drop down menu. Illustrative stacks may take on an appearance similar to, for example, items 651-655 shown and described above in FIG. 10.

Also, a "Stop Stacking by <PROPERTY> command may be available when items are stacked by the property of the currently activated property control. Selection of this command causes stacking by the current property to be stopped.

When items in view are not grouped by the property associated with arrange and filter drop down menu, the "Group by <PROPERTY>" command is enabled. Selection of the "Group by <PROPERTY> command causes groups of items to be created in the view according to the categorization applied to generate the filter terms. The appearance of items grouped may be similar to grouping in the Windows XP Brand operating system. Also, a "Stop Grouping by <PROPERTY> command may be available when items are grouped by the property of the currently activated property control. Selection of this command causes grouping by the current property to be stopped.

FIGS. 41-50 and FIGS. 134-135 are diagrams related to a virtual address bar that corresponds to the information line 641 of FIG. 10 and which is formed in accordance with the present invention. As will be described in more detail below, the virtual address bar comprises a plurality of segments, and each segment corresponds to a filter for selecting content. Collectively, the corresponding filters of each segment represent a virtual address for selecting content.

Figure 41:
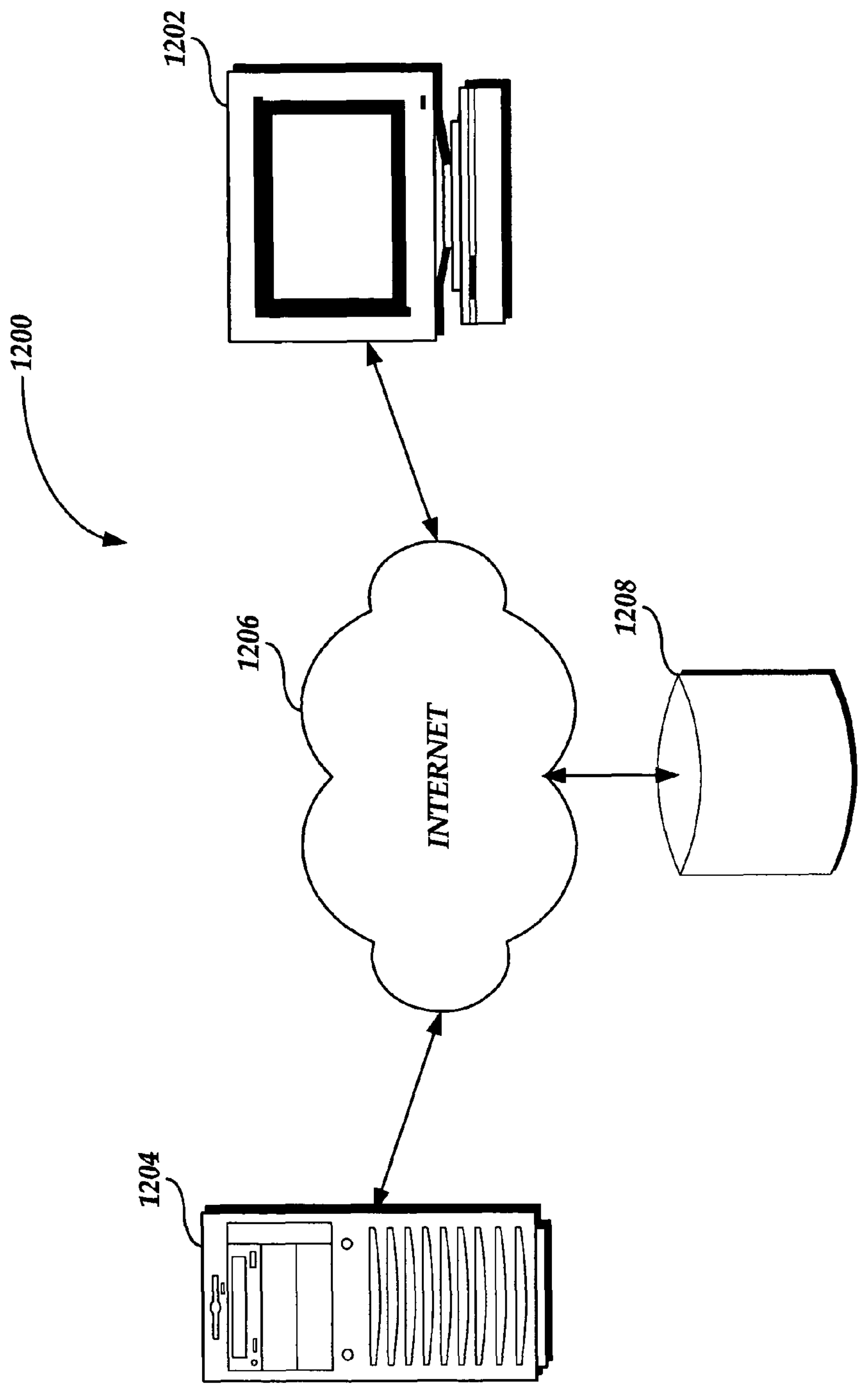
FIG. 41 is a pictorial diagram of an exemplary networked computer environment suitable for implementing the present invention.

FIG. 41 is a block diagram of an exemplary networked computing environment 1200 suitable for operating the present invention. The exemplary networked computing environment 1200 includes a computing device, such as the personal computer 1202 described in regard to FIG. 1, for interacting with a user, and upon which the user may view files stored either locally or remotely to the computing device. While the following discussion describes the present invention in relation to a personal computer, it should be understood that the computing device 1202 includes many types of physical devices including, but not limited to mini- and mainframe computers, PDAs, tablet computers, and other devices capable of interacting with a user and displaying files and content stored on the computing device and elsewhere.

The exemplary networked computing environment 1200 may also include one or more remote servers, such as server 1204 that stores files accessible to the computing device 1202, and connected to the computing device via a communications network, such as the Internet 1206, as shown in FIG. 41. In addition, the computing device 1202 may also be connected to other information sources storing files or other content, such as a remote database 1208. Those skilled in the art will recognize that files and information stored on both the remote server 204 and the remote database 1208, as well as on local storage devices such as hard disk drive 166 (FIG. 1), may be accessible to, and displayable on, the computing device 1202 as part of an integrated file system on the computing device. Additionally, while a particular configuration of a remote server 1204 and remote database 1208 is presented in FIG. 41 those skilled in the art will readily recognize that this particular configuration is for illustrative purposes only, and should not be construed as limiting upon the present invention.

Figure 42:
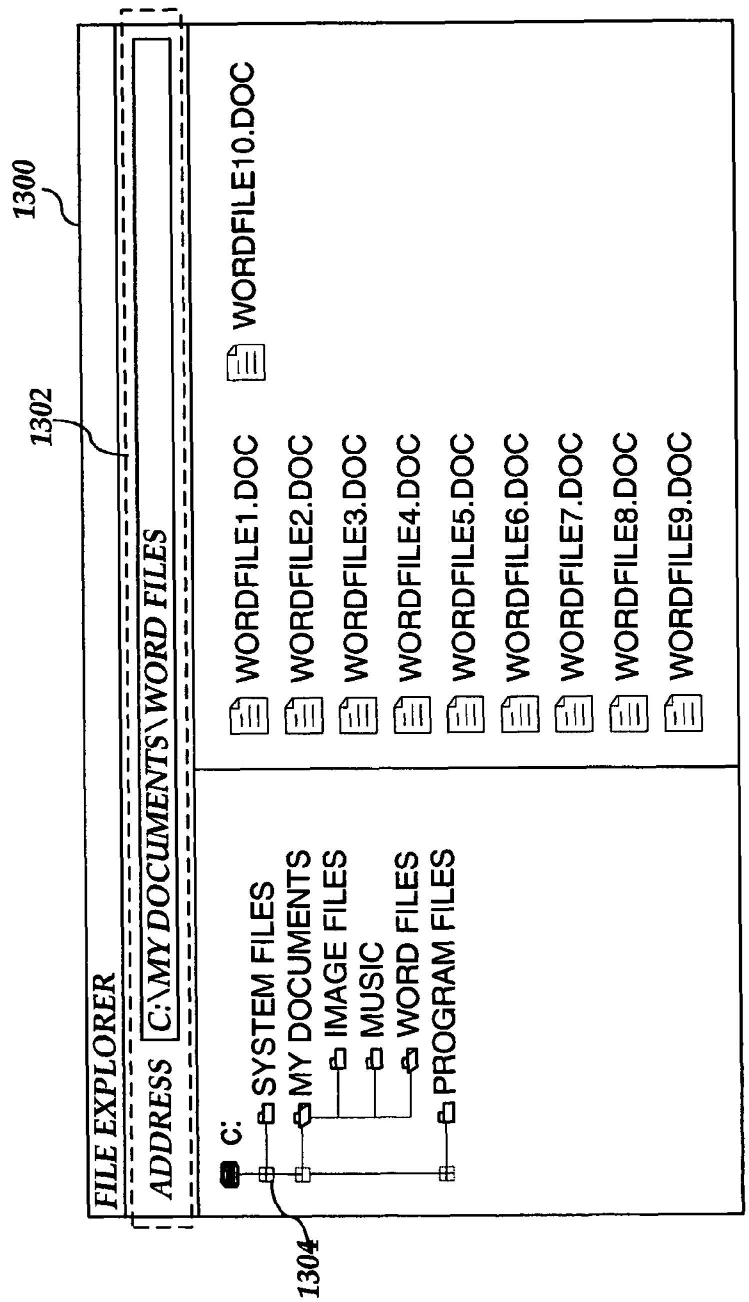
FIG. 42 is a pictorial diagram illustrating an exemplary file viewer having a conventional address bar associated with displaying files in a computer file system, as found in the prior art.

FIG. 42 illustrates an exemplary file viewer 1300 having a conventional address bar 1302 associated with displaying files in a computer file system, as found in the prior art. For purposes of the present discussion, a file viewer is a view or window on a display device, such as display device 158 (FIG. 1), for displaying files or other content to a user. A file viewer may be a window corresponding to an executable program specifically for displaying files to a user. Alternatively, a file viewer may be a view within an open or closed dialog box on an executable program that must save or retrieve data from a storage device connected locally or remotely to the computer system. It should be noted that the above examples of a file viewer are illustrative, and should not be construed as limiting upon the present invention.

An address in the conventional address bar 1302 corresponds to a specific location in a file system. As previously described, in order to edit the address displayed in the conventional address bar 1302, a user must modify the address according to specific knowledge of the file system. Alternatively, a user may select an entry in a tree view 1304 to navigate to an alternative location. Those skilled in the art will recognize that other controls external to the address bar 1302 may also be available that are not shown in the exemplary file view 1300. While the address displayed in the conventional address bar 1302 corresponds to a specific location in a file system, related files distributed among multiple folders in the file system cannot be displayed in conjunction with the conventional address bar 1302.

Figure 43:
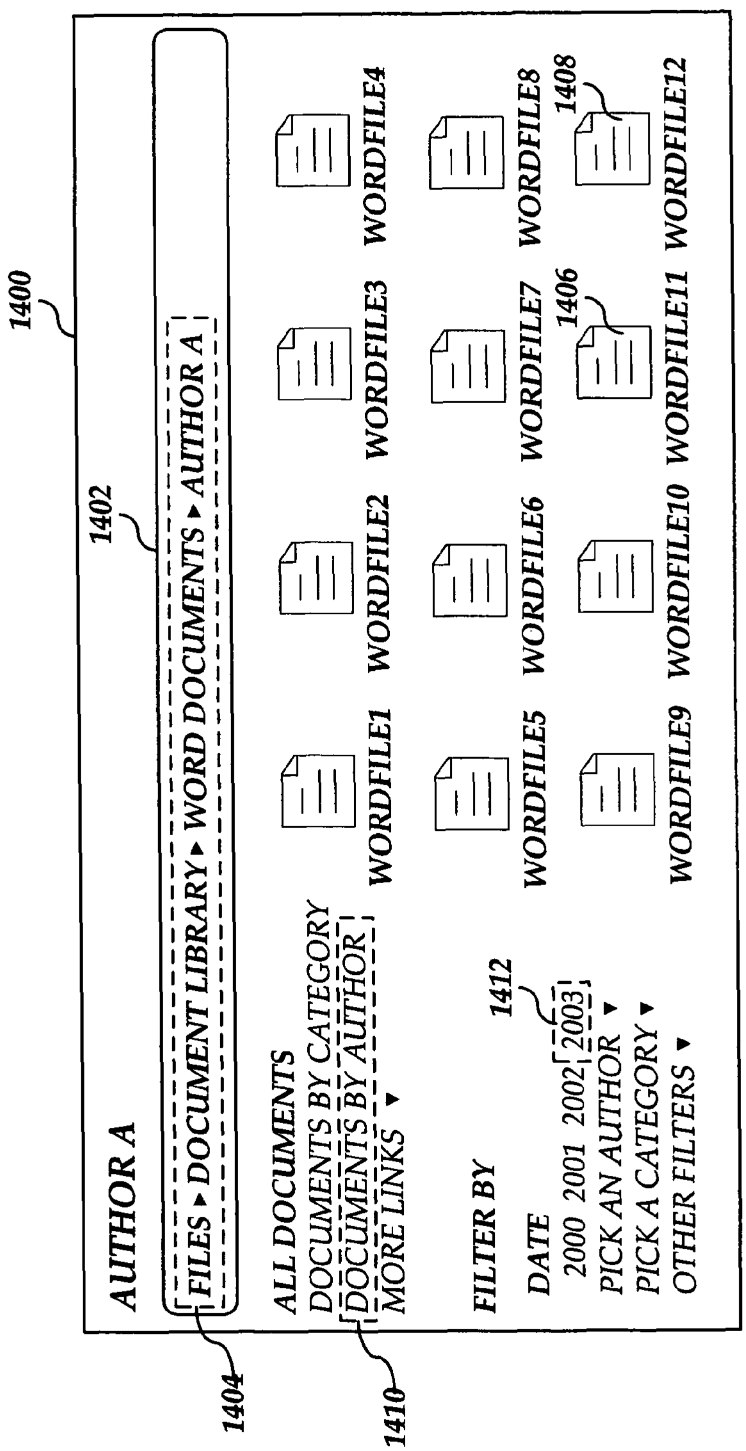
FIG. 43 is a pictorial diagram illustrating an exemplary file viewer for displaying files in a computer file system in accordance with a virtual address in a virtual address bar formed in accordance with the present invention.

FIG. 43 illustrates an exemplary file viewer 1400 having a virtual address bar 1402 associated with displaying files in a computer file system. The virtual address bar 1402, having a virtual address 1404, is configured to display similar information to that displayed by the conventional address 1304 of the prior art file viewer 1300 of FIG. 42. A virtual address, also referred to as a virtual path, references files stored in a computer file system according to selection criteria.

Similar to a conventional address, such as address 1304 of FIG. 42, the virtual address's selection criteria may reference files stored in a specific location in the file system hierarchy. However, in contrast to a conventional address, the virtual address's selection criteria may also reference files irrespective of their specific file system location. Thus, a virtual address may reference files stored in multiple locations in a computer file system including physical and virtual locations. As shown in FIG. 43, the file viewer 1400, according to the virtual address 1404 in the virtual address bar 1402, is able to display additional files, such as files 1406 and 1408, not found in the file viewer 1300 of FIG. 41. Additionally, the virtual address bar 1402 may also be utilized to display content other than files in a computer file system. For example, the virtual address bar 1402 may be used to reference content including system devices, system services, or Internet locations.

Figure 44A:
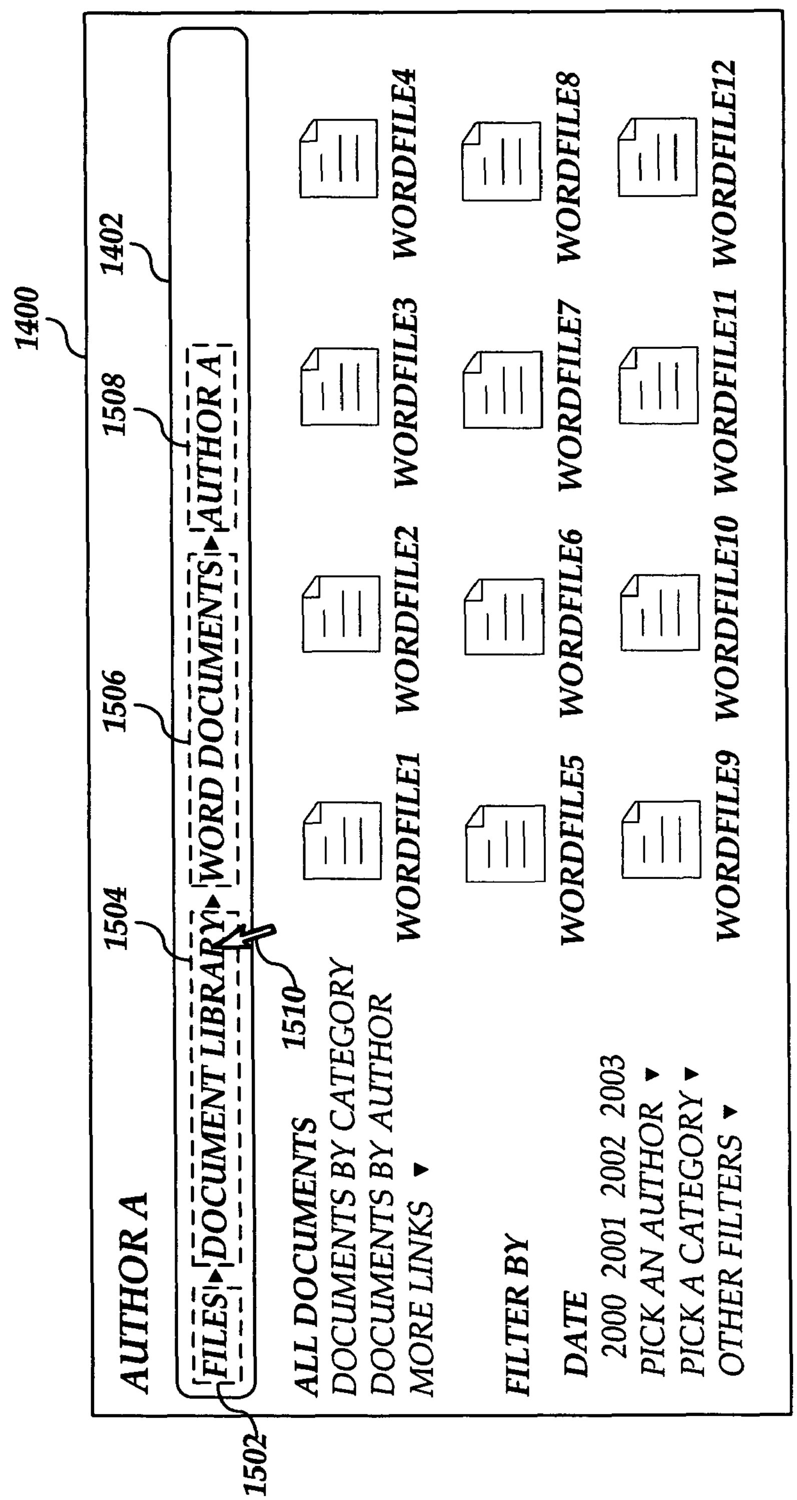
FIG. 44A is a pictorial diagram of the exemplary file viewer of FIG. 5 illustrating selecting a segment of the virtual address in the virtual address bar to navigate in the file system.

FIG. 44A illustrates manipulating a segment of the virtual address 1404 in the virtual address bar 1402 in order to navigate in a computer file system. Each virtual address bar, such as virtual address bar 1402, is comprised of one or more interactive segments, such as segments 1502, 1504, 1506, and 1508. Each segment in a virtual address bar may correspond to one or more predetermined filters, or selection criteria, on all of the available content or files accessible to a computer file system. Collectively, the filters of all of the segments in a virtual address bar 1402 represent the virtual address bar's virtual address.

The first segment in a virtual address bar, such as segment 1502, is referred to as a root segment, or root filter. The root segment represents the broadest category of content available for selection by the virtual address bar 1402. For example, segment 1502 "Files" would likely represent a filter that references all files accessible to the computer file system. Alternatively, a root segment may represent a filter that references all system services available to the user on the computer system, or a filter that references all hardware devices installed in the computer system. Those skilled in the art will recognize that numerous other alternative root filters may be utilized by the present invention. Thus, the above described examples are given for illustrative purposes, and should not be construed as limiting upon the present invention. Additionally, the labels displayed for each segment, such as "Files" on the root segment 1502, are illustrative and should not be construed as limiting upon the present invention. According to one illustrative embodiment, a label displayed on a segment is user configurable.

Each additional segment in a virtual address bar 1402, such as segments 1504, 1506, and 1508, represent additional filters to be applied when selecting and displaying files or content in a file viewer 1400. For example, root segment 1502 "Files" references all files available to the computer system. Segment 1504 "Document Library" filters the files selected by the root segment 1502, by selecting those files that were generated as documents by the user, such as through a word processor, spreadsheet, or some other document generating application. Segment 1506 "Word Documents" filters the files selected by segment 1504 according to those documents that were generated using a word processor, such as Microsoft Corporation's Word application. Finally, segment 1508 "Author A" filters the word processing documents selected by segment 1506 according to whether they were authored by "Author A." Thus, content selected according to the virtual address represented in the virtual address bar 1402 must satisfy the filters corresponding to all of the segments in the virtual address bar.

Segments in the virtual address bar 1402 are generally ordered from those filters that are most inclusive, to those filters that are least inclusive. For example, as previously discussed, segment 1502 "Files" is the broadest and most inclusive. Segments 1506 "Word Documents" and segment 1508 "Author A" are less inclusive. The virtual address bar 1402 illustrates the ordering of segments from left to right, and, for purposes of the present discussion, segments 1504, 1506, and 1508 are subsequent to the root segment 1502. However, it should be understood that other orientations are possible, such as a top-down arrangement, without departing from the scope of the invention. Thus, the orientation from left to right should be viewed as illustrative, and not construed as limiting on the present invention.

As previously mentioned, segments in a virtual address bar 1402, such as segments 1502, 1504, 1506, and 1508, do not necessarily correspond to specific locations in a computer file system, such as folders, drives, and directories. Thus, segment 1504 "Document Library" may reference files or content distributed on multiple servers, drives, or folders/directories. However, certain segments in a virtual address bar 1402 may reference specific locations with a computer file system hierarchy. A further discussion of virtual address segments referencing specific file system locations is given below in regard to FIGS. 48A and 48B.

In contrast to a conventional address bar, each segment in a virtual address bar 1402 represents an actionable, interactive user interface element. For example, a segment in a virtual address bar 1402 is responsive to user selection, monitors whether a cursor is located over the segment for a specific period of time, and may be removed from the virtual address bar by a dragging user interaction. Hence, as shown in FIG. 44A, a user may place a cursor 1510 over a segment in the virtual address bar 1402, such as segment 1504 "Document Library," to select, or click, on that segment in order to navigate to that level, i.e., truncate the virtual address at that segment, as described in regard to FIG. 44B.

Figure 44B:
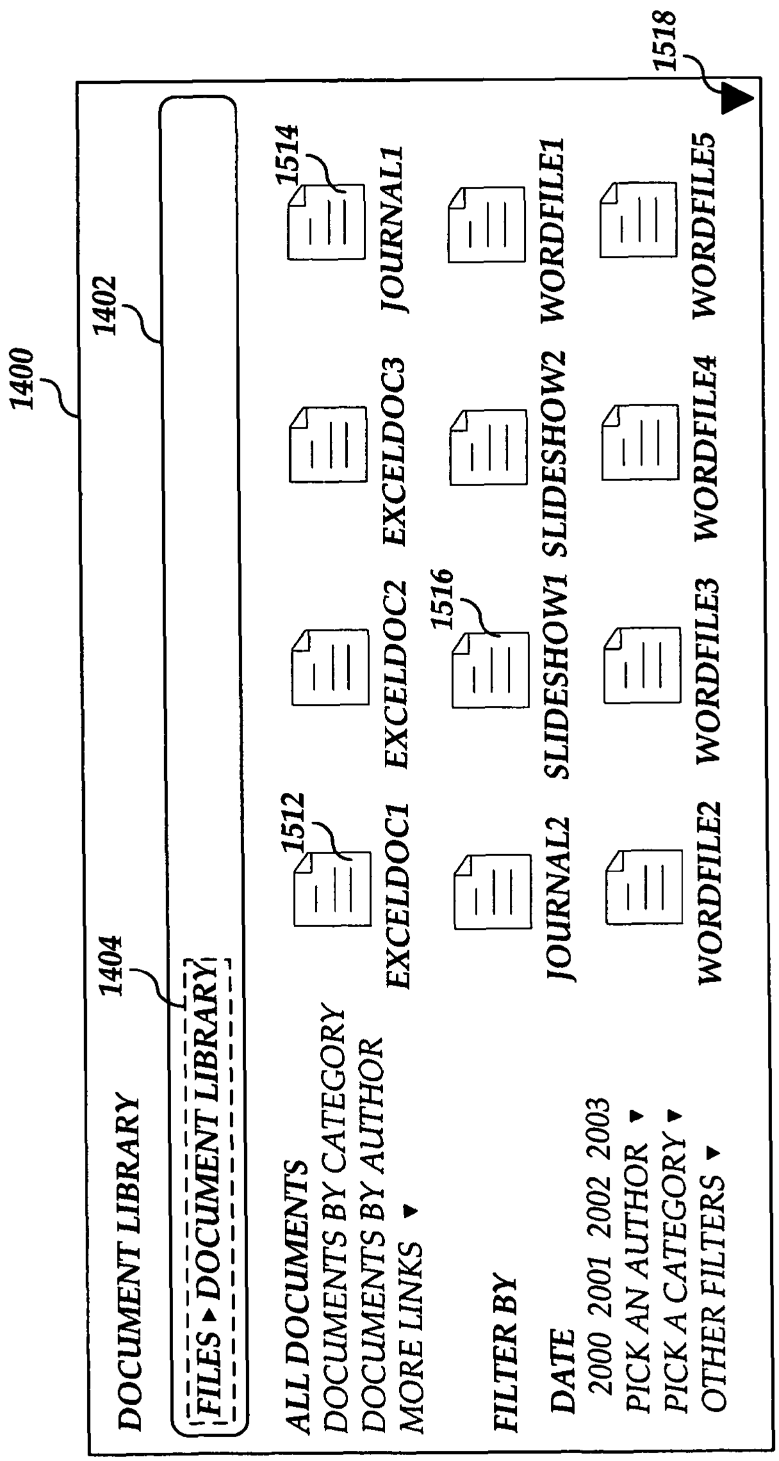
FIG. 44B is a pictorial diagram of the exemplary file viewer of FIG. 45A illustrating the results of selecting a segment of the virtual address in the virtual address bar.

FIG. 44B illustrates the results of selecting a segment 1504 in the virtual address bar 1402. By clicking on the segment 504 in the virtual address bar 1402, the user is indicating a desire to navigate to that level in the virtual address. In effect, the user is trimming off those filters subsequent to the selected segment. For example, by clicking on segment 1504 "Document Library" (FIG. 44A), the resulting virtual address 1404 no longer contains segments 1506 "Word Documents" and 1508 "Author A" (FIG. 44A). Additionally, because the user has navigated to a less restrictive set of filters, the resulting virtual address 1404 in the virtual address bar 1402 is more inclusive. This is indicated by the addition of documents in the file viewer 1400 of FIG. 44B not previously found in the file viewer 1400 of FIG. 44A, including document 1512, document 1514, and document 1516, and by the presence of a scroll button 1518 indicating that additional files may be viewed that cannot be displayed in the file viewer 1400 (FIG. 44B) due to space limitations.

Figure 44C:
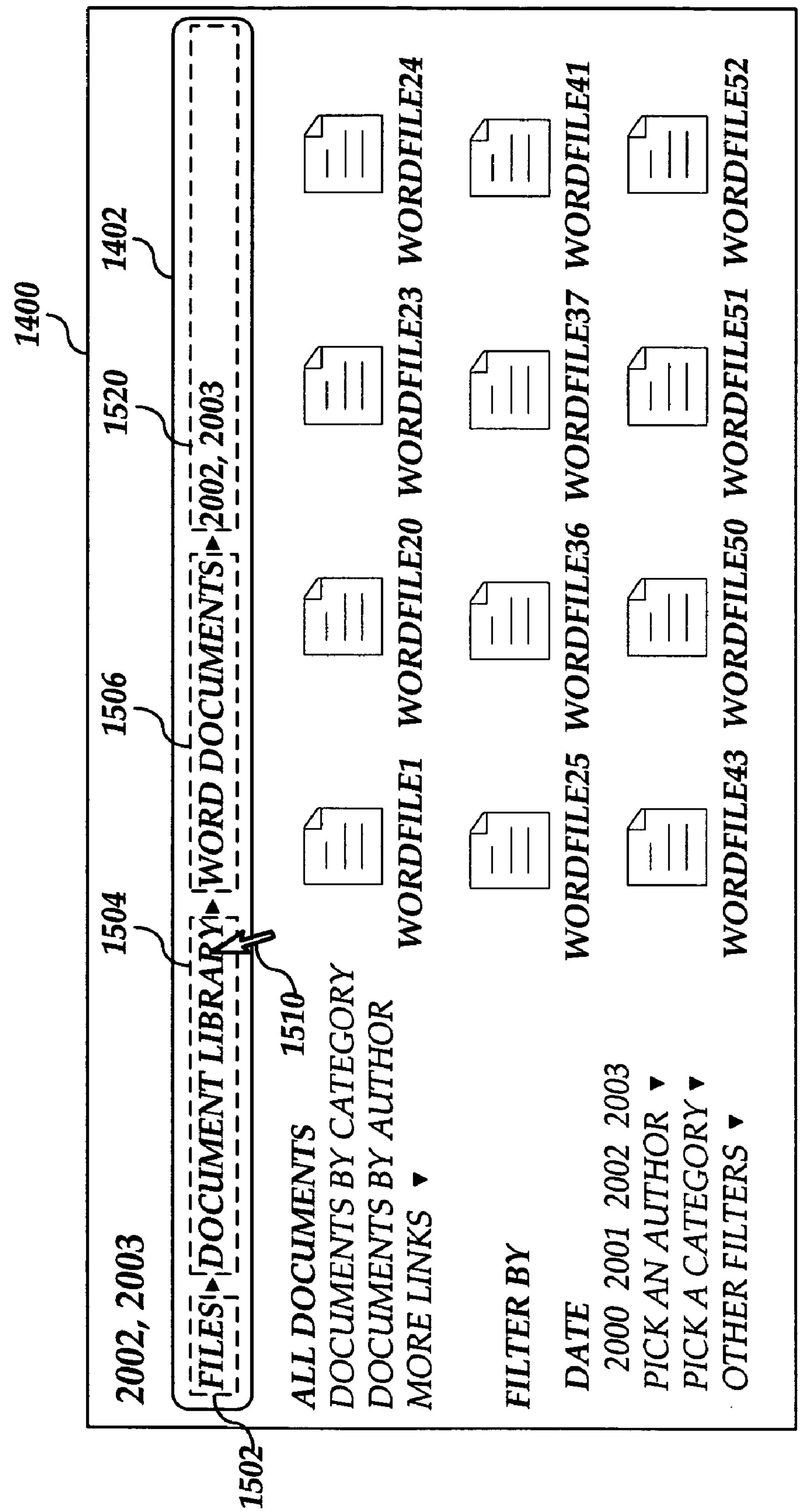
FIG. 44C is a pictorial diagram illustrating an exemplary file viewer for displaying files in a computer file system in which a segment of the virtual address includes more than one filter.

FIG. 44C is similar to FIG. 44A, but replaces segment 1508 with segment 1520. Segment 1520 includes two filters or selection criteria, "2002" and "2003", which are logically combined to produce the results displayed in the file viewer 1400. The "," between the two filters or selection criteria serves as a logical operand. It will be understood that Boolean operators such as AND, OR, NOT, NAND, NOR, XOR, etc. may be applied. In the present implementation, the "," serves as an "OR" operator so items which satisfy all the preceding filters or selection criteria (Files, Document Library, Word Documents) and which either were created in "2002" or were created in "2003" satisfy the logical expression and are presented in the file viewer 1400. The two filters or selection criteria may identify items in virtual or physical locations. For example, one filter or selection criteria may identify items in a physical location, while the other may identify items in a virtual location. Any number of filters or selection criteria may be logically combined in a single segment, but for practical purposes, it would better to limit the number combined to a number which can be displayed together on the address bar to minimize user confusion. While logically combining filters or selection criteria across properties is within the scope of the invention, it would be preferable to logically combine filters or selection criteria within the same property for organizational purposes and to avoid potential user confusion.

It will be appreciated that a logical combination of filters or selection criteria may occur within one or more segments in the address bar. If a segment were added to succeed segment 1520 in FIG. 44C, for example with filter "Author A", then the items displayed in the file viewer would be further narrowed to word documents created in "2002" or in "2003", which were authored by A. Selecting the segment Document Library from FIG. 44C results in the file viewer 400 shown in FIG. 44B, in which the segments "Word Documents" and "2002, 2003" have been removed and the files which meet the filter "Document Library" are presented.

In addition to selecting segments in a virtual address bar to navigate to a less restrictive segment, a user may also wish to navigate to, or select peer filters of current segments in a virtual address. A peer filter is an alternative filter that may be selected and applied to a given segment in the virtual address bar. For example, with reference to FIG. 44A, peer filters for segment 1506 "Word Documents" may include filters such as "Excel Documents," "Journals," and the like. Other types of filters, including specific file system locations, hardware devices, or computer services, may also be applied to a given segment in the virtual address bar. Peer filters may or may not be logically related to a given segment's current filter. Each segment in a virtual address bar may have peer filters. Selecting a peer filter of a segment in a virtual address bar is sometimes referred to as navigating laterally. Selecting peer filters of segments in a virtual address bar is described below in regard to FIGS. 45A-45D, and also in regard to FIG. 49.

Figure 45A:
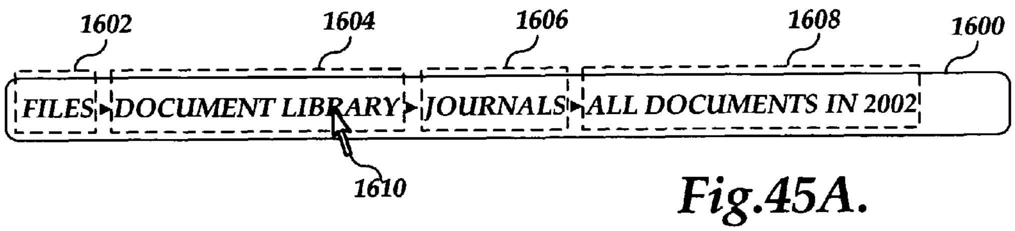
FIGS. 45A-45D are pictorial diagrams illustrating selecting a peer filter associated with a segment of a virtual address in a virtual address bar.

FIGS. 45A-45D are pictorial diagrams illustrating selecting a peer filter associated with a segment of virtual address in a virtual address bar 1600. As shown in FIG. 45A, virtual address bar 1600 has a virtual address comprising multiple segments, segments 1602-1608. In order to select a peer filter for a given interactive segment in a virtual address bar 1600, a user must make an alternative selection, or alternative manipulation, of that interactive segment. One way to make an alternative selection is to right click on a given segment. Right clicking is known in the art and refers to using a secondary button on a mouse, or other input device, where the secondary button is typically on the right-hand side of the mouse. Alternatively, because an interactive segment can monitor when a cursor is located over it, an alternative selection may be made by locating the cursor over an interactive segment and leaving the cursor in place for predetermined amount of time, sometimes referred to as hovering. However, while the present discussion describes alternatives for causing peer filters to be displayed, they are for illustration, and should not be construed as limiting upon the present invention. Those skilled in the art will recognize that there are numerous alternatives for generating an alternative selection.

Figure 45B:
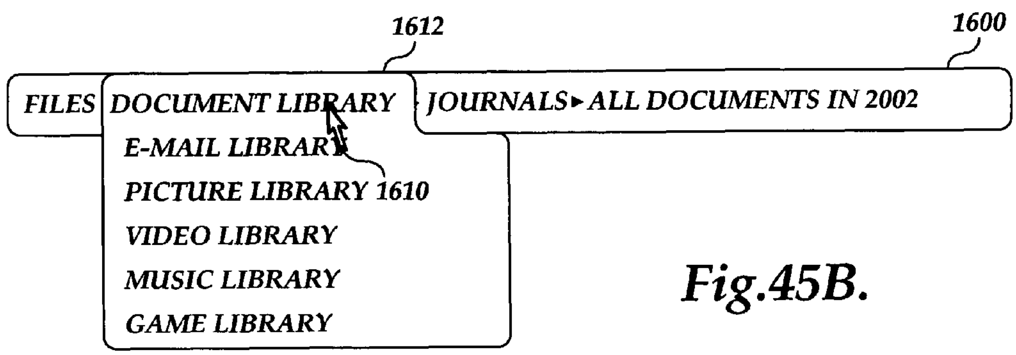

To illustrate alternatively selecting a segment, with reference to FIG. 45A, a user first places the cursor 1610 over segment 1604 "Document Library" for a predetermined amount of time, i.e., hovers over the segment, to select that segment. FIG. 45B demonstrates the results of alternatively selecting segment 1604 "Document Library" in the virtual address bar 1600. As shown in FIG. 45B, after alternatively selecting segment 1604 "Document Library," a peer filter view 1612 is displayed including peer filters corresponding to the selected segment. It should be understood that the peer filters presented in the peer filter view 1612 are for illustrative purposes only, and should not be construed as limiting upon the present invention.

Figure 45C:
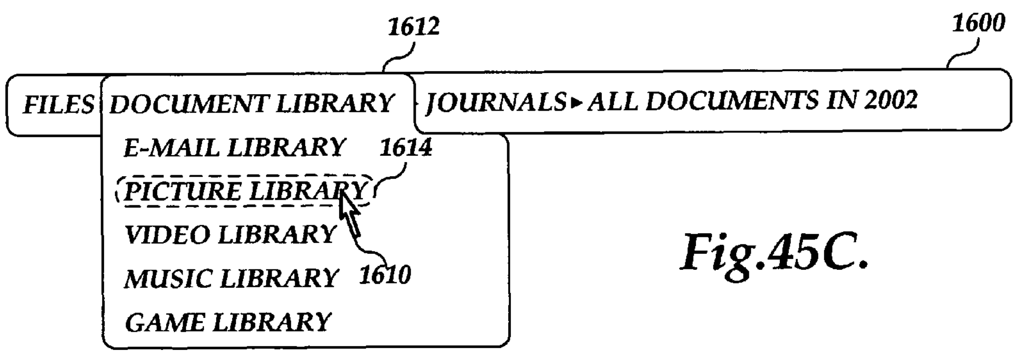
Figure 45D:
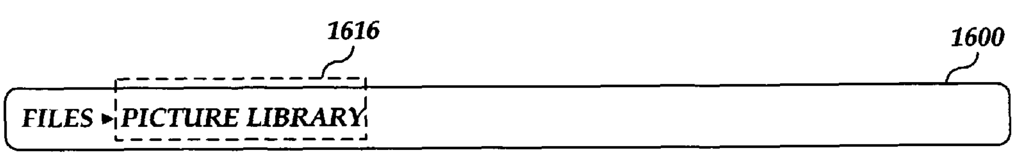

In order to select an alternative peer filter, as shown in FIG. 45C, the user positions the cursor 1610 over one of the filters presented in the peer filter view 1612, such as peer filter 1614, and selects the peer filter. As shown in FIG. 45D, after selecting the alternative peer filter 1614, the previously selected segment 1604 (FIG. 45A) is replaced with a new segment 1616 representing the selected alternative peer filter 1614. Additionally, those segments that followed the alternatively selected segment 1604 in the virtual address bar 1600 of FIG. 45A, specifically segments 1606 "Journals" and 1608 "All Documents in 2002", are removed from the virtual address bar 1600 in FIG. 45D. Although not shown, it follows that any files or content previously selected according to segments 1604 "Document Library", 1606 "Journals", and 1608 "All Documents In 2002" would no longer be displayed in a corresponding file viewer, and only those files or content selected according to segments 1602 "Files" and 1616 "Picture Library" would be displayed.

In accordance with another aspect of the invention, a user may also wish to navigate to, or select, child filters or selection criteria of current segments in a virtual address. In a file tree structure, a parent node (or parent filter) has children represented by child nodes. Each child node is a child filter or selection criteria and further restricts the parent node or parent filter or selection criteria. Each segment in a virtual address bar may have child filters or selection criteria. In FIG. 44A, segment 1504 is the child of segment 1502. Selecting child filters or selection criteria of segments in a virtual address bar is described below in regard to FIGS. 135A-135D, and also in regard to FIG. 134.

Figure 135A:
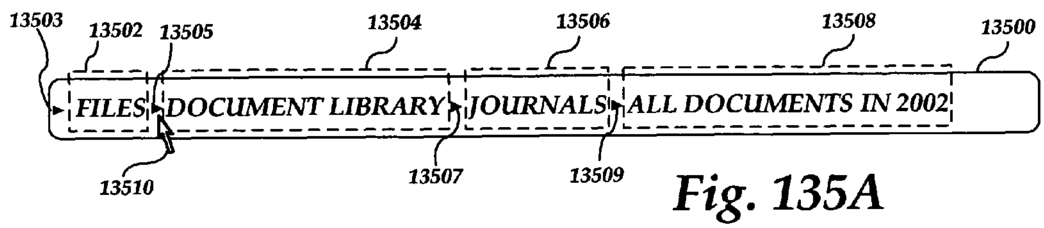

FIGS. 135A-135D are pictorial diagrams illustrating selecting a child filter or selection criteria associated with a segment of virtual address in a virtual address bar 13500. As shown in FIG. 135A, virtual address bar 13500 has a virtual address comprising multiple segments, segments 13502-13508. In order to select a child filter or selection criteria for a given interactive segment in a virtual address bar 13500, a user may select a child control associated with the given interactive segments. Child controls 13503, 13505, 13507 and 13509 are associated with interactive segments 13502, 13504, 13506 and 13508, respectively. It will be appreciated that each segment and its associated child control may form a split button.

Figure 135B:
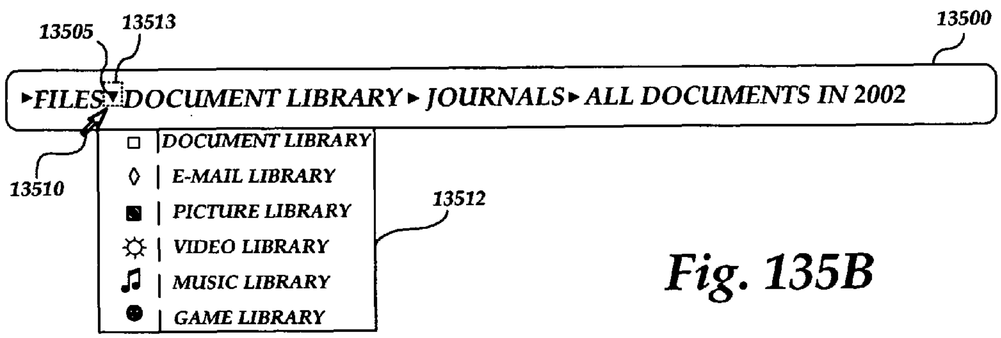

An example of selecting a child filter or selection criteria will be described in connection with FIGS. 135B-135D. To select a child filter or selection criteria, with reference to FIG. 135A, a user first places the cursor 13510 over the child control 13505 for a predetermined amount of time, i.e., hovers over the control, to select the child control. Other selection operations are possible as well such as selecting the control by performing a left click operation on the child control 13505. FIG. 135B demonstrates the results of selecting the child control 13505 associated with the segment "Files" in the virtual address bar 13500. As shown in FIG. 135B, after selecting the child control 1305, a child view 13512 is displayed including a list of child filters or selection criteria for the corresponding interactive segment 13502 and the corresponding icon for the child filter or selection criteria. The icon may identify a particular type for the child filter or selection criteria, such as whether it represents a virtual or physical location and the particular type of virtual or physical location. In this example of the child view, a split menu is shown with the icons in the left hand column and the child filters or selection criteria in the right hand column of the child view. It should be understood that the child filters or selection criteria presented in the child view 13512 and the icons are for illustrative purposes only, and should not be construed as limiting upon the present invention. Also, it should be appreciated that the icons may be displayed adjacent to any address type whether or not part of a child view, peer view or otherwise.

Figure 135C:
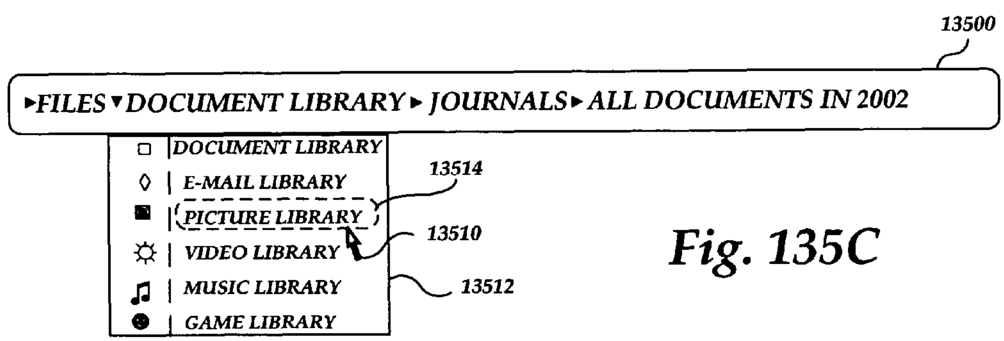
Figure 135D:
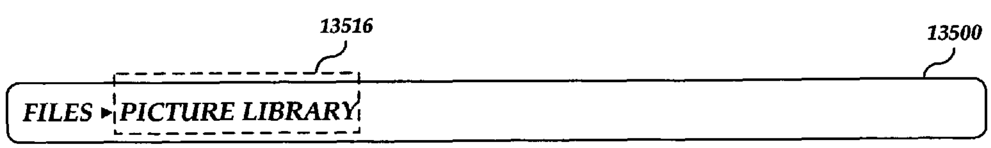

In order to select a child filter or selection criteria, as shown in FIG. 135C, the user positions the cursor 13510 over one of the child filters or selection criteria presented in the child view 13512, such as child filter or selection criteria 13514, and selects the child filter or selection criteria 13514. As shown in FIG. 135D, after selecting the child filter or selection criteria 13514, the segment 13504 succeeding the parent segment 13502 associated with the child control 13505 (FIG. 135A) is replaced with a new segment 13516 representing the selected child filter or selection criteria 13514. Additionally, those segments that followed the segment 13504 in the virtual address bar 13500 of FIG. 135A, specifically segments 13506 "Journals" and 13508 "All Documents in 2002", are removed from the virtual address bar 13500 in FIG. 135D. Although not shown, it follows that any files or content previously selected according to segments 13504 "Document Library", 13506 "Journals", and 13508 "All Documents In 2002" would no longer be displayed in a corresponding file viewer, and only those files or content selected according to segments 13502 "Files" and 13516 "Picture Library" would be displayed.

Segments may be added to a virtual address in a virtual address bar through various user interactions at the end of the existing segments. To add a filter to a virtual address in a virtual address bar, a user may manipulate an actionable control associated with a particular filter found on a window, or file viewer with the virtual address bar. For example, with reference to the file viewer 1400 of FIG. 43, a user may click on the actionable control 1412 "2003" to add a corresponding filter to the virtual address 1404 in the virtual address bar 1402. Alternatively (not shown), a user may manually enter in a known filter at the end of the virtual address by typing the filter's name. Numerous other ways of adding a filter to a virtual address exist, all of which are contemplated as falling within the scope of the present invention. Thus, it should be understood that the above examples are for illustration purposes, and should not be construed as limiting upon the present invention.

When a filter is added to a virtual address in a virtual address bar, a process is undertaken to ensure that the newly added filter does not conflict with any filters currently existing as part of the virtual address. If the newly added filter conflicts with an existing filter, the existing filter is removed. A newly added filter conflicts with an existing filter in a virtual address if the newly added filter varies from the breadth of the existing filter, being either more or less broad than the existing filter. Additionally, a newly added filter conflicts with an existing filter if the newly added filter is mutually exclusive to the existing filter. However, a newly added filter that is equivalent to an existing filter is not added because it has no effect. It should be understood that the above description of conflicts is given for illustration purposes, and should not be construed as limiting upon the present invention. Those skilled in the art will recognize that other conflicts between filters may exist that are contemplated as falling within the scope of the present invention.

Figure 46A:
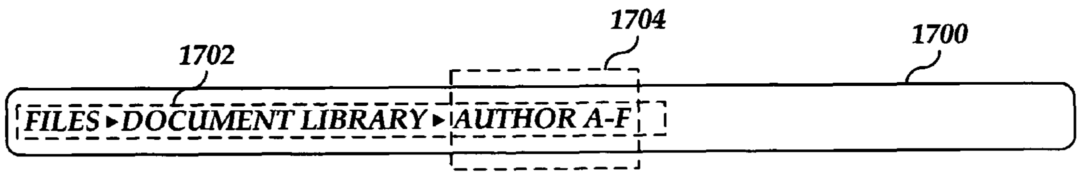
FIGS. 46A-46D are pictorial diagrams illustrating adding additional filters to a virtual address in a virtual address bar.
Figure 46B:
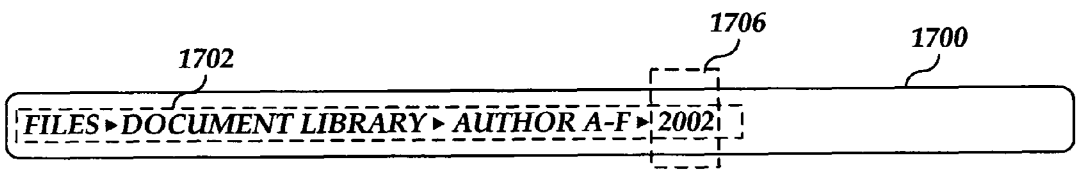

FIGS. 46A-46D are pictorial diagrams illustrating adding filters to a virtual address 1702 in a virtual address bar 1700, and removing conflicting existing filters. FIG. 46A illustrates an exemplary virtual address 1702 displayed in a virtual address bar 1700. As shown in FIG. 46B, a new filter, represented by segment 1706 "2002", is added to the virtual address 1702. As previously described, new filters are added to the end of the virtual address, as indicated by placing segment 1706 "2002" at the end of the segments in the virtual address bar 1700 of FIG. 46B. Thereafter, the process undertaken for adding segment 1706 "2002" determines that the added filter does not conflict with any current filters in the virtual address 1702. Thus, no existing filters are removed from the virtual address 1702.

Figure 46C:
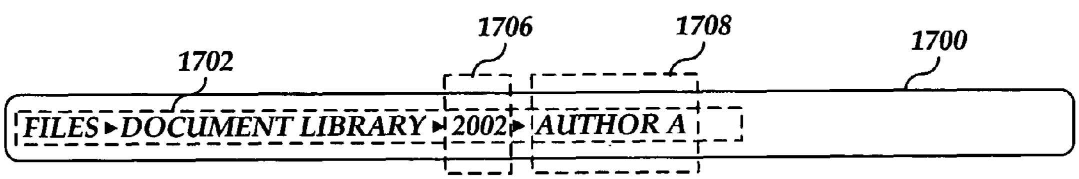

As shown in FIG. 46C, another filter is added to the virtual address 1702, represented by segment 1708 "Author A." The process undertaken for adding this new filter determines that the new filter, "Author A," would conflict with the filter represented by segment 1704 "Author A-F" because the new filter, "Author A," is narrower than the existing filter. Accordingly, segment 1704 "Author A-F" is removed from the virtual address bar 1700, and segment 1708 "Author A" is added to the end of the segments in the virtual address bar.

Figure 46D:
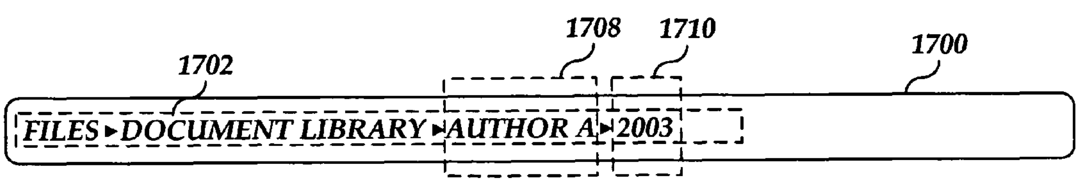

FIG. 46D illustrates the results of adding segment 1710 "2003" to the virtual address bar 1700 of FIG. 46C. Filters in a virtual address 1702 are restrictive, not cumulative. Each filter further restricts the selected content. Thus, mutually exclusive filters would prevent the virtual address 1702 from selecting any files or content, and therefore, create a conflict. As illustrated in FIG. 46D, segment 1706 "2002" (FIG. 46C) is removed from the virtual address bar 1700 because of a conflict as it is mutually exclusive with the newly added segment 1710 "2003."

Figure 47A:
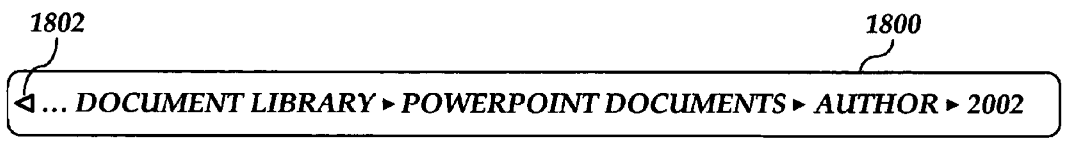
FIGS. 47A and 47B are pictorial diagrams illustrating an exemplary virtual address bar displaying a virtual address where the virtual address exceeds the virtual address bar's display capacity.
Figure 47B:
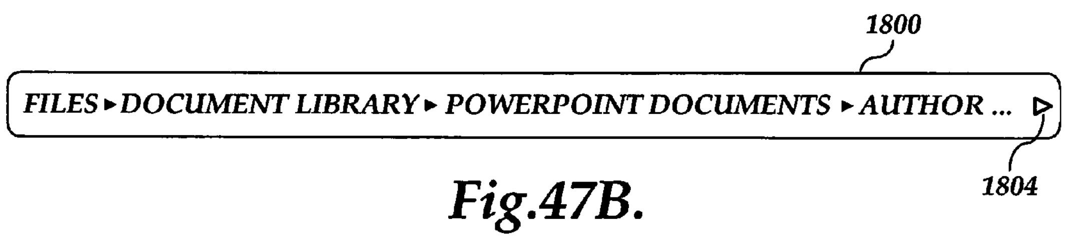

When a virtual address bar, such as virtual address bar 1800 (FIG. 47A), cannot completely display the virtual address due to size limitations of the virtual address bar, a portion of the virtual address is displayed according to the size of the virtual address bar. However, the undisplayed portions of the virtual address may still be accessed by the user. More specifically, the virtual address bar displays actionable visual indicators to scroll the virtual path within the virtual address bar. FIGS. 47A and 47B illustrate an exemplary virtual address bar 1800 displaying a virtual address where the virtual address exceeds the virtual address bar's display capacity. As shown in FIGS. 47A and 47B, scroll icons 1802 and 1804 indicate the direction the virtual address bar 1800 may scroll in order to display the previously undisplayed portions of the virtual address. However, while the illustrative diagrams demonstrate the use of scroll icons, it is for illustrative purposes only, and should not be construed as limiting on the present invention. Those skilled in the art will recognize that there are numerous other ways of scrolling the virtual address in a virtual address bar, all of which are contemplated as falling within the scope of the present invention.

Figure 47C:
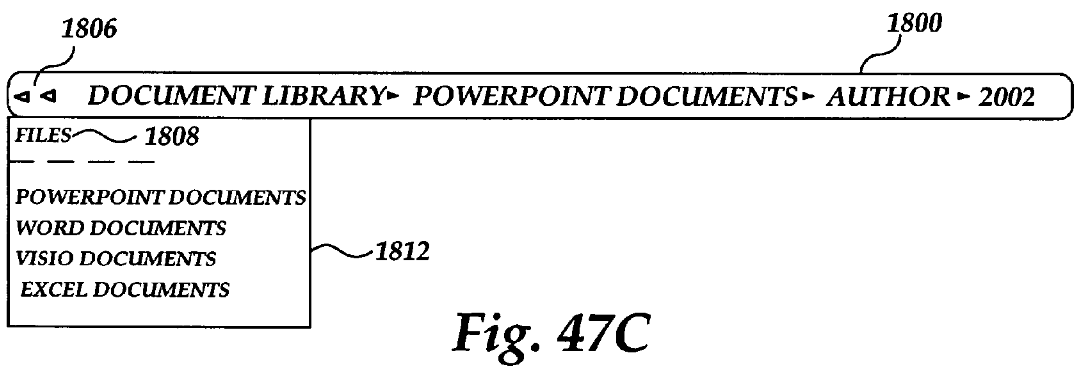
FIG. 47C is a pictorial diagram illustrating an exemplary virtual address bar displaying a virtual address in an overflow condition according to one aspect of the present invention.

According to another aspect, if an overflow condition occurs such that the address bar is too small to fit all the interactive segments that comprise the address, the interactive segments displayed are the most specific. For instance with reference to FIG. 47C, the broader interactive segment FILES is not included while the most specific interactive segments are displayed on the virtual address bar 1800. The chevron 1806 serves as an overflow indicator to indicate that the adjacent interactive segment DOCUMENT LIBRARY has ancestors that are not displayed. The chevron 1806 has dual roles in that it also serves as a child control as well as an overflow indicator. As shown in FIG. 47C, the selection of the chevron 1806 provides the child filter or selection criteria list 1812 including filters POWERPOINT DOCUMENTS, WORD DOCUMENTS, VISIO DOCUMENTS and EXCEL DOCUMENTS for the interactive segment DOCUMENT LIBRARY and also displays an ancestor list 1808 for the interactive segment DOCUMENT LIBRARY including the ancestor FILES. Selection of an ancestor filter or child filter from the ancestor or child filter lists results in the address bar being modified to display that filter and remove all subsequent filters. It will be appreciated that the chevron 1806 could serve as a control for displaying an ancestor list and an independent child control may exist.

Figure 48A:
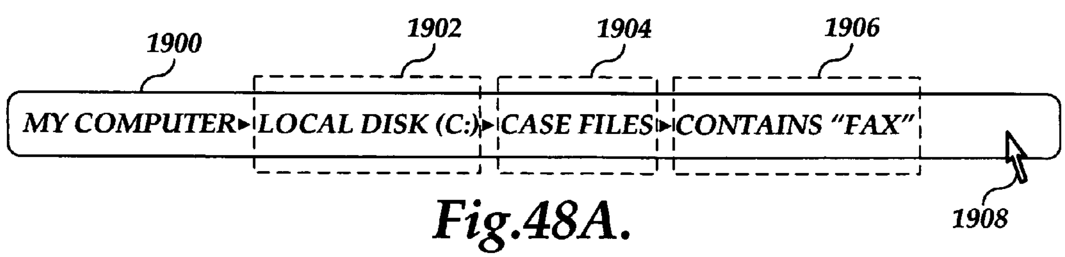
FIG. 48A is a pictorial diagram illustrating an exemplary virtual address bar having a virtual address with filters referencing both virtual and actual locations in a file system.

FIG. 48A is a block diagram illustrating a virtual address bar 1900 having segments referencing both virtual and actual locations in a file system. As previously discussed, a virtual address in a virtual address bar 1900 may contain segments referencing specific locations within a computer file system hierarchy, and also contain segments referencing virtual, or logical, locations within a computer file system. Files or content referenced by a virtual segment may be distributed among many physical locations. A virtual address bar 1900 may contain segments referencing physical locations and segments referencing virtual locations. For example, virtual address bar 1900 includes segment 1902 "Local Disk (C:)" referring to files or content contained in a specific area in the computer file system, in particular drive "C." Alternatively, segment 1904 "Case Files" of itself refers to files or content stored in multiple folders in the computer file system hierarchy associated with case files. However, in combination with segment 1902 "Local Disk (C:)", segment 1904 "Case Files" references only those case files found on local drive "C." Additionally, segment 1906 "Contains 'Fax'" further filters the files on local disk C: and associated with the case files according to whether they contain the word "Fax."

Figure 48B:
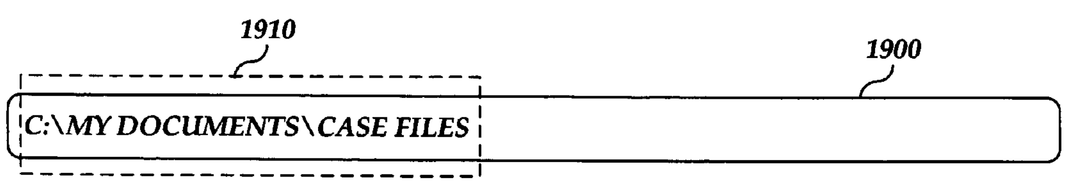
FIG. 48B is a pictorial diagram illustrating the exemplary virtual address bar of FIG. 48A as configured to display a conventional address bar.

As shown in FIG. 48B, a virtual address bar 1900 may be configured to function as a conventional address bar. For example, with reference to FIG. 48A, by placing a cursor 1908 in the empty space of the virtual address bar 1900 and clicking there, the virtual address bar 1900 switches from displaying segments representing a virtual address, to functioning as a conventional address bar displaying a conventional address 1910, as shown in FIG. 48B. The conventional address 1910 in the virtual address bar 1900 of FIG. 48B approximates the virtual address displayed in the virtual address bar 1900 of FIG. 48A. However, those filters in the virtual address bar 1900 of FIG. 48A that do not correspond to physical locations in a computer file system cannot be displayed and are removed from the conventional address 1910. Specifically, segment 1904 "Case Files" and segment 1906 "Contains 'Fax'" are not part of the conventional address 1910 (FIG. 48B).

In order to reconfigure a virtual address bar 1900, functioning as a conventional address bar, to function normally as a virtual address bar, the user must so indicate in a manner other than clicking on the empty area of the bar. When configured to function as a conventional address bar, a virtual address bar must permit the user to click in the empty area for address editing purposes. Clicking in the empty area of a conventional address bar places an editing cursor at the end of the address/path for editing purposes. Accordingly, to reconfigure the virtual address to again function in its normal manner as described above, a user must press a predefined key or key sequence, such as the Esc or Tab key, or by place the focus on another area of a window or view by clicking on another area of the window or view. Those skilled in the art will recognize that other user actions may also be utilized to reconfigure the virtual address bar 1900 to again function in its normal mode as described above, all of which are contemplated as falling within the scope of the present invention.

Figure 49:
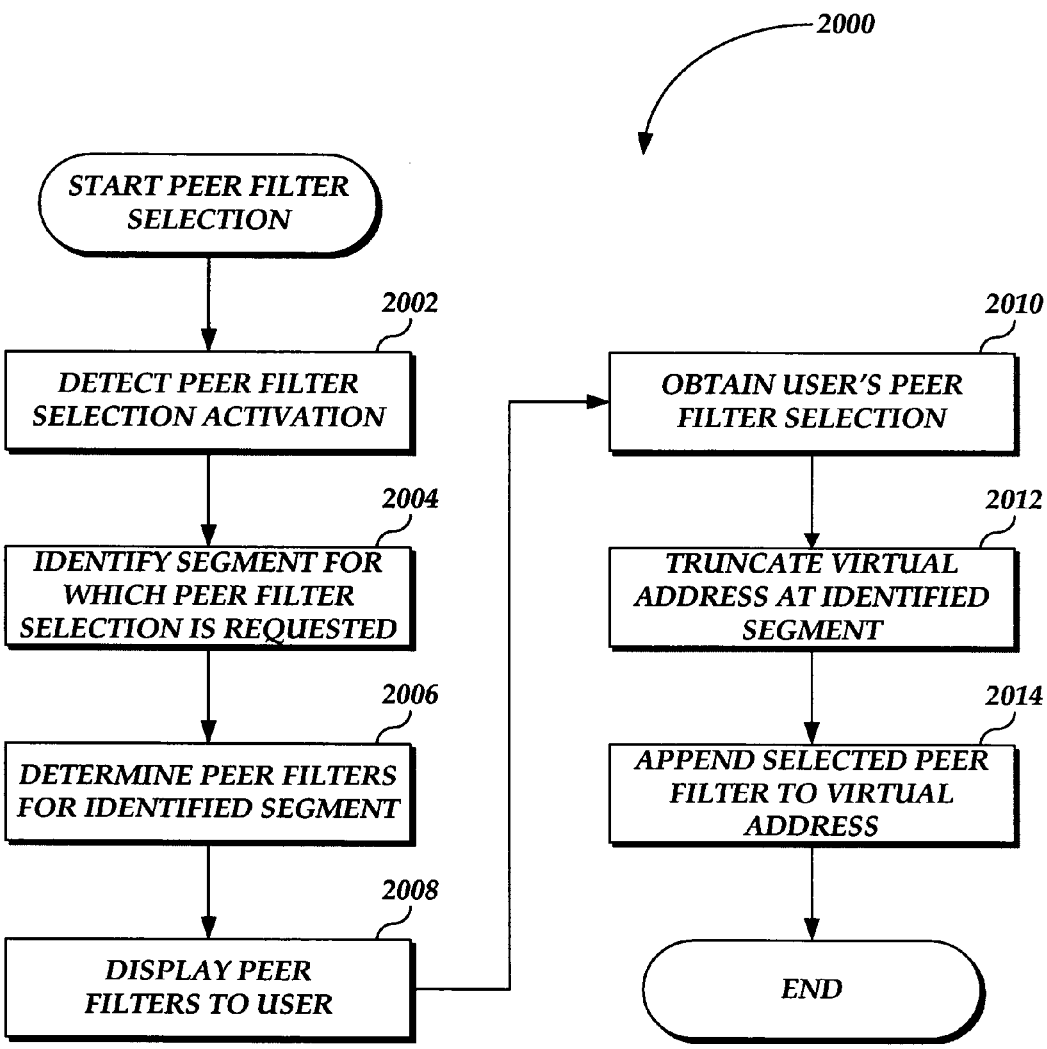
FIG. 49 is a flow diagram illustrative of an alternate filter selection routine for selecting alternate filters in a virtual address bar.

FIG. 49 is a flow diagram illustrative of a peer filter selection routine 2000 for selecting a peer filter for an identified segment in a virtual address bar. Beginning at block 2002, the routine 2000 detects a peer filter selection activation. Activating the peer filter selection process is described above in regard to FIGS. 45A-45D. At block 2004, the segment for which the peer filter selection has been requested is identified. At block 2006, the peer filters for the identified segment are determined from a predetermined list of peer filters. At block 2008, the peer filters are displayed to the user. At block 2010, the user's peer filter selection from peer filters displayed is obtained. At block 2012, the virtual address is truncated by removing the identified segment from the virtual address bar, and any additional segments that follow the identified segment. At block 2014, a segment representing the selected peer filter is appended to the remaining segments in the virtual address bar. Thereafter, the routine 2000 terminates.

Figure 50:
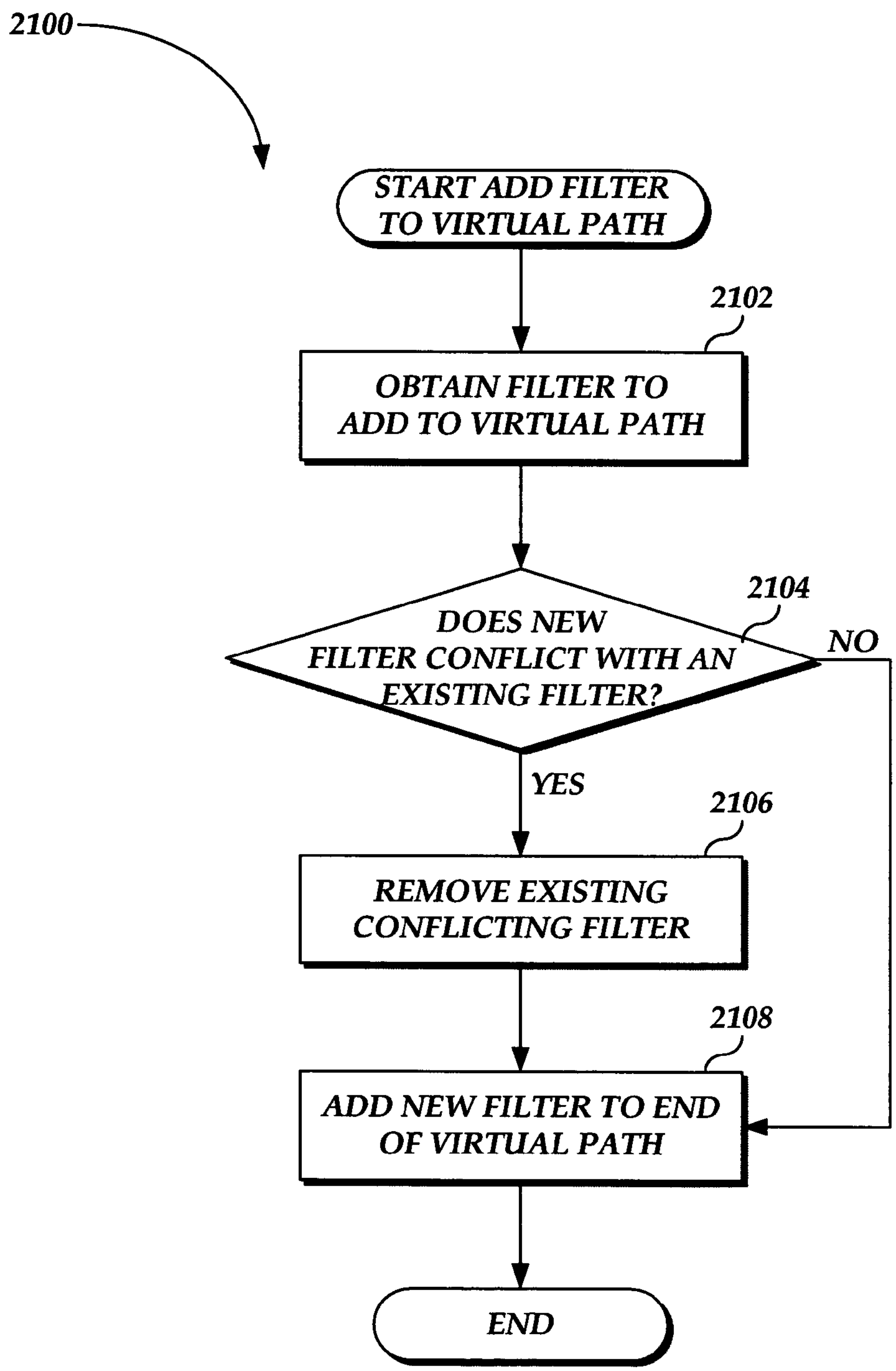
FIG. 50 is a flow diagram illustrating an exemplary add filter routine for adding a filter to a virtual address in a virtual address bar.

FIG. 50 is a flow diagram illustrating an exemplary add filter routine 2100 for adding a filter to a virtual address in a virtual address bar. Beginning at block 2102, the exemplary routine 2100 obtains the filter to be added to the virtual address. For example, as previously discussed in regard to FIG. 43, filters may be added to the virtual address according to user actions external to the virtual address bar, or alternatively, may be directly added to the virtual address bar by typing in the name of a predefined filter.

At block 2104, a determination is made whether the new filter conflicts with an existing filter already in the virtual address. As previously discussed in regard to FIGS. 46A-46D, a new filter may conflict with an existing filter by substantially narrowing or broadening the scope of the existing filter. Alternatively, a new filter may conflict with an existing filter because a new filter is mutually exclusive to an existing filter. If, at decision block 2104, the new filter conflicts with an existing filter, at block 2106, the existing filter is removed from the virtual address. Alternatively, at 2104, if the new filter does not conflict with an existing filter or, after removing the existing conflicting filter in block 2106, at block 2108, the new filter is added at the end of the virtual address. Thereafter, the exemplary routine 2100 terminates.

Figure 134:
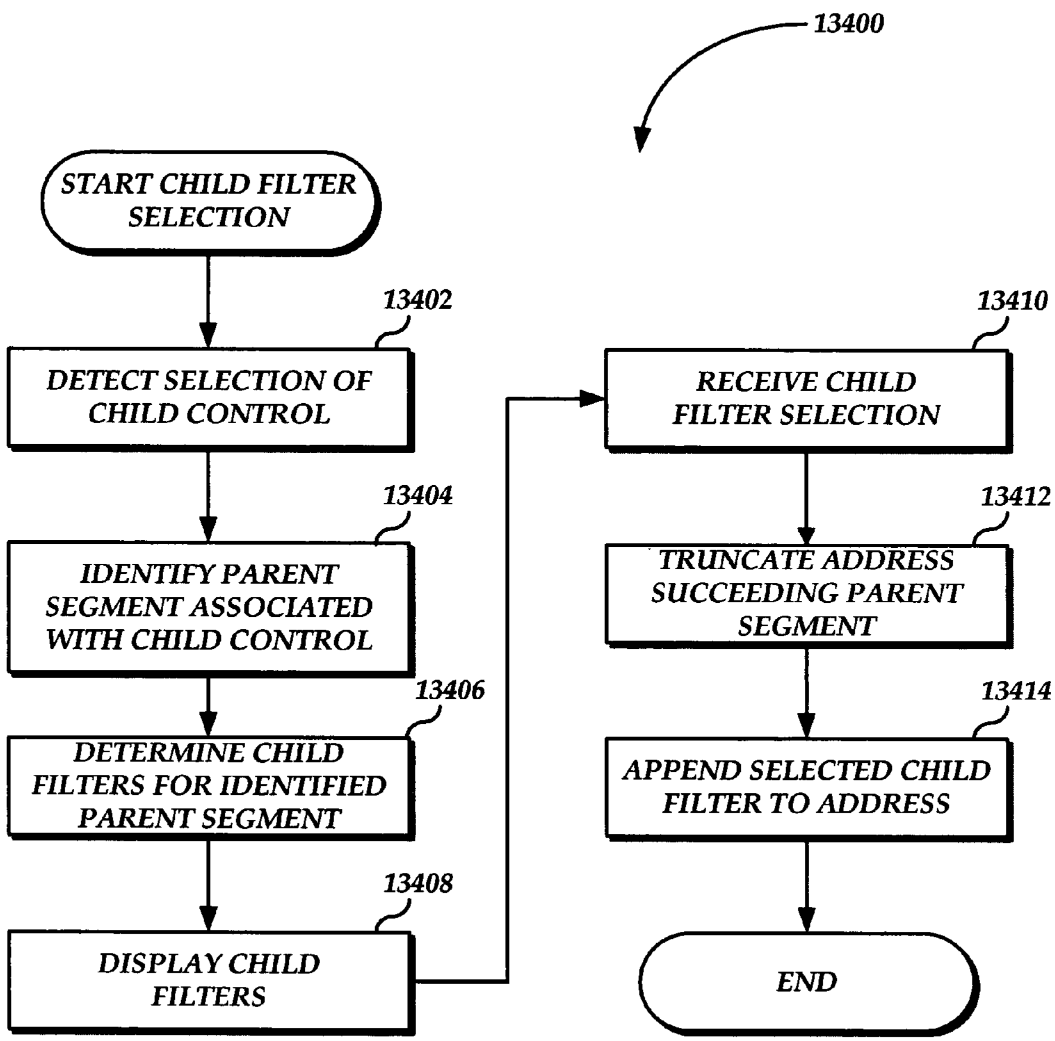

FIG. 134 is a flow diagram illustrative of a selection routine 2200 for selecting a child filter or selection criteria for an associated segment in a virtual address bar. Beginning at block 2202, the routine 2200 detects a selection of a child control. The child filter selection process is described above in regard to FIGS. 135A-135D. At block 2204, the parent segment associated with the selected child control is identified. At block 2206, the child filters for the identified parent segment are determined from a predetermined list of child filters. At block 2208, the child filters are displayed to the user. At block 2210, a child filter selection from the displayed child filters is received from the user. At block 2212, the virtual address is truncated by removing the segments succeeding the parent segment. At block 2214, a segment representing the selected child filter is appended to the remaining segments in the virtual address bar. Thereafter, the routine 2300 terminates.

FIGS. 51-57 are diagrams related to a system and method in accordance with another aspect of the invention that provides an improved user experience within a shell browser. More specifically, a system and method are provided by which users can more readily identify an item based on the metadata associated with that item.

Figure 51A:
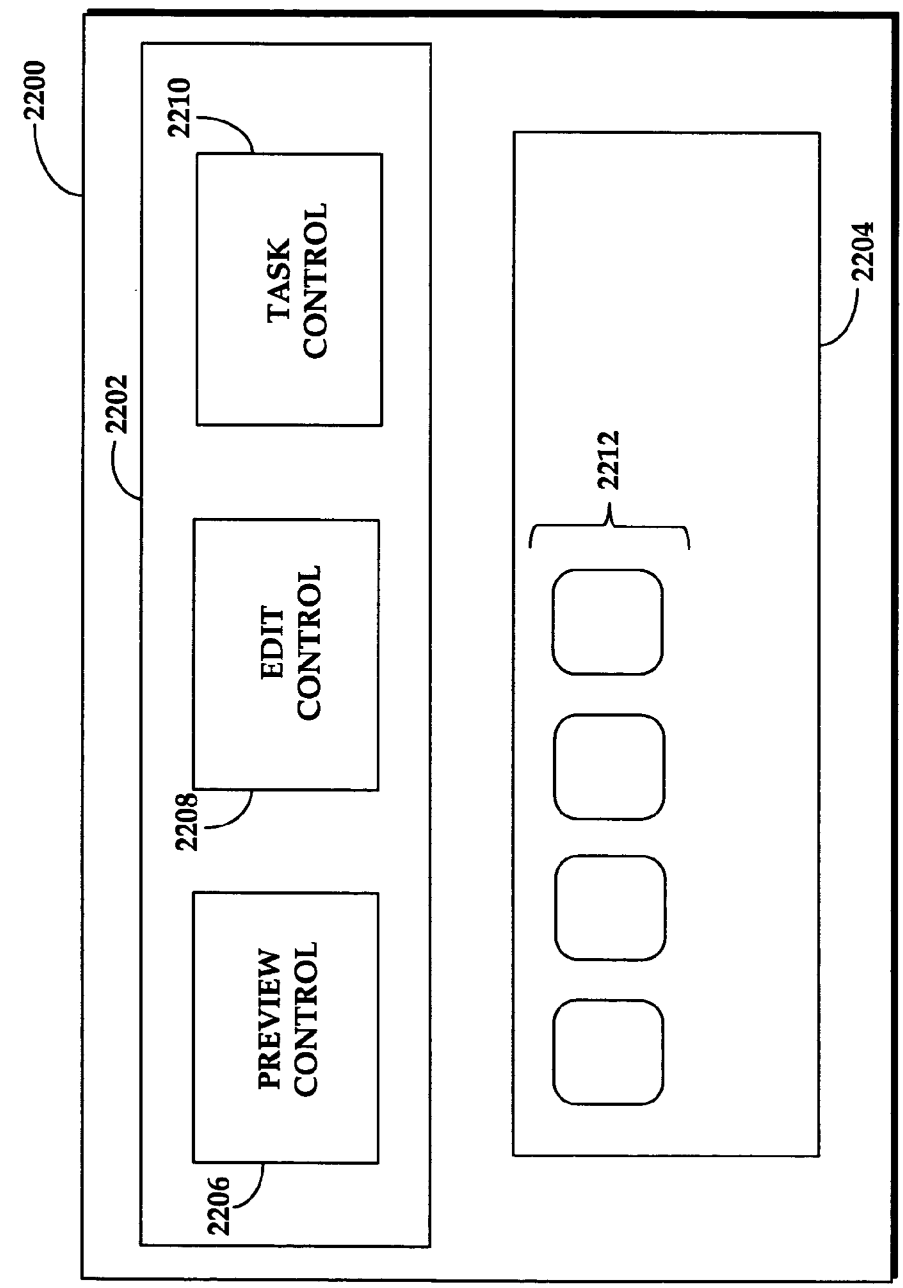
FIG. 51A is a block diagram of an exemplary graphical user interface for a shell browser having an edit control in accordance with an embodiment of the present invention.

Turning to FIG. 51A, a window 2200 represents a screen-size display area for a graphical user interface of a shell browser. The window 2200 contains a preview pane area 2202 and a view area 2204. The preview pane 2202 may include a preview control 2206, a user interface (UI) or edit control 2208, and a task control 2210. Typically, the preview control 2206 will provide the user with an image or other visual display of the item being previewed (e.g., a selected file). The preview control 2206 may also present the user with controls such as iterator buttons which allow the user to shift the focus from one item to the next by clicking a mouse button. Metadata corresponding to one or more items and/or metadata corresponding to the item container may be displayed in a variety of locations within the window 2200. For example, the edit control and metadata may be co-located within edit control area 2208 so that the edit control area not only includes a display of key properties of the previewed item but also presents the user with the option of making edits to the metadata. The task control 2210 contains tasks relevant to the namespace and/or the selection.

For purposes of the present invention, the terms "metadata" and "user modifiable metadata" exclude the shell item name. The term "shell item name" refers to the property which is used for purposes of sorting and displaying the item within the shell browser. As mentioned above, one unique aspect of the present invention is the ability of a user to edit metadata within a shell browser.

Those skilled in the art will appreciate that the present invention contemplates the presence of optional features within the window 2200. For example, the preview control 2206 and the task control 2210 are not essential features for purposes of the present invention. Moreover, other non-essential features which are not shown in FIG. 51A, such as a toolbar which includes iterator buttons or a show/hide button so the user can open/close the preview pane, are also within the scope of the present invention. Nevertheless, these and other optional features may assist the user in readily locating a particular item in the shell browser.

The view area 2204 provides a listview of one or more items 2212, such as file system files or folders. The term "listview" refers to an enumeration or list of items within a container. The terms "item" and "shell item" are used interchangeably herein to refer to files, folders and other such containers, and other non-file objects which can be represented in a listview. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 2200. For example, the preview pane 2202 is shown above the view area 2204 in FIG. 51A. However, other layouts, such as placing the preview pane 2202 and the view area 2204 side-by-side, are clearly within the scope of the present invention. The location of the edit control 2208 is also independent of the location of the displayed metadata and independent of the location of any other controls. There are also many possible view types for the items depicted in list-view area 2204, such as details, slide show, filmstrip, thumbnail, tiles, icons, etc.

Figure 51B:
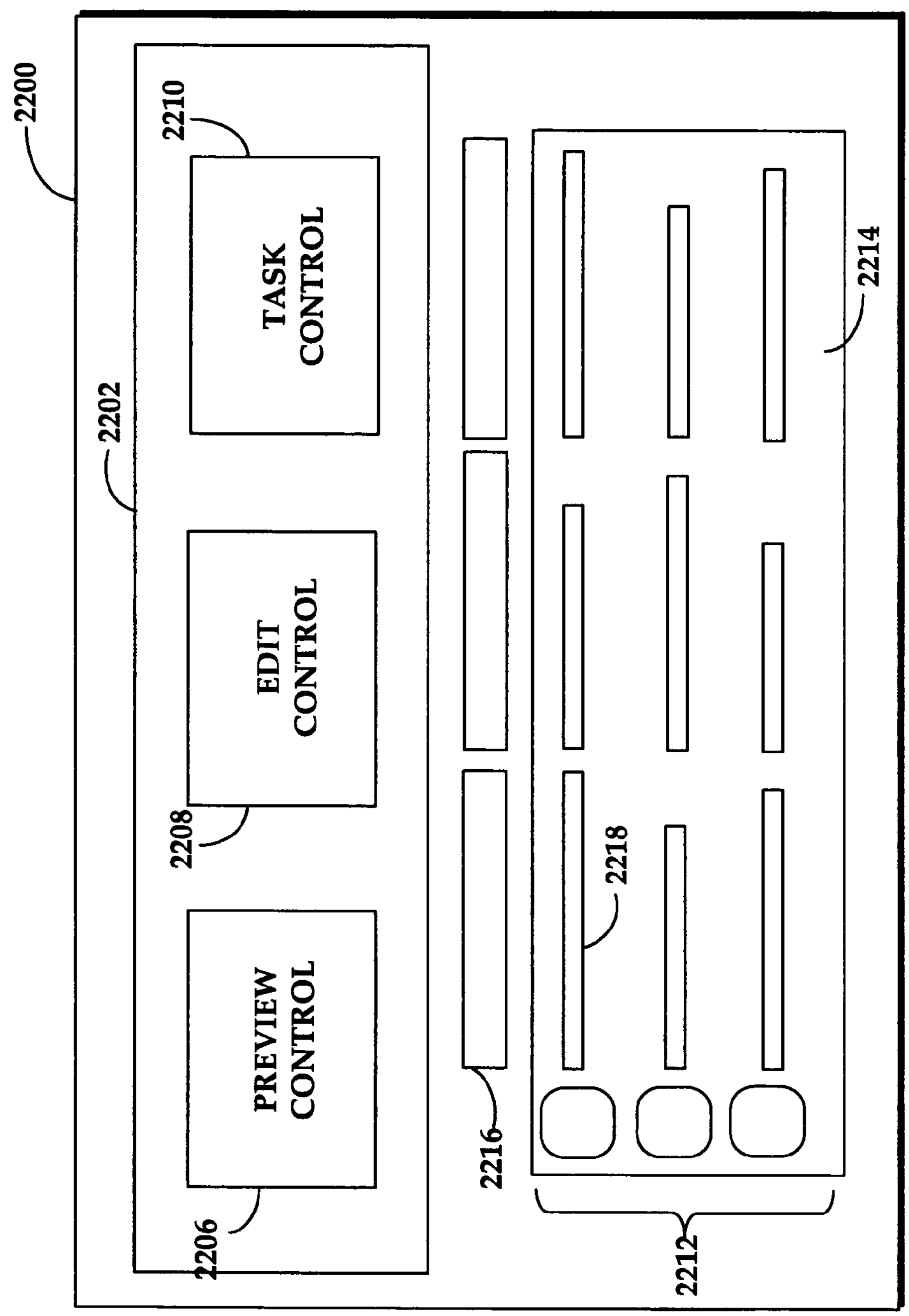
FIG. 51B is a block diagram of an exemplary graphical user interface for a shell browser having one or more edit controls in accordance with an embodiment of the present invention.

FIG. 51B is similar to FIG. 51A, except that the view area 2204 is replaced by a view area 2214 which displays the items 2212 in details mode. As is typical for shell items displayed in details mode, the items 2212 are aligned in a column at the left-hand side of view area 2214, and one or more column headings 2216 form the top row of a set of columns containing metadata 2218 relating to the corresponding item located in the same row. Importantly, the present invention contemplates the ability of a user to explicitly change a metadata value to another value through instantiation of one or more edit controls 2208 anywhere within the window 2200. For example, an edit control may be provided within the preview pane 2202 and/or within the view area 2214. For example, an edit control which is not initially visible to a user may be provided within the view area 2214. Such a control can be instantiated, for example, when the user hovers over the metadata 2218 and then clicks on it to enter an editing mode.

Figure 52:
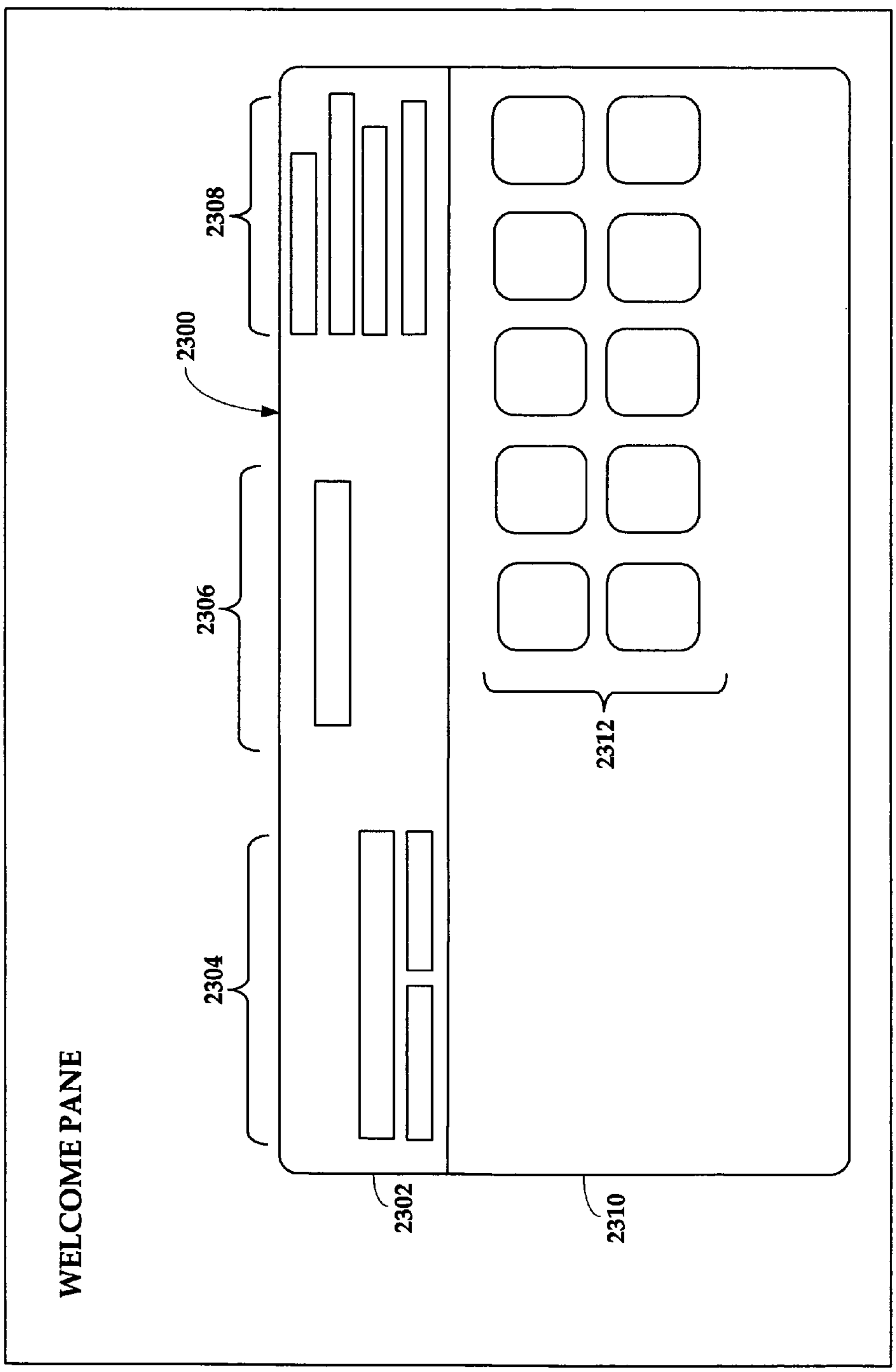
FIG. 52 is a schematic diagram of a welcome pane in a shell browser.

Referring next to FIG. 52, a schematic illustration is provided of a welcome pane 2300 in a shell browser. A welcome pane is sometimes referred to as a "null select" pane because it represents a namespace or container as opposed to a selection. If the user has not yet made a selection, a preview pane 2302 displays metadata 2304 and key tasks relating to the folder or shell library. If desired, the tasks may be separated into premiered tasks 2306 and other relevant tasks 2308. The welcome pane 2300 also includes a view area 2310, in which multiple files or other items 2312 may be viewed. The welcome pane metadata 2304 may include information such as properties of the container (e.g., MyPictures), in which case the metadata display may be static. Alternatively, the welcome pane metadata 2304 may include information such as a sampling of metadata from each of the items within the container, in which case the metadata display may change frequently. For example, the metadata display may be limited to properties of one item at a time by cycling from one item to the next every 30 seconds.

Figure 53:
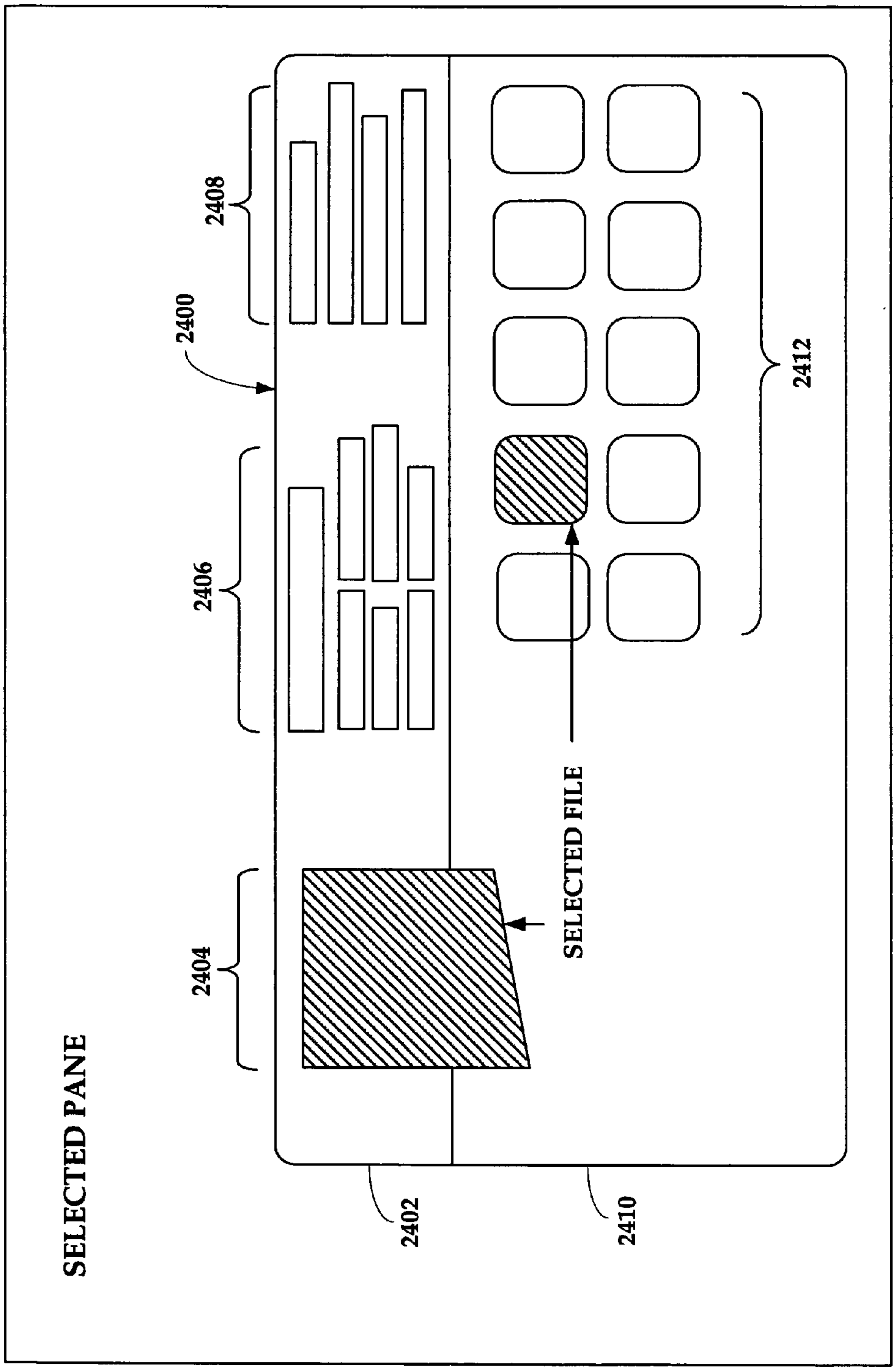
FIG. 53 is a schematic diagram of a selected pane in a shell browser.

FIG. 53 is a schematic illustration of a selected pane 2400 in a shell browser. As opposed to a welcome pane, a selected pane represents a selection by the user. If the user selects a container or folder, the selected pane need not be identical to the welcome pane for that container or folder. In FIG. 53, the selected pane 2400 includes a preview pane 2402 which contains a preview control 2404, a metadata display 2406 and a tasks display 2408. Like the welcome pane 2300 (in FIG. 52), the selected pane 2400 also includes a view area 2410, in which multiple files or other items 2412 may be viewed. In FIG. 53, however, the user has selected one of the files. Consequently, the preview control 2404 displays a preview image of the selected file, the metadata display 2406 shows properties of the selected file, and the tasks display 2408 provides a menu of relevant tasks for operating on the selected file.

Figure 54:
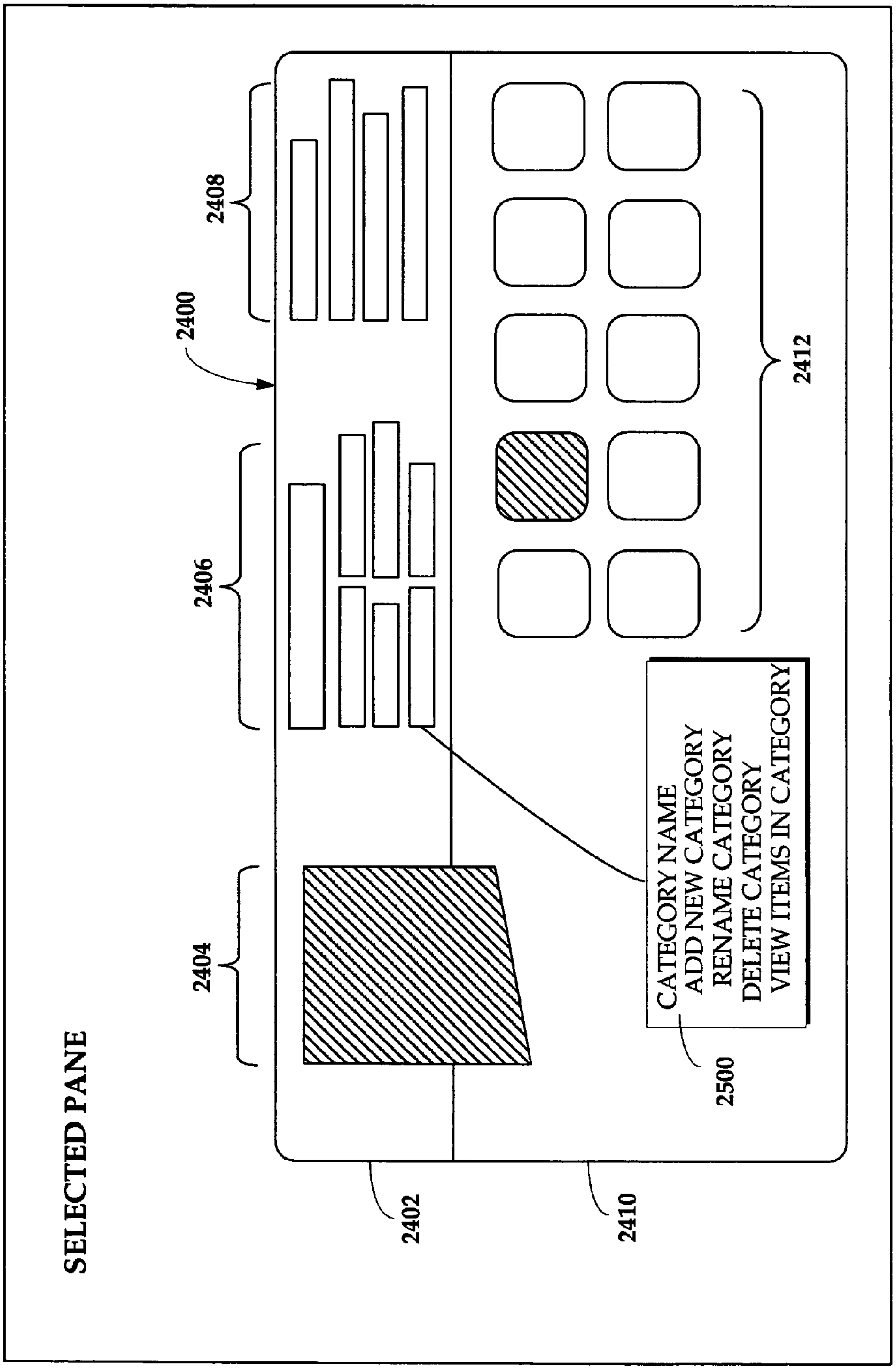
FIG. 54 is a schematic diagram of the selected pane of FIG. 53 including a context menu enabling a user to modify metadata in a shell browser in accordance with an embodiment of the present invention.

FIG. 54 is a schematic representation of the selected pane of FIG. 53 but which also includes a context menu 2500 to enable a user to modify metadata in a shell browser in accordance with an embodiment of the present invention. The context menu 2500 in FIG. 54 presents the user with several options for changing the selected metadata. The generic text shown in the menu 2500 is of course merely one example of the type of options which may be presented to a user for editing the displayed metadata. A context menu can be provided in any window, including a welcome pane, to improve the user experience. As those skilled in the art will appreciate, any number and variety of context menus could be supported by the present invention. For purposes of the present invention, one means for enabling user modifications to displayed metadata within a shell browser is to provide a context menu such as editable metadata context menu 2500. A user may summon the context menu, for example, by clicking on the corresponding text or object in the preview pane.

Those skilled in the art will appreciate that the present invention contemplates means other than context menus for enabling user modifications to displayed metadata within a shell browser. Another such means for is for the user to click on the metadata to enter an editing mode. By contrast, a user could enter an editing mode by hovering over the relevant text or object in the preview pane. Numerous alternative means are available and within the scope of the present invention.

Figure 55:
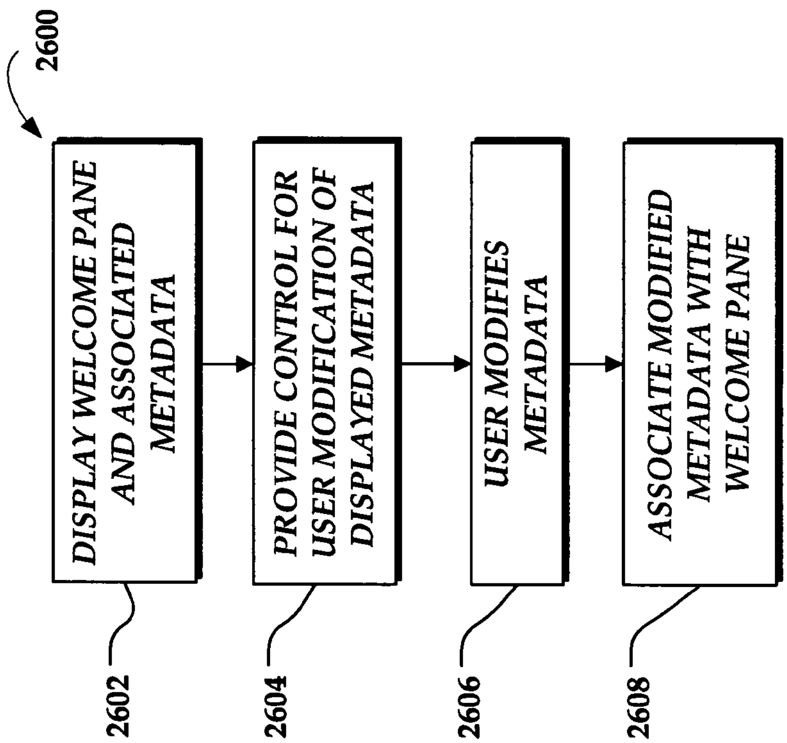
FIG. 55 is a flow diagram illustrating a method for enabling a user to modify metadata displayed in a welcome pane within a shell browser in accordance with an embodiment of the present invention.

FIG. 55 is a flow diagram illustrating a method 2600 for enabling a user to modify metadata displayed in a welcome pane within a shell browser in accordance with an embodiment of the present invention. The method 2600 includes displaying a welcome pane and metadata associated with the welcome pane at 2602. Then, at 2604, the method provides a control for user modification of the displayed metadata. When the user manipulates the control to modify the displayed metadata at 2606, the method then associates the modified metadata with the welcome pane at 2608 so that the modified metadata will be displayed the next time the welcome pane is displayed.

Figure 56:
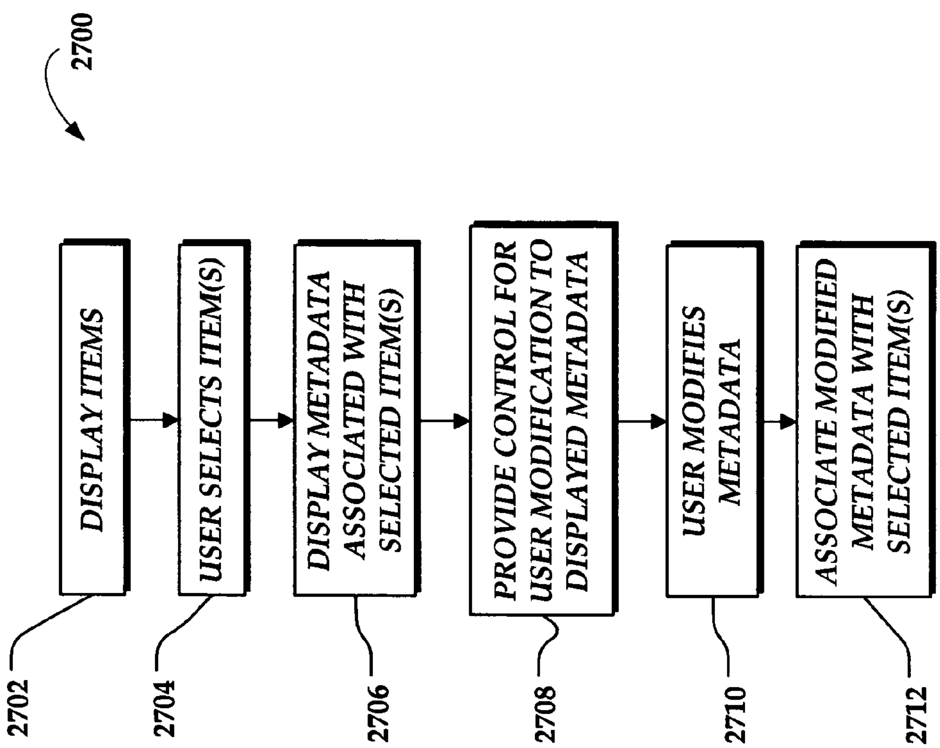
FIG. 56 is a flow diagram illustrating a method for enabling a user to modify metadata displayed in a selected pane within a shell browser in accordance with an embodiment of the present invention.

FIG. 56 is a flow diagram illustrating a method 2700 for enabling a user to modify metadata displayed in a selected pane within a shell browser in accordance with an embodiment of the present invention. At 2702, the method 2700 first displays a number of items, such as items in a welcome pane or items in a selected container. When the user selects one or more of the items at 2704, the method displays metadata associated with the selected item(s) at 2706. At 2708, the method provides a control for user modification of the displayed metadata. When the user manipulates the control to modify the displayed metadata at 2710, the method then associates the modified metadata with the selected item(s) at 2712 so that the modified metadata will be displayed the next time the selected item(s) is/are displayed.

In the event a user selects multiple items at 2704, the displayed metadata may include intersecting properties of the selected items, a union of properties, or perhaps a new property relevant to the selected items. Alternatively, the displayed metadata may include a rotating sample of metadata from each of the selected items (e.g., cycling from one selected item's metadata to the next selected item's metadata every 30 seconds). It is possible for the display of metadata which would result from a selection of all of the items to be identical to the display of metadata which would result from a null select.

Figure 57:
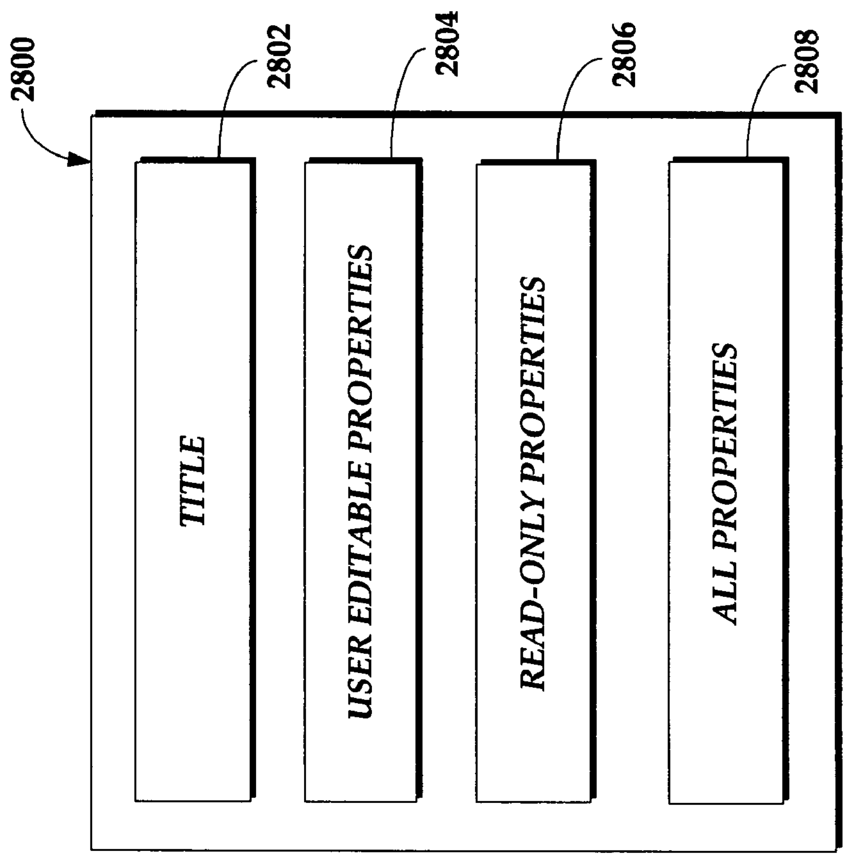
FIG. 57 is a block diagram of a data structure containing user modifiable metadata associated with an item displayed in a shell browser.

FIG. 57 is a block diagram of a data structure 2800 containing user modifiable metadata associated with an item displayed in a shell browser. The data structure 2800 includes a title field 2802 which indicates the name of the item. In the case of non-file items, the title field 2802 may contain the name of whatever property is used to alphabetize that item in a listview. The data structure 2800 includes a user editable properties field 2804 containing one or more properties associated with the displayed item, wherein the user editable properties are displayed in the shell browser with the displayed item. The data structure 2800 may optionally include a read-only properties field 2806 which contains any read-only properties associated with the displayed item and worthy of display in the shell browser. Given the size constraints of the metadata display in the shell browser, the number of properties in fields 2804 and 2806 may be limited. Consequently, the data structure 2800 may optionally include an all properties field 2808, which contains a link or pointer to a location (e.g., a property page) which contains all of the properties or metadata associated with the displayed item. Of course, the all properties field 2808 would not be necessary in the event that fields 2804 and 2806 contain all of the properties associated with the displayed item. The data structure 2800 is stored on one or more computer-readable media, such as in a file system or shell, to provide rich storage views, and thus an improved user experience, within the shell browser.

The present invention enables a number of scenarios which were not possible with conventional shell browsers. As a first example, a student can manage her projects using the preview pane. When she obtains new documents as part of a project she is working on, she can select those documents in her document library and enter the name of the document author and the name of the project into keyword fields using the edit control. Now the new documents will show up in her favorite view: "Documents Grouped by Keyword and Listed by Author." A second example of a new scenario enabled by the present invention involves an employee looking for materials for an upcoming ad campaign. As he browses through his employer's stock collection of photos using the shell browser, he selects a couple of pictures and, from the preview pane, adds a new keyword "Summer 2003 Campaign." Having updated the metadata for a multiple selection, the employee then pivots by keyword and can view all of the "Summer 2003 Campaign" files grouped together. Many other scenarios which take advantage of the present invention would be apparent to those skilled in the art.

FIGS. 58-66 are diagrams related to a system and method for extending the functionality of an object previewer in a shell browser configured to display a plurality of items representing multiple item types. As will be described in more detail below, a shell browser is provided which includes a default previewer and an extensibility mechanism. The default previewer provides a standard level of functionality for multiple item types. The extensibility mechanism enables functionality beyond the standard level provided by the default previewer for one or more of the item types.

Figure 58:
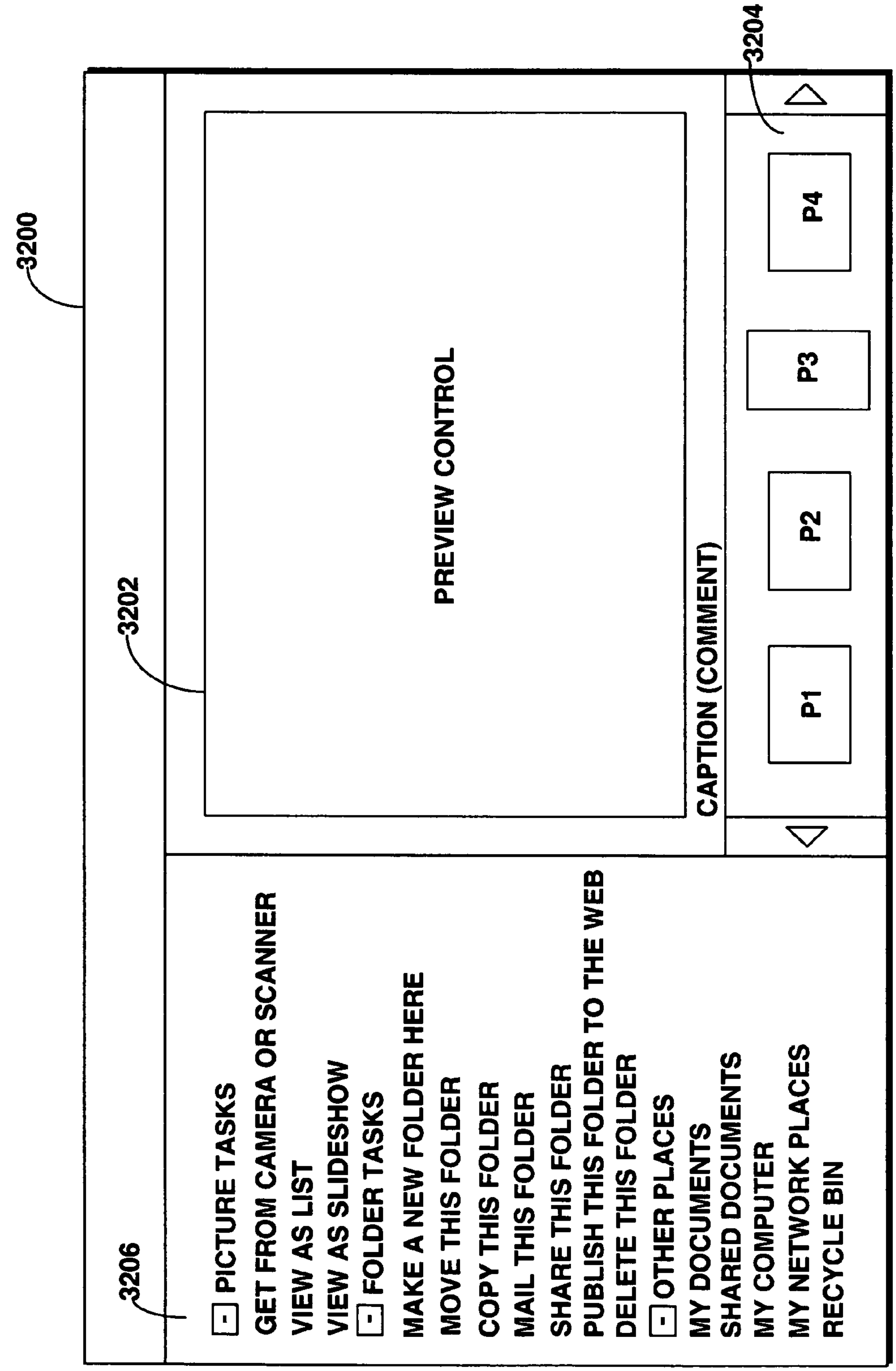
FIG. 58 is a schematic diagram of a prior art graphical user interface for browsing pictures stored in a folder within a shell browser environment which is used for viewing other non-pictorial files and folders.

FIG. 58 is a schematic diagram of a prior art graphical user interface for browsing pictures stored in a folder within a shell browser environment which is used for viewing other non-pictorial files and folders. As stated above, the need to readily identify items that are stored in a computing environment such as a PC is dramatically increasing. With respect to digital pictures, users traditionally had to invoke a third party software program in order to view a specific file on the PC. FIG. 58 illustrates a prior solution, a film strip view, which allows users to more readily view and identify the image associated with a given file within the graphical operating environment. The goal of film strip view was to alleviate the need for other software programs when browsing a folder of pictures by providing a quick iterative process that allows a user to preview a sizeable image of one or more picture files within the folder.

FIG. 58 relates to a system for browsing pictures stored in a folder, wherein a series of folder pictures is presented as a single row of thumbnails within an environment that is utilized for viewing other non-pictorial files and folders (i.e., a shell browser). It further allows a user to selectively cursor through the thumbnails, as it displays an enlarged preview image of a user selected thumbnail. FIG. 58 is a diagram of a representative window on a user's screen. As shown, the window 3200 is divided into several areas including a header region, a task option area 3206, a preview control area 3202, a caption or comment area and a filmstrip area 3204. The task option area 3206 contains a list of tasks that can be selected by a user in order to perform a wide variety of operations relating to the management of files and folders, as well as other system choices. Some of these operations are specific to the pictures in the filmstrip area 3204 and the preview control area 3202. The preview control area 3202 is a space in which an enlarged preview image of a user selected picture will be displayed. This space can also contain navigational icons to assist a user in iterating through a series of pictures. Immediately below the preview control area is a caption or comment area that can be utilized to display a variety of textual information. A film strip area 3204, provides a space to display a single row of thumbnail images P1, P2, P3, P4 of the picture files contained within a given folder. In addition, the film strip area 3204 also contains cursors to allow a user to scroll through a folder for the picture files. It should be noted that the filmstrip area 3204 can contain and display thumbnail images in mixed orientation. For instance, as shown in FIG. 58, P1, P2 and P4 are in landscape while P3 is in portrait.

A user can select any one of the thumbnail images, which will cause a larger preview image of the user thumbnail selection image to be displayed within the preview control area. In addition, user selection of a thumbnail image will also allow the user to select and perform any one of the tasks listed in the task option area 3206, with respect to the selected image. A first control button allows a user to quickly and successively preview an enlarged image of each of the thumbnail images within a given folder, by iterating in one direction. In other words, a user would not have to specifically "click" on each and every successive thumbnail image in order to preview the picture. Instead the user will merely click on the first control button repeatedly to move through the folder. A second control button performs a similar iteration function but only in the opposite direction.

Figure 59:
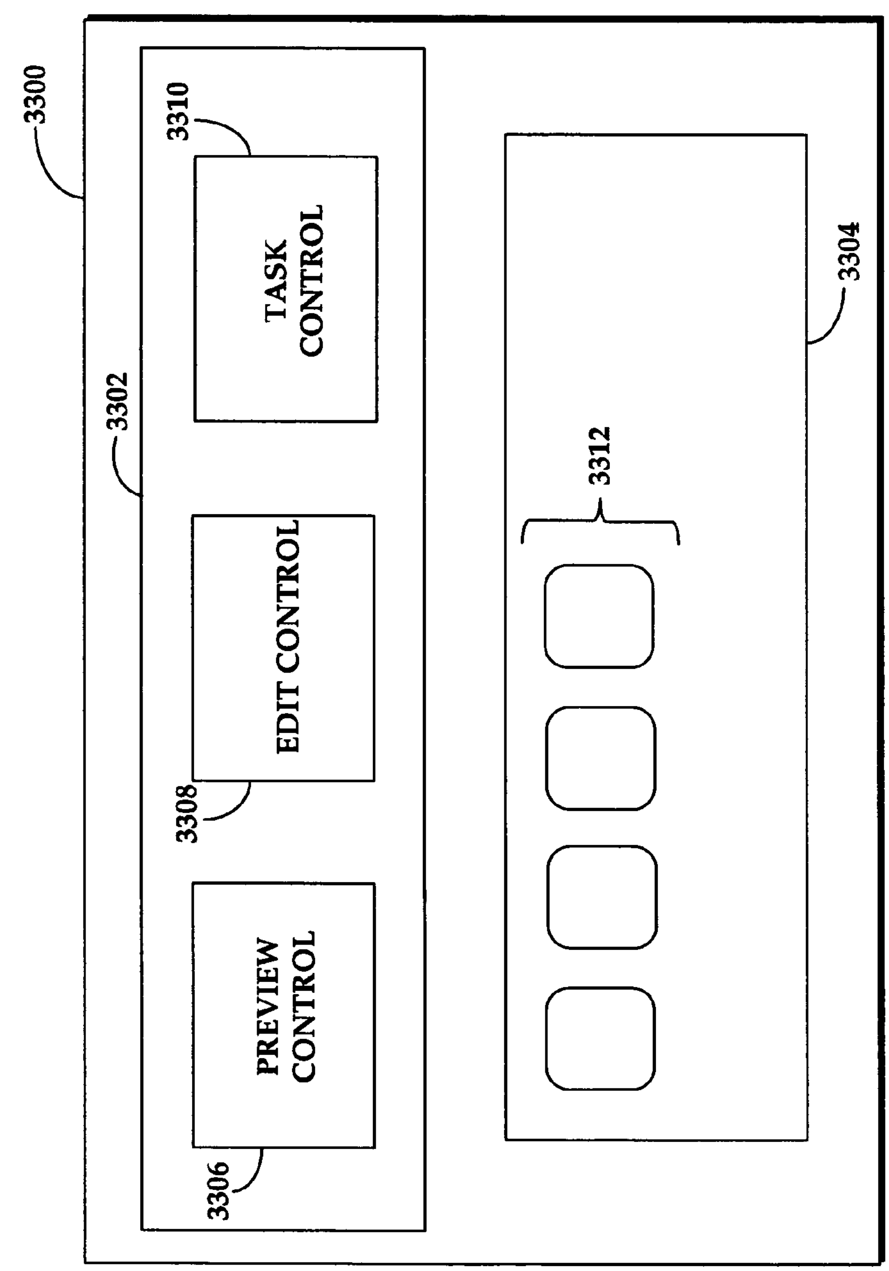
FIG. 59 is a block diagram of an exemplary graphical user interface for a shell browser.

Turning to FIG. 59, a window 3300 represents a screen-size display area for a graphical user interface of a general purpose shell browser. The window 3300 contains a preview pane area 3302 and a view area 3304. The preview pane 3302 may include a preview control 3306, an edit or metadata control 3308, and a task control 3310. Typically, the preview control 3306 will provide the user with an image or other visual display of the item being previewed (e.g., a selected file). The preview control 3306 may also present the user with controls such as iterator buttons which allow the user to shift the focus from one item to the next by clicking a mouse button. The edit control 3308 not only includes a display of key properties of the previewed item, it also presents the user with a control for making edits to the metadata. The task control 3310 contains tasks relevant to the namespace and/or the selection.

Those skilled in the art will appreciate that the present invention contemplates the presence of optional features within the window 3300. For example, the metadata control 3208 and the task control 3210 are not essential features for purposes of the present invention. Moreover, other non-essential features which are not shown in FIG. 59, such as a toolbar which includes iterator buttons or a show/hide button so the user can open/close the preview pane, are also within the scope of the present invention. Nevertheless, these and other optional features may assist the user in readily locating a particular item in the shell browser.

The view area 3304 provides a listview of one or more items 3312, such as file system files or folders. The term "listview" refers to an enumeration or list of items within a container. The terms "item" and "shell item" are used interchangeably herein to refer to files, folders and other such containers, and other non-file objects which can be represented in a listview. Similarly, "shell item" refers to an item in a shell library. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 3300. For example, the preview pane 3302 is shown above the view area 3304 in FIG. 59. However, other layouts, such as placing the preview pane 3302 and the view area 3304 side-by-side, are clearly within the scope of the present invention. There are also many possible views for the items depicted in view area 3304, such as details, slide show, filmstrip, thumbnail, tiles, icons, etc.

Figure 60:
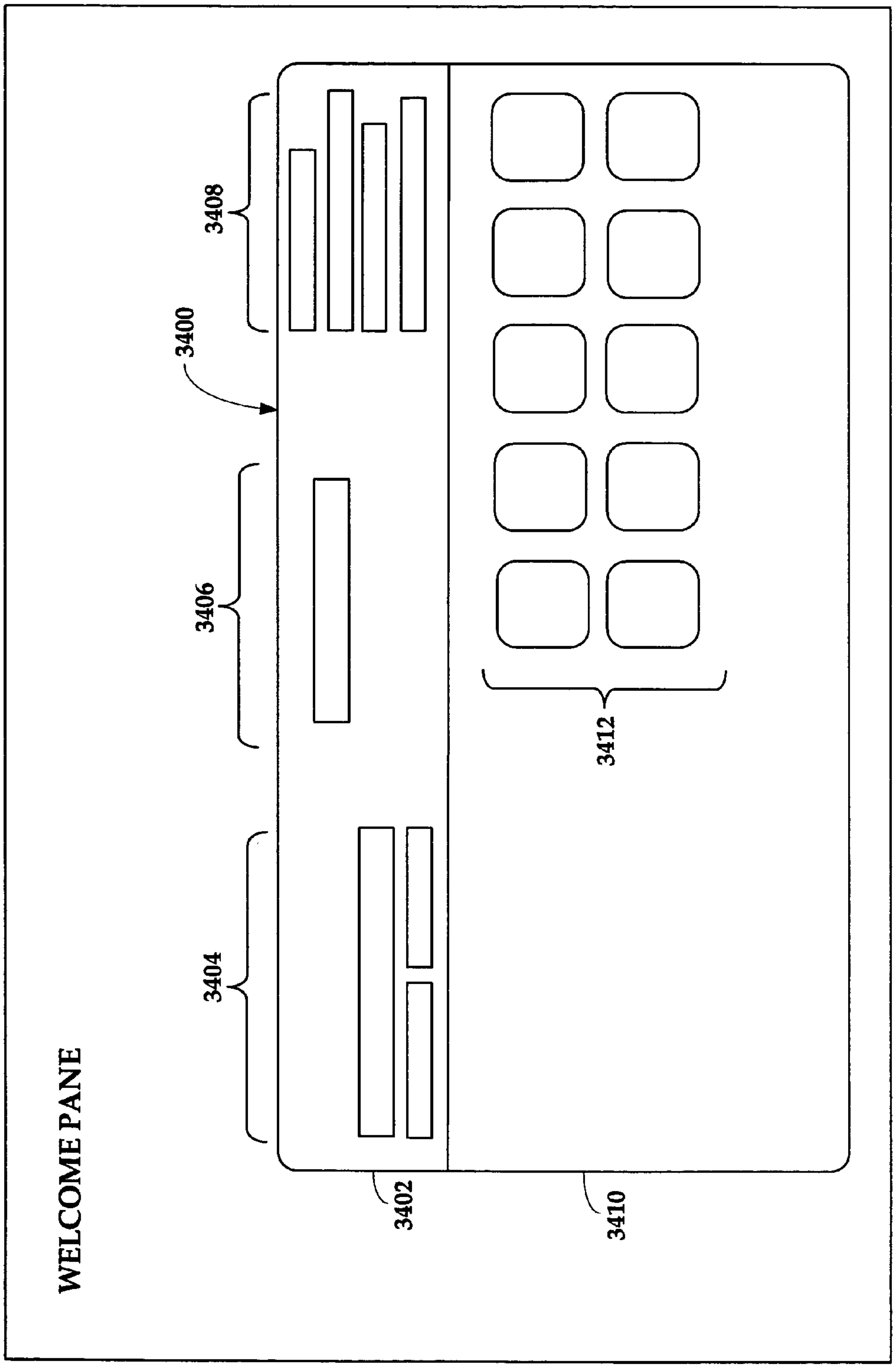
FIG. 60 is a schematic diagram of a welcome pane in a shell browser.

Referring next to FIG. 60, a schematic illustration is provided of a welcome pane 3400 in a shell browser. A welcome pane is sometimes referred to as a "null select" pane because it represents a namespace or container as opposed to a selection. If the user has not yet made a selection, a preview pane 3402 displays metadata 3404 and key tasks relating to the folder or shell library. If desired, the tasks may be separated into premiered tasks 3406 and other relevant tasks 3408. The welcome pane 3400 also includes a view area 3410, in which multiple files or other items 3412 may be viewed. The welcome pane metadata 3404 may include information such as properties of the container (e.g., MyPictures), in which case the metadata display may be static. Alternatively, the welcome pane metadata 3404 may include information such as a sampling of metadata from each of the items within the container, in which case the metadata display may change frequently. For example, the metadata display may be limited to properties of one item at a time by cycling from one item to the next every 30 seconds.

Figure 61:
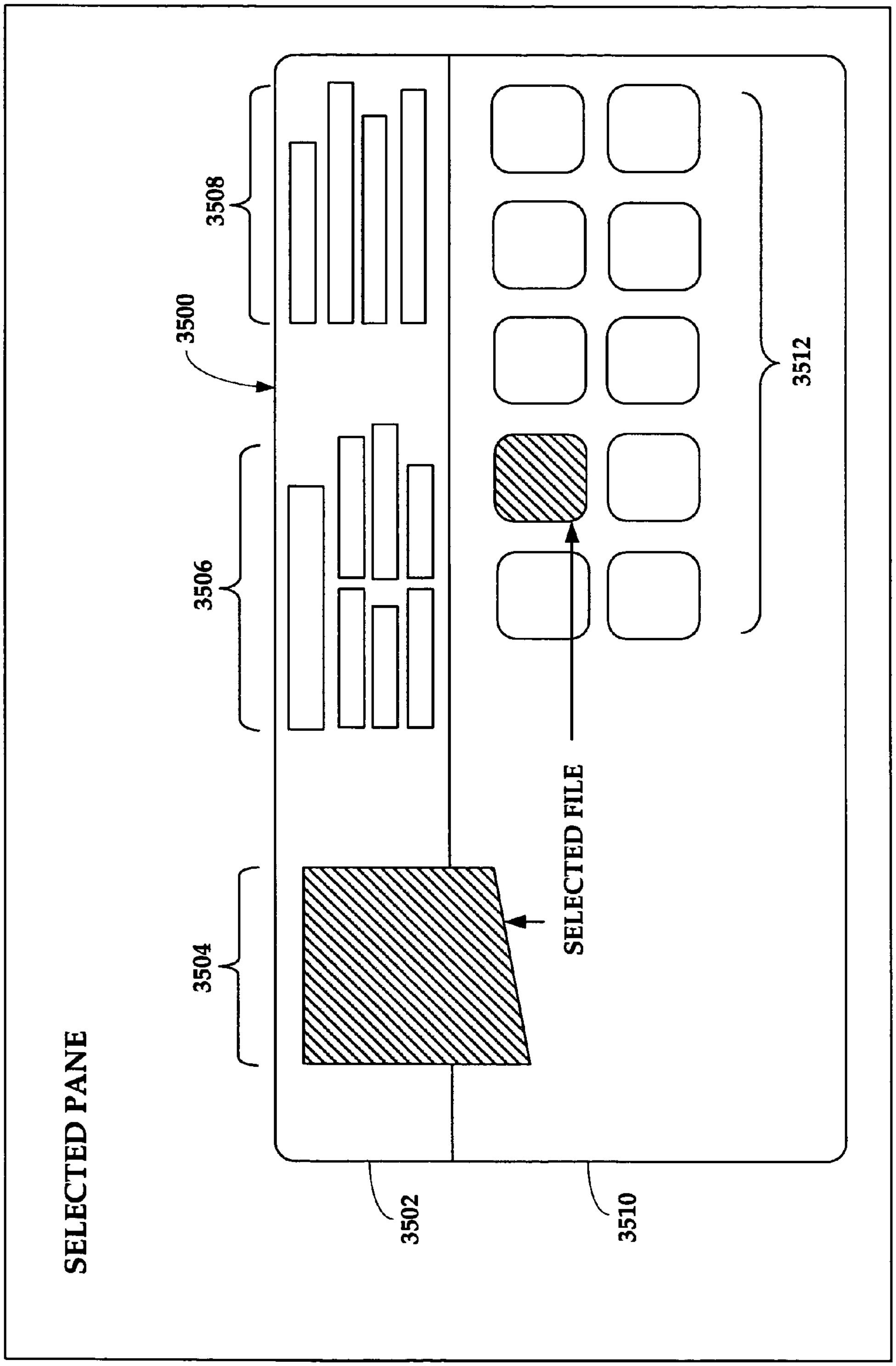
FIG. 61 is a schematic diagram of a selected pane in a shell browser.

FIG. 61 is a schematic illustration of a selected pane 3500 in a shell browser. As opposed to a welcome pane, a selected pane represents a selection by the user. If the user selects a container or folder, the selected pane need not be identical to the welcome pane for that container or folder. In FIG. 61, the selected pane 3500 includes a preview pane 3502 which contains a preview control 3504, a metadata display 3506 and a tasks display 3508. Like the welcome pane 3400 (in FIG. 60), the selected pane 3500 also includes a view area 3510, in which multiple files or other items 3512 may be viewed. In FIG. 61, however, the user has selected one of the files. Consequently, the preview control 3504 displays a preview image of the selected file, the metadata display 3506 shows properties of the selected file, and the tasks display 3508 provides a menu of relevant tasks for operating on the selected file.

Figure 62:
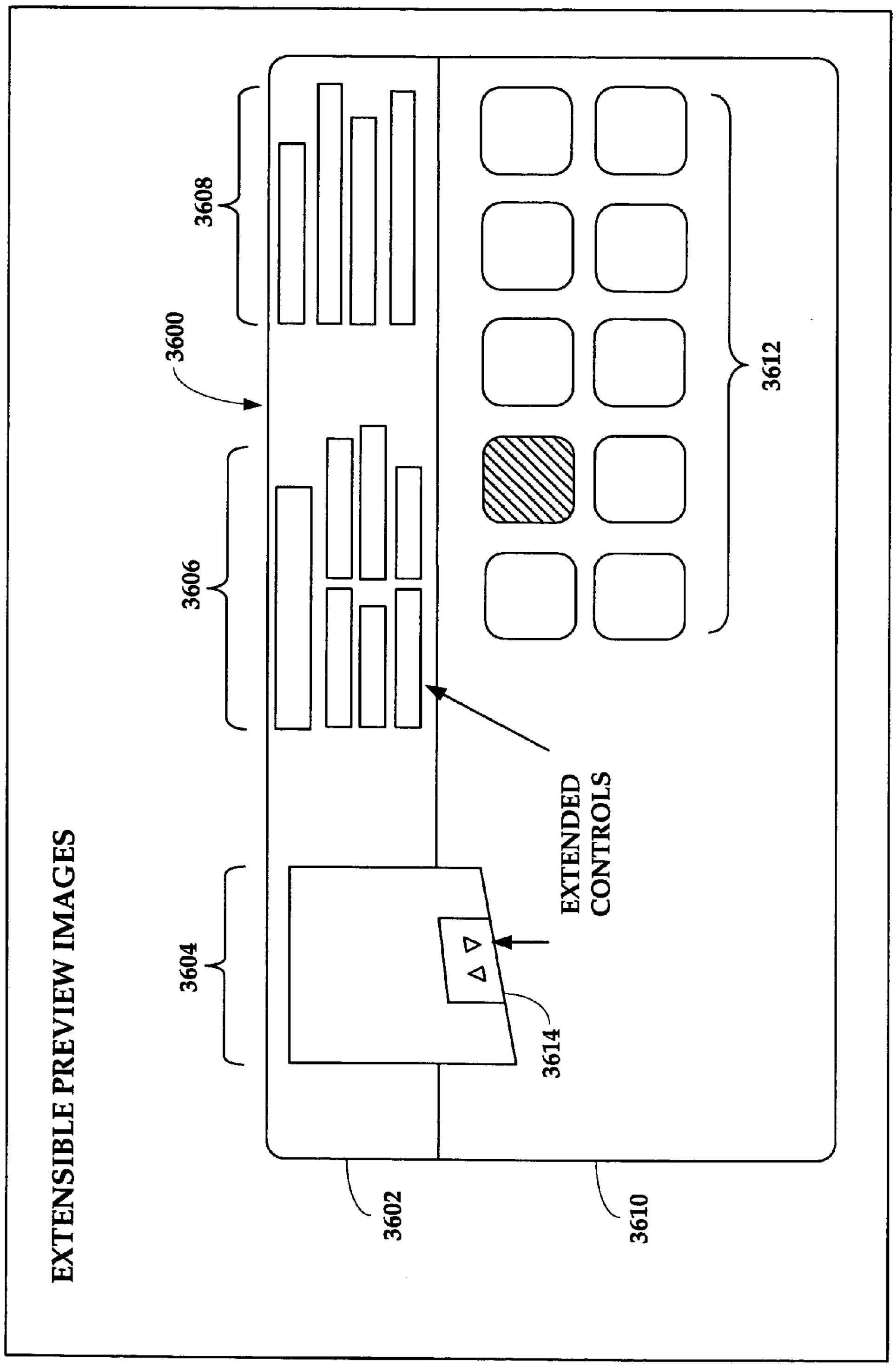
FIG. 62 is a schematic diagram of a selected pane in a shell browser with extended controls in accordance with an embodiment of the present invention.

FIG. 62 is a schematic diagram of a selected pane similar to the selected pane of 3500 of FIG. 61 but with extended controls in accordance with an embodiment of the present invention. The selected pane 3600 includes a preview pane 3602 which contains a preview control 3604 having extended controls 3614, a metadata display 3606 and a tasks display 3608. The selected pane 3600 also includes a view area 3610, in which multiple files or other items 3612 may be viewed. The user has selected one of the files 3612, so the preview control 3604 displays a preview image of the selected file, the metadata display 3606 shows properties of the selected file, and the tasks display 3608 provides a menu of relevant tasks for operating on the selected file.

The extended controls 3614 represent a level of functionality beyond what is typically available from a shell browser. For example, a default preview pane or preview control, such as those shown in FIGS. 58 and 61, may simply display a preview image of a selected item. If the item is a word processing document or slide presentation, the default preview image may be the first page of the document or slide deck. However, by extending the functionality of the preview image to make it more interactive, a user can quite easily manipulate extended controls 3614 to page through the document or slide presentation. This enhanced level of functionality improves the user experience because it allows the user to more comprehensively browse the previewed item without opening it, which is particularly useful for files that are not readily identifiable based on the first page alone.

Extended controls 3614 can be made available to the user as part of an alternative previewer in a shell browser. The term "previewer" can refer to a preview control or to the a preview pane which includes a preview control. The present invention contemplates a shell browser which provides the user with a default previewer offering a standard level of functionality for multiple item types and one or more alternative previewers offering a different level of functionality for particular item types to enhance the user experience. Opening up the development of alternative previewers to independent software vendors (ISVs) and other third party developers adds value to the file browsing experience by showing relevant aspects of the file in an easily recognizable way. The present invention contemplates custom previewers for numerous file types and non-file item types including, but not limited to, image files, video files, contacts, games, scanners, video cameras, document files, spreadsheet files, slide presentation files, drawing files and tablet ink files.

The present invention enables a number of scenarios which were not possible with conventional shell browsers, some of which have been described above. Third parties are allowed to describe and demonstrate their file types by providing code that can look inside the file type and provide a meaningful image that a user will understand. For example, Apple could implement a QuickTime™ preview control, which would be displayed when the user selects a QuickTime™ file in the shell browser. This preview control could provide an alternative or extended level of functionality beyond the default previewer in the shell of an operating system, including functionality such as showing the first five seconds of a QuickTime™ movie and/or offering buttons and controls for the user to launch the QuickTime™ player. An alternative previewer for a music file could provide similar extended functionality. As those skilled in the art will appreciate, the possibilities for extended functionality in an alternative previewer are unlimited.

Figure 63:
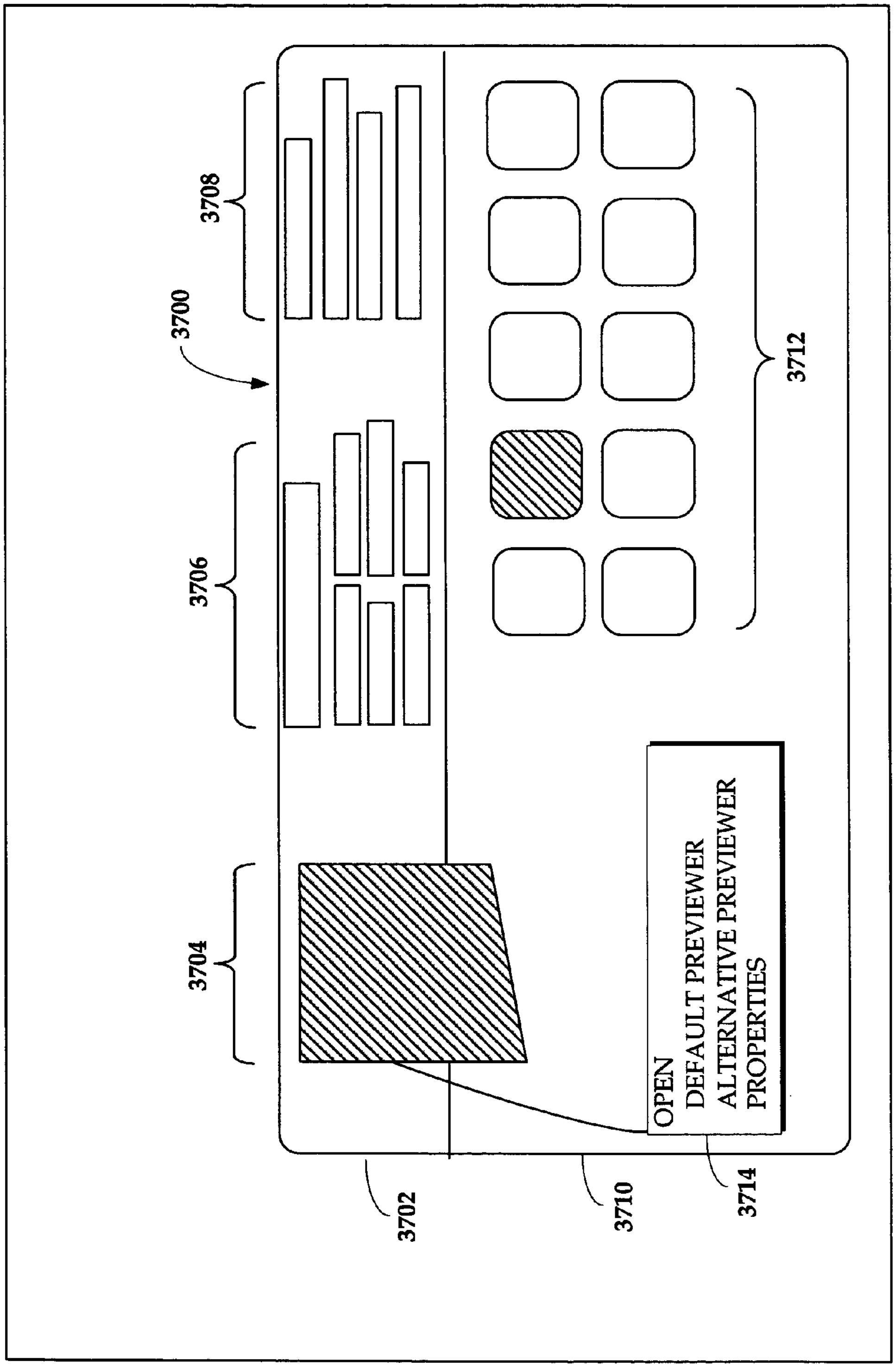
FIG. 63 is a schematic diagram of a selected pane similar to FIG. 61 but including a context menu enabling a user to select a previewer in a shell browser in accordance with an embodiment of the present invention.

FIG. 63 is a schematic representation of a selected pane similar to FIG. 61 but which also includes a context menu 3714 to enable a user to modify metadata in a shell browser in accordance with an embodiment of the present invention. The selected pane 3700 includes a preview pane 3702 which contains a preview control 3704, a metadata display 3706 and a task control 3708. The selected pane 3700 also includes a view area 3710, in which multiple files or other items 3712 may be viewed. Those skilled in the art will appreciate that, for purposes of the present invention, the metadata control 3706 and the task control 3708 are not essential features. The present invention contemplates the presence of these and/or other optional features which may assist the user in readily locating a particular item in the shell browser or otherwise enhance the user experience.

The context menu 3714 in FIG. 63 presents the user with several options, including the choice of selecting either the default previewer or an alternative previewer for the selected item. The generic text shown in the menu 3714 is of course merely one example of the type of options which may be presented to a user for selecting a previewer. A context menu can be provided in any window, including a welcome pane, to improve the user experience. As those skilled in the art will appreciate, any number and variety of context menus could be supported by the present invention. For purposes of the present invention, one means for enabling user selection of a previewer within a shell browser is to provide a context menu such as context menu 3714. A user may summon the context menu, for example, by clicking on the corresponding text or object in the preview pane.

Those skilled in the art will appreciate that the present invention contemplates means other than context menus for selecting a previewer for the displayed items from a plurality of available previewers within a shell browser. Another such means is for the user to click on the preview control to enter a selection mode. Similarly, the user may be prompted to select a previewer by right-clicking within the preview pane. By contrast, a user could enter a selection mode by hovering over relevant text or over a relevant object in the preview pane. Numerous alternative means are available and within the scope of the present invention.

Figure 64A:
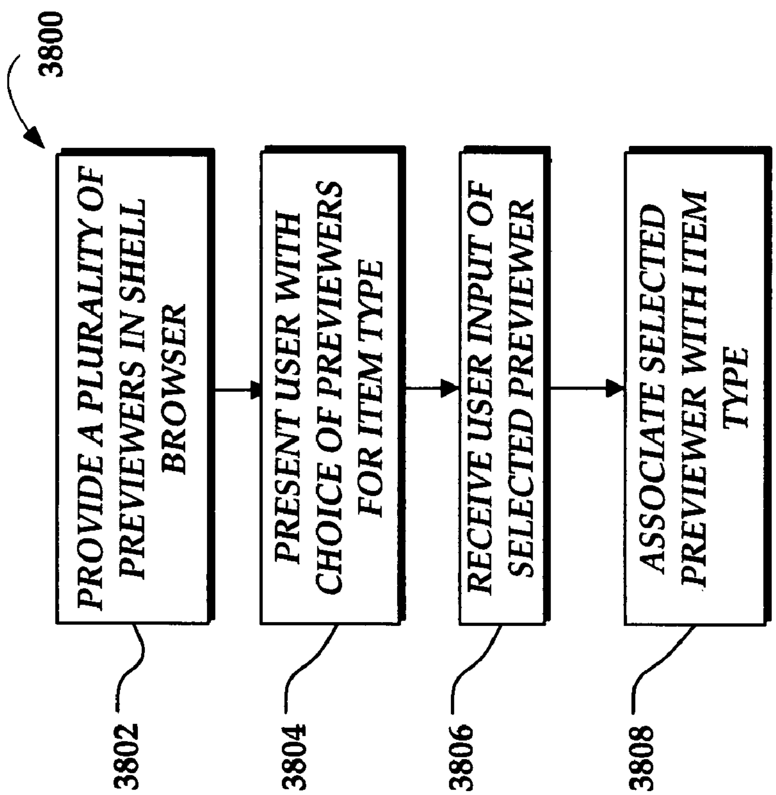
FIG. 64A is a flow diagram illustrating a method for enabling a user to select a previewer in a shell browser in accordance with an embodiment of the present invention.

FIG. 64A is a flow diagram illustrating a method 3800 for enabling a user to select a previewer in a shell browser which supports multiple item types in accordance with an embodiment of the present invention. The method 3800 provides a plurality of previewers in the shell browser at 3802. The plurality of previewers may include a default previewer for multiple item types and one or more alternative previewers for particular item types. These alternative previewers may include installed applications developed by a third party. At 3804, the method 3800 presents the user with a choice of two or more previewers for a particular item type. The prompt to select a previewer may be initiated by the shell browser (e.g., upon displaying a new item type) and/or by the user (e.g., by clicking on an object to display a context menu). Upon receiving an input from the user at 3806 indicating a selection of one of the previewers for the particular item type, the method 3800 then associates the selected previewer with the particular item type at 3808. The selected previewer will remain in use until the user selects a different one. However, if the selected previewer is an installed application, uninstalling the application will also terminate the use of the selected previewer.

Figure 64B:
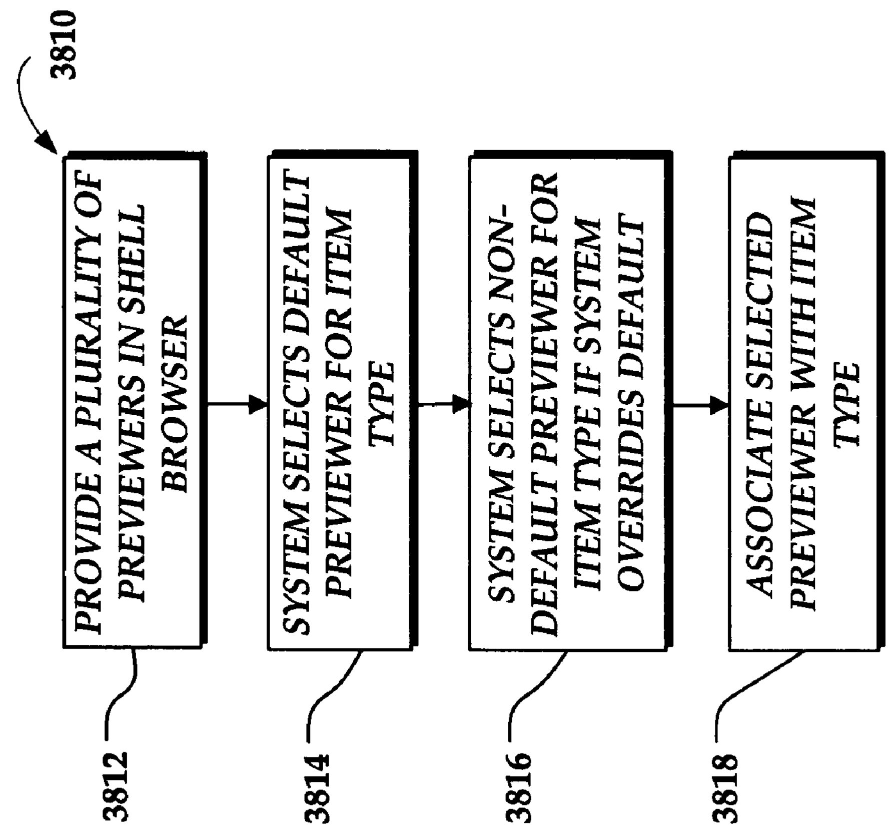
FIG. 64B is a flow diagram illustrating a method for enabling the system to select a previewer in a shell browser in accordance with an embodiment of the present invention.

FIG. 64B is a flow diagram illustrating a method 3810 for automatically selecting a previewer in a shell browser which supports multiple item types in accordance with an embodiment of the present invention. The method 3810 provides a plurality of previewers in the shell browser at 3812. The plurality of previewers may include a default previewer for multiple item types and one or more alternative previewers for particular item types. These alternative previewers may include installed applications developed by a third party.

At 3814, the system (as opposed to the user) automatically and transparently selects a default previewer from two or more available previewers for a particular item type. The system may select a previewer in response to an event such as display of a new item type or the presence of an alternative previewer. The system is configured to select a default previewer based on logical rules. Under exceptional circumstances, the system may decide at 3816 to override the rules and select a previewer that would not have been selected under the applicable rules. For example, if the rule is to select a newly available previewer over the current default previewer, an installed application may generally have the authority to change the default previewer to the previewer now available from the installed application. However, the shell browser, for example, may reserve the right to override the change proposed by the newly installed application. For instance, an override may be appropriate when the newly installed application cannot be authenticated as a proper owner of the item type in question.

In any event, the method 3810 then associates the selected previewer with the particular item type at 3818. The selected previewer will remain in use until a different one is selected. However, if the selected previewer is an installed application, uninstalling the application will also terminate the use of the selected previewer.

Figure 65:
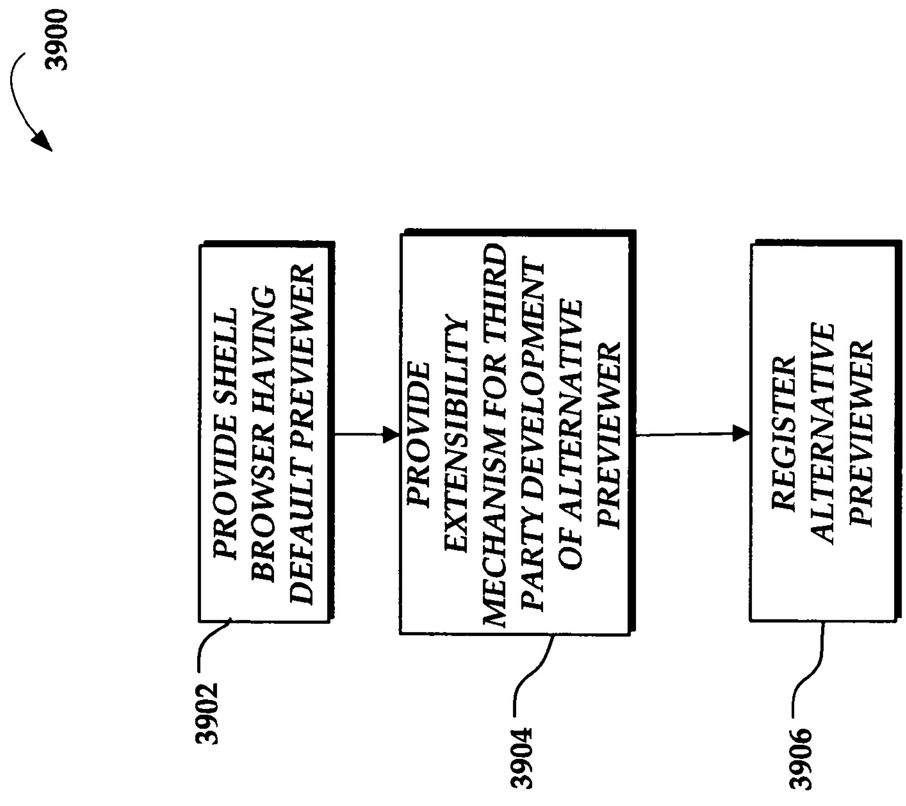
FIG. 65 is a flow diagram illustrating a method for enabling the use of third party previewers in a shell browser in accordance with an embodiment of the present invention.

Referring next to FIG. 65, a flow diagram illustrates a method 3900 for enabling the use of third party previewers in a shell browser which supports multiple item types in accordance with an embodiment of the present invention. The method 3900 includes providing a shell browser having a default previewer for the multiple item types at 3902. The method 3900 further includes providing an extensibility mechanism for third party development of an alternative previewer for at least one of the multiple item types at 3904. The alternative previewer may be registered in the shell browser at 3906. In the case of an installed application, registration may occur substantially at the time of installation. For example, if the application is installed by an OEM, the alternative previewer may be registered before the user has acquired the computer. Alternatively, the user may install the application locally or remotely.

There are many possible approaches for the extensibility mechanism referenced above in 3904. One such approach involves exposing a set of application program interfaces (APIs) so that independent software vendors (ISVs) and other third party developers may develop alternative previewers. With the API approach, a registration mechanism exists which allows an ISV to associate their preview control with an item type owned by the ISV. When an item or file of that type is selected in the shell browser, the ISV's preview control is instantiated via this registration mechanism and the extensibility API. The API provides data to the preview control: data representing the selected item(s) in the view and data representing the parent container of the items in the view. The preview control operates on this data and provides a user interface through the API which is presented in the shell browser. The user may provide input with keystrokes and mouse events which are passed by the shell browser to the preview control which can operate on those user input events.

Those skilled in the art will appreciate that many approaches are possible in the context of the extensibility mechanism of the present invention. In addition to the API approach, similar functionality may be achieved via user configuration, a pointer to HTML or hosting a flash. Moreover, the extensibility model may require that only one application that owns the item type selected may provide only one alternative previewer. In other words, the number of available previewers may be limited to a default previewer and one alternative previewer to avoid a poor user experience in which multiple registered, extended previewers are in competition with one another. However, another model would be to allow any application that can handle the selected item type to provide one additional previewer. An alternative model would allow any running code to provide one additional previewer for any item type. It may also be desirable under certain circumstances to allow replacement or removal of the default previewer. Many other models are possible and are contemplated by the present invention.

Figure 66:
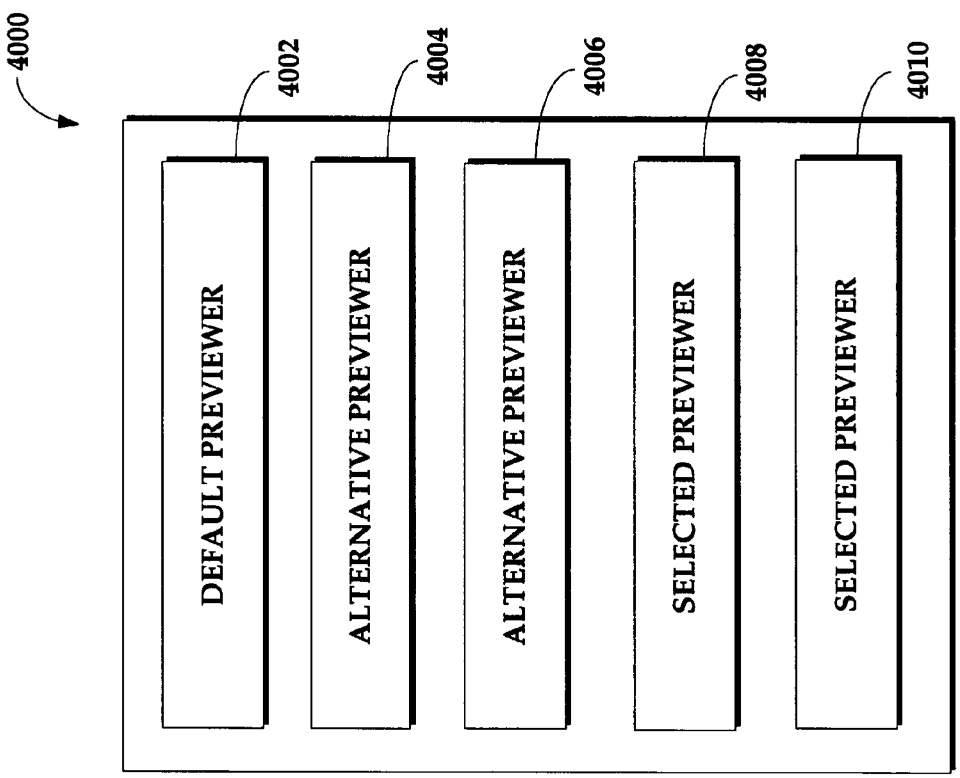
FIG. 66 is a block diagram of a data structure containing information indicative of multiple previewers in a shell browser.

FIG. 66 is a block diagram of a data structure 4000 which is stored on one or more computer-readable media and which contains information indicative of a plurality of previewers in a shell browser. The data structure 4000 includes a default previewer field 4002 containing information indicative of a default previewer which supports multiple item types. An alternative previewer field 4004 contains information indicative of an alternative previewer for a first item type. Another alternative previewer field 4006 may contain information indicative of a second alternative previewer for the first item type, or it may contain information indicative of an alternative previewer for a second item type. Those skilled in the art will appreciate that in some cases there may only be one alternative previewer field, and in other cases there may be two or more alternative previewer fields. The selected previewer field 4008 contains information indicative of whether to invoke the default previewer or an alternative previewer when items of a particular item type are displayed in the shell browser. In the event that field 4006 contains information indicative of an alternative previewer for a second item type, a selected previewer field 4010 may contain information indicative of whether to invoke the default previewer or the alternative previewer when one or more items of the second item type are displayed in the shell browser. The information contained in fields 4002, 4004 and/or 4006 may comprise the previewer code which is configured to run when a user selects an object of that type.

Defining a Scope with Explicit Exclusions: As discussed above with reference to FIGS. 37-38**, a user or application may define a scope across multiple physical locations. According to an illustrative aspect of the invention, a user or application may also define exclusions from the scope, identifying specific locations which are not to be included in the scope, using an advanced user interface that removes the ambiguities associated with tri-state selection controls. Thus, one or more aspects of the present invention may be used in a software input control in which the user defines a scope, or range, of items to be affected by a subsequent computer operation. Examples include defining a scope of software features to be installed, or a scope of storage locations to be searched. These are but two examples provided for illustrative purposes, and are not intended to limit the scope of the invention.

Figure 67:
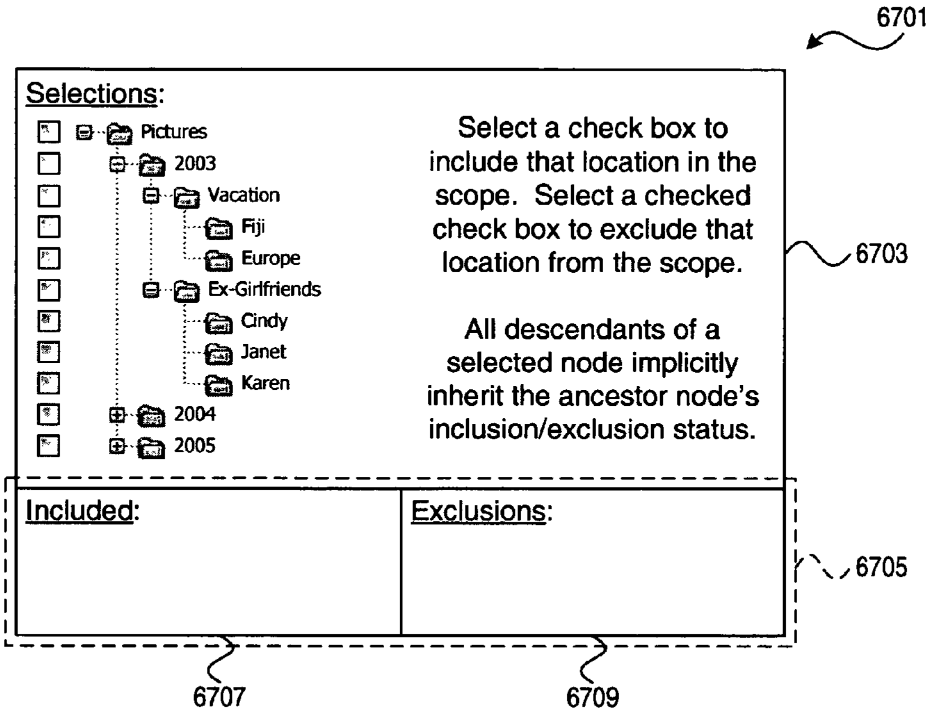
FIG. 67 illustrates a scope input control according to one or more illustrative aspects of the invention.

According to an illustrative aspect of the invention, with reference to FIG. 67, a scope selection control 6701 may, in addition to providing a hierarchical selection tree 6703, include a basket 6705 identifying explicitly included items 6707 and explicitly excluded items 6709. The scope selection control 6701 allows users to quickly visually see that which is included in and excluded from a scope by inspecting the basket. The control 6701 also provides the user detailed control at each folder level to specify what is included or excluded in the scope through interaction with the tree 6703. According to various aspects of the invention, further described below, the scope selection control 6701 may use different visual indications to show the different states of inclusion in a resultant scope. By keeping the basket 6705 synchronized to the tree 6703, the scope selection control 6701 allows a user to quickly switch between hierarchy tree and exclusion basket modes of scope inspection, providing a significant optimization of existing controls for scope creation and modification.

Figure 68:
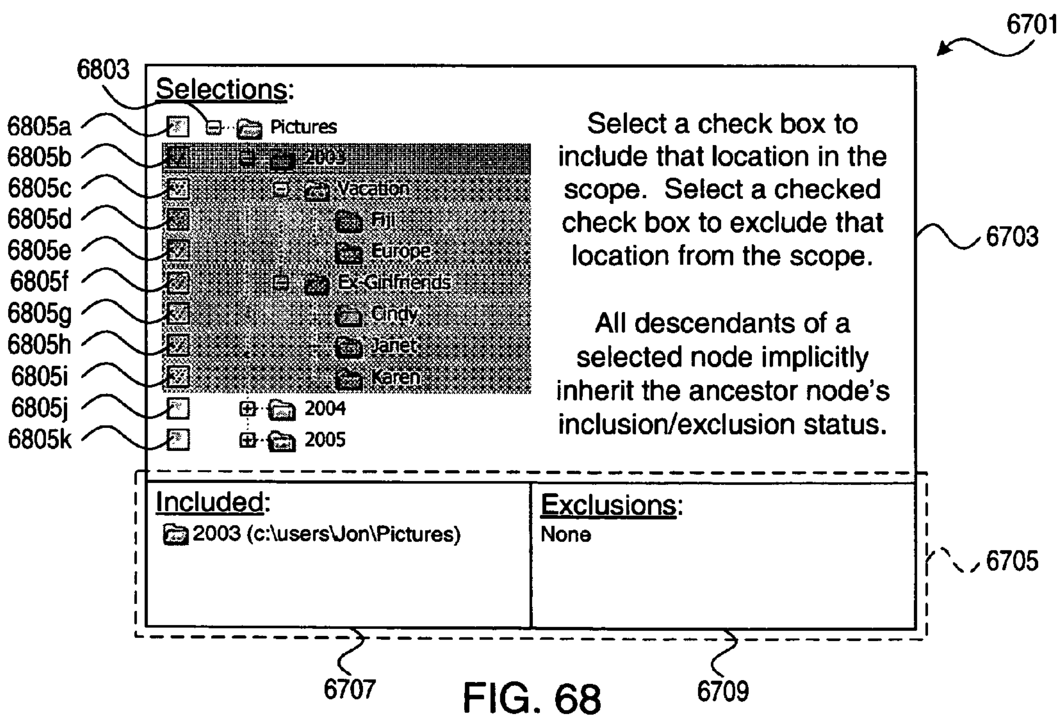
FIG. 68 illustrates a scope input control according to one or more illustrative aspects of the invention.

The operation of scope selection control 6701 will now be described with further reference to FIG. 68. The scope may be defined as the resultant set of items selected for inclusion by the user, explicitly or implicitly, via scope selection control 6701, minus items explicitly or implicitly selected for exclusion by the user. Explicit selection refers to the user affirmatively selecting a specific item for inclusion or exclusion. Implicit selection refers to descendants of an affirmatively selected item inheriting the inclusion/exclusion status of the explicitly selected ancestor. An item is said to be unselected when the user has neither explicitly nor implicitly selected the item for inclusion or exclusion.

The hierarchical selection tree 6703 may include an expand/collapse widget 6803 next to each folder having at least one subfolder, as is known in the art. Clicking on or otherwise selecting an expand/collapse widget 6803 expands or collapses the corresponding node of the tree. Clicking on or otherwise selecting any other location of a row may toggle selection of that location from the current scope, as described herein. Double clicking on a row may both select the node for inclusion/exclusion and may expand its children by one or more levels. The user may also select a checkbox 6805*a*-6805*k* corresponding to the selected item to toggle the status of the item.

When a user explicitly selects a row for inclusion the scope selection control 6701 may indicate the selection in the hierarchy by presenting a first inclusion indicator indicating the item is explicitly included, for example, by drawing or rendering an indicator or graphic on the display screen. For example, in FIG. 68, a user might be defining a scope of search locations to search for a sought after digital photo. Checkbox 6805*b* indicates the user has explicitly selected '2003,' referring to photos taken during the year 2003. Checkbox 6805*b* is checked, and the corresponding row may be highlighted. All files and folders contained within the checked folder are thus presently included in the scope. If the explicitly selected folder contains subfolders, the control 6701 may automatically expand the subfolders one or more levels for display to the user.

Explicitly selecting '2003' also results in the implicit selection of all children and descendants of '2003.' Implicitly selection for inclusion may be represented by presenting a second inclusion indicator indicating an item is implicitly included. For example, in FIG. 68, checkboxes 6805*c*-6805*i* corresponding to all descendants of '2003' are presented to include a faded check mark, and each corresponding row may be presented with faded highlighting.

When the user explicitly selects an item, the item may also be added to the basket 6705 in the appropriate location, i.e., either included items 6707 (inclusions) or excluded items 6709 (exclusions). The control preferably may maintain a 1-to-1 ratio between explicitly selected items and entries in the basket. For example, in FIG. 68 the user has explicitly selected the folder '2003' for inclusion in the scope. The control 6701, in addition to marking the folder '2003' as explicitly selected in the hierarchy 6703, also lists the explicitly selected item in inclusions 6707. Because the user has not yet selected any other location for inclusion or exclusion, there are presently no other entries in basket 6705 in FIG. 68.

According to an aspect of the invention, a folder may be considered implicitly selected even when the user originally explicitly selected the folder for either inclusion or exclusion, under certain circumstances. For example, assume a user first explicitly selects the folder Vacation. The Vacation folder becomes explicitly selected, and the Fiji and Europe subfolders are implicitly selected. Assume the user subsequently explicitly selects the 2003 folder. The 2003 folder is marked as explicitly selected, and all subfolders, including the Vacation subfolder, are marked as implicitly selected. That is, any time a user explicitly selects an item, all sub items may be marked as implicitly selected, regardless of their previous selection state. However, according to an aspect of the invention, the fact that the user previously explicitly selected an item may be stored for future use. For example, suppose the user later de-selects the 2003 folder, realizing the 2003 folder was selected by accident in the first place. Each of the sub items of the 2003 folder may revert to their previous states, and thus the Vacation folder returns to an explicitly selected state. Once the user is done editing the scope and desires to save the scope for future use, the scope may be saved including each selection, or the scope may be saved without information regarding selections that are irrelevant to the final saved scope. For example, in the above example, the fact that the user first selected the Vacation folder may be discarded when the scope is saved, because the previous selection of the Vacation folder may be irrelevant to the final saved scope.

Figure 69:
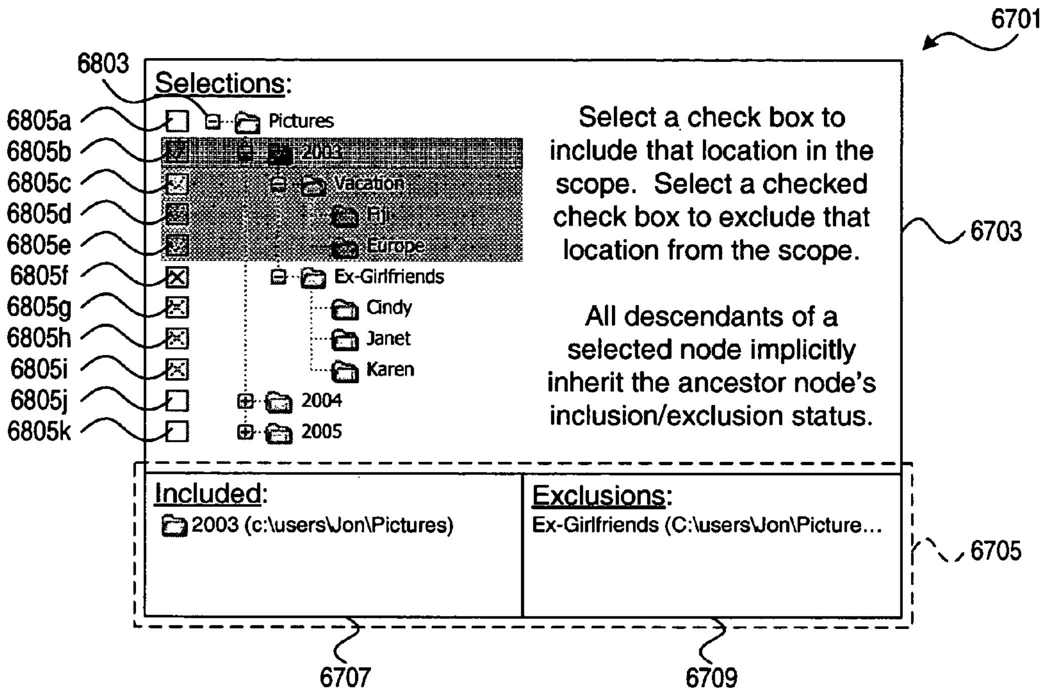
FIG. 69 illustrates a scope input control according to one or more illustrative aspects of the invention.

With further reference to FIG. 69, when a folder is selected for exclusion by a user, that folder and all descendants are removed from the scope. A user may select a folder for exclusion by explicitly selecting that folder after it has been implicitly selected for inclusion, i.e., the user reselects the folder. When a user explicitly selects a row for exclusion the scope selection control 6701 may indicate the selection in the hierarchy by presenting a first exclusion indicator indicating the item is explicitly excluded. For example, in FIG. 69, checkbox 6805*f* indicates the user has explicitly excluded the 'Ex-Girlfriends' folder from the scope, e.g., if the user does not want to include photos of ex-girlfriends in the search results. Checkbox 6805*f* is marked with a solid X, and the highlighting on the corresponding row is removed. All files and folders contained within the explicitly excluded folder are thus excluded from the scope. If the explicitly excluded folder contains subfolders, the control 6701 may automatically collapse the subfolders, thus only displaying the explicitly excluded folder to the user (without descendants). If the user subsequently expands the widget corresponding to an explicitly excluded folder, the descendants may be displayed with the second exclusion indicator, illustrating implicit exclusion.

Explicitly selecting '2003' for exclusion also results in the implicit exclusion of all children and descendants of '2003' from the scope. Implicit selection for exclusion may be represented by presenting a second exclusion indicator indicating an item is implicitly excluded. For example, in FIG. 69, checkboxes 6805*g*-6805*i* corresponding to all descendants of 'Ex-Girlfriends' are presented including a faded X, and the highlighting on each corresponding row may be removed.

When the user explicitly excludes an item, the item may be added to exclusions 6709 of basket 6705, visually depicting each explicit exclusion as a property of an explicitly included item (each exclusion also may optionally be stored as a property of an inclusion). For example, in FIG. 69 the user has explicitly excluded the folder 'Ex-Girlfriends' for exclusion from the scope. The control 6701, in addition to marking the folder 'Ex-Girlfriends' as explicitly excluded in the hierarchy 6703, may list the explicitly excluded item in exclusions list 6709 corresponding to explicitly included folder 2003 in inclusions 6707.

If a user explicitly selects an explicitly included item, the control 6701 may interpret the explicit reselection of the item to indicate the user changed his or her mind regarding that item's inclusion in the scope. However, instead of explicitly excluding the reselected item, the control 6701 may simply remove the explicit inclusion status from the reselected item as well as the implicit inclusion status of any descendants, without marking the reselected item or any of its descendants as either explicitly or implicitly excluded. The items revert to the unselected state. Correspondingly, the item is removed from basket 6705, the check box corresponding to the item in tree 6703 may return to its initial blank state, and any highlighting may be removed. Thus, according to an illustrative aspect of the invention, only a previously implicitly included item can be explicitly excluded from the scope.

Figure 70:
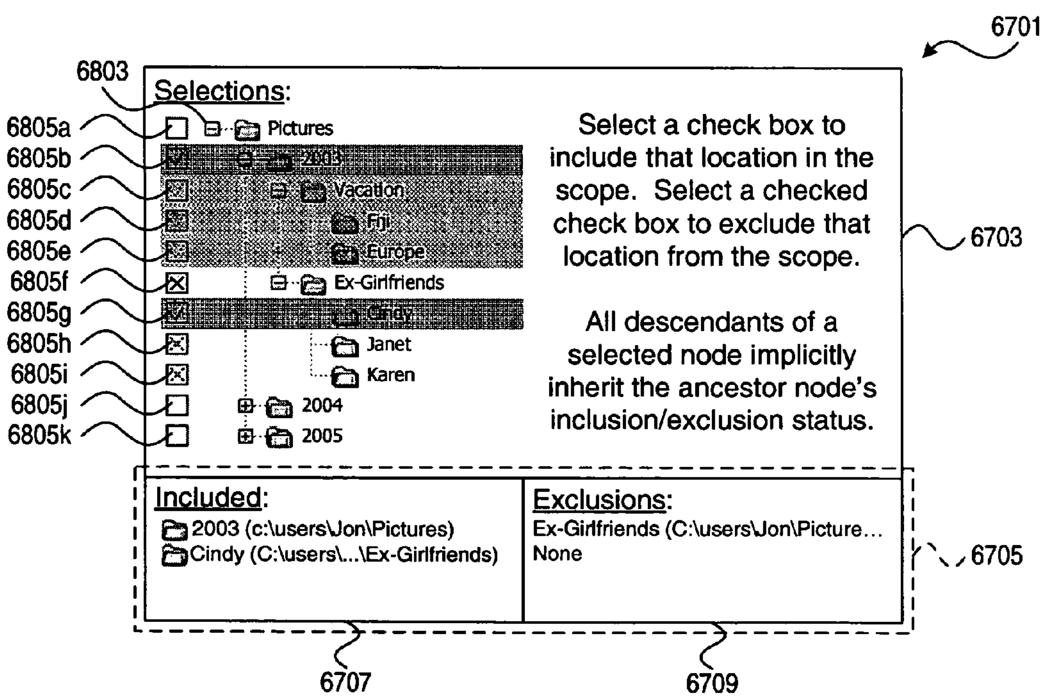
FIG. 70 illustrates a scope input control according to one or more illustrative aspects of the invention.

With further reference to FIG. 70, a user may explicitly include an item from a previously implicitly excluded location. In FIG. 70, the user has decided to include the folder 'Cindy' in the scope, e.g., because the user is still friends with his ex-girlfriend Cindy, but he still does not want to include photos of his other ex-girlfriends in the scope. Upon explicitly selecting the folder 'Cindy' for inclusion, the scope selection control 6701 presents first inclusion indicator in checkbox 6805*g* and highlights the corresponding row. The implicit exclusion status of the folders Ex-Girlfriends, Janet, and Karen remain unchanged, because those folders are not descendents of Cindy, but rather are ancestor and peers, respectively. With the explicit inclusion of the folder Cindy, the scope selection control 6701 adds a corresponding item to basket 6705 in inclusions 6707.

In addition to interacting with tree 6703, a user may similarly interact with basket 6705 to view or modify the scope. The basket preferably displays an item name, location, and icon for each explicitly selected item (although different information may be displayed as desired). The path may be truncated if the physical display size of the basket precludes displaying the entire path for an item, e.g., with ' . . . ' as displayed in FIG. 69 (alpha blending may alternatively be used). Alternatively, the truncation may occur in the middle of the path, illustrated by the ellipses in the middle of the path in FIG. 70. Control 6701 may determine what portion of a path to truncate according to any desired algorithm. In one illustrative embodiment, control 6701 may determine truncation according to the following priority: show the immediate parent first, show the root (e.g., C:\, D:\, etc.) second, and finally fill in the path with the parent's sequential ancestors until the full path is displayed or until the allotted space is full.

Figure 71:
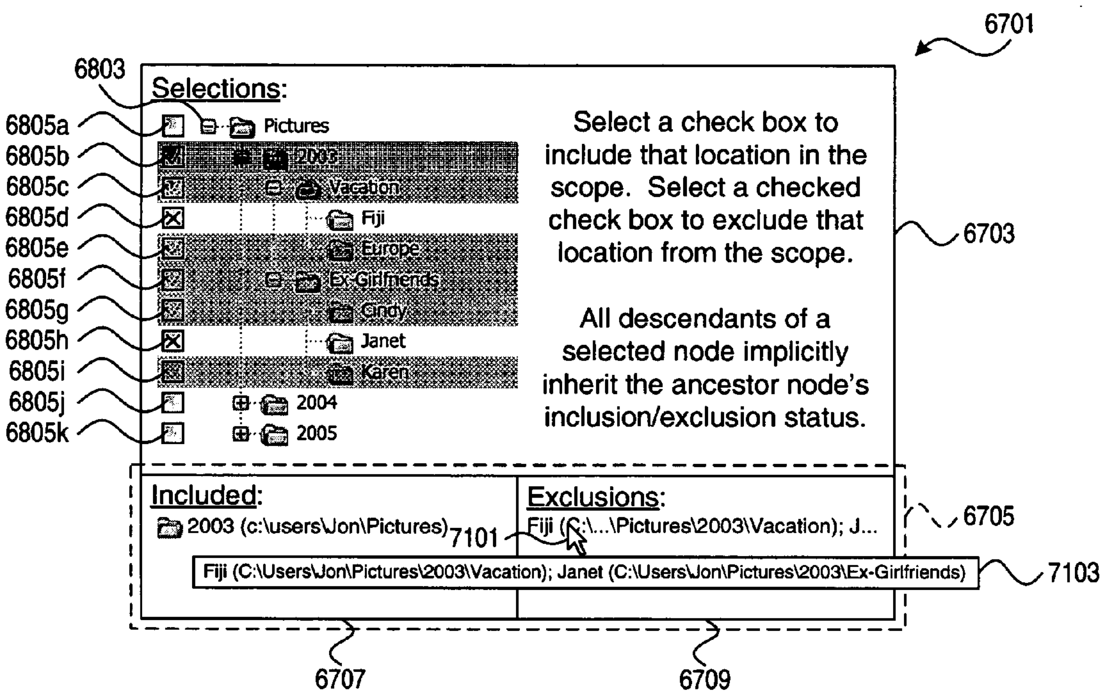
FIG. 71 illustrates a scope input control according to one or more illustrative aspects of the invention.

Selection of a folder in basket 6705, e.g., may result in the tree 6703 automatically expanding and/or scrolling to display the selected folder, if not already visible in the current view of the tree 6703. The tree may also automatically expand the selected folder to display any subfolders of the selected folder. Explicit exclusions may be defined as multi-value properties (MVP) of explicitly included items, where multiple exclusions corresponding to the same explicitly included item result not in an additional row in the basket, but rather in another value added to the exclusions corresponding to the explicitly included item. For example, the view in FIG. 71 results from the user explicitly including the folder '2003', then explicitly excluding the folder 'Fiji,' and finally explicitly excluding the folder 'Janet.' As the user hovers the mouse pointer 7101 over the exclusions from '2003' in basket 6705 the control 6701 may display the fully qualified MVP 7103 so the user can inspect the exclusions. As with inclusions, when a user selects an exclusion from basket 6705 the control 6701 may automatically navigate tree 6703 to the selected item.

When the user completes his or her definition or modification of a scope, the user may save the scope for future use, e.g., to storage medium 22, 24, 39, 30, or the like. Saving scopes may be useful when the user repeatedly performs searches over the same scope, with varying match criteria. When a scope is saved, it may be saved as an ordered list of explicit inclusions, with each entry in the list of explicit exclusions having zero or more associated explicit exclusions as an MVP. Thus, the list may store all explicit selections by the user. However, an item might not be included in the list when a user first explicitly selects the item and then subsequently explicitly deselects that same item (for example, realizing it was selected by accident in the first place). In this manner, the proper scope can be recreated based on the ordered list, and any new folder, which is a descendant of an explicitly included or excluded item, added between uses of the scope will be properly taken into account when the scope is reused.

For example, according to an illustrative aspect of the invention a scope may be stored as an extensible Markup Language (XML) file. The below XML illustrates a scope identifying explicit inclusions and explicit exclusions, wherein each exclusion is stored as a property of an inclusion, and wherein order is inherently maintained by the order in which data is stored in the XML file:

```
<scope>
    <include path="c:\">
        <exclude path="c:\foo">
            <include path="c:\foo\alpha"/>
            <include path="c:\foo\beta"/>
        </exclude>
        <exclude path="c:\too"/>
        </include>
        <include path="d:\"/>
    </scope>
```

Figure 72:
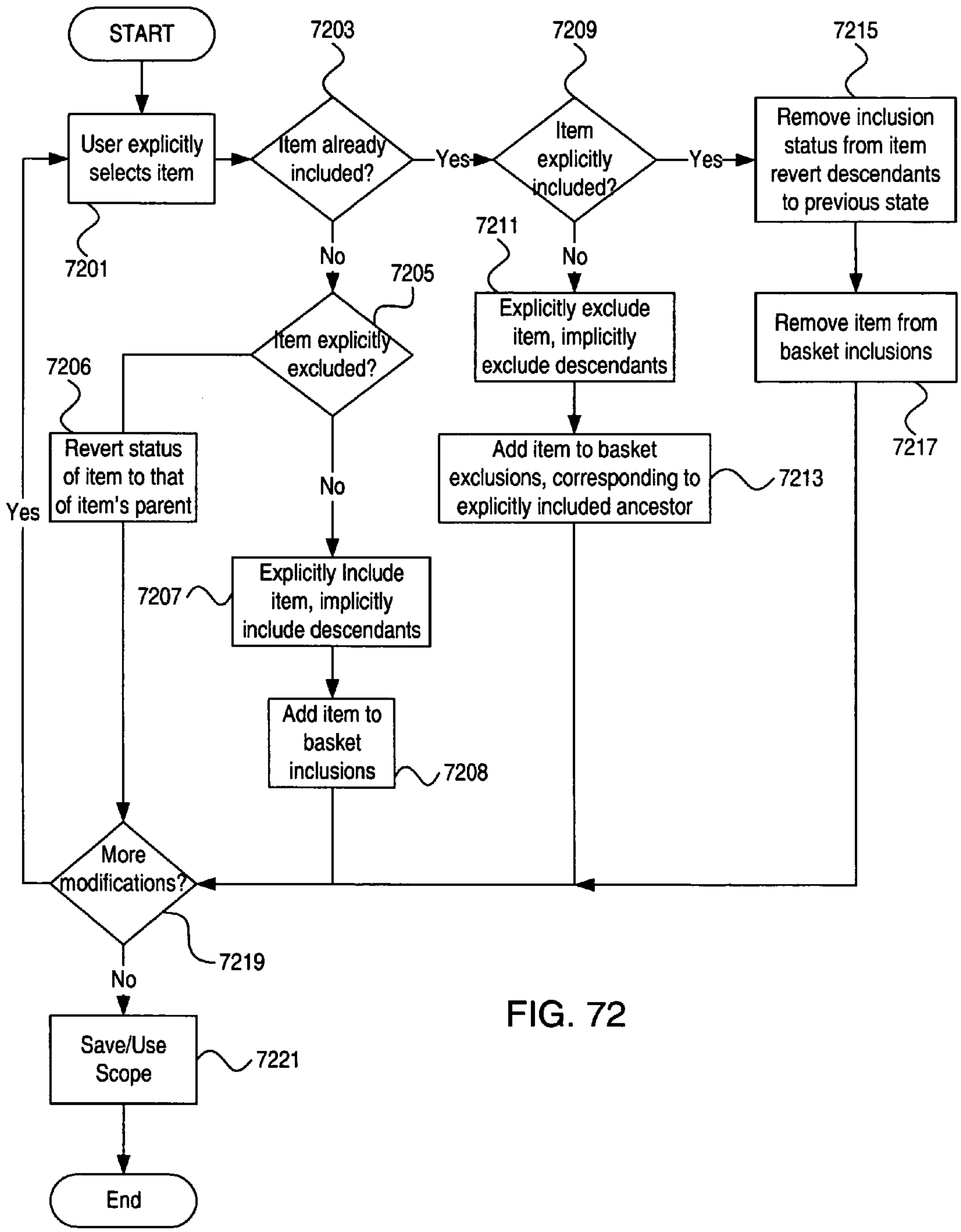
FIG. 72 illustrates a method for specifying a scope according to one or more illustrative aspects of the invention.

FIG. 72 illustrates a method for generating a scope using the scope selection control 6701 described above. In step 7201, a user explicitly selects an item in tree 6703. In step 7203 the scope selection control 6701 determines whether the explicitly selected item is already set for inclusion in the scope. If so, the method proceeds to step 7209. If not, the scope selection control 6701 in step 7205 determines whether the explicitly selected item is currently set as explicitly excluded from the scope. If so, then in step 7206 the scope selection control reverts that status of the explicitly selected item to the status of the parent of the explicitly selected item. If in step 7205 the explicitly selected item is not currently explicitly excluded (meaning the item is either implicitly excluded or is selected), then the scope selection control in step 7207 explicitly includes the explicitly selected item in the scope, and implicitly includes in the scope all descendants of the explicitly selected item. Next, in step 7208, the scope selection control 6701 adds the explicitly selected item to inclusions 6707 in basket 6705.

In step 7209 the scope selection control 6701 determines whether the previously included item is previously explicitly included or previously implicitly included. If the item was previously implicitly included, then in step 7211 the scope selection control 6701 explicitly excludes the explicitly selected item, and implicitly excludes all descendants of the explicitly selected item. Next in step 7213, the scope selection control 6701 adds the explicitly selected item to exclusions 6709 in basket 6705, corresponding to the nearest explicitly included ancestor of the explicitly selected item.

If in step 7209 the explicitly selected item was previously explicitly included, then in step 7215 the scope selection control 6701 removes the inclusion status for the explicitly selected item and reverts all descendants of the explicitly selected item to their previous state. In step 7217 the scope selection control removes the explicitly selected item from inclusions 6707, along with any corresponding exclusions 6709. Those of skill in the art will appreciate that behavior when an item is unselected may vary. For example, an explicitly included or excluded item might not revert to the unselected state when an ancestor is unselected.

After any of steps 7206, 7208, 7213, or 7217, in step 7219 the scope selection control determines whether any more modifications are desired. This determination may be implicit, in that the user does not specifically request to make more modifications, but instead simply continues to step 7201 to make another modification or, on the other hand, the user selects a 'Save' or 'Search' button in step 7221 to indicate to the computer 20 that the user has completed defining the scope, and the computer 20 may use the scope for whatever purpose the user defined the scope. The scope may be said to be the resultant ordered list of explicitly included items, with corresponding explicit exclusions, defined by the basket.

It will be understood by one of ordinary skill in the art that one or more steps may be optional, and steps may be rearranged to produce similar results. In addition, where the above description indicates that the scope selection control 6701 performs some action or makes some decision, the scope selection control 6701 may be operating in accordance with or under the control of control logic, such as software or hardware instructions, stored on computing device 20 and executed by processor 21.

Figure 73:
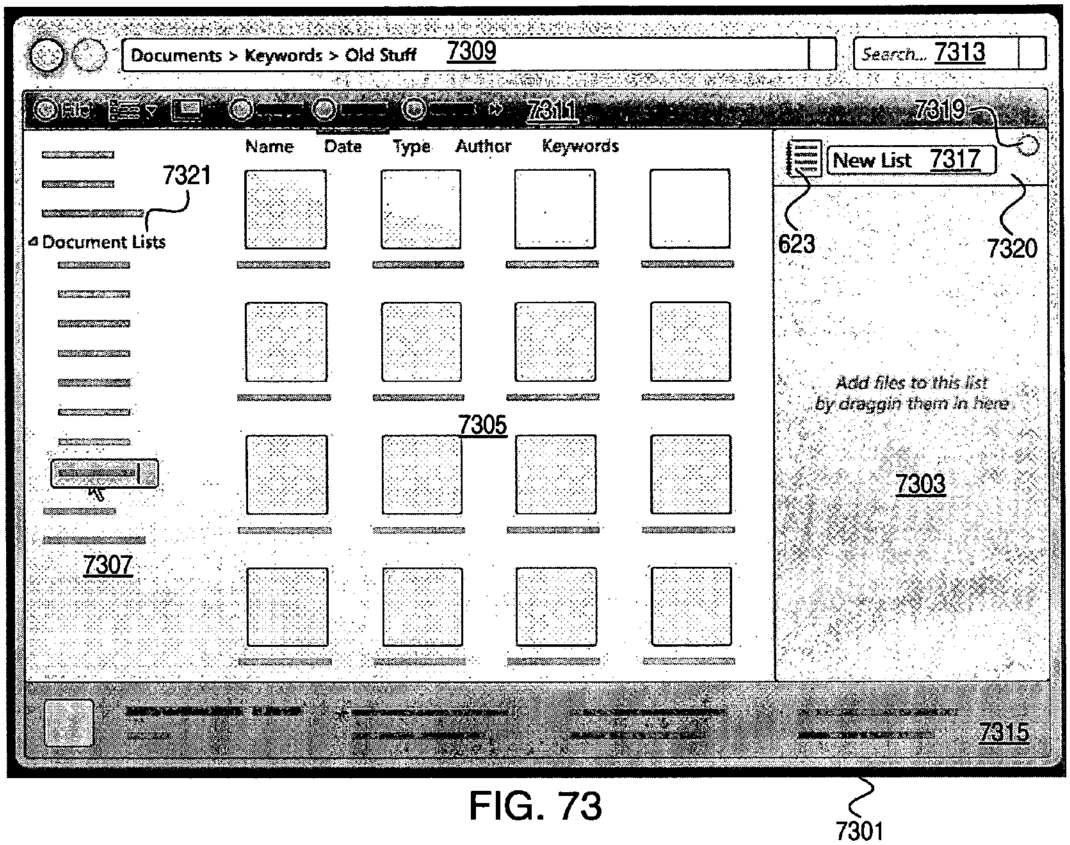
FIG. 73 illustrates an explorer frame with an integrated list pane according to an illustrative embodiment of the invention.

List Pane for Manipulation of Static Lists: As described above with reference to FIGS. 51-66, a shell browser (also referred to as a file explorer, explorer, or file browser) may be used to navigate among file and non-file items. An additional illustrative embodiment will now be described with respect to FIGS. 73-76. FIG. 73 illustrates an explorer frame 7301 having a list pane 7303, primary view pane 7305, and navigation pane 7307. Explorer frame 7301 may also include other features such as a breadcrumb bar 7309 (alternatively referred to as a virtual address bar), menu bar 7311, search window 7313, and information or preview pane 7315. List pane 7303 may behave similar to basket control 201**, described above. The list pane is thus a simple in-frame module available for a user to manipulate collections, e.g., static lists, in the context of the main explorer window.

Thus, for example, a user may create a to-do list and open the to-do list in the list pane 7303, add several items to the to-do list while browsing the system shell via primary view pane 7305, and then close the list pane 7303, optionally saving the revised to-do list. As another example, a user may select certain photos stored across multiple folders viewed sequentially in primary view pane 7305, place the selected photos in the list pane 7303, and print the collection of photos by selecting all the photos in the list pane 7303 by selecting print from a context menu or menu bar 7311. The user can close the list pane with or without saving the new collection of photos, as desired.

A user may open the list pane by selecting a Window menu in menu bar 7311, then selecting List Pane from the Window menu (not shown). Selecting Window>List Pane again may toggle the display status of the list pane 7303, equivalent to Window>List Pane. In some embodiments a keyboard shortcut may be used, e.g., Ctrl-K, to toggle the list pane 7303. The act of a user selecting Window>List Pane from the menu bar 7311, or inputting Ctrl-K via a keyboard may be ambiguous as to whether the user desires to create a new persisted static list, or whether the user desires to gather a few items for an immediate task at hand, then close the list pane without saving the list. Thus, according to an embodiment of the invention, when a user opens the list pane 7303, any objects in the list pane 7303 are at least temporarily stored. If the user closes the list pane 7303 without explicitly saving the static list, then the contents of the static list are discarded. However, the user may save the static list to persist the static list, e.g., to reuse the static list later, to or share the static list with others, etc. In one embodiment, the temporary storage location may be LocalAppData\Windows\Temporary List.wpl. Each explorer window opened by the user may have a unique temporary storage location associated with it for the purpose of storing the temporary static list until the user optionally affirmatively saves the static list.

The user can use the temporary list in the same manner that any other list in the basket is used. Items can be added, removed, re-ordered, etc. When the list pane 7303 is open, the user can right-click on any item in the primary view 7305 and choose "Add to List Pane" from a context menu (not shown) or view the menu bar 7311, which will insert that item as a new last item in the list in list pane 7303. The user may also drag and drop items into list pane 7303. However, as this is a temporary list (similar to the "now playing" items in Windows® Media Player), the contents of this list are discarded when the user closes the frame 7301 or closes the list pane 7303. The system may optionally notify the user if there are unsaved contents in the list pane before closing the list pane 7303 or frame 7301.

If the user desires to save the temporary list, the user may select the title textbox 7317, inputting a name for the list identified by the contents in list pane 7303, and selecting the Save icon 7319. Selecting the Save icon 7319 may invoke the common file dialog to allow the user to select the location in which to store the static list. Alternatively, the user may context-select (e.g., right-click), in the list background, and select "Save . . . " from the context menu, to invoke the common file dialog.

The user may also open the list pane 7303 by selecting File>New>List from the menu bar 7311, which will open the list pane 7303 if it is previously closed. If the list pane is already open, selecting File>New>List results in the system discarding any items currently in the list pane 7303 and creating a new temporary list. The new temporary list behaves just as a list created by the user selecting View>List Pane, and has the same persistence model (i.e., it is discarded when closed, unless the user first saves it).

The navigation pane 7307 may include a lists node 7321, which may be representative of all static lists created by the user, or of all static lists created by the user and stored in a specific location. A user may also be able to create a new list by context-selecting the lists node 7321 and selecting "New List" from the context menu, which results in the frame 7301 opening the list pane 7303 with an empty list with a default title, e.g., "New List" or "New List (n)" where multiple default named new lists have been created. Optionally, in the navigation pane 7307 the list name of the newly created list may automatically be in edit mode and/or the user may edit the list name in title text box 7317 in the list pane 7303. The new list is created in the default save location for the given explorer frame 7301.

According to aspects of the invention, the list title may always be editable to input a new name for the list in list pane 7303, which results in the system renaming the list on the storage device. If the user selects save button 7319 for an already persisted list (i.e., the list is already saved), the system may perform as if the user selected a "Save as . . . " option. Additionally, when the user selects File>New List from the menu bar 7311, there might be no change to the state of appearance of the navigation pane. That is, if the lists node 7321 is presently expanded, the new list appears hierarchically underneath the lists node 7321, provided there is space available or its alphabetic insertion allows it to be viewable. However, if the lists node 7321 is not presently expanded, then there is no visible change to the navigation pane 7307. When the list in list pane 7303 is empty, the list pane 7303 may display a message indicating to the user how to create a list, e.g., "Add files to this list by dragging them in here."

A user may double-click or otherwise select the list pane header 7320 to close the list pane 7303 and present the list contents in primary view 7305. The user can alternatively press Shift+double-click to open a new explorer window rooted in the list displayed in list pane 7303. The user can select the 'X' (or equivalent) in the uppermost right corner of the list pane 7303 (not shown) to close the list pane 7303 without any navigation in the primary view 7305. When persisted lists are edited in the basket, there may be an explicit save model, where when the user closes the list pane 7303 or the explorer frame 7301, or navigates the list pane to another list, the system presents an explicit dialog box to ask the user whether the user desires to save any changes.

Items in the list pane 7303 may exhibit similar behavior as items in primary view 7305. For example, clicking or selecting any given item in the list pane 7303 selects that item. When focus shifts between the primary view 7305 and the list pane 7303, both the primary view 7305 and the list pane 7303 may continue to reflect their selection state (using the soft-select state for whichever pane does not have input focus). However, only one pane truly has focus, which is reflected in the view as a visual cue to the user as to what the arrow keys will do. When focus is in the list pane 7303, the same selection and keys may work as in the primary view 7305—Ctrl+A to select all, arrow keys to move, etc.

Using the system described above, a user can drag and drop to and within the list pane 7303, allowing the user to add, delete, re-order, and otherwise manipulate objects in a static list. When dragging into the basket, the system may provide various visual cues to the user. First, the explorer frame may highlight the outer edge of list pane 7303 to indicate that the list pane 7303 is an active drop target. The list pane may also provide an insertion bar (not shown) if there is more than one item in the list. As the user navigates the primary view 7305, the list pane 7303 remains rooted in a given list, which provides the user an efficient and simple mechanism by which to build up contents of a collection by navigating a file system in primary view 7305 without requiring the user to engage in a plentitude of tedious cross-window drag-drops.

Figure 74:
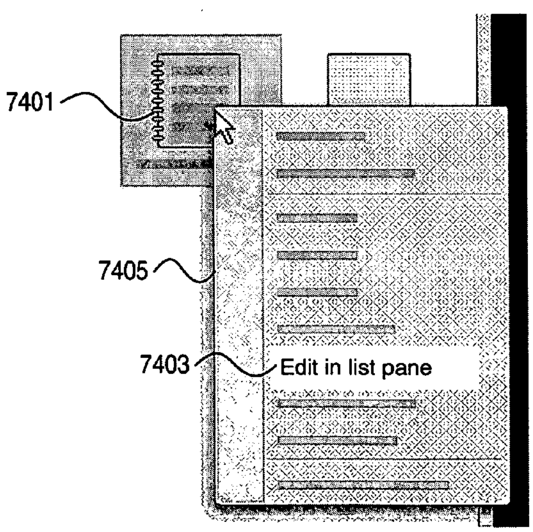
FIG. 74 illustrates a context menu for a list object according to an illustrative embodiment of the invention.

With further reference to FIG. 74, after a user creates and saves a list 7401, the user may reopen the persisted list 7401 in the list pane 7303 by context-selecting the persisted list 7401 to display a context menu 7405 and selecting a context option 7403 to open the list in the list pane 7303. The user can select the list icon 623 in the list pane header 7320 to select the entire contents of the list currently being edited in list pane 7303. The user may context-select (e.g., right-click) the list icon 623 to display context menu 7405. Optionally, the user may right-click and drag the icon 623 to a new location to move the storage location of the list or to make a copy of the list in a new location.

According to an aspect of the invention, a static list may have a task associated with it, e.g., "Print photos," "Burn CD," "Make movie from video clips," etc. In such an embodiment, selection of the task may open a blank list with task-specific controls. Alternatively, when a user opens a static list with which a task is already associated, the list pane 7303 may automatically display task specific controls dependent on the specific task. User interactions with the list pane 7303 remain the same, however, there is an overall optimized task the user is pushed toward while in a task-based mode.

Figure 75:
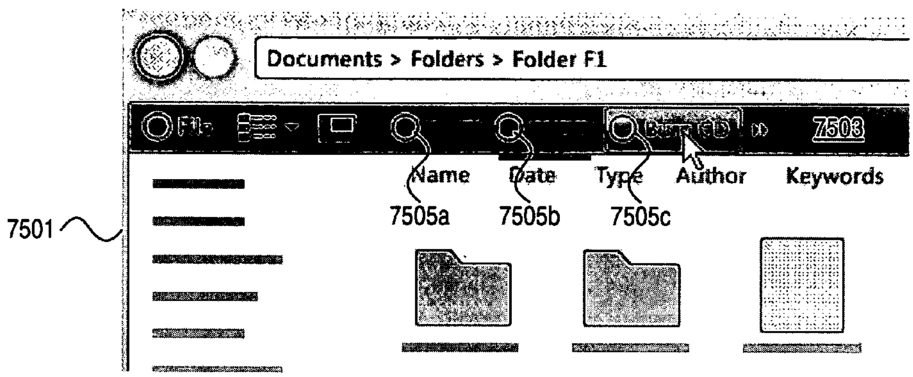
FIG. 75 illustrates a portion of an explorer frame having task-based controls according to an illustrative aspect of the invention.
Figure 76:
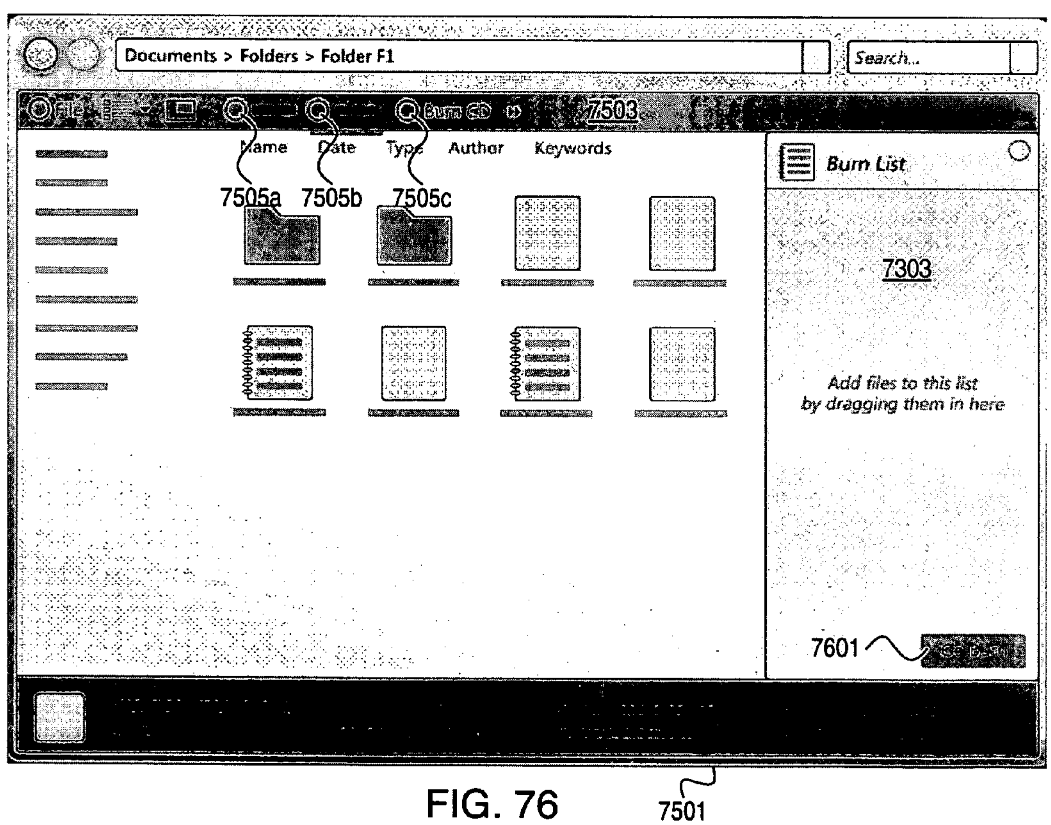
FIG. 76 illustrates an explorer frame with an integrated task-based list pane according to an illustrative embodiment of the invention.

Thus, for example, FIG. 75 illustrates a portion of an explorer frame 7501 prior to a user opening a list pane. The explorer frame 7501 includes menu bar 7503 having task options 7505$a$, 7505$b$, and 7505$c$. Task 7505$c$ specifically refers to burning a CD. Tasks 7505$a$ and 7505$b$ might refer to, e.g., printing photos and making a movie from video clips, respectively. Upon selection of task 7505*c*, the explorer frame opens list pane 7303 with integrated task specific control 7601, as further illustrated in FIG. 76. In this example the task specific control 7601 provides the user the option to write the contents of the static list to a CD or other optical media or storage device. In such a scenario, the system may be adapted with logic to know that actual copies of the objects identified are to be written to the CD or other media, and not simply shortcuts, or pointers, to the objects if the collection is a static list. The objects identified by the list in list pane 7303 may be written in their order prescribed by the static list, with annotations as applicable.

Task-based lists may also be temporary, and be discarded when the pane 7303 or frame 7501 is closed unless the user first saves the collection as described above. After the user completes the main task (burn, print, etc.) the task control 7601 may automatically switch to be a "Save" button to re-emphasize that the user will otherwise lose the task-based list when the user closes the list pane 7303 or frame 7501.

The list pane 7303 may be displayed in a countless number of ways with endless variations to display details, formats, etc., while still providing the functionality described above. Those of skill in the art will appreciate that the below description of an illustrative view is merely an example, and does not limit the scope of the invention as defined in the claims. Variations are possible depending on artistic design, allotted space, and the like. In one illustrative embodiment, the view state of the list pane may display tiles including 32×32 point icons with two rows of corresponding metadata. The icon size may optionally be locked (Ctrl+mouse may thus be disabled), or variable by the system and/or user. The list pane 7303 may optionally limit horizontal resizing such that tiles are never shown side-by-side, which also assists the user to cognitively maintain the order of items in the collection by viewing their vertical order. Also, the list pane preferably only sorts and displays items by their order in the static list.

Various additional optional features may be included in one or more illustrative embodiments of the invention. For example, when the user closes the explorer frame and the list pane is open on a named list (e.g., one that has an explicit name and not the temporary default name), when the user next re-opens a like explorer frame the list pane may remain open to the list the user was previously viewing. If a temporary to-be-discarded list is in the list pane when the frame is closed, that list is discarded but the list pane may remain open (and empty) when the explorer frame is re-opened.

The list pane preferably opens as the rightmost pane, and may open by default to be 200 pixels wide. The cursor may become a resize grabber when hovering over the border between the list pane 7303 and primary view 7305. The list pane can be resized to a minimum width, e.g., 33 pixels, and the list pane size is preferably persisted per explorer frame. The list pane can also be resized to a maximum size, e.g., as large as the primary view 7305 allows the list pane to grow (e.g., the list pane cannot be made larger than the smallest size of primary view 7305). Those of skill in the art will appreciate that the default size may be other than 200 pixels, and that the list pane may be presented in a position other than the rightmost pane. For example, on a system wherein the language reads right-to-left (instead of left-to-right as in most western countries), the list pane may appear as the leftmost pane instead of the rightmost pane.

Figure 77:
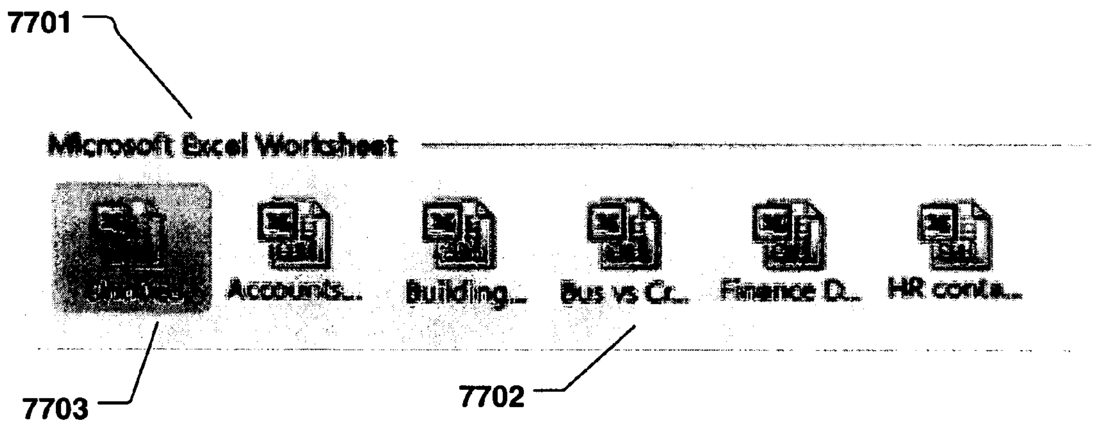
FIG. 77 depicts an example GUI view containing a preview representation of a file that is about to be created on the system.

Preview representation of saved files: An aspect of the invention relates to a system and method for providing an improved user experience when creating files by offering users a preview representation of a file that is about to be created on a system. FIG. 77 depicts an example view 7701 that may be found in a GUI when saving a file. In view 7701, various indicia 7702 are shown depicting files that exist according to the criteria used to generate the view 7701. Such criteria may be varied depending on user preference. For example, a view 7701 may be generated to display the contents of a given folder on the system. Alternatively, view 7701 may display all files of a given file type (e.g., MICROSOFT EXCEL™ Worksheet is shown in the FIG. 77 example). View 7701 may also result from combinations of criteria. For example, the view 7701** may be a view of all worksheets that belong to a certain user, or to a certain project, or that are stored in a certain folder. Possible criteria are near limitless, and include, in addition to the ones already listed above, file size, creation date, edit date, project, owner, memory location, user, file name, etc.

View 7701 may depict a preview representation 7703, or ghost, representing the file that is about to be saved on the system, where the ghost shows the user where the new file will appear in the GUI should the save operation be performed, and identifies the location or view in which the new file will be found if saved. In the FIG. 77 example, the file has not been given a name yet, so it bears a label of "Untitled." The ghost 7703 may have a distinct appearance to indicate that it represents a file that is not yet technically a stored file on the system. The distinction in appearance may be a transparency or opacity setting, color, font, highlight, or any other way of offering a different appearance. To help ensure that the user does not lose track of the ghost 7703 as the user navigates through different views (e.g., selecting a different folder in which to store the file), the ghost 7703 may be configured to always appear in a predetermined location in the view. For example, and as shown in FIG. 77, the ghost 7703 may be configured to appear as the first indicia shown. The difference in appearance may correspond to changes that occur when a file is selected. For example, the ghost 7703 may be selected by default, and its indicia may have whatever appearance is used in the system to denote selected objects (e.g., may be the same distinction discussed above).

Figure 78:
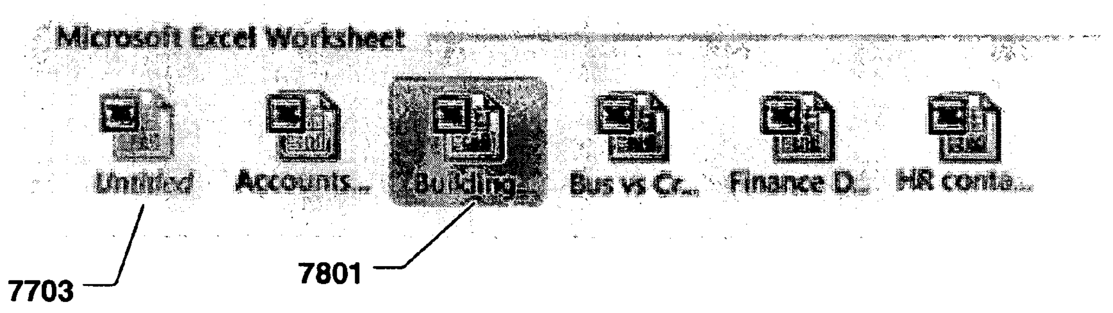
FIG. 78 depicts another example GUI view containing a preview representation of a file that is about to be created on the system.

The ghost 7703 may be treated as any other indicia in the view 7701. Users may select, highlight, modify, drag and drop, etc. the ghost 7703 as they would any other indicia. FIG. 78 depicts an example of the FIG. 77 view 7701, in which an indicia 7801 representing an existing file on the system has been selected by the user. That is, indicia 7801 may be given a distinct appearance as well, and may be given an appearance that is distinct from the ghost 7703. However, the ghost may include additional functionality not associated with the indicia 7801 for files that already exist. For example, ghost 7703 may be associated with a unique context menu of functions and options that are applicable to files that aren't already saved.

Figure 79:
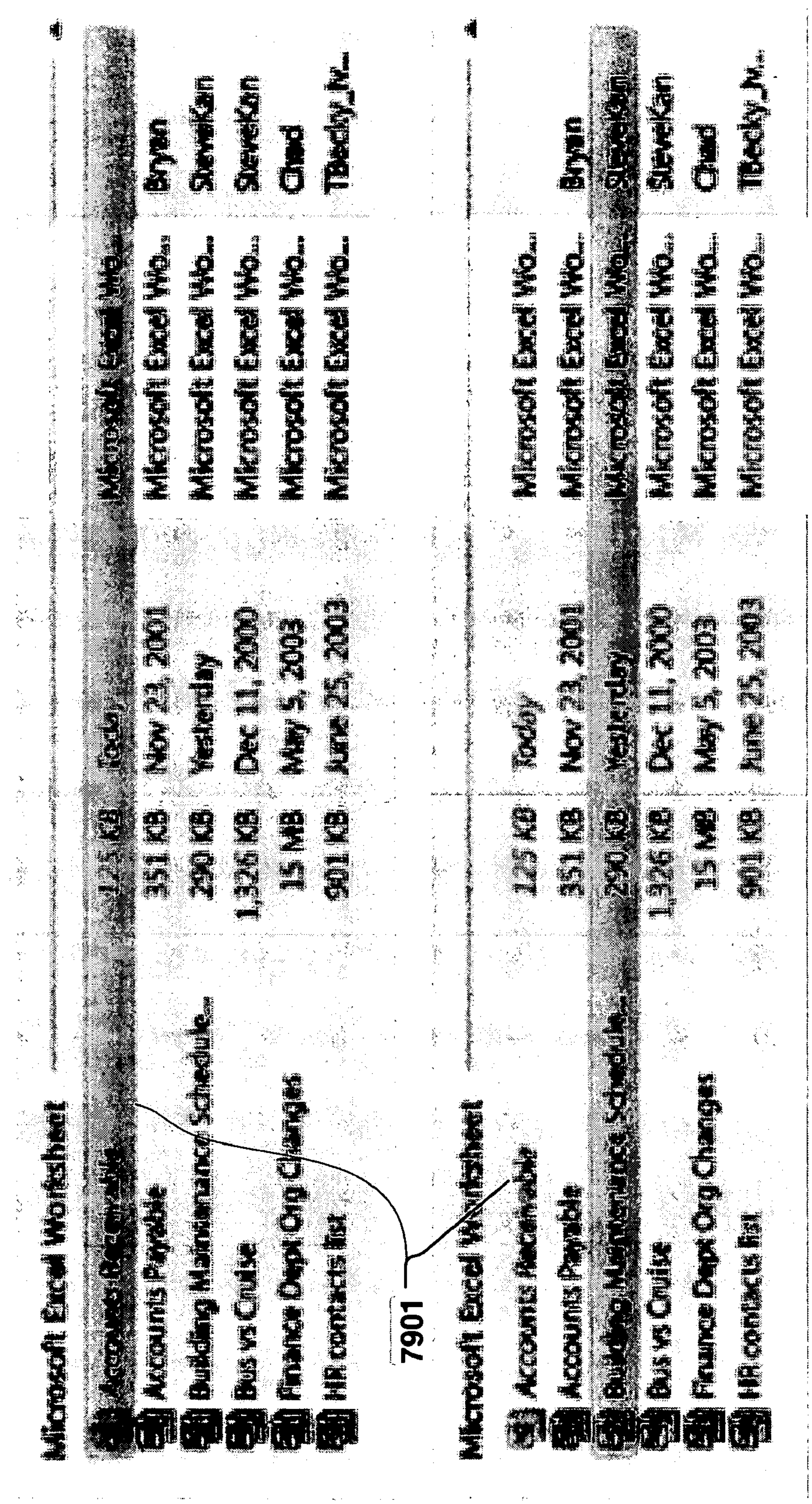
FIG. 79 depicts two additional examples of GUI views containing a preview representation of a file that is about to be created on the system.

Ghosts are not limited to GUIs and views in which large indicia are used. To the contrary, they may appear in other types of views as well, such as a listing as shown in FIG. 79. In FIG. 79, ghosts 7901 give the user a preview representation of a file that is about to be saved (in the example, the file has been named "Accounts Receivable").

Figure 80:
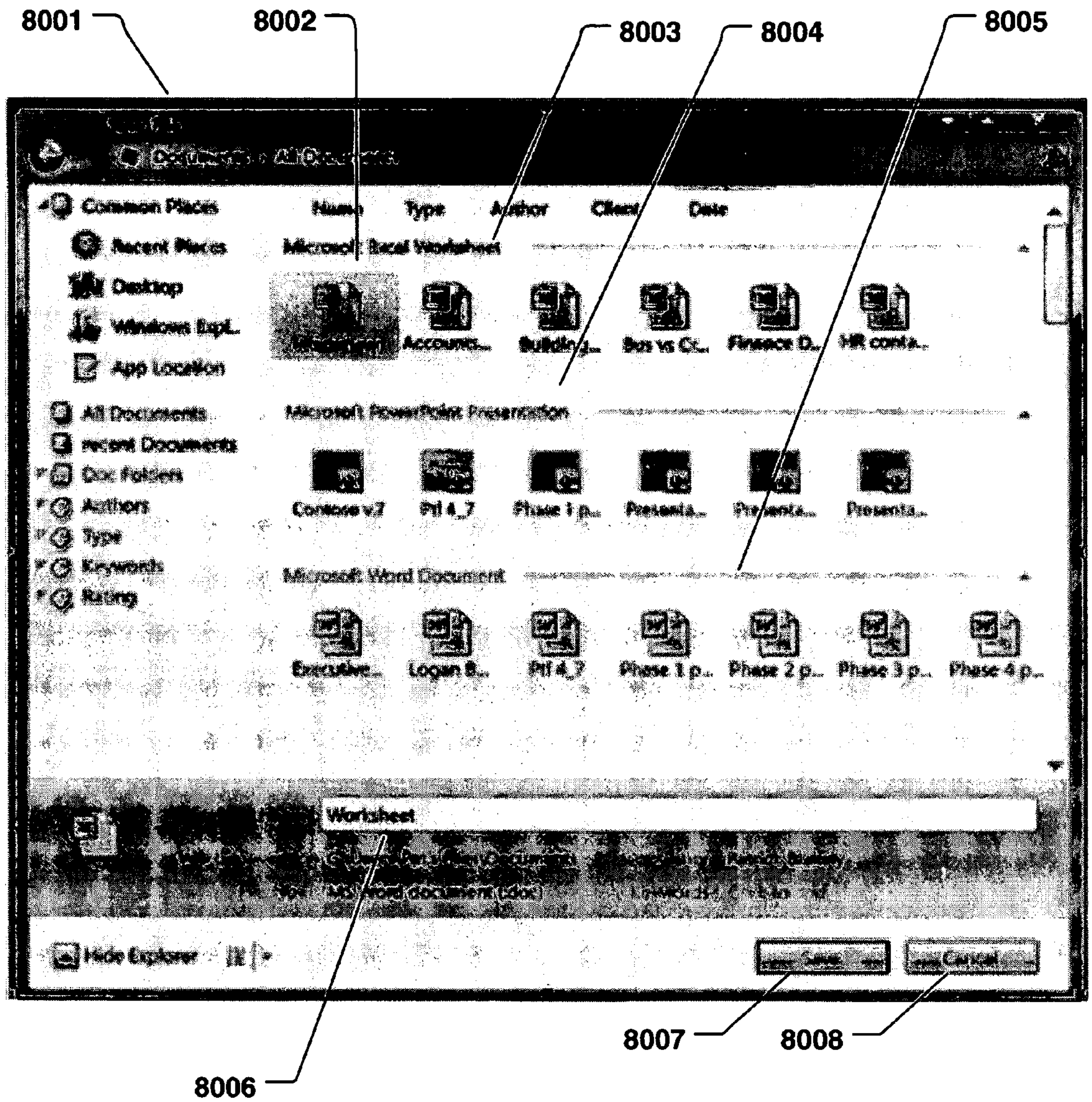
FIG. 80 depicts an example Save File dialog offering a preview representation of a file that is about to be created on the system.

The ghost may be incorporated into the GUI for a system file panel or common file dialog, such as the Save File dialog 8001 shown in FIG. 80, which may be shared by a plurality of applications on the system. In the dialog/panel 8001, ghost 8002 may appear to provide the preview representation of how the new file will appear once it is saved. In this example, three views 8003, 8004, 8005 are shown, where one view 8003 contains indicia for MICROSOFT EXCELS worksheet files, one view 8004 contains indicia for MICROSOFT POWERPOINT® presentation files, and one view 8005 contains indicia for MICROSOFT WORD® documents. The ghost 8002 appears in the first view 8003 because the file is presently set to be saved as a MICROSOFT EXCEL® worksheet. This setting is shown in the metadata portion 8006 of the display, which may display a set of metadata (e.g., author, file type, etc.) for the file that is about to be saved.

The user can interact with the ghost 8002 to change the metadata of the file that is about to be saved. The user may drag and drop the ghost 8002 onto different views to change the new file's properties to match those of the new view in which the ghost 8002 is dropped. For example, if a file type is to be changed, by clicking and dragging the ghost 8002 from the worksheet view 8003 to the presentation view 8004, the system may automatically update the metadata 8006 to reflect that the new file will be of type "presentation" instead of type "worksheet." Similarly, other changes in metadata may be made by moving the indicia. For example, if one view corresponds to items having a first priority, and a second view corresponds to items having a second priority, moving the indicia from the first to the second may change the document's priority level to match the second view.

Changes made to the metadata may also be automatically reflected in the ghost 8002. For example, should the user enter in a different file name or type in metadata 8006, the ghost 8002 may automatically change and/or reposition itself to reflect the new metadata, changing the title to the new name, and repositioning itself into the correct view based on the new file type (e.g., into view 8004 if the user changes the type to a presentation). As another example, if a view shows a first priority, and the priority is changed in the metadata, the indicia may be moved to a different view showing documents having the new priority. In some instances, this may cause the ghost to completely disappear from the user's current screen, if the ghost 8002 is repositioned to a view or location that is not currently displayed on the screen.

The Save File dialog may also include a Save button 8007 and cancel button 8008 for performing or aborting the save process.

Figure 81A:
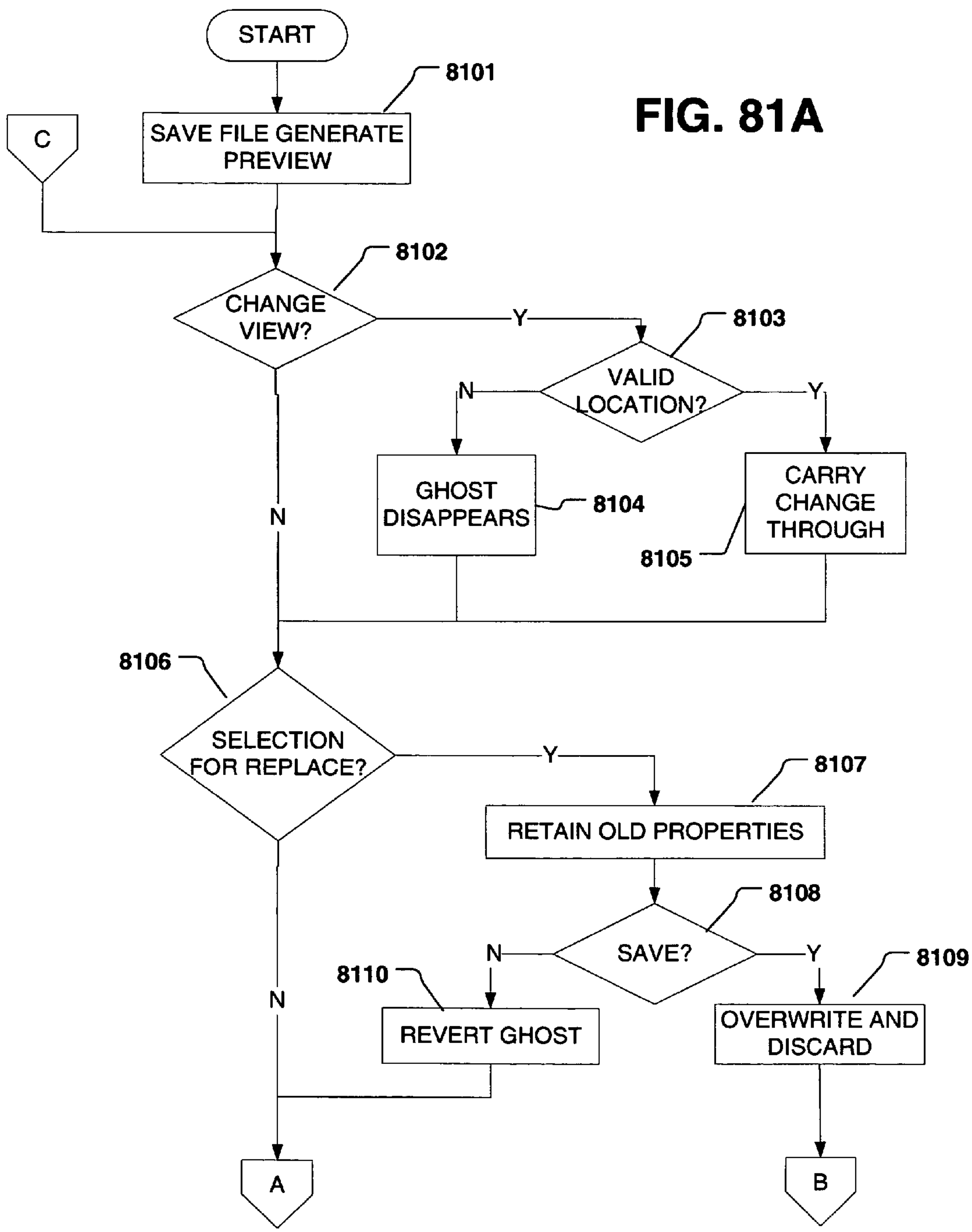
FIGS. 81A-B depict an example process for implementing a preview representation of a files that is about to be created on the system.
Figure 81B:
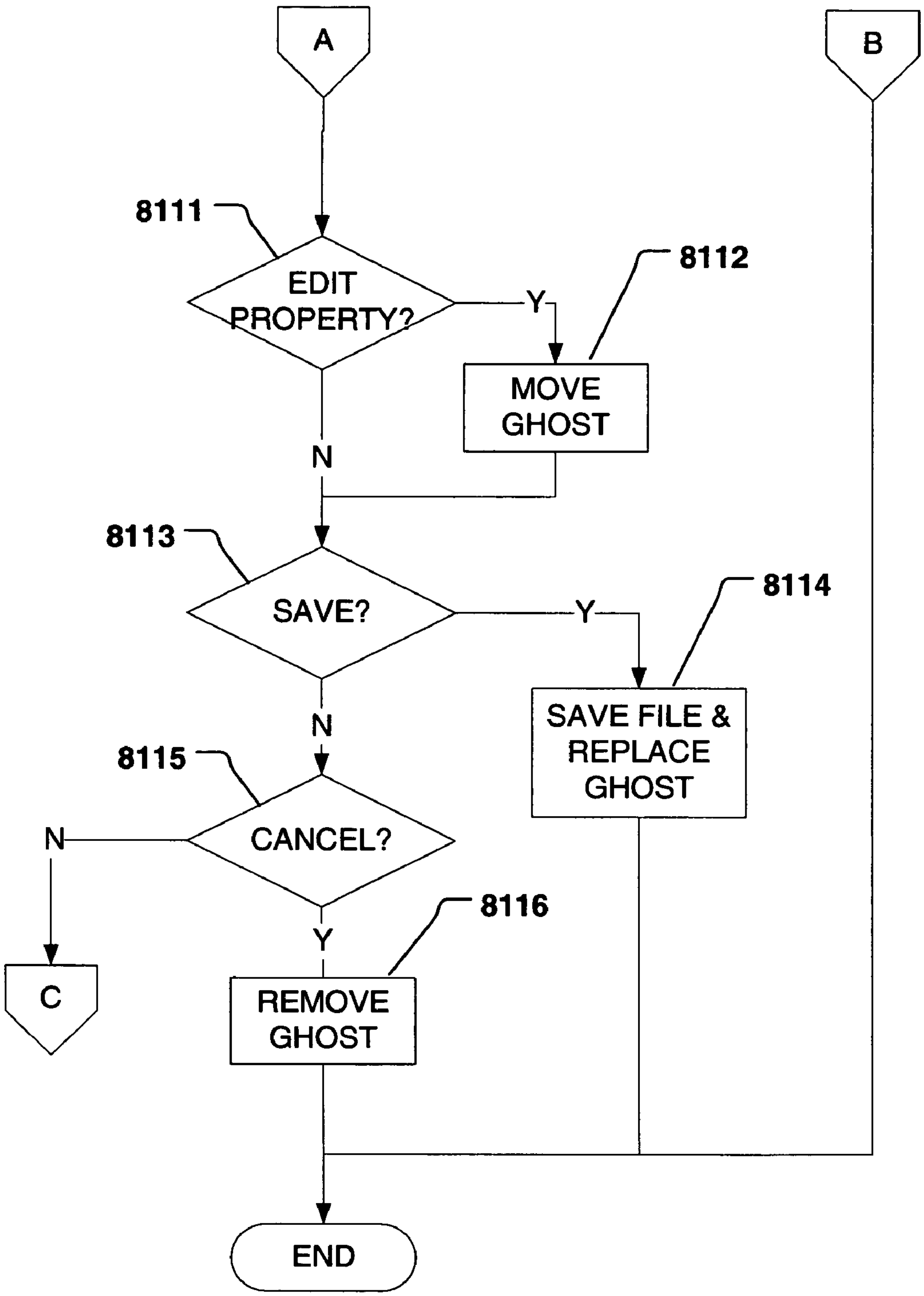

FIGS. 81A and 81B depict an example process that may occur when a file is to be created on a computing system. In step 8101, the request to initiate the saving of a new file is received, and the ghost preview may be generated, as discussed above, to reflect how the current saved file would appear if the file were saved using the current metadata. The new file may be automatically populated with metadata by the application requesting the save. The display may also include a display of editable metadata, and may also include a preview thumbnail image of the file.

In step 8102, the system may check to determine whether the user has changed the current view to cause the new file to conform to the properties of the new view. Changing the view may simply refer to navigating through a display space, or changing the criteria of a given display, and may be done by entering different criteria (e.g., requesting to view files of type *.wav) and/or GUI navigation (e.g., dragging and dropping the ghost into a new view, or just clicking on a folder indicia to enter the folder). For example, if the user requests to see a different view of files, such as files of a different type, a different location, a different project, etc., as discussed above, then the process may proceed to step 8103 to determine whether the new view represents a valid save location (physical location or logical location) for the file. For example, the user might not have privileges for saving files to certain locations, or to certain views, or the file to be saved is incompatible with the other files in the new view (e.g., the user has changed views to a spreadsheet view, and the new file is an incompatible image file). As another example, ghosts from a common file dialog might be prohibited from being moved to a location outside of the dialog. Changing views does not necessarily always result in changing the new file's properties. In some instances, the user may have simply changed views to view different files, with no desire to update the properties of the new file to match those of the changed view. For example, the user may have simply wanted to see what other documents exist for a particular priority, without necessarily changing the priority of the file being saved. If no such updating of the properties is desired when the view is changed, the process may move from step 8102 to step 8106.

If the new location is invalid, the system may move to step 8104 and take steps to alert the user that an invalid location has been selected. For example, the preview ghost may simply disappear from the view. Furthermore, a message may be provided to the user. If this occurs, the system may simply remain in this state until the user selects a different view representing a valid location for the file. Alternatively, the user may abort the process by, for example, pressing a Cancel button 8008.

If the new view is a valid location, the system may move to step 8105 and carry the change through. This may involve a step of relocating the preview ghost so that it appears in the new view. The file's metadata may also be automatically updated to reflect the metadata required (if any) of the newly-selected view. For example, if the user chooses a new view of all files in a given project, then the "Project" metadata property may be revised to reflect the new project.

In step 8106, the system may check to determine whether the user has requested that the new file replace an existing file. This may be done by, for example, dragging and dropping the ghost preview indicia onto an indicia of an existing file. If this occurs, in step 8107 measures may be taken to retain the original set of metadata properties, for example, by saving them to memory. The displayed metadata properties may be replaced by the properties of the file to be replaced, to reflect the fact that the new file will assume the same properties as the file it is replacing. Saving the original properties may be helpful should the user change his/her mind about the replacement. Of course, dragging-and-dropping onto an existing file is not always required, and in those instances where such functionality is not desired, step 8106 may be skipped.

In step 8108, the system may wait to see if the user executes the save process (for example, by pressing a Save button 8007). If the user executes the save process, then the new file replaces the old in step 8109. The previous properties retained in step 8107 may be discarded.

If the user decides not to execute the replacement process, such as by selecting the ghost again, then the process may turn to step 8110, in which the ghost may be displayed in its previous state. The original metadata properties saved in step 8107 may be used to repopulate the metadata fields of the ghost preview. Alternatively, the new file may retain the properties of the file that was previously to be overwritten. This alternative may make it easy for users to duplicate an entire set of metadata properties without entering each one separately. For example, the properties of the item that was (but is no longer) to be replaced may be retained as a "stamp" or new default set of properties that may be applied in the future to new saved files.

In step 8111, a check may be made to determine whether the user has edited a metadata property value using, for example, a metadata display area 8006. If the user has edited the metadata, the system may automatically move the ghost preview in step 8112 to a new location commensurate with the new property and, if necessary, update the appearance of the ghost preview to reflect the new metadata property (e.g., selecting a different indicia if the file type has changed, or revising the file name under the indicia).

In step 8113, the system may check to determine whether the user has requested to execute the save, such as by pressing the Save button 8007. If the user has requested the save operation, then the new file is saved in step 8114, and the ghost preview is dismissed (the new file now appears as a normal indicia).

If the user has not yet finalized the save, a check may be made in step 8115 to determine whether the user has aborted the save operation by, for example, pressing Cancel button 8008. If the user has canceled the save operation, the ghost may be removed in step 8116. The ghost's property data may also be deleted from the system.

Figure 82:
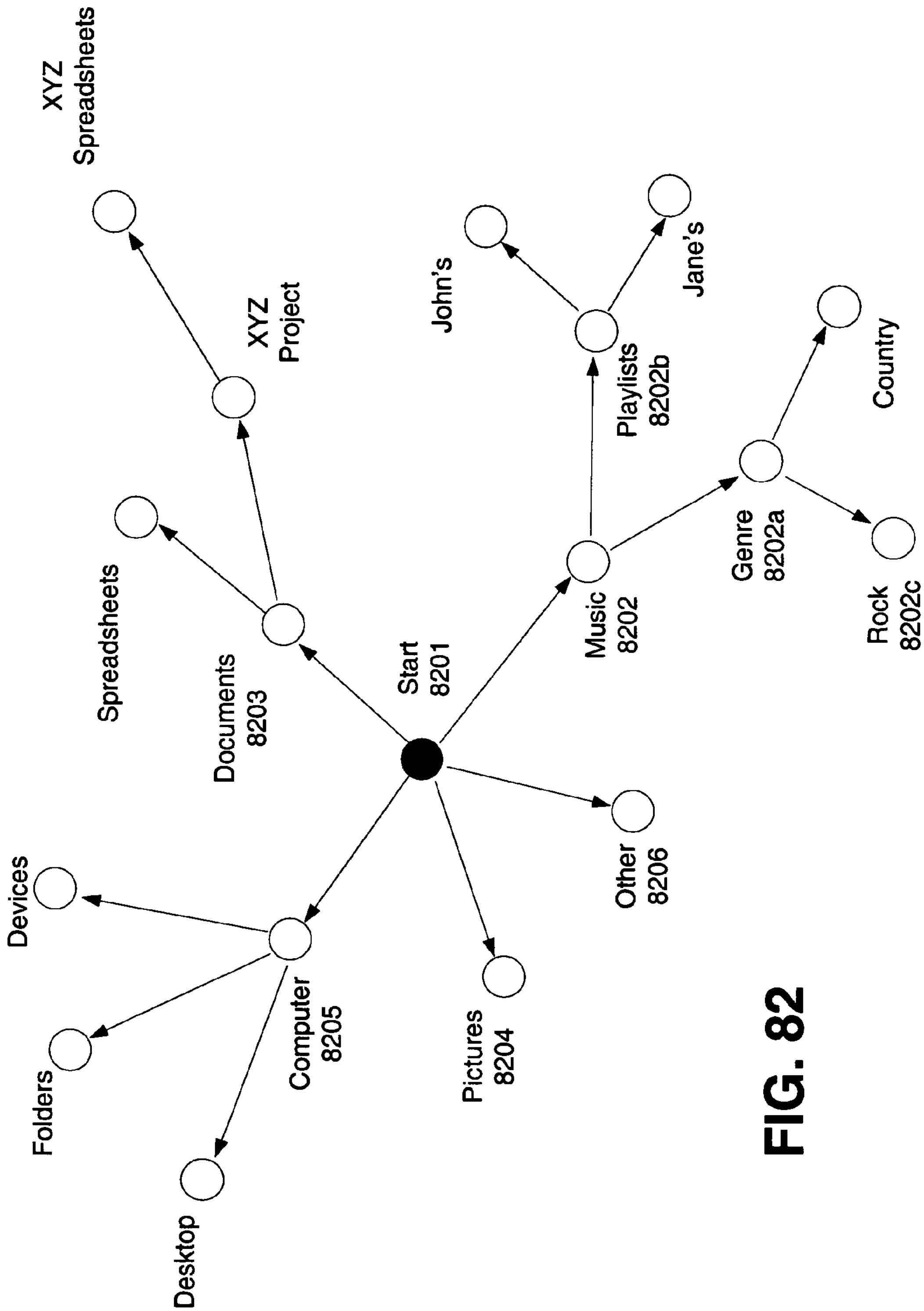
FIG. 82 is a diagram illustrating relationships between browser views.

Specialization of explorer views: According to an aspect of the invention an explorer (shell browser) window (e.g., as described above with respect to FIGS. 51-57) may be specialized based on the context of use or the data/files being navigated, thereby providing an improved user experience when browsing files on a system. FIG. 82 shows a relationship diagram illustrating how different panels, such as display regions in an explorer window, may be conceptually related. In some instances, there may be a Start panel 8201 that may serve as an initial display region provided to the user to begin browsing through files available through the system. The Start panel 8201 may offer the ability to view a different panel for browsing files, such as a Music browser 8202, Documents browser 8203, Pictures browser 8204, Computer browser 8205, or any other browser 8206 desired by the system and/or user. Each of these browsers may be a top level panel for browsing through files that meet particular criteria. For example, Music browser 8202 may display a listing of files on the system that meet certain music criteria, such as audio music file types. The browsers may also offer sub-browsers created using different criteria, such as a Genre 8202***a* browser panel that displays files that meet one or more genre criteria; or a Playlist 8202*b* browser panel that displays files relating to one or more playlists of songs. These panels may, in turn, allow the display of files meeting further criteria. For example, the Genre 8202*a* panel might display a subset of music files that are songs having genre information, and may offer a Rock 8202*c* sub-panel that displays a further subset of music files having a genre of rock and roll. Any number of panels may be created to accommodate any desired relationship and method of displaying file data. The Documents browser 8203 may offer separate browsers for certain types of documents (e.g., spreadsheets), or documents pertaining to a given project (e.g., XYZ project).

Each available browser may be defined by a template stored in memory of the computer system. The template could simply be a file identifying the contents of the view, the organization, the features to display, etc. The template may also specify the actual files that are to be displayed in the browser view.

Figure 83:
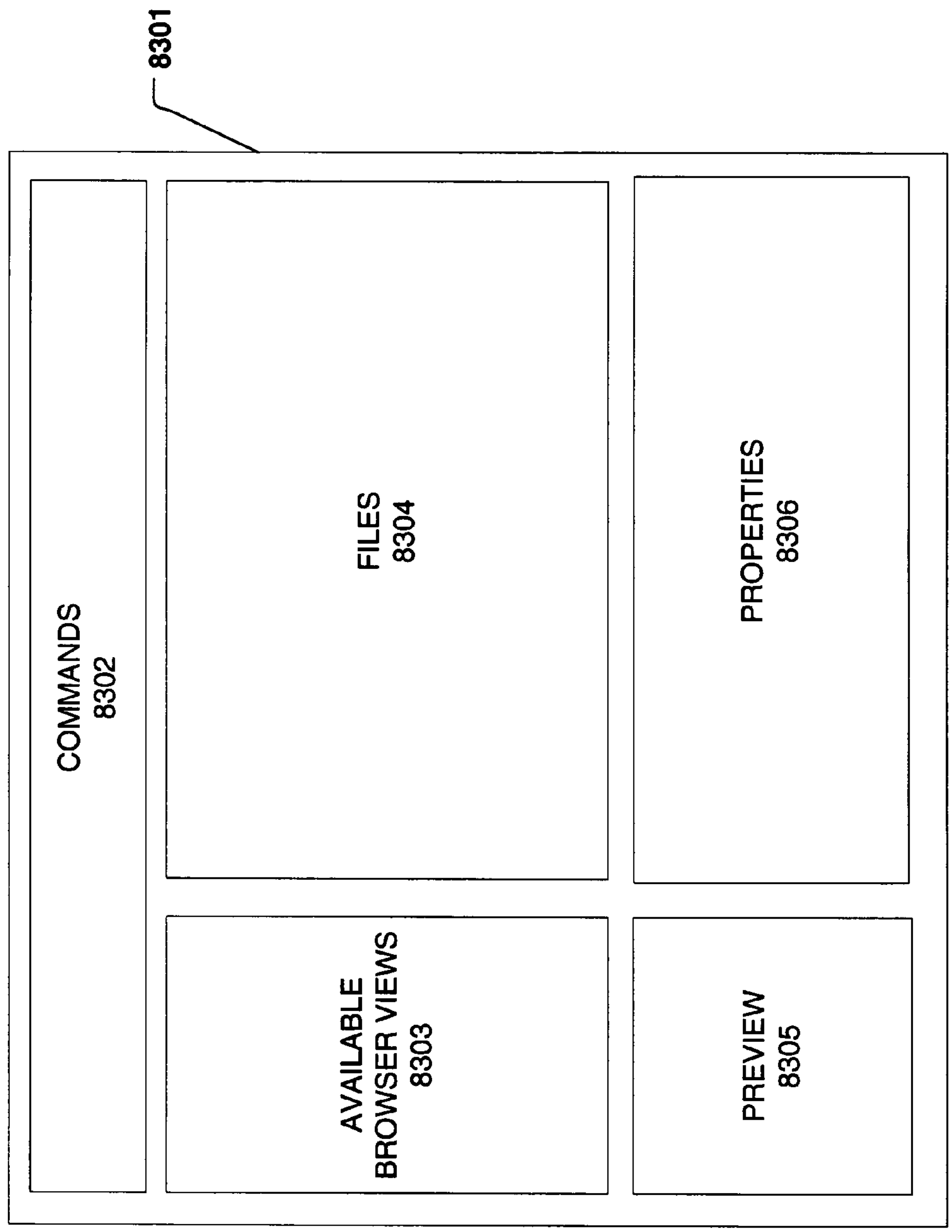
FIG. 83 depicts an example browser interface layout according to aspects of the present invention.

FIG. 83 depicts an example of a browser display 8301. The display 8301 may include one or more commands 8302 offered to the user. The commands may be in any form of command entry, such as menus, links, buttons, icons, or other indicia, and may be custom selected based on the template establishing the browser view. For example, if the browser 8301 is a display of music files, then the commands 8302 may include specific commands that make sense for music files, such as "Copy to CD," "Play," and/or "Shop for Music Online." Of course, commands 8302 may also include commands associated with and shared by various browsers, such as "File" commands for file manipulation (e.g., saving and opening files) and commands for editing the current panel (e.g., creating duplicate panels, or sorting multiple existing panels), and may include menus of commands. In addition to the presence/absence of commands, the commands display 8302 may also customize the appearance of the display, such as its color, user interface element details (color, size, positioning, etc.), sequencing of selectable elements, etc.

Display 8301 may include a list panel 8303 showing the available browser panels. The list may include a listing of all available views on the system, which may be presented in a nested menu/sub-menu format to conserve display area. This range of views may be referred to as a pagespace. The list 8303 may alternatively list a subset of browser panels that are associated with the current panel, resulting in a smaller pagespace. For example, if the current display 8301 is a music panel, the list 8303 may display Playlist and Genre view options, or specific playlists and/or genres that have their own panels.

Display 8301 may include a files panel 8304, which may contain a listing of the files that meet the criteria established for the current browser panel. The files panel 8304 may include indicia representing data files (such as an icon and/or text), and one or more properties of the files (e.g., their names, authors, file sizes, file types, project affiliation, date of creation/modification, etc.). The properties may be arranged, such as in columns, and may be rearranged and/or modified depending on what is appropriate given the criteria used for the selected display 8301. For example, a music browser might choose to list the "Song Title" as the first property, with "Artist" and "Album" next, whereas a browser for project XYZ might list the "Edit Date" first, with "File Size" and "File Type" to follow. Certain browser types may wish to omit undesired properties (e.g., the "Album" property may not be very useful for a spreadsheet document). Each browser display 8301 may have a customized arrangement of files and associated properties. Column width, row size, indicia appearance (e.g., size, color, etc.), grouping, stacking, and any other display properties may be included in this customization. For example, some browsers may display their files as thumbnails (e.g., picture browsers may do this), while other browsers may simply display the files in a text listing of the files and their properties.

Display 8301 may also include a preview panel 8305 that provides a preview of the content of one or more selected files from the files panel 8304. There may also be a properties panel 8306 that displays properties for one or more selected files from the listview data 8304. The properties panel 8306 may provide greater detail and/or amounts of properties than that shown in listview 8304. Display 8301 may include other types of display and user interface elements as well, such as navigation commands, panel sizing commands, etc.

Each of the various portions of display 8301 may be implemented as distinct software modules. For example, there may be a Commands module that is responsible for defining the user interface elements that are to go into Commands display 8302, a Listview module for processing the display elements in the files panel 8304, a Preview module for generating the content of the preview panel 8305, etc. These modules may expose application program interface (API) elements to facilitate interoperability with other applications, and the various modules may be provided with parameters such as the criteria for a given view, its position, its size, etc. Having distinct modules may simplify the process of defining new panels with different layouts and arrangements.

Figure 84:
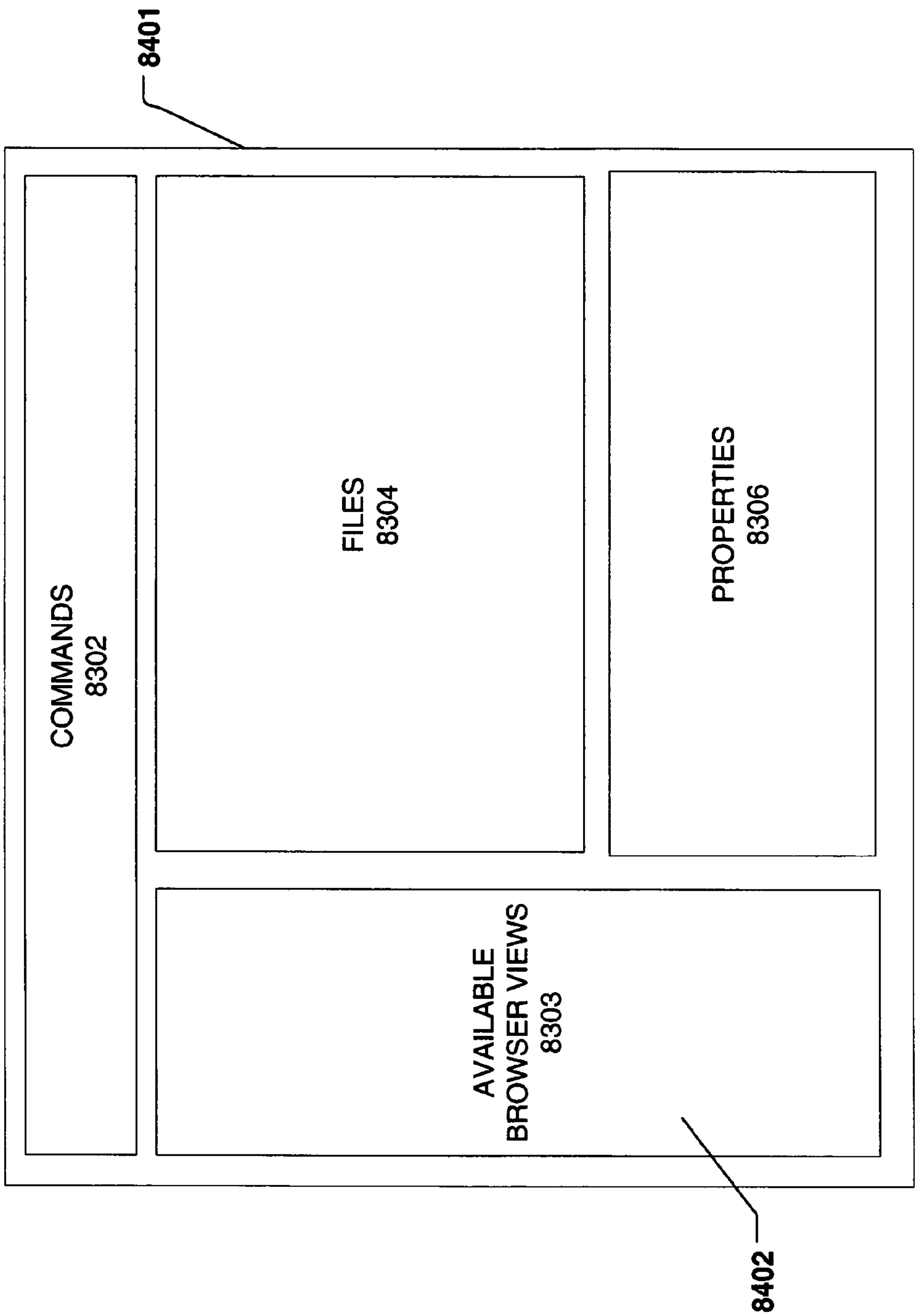
FIG. 84 depicts another example browser interface layout according to aspects of the present invention.

Each browser display 8301 may also have differences beyond just having different contents in the display areas discussed above. For example, each browser may have its own customized arrangement of display areas, such that certain areas may be resized/added/removed based on the criteria and/or contents of the particular browser. For example, a music browser might wish to do away with preview panel 8305, and offer music commands (e.g., play, pause, cue, add to playlist, burn to CD, etc.) in command area 8302. The other display areas may be rearranged and/or resized to take advantage of the space previously occupied by the preview panel. The particular layout of the browser may be set, for example, in the template defining the browser view. For example, FIG. 84 depicts an example of a different browser 8401 having elements arranged in a different manner. In that example, the list 8402 of available browser views has been enlarged to occupy the space relinquished by the preview panel. As another difference, each browser view may have its own unique display theme, such as watermark pattern, color theme, font, etc., to help further distinguish the view from other views on the system. Context menus (e.g., available commands, text, etc.), user interface behaviors, default commands on left/right mouse clicks, and other display/interaction attributes may also be different for each browser.

Figure 85:
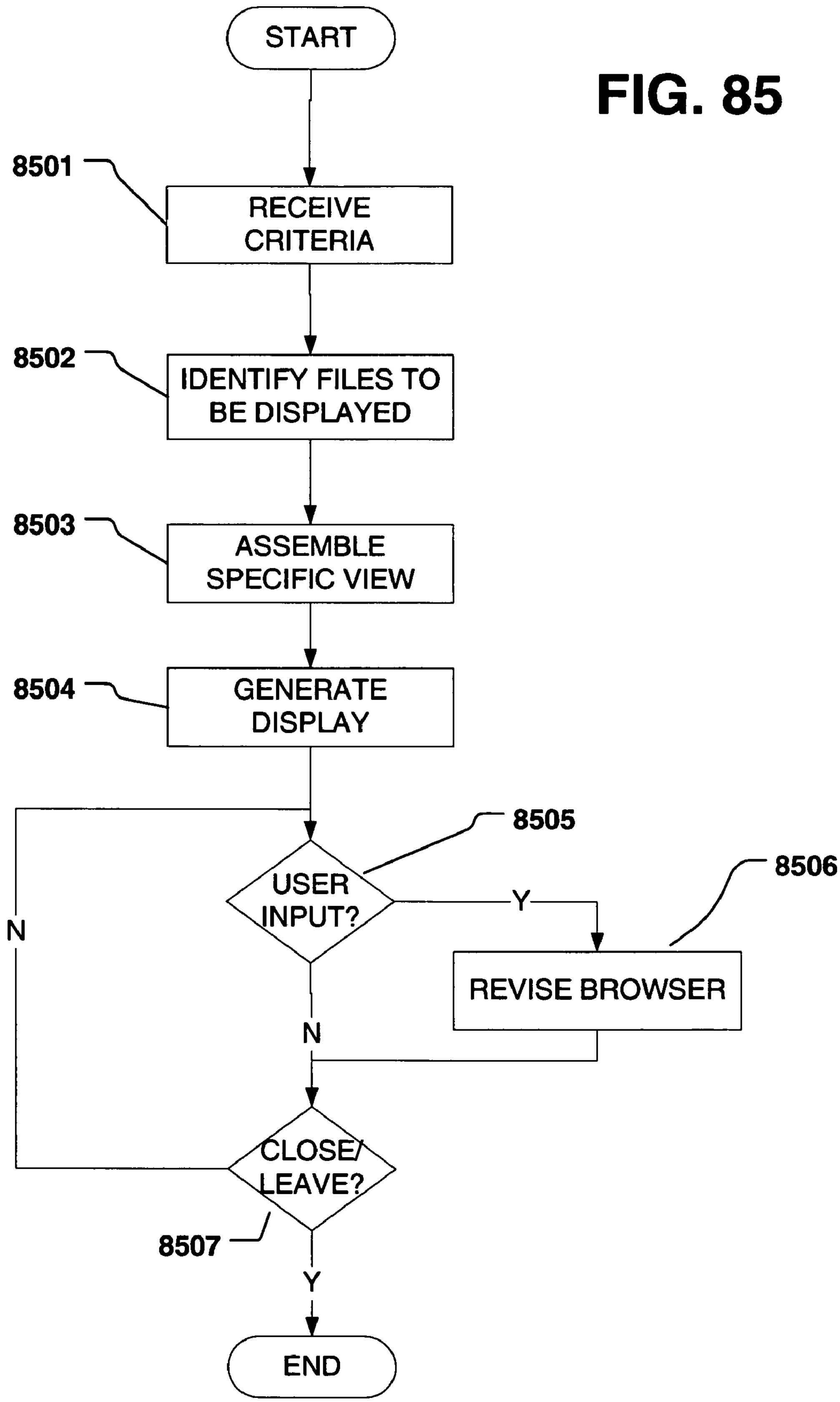
FIG. 85 depicts an example process for browsing files according to aspects of the present invention.

FIG. 85 depicts an example process by which various browsers may be displayed. In step 8501, the system may receive one or more criteria defining a view to be displayed. These criteria may come from a variety of sources. For example, the user might have selected a predefined template for display, and the system may simply receive that selection (or the criteria associated with the template). Alternatively, the system may receive criteria for a new view, such as a new view based on a keyword search using keywords supplied by the user.

In step 8502, the criteria may be used to identify the various files on the system that satisfy or meet the criteria, and which are to be included in the browser display. These files may be identified through a search of the system's memory, or they may simply be identified from the template information if the template already identifies the files to be listed.

When the files are identified, the system may assemble a specific browser view or panel in step 8503. Assembling the panel may include consulting a predefined template to determine the various elements/modules that are needed in the panel. In some instances, the panel may be further customized and/or modified when the files identified for display satisfy a different set of criteria from the ones established for the template, or if the identified files are suitable for display in a different template that has narrower criteria. For example, if the user requests a browser for all files associated with a given project, such as XYZ Project, the system may be expected to provide a project browser panel. Such a panel may have been defined with the possibility that a project may include files of multiple types, and may have separate display regions to segregate files based on file type. However, if a particular project only happens to have files of one type, then the system may dynamically customize the browser panel for the current display. The further customized panel may offer extended command options applicable to the file type, or remove display areas and/or elements that normally would have been used to display files of other types. The browser views may be dynamically modified based on the identity of files that meet the criteria used to establish the panel. Other types of custom assembly may be performed. The browser may adjust the panels depending on the number of files to be displayed, so that a portion of a first display area's screen space may be transferred to a different display area (e.g., a smaller listview is shown, but a larger properties area is shown). The browser may adjust the panels based on the search criteria used to identify the files for display (e.g., the criteria may be incorporated into a predetermined portion of the display, or the results may be arranged based on the criteria and how well the files matched them).

In step 8504, the browser view may be generated on a display device associated with the computer system. Then, in step 8505, the system may check to determine whether the user has performed an interaction, or supplied an input, to the browser view. User interaction may include editing text, navigating through the pagespace by selecting a different view, and/or interacting with any of the displayed elements on the browser. If the user has given an input, then in step 8506 the system may revise the browser in response. The revision to the browser may include removing, adding or modifying one or more of the displayed elements in the browser view, and may result in a dramatically different display. For example, the user viewing a Music browser view may select one of the music files and request to view a Project browser for a project associated with the selected music file—the Project browser may have a completely different display format. The browser displays may be dynamically modified to add and/or remove any of the features described above, which results in a browser interface that continuously provides users with a high level of contextually-appropriate information.

When changing or revising a particular browser, the system may provide visual effects to smooth the transition. For example, animation may be used to show a repositioning of a displayed element, fading can be used to show the addition/deletion of elements, and morphing effects may be used to show one element changing into another one. Although different views are possible, a user (or the system or its applications) may also specify that certain features (e.g., display elements, available commands, menus, etc.) or formats are to remain constant in multiple browser views, to help minimize user confusion.

In step 8507, which occurs after step 8506, or if no user input has been received in step 8505, the system may check to determine whether the browser is to be closed, or left, and if so, the browser process for this browser may end. If not, the process may return to step 8505 to await further user input.

Figure 86:
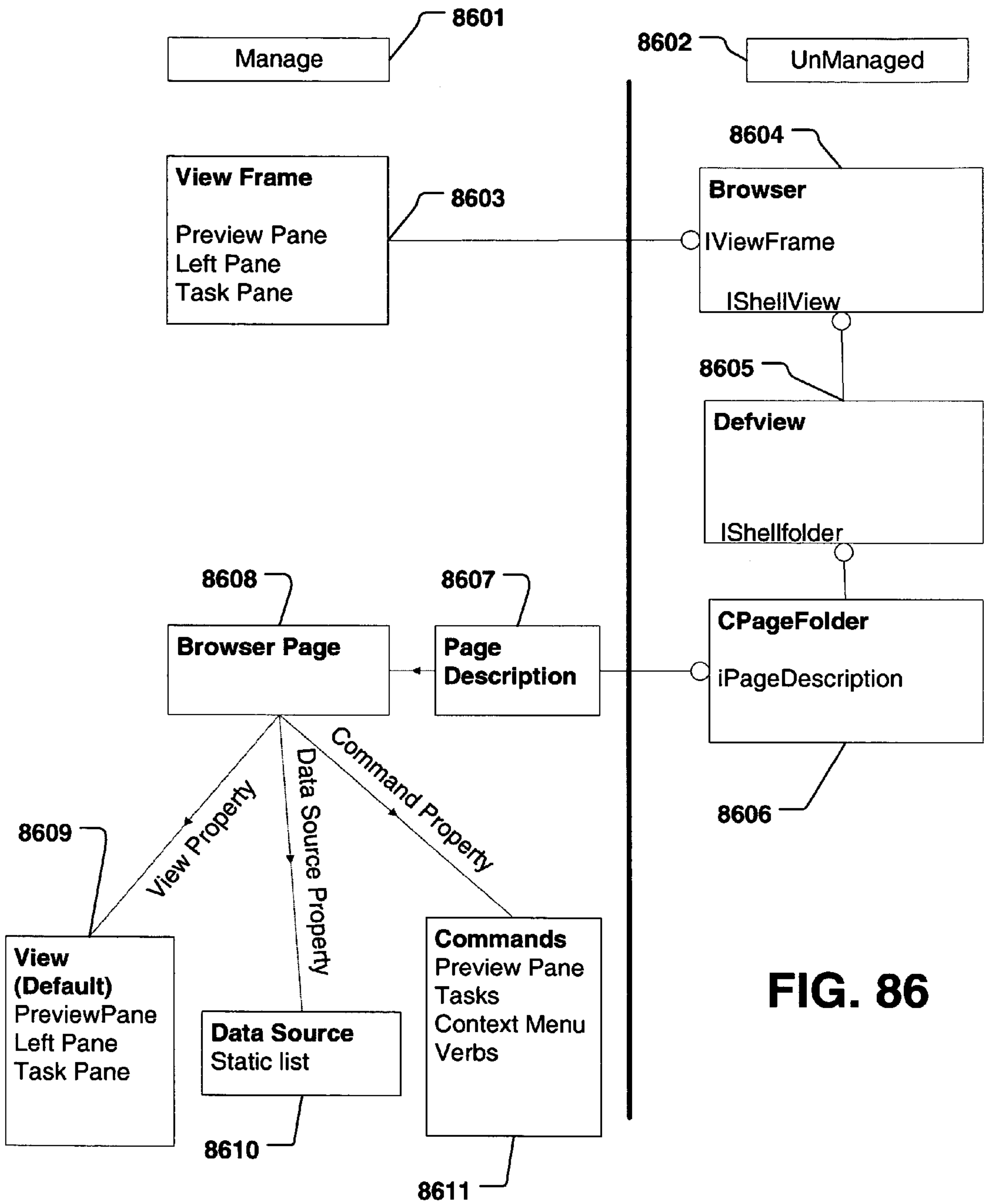
FIG. 86 depicts an example logical relationship among data structures, applications, and/or subroutines that may be used to implement aspects of the present invention.

FIG. 86 illustrates an example diagram of logical relationships that may exist in the system to generate the various browser views described above. Browser views may generally be managed by an underlying operating system (e.g., the Managed 8601 group on the left of FIG. 86), or they may be unmanaged by the operating system so that individual post-installation applications may control the views (e.g., the Unmanaged 8602 group on the right of FIG. 86). The system may define a basic overall view frame 8603, which may define aspects that will be common to multiple views. For example, the basic view frame 8603 of the system may include a preview pane, a left pane and a task pane. The basic configuration may be passed (e.g., as a data structure) to an unmanaged browser application 8604, which may in turn call a default view routine 8605 to generate a desired default browser view for the browser application 8604. The application may include a subroutine 8606 used to initiate the browser view, and that routine 8606 may make access a managed data structure containing a page description 8607 that defines the view to be generated for that particular browser application 8604.

The page description 8607 may include a reference to a browser page structure 8608. The browser page 8608 structure may include a variety of properties that ultimately define the view. For example, there may be a view property 8609 defining the basic attributes to be contained in this view (those attributes may be the same preview pane, left pane and task pane in the basic view frame 8603. The page 8608 may also have a data source property 8610, which may identify a location from which the data that populates the particular view may be obtained. The source 8610 may, for example, include a static list of data. The page 8608 may also include a command property 8611, which may identify the various commands that are to be supported by the view. Each command may be implemented by a separate application and/or routine, and may include commands for handling preview pane tasks, context menu options, etc. Of course, the above is just one example of how the various browser views may be managed and implemented.

The discussion above refers to "browsers," but the features described herein need not be limited to system shell browsers. Any application wishing to offer customized views of data files may take advantage of the features described herein.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

**Page Space Control: Tremendous volumes of information are stored on and/or available through computer systems and networks, and this information can be made available to computer users for a variety of different purposes. Although computers can provide this wealth of information to users, the information is only valuable and useful to users if users can reliably locate and retrieve the desired information from the system or network. The stored information is of little or no value to users if it cannot be readily located and/or retrieved without substantial searching time, effort, and/or frustration. Thus, various aspects of the invention relate to systems, methods, and computer-readable media for storing, searching, navigating, and/or retrieving electronic information in and available through computing systems and/or networks. This section is divided into sub-sections to assist the reader. The sub-sections include: Terms; General Description of Various Aspects of the Invention; Example Systems, Methods, and Computer-Readable Media According to the Invention; and Conclusion.

Page Space Control: Terms: The following terms may be used in this section and throughout this specification and, unless otherwise specified or clear from the context, the terms have the meanings provided below:

"Hierarchical Property"—A type of property whose value may include an ordered collection of categorizing unique strings. Each string may be made unique, for example, by the path through which it is specified, and this path also may be used to define the categories to which each property value belongs.

"Parent Property Value"—A property value that has one or more possible children property values.

"Child Property Value"—A property value that is a child of another property value.

"Auto lists"—Lists of files or other data resulting from queries for information over a fixed scope matching a preselected set of filter conditions. Examples of "auto lists" include, but are not limited to: file creation dates, file creation time, last edit date, last edit time, file rating data, file author list, last use=yesterday, last use=last week, etc. A "navigation panel," as described below, may include one or more "auto lists."

"Lists"—Shortcuts or "links" to auto lists, files, file collections, folders, and the like. A "navigation panel," as described below, may include one or more "Lists."

"Page"—A specific folder, virtual folder, list, auto list, or the like. A "page" may constitute a node in a hierarchical table to which users can navigate, e.g., by selecting items from a menu, from the navigational tool according to aspects of the invention, etc. Individual "pages" or listings of "pages" at various levels in a storage system and/or available through a computer system or network may appear in a navigation panel and/or a display panel, as described in more detail below.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

Page Space Control: General Description of Various Aspects of the Invention

Page Space Control: General Description of Various Aspects of the Invention: Storing Properties in a Hierarchical Relationship Aspects of the present invention relate to computer-readable media having data structures stored thereon. The data structure in accordance with at least some examples of this invention may include: (a) a first data set containing at least some of content of an electronic file; and (b) a second data set containing property data associated with the electronic file. This second data set may include a first flat path string indicating a first property associated with the electronic file, wherein the first flat path string indicates a hierarchical structure of the property data. Optionally, if desired, the second data set may include multiple flat path strings of data indicating multiple properties associated with the electronic file, e.g., in a hierarchical structure. The second data set may be provided in any desired manner, for example, as metadata included in and/or associated with the first data set. Of course, if desired, a third data set (or even more data sets) containing additional property data may be included in and/or associated with the electronic file, wherein the third data set (or additional data sets) includes another flat path string indicating another property associated with the electronic file, and wherein the additional flat path string indicates a hierarchical structure of the property data in the third (or additional) data set.

Additional example aspects of this invention relate to systems and methods for storing electronic data including hierarchical property information. Such systems and methods may include: (a) creating an electronic file including electronic data for storage on a computer-readable medium (e.g., using one or more computer processing systems); (b) receiving input data indicating a first property value to be included as part of the electronic file or associated with the electronic file (e.g., via a mouse, pen, digitizer, keyboard, network connection, disk drive, etc.), wherein the first property value includes a first data set including a first flat path string indicating the first property value, and wherein the first flat path string indicates a hierarchical structure of the first property value; and (c) storing the electronic file with the first flat path string included therein or associated therewith (e.g., in an electronic memory device), wherein the first flat path string is stored or associated with the electronic file in any desired manner, e.g., through linking information, as part of the file, as metadata, etc. Optionally, systems and methods in accordance with at least some examples of this invention further may receive input data indicating a second property value to be included as part of the electronic file or associated with the electronic file, wherein the second property value includes a second data set including a second flat path string indicating the second property value, wherein the second flat path string indicates a hierarchical structure of the second property value, and wherein the storing of the electronic file includes storing the electronic file with the second flat path string included therein or associated therewith. Any number of property values may be stored in and/or associated with an electronic file in this manner in accordance with the invention.

Still additional example aspects of this invention relate to systems and method for processing electronic data that includes hierarchical property information associated with it. Systems and methods according to at least some examples of this invention may include: (a) receiving data on a computer system or network (e.g., into the computer system's or network's memory) indicating a hierarchical structure of plural defined property values, wherein each defined property value has an unique flat path data string associated with it as compared with all other defined property values in the hierarchical structure; (b) receiving user input indicating a new property value to be included at a user desired location in the hierarchical structure (e.g., via a mouse, pen, digitizer, keyboard, network connection, disk drive, etc.); and (c) based on the user desired location in the hierarchical structure, determining whether the new property value would have a flat path data string that differs from all other flat path data strings existing in the hierarchical structure. The flat path data string for the new property value may include, for example, at least a first parent property portion and a first child property portion (optionally, at least one of the first parent property portion or the first child property portion may be identical to a portion of at least one other defined property value in the hierarchical structure). The method further may include adding the new property value to the hierarchical structure at the user desired location when the flat path data string for the new property value is determined to differ from all other flat path data strings for properties existing in the hierarchical structure.

In use of various systems and methods in accordance with examples of the invention, a user may enter input into the system indicating a search query, wherein the search query includes selection of a search property that includes a property value in the hierarchical property structure. Once the search query is entered, systems and methods in accordance with at least some examples of the invention may determine which electronic files stored on or available through a computer system or network (optionally with a search scope that limits the scope of files to be searched) meet the search query, wherein the electronic files determined to meet the search query include the first search property stored therein or associated therewith. As another example, the search query may include user selection of multiple properties in the hierarchical structure, and determination of which electronic files stored on or available through the computer system or network (optionally within a limited search scope) meet the search query may include identification of electronic files that include at least one of the selected properties.

The property data included in the computer-readable media, systems, and methods according to examples of this invention may be stored in any suitable or desired manner without departing from the invention, e.g., in a manner so as to indicate a hierarchical structure of the property data in the property data set. As examples, the property data structure may take on one of the following formats: parent property value-delimiter-child property value; parent property value-delimiter-child property value-delimiter-grandchild property value; child property value-delimiter-parent property value; and/or child property value-delimiter-parent property value-delimiter-grandparent property value. Of course, any number of levels in the property hierarchical structure and the data structure in the flat path data string may be provided without departing from this invention.

Additional aspects of the invention relate to computer-readable media including computer-executable instructions stored thereon for providing hierarchical property data and/or using hierarchical property data, e.g., for storing, searching, navigating, and/or retrieving electronic files and related information, including computer-readable media for performing the various methods and/or operating the various systems described above.

Page Space Control: General Description of Various Aspects of the Invention: Multiple Property Selections: Other aspects of the present invention relate to methods and systems for processing input data that include multiple user selections, including multiple selections of electronic file property data. Such systems and methods may include, for example: (a) selecting a first search parameter from a hierarchical structure including plural search elements (e.g., through a user input device, such as a mouse, pen, digitizer, keyboard, network connection, disk drive, etc.); (b) selecting a second search parameter from the hierarchical structure (e.g., through a user input device, such as a mouse, pen, digitizer, keyboard, network connection, disk drive, etc.); and (c) determining whether the first search parameter is located within the same element set in the hierarchical structure as the second search parameter (e.g., using a computer processing system). Various displays may be generated (e.g., on a computer display device) by the computer processing system depending on whether the first search parameter is determined to be located within the same element set as the second search parameter. In accordance with at least some examples of the invention, search results indicating a union of electronic files meeting the first search parameter or the second search parameter may be displayed when the first search parameter is determined to be located within the same element set in the hierarchical structure as the second search parameter. Additionally or alternatively, search results indicating an intersection of electronic files meeting both the first search parameter and the second search parameter may be displayed when the first search parameter is determined to be located outside the element set in the hierarchical structure of the second search parameter.

In accordance with at least some examples of this invention, the hierarchical structure(s) of the various search elements may include plural properties arranged in a hierarchical manner. At least one of the search parameters may include one of these defined property values. Optionally, in at least some examples, at least one of the search elements will constitute a folder element, a list element, an auto list element, or any other desired element in the hierarchical structure. Still additional features of at least some examples of the invention may include determining or defining a scope for the search activities, optionally based, at least in part, on the hierarchical structure of the search elements and/or user input selecting portions of the hierarchical structure for the search scope.

Additional aspects of the invention relate to computer-readable media including computer-executable instructions stored thereon for performing various search methods and/or operating various searching systems, including systems and methods like those described above.

Page Space Control: General Description of Various Aspects of the Invention: Grouping and Stacking in the Display Panel: Still additional example aspects of the present invention relate to computer displays providing user interfaces for searching electronic files stored on or available through a computer system or network. User interfaces in accordance with at least some examples of this invention may include: (a) a navigation panel (also referred to as a page space control) displaying a hierarchical structure of search elements (page space), wherein at least some individual search elements in the hierarchical structure may be expanded, optionally in response to user input, to display one or more child search elements in the hierarchical structure, and wherein the navigation panel receives user input directed to one or more search elements; and (b) a display panel displaying information relating, at least in part, to search results obtained from searching the electronic files, wherein the search results are determined, at least in part, based on the user input received through the navigation panel. Once expanded, the individual search elements in the hierarchical structure of the navigation panel may remain expanded to display the child elements in the hierarchical structure irrespective of the manner in which the search results are displayed in the display panel (e.g., in a stacked manner, in a grouped manner, in a combined grouped and stacked manner, etc.). The various search elements in the hierarchical structure may include, for example, property values, list elements, auto list elements, folder elements, etc., and the hierarchical structure may be, at least in part, defined by individual user input.

In accordance with at least some examples of the user interfaces in accordance with the invention, user input selecting child search elements or otherwise changing search elements in the hierarchical structure of the navigation panel will produce and/or drive corresponding changes in the search results displayed in the display panel of the user interface.

Additional example aspects of the invention relate to systems and methods for navigating electronic data stored on or available through a computer system or network. Such systems and methods may include: (a) providing a navigation panel (e.g., using a computer processing system) displaying a hierarchical structure of navigation elements, wherein at least some individual navigation elements in the hierarchical structure may be expanded, optionally in response to user input, to display child navigation elements in the hierarchical structure; (b) receiving user input, through the navigation panel, selecting one or more of the navigation elements (e.g., through a user input device, such as a mouse, pen, digitizer, keyboard, network connection, disk drive, etc.); and (c) displaying information relating, at least in part, to search results obtained from searching the electronic data, e.g., on a display device, wherein the search results are determined, at least in part, based on the user input received through the navigation panel (e.g., using the computer processing system), and wherein the information is displayed on a display device simultaneous with display of the navigation panel. Additionally, systems and methods in accordance with at least some examples of this invention further may include: receiving new user input, through the navigation panel, selecting one or more new navigation elements from the hierarchical structure (e.g., via an input system as described above); and changing the information displayed (e.g., using a computer processing system), at least in part, based on the new navigation element or elements selected, wherein the changed information is displayed on the display device simultaneous with the navigation panel. The new user input may constitute, in at least some examples, a child navigation element in the hierarchical structure from the navigation element initially selected to thereby filter down the information displayed. Again, the various search elements in the hierarchical structure may include, for example, property values, list elements, auto list elements, folder elements, etc., and the hierarchical structure may be, at least in part, defined by individual user input.

Still additional systems and methods in accordance with at least some examples of this invention may include systems and methods for displaying information regarding electronic data stored on or available through a computer system or network. Such systems and methods may include, for example: (a) providing a navigation panel displaying a hierarchical structure of navigation elements, e.g., on a display device (generated using a computer processing system), wherein at least some of the individual navigation elements in the hierarchical structure include folder elements; (b) receiving user input, through the navigation panel, selecting at least one folder element (e.g., using a user input device as described above); and (c) displaying information on the display device relating, at least in part, to search results obtained from searching the electronic data, wherein the search results are determined (e.g., using a computer processing system), at least in part, based on the user input received through the navigation panel, wherein the information is displayed simultaneous with display of the navigation panel, and wherein the information is displayed such that any sub-folders provided under the selected folder element are displayed as stacks. Additional features of at least some systems and methods in accordance with examples of this invention may include: receiving new user input (e.g., via a user input device), through the navigation panel, selecting one or more new navigation elements from the hierarchical structure; and changing the information displayed, at least in part, based on the new navigation element or elements selected (using a computer processing system to generate the display). The new user input may be used to select a property value in the hierarchical structure, and the information displayed, at least in part, may correspond to electronic data having the selected property value associated with it.

Still additional aspects of the invention relate to computer-readable media including computer-executable instructions stored thereon providing user interfaces, performing various searching and/or displaying methods, and/or operating various searching and/or displaying systems including use of the hierarchical searching and navigation elements, including providing the user interfaces, performing the various methods, and/or operating the various systems like those described above.

Page Space Control: Example systems, methods, and computer readable media according to aspects of the invention: In modern computer operating systems and application programs useful on them, many file navigation, searching, listing, and/or retrieval operations occur via query operations, as the systems attempt to locate items (such as stored electronic files or other data) that meet the various query parameters. Aspects of the present invention provide navigational tools that, in at least some instances, also can be used for item placement and file storage, which assists the user in these file navigation, searching, listing, and/or retrieval efforts.

In accordance with example aspects of this invention, users may use navigational tools in accordance with this invention, e.g., to navigate to and/or locate information relating to any page in a navigational control menu; to add pages to the navigational control menu or listing; to add items to any set (such as a property set, an auto list set, a list set, a folder set, etc.); to see the content of existing and/or system folders (e.g., a "My Documents" folder, etc.); to see expanded sub-folders within folders; to add properties or other data to files or other items (e.g., optionally in a hierarchical manner), even to files or items stored in an auto list or a system generated list; and the like. Additionally, in accordance with at least some example aspects of this invention, users and/or independent software vendors will be able to customize the system navigational tools for use in different application programs, in different views, in different modes of operation, and/or the like. If desired, users also can be given various tools to restore the navigational panel to a previous state or to its original state.

As more specific examples, if desired, navigational tools in accordance with examples of the invention may be designed or customized with lists and/or auto lists that allow users to quickly locate and view information relating to pages of interest. For example, if desired, systems may have lists or auto lists named "Documents Stacked by Author" (or the like) to allow users to quickly jump to a view showing "stacks" of files collected together based on the underlying authors named for the various documents (the user can further drill down into the stacks, if desired, e.g., to locate specific documents by specific authors), and/or based on properties associated with the files when they are created, stored, edited, downloaded, modified, or the like. Other potential groupings or listing of stacks may include listings such as "important documents," "recent documents," "good music," "recently used," "recently obtained," etc.

More detailed descriptions of various aspects of the invention follow. Those skilled in the art will appreciate that this description merely includes examples of various aspects of the invention and does not limit the invention.

Page Space Control: Example systems, methods, and computer readable media according to aspects of the invention: Storing Properties in a Hierarchical Relationship: As described above, certain example aspects of the present invention relate generally to systems and methods for storing and using "properties" in conjunction with individual stored files or data on and/or available through a computer system or network. In general, when saving new files to a computer system or network, such as a PC, a network of PCs, a server, or the like, users typically can assign "properties" to the files. Examples of such "properties" include: Comments, AuthorID, Keywords, and the like. While this capability is useful and may be adequate in some instances (for example, when only a small set of properties is involved), this conventionally available "flat" property structure can become difficult to manage and/or use over time (e.g., as the overall number of available properties increases). Also, with this flat property data structure, users must separately enter and/or associate each desired property with an individual file. This can be a time consuming task. Additionally, the failure to accurately and/or completely associate properties with respective files may limit a user's ability to search for, locate, and/or retrieve the desired data at later times. For example, as the number of different individual available properties increases, it becomes more difficult for users to reliably retrieve items when they must correctly name, in a search query, one or more of the individual properties associated with the file.

At least some example aspects in accordance with this invention provide users the ability to assign and store at least some file "property" data along with an electronic file, e.g., as metadata, wherein the assigned property data is part of a hierarchical structure. As more and more properties become available to users (e.g., through user designation and/or user definition of new properties), providing the properties in a hierarchical structure in accordance with examples of this invention will allow users to quickly assign multiple properties to a file through a simple one property assignment action. The availability and use of hierarchical properties in accordance with examples of this invention also will allow users to have more control over ordering their property values (e.g., in a display of the hierarchy, to provide the most common or important elements high in the hierarchy, etc.), and it will allow users to express relationships between the values of a property and have these relationships reflected when retrieving items or assigning values to items. The availability and use of hierarchical properties in accordance with examples of this invention also will give users compelling ways to organize the values generated in a property and to browse through and retrieve their items using this organization. The use of hierarchical properties in accordance with examples of this invention, as will be explained in more detail below, may allow users to more easily navigate through files across different properties, locate desired files, and/or retrieve files using a single property (even, at least in some instances, when the property searched with was not explicitly assigned to the file by the user but was simply part of the hierarchy of a property assigned by the user).

Figure 87A:
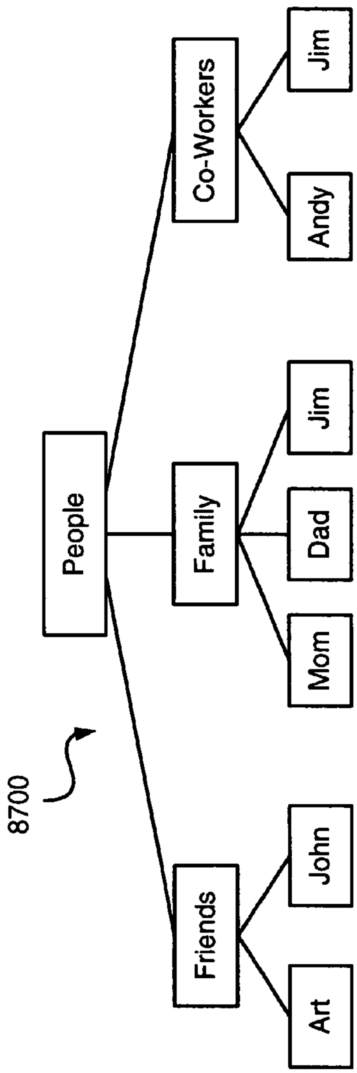
FIGS. 87A and 87B illustrate examples of permitted and non-permitted hierarchical property paths, respectively, in accordance with at least some examples of the invention.

FIG. 87A illustrates an example property hierarchical structure 200 for "keyword" properties that may be used in association with various electronic files, such as digital pictures, music, videos, electronic documents, or the like. In this example, the user has defined a hierarchical structure 200 that may be used in assigning properties to files, e.g., when the files are first stored, created, downloaded, when modified, edited, moved, etc. In this hierarchical structure 200, a "People" node constitutes a parent level node in the hierarchy 200. The "People" node includes three immediate children nodes (namely, "Friends," "Family," and "Co-Workers"), and each of these children nodes contains further individual children nodes, as shown in the figure. In use, assigning a keyword to a file (e.g., including a keyword in metadata associated with an electronic file) not only associates that specific keyword with the file, but it also associates any higher parent keywords of the associated keyword in the hierarchy with that file. As a more specific example based on FIG. 87A, assigning the keyword "Dad" to an electronic file would also, automatically, associate the keywords "Family" and "People" with that file in this example system and method, because these keywords exist in the hierarchal path associated with the assigned keyword "Dad" (i.e., the overall hierarchical keyword data applied in this example is: Dad>Family>People). Therefore, a search query containing any one of the three terms "Dad," "Family," and/or "People" would return a hit for this file. Without the hierarchy according to this example of the invention, the user would have to separately apply all of these keywords to the file (e.g., each of "Dad," "Family," and "People") if he/she wanted to associate each keyword with the file and/or be able to retrieve information relating to the file based on any of these keywords.

Additional aspects of the present invention relate to systems and methods for entering or capturing a hierarchy that may exist between properties (e.g., a user defined hierarchy, an automatically generated hierarchy, etc.). If desired, this hierarchical property information may be stored, e.g., as metadata contained in and/or associated with the electronic file itself, as a flat path, similar to the manner in which hierarchical folders are stored in various commercially available systems and methods (such as systems and methods with folders available in various operating systems and application programs available from Microsoft Corporation). More specifically, systems and methods according to at least some examples of this invention will store one or more hierarchical properties for an electronic file as a flat path string (akin to a known flat folder path string), which allows the shell operating system to correctly stack, filter, group, and/or otherwise navigate or process information relating to the stored files using the hierarchical properties in the same or a similar manner to which a folder hierarchy may be navigated and/or processed today in various conventional systems and methods that utilize folder structures. Similarly, providing a hierarchical data structure for properties gives users the ability to drill into a sub-property to get to lower child property levels in the hierarchy, in a manner similar to the manner in which users can drill into sub-folders in the known and conventional folder systems.

In the data structure (e.g., in data sets or fields, such as in metadata associated with a file), the various property values may be differentiated by paths, such as the flat path strings described above. In this manner, an individual value (e.g., an individual node name) can appear multiple times in a hierarchy, provided the paths to the identical node names or values are different at each place the name appears. FIG. 87A illustrates an example. Specifically, as shown in FIG. 87A, the value "Jim" appears under both the "Family" node and the "Co-Workers" node. Because the paths to these two "Jim" values differ from one another (i.e., People>Family>Jim v. People>Co-Workers>Jim), these two values, including the same ultimate end name (optionally on the same hierarchical level as shown in FIG. 87A), can co-exist in the hierarchy without causing difficulties. A specific node name or value can appear any number of times in a hierarchy provided that the path to it in each instance is different from all other paths to the same name or value.

Additional example aspects of the invention relate to processes to disambiguate between properties in different branches of a hierarchical structure that utilize the same name or node value. In the example described above in conjunction with FIG. 87A, the name "Jim" is associated with both a family member and a co-worker. To distinguish between these two cases, systems and methods according to at least some examples of the invention need only compare the values in higher levels of the hierarchy for the two cases in question to determine whether the values in question have an uncommon parent property, node, or path. Using the example above, systems and methods according to at least some examples of this invention can differentiate between the two common node names in the hierarchy by looking at each "Jim" node's parent node. This investigation shows that one "Jim" node has "Family" as a parent node while the other "Jim" node has "Co-Workers" as its parent node. Because their immediate parent nodes are different and distinguishable, these two "Jim" nodes can co-exist in the property hierarchical structure 200. Of course, the different parent node names need not be located at the immediate parent node of the node(s) under consideration (e.g., the differently named parent nodes could be located at a grandparent node level, at an even higher node level, and/or at different node levels in the hierarchical structure).

Figure 87B:
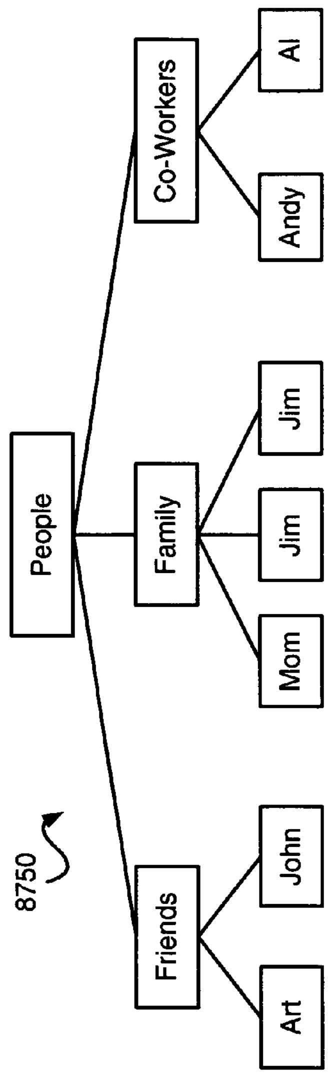

The hierarchical structure 8750 illustrated in FIG. 87B, however, typically would not be permitted, in at least some example systems and methods in accordance with this invention. More specifically, as shown, the hierarchical structure 8750 in FIG. 87B is similar to the hierarchical structure 8700 in FIG. 87A except with respect to certain nodes at the lowest level. In FIG. 87B, the "Family" node contains two child nodes on the same hierarchical level having the same name (namely, the two "Jim" nodes). Because the flat path string to each of these "Jim" nodes is the same (i.e., People>Family>Jim), it would not be possible for the operating systems and/or application programs to distinguish one node from the other, and therefore, an ambiguity would exist any time the flat path string "People>Family>Jim" were used. If a user attempts to set up two identical property paths as shown in the example of FIG. 87B, systems and methods according to at least some examples of this invention will display an error message, present a dialog box, request entry of a new name, and/or otherwise indicate to the user that this name or value is not permitted in the hierarchical structure at this location.

Figure 88:
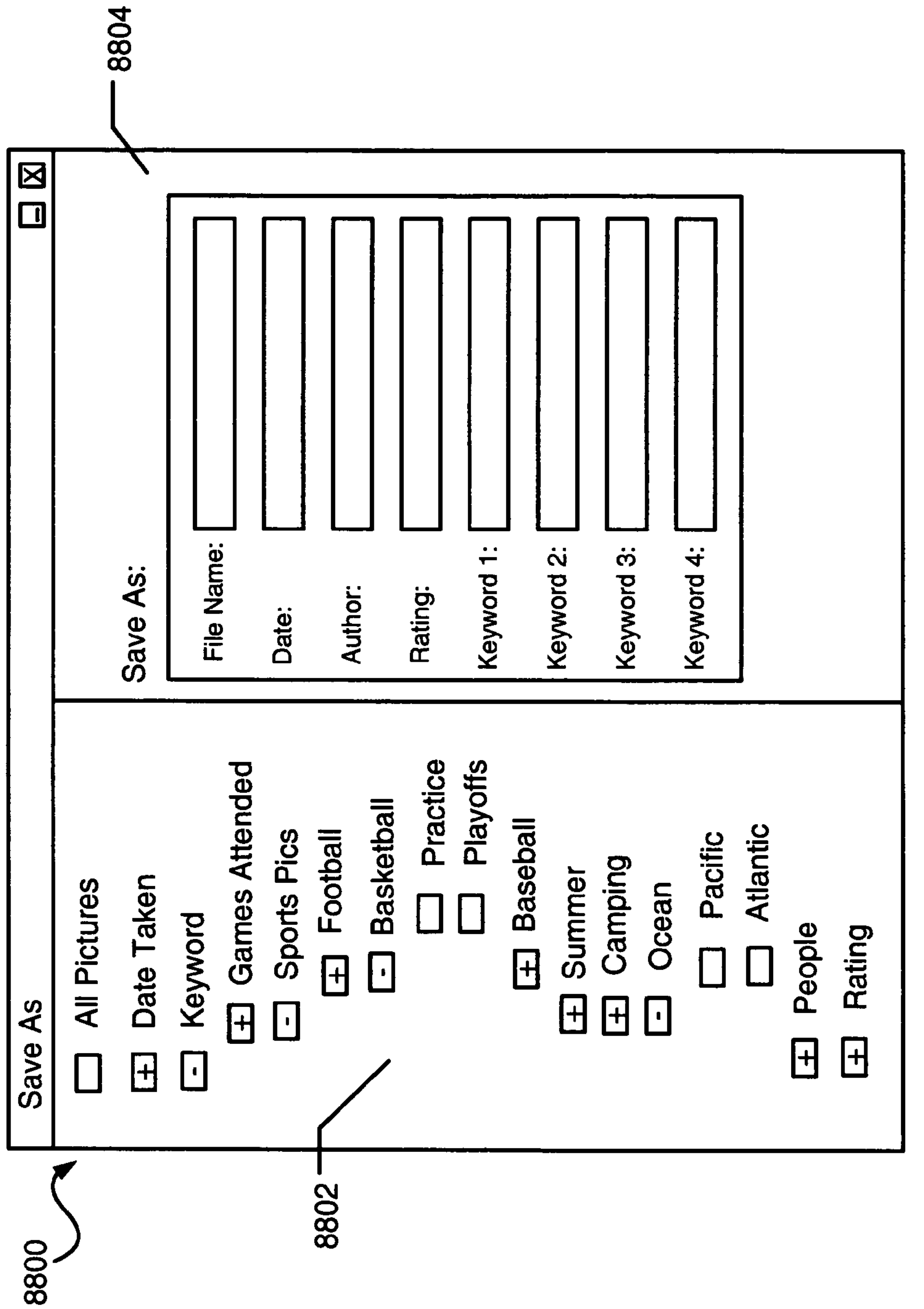
FIG. 88 illustrates an example of a user interface for saving a new item (e.g., a file) with associated hierarchical properties in accordance with examples of this invention.

Property values may be assigned to and/or associated with an individual file in any desired manner and/or at any desired time without departing from this invention. For example, users may be given an opportunity to assign property values to a file when a new file is downloaded to and/or saved onto a user's computer system or network. FIG. 88 illustrates an example user interface 8800 through which a user may save a file to his/her computer system or network and, if desired, through which he/she may assign one or more properties to the file. As shown, the user interface 8800 includes a navigation panel 8802, which displays at least some of the properties or other information that may be associated with and/or assigned to a file (e.g., when information relating to a new file is entered in an input panel 8804, in an "edit profile" procedure, and/or at any other desired time). Notably, the properties in navigation panel 8802 are arranged in a hierarchical manner. The various properties can be assigned to and/or associated with the file in any desired manner, e.g., by typing or writing the node name in at the appropriate location in the input panel 8804 (e.g., in a "keyword" input box) by "dragging" and "dropping" a property name from the navigation panel 8802 to an appropriate location in the input panel 8804, etc. As another example, if desired, properties may be assigned by dragging an icon or other representation of a file (e.g., from a file list) onto the desired value or node name in the navigation panel 8802 and dropping the icon or other representation at that location (if desired, the hierarchy in the navigation panel 8802 may exhibit an "auto-expand behavior" in which dragging an icon or other file representation onto a parent property value and holding it over that property value (without dropping) will expand the parent property value (if possible) to at least its next level of hierarchy (e.g., in the same manner that some folders will "auto-expand" in currently available systems and programs)). In addition to assigning property values to files through a navigation panel 8802, like that shown in FIG. 88, users of hierarchical property systems in accordance with at least some examples of this invention may navigate or search through their hierarchies, manage and/or edit their hierarchies, and/or take other actions, as will be described in more detail below.

In accordance with at least some examples of this invention, when a file or other item is assigned a property value that is a child of another property value (e.g., the value "Playoffs" in FIG. 88), the file or other item also will automatically inherit any and all parent property values associated with the assigned property value (e.g., "Sports Pics>Basketball" in this specific example). Moreover, if desired, a parent property value can be assigned to a file or item even if that property value has one or more child property values under it (e.g., one can assign a "Basketball" property to a file). In such an instance, in at least some example systems and methods in accordance with the invention, while the parent property will be assigned to the file, neither of its children property values (i.e., "Practice" or "Playoffs" in this example) will be automatically assigned to the file or item (although its parent property would be assigned). Of course, if desired, systems and methods also could be set up to automatically assign or associate the children properties with the file in this situation without departing from the invention.

As will be described in more detail below, in accordance with at least some examples of this invention, a list files, search, or other query including a parent property value as a search element or parameter will return all items tagged with both the designated parent property value and any of its children property values. In this manner, storage systems and methods in accordance with examples of this invention allow users to easily tag items with a relatively few highly specific descriptive properties (e.g., at lower levels in the hierarchy), but by arranging the properties under increasingly broader parent nodes in the hierarchical structure, the tagged items may be made to readily appear, even in response to relatively broad search queries. If desired, in accordance with at least some examples of the invention, when the search results, list files results, or file preview results are displayed in response to a search query, the primary value assigned to the file (e.g., the actual value assigned by the user) will be highlighted and/or made known or available to the user in some manner.

The available (e.g., previously defined by the user, system, or another) and/or stored hierarchical properties may be displayed by systems and methods in accordance with examples of this invention at any desired time and/or at any desired location without departing from the invention. For example, as shown in FIG. 88, the properties may be displayed during a "Save" or "Save As" operation (e.g., in the navigation panel 8802). They also may be displayed during file "search," "list," or "viewing" operations, e.g., in the same hierarchical tree layout illustrated in navigation panel 8802 of FIG. 88. Also, if desired, hierarchical properties in accordance with examples of this invention may be displayed in any and/or all places where conventional properties are shown by application programs and/or operating systems today (e.g., as properties shown in a "list view" display, as properties shown in an "item details" display, as properties shown in a file "preview" display, etc.). Also, if desired, hierarchical properties in accordance with examples of this invention may be displayed in any controls used to navigate properties, such as in a tree control supporting properties.

Figure 89:
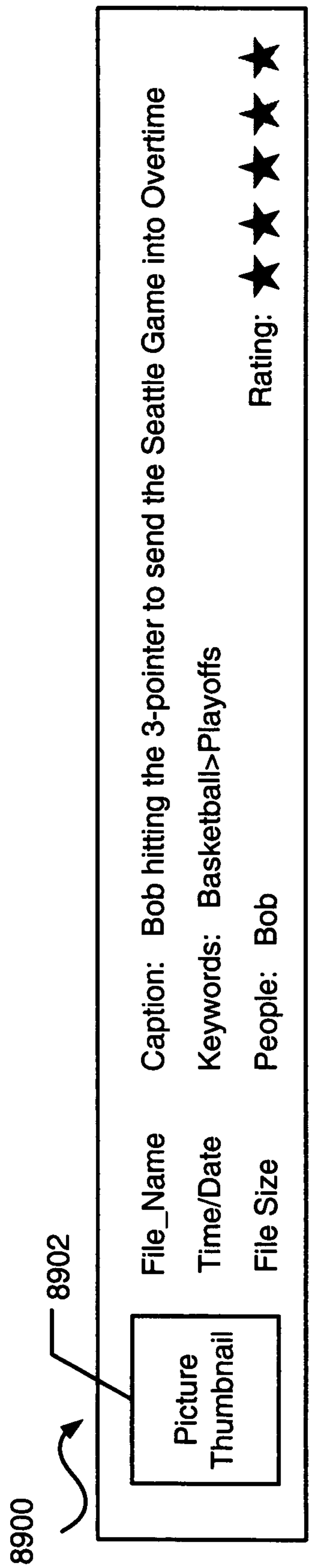
FIG. 89 illustrates an example “preview panel” that includes information relating to a stored item (e.g., a digital picture file) in accordance with examples of this invention.

FIG. 88 illustrates an example of display of hierarchical properties in a tree control screen (e.g., in the navigation panel 8802). FIG. 89, on the other hand, illustrates an example of display of property information in an item or file "preview" screen 8900. As shown in FIG. 89, this example item or file "preview" screen 8900 includes a thumbnail or iconic display 8902 of the item (e.g., a small version of the picture included in the file, in this example), as well as certain system and/or other factual information relating to the file, such as the file name, its saved time/date, file size, and user input "caption" information. In addition, this item or file "preview" screen 8900 displays certain "property" information input by the user, including: assigned keywords (displayed in a flat path string format), picture subject ID's, user input rating information, and the like. Of course, any number of properties may be listed in such screens without departing from the invention (optionally, with the ability to display information regarding any undisplayed properties).

The property information may be entered and/or associated with individual files at any desired time and in any desired manner without departing from the invention. In addition to including the property information with the files at the time they initially are saved onto the computer system or network, properties associated with individual files may be added to, deleted from, and/or modified at other desired times, such as whenever a file is opened, edited, or used, in response to an "edit profile" or "edit properties" command, and the like. The properties may be entered via typing (optionally with "autocompletion" of matching strings, optionally from any level in the hierarchy), through drag-and-drop operations, through "right-click" operations, through pen "press-and-hold" operations, etc. Any tools useful for setting, editing, and/or deleting properties associated with a particular file also may be accessed and used in the preview screen 8900 without departing from the invention.

Figure 90:
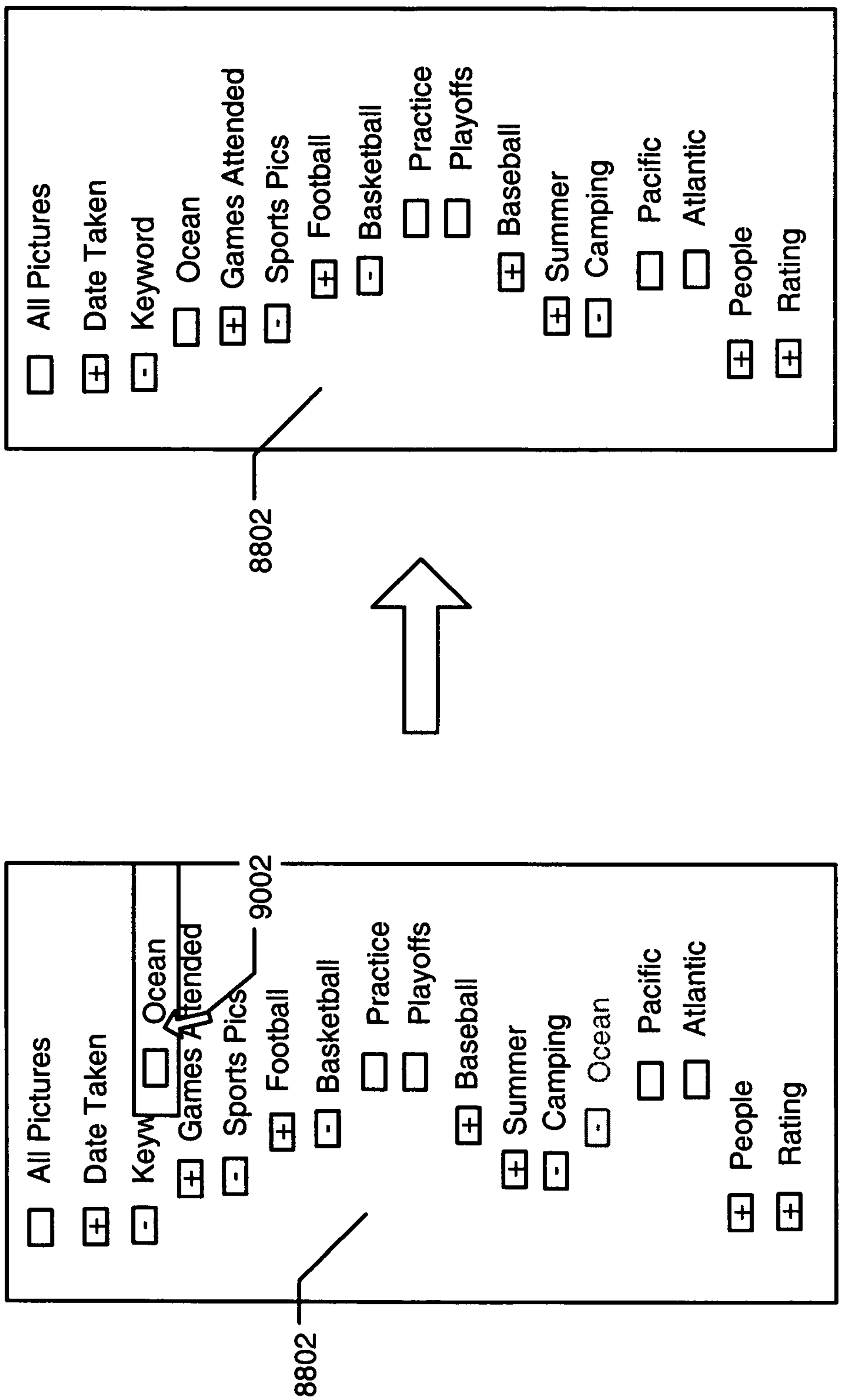
FIG. 90 illustrates an example of changing a hierarchical arrangement of hierarchical properties in accordance with an example of this invention.

Additionally, the actual content of the properties in the hierarchical arrangement may be changed by the user at any desired time and/or in any desired manner without departing from the invention, including, for example, in the manner that conventional "folder" structures are added to, deleted from, and/or otherwise edited in conventional application programs and operating systems. As examples, new properties may be added under an existing property and/or existing properties may be deleted via "right click" mouse button actions (which may display an appropriate user interface, e.g., a menu including "insert new property," "delete existing property," "change node level or position," cut, copy, paste, or other appropriate actions) or in any other desired manner. As another example, if desired, the locations of existing properties in a hierarchical structure may be changed, e.g., moved via "drag and drop" operations, as illustrated in FIG. 90. More specifically, FIG. 90 illustrates the navigation panel 8802 displaying a hierarchical property listing, e.g., for an application program for storing and editing digital photographs. The left hand side of FIG. 90 illustrates the user moving the icon for the keyword "Ocean," through a drag and drop operation (illustrated by arrow 9002) from beneath the "Camping" parent node to the hierarchical level immediately beneath the "Keyword" node. Once positioned at the desired location (e.g., immediately over the "Keyword" node in this example) via the dragging operation (e.g., with the left mouse button held down), the "Ocean" node may be repositioned in the hierarchy by dropping it in that place (e.g., by releasing the mouse's left button). This action will reposition the node "Ocean" as shown in the right hand side of FIG. 90. If desired, the user can move the former children nodes "Pacific" and "Atlantic" to accompany the "Ocean" node through additional drag and drop operations. Alternatively, if desired, systems and methods according to at least some examples of this invention may operate such that repositioning a node also will result in automatically repositioning of its children nodes (if any). If desired, in accordance with at least some examples of this invention, a user can press the "Control" button while dragging a property value in this manner (or take other predetermined action) to make another copy of the property value (and optionally its children property values) appear under a different property value (e.g., using a paste command). Of course, other ways and protocols for cutting, copying, and/or repositioning nodes and/or their respective children nodes may be used without departing from the invention (e.g., repositioning a node with collapsed children may be used to reposition the node and all of its children in one action, but repositioning a node with its children fully expanded and displayed may be used to only reposition the parent node, without its children, etc.). Other default methods and ways of moving nodes may be used in systems and methods without departing from this invention.

In at least some instances, depending on the specific characteristics of systems and methods in accordance with the invention, errors may be generated during this repositioning action, for example, if the same property name appears more than once in the new path or position for the moved property. Systems and methods according to examples of this invention may handle such situations in any desired manner, e.g., by not completing the desired move, by providing an interface to enable the user to change a name within the path, by displaying a dialog box to advise the user of the problem with various options for rectifying the problem, etc. As another example, if desired, systems and methods may be developed that will allow multiple uses of a single name within a path (e.g., Location>New York>New York), such that this error would not appear unless an attempt is made to produce multiple nodes having the same overall flat path string names.

Users that take advantage of the hierarchical property characteristics in accordance with examples of this invention may develop a relatively large hierarchical structure for properties such that the overall hierarchical structure, when fully expanded, spans longer than the available space in the navigation panel 8802 and/or the height of their display screen. This situation can be handled in any desired manner without departing from the invention, for example, by providing scroll bars within the navigation panel, by allowing children nodes to collapse under their parent nodes (and to be fully expanded or collapsed based on user input, e.g., in a manner similar to the way that hierarchical folder structures expand and collapse in conventionally available systems and methods), etc. When opened, navigation panels 8802 of the type illustrated in FIGS. 88 and 90 may open at any desired location within the hierarchical structure and/or in any desired expansion/contraction condition, such as always at the top of the hierarchical structure location, at the most frequently used location in the hierarchical structure, at the most recently used location in the hierarchical structure, at a location in the hierarchical structure that includes the open document (if any), in a fully expanded condition, in a fully collapsed condition, in the most recently used condition, etc. Also, the navigation panel 8802 may appear at any desired location on the display screen, such as at the left or right side, e.g., based on user preference, default, etc.

If desired, systems and methods in accordance with at least some examples of this invention may include a basic hierarchical structure when shipped, and this basic structure may be used by users as a starting point to build a more complete, richer hierarchy, e.g., one that is more targeted and customized to their own uses. Examples of such a pre-determined basic hierarchical structure, e.g., for storing digital picture, audio, video, or other user data, may include base nodes such as: Keywords, Events, Places, People (e.g., potentially with child nodes, such as Author, Photographer, Subject People, etc), Dates, My Pictures, My Music, My Documents, My Videos, etc. Any desired information may be included in this basic hierarchy without departing from the invention.

Figure 91:
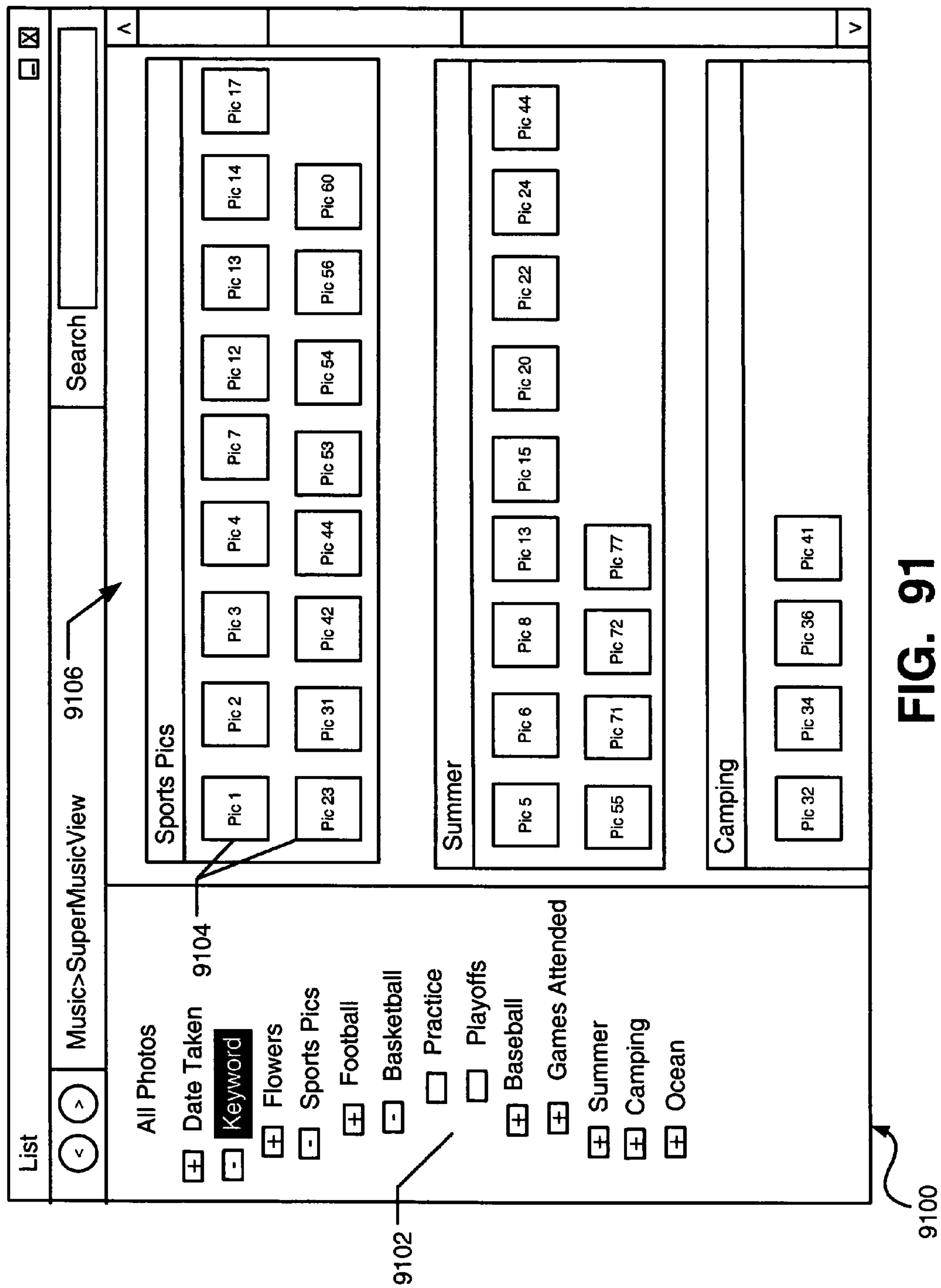
FIG. 91 illustrates an example user interface with a navigation panel in accordance with some examples of this invention.

FIG. 91 illustrates an example display screen 9100 as it may appear, for example, in response to a "List Files," search, query, navigate, or other appropriate command. Notably, the left hand side of this example display screen 9100 includes a navigation panel 9102 for the hierarchical properties under which at least some of this user's files are stored (e.g., relating to a digital photograph storage/editing system in this example). In at least some examples of systems and methods in accordance with this invention, the display screen 9100 with navigation panel 9102 may be a primary entry and interaction point for hierarchical properties for the user. From such a screen 9100, users may be able to view files, present search queries, and/or filter through their files based on the various hierarchical categories that have been created as well as other stored data associated with the files. As shown in FIG. 91, highlighting the node "Keyword" in the hierarchy (e.g., by a left mouse button click action) pulls up a complete listing of user files having keywords assigned to or associated with them. In this example system and method, this action pulls up listings of digital photograph files including thumbnail icons or pictures 9104 illustrating the individual files in the display portion 9106 of the screen 9100. The individual files in this example are grouped based on the individual child levels of the hierarchy immediately below the highlighted search term (i.e., grouped as "Sports Pics," "Summer," and "Camping" groups in this illustrated example, with the other levels of the hierarchy (i.e., "Flowers" and "Ocean") not shown due to display portion 9106 size constraints). Of course, many ways of displaying the search or list view results are possible without departing from this invention.

Any desired form or format may be used for storing or representing the hierarchical properties with individual files without departing from this invention. For example, if a child property value is assigned to a file, the path to that property value through the hierarchical structure may be stored as part of and/or associated with the actual file (e.g., as metadata included in and/or associated with the file). As an example, the representation or data structure of the hierarchical structure may include, at least: (Parent property value) [delimiter] (child property 1) [delimiter] (child property 2) . . . . Returning to the more specific example illustrated in FIG. 91, a file saved with the individual properties "Football" and "Games Attended" associated with it may have metadata associated with the file that would be displayed along with information about the file in at least some instances (e.g., as shown in FIG. 89), for example, in the form of: "Keyword/Sports Pics/Football;" and "Keyword/Sports Pics/Games Attended." In these examples, the parent property value is "Keyword," the first child property value in each instance is "Sports Pics," the second property values are "Football" and "Games Attended," respectively, and the delimiter is the slash "/" (the delimiter may be a special character used to separate property names, and this delimiter may not be included in property names, to avoid confusion in the system). Of course, any number of children property levels may be included in the flat path data string without departing from the invention.

Properties listed in a navigation panel, e.g., panel 9102, at least in part, may behave in a manner similar to the way conventional folders behave in various known operating systems and application programs. For example, the manner of expanding and/or collapsing hierarchical properties in the navigation panel 9102 may be similar to expanding and/or collapsing folders in similar folder navigation panels or controls. As more specific examples, in order to view and display child property values under a parent property, a user can click on a "widget" provided to the left of the property (note, for example, the widget with the "+" sign therein for the "Summer" keyword in FIG. 91 (the "+" sign in the widget indicates the presence of one or more additional undisplayed child properties, and a "−" sign in the widget indicates that the specific property already has been expanded in this example system)). In at least some examples, if a property or node has no children, the widget to its left may be omitted, it may include no additional indicator (e.g., a "+" or "−" sign, etc.), it may include another indicator, or the lack of children nodes may be indicated in another desired manner. An indentation scheme, e.g., as shown in FIG. 91, also may be used to help better illustrate the hierarchical structure. Notably, because an individual file may have multiple properties associated with it, the same file or item may appear in multiple groupings in the display panel 9106 (note, for example, that Pictures 13 and 44 appear in both the "Sports Pic" grouping and the "Summer" grouping in FIG. 91).

Systems and methods in accordance with at least some examples of this invention may support still other ways for users to change, modify, and/or use the hierarchical property structure. As one example, in situations when a property value in the navigation panel 9102 is selected via a right-click action when no items in the display panel 9106 are selected, the user then may be given an option (e.g., via an interface) to add a new hierarchical property as a child under the right click selected node (e.g., a new node with an editable textbox may appear at the location of the new property value in the hierarchical structure to enable the user to type in (or otherwise enter) the new property value). A "delete" function or option may be provided, e.g., via a right mouse button click, to enable the user to delete any desired portion of the hierarchy, such as an individual node, a node and all of its child nodes, etc. "Promote" and "demote" functions may be provided, e.g., to allow a user to select a property value and move it (optionally along with all of its own child values) up or down a level in the hierarchy, respectively (e.g., promotion makes the selected node move to a level so that it now appears as a peer to its former immediate parent node). As still another example, a "rename" function may be provided, e.g., via a right mouse button click, that will enable users to give any property value or node a different name (optionally, with limitations if the same name is used twice in a path and/or if two identical flat path names are presented, as described above). Potential functions that may be provided in accordance with examples of this invention, e.g., via a right mouse button click when a file is selected in the display panel 9106, include a "remove property" function and an "add property" function, which may be used to remove and/or add one or more properties from/to the metadata or other data stored with and/or associated with the file. Of course, other functions and/or other ways of performing the above functions may be provided without departing from the invention. Where necessary, all files or items tagged with a given property and/or path that is changed via the various functions described above may have their corresponding property data and/or path information updated to reflect the user made changes to the paths and/or properties.

Additional features in accordance with at least some examples of the invention relate to sharing hierarchical properties, e.g., when existing files including hierarchical property data are sent to another user having a system or network that supports hierarchical property data but does not necessarily have the same available hierarchical property structure corresponding to the newly received file(s). Systems and methods in accordance with at least some examples of this invention may be constructed to allow sharing of files (or other items) with hierarchical property values in a manner similar to the manner in which files (or other items) having flat property values are shared. In accordance with at least some examples of systems and methods according to this invention, the default behavior for when a file or other item comes into a system with hierarchical property values will be as follows: (a) the hierarchy of the new file will be displayed in all areas where hierarchical keywords typically are displayed by the system or network, e.g., in the same manner as if the newly received file originally had been created on the target system or network; (b) if the same hierarchy as that required for the new file already exists on the new recipient's system or network, the new file item will associate itself with the hierarchy already on the system or network; (c) if only part of the path necessary for the new file exists on the recipient's system or network, the remaining parts of the hierarchy to accommodate the new file will be created on the recipient's system or network; and/or (d) if none of the path necessary for the new file exists on the recipient's system or network, the new hierarchy to accommodate the new file will be added to the recipient's system or network.

The following provides a more detailed example of property hierarchy sharing in situations where a file is received and saved to a new user's system or network. In this example, the recipient user has an existing property hierarchy with the path/property values "Family/Brothers/Toby." A new file is received by a recipient user (e.g., as an email attachment), and this new file, which is saved to the recipient's system, includes metadata from the file sender's hierarchical configuration. Both the file sender and the file recipient operate programs, systems, and/or methods with hierarchical data structures in accordance with an example of this invention. The following table describes the manner in which the recipient user's system may handle receipt of the new file in various different scenarios:

TABLE 1

| New File's Hierarchical Property Value | State of the Recipient's System Before Receiving the New File | State of the Recipient's System After Receiving the New File |
|---|---|---|
| Family/Brothers/Toby | Family/Brothers/Toby | Family/Brothers/Toby - (no change) |
| Family/Brothers/Noah | Family/Brothers/Toby | Family/Brothers/Toby; Family/Brothers/Noah - (the system adds a child node for "Noah" to accommodate the new file's hierarchy) |
| Relatives/Cousins/Toby | Family/Brothers/Toby | Family/Brothers/Toby; Relatives/Cousins/Toby - (the system adds an entire new hierarchy for the new file). |

The various property values associated with a file may be displayed at any appropriate time and in any appropriate fashion without departing from the invention. For example, as described above in conjunction with FIG. 89, property information may be displayed in a "preview" panel associated with a file. As additional examples, if desired, the properties associated with a given file may be included with a "property" page or a "display properties" command associated with a file. Existing properties also may be displayed, for example, during save, save as, edit profile, open file, or other similar operations. If desired, the stored properties associated with a file also may be displayed while the file is opening and/or open, e.g., in a toolbar, and the user may have an interface available for editing the properties, e.g., while actively working with the file, after it is saved, before it is opened, etc. Many other options are available for displaying the saved property data associated with a given file without departing from this invention. Of course, any number of properties may also be associated with a given file without departing from this invention.

Also, any desired amount of the property data associated with a file may be displayed in the various locations without departing from the invention. For example, if desired, the entire hierarchical path may be shown for each property (or at least some properties) at any location where one or more of the properties associated with a file are displayed (e.g., in "preview" or "property" panels, like that shown in FIG. 89). As another example, if desired, only the assigned property value itself may be shown at the various locations (and the remainder of the hierarchy can be seen, for example, via the navigational panel, during a cursor "hover" action, etc., as well as via the file information stacking and grouping features to be described in more detail below). As a more specific example, if an individual file (such as a digital picture) has the following hierarchical keywords assigned to it: "Sports Pics>Baseball>Practices>Cardio Drills," this lengthy flat path string may be represented in at least some locations simply by providing the lowest child node in the path, namely "Cardio Drills." This truncated format of property listing, however, runs the risk of having name collisions and/or being somewhat unclear to the user (e.g., if the node "Cardio Drills" exists at multiple locations in the hierarchy). In such situations, if desired, additional hierarchical information may be displayed along with the lowest level keyword to distinguish the conflicting information. For example, as described above in conjunction with FIG. 87A, each hierarchical node in systems and methods according to at least some examples of this invention has a different and unique path. This information may be used to resolve conflicts described above. Specifically, for example, when there is a conflict of the type described above (defined as two hierarchical property values being visually represented in the same way), systems and methods according to at least some examples of the invention will traverse the conflicting paths until a different parent property value is found, and that value will be displayed (optionally along with the conflicting lowest level node information). For example, if a hierarchy contained and/or an individual file was tagged with both: "Sports Pics>Baseball>Practices>Cardio Drills" and "Sports Pics>Basketball>Practices>Cardio Drills," the displayed property information, e.g., in a "preview" or "property" display, may be represented, for example, as "Cardio Drills. Baseball" and/or "Cardio Drills . . . Basketball," and/or in some other appropriate manner to distinctly show the correct hierarchy.

As another example of practical use of hierarchical property information, many businesses are arranged with at least some degree of hierarchical structure (e.g., departments, divisions, locations, etc.). More targeted operating systems, methods and/or application programs according to examples of the invention may be developed for such businesses that take advantage of the hierarchical nature of the individual corporation's structure. For example, predetermined hierarchies may be provided for the computer systems, networks, and/or application programs used by corporate employees that include a predefined hierarchical structure for properties in data stored for the corporation. Such systems and methods can enable at least some overall sensible hierarchical structure in the corporation's systems and networks in which its data may be organized and stored.

Aspects of the present invention also relate to computer-readable media including hierarchical property data stored thereon and computer-readable media including computer-executable instructions stored thereon for allowing entry and/or use of hierarchical property data in various operating systems, application program environments, and/or various other systems and methods, including the systems and methods described above. The computer-readable media may constitute computer-executable instructions stored on the various specific examples of computer-readable media described above.

Page Space Control: Example systems, methods, and computer readable media according to aspects of the invention: Multiple Property Selections: As described above, additional aspects of the present invention relate generally to systems and methods for searching information contained on a computer system or network, optionally, taking advantage of the hierarchical property structures described above.

With its Windows® computer operating systems, Microsoft Corporation of Redmond, Wash. introduced a real world analogy for saving, organizing, and retrieving electronic information from computer systems or networks, namely folders. This folder system was strictly an end-user concept introduced to give a real world feel to the electronic data and information stored on or available through the computer. Computer users typically think of their computer's hard drive as a big filing cabinet in which their files are organized. However, to the computer system itself, an electronic file is simply a series of bits that are encoded magnetically to a hard drive (or in some other manner), and a "folder" is simply a way for the computer system to reference those sets of files.

With Microsoft Corporation's NT File System ("NTFS"), the ability to support hard links was introduced. This feature enabled users to place electronic files in multiple folders. Of course, physically, this feature does not require that the bits representing those electronic files are duplicated multiple times on the computer's hard drive (or other storage system), e.g., once for each folder in which the file is placed. Rather, the different folders reference back to the same file. However, when initially released, this ability was not exposed to end users because putting a single file into multiple folders did not match the user's real, physical world concept (i.e., the same physical piece of paper cannot be located in two separate physical folders at the same time).

In at least some operating systems in which at least some aspects of this invention may be practiced, a new end-user concept called a "list" is being introduced. As a physical analogy, one may think of a "list" as a container that references sets of items (e.g., electronic files). To better understand "lists," a more detailed explanation of a "folder" is described. A "folder" may be considered as a "set" or group of items that are considered as related to one another in some manner (e.g., being present in the same "folder" may be one way that items in a set may be considered as "related"). Each item or file in a set or folder may include a property called "PARENTFOLDER" (e.g., in the form of a path, such as "c:\users\usera\documents"). Notably, this path also is an end user metaphor and does not necessarily reflect the physical structure of the computer. In fact, the concept of a drive itself also may be considered a metaphor, as a single physical hard drive may be partitioned into multiple "drives," such as a c drive, a d drive, etc.

Another way users can define a "set" is through a "list." "Lists" may be considered as related to "folders" because each may be thought of as defining a set of items. Unlike "folders," however, "lists" in accordance with at least some examples of this invention do not define this relationship using a "PARENTFOLDER" property as described above. Rather, "lists" will allow the same item (e.g., an electronic file) to exist in multiple locations (e.g., in multiple, independent "lists"). Like "folders," "lists" are an end-user concept. Putting electronic files or other items in multiple "lists" does not cause the actual physical bits representing the underlying data to be duplicated, but rather, the underlying electronic files or items are referenced by (or "linked" in some manner) to that "list." To tie this discussion back to a real world example, a person may have a "Shopping List" and an "Urgent 'To Do' List" in which they keep track of items they need to purchase and things that they need to do. Both of these "lists" may include an item such as "birthday present for wife." The user understands that buying a gift is both something that must be done while shopping and something that must be done rather urgently. The user further understands, however, that just because this item is entered in two of his/her lists, this does not mean that they need to purchase two gifts. Rather, the single act of buying the gift allows the user to remove each item from its respective list.

Operating systems in which at least some aspects of the present invention may be practiced further may include "Auto Lists." "Auto Lists," like "lists" and "folders," define sets of items. These sets of items may be generated automatically based on common property values associated with items stored on or available through the computer system. For example, if desired, users can have an Auto List based on the property value: rating=5 star. Using this "Auto List" feature, users can easily locate and see information relating to all of their files that are rated 5 stars regardless of which specific folder or "list" they may appear in. As long as the file or item has a 5 star rating associated with it, systems and methods according to at least some examples of this invention will automatically include this file or item as a member of this dynamically and automatically generated set, e.g., any time a user's query asks to see the 5-star Auto List. Other examples of "Auto Lists" may include, for example: recently created files, recently edited files, frequently used files, Author ID, creation time/date, edit time/date, file type, application name, etc.

One aspect relating to the content of an "Auto List" relates to the list's scope (i.e., the set of files and/or locations that will be searched to generate the "Auto List"). Various limits on the scope of an "Auto List" may be set, depending, for example, on the environment in which the computer is located, user preferences, the manner in which the computer or network is used, and the like. For example, the scope of an "Auto List" may be limited to a particular machine, to a particular user's files on a machine or a network of machines, and/or in any other desired manner without departing from aspects of this invention. As a more specific example, the scope of a "5 star" Auto List may be limited to a set of specific files or folders to search across, such as the files or folders on a given physical computer and/or files or folders created by a given user. If desired, however, users can set an Auto List scope (or other search scope) to search across everything on the computer and/or the network containing the computer, such as to locate all "5 star" files stored on either of the user's desktop or laptop computers.

With the increasing number of files users are saving on their PCs (e.g., documents, music, video, and picture files, etc.) and the increasing use of networked computer systems, the ability for users to select smaller search scopes (e.g., for Auto Lists or other searches) may become important (e.g., to avoid location and display of excessive irrelevant data (e.g., data from other users or other locations), to avoid search delays, etc.). As a more specific example, a graphics designer may want to scope an "Auto List" search to limit its search and returned content to a hard drive portion (e.g., a directory or the like) that contains only Photos (or, optionally, only a specific user's photos). This user would not necessarily want to search everything on the PC and/or everything on the network to which the PC may be connected. Such users may not wish to see other user's files that also may meet the search parameters set for the "Auto List."

Accordingly, in systems and methods in accordance with at least some examples of this invention, users may select and define "sub-item domains" as part of search scopes. A "sub-item domain" is a set of folders defining a smaller scope for the computer system to search across. This sub-item domain may include a set of folders and/or sub-folders where users store their data, items marked with certain properties, etc.

Figure 92A:
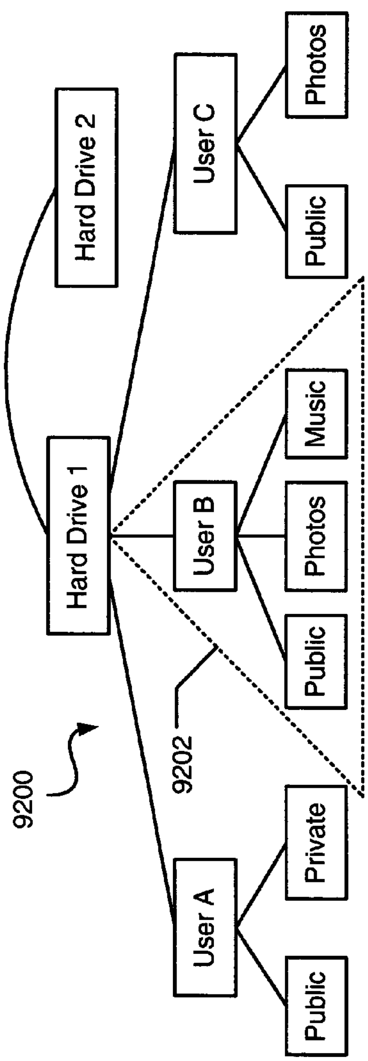
FIGS. 92A and 92B are diagrams that illustrate examples of different scopes that may be used during navigation and display operations in accordance with examples of this invention.
Figure 92B:
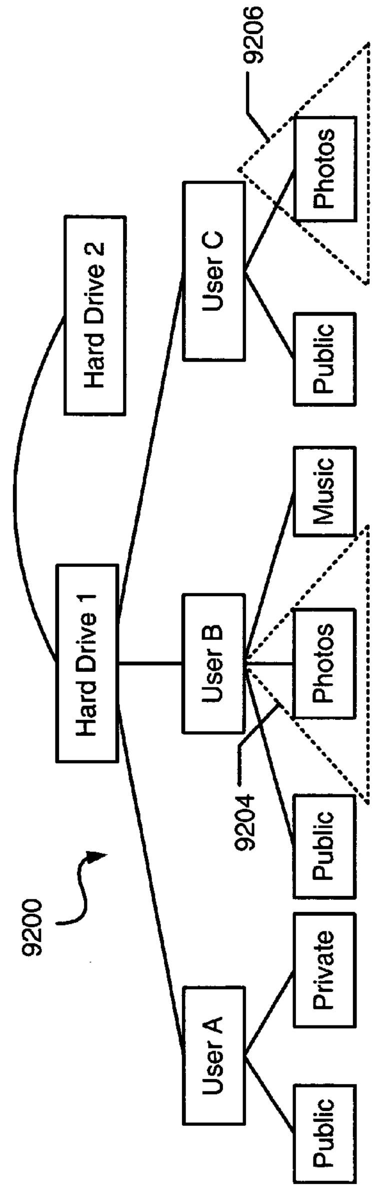

FIGS. 92A and 92B illustrate examples of sub-item domain scope setting aspects. For example, FIG. 92A illustrates an individual computer or network 9200 shared by multiple users (e.g., Users A, B, and C), wherein each node in the illustration indicates a folder or other file "container" set created by and/or for the various users. During searching activities, including activities relating to generation of "Auto Lists," as described above, a user may set the system to search only a portion of these available "folders" or other elements. For example, by setting the "sub-item domain scope" for a certain search or Auto List, a user can limit his/her search to only certain folders of files. FIG. 92A illustrates a "sub-item domain," represented by triangle 9202, set to search only the folders including and under the folder "User B." Of course, a "sub-item domain" may be set to encompass any portion of the network 9200 without departing from this invention. Additionally, if desired, the scope may differ for the various different Auto Lists generated by a given computer system without departing from the invention. By using a sub-item domain scope such as that shown in FIG. 92A, the results of the "Auto List" or other searching activities may be much more relevant because the searching is more targeted to only certain specified source data (e.g., User B's data in this example). Also, performance speed may be increased because the set of items to inspect is smaller. Of course, user interfaces may be provided so that users can readily adjust and change the sub-item domain for any search activities, including Auto List searches.

The content of this settable "sub-item domain" need not be limited to a single folder or even a single common branch of the folder hierarchy. Rather, if desired, in accordance with at least some examples of systems and methods in accordance with this invention, a user may set a search scope (such as an "Auto List" generation search scope) to consider files located in multiple folders, optionally in multiple branches of the network or computer memory. FIG. 92B illustrates the example individual computer or network 9200 of FIG. 92A, but in this example, the search "sub-item domain" is set to search through data included only in folders available from two independent users, as represented by sub-item domain triangles 9204 and 9206 (photo data from Users B and C in the illustrated example of FIG. 92B). Again, using this sub-item domain scope, the results of the "Auto List" or other searching activities may be much more relevant because the searching is more targeted to only the desired users' data in this example, and performance speed may be increased because the set of items to inspect is smaller.

Additional aspects of the present invention further extend from the aspects described above. In at least some example systems and methods in accordance with this invention, multiple folders and/or properties may be selected by users as the scope for searches and/or displays of information stored on the computer. Such systems and methods may utilize navigation panels that display properties and/or folders in a hierarchical manner, as described above, for example, in conjunction with FIGS. 87-91.

In conventional and currently available "folder trees" that display folders of items stored on a computer, users cannot select more than one folder at a time. If a user wants to view the contents of multiple folders, he or she has to open multiple windows (e.g., one for each folder desired) and/or consecutively open and inspect the desired folders. Therefore, the user cannot view all information from multiple folders in a common screen, making it difficult to get an accurate overview of the available information stored on the computer system or network.

The availability of "lists" and "Auto Lists" further exacerbates this problem. As noted above, lists and Auto Lists may comprise sets of property values that help define or categorize files and/or other items stored on the computer system or network. Often, users would like to further narrow down information presented via a list or Auto List procedure (i.e., the relevant files identified as meeting a search criteria) based on the requirement that the displayed information include multiple properties associated with it. For example, users may wish to see all stored pictures from a specific trip locale that also include a specific person (e.g., spouse). Without the ability to use multiple property selection techniques, users may not be able to easily find the sub-set of files that meet these two independent property criteria.

Aspects of this invention relate to systems and methods that allow for conducting searches, interpreting search results, and/or displaying search results when multiple properties are selected as part of the search criteria, e.g., from a hierarchical listing of properties provided in a navigation panel or otherwise made available to a user. Such systems and methods may be used, for example, when navigating, searching, displaying, and/or otherwise interacting with various lists, Auto Lists, and/or folders.

One feature relating to this aspect of the invention relates to the manner in which information or files are determined to satisfy the search, which includes multiple properties and/or other search parameters. More specifically, in some instances users would prefer to see the combined union of all information that satisfies either feature of a multiple property search query (i.e., display information that satisfied either property A "OR" property B), and in other instances users would prefer to see the intersection of only the information that satisfies both features of a multiple property search query (i.e., display information that satisfied property A "AND" property B). As some more specific examples, when users request retrieval of information identifying all files that contain "Maui pictures" taken with a member of the family contained therein, they expect the searching systems and methods just to retrieve those pictures that contain both a family member AND were taken in Maui. With such a query, users typically do not wish to see all Maui pictures (including all pictures without family members contained therein) and all family pictures (including pictures not from Maui). On the other hand, when users request retrieval of information identifying files that are rated either three stars or four stars, they expect the searching systems and methods to retrieve files with either of these ratings (because at least most files would not be simultaneously rated three stars and four stars by the user).

Accordingly, at least some aspects of this invention relate to algorithms that automatically determine whether users likely wish to receive set "union" or set "intersection" information based on the information or multiple search parameters selected, e.g., from a navigation panel of properties and/or folders, e.g., arranged in a hierarchical manner. In general, as will be explained in more detail below, systems and methods in accordance with at least some examples of this invention will return information (e.g., during a "search," "list files," or other navigation task) regarding files based on a union of the multiple parameters selected (a logical OR operation) when the searched multiple properties, lists, folders, items, and/or other parameters belong to the same "property" in the hierarchy. On the other hand, systems and methods in accordance with at least some examples of this invention will return information (e.g., during a "search," "list files," or other navigation task) regarding files based on an intersection of the multiple parameters selected (a logical AND operation) when the searched multiple properties, lists, folders, items, and/or other parameters belong to or lie across different properties. More detailed examples of operation of this algorithm are described below in connection with FIGS. 93 through 103. Of course, if desired, a user may be given an option and/or opportunity (e.g., via an interface screen, right mouse button click, etc.) to override the automatically selected AND or OR operation for a given search query to customize and target the results for that specific query.

Figure 93:
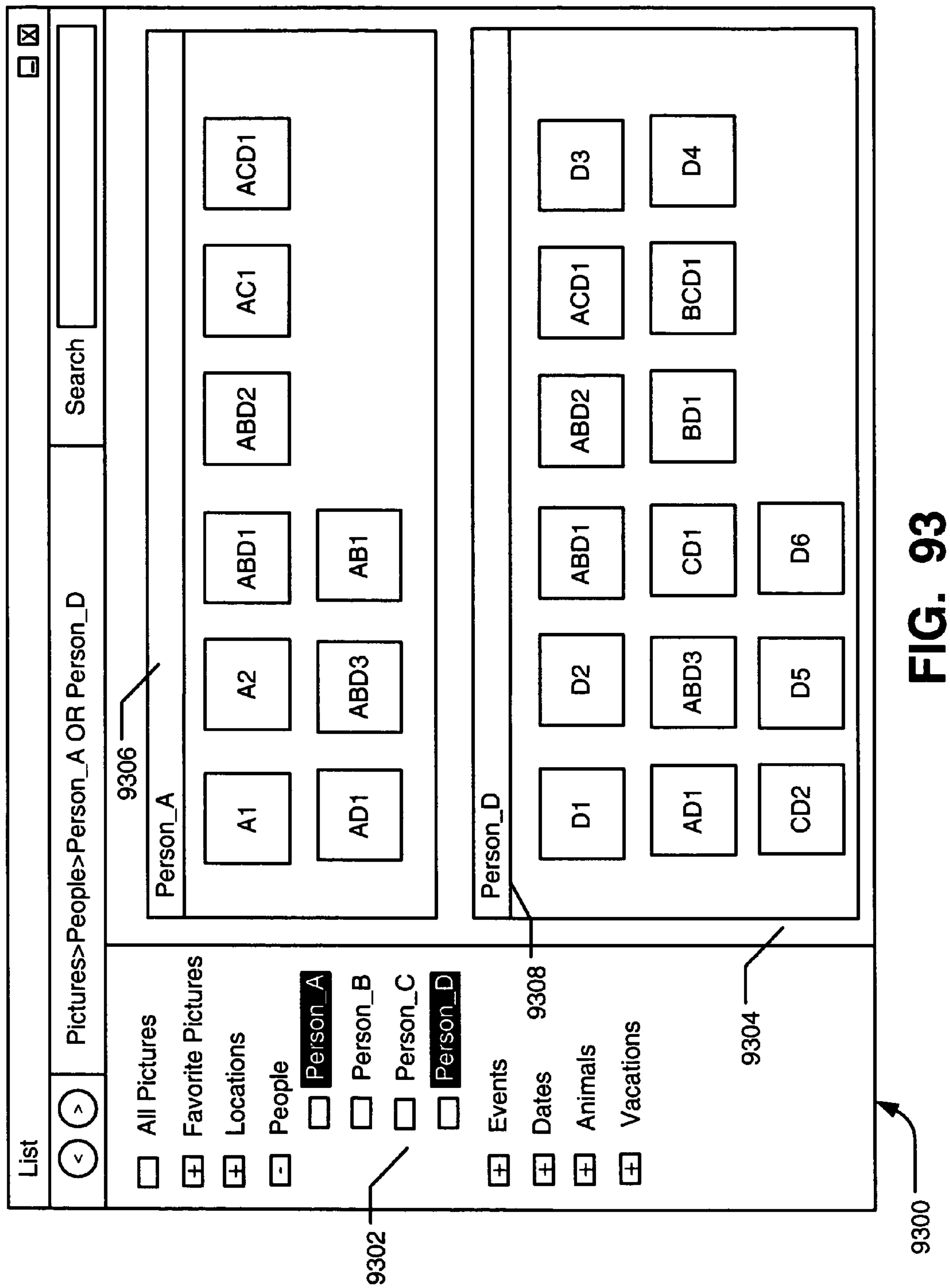
FIGS. 93 through 103 illustrate examples of user interfaces, displays, and operations during multiple property or other information selections in navigation and display operations in accordance with examples of this invention.

Page Space Control: Example systems, methods, and computer readable media according to aspects of the invention: Multiple Property Selections: Multiple Selections Within a Single Multi-Value Property: FIG. 93 illustrates an example display screen 9300 that includes a navigation panel 9302, which may include a hierarchical listing of properties, folders, and the like (the various nodes in panel 9302 in the illustrated example). Information stored under and/or associated with the nodes optionally may contain information identifying individual electronic files or items of information (e.g., email files, music files, digital photo files, electronic documents, audio and/or video files, etc.) that have been associated with that node (e.g., automatically, by user input, by another's input, when the file was downloaded from another source, etc.). Information identifying at least some of the files corresponding to one or more criterion specified for the search query or list files activity is displayed, in this example display screen 9300, in the display panel 9304. Using the navigation panel 9302, a user may select one or more of the hierarchical nodes representing an assigned property associated with the file, and the display panel 9304 will contain information identifying files or other collections of information that satisfy the user specified property criteria.

As shown in FIG. 93, in this example, the user has indicated that they wish the system to retrieve information identifying files that include pictures showing Person_A and Person_D (as shown by highlighting in the figure). As a more general description, in this example, a user has selected multiple values within a single, multi-value property from the hierarchy (i.e., selection of the hierarchical icon representing Person_A and selection of the icon representing Person_D from a single property ("People")). The "People" property is called a "multi-valued" property because the files under the "People" property may have multiple individual property entries (e.g., a given picture may contain more than one identified person, and thus may have multiple "People" child properties associated with it). In response to this query, search, or "list files" command, systems and methods according to this example of the invention retrieve any pictures that contain either Person_A or Person_D (to be retrieved, the system automatically or some person must have, at some time, associated the "Person_A" or "Person_D" properties or keywords with the various picture files (e.g., as metadata, as discussed above), thereby indicating the person(s) included in the picture). Notably, in this example search query, systems and methods in accordance with this example of the invention automatically retrieve union information, i.e., information identifying files that contain either Person_A OR Person_D (represented by the letters "A" and "D," respectively, in the names included in the icons in FIG. 93), including any pictures that contain both Person_A and Person_D (i.e., pictures ABD1, ABD2, ACD1, AD1, and ABD3 in this example). In essence, systems and methods in accordance with this example of the invention performed a logical OR operation based on the input parameters specified by the user in the navigation panel 9302.

Accordingly, from this example, a first rule of a selection algorithm in accordance with at least some example systems and methods according to the invention may be derived. By this rule, information returned from user selection of multiple sets within a single, multi-value property set automatically will be returned in a "unioned" or logical "OR" query language manner. Of course, if desired, systems and methods in accordance with at least some examples of the invention may provide a user with the ability to override this rule and/or this automatic selection action (and thereby run an "AND" operation).

Notably, in the illustrated display panel 9304, the two selected data sets are shown or are available in their entirety and maintained separate from one another (i.e., one sub-panel 9306 for the Person_A pictures and one sub-panel 9308 for the Person_D pictures in this example). Notably, a single list item may appear in each sub-panel 9306 and 9308 (or in others), if appropriate (i.e., the icons representing pictures ABD1, ABD2, ACD1, AD1, and ABD3 appear in each sub-panel 9306 and 9308 in this example). Of course, many other ways of displaying the retrieved information (e.g., in display panel 9304) may be used without departing from the invention, including for example, displaying a compiled listing of files or items without an indication of the source property and/or without providing repeated representations of the same file or item. As another example, if desired, the display portion 9304 could also include a display sub-panel or the like that includes the results of the logical AND operation (i.e., pictures including both Person A and Person D in this example), to make this information readily available to the user, in the event the logical AND operation was desired.

Figure 94:
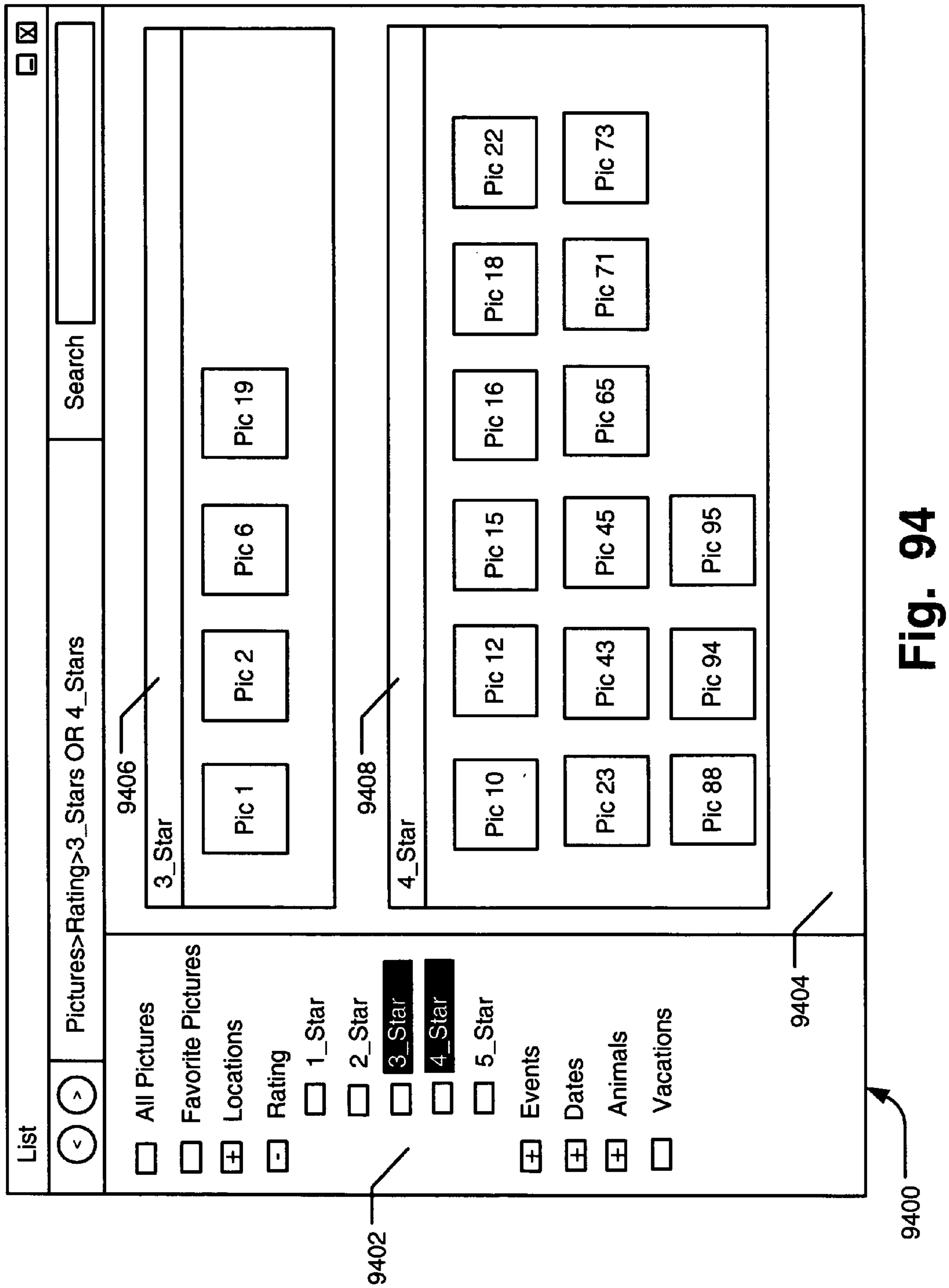

Page Space Control: Example systems, methods, and computer readable media according to aspects of the invention: Multiple Property Selections: Multiple Selections Within a Single-Value Property: As described above, in the example of FIG. 93, the "People" property is a multi-valued property (meaning that an item of information (e.g., a file) stored under that property may have more than one of the underlying child properties associated with it). Some properties, however, may be considered "single valued properties," which means that each item of information (e.g., a file) stored under that property contains only a single instance of an underlying child of this property. Examples of single valued properties may include, but are not limited to: size, rating, and the like. FIG. 94 illustrates an example display screen 9400 in which a user has selected multiple properties (e.g., in a list files, search query, or other action) from a navigation panel 9402 including a hierarchical arrangement of properties (or folders, etc.), wherein the selected properties lie under a single valued property "Rating" (i.e., a user typically can and/or will give only one rating to a file). Notably, in this example, the user has requested retrieval of all pictures having a 3 or 4 star rating, as evident from the highlighting in the navigation panel 9402.

In response to this query, search, or "list files" command, systems and methods according to this example of the invention retrieve any pictures rated either as 3 stars OR 4 stars (to be retrieved, the system automatically or some person must have, at some time, associated a rating property with the various files (e.g., as metadata, as discussed above)). Notably, in this example search, systems and methods in accordance with this example of the invention automatically retrieve union information, i.e., information identifying files rated either 3 stars OR 4 stars. In essence, systems and methods in accordance with this example of the invention performed a logical OR operation based on the input parameters specified by the user in the navigation panel 9402. In fact, in this example, because the "Rating" property is a single valued property, it would not make sense to perform a logical "AND" operation, because the "AND" operation would return an empty set in each instance (i.e., because each file contains one and only one rating, no files will be located during the search that contain both a 3 star AND a 4 star rating)

Accordingly, from this example, another rule of a selection algorithm in accordance with at least some example systems and methods according to the invention may be derived. By this rule, information returned from user selection of multiple sets within a single-valued property set automatically will be returned in a "unioned" manner or in a logical "OR" query language manner. Of course, if desired, systems and methods in accordance with at least some examples of this invention may provide a user with the ability to override this rule and/or this automatic selection action.

Notably, in the illustrated display panel 9404, the two selected data sets are shown or are available in their entirety and maintained separate from one another (i.e., one sub-panel 9406 for the 3-star rated pictures and one sub-panel 9408 for the 4-star rated pictures in this example). Notably, in this instance, no single list item appears in both sub-panels 9406 and 9408 (or in others), because each file, by definition in this example, contains a single rating value. Of course, many other ways of displaying the retrieved information (e.g., in display panel 9404) may be used without departing from the invention, including for example, displaying a compiled listing of files or items without an indication of the source property.

Figure 95:
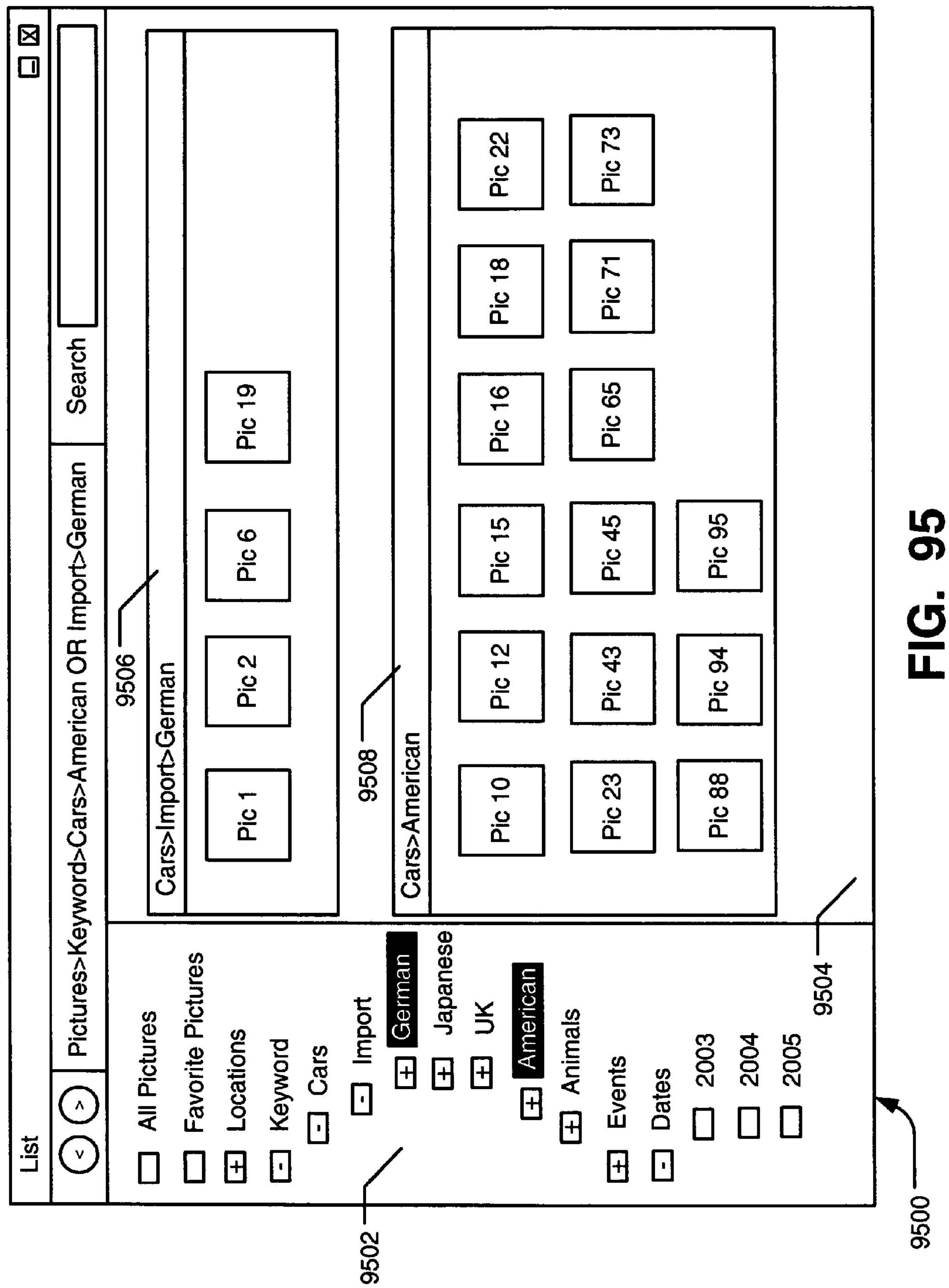
Figure 96:
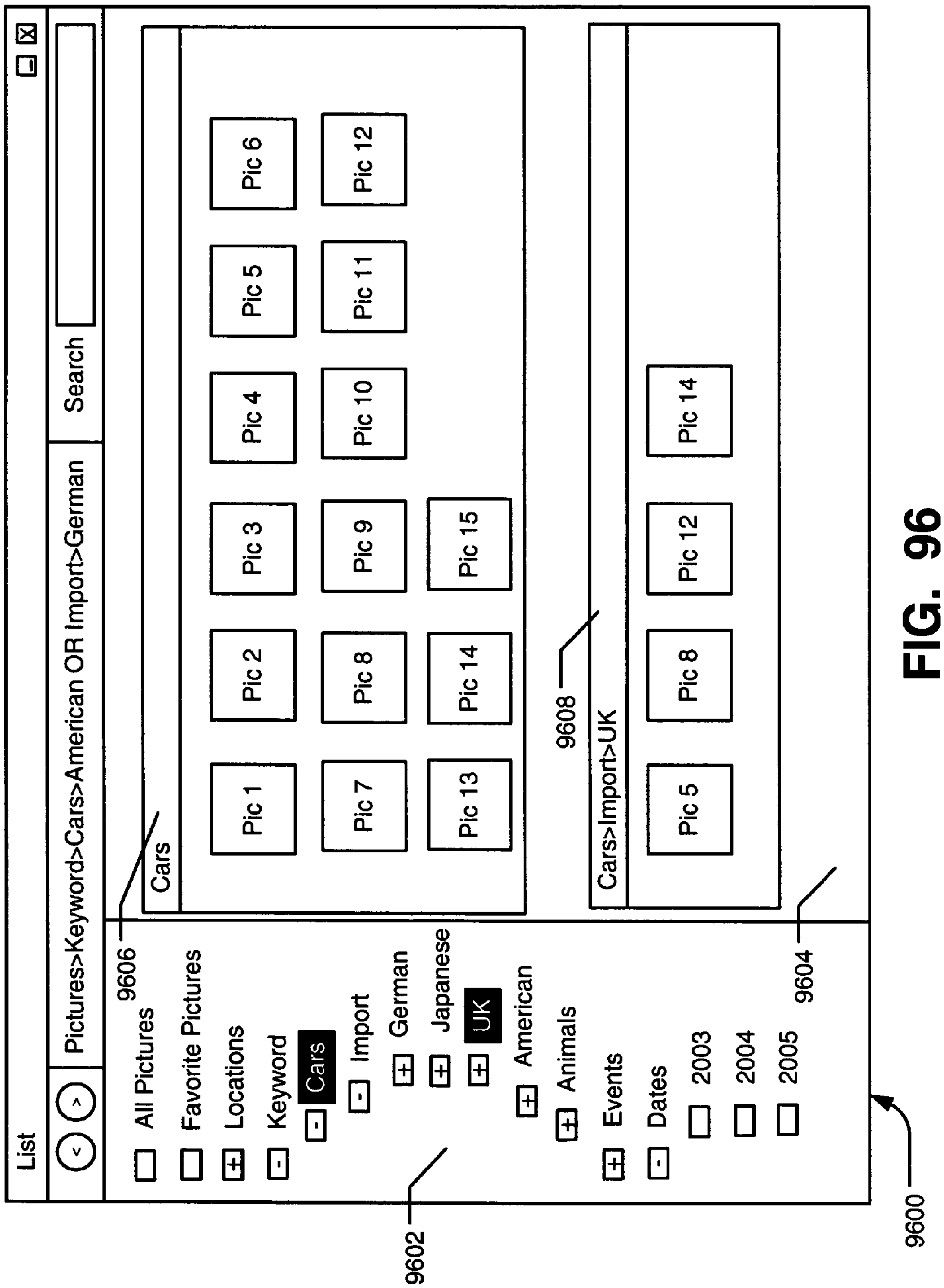
Figure 97:
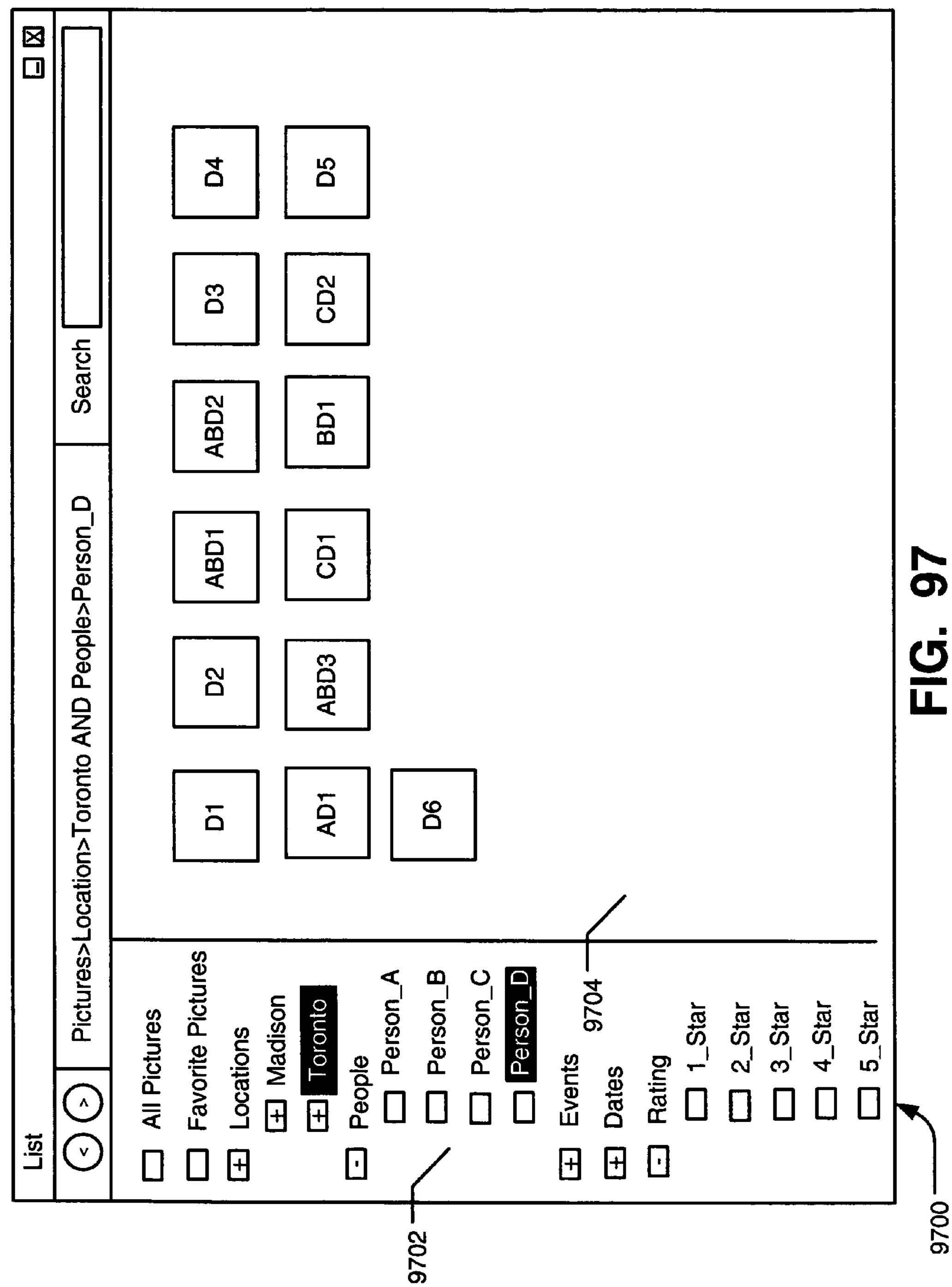

Page Space Control: Example systems, methods, and computer readable media according to aspects of the invention: Multiple Property Selections: Additional Logical "OR" Examples: As noted above, the above rules may apply to items in folder structures and/or in a hierarchical property structures. FIGS. 95 and 96 illustrate some additional examples when user selection is applied to hierarchical properties in a navigation panel.

As shown in the display screen 9500 of FIG. 95, a user has selected two independent entries in a hierarchical property table present in a navigation panel 9502, namely a Cars>Import>German property and a Cars>American property. Because the selected properties still are located under a common multi-valued parent property ("Cars" in this example), the above rule applies, and the display panel 9504 will display the union of the two selected properties in response to this query, search, or list files operation. More specifically, as shown in FIG. 95, the display panel 9504 includes information identifying all stored files corresponding to the logical OR operation, i.e., information that satisfies either search criterion, namely stored digital pictures corresponding to German import cars OR stored digital pictures corresponding to American cars. A logical AND operation makes less sense or is less likely in this specific factual situation because typical cars would not be considered both "imports" AND "American" (an AND operation could return a hit however, for example, if multiple cars were included in a given picture and properties were associated with the file for both cars in the picture).

Notably, in this example, the two selected items (i.e., properties) in the hierarchical structure were not located in the same hierarchical level. Nonetheless, the logical OR operation was conducted in this instance because, as noted above, the algorithm's rule requires the OR operation to be performed when the selected properties are located under a common parent property (this common parent property, however, need not be an immediate parent of both or either selected node).

Notably, in the illustrated display panel 9504, the two selected data sets are shown or are available in their entirety and maintained separate from one another (i.e., one sub-panel 9506 for the German car pictures and one sub-panel 9508 for the American car pictures in this example). Again, in this instance, no single list item appears in both sub-panels 9506 and 9508 (or in others), but, because a single picture may include more than one automobile, overlapping pictures may be possible in the sub-panels 9506 and 9508. Of course, many other ways of displaying the retrieved information (e.g., in display panel 9504) may be used without departing from the invention, including for example, displaying a compiled listing of files or items without an indication of the source property, with no duplicated photo listings, etc. Also, if desired, the results of a logical AND operation also may be displayed in display panel 9504, optionally along with the results of the logical OR operation.

FIG. 96 illustrates another example display screen 9600 in which multiple hierarchical property nodes in a navigation panel 9602 are selected by a user. In this example, a node and one of its corresponding grandchildren nodes are selected by the user (namely, the Cars node and Cars>Import>UK nodes were selected). In this instance, a logical AND operation makes little or no sense because if the user had intended to list files corresponding to only the UK import cars, he/she could have simply selected the UK node to create this listing (a multiple selection was not required). Accordingly, the above selection rule still applies, i.e., because the selected properties are located within a common parent property ("Cars" in this example), the system will automatically retrieve and the display panel 9604 will automatically display the union of the two selected properties in response to this query, search, or list files operation. More specifically, as shown in FIG. 96, the display panel 9604 includes information identifying all stored files corresponding to the logical OR operation, i.e., information that satisfies either search criterion, namely stored digital pictures corresponding to all cars OR stored digital pictures corresponding to imported UK cars.

As with the various display panels described above, display panel 9604 makes the two selected data sets available in their entirety and maintained separate from one another (i.e., one sub-panel 9606 for all the car pictures and one sub-panel 9608 for the UK imported car pictures in this example). In this example system and method, all of the UK car pictures in sub-panel 9608 also are included within the more generic Cars sub-panel 9606 because all UK car pictures must fall within the Cars parent node (e.g., as described above with regard to the hierarchical properties, when a child property is assigned to a file, that file also automatically is assigned all parent properties to the assigned child property). Of course, many other ways of displaying the retrieved information (e.g., in display panel 9604) may be used without departing from the invention, including for example, displaying a compiled listing of files or items without an indication of the source property, with no overlapping photos displayed, etc.

Page Space Control: Example systems, methods, and computer readable media according to aspects of the invention: Multiple Property Selections: Logical "AND" Examples: The above examples for FIGS. 93-96 relate to multiple user selections within a given hierarchical grouping, such as a folder, a hierarchical property, or the like. Another rule of the example algorithm for determining what data to display in response to multiple user selections in a hierarchical folder or property structure is illustrated with respect to FIGS. 97 through 99.

In general, this "rule" of the algorithm requires that when the multiple user selections are made across different parent property sets, the "intersection" of the search results will be displayed (or a logical AND operation will be performed and the results displayed). In the example illustrated in FIG. 97, the display screen 9700 shows a navigation panel 9702 in which multi-value hierarchical properties are displayed. The user has selected two properties that span across two of the highest level parent property sets, namely: Locations>Toronto and People>Person_D. In situations of this type, users typically expect a logical AND operation to be performed such that the displayed results include only pictures taken in Toronto that also include Person_D (e.g., typically with a search query of this type, a user would not wish to see all Toronto pictures or all pictures including Person_D). Therefore, as shown in display panel 9704 in this example, the resulting displayed results include only those pictures from the Toronto trip that include Person_D therein. Because the intersection of both selected sets is displayed, there is no reason to separately show the results from each user selected set, as was shown above in FIGS. 93-96 (i.e., each item in display panel 9704 would be present in the Locations>Toronto listing and in the People>Person_D listing), although these individual selected sets also may be shown, if desired (e.g., to cover the possibility that the user wanted to see both individual sets).

Of course, any way of displaying the search results, e.g., in display panel 9704, may be used without departing from this invention. Additionally, if desired, users may be provided with the ability to override the automatic AND operation produced by systems and methods in accordance with this example of the invention.

Application of the logical AND operation is not limited to use with multi-valued hierarchical properties. For example, if one or both of the user selections in FIG. 97 had constituted a single valued property (such as one of the star "Rating" properties shown in the navigation panel 9702) and the other selection had been located in a different parent property set (such as in the "People" or "Locations" property sets), the "intersection" of the selected star Rating property and the selected People or Locations property would have been displayed (i.e., a logical AND operation still would have been performed and the results displayed because the selections spanned across different property sets).

Figure 98:
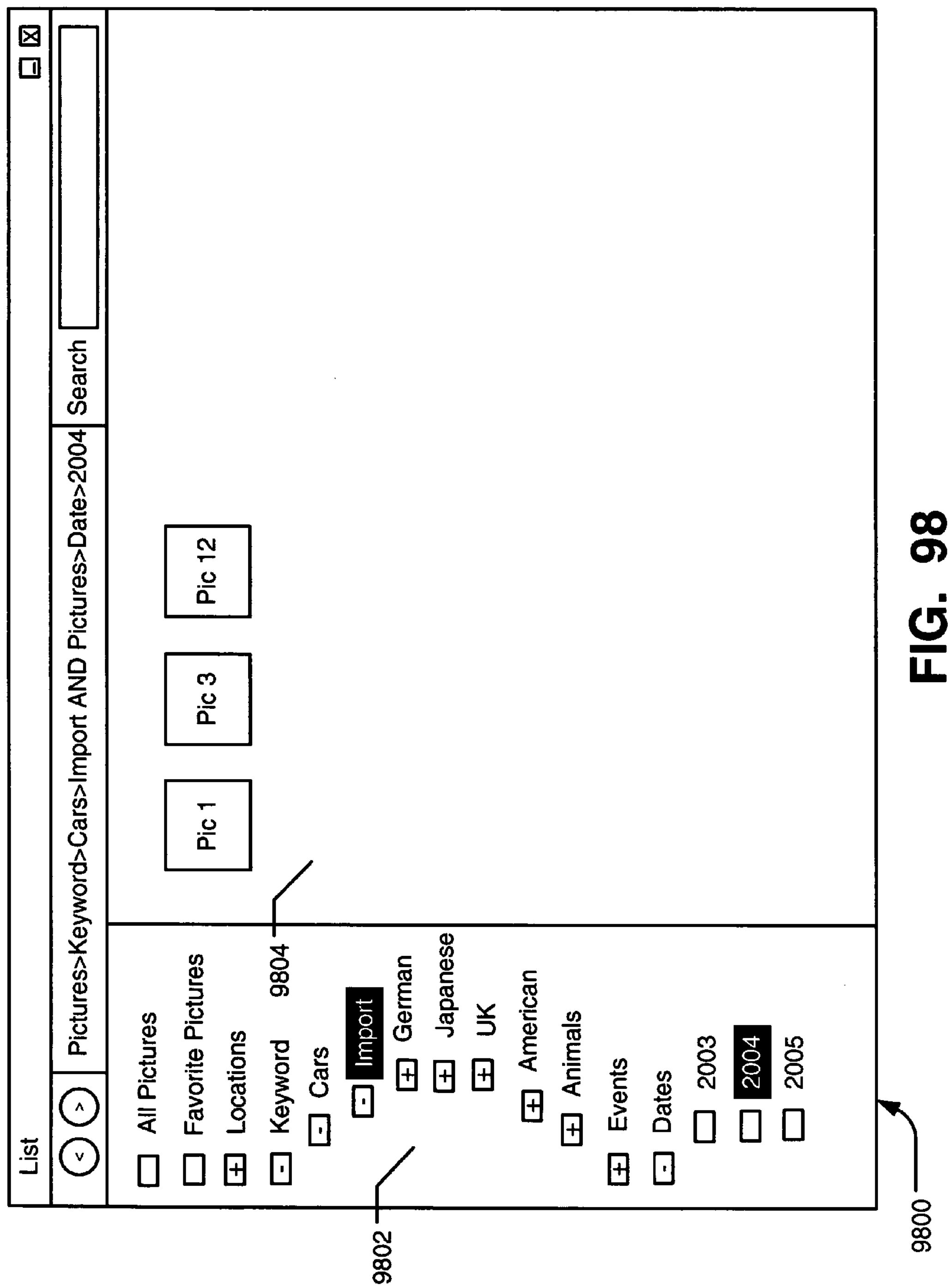

The algorithm's rule for applying a logical AND operation also applies when selections are made across different hierarchical properties, even when these selections are located at different depths within the hierarchical structure. FIG. 98 illustrates an example. As shown in the display screen 9800 of FIG. 98, the user has selected the properties Keyword>Cars>Import and Date>2004 in the navigation panel 9802. Because the top level parent properties differ, a logical AND operation is conducted, and display panel 9804 displays the intersection of these two properties (i.e., it displays files having both selected properties, namely pictures of Import cars from the year 2004). This AND operation is conducted despite the fact that one of the selected nodes has a different number of parent nodes as compared to the other selected node (and therefore exists at an overall different level in the hierarchy).

This same algorithm rule may apply and similar intersection results may be obtained irrespective of whether one or both of the user selected properties is a single value property or a multi-valued property.

Figure 99:
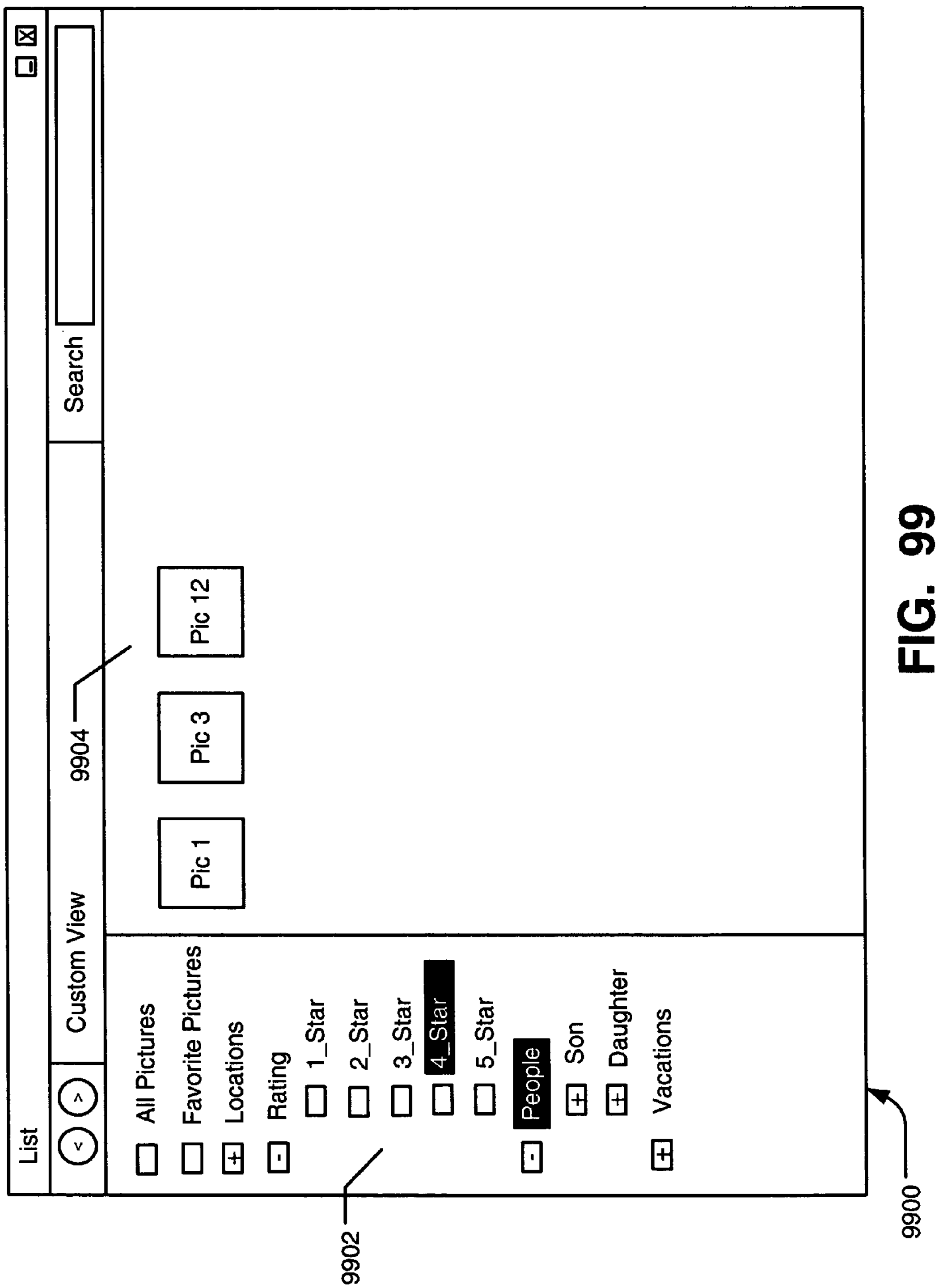

Additionally, the algorithm's rule for applying a logical AND operation also applies when selections are made across different hierarchical properties, even when at least one of these selections does not include a low level item in the hierarchy. FIG. 99 illustrates an example. As shown in the display screen 9900 of FIG. 99, the user in this example has selected the properties Rating>4_Star and People in the navigation panel 9902 (no particular person under the People node was selected). Because the top level parent properties differ, a logical AND operation is conducted, and display panel 9904 displays the intersection of these two properties (i.e., it displays information relating to files having a "People" property (e.g., any person) included therein that is rated 4 stars).

Page Space Control: Example systems, methods, and computer readable media according to aspects of the invention: Multiple Property Selections: Use of Multiple Selections in Hierarchies with Folders, Lists, or Other Structures: As noted above, aspects of the use of multiple user selections in hierarchies also may be applied to hierarchies that include conventional folders (e.g., performance of the OR/AND functions may be determined using the rules above, even if one or both user selected elements includes a folder structure). Conceptually, in accordance with at least some example aspects of this invention, a "folder" may be treated as a single-valued property. More specifically, because an individual file will reside only in a single conventional folder as described above, a folder may be treated as a single-valued property in accordance with these aspects of the invention. Optionally, if desired, the multiple user selections may include a mixture of selections of folder elements and property elements in the hierarchical structure. Various examples follow.

Figure 100:
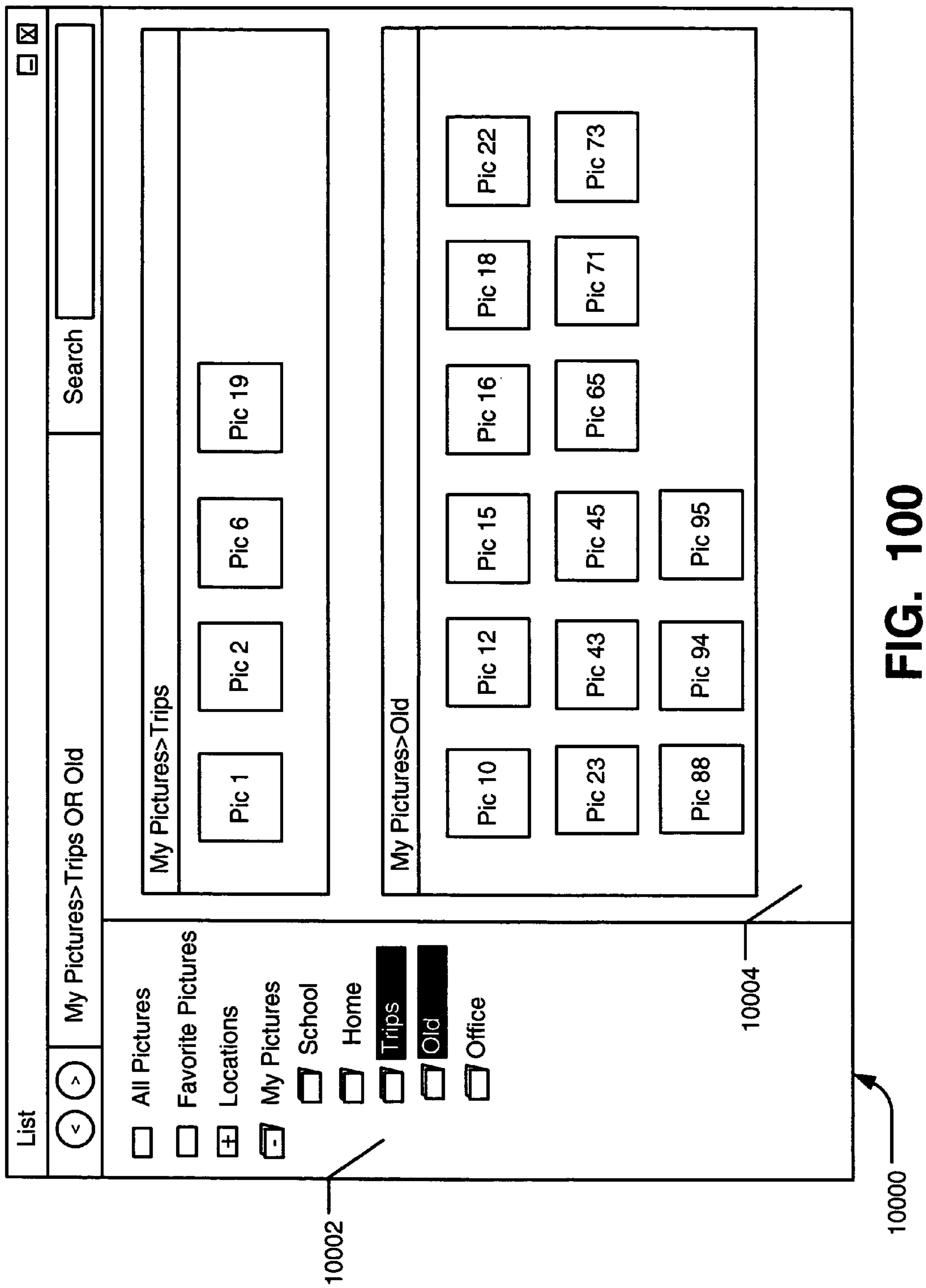

FIG. 100 illustrates a display screen 90000 including a navigation panel 10002 in which both hierarchical properties and folder structures are present. In the example illustrated in FIG. 100, the user has selected two individual folders, namely, the My Pictures>Trips folder and the My Pictures>Old folder. Because the two selections are located under the same top level parent element in the hierarchy (namely, the "My Pictures" element, in this example), a logical OR operation is applied through application of the various algorithm rules described above, and the displayed results, as shown in display panel 10004, show the union of the two selected sets. While the content of these selected sets may be displayed in display panel 10004 in any desired manner, in this illustrated example, the displayed files are identified in separate and distinct sub-panels as generally described above, for example, in FIGS. 93-96.

As described above, user files exist in a conventional folder hierarchy at a single location (i.e., a single file or other item cannot exist in two independent and separate folders at the same time). Therefore, a logical OR operation makes the most sense in the situation illustrated in FIG. 100, because a logical AND operation would return an empty set as the results.

Figure 101:
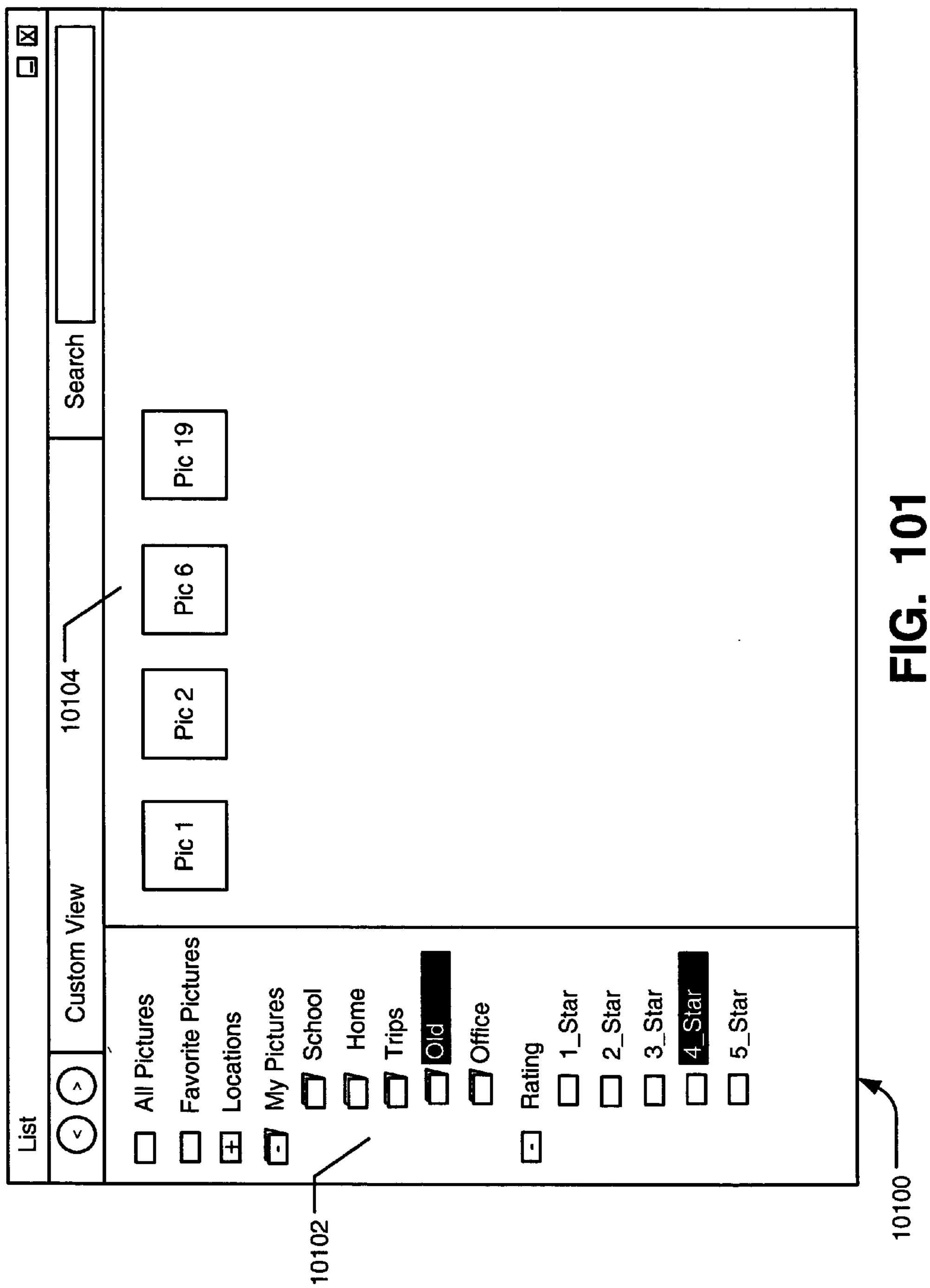

FIG. 101 illustrates display screen 10100 in an example where the OR/AND logical operation selection rules and algorithm are applied in a situation where the user's selections include at least one folder set and the selection spans across independent and different portions of the hierarchy (i.e., portions having different ultimate top level parent nodes). As shown in the hierarchy navigation panel 10102 of FIG. 101, the user has selected a rating node (4_Star, in this example) and a folder node (the My Pictures>Old folder node, in this example). Applying the various rules and algorithm described above, because the selections have different top level parent nodes in the hierarchical structure, a logical AND operation is applied, and information regarding the intersection of these two hierarchical elements is displayed in display panel 10104. More specifically, in this example, all of the stored "old" pictures having a "four star" rating are displayed in display panel 10104. Of course, any way of displaying the query, search, or list files result may be used without departing from this invention. Also, if desired, display panel 10104 could be designed to additionally show the results from a logical OR operation, and/or a user may be able to inform the system in some manner that the logical OR operation is desired.

Figure 102:
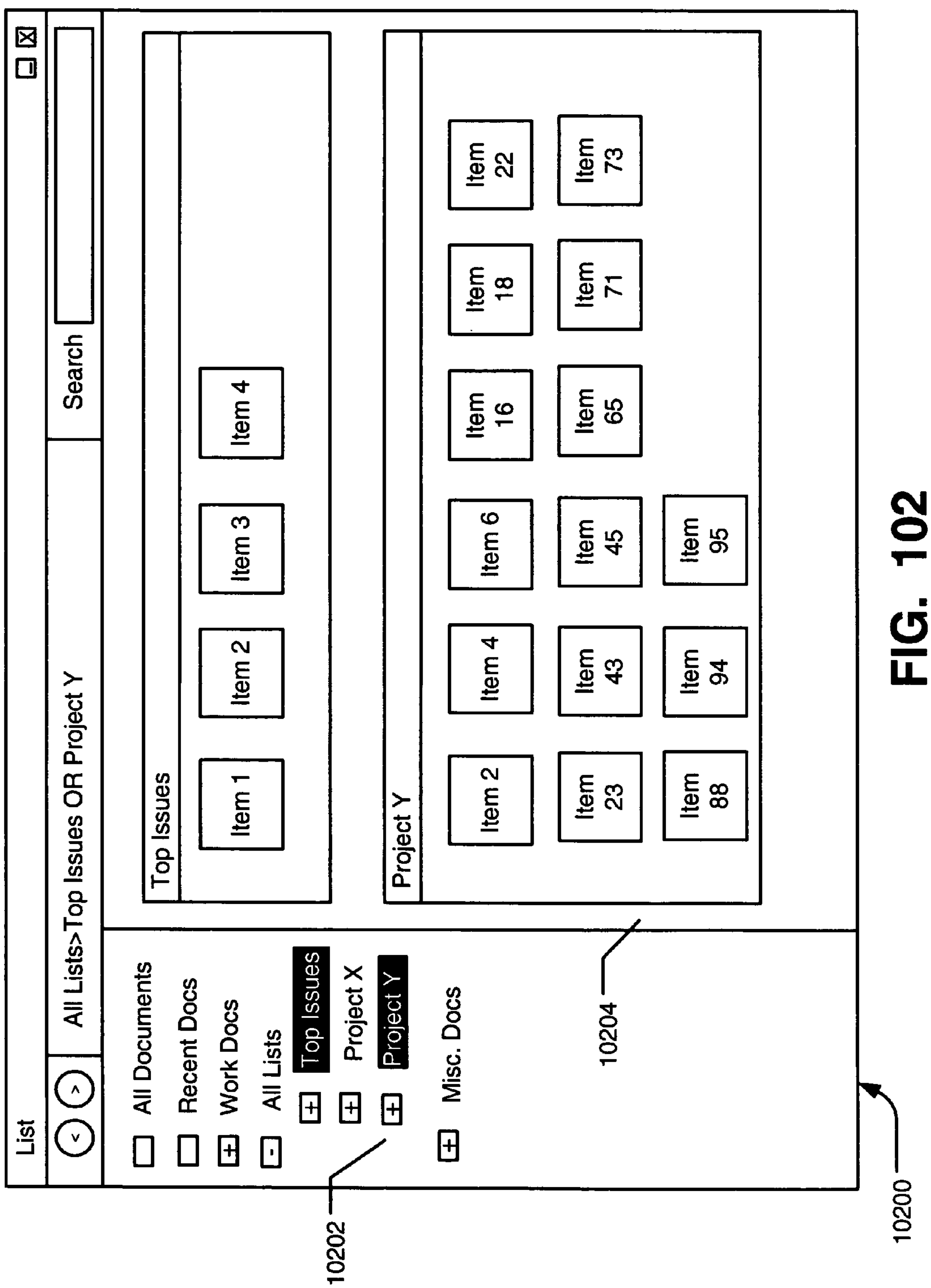

The same OR/AND logical operation selection features may be applied to list elements in a hierarchical structure, in accordance with at least some examples of this invention. "Lists" may be conceptually considered as simply constituting sets of items, such as files or the like. FIG. 102 shows an example display screen 10200 in which various list elements are included in the hierarchical structure shown in the navigation panel 10202. Multiple elements under the "All Lists" node are user selected, namely the "Top Issues" node and the "Project Y" node. In the display panel 10204, the generated display provides information regarding list items that satisfied either of these search criterions, namely, list elements designated as being "Top Issues" OR list elements designated as corresponding to "Project Y." Notably some of the list items may be included under the groupings for both nodes (e.g., items 2 and 4). While the content of these selected sets may be displayed in display panel 10204 in any desired manner, in this illustrated example, the displayed list elements are identified in separate and distinct sub-panels as generally described above, for example, in FIGS. 93-96. Also, if desired, display panel 10204 could be designed to additionally show the results from a logical AND operation, to cover the possibility that this AND result was desired by the user. Also, as noted above, if desired, the user may be given the ability to override the automatic OR operation selection.

Figure 103:
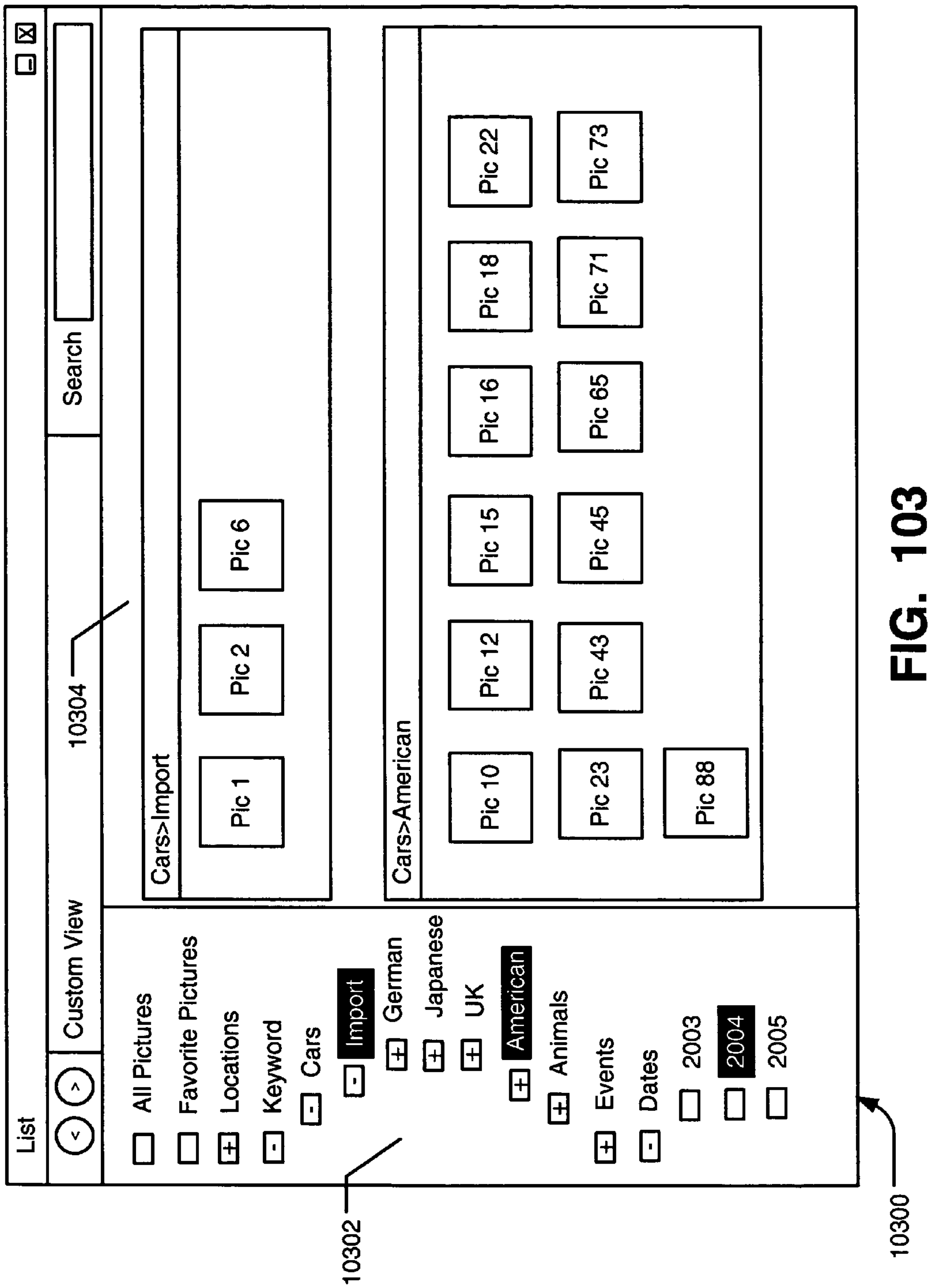

The above described OR/AND logical operation selection determination algorithms and rules also may be applied in situations in which a user selects more than two hierarchical elements (e.g., three or more folders, list elements, properties, etc.). In general, in such situations, a logical OR operation (i.e., the union) is performed with respect to any selections made under the same hierarchical parent element set, and a logical AND operation (i.e., the intersection) is performed with respect to selections made across different hierarchical parent element sets. Optionally, operations within a given hierarchical parent element set (i.e., the OR operations), if any, may be performed first. FIG. 103 illustrates an example of this type of operation.

Specifically, as shown in the display screen 10300 of FIG. 103, a user has selected three elements from the hierarchical navigation panel 10302, namely a Dates>2004 property, a Keyword>Cars>Import property, and a Keyword>Cars>American property. In response, systems and methods according to at least some examples of this invention will first perform an OR operation with respect to the selected Keyword properties, to locate all saved files including stored keyword properties meeting either of these criterion. Then, from those identified files meeting either of the Keyword criterion, a determination is made as to which files also satisfy the date criterion (by applying a logical AND operation). The displayed results, in display panel 10304, then will show the imported car pictures and the American Car pictures from 2004. While the content of these selected sets may be displayed in display panel 10304 in any desired manner, in this illustrated example, the displayed information regarding the files is provided in separate and distinct sub-panels directed to the different "OR" selections, as generally described above, for example, in FIGS. 93-96.

The above noted rules and application of these rules in determining whether to conduct a logical OR operation or a logical AND operation to multiple user selections are advantageous because they produce predictable and logical results when users use the hierarchical properties, folders, lists, or other structures for storing, searching, and retrieving information from a computer system or network. Of course, if desired and as noted above, users may be provided an interface to allow them to override these automatic retrieval rules at any time, e.g., if the rules produce the undesired results in any individual instances. As new information is introduced into the computer system or network, the above rules can continue to be applied, including to the newly added information, regardless of whether the new information may be incorporated into the existing hierarchy or requires new/additional hierarchy. Once placed in the hierarchical structure in some manner, the above OR/AND logical operation selection procedures can be carried out by determining whether the various selections are located within a given property or other hierarchy element level and/or whether they span across different top level parent property or other hierarchy element levels.

Page Space Control: Example systems, methods, and computer readable media according to aspects of the invention: Multiple Property Selections: Computer-Readable Media: Additional aspects of the present invention also relate to computer-readable media including computer-executable instructions stored thereon for performing the various multiple property or other value selection methods and/or for use in various systems that include multiple property or other value selection methods, including the systems and methods described above. The computer-readable media may constitute computer-executable instructions stored on the various specific examples of computer-readable media described above.

Page Space Control: Example systems, methods, and computer readable media according to aspects of the invention: Grouping and Stacking in the Display Panel: Today in Windows® based computer operating systems (e.g., available from Microsoft Corporation of Redmond, Wash.), it is possible to organize sets of files (e.g., from a search query or a list files command) into groups. For example, grouping by file "type" may be used to place all PowerPoint® presentations (presentation software available from Microsoft Corporation) within the search domain into one grouping and/or all digital pictures into another grouping. It can be difficult, however, for users to efficiently and effectively deal with large sets of items because they still have to locate the correct grouping to ultimately locate the file that they wish to further consider. For example, if a user has a folder with 100,000 files contained in it, grouping those files may help sort through things somewhat, but it still may be difficult for users to locate the specific file desired (e.g., particularly if keyword searches or other search techniques are not effective to narrow down the grouped files).

In application programs and/or operating systems in accordance with at least some examples of this invention, users may take advantage of the ability to "stack" as a new/additional way for visually organizing files into sets. For example, if systems and methods were to stack by "file type," users would be able to see all of their files stacked into individual sets, e.g., a set for PowerPoint® presentation files, a set for spreadsheets, a set for digital pictures etc. Each of these sets may be represented, e.g., in a computer-generated display, by a stack icon that conceptually acts as a virtual container for that set of items. Stacking is a very useful way to help users narrow down on a set of items they care about because stacking clearly enumerates and identifies to the user the various available stack options.

Applied to a more concrete, real world example, stacking can be conceptually thought of as going to a car rental location and asking them to tell you what color cars are on the lot. They may advise you that they have blue and red cars available today. Conceptually, this is what happens when users stack their files by a property, i.e., they may obtain stacks for each unique value of that property.

This stacking feature (as well as other display features) may be applied, for example, to user interfaces like those described above in conjunction with FIGS. 91 and 93-103. In such user interfaces, systems and methods in accordance with at least some examples of this invention may show information including things such as Lists, Auto Lists, Folders, and properties, including, for example, user defined properties. Each Auto List may be designed to provide a way for users to view information identifying their files in various ways, for example, by a certain property. As a more specific example, a music Auto List may be stacked for example, by the performing artist, and searching by this performing artist property will allow the user to see stacks identified with all the artists included in the music collection, e.g., Bjork, Madonna, etc. One issue, however, with simply showing a shortcut to this Auto List is that if the computer system has music from many different artists stored on it and available in the view, it still may be difficult for the user to locate the desired individual artist and/or the desired individual album, CD, or song(s).

One aspect of systems and methods in accordance with examples of this invention relates to exposing the stacking structure of the available Auto Lists as sub-nodes in the navigation panel and/or the display panel associated with it. As one more specific example, for the "Artists" Auto List situation described above, systems and methods in accordance with at least some examples of this invention may enable users to expand the "Artists" (or other) nodes in the navigation panel and/or the display panel, to thereby enable them to control and/or see all the unique Artists (or other nodes) saved on the computer, network, or system.

Other aspects of this invention relate to the manner in which information relating to groups and stacks of information is processed and/or manipulated, e.g., in a navigation panel and/or a display portion of a user interface presenting such information. More specifically, aspects of the present invention will treat "grouped" and "stacked" information in the same way and allow Auto Lists that are grouped to represent hierarchy in the navigation panel. In other words, if a user has a view of music files grouped by "Artist" in the display panel, systems and methods in accordance with examples of this invention may be used to generate sub-nodes for the various artists in the navigation panel. In at least some instances, the sub-nodes may in fact constitute another stack, and therefore, when users click on one of these sub-nodes, the set of items in the view would filter down to only those results. This gives users a quick index of the items present in the view and allows them to actually narrow down to a set of files instead of just visually or mentally organizing them.

Still another example aspect in accordance with this invention relates to the ability of users of systems and methods according to at least some examples of this invention to stack in a parent folder and flatten its folder hierarchy. For example, when a user stacks by file type in a hard drive directory or other collection of data (e.g., a "D:\Data" grouping), systems and methods in accordance with at least some examples of this invention will search through all sub-folders and take those items and place them into stacks. This gives users the ability to navigate to any folder and view its contents organized by a desired property value instead of by its folder hierarchy.

In general, aspects of this invention are useful because, in systems and methods according to at least some examples of this invention, grouping and stacking can be used to create a dynamic organizational structure in the navigation panel, and it provides the ability to select a group in the navigation panel or the display panel and narrow down the items in the view to display only that set. Still additional general aspects of the invention relate to treating grouping and stacking as sub-nodes to an Auto List and the ability to select a group in the navigation panel and/or the display panel and, through this selection, thereby further narrowing down the displayed view. More specific examples of these aspects of the invention will be described below.

Figure 104:
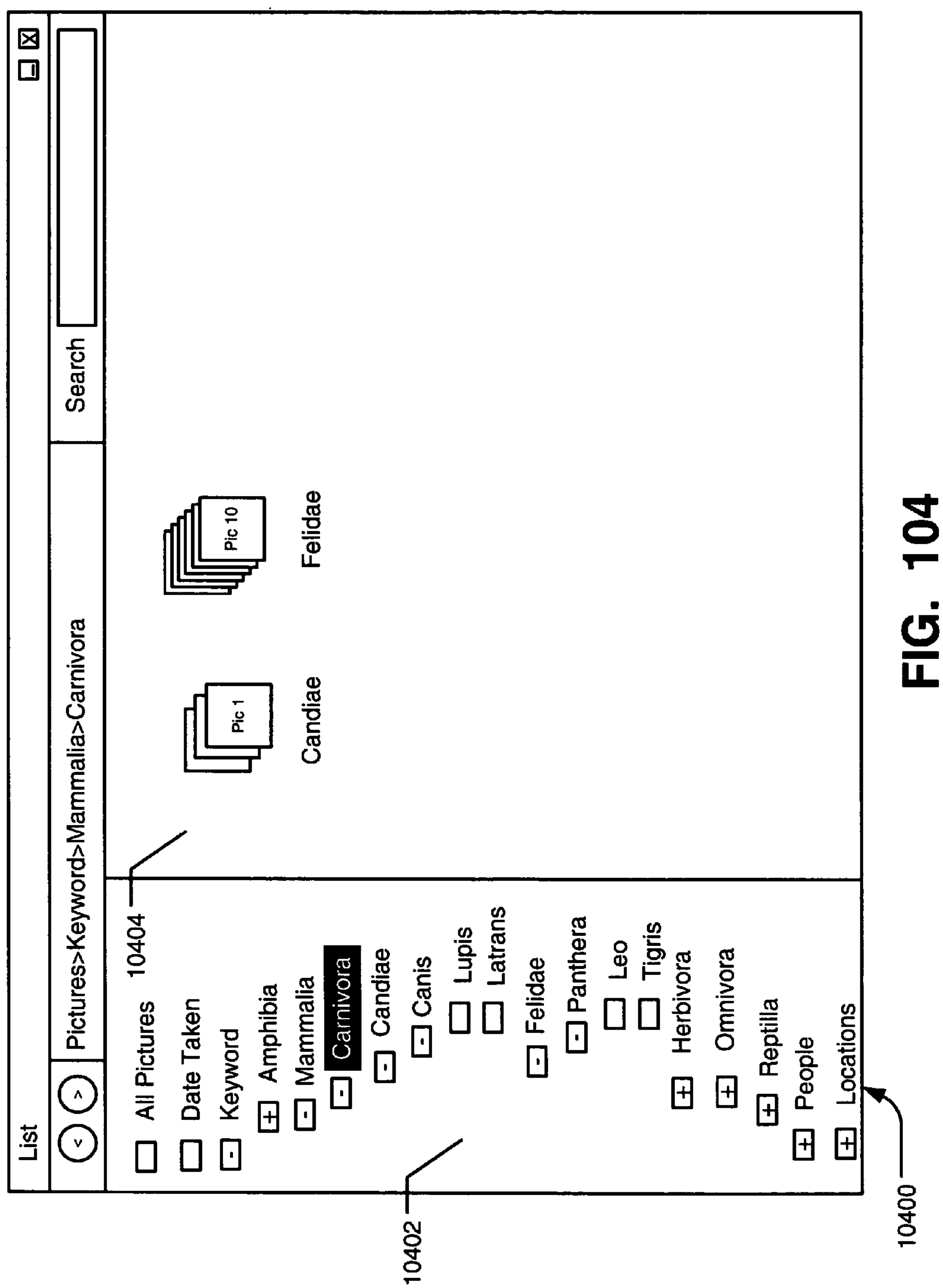
FIGS. 104 through 111 illustrate examples of user interfaces, displays, and operations during grouping, stacking, and filtering of items (e.g., electronic files) in navigation and display operations in accordance with examples of this invention.

As noted above, "grouping" and "stacking" are two different ways to visualize a set of items. FIG. 104 illustrates a display screen 10400 that includes a navigation panel 10402 and a display panel 10404 (which illustrates information relating to various stored files or items based on input received in the navigation panel 10402). Notably, in FIG. 104, the navigation panel 10402 indicates that the property or keyword "Carnivora" has been selected, and the corresponding display panel 10404 shows stacks for the individual child nodes in the hierarchy at the level immediately under the Carnivora parent node. More specifically, as shown in the example of FIG. 104, the display panel 10404 includes a stack of pictures for dogs (Candiae) and a stack of pictures for cats (Felidae). Notably, in the navigation panel 10402, the child nodes under the Candiae and Felidae nodes are fully displayed (down to their lowest level), despite the fact that these sets are shown as stacked in the display panel 10404.

In at least some instances, stacks may not constitute the most preferable way of displaying information in the display panel 10404. For example, as shown in FIG. 104, stacking may be undesirable, at least in some instances, because the user is not able to easily see any information regarding the content within the stack (e.g., the user cannot see thumbnail icons or much other displayed information regarding the content of the stack, as shown in FIG. 104). Without displaying information in the display panel 10404 in an "unstacked" manner, users may have to "drill down" to the deepest levels of the hierarchy, at least in some instances, to finally see the pictures (or other more specific information relating to specific files). This requirement can be inconvenient, particularly if the hierarchy has many levels, if many files are included in the hierarchy, and/or if the user is not certain where the desired files are located within the hierarchy.

Figure 105:
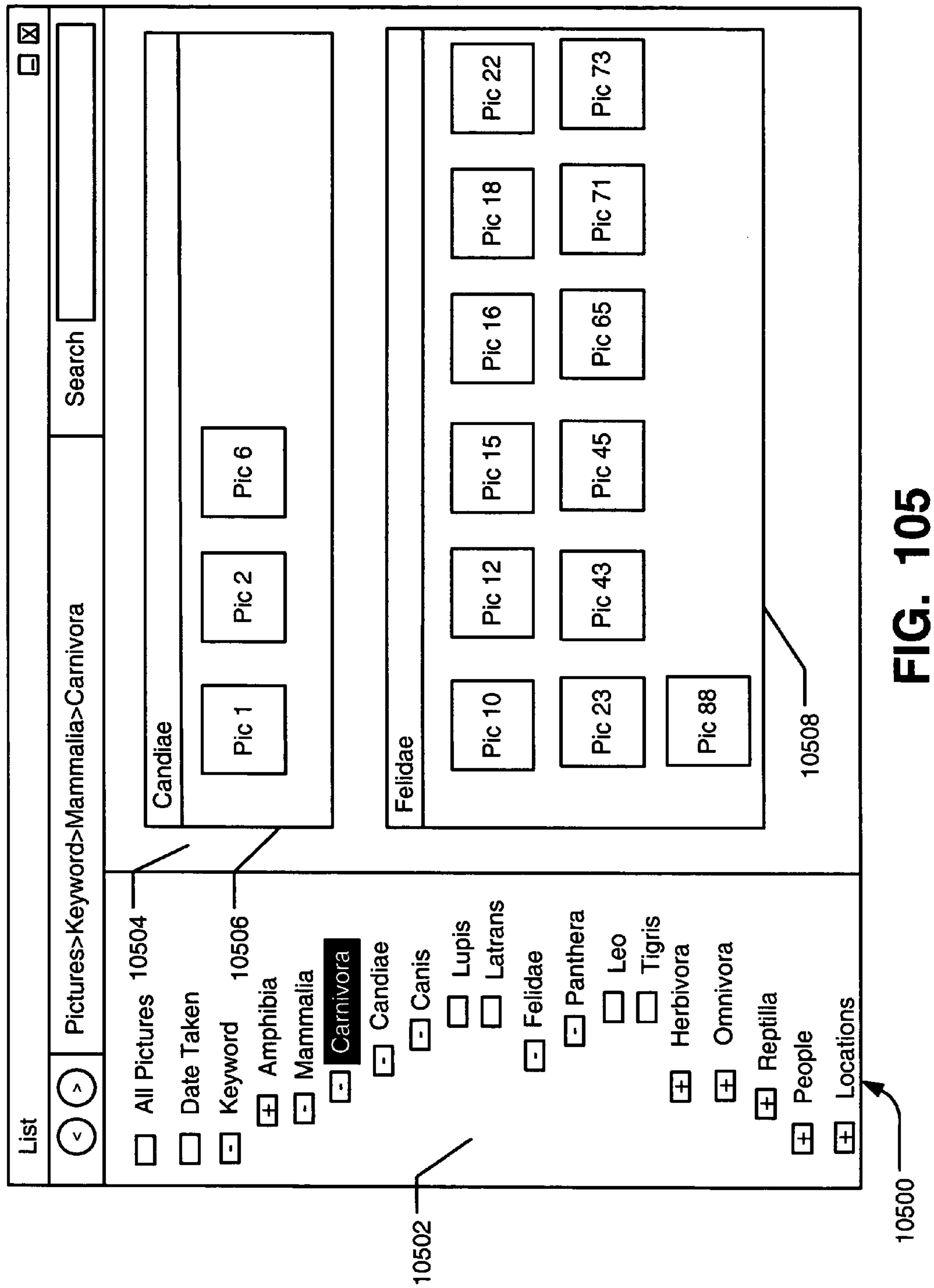

FIG. 105 illustrates another example display screen 10500 that utilizes grouping as opposed to stacking in the display panel 10504. Notably, the same node remains highlighted in the navigation panel 10502 (i.e., the "Carnivora" node, in this specific example), but the display panel 10504 shows the search results grouped under the respective child nodes under the selected parent node as separate sub-panels 10506 and 10508. Moreover, within the sub-panels 10506 and 10508, the underlying file information in this example display screen 10500 is shown in an unstacked manner so that the user can quickly and easily see information relating to the underlying content within the hierarchy.

Notably, in the example shown in FIG. 105, information relating to all of the items contained under the specific node (e.g., the Candiae node) is provided in the respective sub-panel (e.g., in sub-panel 10506), irrespective of the level in the hierarchy at which that information is located (e.g., irrespective of whether the specific picture is stored with the "Candiae" property, the "Canis" property, the "Lupus" property, or the "Latrans" property associated with it). This feature allows quicker and easier user access to and recognition of the desired information. Notably, this same display panel 10504 may appear as a result of other search or list files commands, e.g., if the user highlighted both the Candiae and Felidae nodes in the navigation panel 10502.

Figure 106:
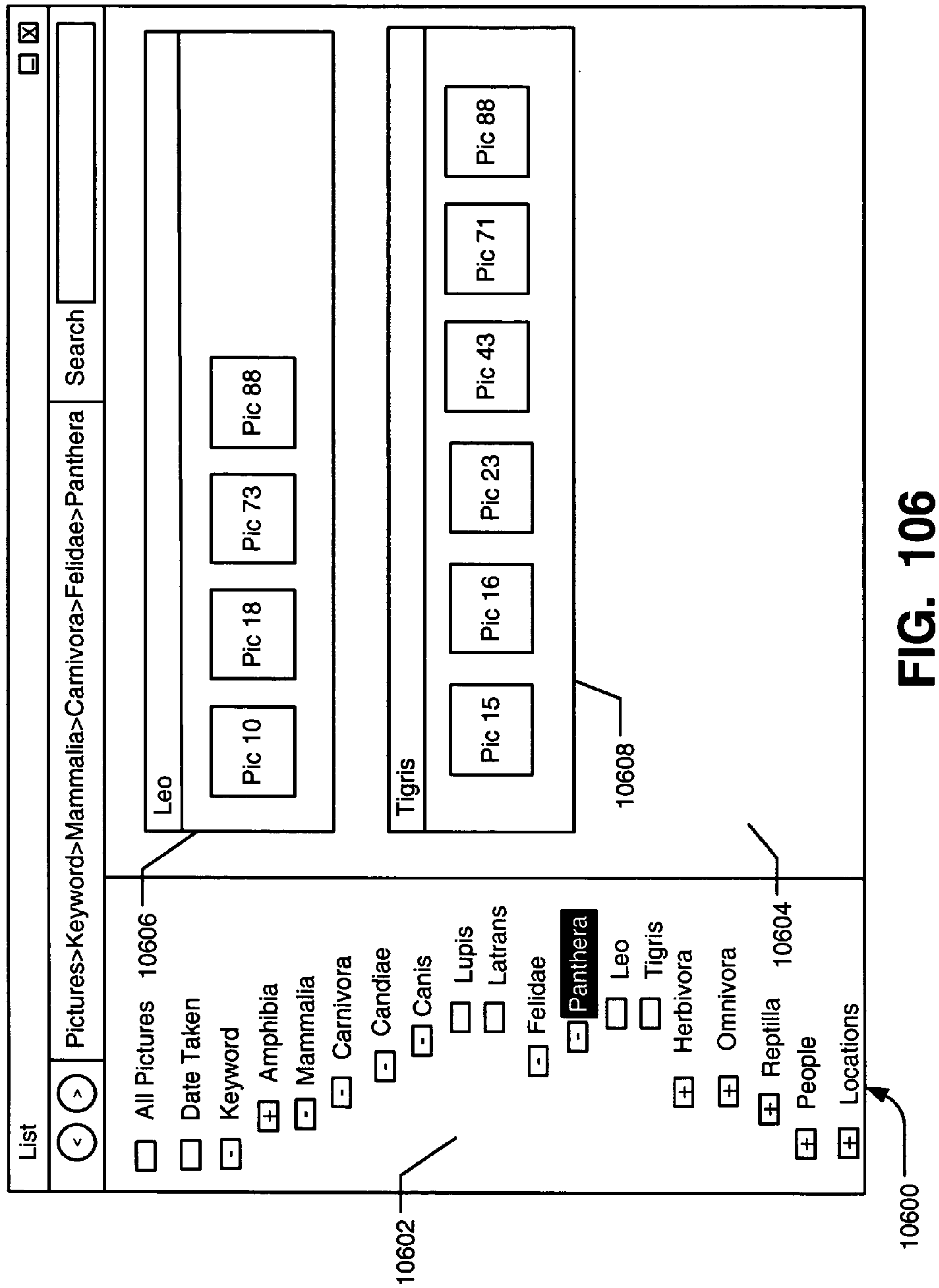

Users also can quickly navigate in the hierarchical structure of the navigation panel 10502 to see different groupings of information. An example of potential changes may be seen by a comparison of FIG. 105 with FIG. 106. Notably, in FIG. 105, as described above, the Carnivora property was selected by the user in the navigation panel 10502, which provided a display of information stored with that property, grouped based on the child nodes of the selected property (i.e., grouped based on the Candiae and Felidae child nodes in this example). In the display screen 10600 of FIG. 106, the user has changed the highlighted selection in the navigation panel 10602 to the more specific Panthera property (a grandchild node under the Carnivora property). As shown in FIG. 106, this change causes the display panel 10604 to provide groupings for the children under the Panthera property node, namely, groups of pictures labeled with the Leo and Tigris properties (see sub-panels 10606 and 10608, respectively). As evident from FIGS. 105 and 106, the navigation panels 10502 and 10602 and the display panels 10504 and 10604, along with the hierarchical properties used in conjunction with these panels, allow users to store, search, and navigate their stored data in a meaningful way and get useful thumbnail or other "preview" information of the available data throughout the hierarchy. Notably, the content and user input in the navigation panels drive the content provided in the display panels, although user input also may be allowed through the display panels, if desired.

Figure 107:
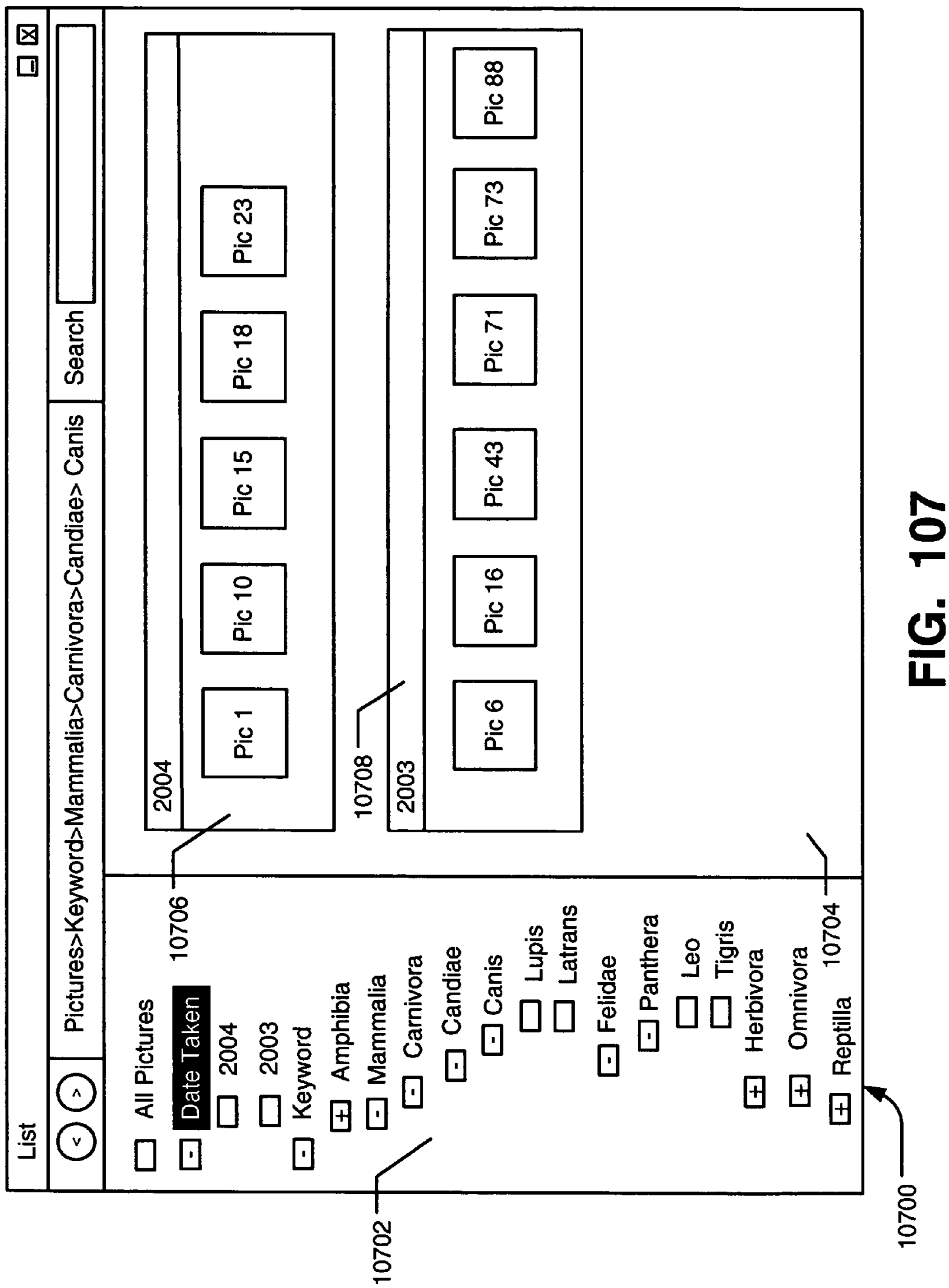

A comparison of the display screens 10600 and 10700 of FIGS. 106 and 107, respectively, illustrate additional features that may be present in accordance with at least some examples of this invention. When changing between various different auto lists in the navigation panel 10702 (e.g., from Keyword>Mammalia>Carnivora>Felidae>Panthera in FIG. 106 to Date Taken in FIG. 107), the hierarchical structure in the navigation panel 10702 does not collapse, but rather, it remains as the user left it (e.g., in the illustrated example, the full hierarchy for the Mammalia property and its children remains exposed). In general, in accordance with at least some examples of the invention, the navigation panel 10702 does not reflect or change to reflect what is shown in the display panel 10704 (e.g., in sub-panels 10706 and 10708), but rather, the navigation panel 10702 drives what is being presented in the display panel 10704.

This "non-collapsing" feature of the navigation panel 10702 may be useful for various reasons. For example, in general, users expect this hierarchy to remain exposed in this manner, e.g., from their interactions with conventional electronic file and/or folder systems. As another example, keeping the hierarchy open, expanded, and available in this manner (e.g., until closed by the user) can be more convenient, e.g., if the user decides to return to the hierarchy, for example, for additional searching, navigation, or previewing purposes, for property assignment to file purposes, and the like. Moreover, by leaving the navigation panel 10702 in an unchanged state as the user navigates and potentially manually changes it, the past locations visited by the user will remain readily available, so that they can quickly return to where they have been, if desired.

Figure 108:
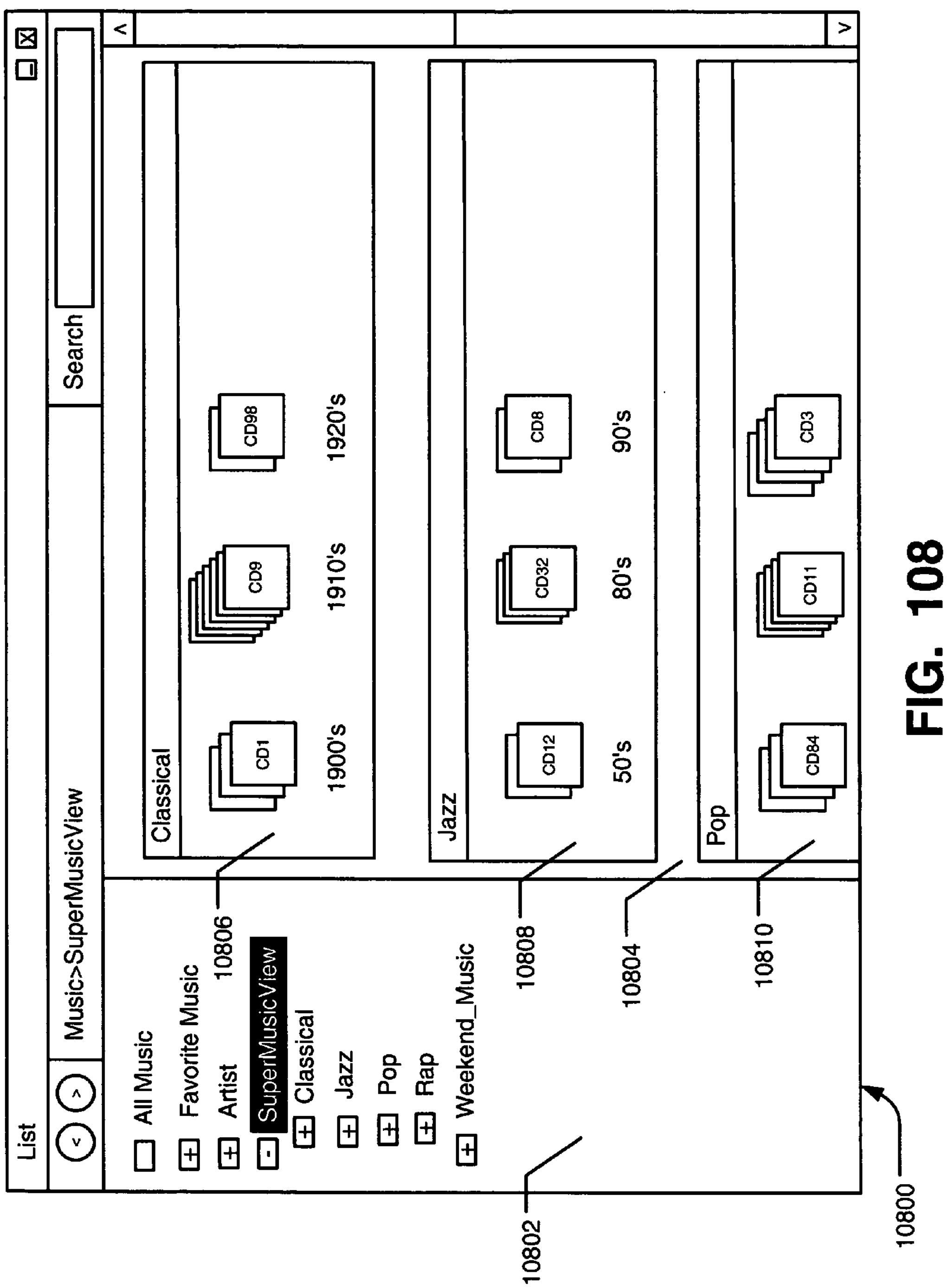

If desired, in accordance with at least some examples of this invention, combinations of grouping and stacking may be used in the display panel. An example of this combined use of grouping and stacking may be seen, for example, in the display panel 10804 of the user interface display screen 10800 shown in FIG. 108. More specifically, FIG. 108 illustrates a display screen 10800 having a navigation panel 10802 including information relating to a collection of stored digital music, wherein at least some of the information relating to the stored music includes hierarchical properties. In this example display 10800, the user has highlighted an auto list entitled "SuperMusicView" in which the contained music data has been stored with properties including various different genre of music (e.g., one child node for "Classical" music, one for "Jazz," one for "Pop," one for "Rap," etc.). Of course, any number of genres may be included in the hierarchical structure without departing from the invention.

By selecting the parent "SuperMusicView" node, the systems and methods in accordance with this example of the invention display information in the display panel 10804 relating to stored music on the system grouped by the various genres (e.g., sub-panels 10806, 10808, and 10810 for the genres "Classical," "Jazz," and "Pop," respectively). Within each individual genre grouping, in this example, the information is stacked, e.g., by the decades in which the albums or musical selections were released. If desired, a user can further "drill down" into the hierarchical structure, e.g., in the display panel 10804 or the navigation panel 10802, to see more detailed information relating to the information stored within the stacks (e.g., individual CD or album titles, in this illustrated example, information stacked by performing groups or artists with the stack including individual albums, etc.). Further drilling into the individual CD or album titles may be used, if desired in at least some examples of systems and methods of the invention, to display information regarding the titles of the individual songs or tracks included on the album or CD. Of course, any number of stacks, groupings, and/or any desired types of information may be included in the hierarchical property structures without departing from this invention.

Notably, in the example navigation panel 10802 and display panel 10804 shown in FIG. 108, at least some portion of the hierarchy of the Auto List is shown in the navigation panel 10802 regardless of whether grouping or stacking appears in the display panel 10804. In fact, in this example structure, the display panel 10804 includes both grouped information and stacked information. In general, grouped information is present as a "transparent container," meaning that the content in the grouping is readily available and visible to the user in the view. Information contained in "stacks," on the other hand, may be considered as being in an "opaque container," meaning that at least some of the individual content may be hidden from the user due to the stacking display (but the hidden content may be displayed or made available, if desired, by further highlighting or "drilling down" into the individual stacks via the navigation panel 10802 and/or the display panel 10804).

As with any of the windows, display panels, sub-panels, and the like contained in systems and methods in accordance with examples of this invention, when the available information more than fills the available display area, user access to undisplayed information may be gained in any desired manner, for example, through the use of scroll bars as shown in display panel 10804, through "next page"/"previous page" buttons or icons, and/or in any other desired manner.

Figure 109:
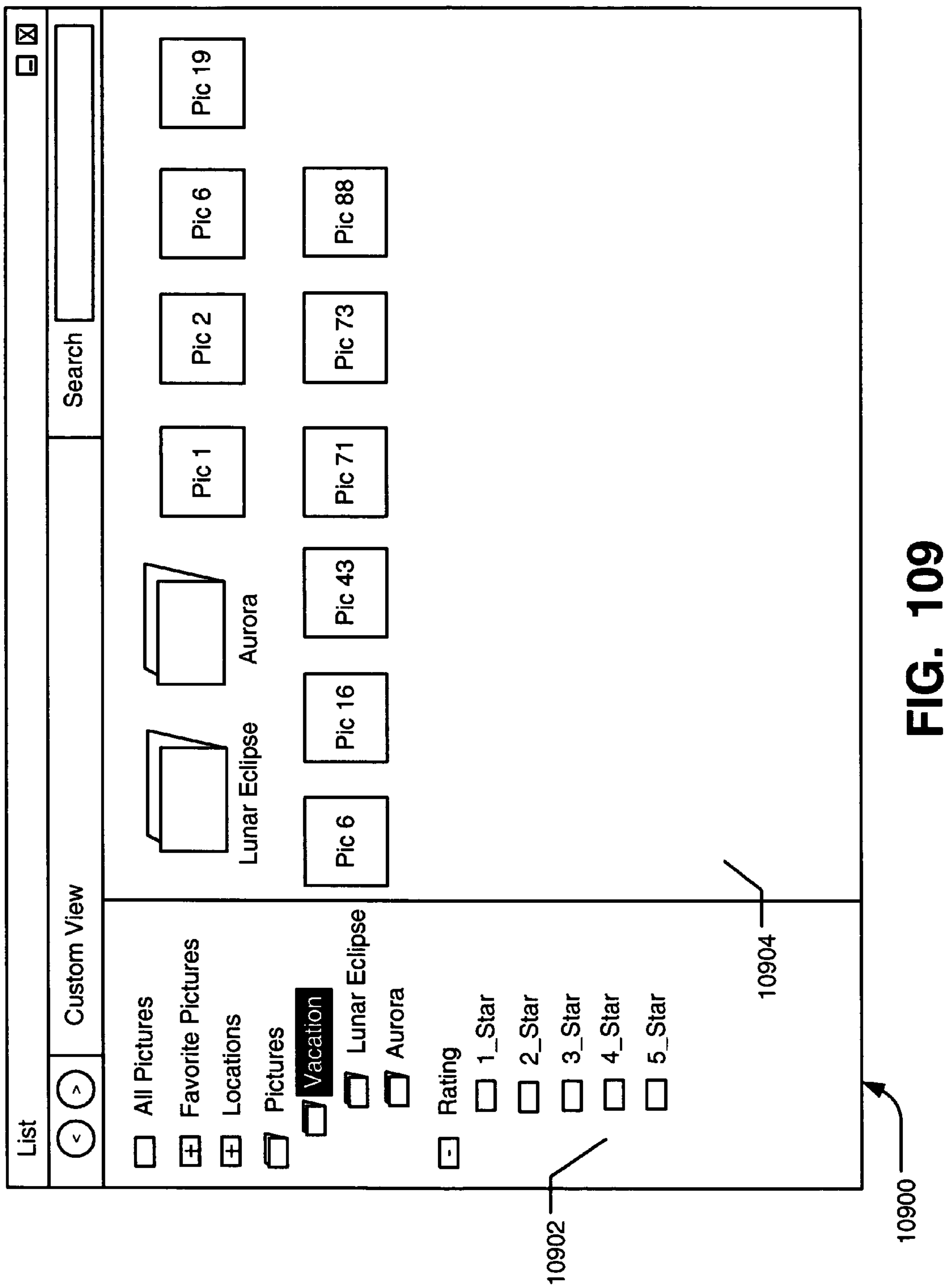

The hierarchical properties and other elements, navigation panels, and displays of groups and/or stacks of information in accordance with examples of this invention may be used in combination with conventional folder structures without departing from this invention. In general, stacking folders (e.g., in a display panel) is not useful to users because individual folders within a hierarchical structure may have vastly different and independent subjects and because users that organize information in folders often do not store many files on any given level of their folder hierarchy. Therefore, in accordance with at least some examples of this invention, stacking in a folder will flatten the folder hierarchy and re-organize the items contained within the folder into sets based on that property. FIG. 109 illustrates a display screen 10900 that includes a navigation panel 10902 with a folder hierarchical structure contained therein. When the "Vacation" folder is selected by the user in the navigation panel 10902, the display panel 10904 displays the underlying folder structure (i.e., the "Lunar Eclipse" and "Aurora" folders under the "Vacation" folder in this example), as well as the individual files contained within those folders (thereby "flattening out" the folder structure to make the underlying information readily visible and available to users). This may be accomplished, for example, by creating an "Auto List" element or node scoped to look at the selected folder and all of its sub-folders.

Of course, other ways of presenting information from the folders in the display panel 10900 are possible without departing from this invention. For example, if desired, rather than flattening the hierarchical structure shown in FIG. 109, the folder structure may be maintained in the display panel 10904, particularly in the situation where the highlighted folder itself includes several levels of hierarchy. For example, if desired, when a folder is selected in the navigation panel 10902, the information may be displayed in the display panel 10904 by removing the individual items from the sub-folders and showing these items in stacks named after the sub-folders. Of course, other display techniques are possible without departing from this invention.

Figure 110:
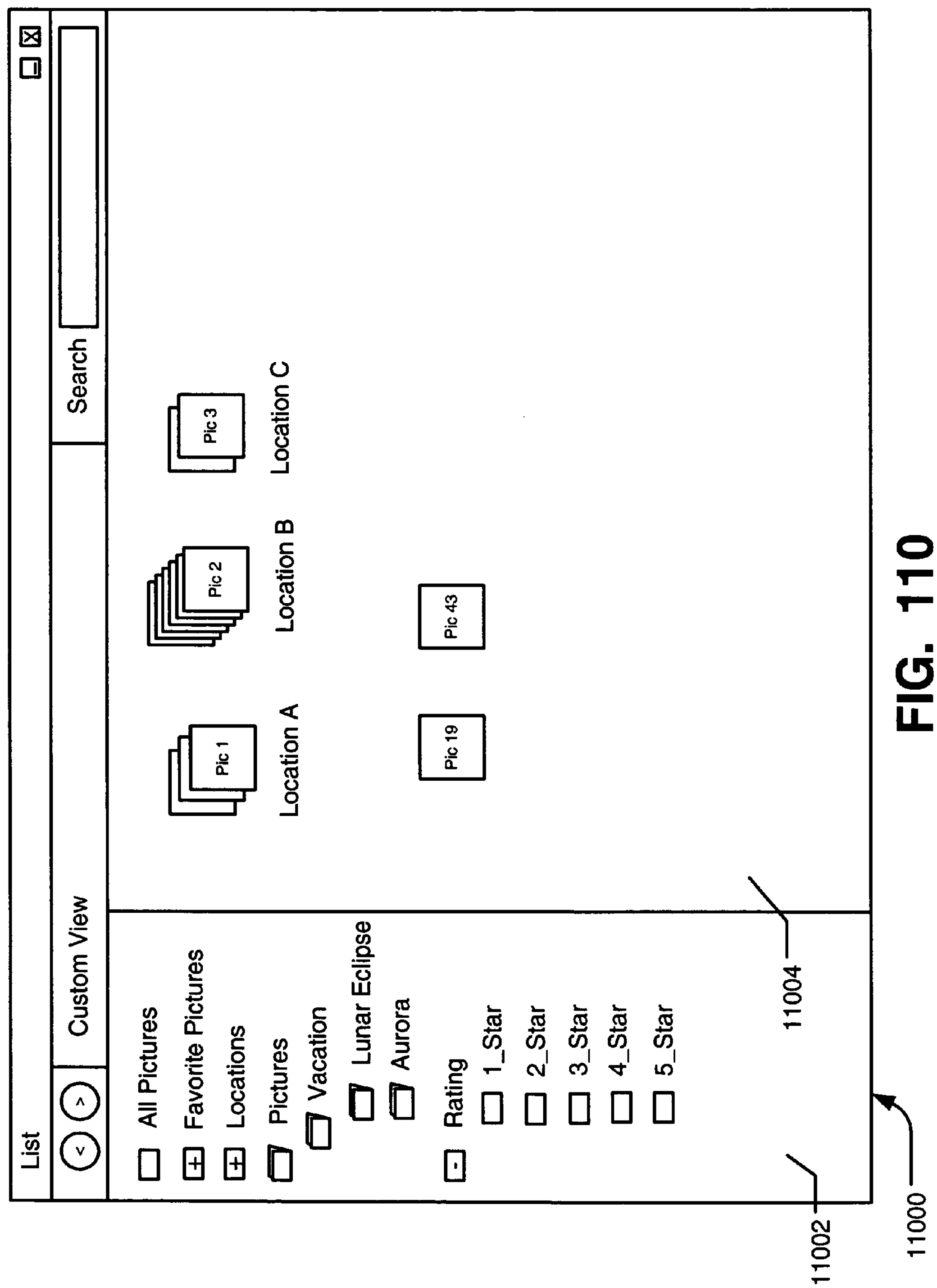

Various manipulations also may occur to data once highlighted or selected in a navigation panel and/or information relating thereto is displayed in a display panel. FIG. 110 illustrates an example display screen 11000 that may be used and/or appear in accordance with at least some examples of this invention. In this example, the user interface display screen 11000 includes a navigation panel 11002 in which a hierarchical folder structure appears, and a display panel 11004. Because of a deeper hierarchy in the folder structure in this example, when a folder is highlighted (e.g., the "Vacations" folder in this example) in the navigation panel 11002, the information in the display panel 11004 is removed from the underlying sub-folder structure (i.e., the folders under the "Vacations" folder) and placed in individual stacks. If the user then were to re-organize the information (e.g., by clicking on the "Location" icon or other property icon in the navigation panel 11002, selecting a property from a right click or drop down menu, etc.), the data could reorganize and stack by locations, as shown in FIG. 110. Because this revised stacking of the data in FIG. 110 (stacked by "Vacations" and "Location") does not correspond to the contents of the "Vacations" folder in the manner provided in that folder, no highlighting is shown in the navigation panel 11002 in FIG. 110. In effect, this action is akin to a flattening out of all information contained in the selected folder (i.e., the "Vacations" folder in this example) and then a reorganization of this information into stacks based on the children properties contained under a selected property.

Of course, many options for grouping and/or stacking in response to user commands, e.g., in a navigation panel of the type described above, and other system actions in response to user commands may be provided in systems and methods without departing from this invention. The following includes at least some additional examples of options that may be included in at least some examples of this invention.

As one example, when grouping or stacking by a property that is multi-valued, systems and methods in accordance with at least some examples of this invention may provide one group or stack for each top level value under the property, and further children property values may not be exposed in the display panel (although, if desired, the underlying information in those lower children property values may be displayed and/or made available for display). In such systems, if desired, the user can expose the children property values by navigating into the various hierarchical level groups, e.g., using the hierarchical navigation panel, drilling down into stacks provided in the display panel, etc.

If desired, in accordance with at least some examples of this invention, no way need be provided to view all keywords (grouped or stacked) as a flat list, and the information highlighted in the navigation panel will control what is displayed in the display panel. If desired, systems and methods according to at least some examples of this invention may allow users to "unstack" at any level, e.g., by providing a menu item (e.g., a button, a right click menu, a tool bar menu, etc.) that allows the user to "expand all stacks," "expand this stack," and/or the like.

Other actions also may occur while information is grouped and/or stacked, e.g., operations relating to the hierarchical properties contained in the groups and/or stacks. One example relates to dragging and/or dropping operations. In at least some examples of this invention, when dragging an item from one group to another group, the item may be changed to have the property value(s) of the newly applied group and/or stack applied to it (i.e., changed to also include the property value(s) of the "destination" groups and/or stacks from the drag and/or drop operation, and optionally, at least, to remove the property value(s) of the original source groups and/or stacks, if necessary and desired). Another example operation relates to "paste" operations. When an item is placed in a new group and/or stack by a paste operation, the destination property and its parent property value(s) may be applied to the newly placed item.

Figure 111:
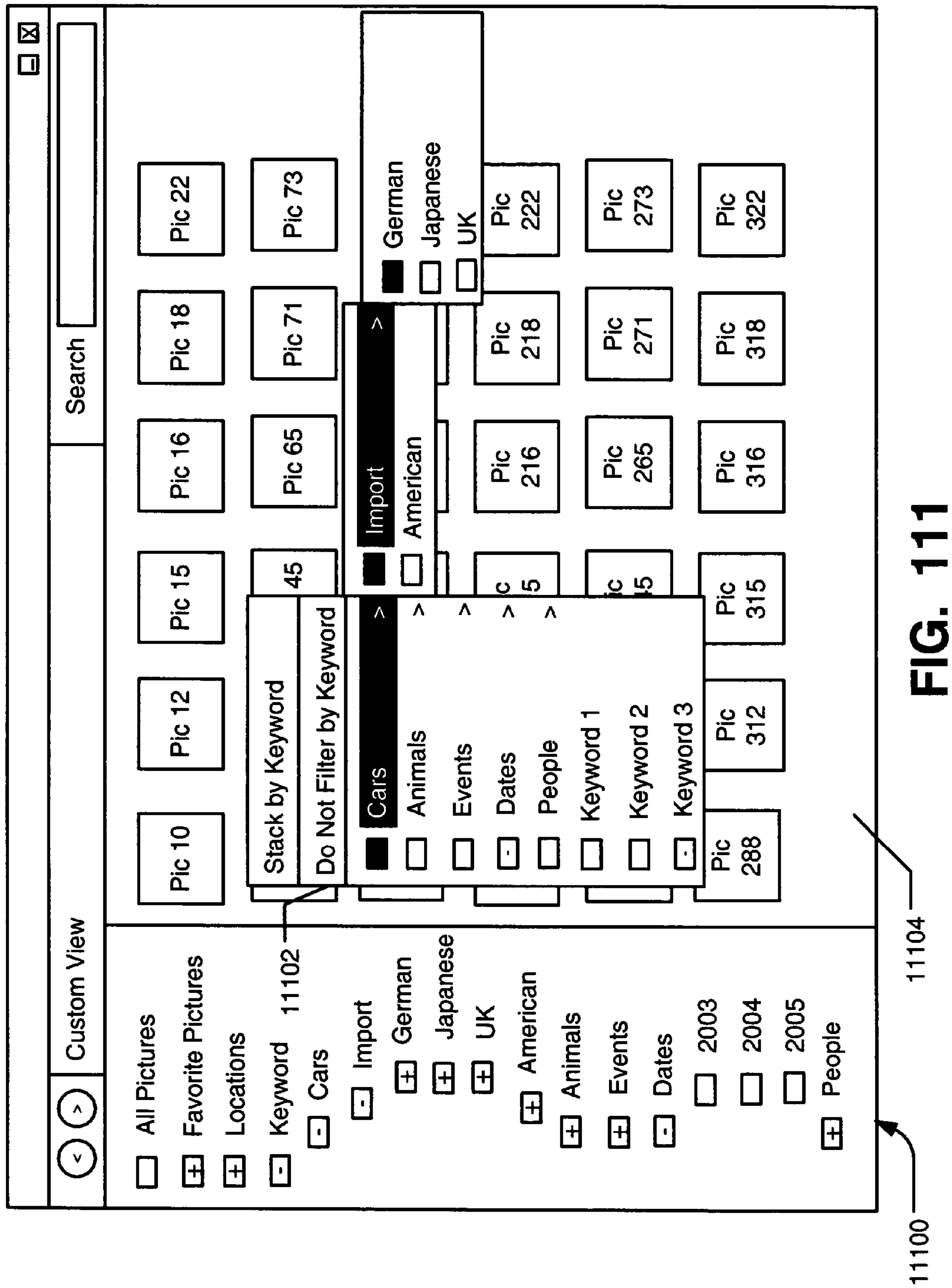

Also, many different types of displays or display contents may be provided in response to navigating into a group and/or a stack. As described above, however, in accordance with at least some examples of this invention, all items with the group title property value may be shown in an initial display, as well as all items tagged with children property values of this group/parent property value (if any). If desired, an indicator of some type may be provided in the navigation panel and/or the display panel to indicate that the item in the hierarchy can be further expanded to display children property values (e.g., a "+" sign is used with the icons or widgets in several of the illustrated examples shown in the figures of this specification) . This same convention may be used in filtering menus without departing from this invention. FIG. 111 illustrates an example display screen 11100 in which an example menu 11102 has been pulled up (e.g., via a right click action or in any other appropriate manner) that will allow further user filtering of information contained in the display panel 11104 of the display screen 11100. More specifically, in this example, by clicking on the desired menu items to be used for the filtering, changes in the information present on the display panel 11104 may be made. In this example, a caret structure ">" at the far right side of each menu item is used to indicate that further, lower hierarchical levels are available for filtering, if desired.

Additional aspects of the present invention also relate to computer-readable media including computer-executable instructions stored thereon for performing the various grouping and/or stacking methods and/or for use in various systems that display information, such as properties, folders, lists, and the like in grouped and/or stacked manners, including the systems and methods described above. The computer-readable media may constitute computer-executable instructions stored on the various specific examples of computer-readable media described above.

**Multiple Roots in Page Space Control: Because known navigation systems only incorporate a single root node, a navigation tree restricts the organization of a user's folders and other structures to a single representation. Such a restriction may pose substantial obstacles to efficiently viewing and navigating folders of comparable relevancy. In one example, a user may have limited space on each of his or her storage drives and is therefore forced to store his or her photographs on two separate drives. In known single root solutions, the user is forced to access both storage areas by expanding the navigation tree significantly at two different storage points. Such a method of navigation hinders viewing both sets of photographs simultaneously. Thus, according to aspects of the invention an application or user may establish multiple roots in the page space control, e.g., a navigation panel described above.

Figure 112:
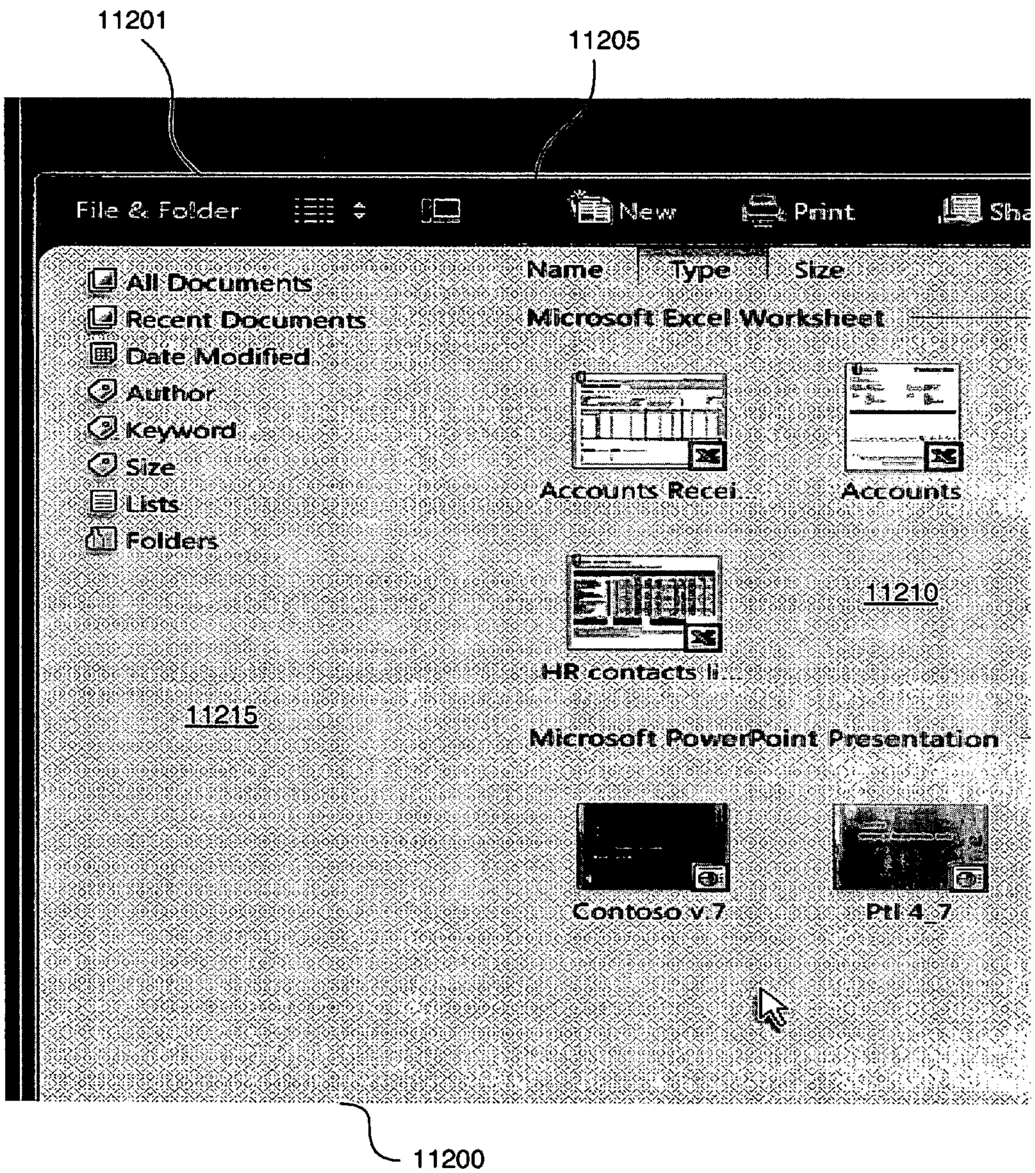
FIG. 112 illustrates a partial screenshot of a shell browser window implementing a multiple root navigation pane according to an illustrative embodiment of the present invention.

FIG. 112 illustrates a partial screenshot 11200 of a shell browser window implementing a multiple root navigation pane according to an illustrative embodiment of the present invention. The shell browser window 11201 is comprised of a menu bar 11205 spanning the top of the window, a shell browser pane 11210 on the right side and a multiple root navigation pane 11215 along the left side of shell browser window 11201. The implementation of a multiple root navigation pane within the shell browser window 11201 allows a user significant flexibility in navigating, as described herein. A user may either browse files and/or data by accessing individual folders or pages via page views in shell browser pane 11210 or navigate using the navigation pane 11215 by jumping directly to desired nodes representative of documents or files corresponding to a page view. As used herein, a page refers to a collection of related documents; a page view refers to a graphical display of data items in a particular page; and a page node refers to an iconic or graphical representation of a particular page. Each page may include and/or represent static lists, auto-lists, physical folders, virtual folders, and any other structure or data collection of related files, data, or pages, and each page displayed in shell browser pane 11210 may have a corresponding node displayed in navigation pane 11215, as further described below. The ability to view both shell browser pane 11210 and navigation pane 11215 simultaneously facilitates many of the customization options associated with a multiple root navigation pane 11215. For example, folders or lists may be dragged from the shell browser pane 11210 to the navigation pane 11215 to define an additional root in the navigation pane 11215. In a navigation pane, a root node generally relates to a page node that lacks a parent page node. According to an aspect of the invention, each root node in the navigation page might have a parent node, however, the navigation pane does not display any parents of a node identified as a root node. The user is thus unable to navigate to the parent of a root node, when one exists, via that root node itself.

Figure 113:
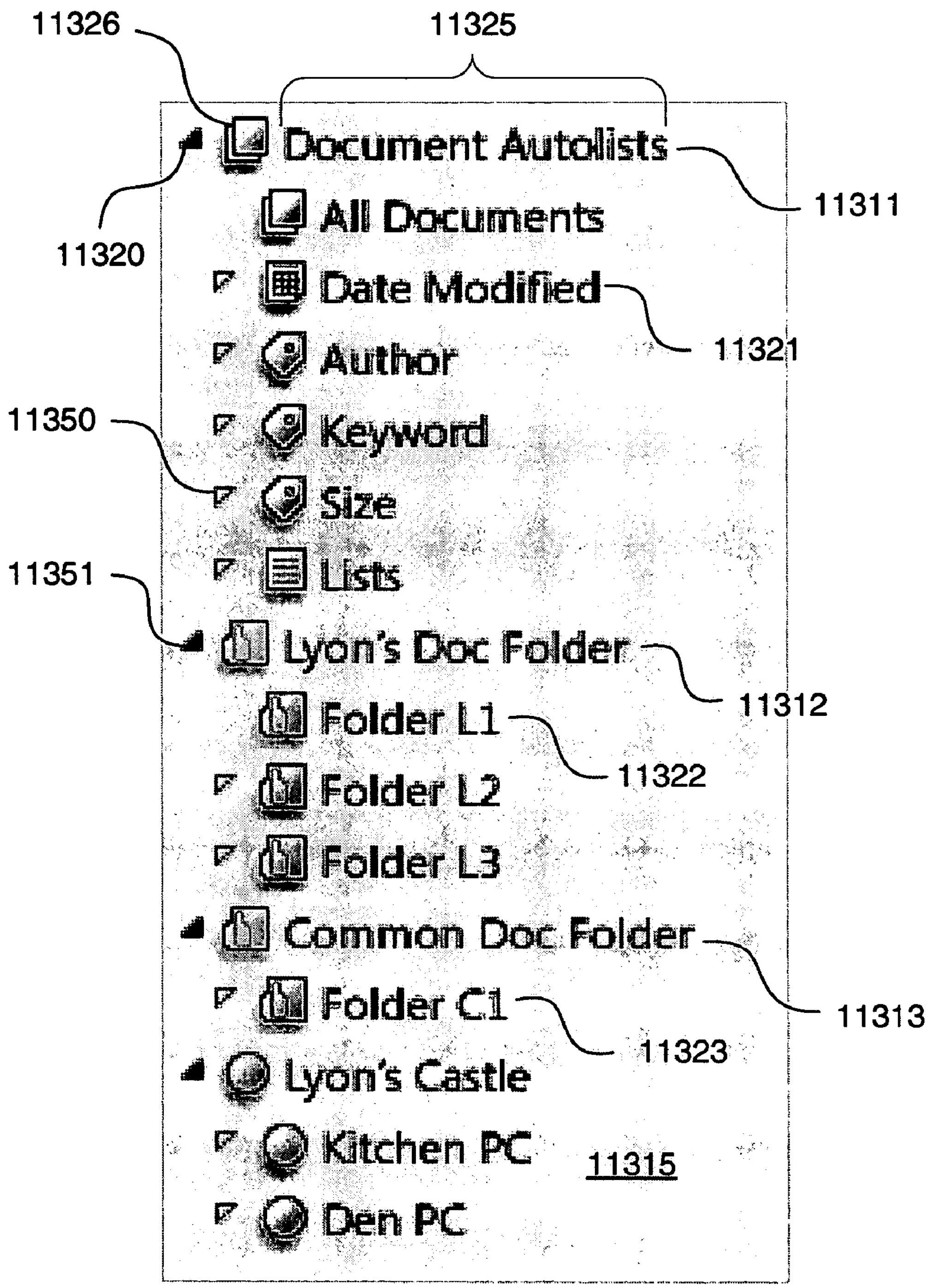
FIG. 113 illustrates a multiple root navigation pane according an illustrative embodiment of the present invention.

FIG. 113 illustrates a multiple root navigation pane according an illustrative embodiment of the present invention. The multiple root navigation pane 11215 may comprise multiple root nodes 11311, 11312 & 11313. Root nodes are commonly used as a starting point for navigating through data stored on a device such as a hard disk. Navigation pane 11215 combines root nodes 11311, 11312 & 11313, with any expanded descendant nodes, to graphically illustrate the organization of data. In one hierarchical representation, root nodes 11311, 11312 & 11313 may be aligned along a single vertical axis in the navigation pane 11215 to convey their status as root nodes. Accordingly, child pages 11321, 11322 & 11323 of root nodes 11311, 11312 & 11313, respectively, may be positioned below its respective root node and aligned on a second vertical axis located to the right of the vertical axis of root nodes 11311, 11312 & 11313. A first page or node is said to be a descendant of a second page or node if the first page immediately depends on the second page. The relative positioning of the root nodes 11311, 11312 & 11313 and descendent page nodes 11321, 11322 & 11323 graphically delineates their hierarchical relationship. Further levels (e.g., descendants of descendants of a root node) of the storage hierarchy may be represented on the navigation pane 11215 following the above described scheme using the position of a parent page node for orientation. One of skill in the art will appreciate that numerous ancestor/descendant orientation schemes may be utilized to represent the hierarchical relationship of a root node and its descendants, as is known in the art.

Each root node 11311, 11312 & 11313 and descendent page nodes 11321, 11322, 11323 may further comprise an expansion control widget 11320, an identifying icon 11326 and identification text 11325. Generally, identification text 11325 conveys the general category or description of the pages or files stored therein. For example, root node 11311 may be labeled with "Lyon's Doc Folder" to identify the contents of that page as documents belonging to user Lyon. An identifying icon 11326 may be positioned adjacent to the identification text 11325 to allow a user to graphically differentiate between one or more root nodes 11311, 11312 & 11313 or page nodes 11321, 11322 & 11323. For instance, a user may create a unique icon to mark his or her ownership of certain pages or to indicate a type of files stored at the represented location. Similarly, users may use different icons to represent different types of pages (i.e., folders, lists, autolists). To access a page node and view its contents, a user may either double-click the identification text 11325 or toggle the expansion control widget 11320 associated with the particular node. By using either of these methods, the user may expand the parent page node thereby revealing its descendant nodes. The absence of an expansion control widget 11320 may signal that the page node has no descendants and thus, cannot be expanded. If an expansion control widget 11320 does exist, the control widget 11320 may change to the corresponding page node's current state (i.e., expanded or collapsed). For example, the expansion control widget 11320 may comprise a clear arrowhead 11350 pointing away from the identifying text 11325 when the page node is collapsed (i.e., hiding its descendant nodes). Conversely, if the page node is in an expanded state, the expansion control widget 11320 may comprise a darkened arrowhead 11351 pointing toward the displayed descendants of that page node. The expansion control widget 11320 may be implemented in numerous ways and using a variety of symbols, colors and/or animations, such as '+' and '–', as is known in the art.

Figure 114A:
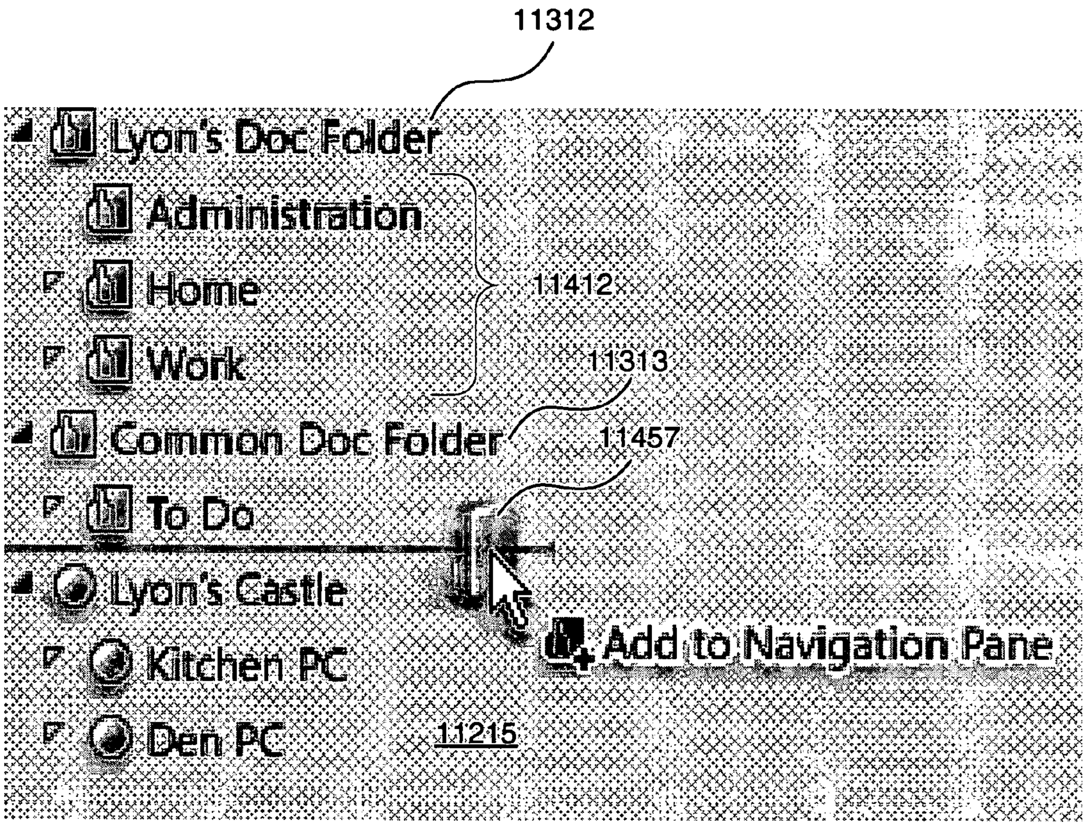
FIG. 114A illustrates a method for customizing a navigation pane according to an illustrative embodiment of the present invention.

FIG. 114A illustrates a method for customizing a navigation pane according to an illustrative embodiment of the present invention. A user may customize a navigation pane 11215 in a variety of ways including adding new root nodes, removing existing root nodes, modifying the order of page nodes as they appear in the pane and creating shortcuts to pages or root nodes. In this embodiment, the method for customizing a navigation pane permits a user to add a node representing a specified page to the pane 11215 as a root node. The addition of new root nodes facilitates navigating to oft-used pages by circumventing irrelevant parent pages. To add a new root node, a user may initially locate the desired page 11457 using shell browsing methods generally known in the art. For example, a user may locate the desired page 11457 using the shell browser pane 11210 of FIG. 112. After locating the desired page 11457, the user may then select and drag the page 11457 from the shell browser pane 11210 (FIG. 112) to the navigation pane 11215 as shown in the illustration.

Upon receiving a user request for the creation of a new root node, the navigation pane 11215 may identify the page type, acquire the page's physical location, determine the page's descendants and create a root node comprising a pointer to the page's physical location and an expandable/collapsible list of descendants. In contrast to a simple pointer or shortcut, a root node is a dynamic tool that permits a user to not only view a corresponding page by selecting the node, but also to view or hide (i.e., expand or collapse) an associated list of descendants. For example, if a user wants to make the folder "Louie's Documents" a root node in the navigation pane 11215, the navigation pane 11215 will identify that it is a folder page type. Subsequently, the navigation pane 11215 will create a node structure in the pane 11215 with the name "Louie's Documents" pointing to the physical or virtual location of "Louie's Documents." When a root node represents a static or dynamic list, the root node may store information identifying a location of the definition of the list to which it refers. Additional pages/root nodes may be similarly added to the navigation pane 11215. In one embodiment of the present invention, the list of root nodes is stored in a registry that may comprise data and settings corresponding to system options, hardware and the like. Storage in a medium such as a registry allows a custom list of root nodes in a navigation pane to persist from browsing session to browsing session. Those of ordinary skill in the art will appreciate that the list of nodes may be stored using an array of other methods and in a variety of other mediums.

The user may remove a preexisting root node 11312 from the navigation pane 11215 by using a remove option available in a context menu. In one embodiment of the invention, the user may access the context menu of a particular root node 11312 by selecting and/or right-clicking (i.e., using a mouse) on root node 11312. Once the user selects the remove option from the context menu, the navigation pane 11215 removes the selected root node 11312 and its associated list of descendants 11412.

Figure 114B:
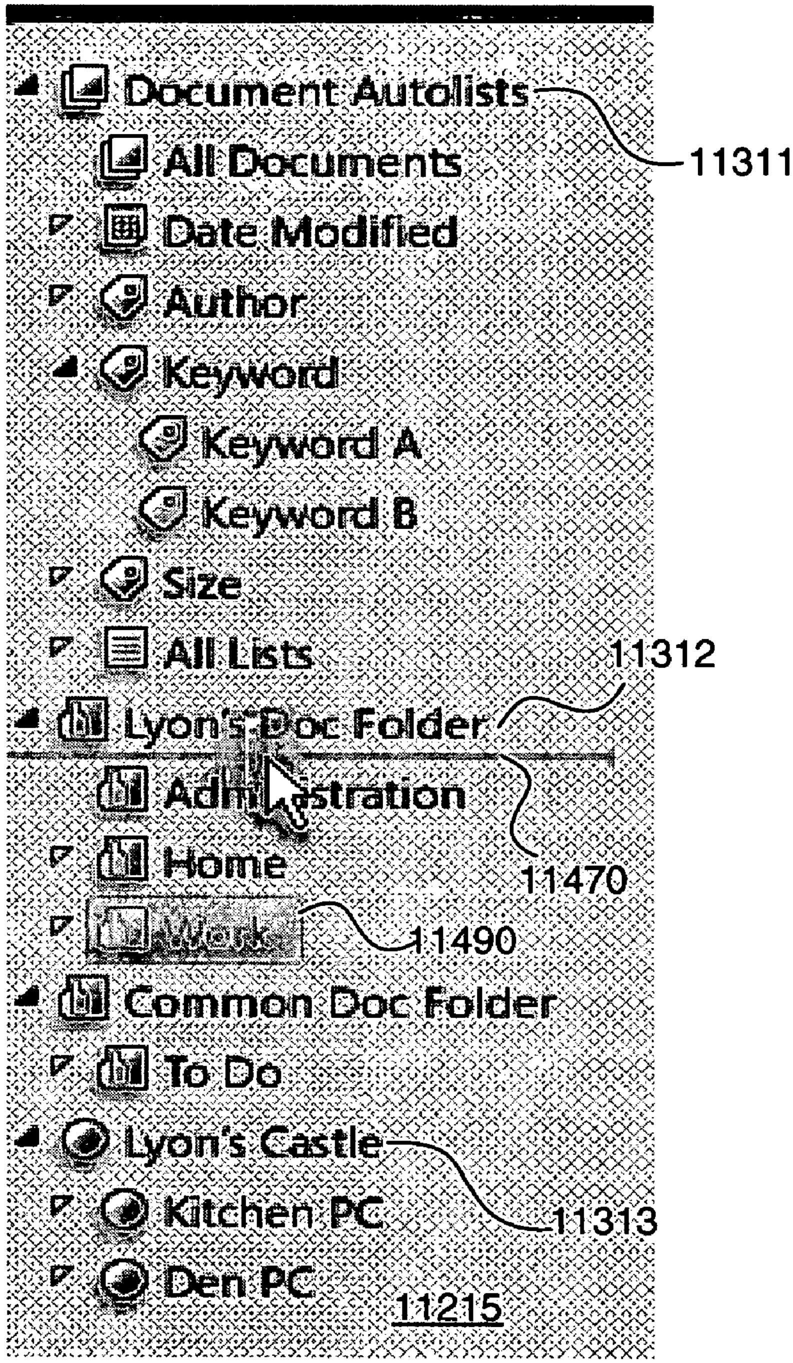
FIG. 114B illustrates a method for reordering page nodes in a multi root navigation pane according to an illustrative embodiment of the present invention.

Referring to FIG. 114B, a user may further adjust the ordering of the root nodes 11311, 11312 & 11313 by selecting and dragging root nodes 11311, 11312 & 11313 to their preferred locations in navigation pane 11215. The user may similarly reorder sibling nodes having a common parent. The destination location may be identified by a position indicator 11470 to ensure accurate relocation of root nodes. For example, a user may reorganize Lyon's Doc Folder 11312 by dragging Work page 11490 to the location identified by position indicator 11470. Alternatively, a user may drag an existing page on the navigation pane 11215 to a desktop. By doing so, the user may create a shortcut on the desktop to the selected page without removing the page node from the navigation pane 11215. In such an instance, the navigation pane 11215 may create a copy of the node pointer and place that copy on the desktop. Yet another alternative (not shown) permits a user to pin a parent and child node so that they appear on the same hierarchical level. For instance, a user may pin "Lyon's Doc Folder" 11312 and child folder "Work" 11490. By pinning the parent and child folder, "Lyon's Doc Folder" 11312 and "Work" 11490 appear on the same hierarchical level in the navigation pane without actually modifying the underlying structure. Such a feature allows a user to temporarily modify the hierarchical view of the navigation pane without making permanent changes.

Figure 115:
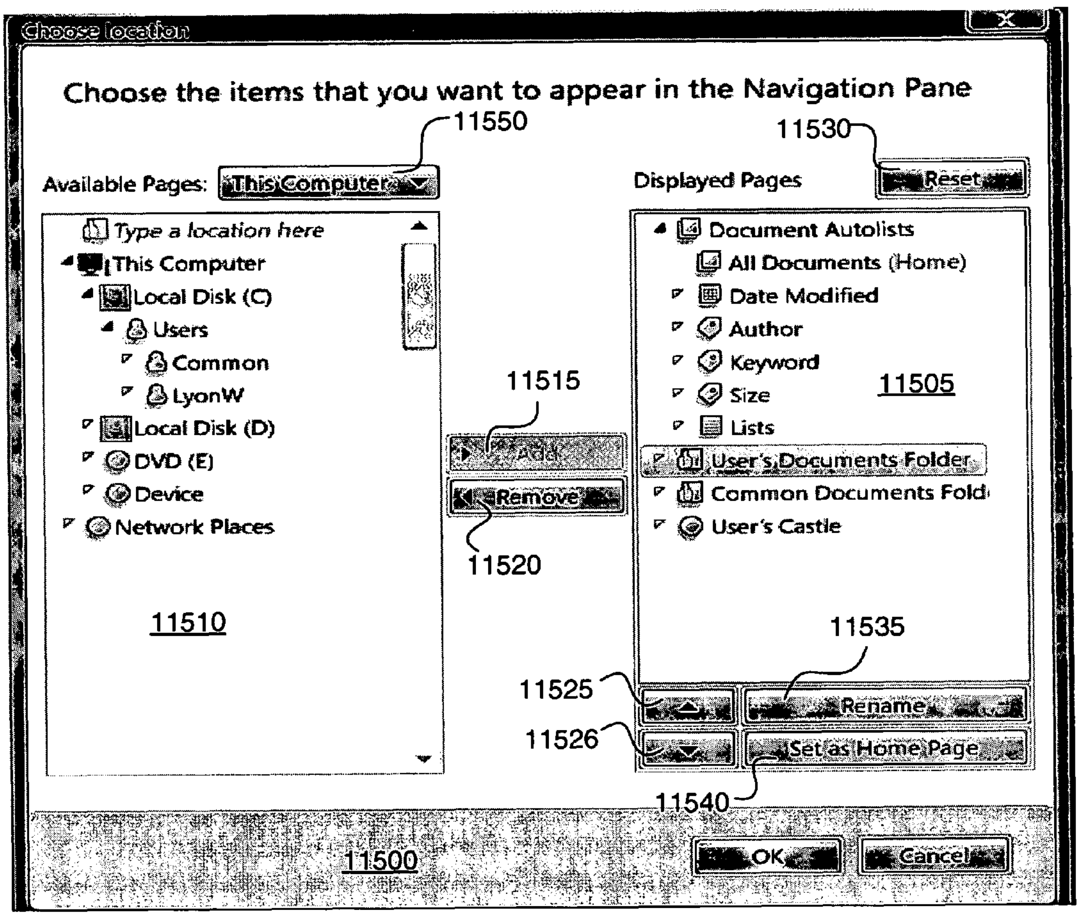
FIG. 115 illustrates a configuration dialog for customizing the navigation pane according to an illustrative embodiment of the present invention.

A user may also add, remove, rename and/or reorder root nodes using a configuration dialog similar to that illustrated in FIG. 115 according to an illustrative embodiment of the invention. The configuration dialog 11500 may comprise a displayed pages pane 11505, an available pages pane 11510, an add button 11515, a remove button 11520, reordering buttons 11525 & 11526, a reset button 11530, a rename button 11535 and a set as homepage option 11540. The configuration dialog 11500 permits users to view a list of available pages in one pane 11510 while modifying the contents of the navigation pane in the displayed pages pane 11505. The available pages pane 11510 displays a list of selectable pages that correspond to a selected location. A user may change the selected location by using a drop-down menu 11550. Once the user has a list of available pages, the user may then select an available page and choose add option 11515 to create a new root node corresponding to the selected page. Displayed pages pane 11505 may automatically update its contents to reflect the addition of new root nodes. In other words, upon detection of a change the configuration dialog 11500 may refresh panes 11505 & 11510 to reflect the most current information.

If the user wants to remove a current root node, the user may select the root node in the displayed pages pane 11505 and choose the remove option 11520. Upon removing the root node, the navigation pane disassociates the node with the corresponding page and removes the node from the pane. Other options permit the user to rename a current root node or set a root node as the home page. A user may reorder a root node in the displayed pages pane 11505 by selecting a node and adjusting its relative position using arrow buttons 11525 & 11526. Should the user make a mistake in adding, removing, reordering or renaming one or more root nodes, the user has the reset option 11530 to reset the changes he or she made to the navigation pane. Selecting reset button 11530 may revert any changes made by the user since the window 11500 was last opened, or may revert to a default state, undoing any changes the user has made.

Figure 116A:
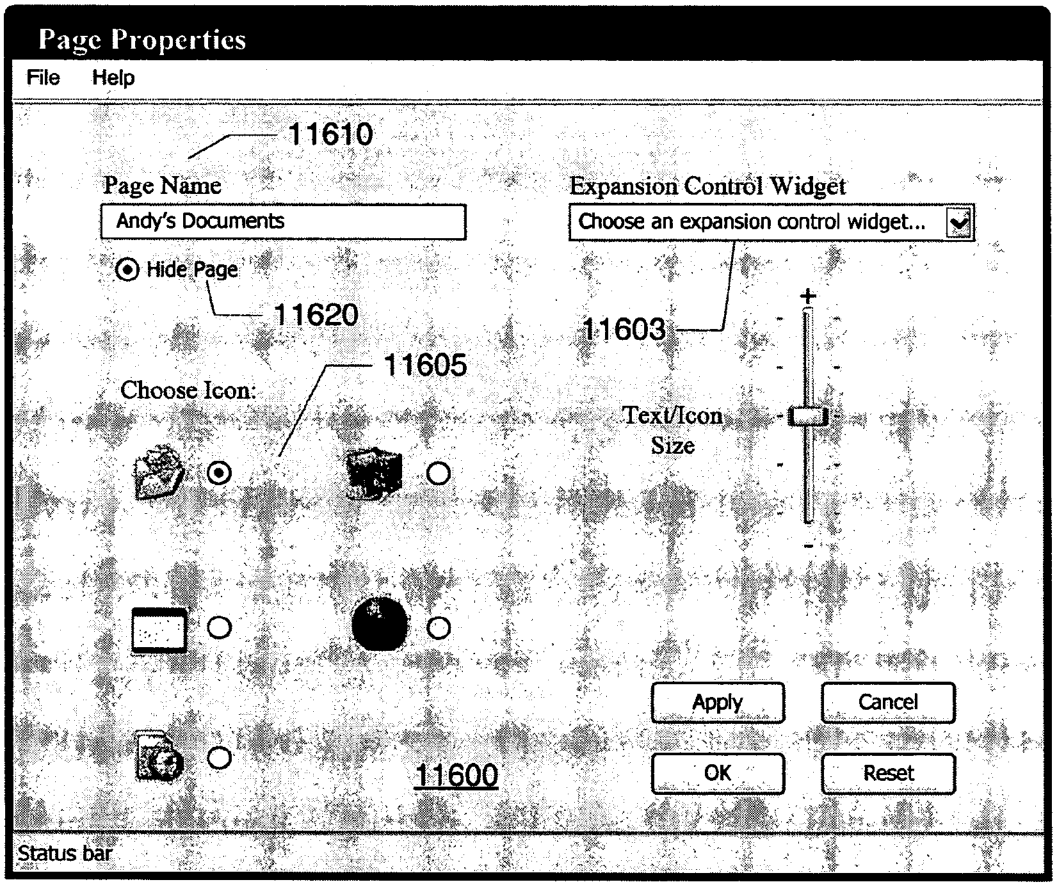
FIG. 116A illustrates a page node property configuration dialog according to one embodiment of the present invention.

FIG. 116A illustrates a page property dialog for customizing page nodes according to an illustrative embodiment of the present invention. A user may configure the aforementioned properties of a specified page node through a property dialog 11600. The property dialog 11600 may comprise an expansion control selection tool 11603, icon selection tool 11505, an identifying text changing tool 11610, a size selection bar 11615 and a hide option 11620. The expansion control selection tool 11603 and icon selection tool 11605 provide the user with the flexibility to change the expansion control icon (e.g., to '+' and '−' as in previous operating systems) and the representative icon adjoining the identifying text. The expansion control selection tool 11603 and icon selection tool 11605 may be implemented through a drop-down list or through a shell browser utility that permits a user to search through and select from a database of images and icons. With regard to the expansion control selection tool 11603, a user may be asked to select two images to represent each of a collapsed and expanded state. Alternatively, the selection tools 11603 and 11605 may comprise a predefined menu of available icons or images. Once the user has selected an icon, he or she may have the option to preview the change prior to applying it to the page node.

In addition, a user may change the substance and appearance of the identification text of the page node and the underlying page. This may be accomplished by editing the text within the navigation pane or, alternatively, through the property dialog 11600. The property dialog 11600 may comprise options for adjusting font, font size, style (italics, bold, small-caps, etc.) and color. For example, a user may increase the font size and alter the font color of a page of particular significance or importance and its representative node. Such features may allow a user to identify to others that the page is of high importance or relevance.

Figure 116B:
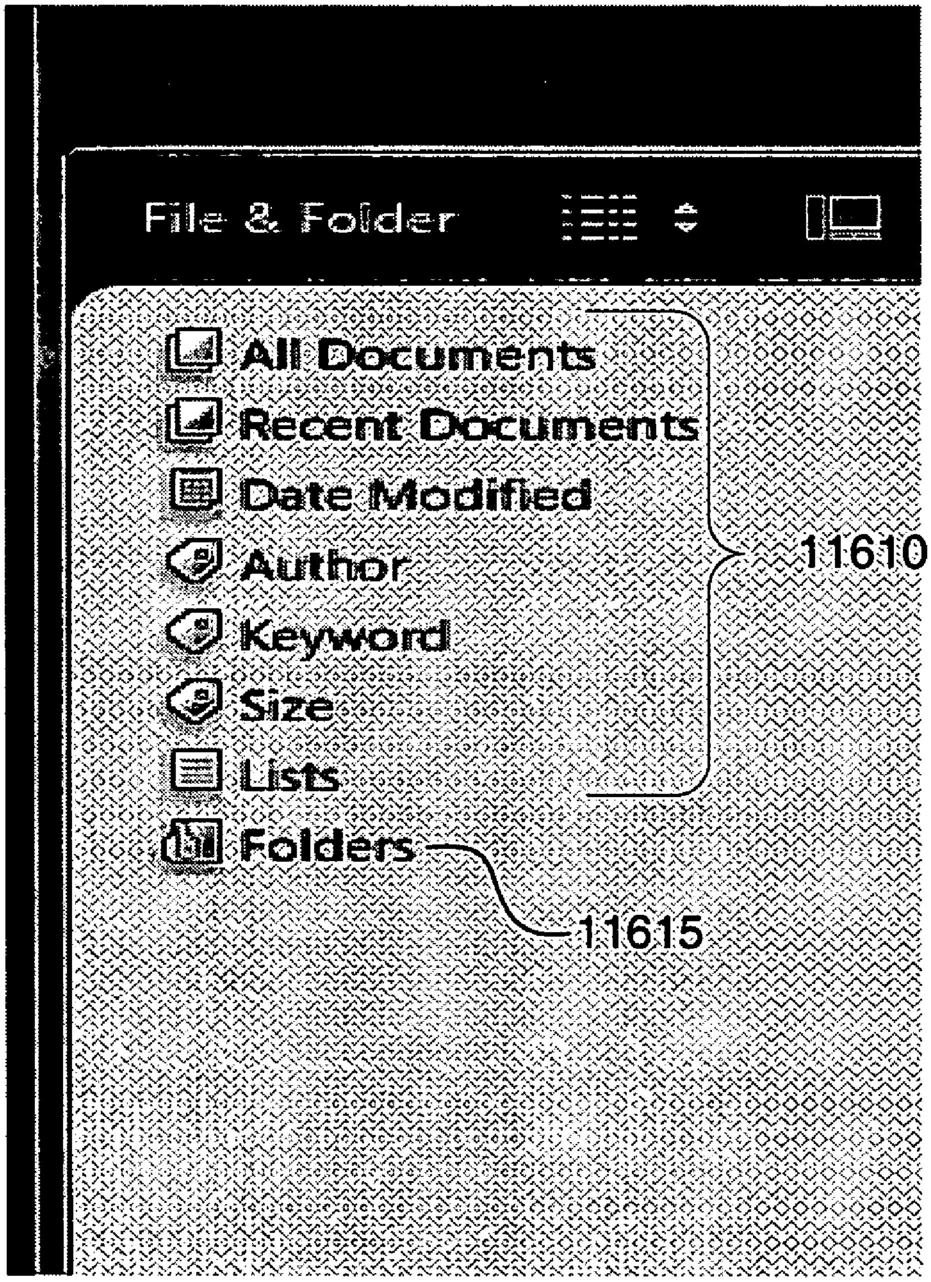
FIG. 116B illustrates a multi root navigation pane with an invisible root according to an illustrative embodiment of the present invention.

A further option of the page property configuration dialog 11600 may allow a user to hide a page node in the navigation pane so that the page node is not visible when viewing the navigation pane. In one embodiment of the invention, when a page node is hidden, its descendant nodes may be elevated to root node status in the navigation pane. Thus, a hide option permits a user to create several root nodes simultaneously. A navigation pane comprising a hidden page node is illustrated in FIG. 116B. Group 11610 comprises descendant page nodes of the hidden Autolist root node while the Folders page node 11615, not related to the hidden node, is also visible. Hiding a particular root node may also be advantageous when a user is working extensively with the pages dependent on the hidden root node. By hiding the node, a user is not required to continuously expand and collapse the root node to interact with the children nodes.

Multi-Valued Properties: Further to the discussion above with respect to FIGS. 51-66**, additional aspects of the present invention may provide a system and method for user modification of properties (or metadata). In one aspect, a shell browser is provided which includes a display of file properties that may include multi-value properties. The user may edit the multi-value property, and the system may intelligently assist the user in editing the multi-value property. The system may tokenize the multi-value property values, and may provide persistent prompt text within a multi-value property field as a reminder to the user of the field's options.

The system may display aggregated property values, and may incorporate visual differences to associate aggregated values with the files to which they apply. Editing of the aggregated values is possible, and when editing aggregated multi-value properties, the system may intelligently assist the user in selecting (or avoiding) entries based on a variety of factors, such as the entries already in use and the context in which the property values are used. When aggregating multi-value properties for multiple selected files, the system may also take steps to help preserve the order in which particular values appeared in the various files. Values that tended to appear more often in the beginning of a file's multi-value property will tend to appear towards the beginning of the corresponding aggregated multi-value property.

Figure 117A:
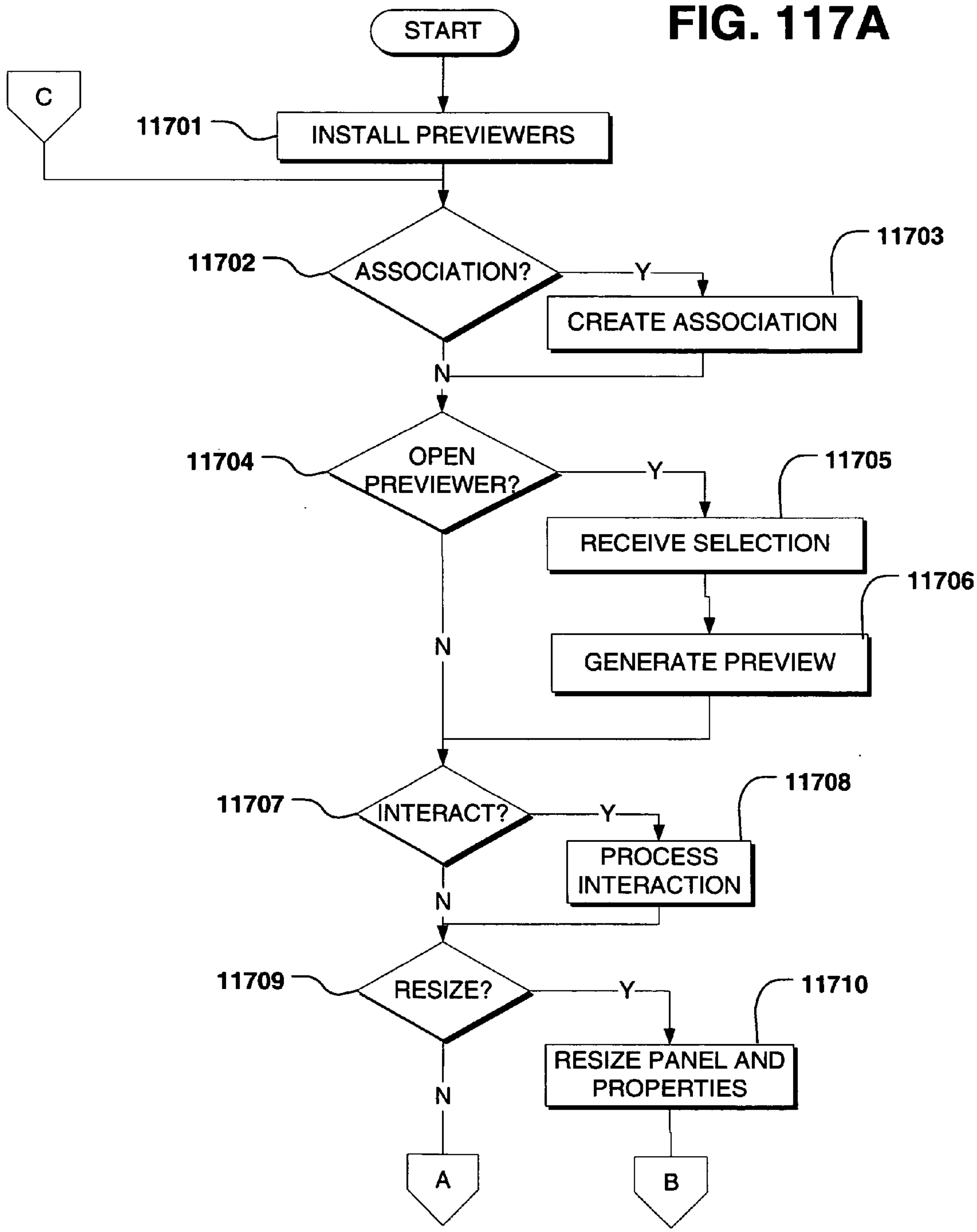
FIGS. 117*a-b* depict an example flow diagram of a process that may employ features described herein.
Figure 117B:
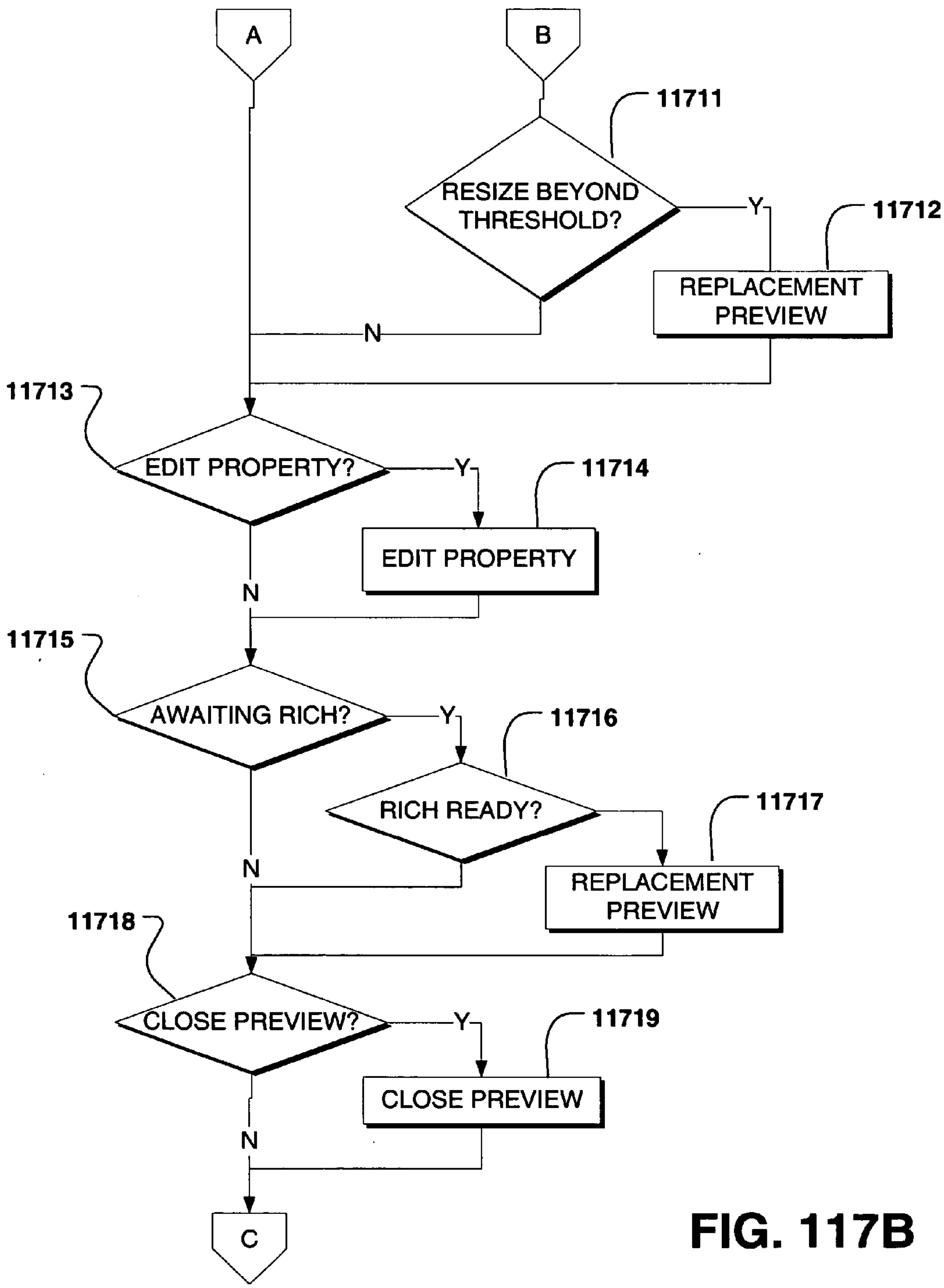

FIGS. 117A-B depict an example flow diagram for a preview process that may be used in conjunction with the features described above and herein. As an initial step in the process, one or more previewers may be installed on the system in step 11701. Previewers may be software that is shipped as part of the underlying operating system software.

Previewers may also be additional software loaded onto a computer system after it is shipped. For example, the underlying operating system may expose a set of application program interfaces (APIs) that would allow future development and/or addition of previewers.

In step 11702, a check may be made to determine whether a new association is to be created for one or more previewers. An association may be any criteria and/or request governing the times and types of previewers that are to be used. An association may be created to define the types of previewer(s) to be used for a given user identity (or if a particular user wishes to disable previews altogether), and/or for certain predefined situations based on system conditions (e.g., available resources, memory, current applications running, number of previews generated or to be generated, available power, time of day, status of other applications, etc.) and file type (e.g., a user may prefer to use one type of previewer for home videos, and a different previewer for compressed songs), such that the default previewer used by the system may be user-defined. A user may indicate that certain file types are only to have basic/non-interactive previews, or the system can automatically disable a preview if it experiences a predefined number of failures, crashes, or hangs. An application may be associated with one or more previewers so that previews opened from the application, or previews of files created by the application, may always be previewed using the same previewer. These associations can be hierarchical in nature, such that multiple previews are ranked in order of preference. The step of requesting a new association 11702 may occur at startup, upon installation of an application, upon execution of a predetermined application, and/or by user request.

If a request to create a new association is received, then the association is created in step 11703. The act of creating an association may be accomplished by querying the user for the specific criteria to be met when certain previewers are to be used, or retrieving such criteria information automatically from an application and/or the system itself. When created, an actual association can take the form of data stored in the computer system's memory associating the previewer(s) with any of the criteria identified above.

In step 11704, a check may be made to determine whether a previewer needs to be opened. There are a number of events that can trigger the opening of a previewer. For example, when a user opens a shell browser on the system and begins perusing files and/or folders, the browser may initiate a previewer to display a preview of one or more selected files (or default files, when none is selected). Alternatively, a previewer may be triggered at the request of any other application. A previewer may also be triggered by the creation of common file dialogs that are shared by multiple applications. Common file dialog previews are discussed further below.

If a previewer is to be opened, the system may receive the selection, or selections, that are to be previewed in step 11705. This may involve receiving identifications of the file (or files) that are to be previewed. Such selections may be made by the user, such as by the selection of one or more files by moving a mouse pointer to a listed file and pressing the left mouse button, or clicking and dragging a selection box around multiple file listings. Alternatively, selections may be made automatically. For example, certain applications may default to a predetermined file, and may automatically select that file for previewing upon first opening. A word processing program, such as MICROSOFT WORD™, may default to a previewer that includes text editing features. The system may automatically select files for previewing as a result of conducting a search. A user might enter search criteria, such as a keyword, and the system or application may automatically select one of the search results for previewing. For example, a user might type in "peanut" as a keyword in a system search tool, and the resulting listing of files containing "peanut" may display, with a preview of the first listed file.

Once the file(s) to be previewed are selected, the system then selects and generates the appropriate preview in step 11706. Selecting an appropriate preview may be based on one or more associations that have been created (e.g., a user has selected a particular previewer for previewing all files of a certain type, or for previewing certain files), and may also be based on the system resources that are available (or consumed). Alternatively, the user may be requested to identify which previewer should be used for the current preview by, for example, selecting from a presented list of predetermined previewers that may be appropriate for the selection to be previewed.

In some situations, it may be desirable to generate an initial basic preview that can be viewed while a richer interactive preview is being initiated. For example, if a rich preview of a text document would require a few seconds to load and generate, the user may be presented in the interim with a more basic preview that can be generated sooner. The more basic preview may have some, or none, of the interactive functionality offered in the rich preview, and can at least get the user started in previewing the selection(s).

Selecting a preview may include a prestored sequence of previewers that can be used. For example, a particular application or view may have a hierarchical sequence of available previewers, such as a full rich previewer, a reduced feature previewer, a basic thumbnail preview (which need not be interactive), and a basic icon similar to the desktop icons currently used in MICROSOFT WINDOWS™ operating systems. When a previewer is to be opened, the system may start with one previewer, such as the full rich previewer, and "fall back" through the sequence of previewers to find the most appropriate one. For example, the full rich preview might be the default for a particular view with a previewer that offers paging, zoom and text editing capabilities that allow the user to modify the document from the preview, and if there are insufficient system resources (e.g., due to memory limitations, other applications, other previewers, etc.) to adequately offer that preview, the system may check the next previewer (e.g., a less-featured one) on the list. The next previewer may be slightly less featured, for example, by only offering the ability to navigate through (e.g., paging and zooming) the document, but without the ability to edit. Such a previewer may require less system resources to run, and may be preferred if resources are not available. If there still are insufficient resources to offer that second previewer, the system can check the next previewer (e.g., a basic thumbnail view with little or no interactivity), and so on until a suitable previewer is found given the available resources.

When the preview is generated, the preview may be initiated as a separate and distinct process from the application requesting the preview. For example, if a previewer is provided in a system shell browser, the previewer may be executed as an independent process from the shell browser. With the preview as a separate process, the shell browser might not ever find itself in a position of having to wait for a response from the preview application, thereby avoiding a crash or hang if the previewer encounters difficulty. Such difficulty can come from a variety of sources. The selected file might have corrupt data such that the preview application cannot process it; the preview application itself might have an error or bug preventing its smooth operation; the file may be mislabeled or misidentified such that the wrong preview application is chosen (e.g., the file may indicate that it is an audio file, when actually it is a text file); or the system resources may encounter a problem such as a bad memory sector. Having the previewer as a distinct process provides a degree of crash/hang resistance. If the previewer encounters an error, crashes, or hangs, the problem will be confined to the preview panel itself, and the shell browser will continue to function. In some instances, the system may keep track of the number of times that a particular preview application encounters difficult, crashes and/or hangs, and if a predetermined number is exceeded (e.g., 3), then the system may take steps to reduce the frequency with which that particular previewer is used. For example, the system may lower the priority of that previewer, or create an association that calls for a different previewer.

In step 11707, a check may be made to determine whether the user has interacted with any displayed preview. Interaction can take any form of known computer interaction. For example, an interaction may be a mouse click within the preview panel. An interaction may be a selection of one or more graphical interface elements in the preview panel, such as paging buttons cursor arrows, or the like. Interaction may take the form of keyboard keys, such as cursor movement keys to move a cursor within a preview of a text document.

If an interaction occurs, the appropriate processing will occur in step 11708. Processing an interaction may take the form of any response to a user input. For example, the processing may begin an editing process in response to a user clicking a mouse or other pointer within the preview panel. The editing process may allow the user to view and/or edit the previewed file directly from the preview panel, without requiring the user to leave the view having the preview panel.

In step 11709, a check is made to determine whether the preview panel has been resized. The panel may be resized, for example, by the user entering commands, and/or by clicking and dragging a boundary or resizing tool of the preview panel. If the panel is resized, the new resized panel is displayed in step 11710. If desired, the resized panel may be configured to automatically retain the same aspect ratio found in the original panel. Some file types may be configured, such as through association, to always have the same aspect ratio (e.g., videos may always be 4:3). If properties or metadata were displayed accompanying the preview, then the properties and/or metadata display area may also be resized to correspond to the new preview panel size. For example, the properties or metadata display area may be configured to always have the same height or width as the preview panel. Conversely, the previewer may be resized in response to a resizing of the properties/metadata display area. If desired, the new size may be stored in the system as the new default size associated with the particular file type, current view, application, and/or user, and used the next time a preview is needed.

In step 11711, a check may be made to see whether the new size of the preview panel has passed one or more predetermined thresholds for the preview. As noted above, previewers may have one or more criteria for their use. One such criterion may relate to the amount of display area available to the previewer. For example, different levels of interactivity and/or functionality may be offered for different sizes of preview. Using a word processor, such as MICROSOFT WORD™, as an example, a larger preview may offer more detailed functionality, such as navigating/paging and zooming in the document, changing font size, or editing text using a cursor in the preview, while a smaller preview of the MICROSOFT WORD™ document might still include the navigation and zooming features, but omit the cursor text editing if the display is too small to reasonably use a cursor to edit the text. A previewer may have one or more threshold sizes associated with it, which may be created during association, stored in the computer system's memory, and which may identify a replacement previewer for use when the threshold is met or passed. For example, the previewer might require a minimum of 256 pixels of width to implement certain features, while other features might only be included if there are 512 pixels.

If the new size passes a threshold, such as a minimum or maximum threshold, a replacement preview may be selected and generated in step 11712. The generation of a replacement preview may be identical to the generation of the preview in step 11706. So for example, if a preview panel has been reduced in size beyond a certain minimum size, a replacement previewer may be used that offers a smaller subset of those interactive features that can still be used at the smaller size. Alternatively, if the preview panel has been enlarged beyond a certain maximum size, a replacement previewer may be used that offers more features that can be useful given the larger size, such as a previewer that has more user interface controls, or allows detailed edits within the preview.

In step 11713, a check is made to determine whether a displayed property, or piece of metadata, is to be edited. Such data may be edited by, for example, clicking a mouse or pointer on a piece of displayed metadata, and entering a value using a text entry or menu user interface. In step 11714, the appropriate steps are taken to edit the particular property. The actual steps may depend on the type of data being edited. A date field may bring up a calendar user interface element, allowing a user to view and select a date (and/or time) value for entry. Other types of data may be entered through a text entry box, and other types may be selected from a menu, such as a pull-down menu.

In step 11715, a check is made to determine whether the system is awaiting the loading of a rich previewer. As noted above, a more basic or generic preview may be provided while a rich preview is being initialized on the system. If the system is awaiting a rich previewer, in step 11716, a check is made to determine whether the rich previewer is ready. If it is, then the system will replace the existing preview with the rich preview in step 11717. Step 11717 may also include a query to the user to determine whether the rich previewer is still desired. Although this step shows two previewers, more than two may also be used. For example, the system may display an icon while waiting for a thumbnail preview, and then display the thumbnail while waiting for a rich preview, etc.

In step 11718, a check is made to determine whether a previewer is to be closed, and if so, the previewer is closed in step 11719. Then, the process returns to step 11702 to begin again. Of course, the process shown in FIGS. 117*a-b* is merely an example showing a way of arranging a number of steps, and any of the steps may be reordered, repeated, removed, or modified as desired to implement (or remove) any feature described herein.

Figure 118:
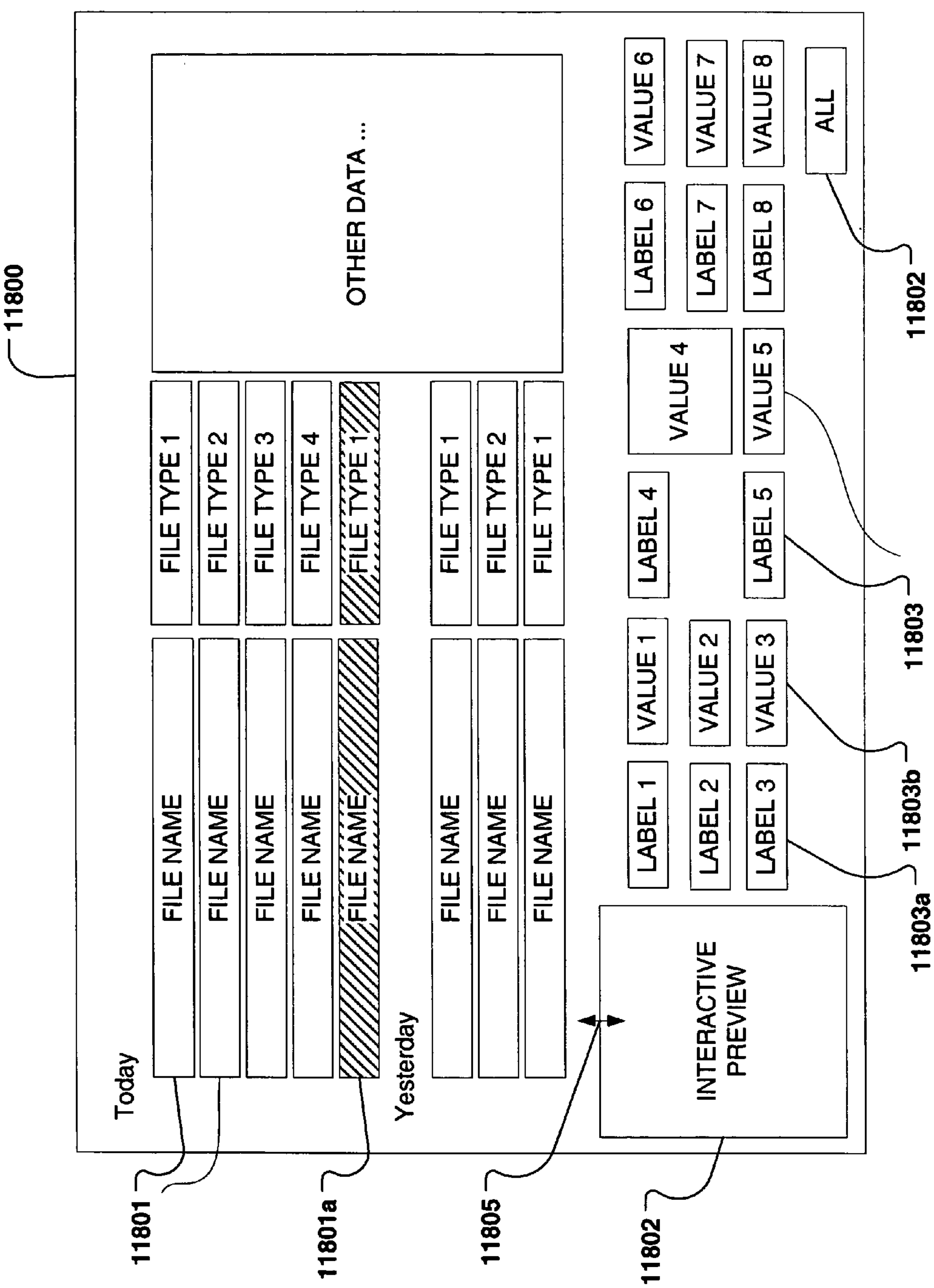
FIG. 118 depicts an example file browser user interface and various user interface elements.

FIG. 118 is an example of another shell browser interface 11800 (or system browser) incorporating one or more aspects of the present invention. Browser 11800 may be offered as part of the operating system for viewing contents of one or more directories, networks, drives, folders, etc., and may be generic, or non-application-specific. In browser 11800, a number of items 11801 are listed, with file name, file type and other data being listed for the various items. As shown in this example, files of multiple different types (e.g., text files, image files, audio files, and/or custom data files for existing applications, such as word processing applications) may all be displayed in the shell browser. The items 11801 are shown organized by date (e.g., Today's and Yesterday's files), but any sorting or organization may be used (e.g., file size, file name, project name, file type, artist, album, create date, edit date, etc.). The user may select one of the listings, such as listing 11801*a* (shown as visually differentiated with a first pattern which may be the color red), and the shell browser 11800 may display an interactive preview panel 11802 corresponding to the selected item 11801*a*.

Interactive preview panel 11802 may, for example, display one or more pages of text appearing in selected item 11801*a* when item 11801*a* is a file containing textual data, such as a MICROSOFT WORD™ file, or other word processing program. The interactive preview 11802 may allow the user to edit and/or manipulate the displayed text directly in the preview panel. For example, the user may be permitted to click a mouse pointer within the interactive preview 11802 to cause a cursor to appear in the panel, and the user may manipulate the cursor or enter keyboard inputs to add, delete, and/or otherwise modify the displayed text. Other types of controls, such as paging controls, font/format controls, scrolling controls, file management controls, input/output controls, and the like may also appear in the preview panel 11802.

Different types of data files may have different types of interactive previews. For example, the interactive preview for an audio file might include controls to control the play of an audio preview of the selected audio file on one or more speakers (such as speakers 197) of the computer system. A preview of a .wav file or .mp3 file may include such audio commands. There may be controls to play, pause, or cue the playing of the audio file. Some previews, such as previews of pictures, may include zooming/panning controls to allow the manipulation of a displayed image. Video previews may have controls to play, pause, or cue the playing of a video on a display and audio on a speaker of the computer system.

The interactive preview 11802 may also be displayed in conjunction with a plurality of properties 11803 (including metadata), shown in FIG. 118 as having labels 11803*a* and corresponding values 11803*b*. Any type of file property may be displayed with a label. Example properties may include file size, folder location, file name, project name, edit/create date, application type, etc. The various labels and properties 11803 that appear may be customized according to the type of file chosen, so that different sets of properties may appear for different types of files, depending on what is appropriate for the selected file's type. For example, a selected audio file containing a song may have properties for album name, artist, name of song and release date, while a selected spreadsheet file might replace those properties with different properties, such as group name, project name, project leader and project start date. The determination of which properties are to be displayed may be automatically configured, or alternatively the user may be given the option of selecting (and/or deselecting) properties to appear in the properties area for a particular file type. Properties may be prioritized by type (e.g., an "album name" property type may be more important to a song file than an image file) to facilitate in this display.

Other variations on the displayed information are also possible. For example, some labels (such as file name and file type) may be considered optional, or may be omitted from the display altogether. One example from FIG. 118 may be the file name and file type, which is already displayed elsewhere on the screen, and would be redundant if displayed again in the properties area by the previewer. The space available for such non-displayed labels might be used to display additional property information. Properties having no value may be omitted by default, or may be flagged to appear despite being empty. As another variation, some properties may be provided with different amounts of space to accommodate more lengthy properties.

The properties may be editable from the property display area. For example, a user may simply click on, or hover over, a displayed property value, and begin a process of entering/editing data. The interface for entering/editing the data may be dependent on the particular property or type involved. Some properties, such as dates, may have a calendar display and/or pull-down menu to select a value. For example, the user can simply move a mouse pointer over a date field, and a display of a calendar can appear to help the user enter a date by choosing from the calendar. Pull-down menus or lists of possibilities may be displayed to simplify entry. For example, by clicking a mouse pointer on a month field, the system may display a list of months from which the user can choose to fill in the field. A simple textbox may be displayed with a cursor to allow the user to directly type in and/or edit the property value form the preview display, without requiring a separate dialog box for the data. The textbox may be a fill-in-the-blank box in which the user can type using a cursor and keyboard. Any other form of data entry may be used. To help the user identify properties that may be edited, those properties may be visually differentiated or accentuated in some fashion in the display. For example, a different color (e.g., yellow), font (e.g., bolded letters, or ALL CAPS font), appearance and/or symbol may be used to indicate values that are editable by the user and values that are not. Highlighting can also be used to differentiate or accentuate certain fields. For example, editable fields may have a certain color (e.g., canary yellow) in and/or surrounding them, similar to the effect created when a yellow highlighter is used on a printed document.

Some file types may have more properties than what will fit in a given preview display. In some embodiments, there may be an option, such as an ALL button 11804, that may allow a user to view all properties for a given file, or at least view additional properties.

As noted above in step 11709, the user may be given the option of resizing the preview and/or properties display used in the browser 11800. For example, a resizing tool 11805 may be used in the preview panel 11802, and by selecting and moving the tool, the user can cause the browser 11800 to automatically adjust the display area occupied by the previewer and/or properties area.

Figure 119:
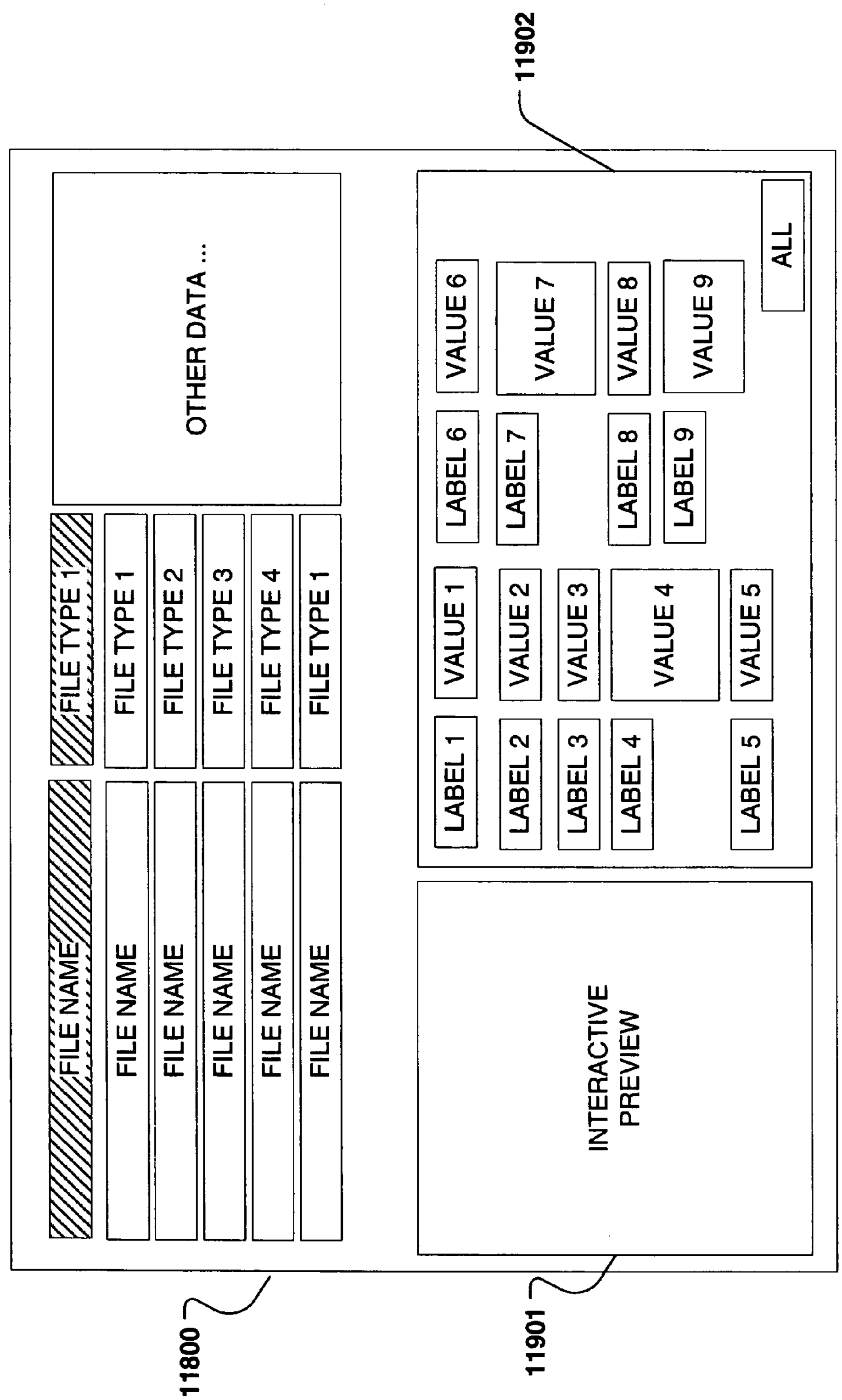
FIG. 119 depicts a modified version of the interface in FIG. 118, in which the preview area is resized.

FIG. 119 shows an example user interface in which the user has resized interactive preview 11802 to have a larger size, resulting in larger interactive preview 11901. The new preview 11901 may be configured to have the same aspect ratio as the old preview 11802, or the user may be permitted to modify the aspect ratio as part of the resizing process. With a larger preview 11901, the browser 11800 may increase the space allocated to the display of properties as well, so that the properties and preview correspond in size. For example, the properties area 11902 may be configured to have the same height as the resized preview, and may automatically rearrange the displayed data to accommodate the new size. Additional properties may be displayed in this larger area.

As noted above, a change in the size of the preview may, in some instances, cause a change in the type of preview offered, such that different sizes of preview panels result in different types of interactive preview. So preview 11901 may differ from preview 11802 in terms of the level of interactivity and/or the types of features provided. As one example, certain graphic editing features might not make sense if the preview is less than 256 pixels in width. The same type of resizing can occur if the user resizes the area used to display properties. For example, the user could click and drag a mouse pointer on a border of the properties area 11902, and resize it, and cause the preview area 11901 to change sizes to match the new properties area 11902 size.

Figure 120:
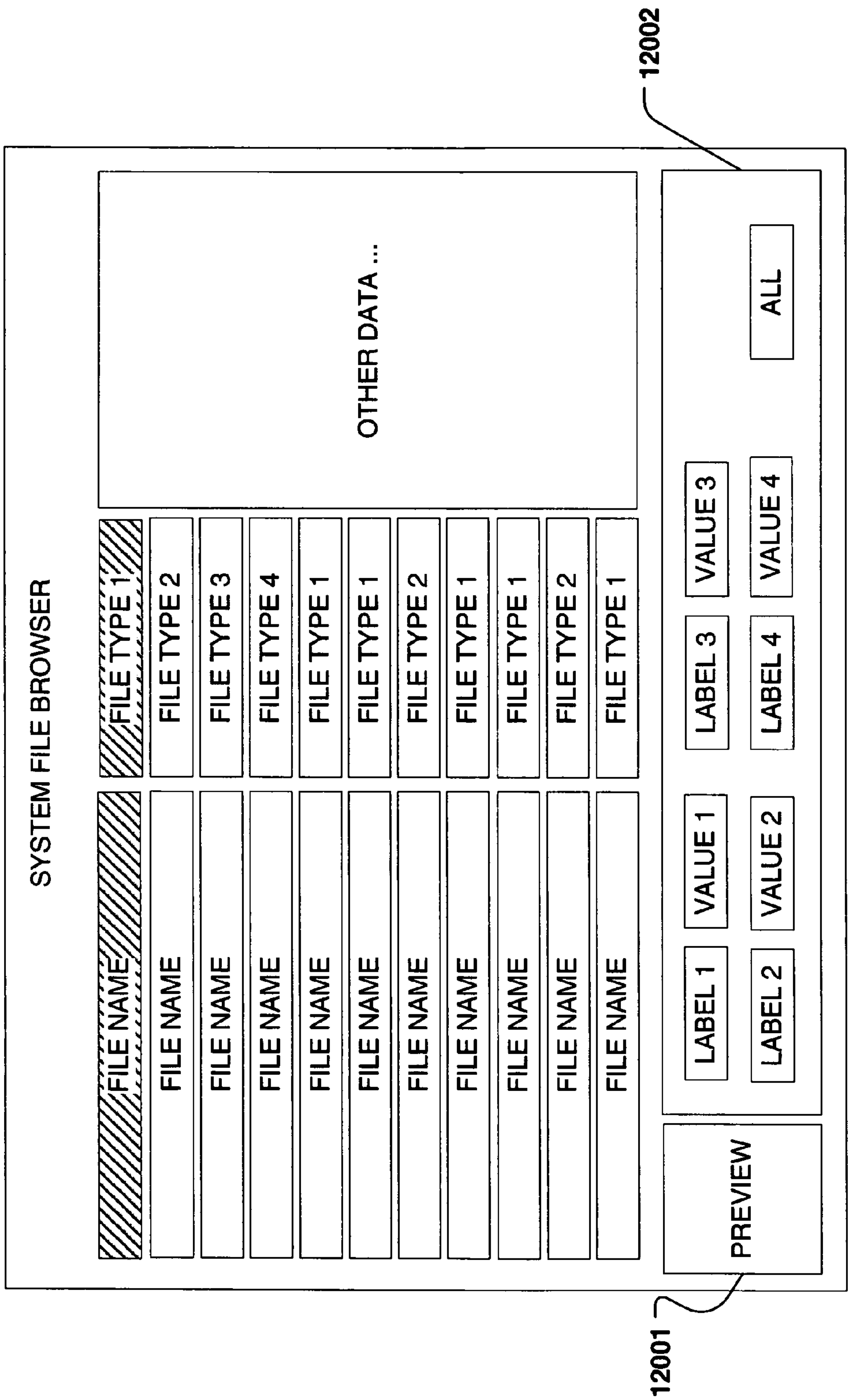
FIG. 120 depicts another modified version of the interface in FIG. 118, in which the preview area is resized.

FIG. 120 shows an example in which the preview has been resized to be a smaller preview 12001. Smaller preview panel 12001 may have a reduced set of features given its smaller size. Properties area 12002 may also be reduced in accordance with the preview panel 12001, and may rearrange and/or remove displayed properties or metadata to accommodate the reduction in available space. Some previews may exhibit icon behavior found in the Microsoft WINDOWS™ operating systems, so that right-clicking, left-clicking, dragging, etc. may have the same effect. For example, dragging and dropping one icon onto another may cause a first file to be attached to the second.

Figure 121:
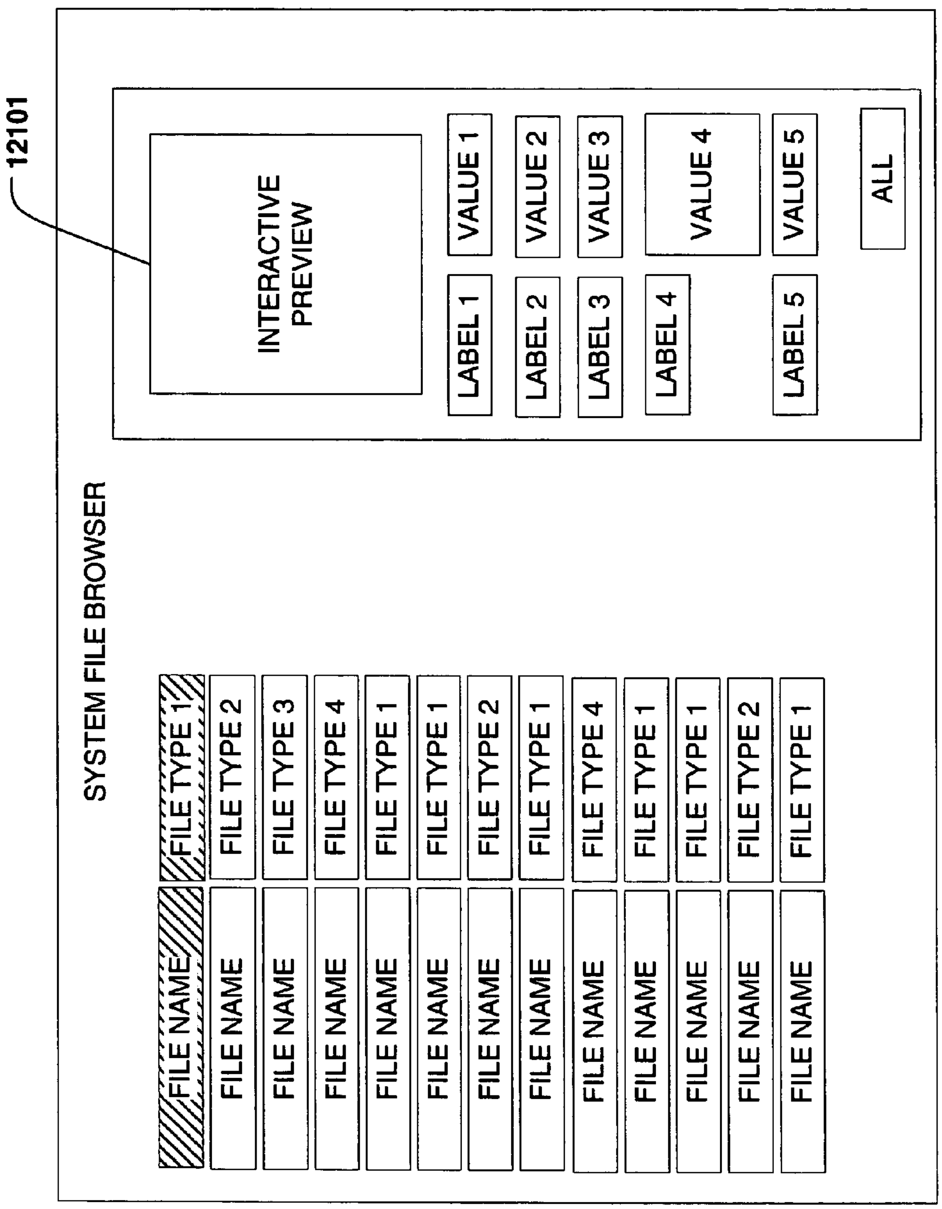
FIG. 121 depicts an alternative browser interface with a different orientation of preview elements.

In addition to resizing the preview panel and/or properties display area, these elements may be rearranged either automatically or by user request. For example, the user may wish to move (e.g., by selecting a preference, by clicking and dragging the preview, or some other user input) the preview 12101 (FIG. 121) to have a different orientation and appearance. A different orientation may be preferable when certain types of files are previewed. For example, previews of photographs taken in the "landscape" format, or of video images, may be more suitable to an orientation that is wider than it is tall (e.g., "landscape"), while other types of files (e.g., text documents, or "portrait" images) may be more suitable in an orientation that is taller than it is wide. The selection between the formats can also be done automatically, for example, based on file type. The system may, for example as part of the preview selection in step 11706 or association in step 11703, automatically examine the file type, properties, and/or metadata to determine which preview orientation would be most appropriate for the selection to be previewed.

To facilitate the rearranging, and the crash/hang resistance noted above for the preview panel, the preview panel and properties/metadata area may be implemented as separate software modules. Each module may be executed as a distinct process on the system's processing unit(s) 120. Alternatively, the preview and property/metadata panels need not be implemented as distinct software or software modules in the system, and may instead be implemented as a common module. The level of integration may be a design choice based on the level of extensibility desired, software memory footprint, and other factors.

Figure 122:
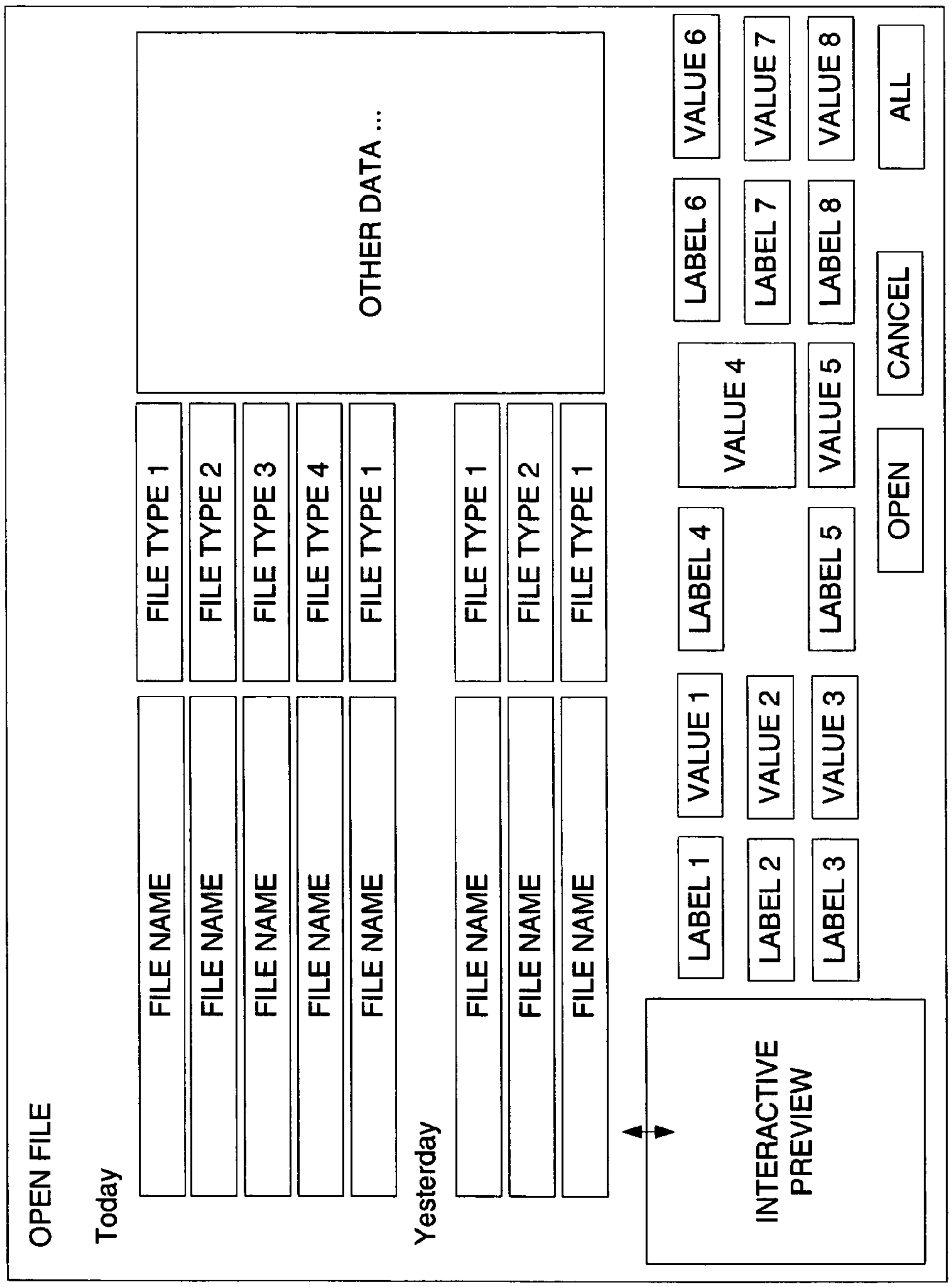
FIG. 122 depicts an example of a common file dialog that includes a preview interface.

As previously mentioned, the preview panel may be incorporated into a computer system's common file dialogs. Common file dialogs may be user interface elements and/or programs offered by the computer system to be shared by the various applications executed on the system. For example, an operating system might offer a common "Open File" or "Save File" dialog that may be used by any application wishing to create a file on the system. Including a previewer in such common file dialogs allows multiple different types of applications to benefit from having previews, and allows applications to effectively provide rich, interactive previews of files that are not natively supported without requiring the application developers to develop their own previewer. Incorporating a previewer in the common file dialog also provides a consistent interface across multiple applications, where user preferences and associations may be consistently used across the various applications. Furthermore, offering the previewer in the common file dialog may allow an application to effectively provide a rich, interactive preview of a diversity of file types—even file types that the application does not natively support. For example, a spreadsheet application may have installed its own rich, interactive previewer to handle previews of data-intensive spreadsheets. A separate word processing application, which might not have any capability for editing the spreadsheet application's data files, may nevertheless offer such a preview by using the common file dialog. FIG. 122 shows an example of a previewer that is part of an "Open File" common dialog. These common file dialogs, with their previews, may be extensibly offered to other applications through certain APIs.

In some instances, a user may wish to select multiple files at once, or have multiple files actively selected at the same time. In those instances, the previewer may operate as described above, providing separate previews for each selected file. Alternatively, the system may alter its behavior. For example, if, in step 11705, the system determines that multiple files are selected, the step of generating a preview 11706 may involve a process of determining which selected file will be previewed, and which ones will not. This determination may be made based on a variety of criteria (e.g., first selection, last selection, newest selection, largest selection, simplest preview, user previewer preference, etc.), such as the associations and preferences discussed above.

Figure 123:
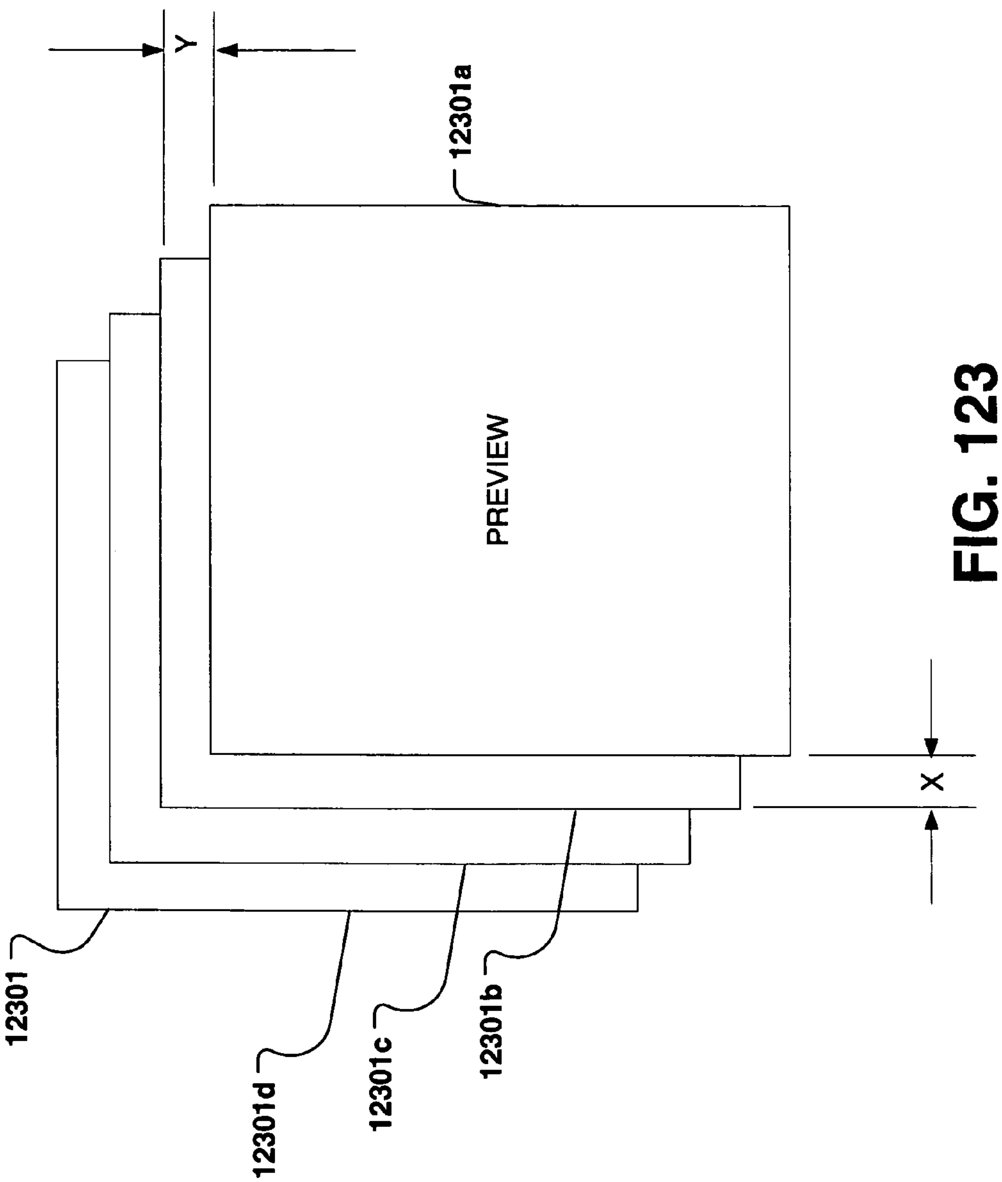
FIG. 123 depicts an example of a stacked preview presentation.
Figure 124:
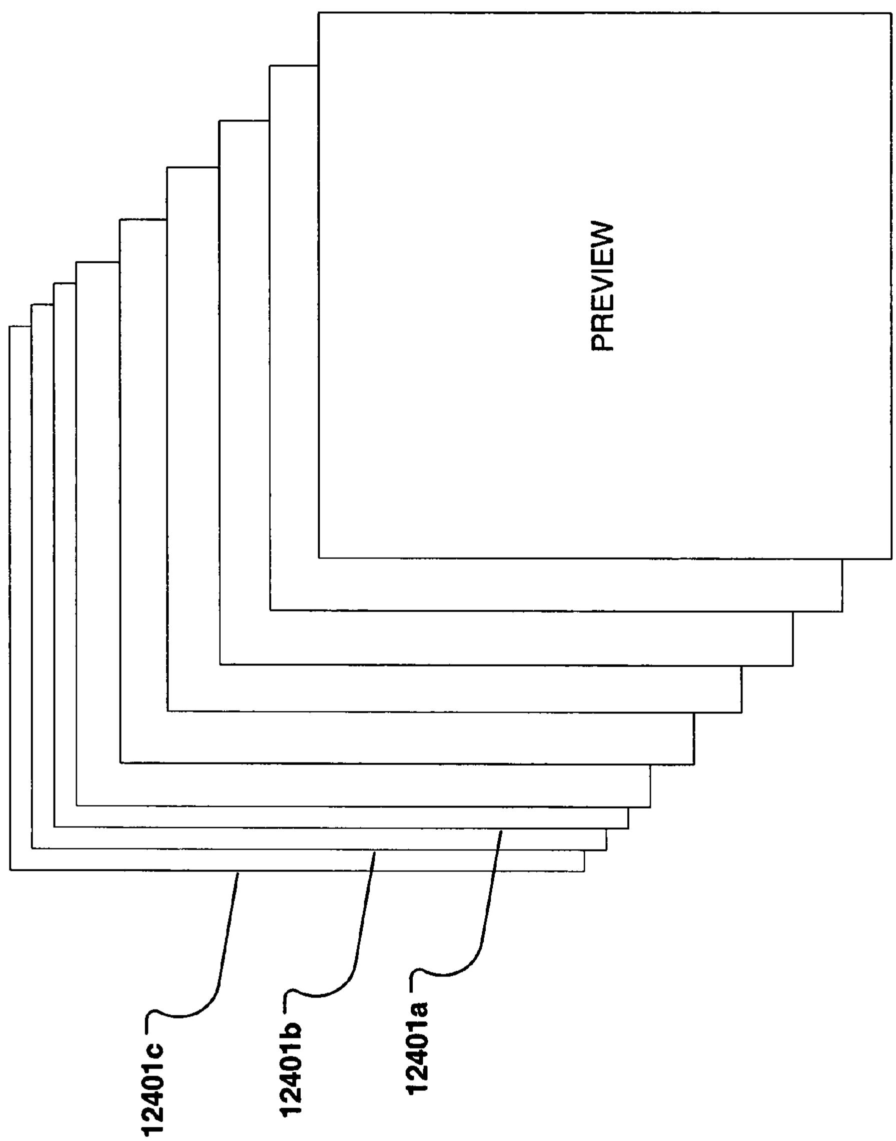
FIG. 124 depicts another example of a stacked preview presentation, having more stacked previews than the example shown in FIG. 123.

The system may also take steps to generate simultaneous previews corresponding to the multiple selections. As depicted in FIG. 123, multiple preview panels 12301 may be given a stacked appearance to illustrate the multiple selections being previewed. A primary preview 12301*a* may appear on top, and may have all of the same rich interactivity described above with other previews. Additional previews 12301*b*, 12301*c* and 200*d* for the other selections may appear stacked behind the primary preview 12301*a*, and may have horizontal offset X and vertical offset Y. The offsets may be constant to present a uniform appearance. Alternatively, the offsets for each successive preview may become smaller as more previews are placed in the background. There may be a predetermined maximum number of stacked previews, beyond which a different appearance may be used. For example, if the predetermined maximum number of previews is set to 6 (can be set by the system or by the user), and if more than 6 files are selected, the stacked previews may have a different appearance, as shown in FIG. 124. There, the previews 12401*a*, 12401*b* and 12401*c* beyond the first six (6) are shown as being stacked with smaller offsets. These additional previews may be rendered as simply blank previews, with a predetermined pattern, and/or with a degree of transparency or opacity to indicate to the user that there are more selected files that are not previewed.

Figure 125:
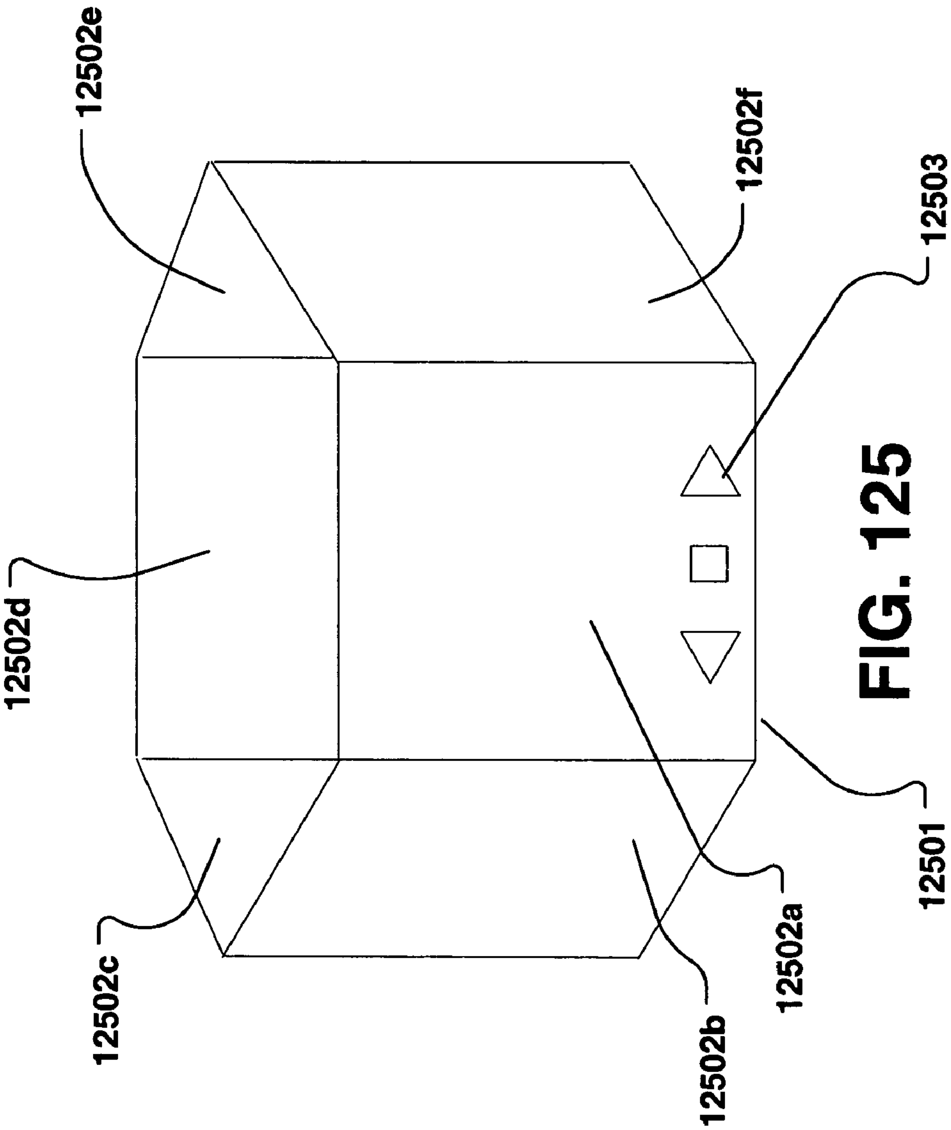
FIG. 125 depicts an example of a preview occurring when multiple files are selected.

Alternative displays of multiple previews may also be used. For example, a rotating 3-D carousel of previews, such as that shown in FIG. 125, may be used. The six-sided carousel 12501 may display six separate previews on its different faces 12502*a*, 12502*b*, 12502*c* (shown from back), 12502*d* (shown from back), 12502*e* (shown from back) and 12502*f*. User interface elements 12503 may be provided to allow manual navigation through the carousel, such as rotation or zoom, or carousel may be rotated automatically (or not at all). Other approaches include displaying multiple previews in a fanned-out display, displaying multiple previews (resizing if desired) side-by-side, displaying them in a 3-D isometric view of a stack (resembling a stack of papers), and displaying them sequentially with automatic or manual navigation.

The preview of multiple selected files (e.g., selected by clicking a mouse cursor on multiple files, holding the SHIFT or CTRL keys and clicking, or clicking and dragging a selection area around multiple files) can also vary depending on the type of files chosen, and different preview sequences may be used for different combinations of selected files. For example the system (e.g., via the operating system, hardware, an application, etc.) may use a stacked presentation when multiple image files are selected, and use a sequential video preview when multiple video files are selected. The system may also scale back or simplify the previews offered when multiple files are selected, in order to conserve resources.

The various features above may be implemented as a single integrated piece of code, or as a collection of subroutines or modules. For example, there may be an iterator module to handle the preview of multiple files, a commands module that is responsible for the user interface commands offered in the previews, a preview module for generating the preview itself, a properties module for handling the properties/metadata portion of the preview display, etc.

As noted above, these preview features may be offered anytime a user is to be shown a listing of files or other data on the system. When the particular listing is generated through the use of one or more criteria, such as when the display is the result of a user-requested keyword search, the previewer may use the search criteria to assemble the preview. For example, an application may wish to notify the previewer of the keywords used in a search, so that the previewer can determine which preview to use, or how to sequence the previews when multiple previews are to be used. This may be an extensible feature, where the previewer is provided with the search criteria.

Figure 126:
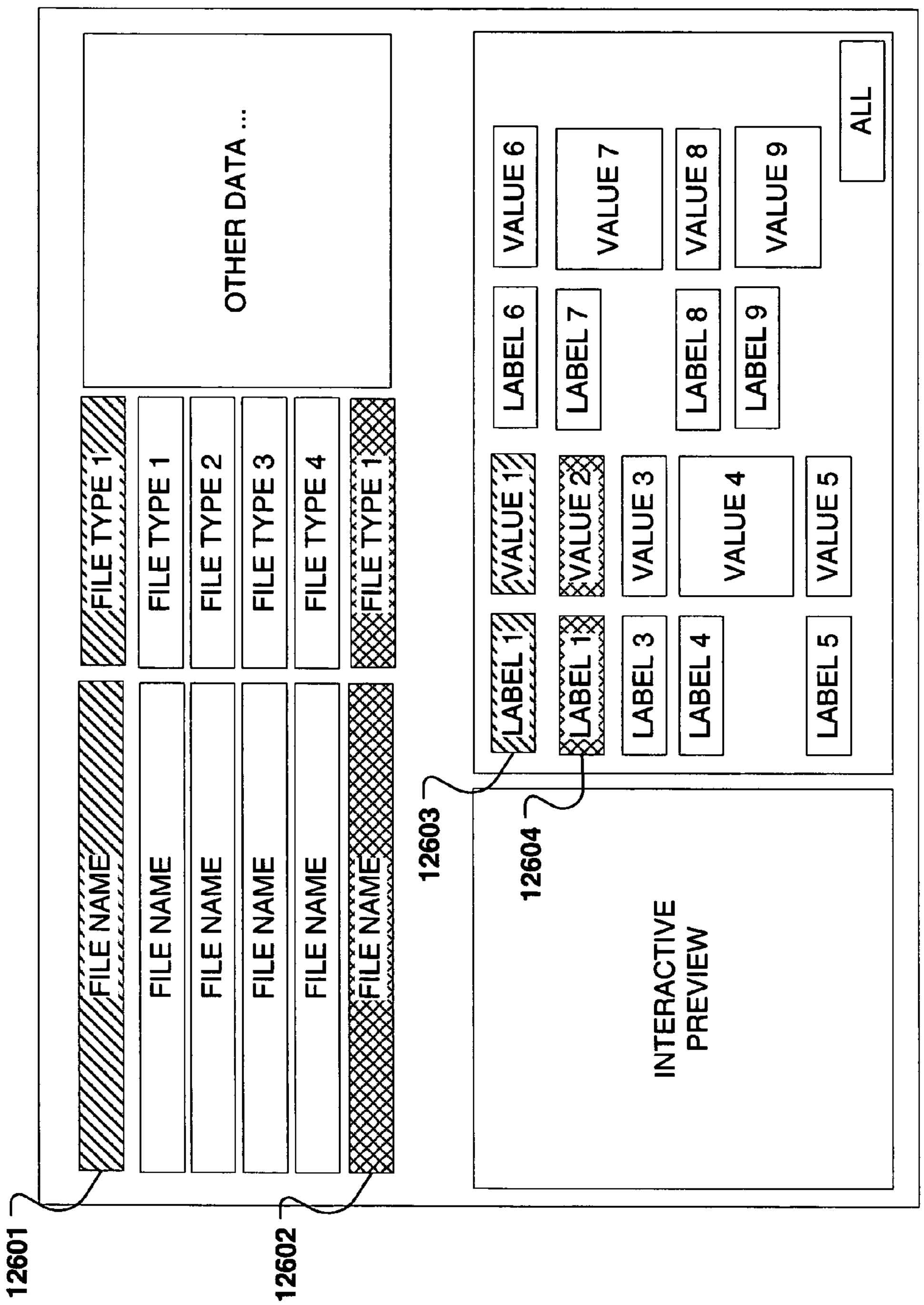
FIG. 126 depicts an example browser having multiple files selected, and visual differentiation of corresponding properties and files.

As noted above, multiple selections may be made, and the displayed preview image may change as a result. These multiple selections may also cause a change in the display of properties and/or metadata. For example, FIG. 126 shows an example view in which two files 12601 and 12602 have been selected. The selected files may be differentiated and/or accentuated in a unique fashion or with a unique appearance, such as having a distinct color, font, shape, texture, style, size, background color, pattern, etc. The properties and metadata for the selected files may display the same property for both files (such as the project name for each) 12603, 12604, and may have a corresponding appearance so that the user can easily match properties with their corresponding files. For example, the properties may be color-coded to identify the selected file to which they belong. The pattern shown for file 12601 may accentuate and/or differentiate the file, such as by a color (e.g., red), a highlighting (e.g., a different color surrounding the text, as with a highlighter on a paper document), a font (e.g., bolding, underlining, ALL CAPS, Times New Roman, etc.), a size (e.g., larger text), etc. Property 12603, which may display a property of file 12601, may have the same accentuation and/or differentiation used for that file, to correlate the properties and their respective files.

Figure 127:
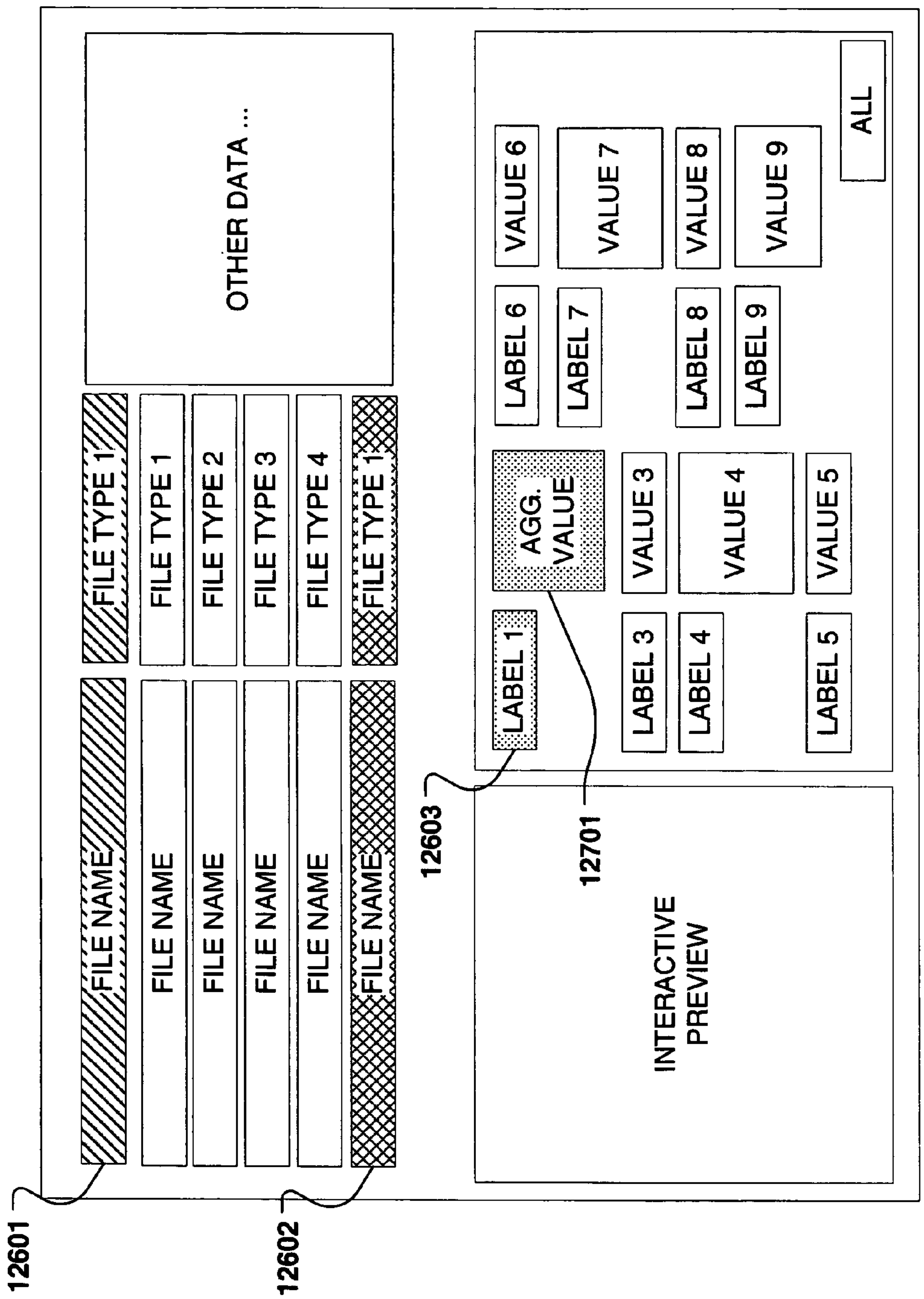
FIG. 127 depicts an example browser having multiple files selected, and an aggregated property field.

Many properties and/or metadata for multiple selected files may be aggregated and presented together as a compilation or sum. For example, if one displayed property is file size (e.g., how many kilobytes (kb) or megabytes (Mb) used), and multiple files are selected, the file size property may display an aggregated file size value, totaling the file sizes of the selected files (e.g., 4.3 Mb). As another example, if one displayed property has keywords, the keywords for multiple selected files may be aggregated together and presented as a single keyword property. Some aggregations may result in a larger property display, and may use the same appearance accentuation/differentiation described above to correlate aggregated properties with their corresponding files. Alternatively, the properties may be further differentiated from the selected files (e.g., a different color, font, highlighting, appearance, size, etc.) to indicate that the property is an aggregation of all selected files. FIG. 127 depicts an example in which an aggregated property value 12701 is displayed with a distinct appearance represented by shading, which is different from the patterns on the selected files 12601, 12602 individually. The shading may represent, for example, the color red, while the patterns on files 12601 and 12602 may be green and yellow.

Figure 128:
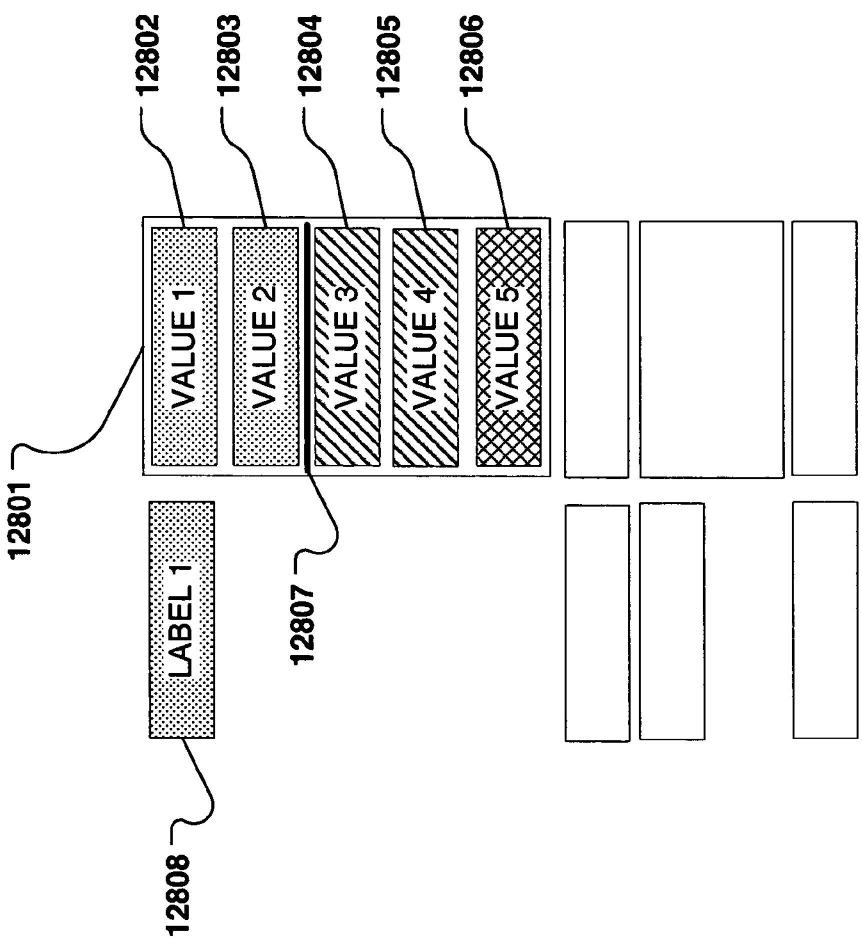
FIG. 128 depicts an example of an aggregated property field, with visual differentiation to correlate properties with one or more selected files.

The accentuation and/or differentiation of the aggregated values may, in some cases, be done in a manner to indicate the source of the values. For example, FIG. 128 depicts an enlarged properties/metadata display of the view shown in FIG. 127. Some aggregated properties, such as keywords, may result in a listing 12801 of multiple property values aggregated from the multiple selections. These aggregated properties may be given distinct appearances that indicate which values came from which selected file. In the FIG. 128 example, values 12802 and 12803 are shown in one form of shading to indicate that those particular values (e.g., keywords) are common to both selected files 12601 and 12602. That shading can reflect any of the types of differentiation and/or accentuation described above (e.g., the color red). Values 12804 and 12805 are shown with a first pattern to indicate that they are associated with one selected file 12601, which shares the same pattern (e.g., a file and its values are both blue) and value 12806 has a different pattern to indicate that it is associated with the other selected file 12602, which shares the same pattern (e.g., this file and its values are green). A separation line 12807 may be used to delineate values that were common to all selected files from those that were not. Of course, different appearances may be given different meanings when more files are selected. Label 12808 may also be visually differentiated and/or accentuated to indicate that it is an aggregated property. For example, label 12808 may also be in red.

Accentuation and/or differentiation can also begin with user selections of certain values in the aggregated values. For example, a user may select one of the values in the aggregated list, and cause a subsequent display to appear that indicates which files share the selected value. The indication could come in the form of a common appearance, where the selected value and its corresponding files are displayed in a common manner. For example, by clicking on value 12806, the system may automatically change the font of that property value to a boldfaced font, and may do the same to the file listing 12602 to identify the file whose property was selected.

Although the discussion above addresses properties and metadata displayed with the previews in a shell browser, these features may be used in other contexts as well. Any situation involving the display of multiple properties and/or metadata may benefit from the features described herein.

While some kinds of properties are easier to aggregate because they have numbers (e.g., file size is simply a total of the individual sizes), other types of properties may be more difficult to aggregate. For example, some properties have text words as values (e.g., keywords). Furthermore, some individual properties and/or metadata may have multiple values themselves, known as multi-value properties. For example, a given file's "keywords" property may have none, one, two, three, or any number of distinct keywords as values (e.g., one file may list "peanut", "food" and "candy" as keywords relating to the file). These multiple values may also be sequenced in a meaningful way for each file, such that the first value listed may be more important (e.g., an article that primarily deals with peanuts, might list "peanut" as the first keyword because it is most important, and may list "food" and "candy" second and third, in descending order of importance). When multiple files, each having multiple keywords, are selected, the process of aggregating those properties is not as simple as just adding numbers. When that occurs, the system may display a listing of the values that are in some form of ranked order based on the order in which they appeared for the individual selected files. Steps may be taken to help ensure that the resulting list of aggregated values corresponds to the relative importance of the values as they appeared for the various selected files. For example, five newspaper articles may have keywords identifying the cities that are discussed in the articles, and ranked in the following order:

File 1: Austin, Chicago, Boston, Detroit

File 2: Chicago, Detroit, Boston

File 3: Chicago, Boston

File 4: Detroit, Chicago

File 5: Boston, Austin

In this example, Chicago was given "first place" twice (e.g., Files 2 and 3 discuss Chicago a lot) and "second place" twice" (e.g., Files 1 and 4 don't focus on Chicago, but they do mention it). The resulting aggregation of these properties may remove redundancies, and may display the properties in a sequence that represents the relative importance of "Chicago" (and the other values) to the files, and also take into account the number of times a particular value appeared at all in the files' properties: "Chicago, Boston, Detroit, Austin." So with this example, the multiple selected files, as a whole, deal mostly with Chicago, and then with Boston, and then Detroit, and least with Austin.

Figure 129A:
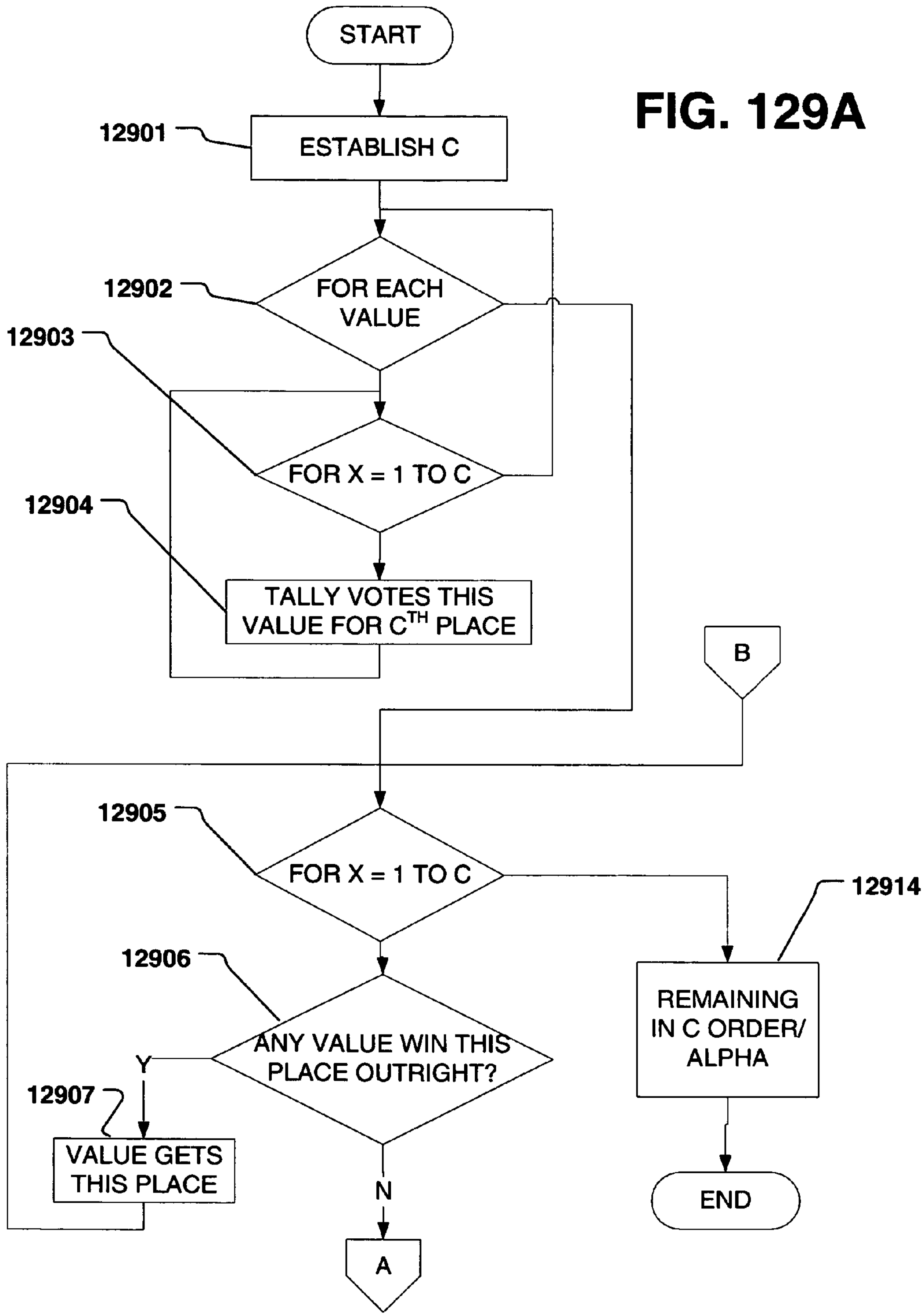
FIGS. 129A-B depict an example process by which several selected multi-value properties may have their values aggregated.
Figure 129B:
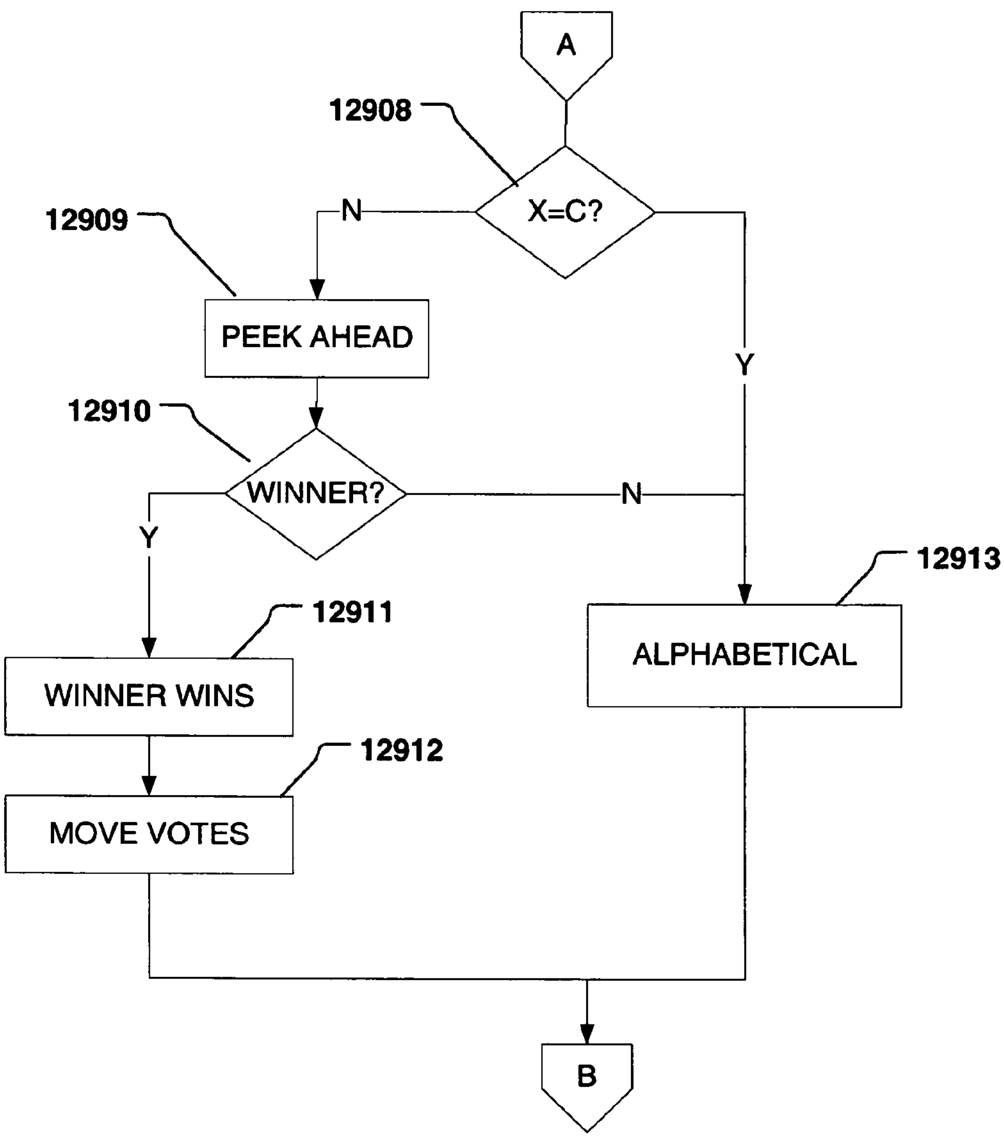

FIGS. 129A-B depict an example process for determining the order in which aggregated values for multiple-value properties may be displayed, and may be run whenever such an aggregated display is needed, and/or whenever a multi-value property is changed. The process is a modified form of the Single Transferable Vote algorithm. In this process, when a particular value is listed first in a file's properties, that is considered a "vote" for first place. If the value is listed second, that's a vote for second place, and so on, and so forth. The process produces a nonredundant ranking that is based on both the number of times each particular value appears in the selected files, and on the relative importance placed on the value by each of the selected files.

In step 12901, a global integer constant, C, is established either automatically (e.g., the computer system may detect the availability of system resources, and adjust the constant to avoid bogging down the system), or manually (e.g., the user may be given the option to set C as high or as low as they want, depending on how much detail they want in the aggregation of multi-value properties). This constant represents a number of places or rankings for which the process will be carried out, for example, C may be ten (10). A higher constant C will allow greater granularity in the ranking, but would require greater processing power and more time. This value may be dynamically established depending on user preference, system settings, available resources, system load, etc.

In step 12902, a loop begins for each value present among the selected files. In step 12903, a nested loop is executed for the first C places in the voting. In step 12904, for each place, the system tallies the number of votes that the current value received for that place. These two loops result in the system determining, for each value, how many "votes" it received for each of the first C "places." Then, in step 12905, another loop is begun to process each of the C places, beginning with the top place (first place) and proceeding on through the Cth place.

In step 12906, a check is made to determine whether any single value received the most votes for the place under consideration. If a value received the most votes for this place, that value is awarded this place, and the value is removed from the remainder of the calculations in the vote tabulation process, in step 12907. So in the above example, Chicago received the most votes for first place (two votes).

If, in step 12906, no single value had the most votes for this place, then there is a tie for the current place (either 2 or more values had the same number of votes for this place, or all values had zero votes for this place), and the process moves to step 12908 where a check is made to determine whether the current place being checked is the last place to be checked (Cth place). If it is not, the process moves to step 12909. In step 12909, the system "peeks" ahead one place, to identify the number of votes that the current tied values received for the next place. In step 12910, if one of the tied values had the most votes for the next place, then that value is given the present place in step 12911, and the votes for the current place held by the other tied values are moved, or transferred, to the next place. In other words, the "losers" at step 12911 have their votes for the current place added to their vote total for the next place, so that for every value that received votes in the place under consideration, but was not awarded that place, its votes in the current round are carried over and added to its votes in the next round when computing a winner for that round.

If, in step 12910, none of the tied values has the most votes for the next place, then all of the tied values are ranked in alphabetical order for the current place in step 12913 (and the next several places until the tied values are all given a place), and the process returns to step 12905. Similarly, if, in step 12908, the process happened to be examining the last place (place C) when the tie occurred, then the process also moves to step 12913 to rank the tied values alphabetically, and on to step 12905.

From step 12905, if the last place (Cth place) has been processed, then the process moves to step 12914, where all remaining votes for the remaining unranked values are treated as votes for Cth place, and the remaining values are ranked in order of whomever has the most votes for Cth place, with ties being broken using alphabetical order.

The algorithm shown in FIGS. 129A-B may keep a summary table in memory tabulating the various vote counts and values. The table may be advantageous, in that the system can incrementally load the table into operating RAM as the process runs, deleting portions from RAM that are not longer needed, and thereby reducing the amount of run-time memory required to run the process.

In some instances, the various multi-property values may undergo a normalization process. The normalization process may delete redundant appearances of values in a file's multi-property field. For example, a file may have keywords (Dog, Cat, Dog), and the normalization process may keep the first occurrence of the values, and remove subsequent occurrences of the same value (e.g., resulting in "Dog, Cat"). Un-normalized data may be stored in the system's memory, and the normalized version may overwrite that data, or the normalization data may simply be stored separately in the memory. In some instances, normalization may occur when the user modifies a multi-value property.

In some instances, a user may wish to edit the multi-value properties through interaction with the aggregated display. When that occurs, the system may revise the multi-value properties for each file in response to changes made to the aggregated multi-value properties display. For example, an addition of a new property to the end of the aggregated display may simply cause the new property to be appended to the multi-value property for each of the files. The same thing may occur if a new property is inserted in the beginning of the aggregated multi-value property display, or any other insertion. Some changes, such as reordering of the properties within the aggregated properties display, may cause a corresponding reordering of the multi-value properties for each of the files.

Figure 130:
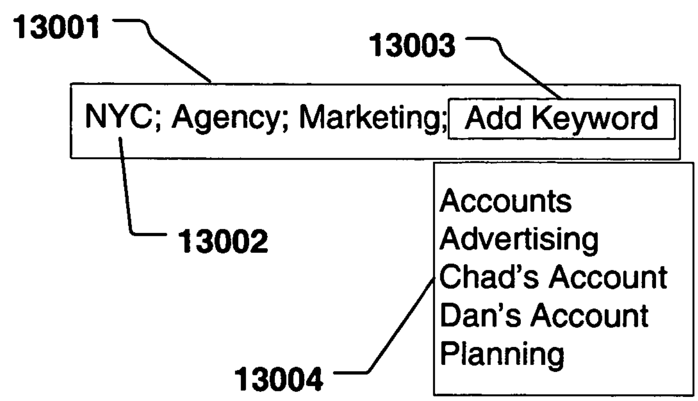

Multi-value properties may also have a unique approach to editing data. For example, fields for such properties may appear in a list, similar to that shown in FIG. 130. Field 13001 may be an active text edit box in which the user may type to enter data, and may have a number of values 13002, which may be delineated in the field by characters such as semicolons. Values 13002 may exhibit atomic behavior, or token behavior, such that the entire value may be selected as a single selection. Thus, in some instances, when an insertion point is placed in the field 13001 to edit data, an atomic value 13002 may behave as a single unit, as opposed to a plurality of characters (e.g., "NYC", as opposed to "N" "Y" "C"), and placing an insertion point within an atomic value might even be prohibited, such that an attempt to place an insertion point within the atomic value (e.g., by clicking a mouse within it) may result in an insertion point being placed before or after the atomic value. Pressing arrow keys to navigate around an atomic value may also move from one side of the value to the other side in a single keypress. Furthermore, when selection regions are possible, such regions may be prohibited from selecting only a part of an atomic value, such that selection of a predetermined portion (e.g., half) of the value results in a selection of the entire value. Hovering over an atomic value may cause the value to enter a hover state indicating that it is an atomic value. For example, the hover state may include a box or highlighting, or other visual differentiation or accentuation around the entire atomic value. With the atomic values, the values may also be rearranged by drag-and-drop operation.

The token behavior is not limited to simply selecting the entire word at once. The word may be replaced by alternative user interface elements. For example, a time could be replaced by a graphic image of a clock; a date could be replaced by an image of a calendar. The atomic values may exhibit icon behavior, such that clicking (or right-clicking) on them may cause additional levels of interactivity, such as bringing up command menus, option lists, other pop-ups, etc. Values can also be dragged onto other files and/or properties, and those values may be added to the other files and/or properties.

At the end of the field's list, there may be a prompt string 13003 reminding the user of what data the field contains. In some instances, the prompt string 13003 may appear only when the field 13001 is in an edit state, such as when it is given a keyboard focus for the entry of data, and the prompt string 13003 is not treated as an actual value in the multi-value field (e.g., it is not saved to memory as a value in the field, but is rather generated as part of the user interface).

The prompt string 13003 may have be visually differentiated and/or accentuated using any of the types previously discussed (e.g., it may have a highlighting of a certain color in the area around the letters), and may exhibit some types of default behavior. For example, the prompt string 13003 may automatically appear whenever the field 13001 is in an edit state and an insertion point is at the end of the string of values. Once the user starts typing to insert a new value at the insertion point (e.g., by starting to type in a textbox), and new characters are added, the prompt string 13003 may automatically disappear. The prompt string may reappear automatically should the user complete, or abort, entry of the new value.

Figure 131:
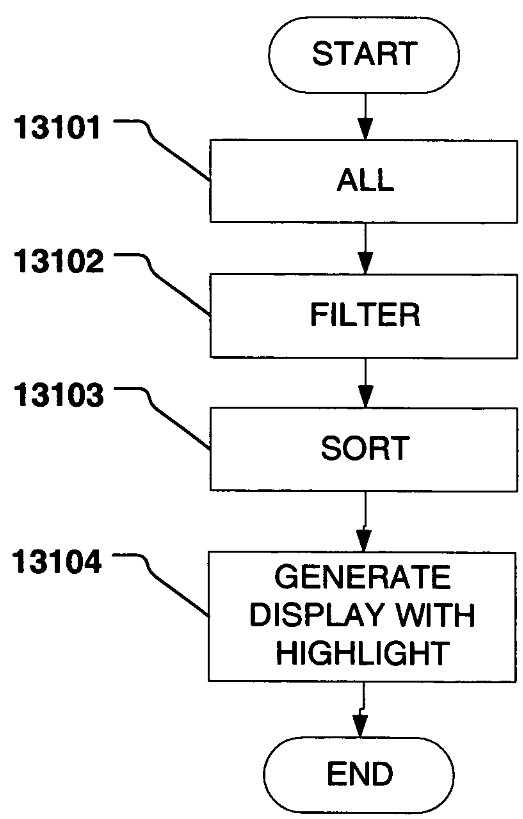

In the edit state, the field may also display a dropdown menu 13004 providing the user with a list of potential values to add to the multi-value field 13001, and the user can select an entry from the menu. The dropdown menu 13004 may include an autosuggest feature, which may be implemented according to the process shown in FIG. 131. First, the process may begin in step 13101 by collecting all values already in use for the given property and/or used by the given user. In step 13102, the menu 13004 can omit values that are already present in the multi-value property for the selected file(s), since the user is unlikely to want to add a duplicate. In step 13103, the list may be sorted by popularity, alphabetically, or by any other desired method. Then, in step 13104, the menu may be displayed with the autosuggest. If some of the listed values are already present for some, but not all, of the selected files, those values may be given a different appearance (e.g., highlighting, coloring, pattern, font, etc. as discussed above) to indicate that fact. Values that are not used in any of the selected files may also be given a different appearance to indicate that fact.

The field may also have an autocomplete feature, as shown in FIG. 132. With the autocomplete feature, when a user begins to type a new value to add to the multi-value property (such as by typing the "D" in the FIG. 132 example), the system may automatically attempt to complete the entry with an anticipated value. The autocomplete feature may be implemented using the process shown in FIG. 133. The anticipated value may be selected by first taking all of the values in use for the given property in step 13301, and filtering out the ones that already apply to the selected file(s) in step 13302. A further filtering may occur in step 13303 to identify the values that begin with the letters that have already been entered by the user, and selecting the first (alphabetically) value that starts with the letter(s) that the user has already typed. In step 13304, the remaining possibilities may be sorted by popularity, alphabetically, or by any other desired method, and in step 13304 the remaining list may be displayed. The first entry in the list may be selected by default, and may be highlighted and the remaining characters may automatically be placed in the field following the user's entered data, with additional highlighting if desired.

The autosuggest and autocomplete features described above may include other types of filtering steps as well. For example, filters may select the most recent values that were selected and/or entered by the user; or filter the possible values based on the context that created the listing of properties. For example, if the selected files were selected for display as part of a project view (e.g., displaying files that relate to a given project), the system may automatically determine that certain possible values are more (or less) likely to be used in that project, and may filter the list accordingly.

When the user is entering data in the field, a check may be made to validate the entry. For example, certain fields may be predetermined to only have a specified range or list of possible values (e.g., day of week), and if the user attempts to enter an invalid entry in the multi-property field, the system may simply reject the entry, providing the user with a message indicating that the entry was invalid.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

Dynamic Scrolling: Various aspects of the present invention may be used to enhance navigation through a conventional folder tree control (e.g., a navigation pane, navigation panel, page space control, or the like) or navigation of other data. The traditional folder tree control 13600 in FIG. 136 allows a user to view, organize, and retrieve data. Typically a vertical scroll bar 13602 and horizontal scroll bar 13604 accompany the folder tree control as one mechanism to permit user navigation through the folder tree structure. As a user navigates vertically through the hierarchy of the folder tree structure, the relevant node may no longer be fully visible in the narrow viewable window pane. For example, in FIG. 136, in response to a user repeatedly pressing the "down arrow" key when the node 13606 labeled "Installer" in FIG. 136 initially has focus, the non-visible, or obscured, nodes 13608 below the "Installer" node each, in turn, become highlighted and receive focus. These nodes, however, are not entirely visible in the narrow window pane. The user must subsequently horizontally scroll the narrow viewable window pane to the right to make those nodes 13608** fully visible.

Figure 137:
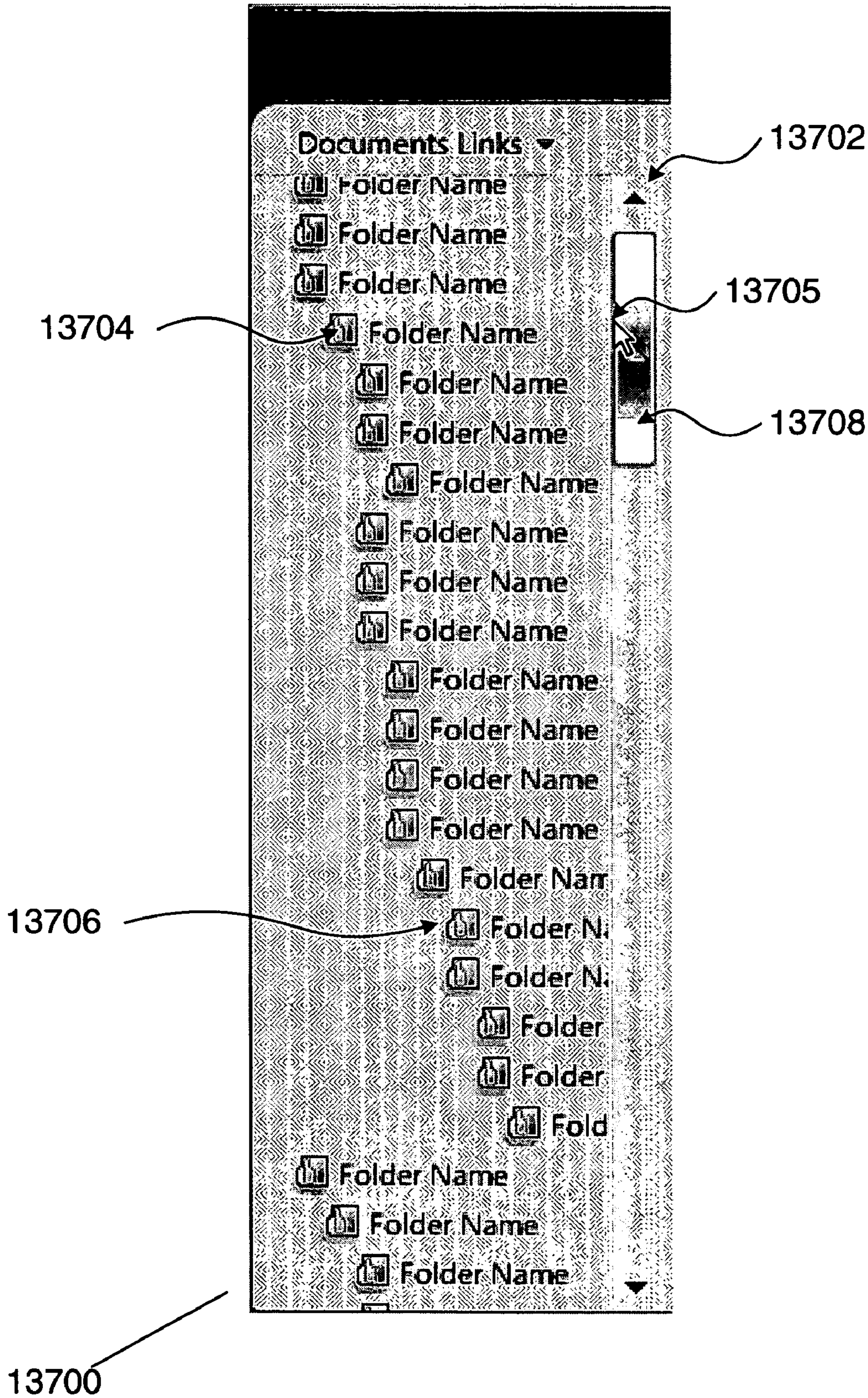

In FIG. 137, a folder tree in accordance with various aspects of the present invention is displayed. One skilled in the art will appreciate that FIG. 137 is merely one example of a folder tree in accordance with various aspects of the present invention. Aspects of the present invention may be implemented with a variety of tree controls or other data navigation. In one example, a folder tree may be a hierarchically tree-shaped set of user interface controls that expose branches of the tree in hierarchical levels as navigated by the user. The user of a folder tree control may click on a node exposed by the tree control to expand the node in place; the node can be collapsed if it is already expanded. A small widget, such as one displaying '+' or '−', may be used to indicate whether a node is collapsed or expanded, as is known in the art. The expansion of a node shows the nested nodes hierarchically under the currently selected node. The user may expand/collapse a node by, for example, clicking on a button, clicking on the node, or clicking on the displayed widget.

A folder tree control enables a user to navigate across hierarchically arranged data, as is known in the art. In FIG. 137, a vertical scroll bar 13702 accompanies the folder tree control as one mechanism to permit user navigation through the folder tree structure. For example, in FIG. 137, in response to a user dragging the floating vertical scroll bar control 13708 towards the bottom of the window pane, the folder tree control scrolls the visible content up, thereby displaying previously undisplayed nodes from below the window 13700.

According to an illustrative aspect of the invention, when a user navigates along one dimension (e.g., vertically), the folder tree control may automatically scroll in another dimension (e.g., horizontally) to ensure that a node relevant to the user is within the visible area of the window 13700. The relevant node may be a current node, a node having input focus, or an otherwise selected node. The relevant node may be a node in the tree structure, for example, that is horizontally alongside the mouse pointer's position. When the user scrolls, expands, or collapses any node of the folder tree control, thereby causing the relevant node to no longer to be fully and/or partially visible, the folder tree control may automatically horizontally scroll the folder tree such that the relevant node is visible within the window 13700.

Those of skill in the art will appreciate that, while the present illustrative embodiment performs automatic horizontal scrolling, other embodiments may automatically scroll vertically in response to horizontal scrolling by a user, e.g., where the user is navigating other types of data which lend themselves to horizontal arrangement rather than vertical. For example, various aspects of the invention may be implemented in a system where a substantial percentage of user input indicative of navigation is in the horizontal dimension. In that case, one skilled in the art may implement various aspects of the invention such that there is automatic dynamic vertical scrolling.

For example, at the instance of FIG. 137, when the mouse pointer is at location 13705 to the immediate right of the then relevant node 13704, the displayed tree need not be scrolled horizontally because the folder name of node 13704 is fully visible. However, when the user drags the floating vertical scroll bar control 13708 using the mouse pointer 13705 such that the mouse pointer 13705 is at location horizontally alongside the node 13706, then the displayed tree view may be automatically scrolled horizontally, as further described below. In this example, the mouse pointer 13705 is in horizontal proximity to node 13706. Further in this example, the displayed tree view is scrolled horizontally to the right, resulting in the tree moving to the left, by a predetermined distance such that the folder name is fully visible, or as fully visible as possible given the width of the predetermined viewable area 13700. If the folder name is truncated for any reason, then the predetermined distance may be such that that the dynamic horizontal scrolling results in the entire truncated folder name being fully visible.

One skilled in the art, after being provided with the teachings disclosed herein, will appreciate that the predetermined distance for automatically scrolling a navigational control (e.g., a folder tree control) may vary among embodiments of the invention. In one example, the predetermined distance for automatically scrolling is equal to the distance necessary to align a relevant node 13706 with a right edge of the predetermined viewable area 13700. In a second example, a relevant node is wider than the predetermined viewable area 13700, and the predetermined distance for automatically scrolling may equal the distance necessary to align a relevant node 13706 with a left edge of the predetermined viewable area 13700. In a third example, the predetermined distance for automatically scrolling may equal the distance necessary to align a relevant node 13706 in the center of the predetermined viewable area 13700. These examples are merely illustrative of an appropriate predetermined distance to be used for approximately aligning the relevant node 13706 in the predetermined viewable area 13700, and they should not be narrowly construed to limit the scope of the claims.

In accordance with various aspects of the invention, the dynamic horizontal scrolling discussed may be delayed by an appropriate time period. For example, the horizontal scrolling may be set to occur immediately, or may be set to occur 100 ms after a user first positions the mouse pointer alongside a relevant node. At least one benefit of implementing a time delay is to create or provide the appearance of smooth movement. One skilled in the art will appreciate that the amount of time delay set may be varied as appropriate.

Figure 138A:
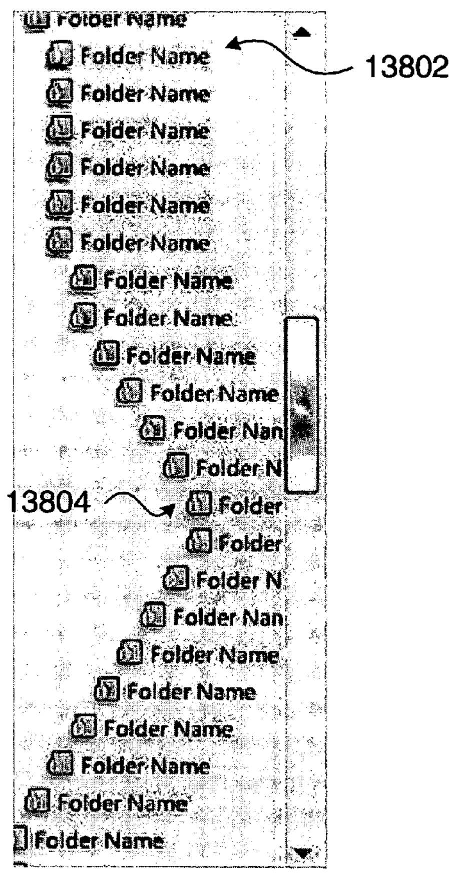
Figure 138B:
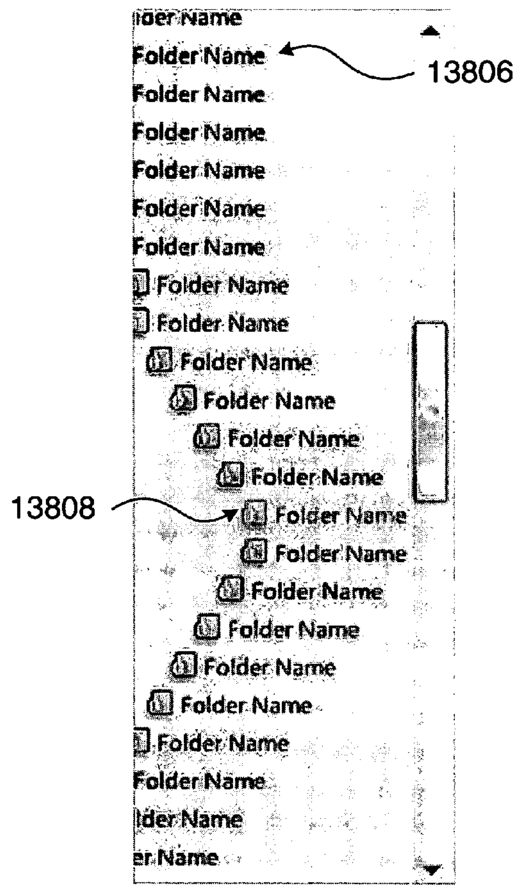

FIGS. 138A and 138B illustrate screenshots of an illustrative user interface for viewing and organizing stored data in accordance with various aspects of the invention. One skilled in the art will appreciate that similar navigational control interfaces are available for documents, messages, video files, and contacts, with the navigational control interface in each case being specifically adapted for the kind of data item that is presented. Such content-oriented interfaces may be provided with an operating system product as a component of the user interface, or shell.

In FIG. 138A, a node 13802 currently has focus responsive to user input. By way of just one example, such user input may include a user moving a mouse pointer near or over the node 13802. Upon receiving focus on the relevant node (node 13802), the tree control determines whether horizontal scrolling is appropriate. In this case, the folder name (i.e., descriptor) is entirely visible. Therefore, automatic horizontal scrolling is not performed. However, when the user moves the mouse pointer near or over node 13804, then node 13804 receives focus. FIG. 138B illustrates just such a folder tree control in accordance with various aspects of the invention. The then relevant node 13808 currently has focus in FIG. 138B. Node 13808 is the same data item as Node 13804, however, Node 13808 has focus in FIG. 138B while Node 13804 did not have focus in FIG. 138A. Furthermore, in FIG. 138B the folder tree has automatically dynamically scrolled horizontally to the right by a predetermined distance to make the entire name of Node 13808 visible. In this case, the node name is "Folder Name" and is not truncated. The predetermined distance that the folder tree control is horizontally scrolled may be determined by calculating the amount of distance required to approximately align the end of the node name at or near the edge of the internal window pane. Meanwhile, the previously-focused node 13806 is no longer highlighted and may not be fully visible.

The view of the navigational control is dynamically scrolled horizontally by an appropriate distance after it is determined that scrolling (e.g., horizontal scrolling) is desired. One skilled in the art will appreciate that at least one advantage of the instant invention is that it does not require the display of a horizontal scroll bar, thereby resulting in additional viewable area on a limited display screen for displaying data of the folder tree. Although a horizontal scroll bar is not required, the instant invention does not preclude a horizontal scroll bar from being included and/or used. For example, it is conceivable that a horizontal scroll bar could be beneficial to a user to visually indicate the current horizontal position of the displayed view in relation to the folder tree.

Figure 139:
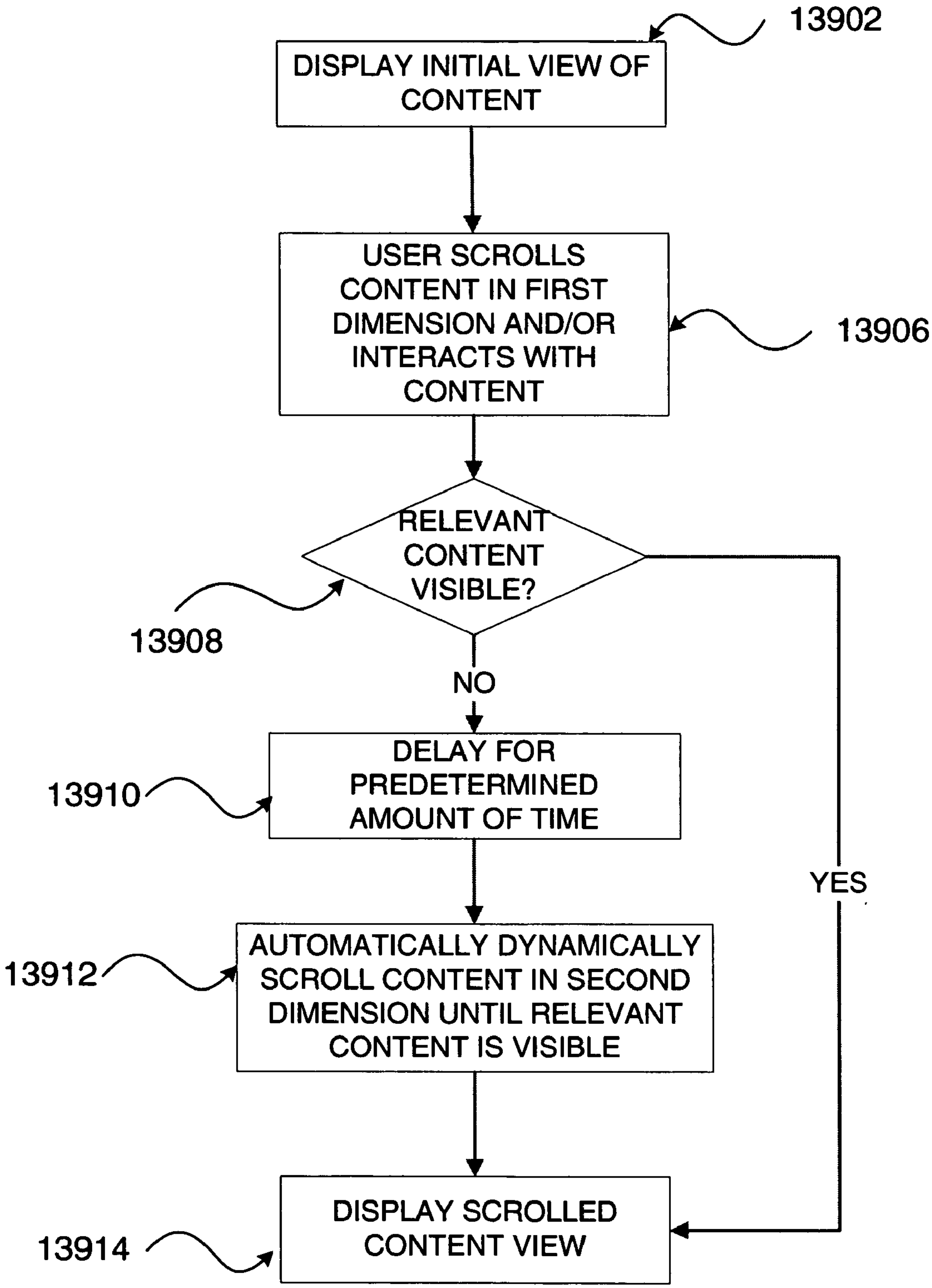

In accordance with various aspects of the invention, FIG. 139 illustrates a flowchart describing a computer-implemented method for automatically dynamically scrolling content in one dimension responsive to user-controlled scrolling or navigation of the content in another dimension. Those skilled in the art will appreciate that the steps illustrated in FIG. 139 may be performed in other than the recited order, and that one or more steps illustrated in FIG. 139 may be optional.

Figure 136:
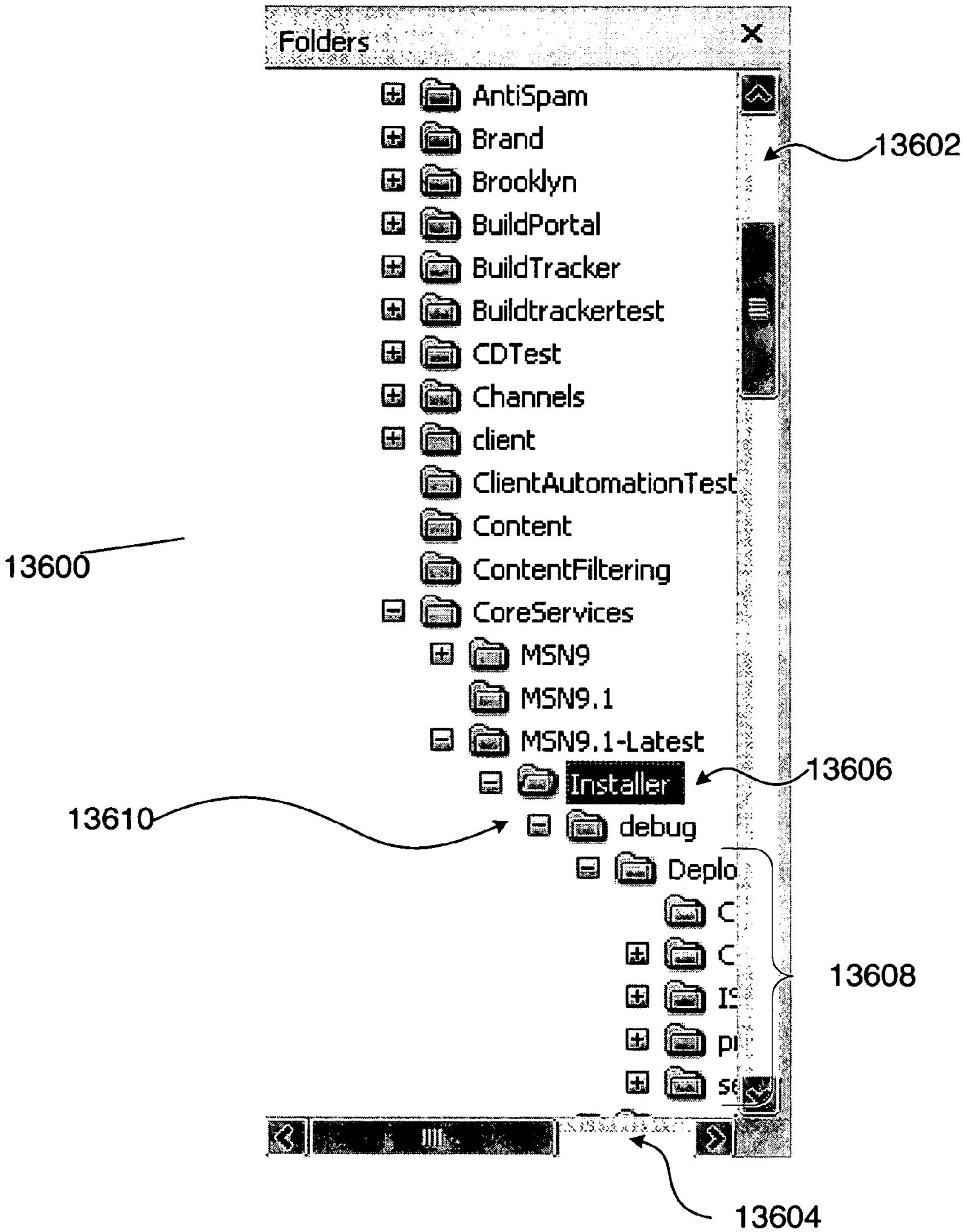

In step 13902, a user is presented with an initial view of content. The content may be displayed in the form of a hierarchical folder tree control with multiple levels of nodes. FIG. 138A is just one example of a first view of a hierarchical folder tree. FIG. 136 is yet another example of a first view of a hierarchical folder tree.

In step 13906, the user scrolls content in a first dimension and/or interacts with the content. These acts are just some examples of user inputs indicative of navigation of the content. Various user inputs scroll the relevant content by moving its position in the predetermined viewable area. For example, a form of user navigation that results in vertical scrolling of content is when a user drags a floating vertical scroll bar control 13606 towards the top or bottom of a window pane 13600 containing a folder tree control. Meanwhile, various non-scrolling user inputs interact with the relevant content by updating the designation of which content is relevant to the user. An example is when a user presses the "up arrow," "down arrow," "page up," or "page down" button on an input device 115 while the folder tree control window is active. Moreover, an example of a non-scrolling user input may be illustrated in FIG. 138A. If a user presented with the view of content illustrated in FIG. 138A moves a mouse pointer over or near node 13808, then node 13808 receives focus. In this example, the user interacts with the content, rather than scrolling the content in a first dimension. In another example the user may be both interacting with the content and scrolling the content in a first dimension simultaneously. In yet another example, with respect to FIG. 136, a user may interact with a folder tree by pressing an expand widget, resulting in sub-nodes 13608 of the node 13610 to which the widget corresponds being only partially displayed in the viewable area of the folder tree control.

In step 13908, if the relevant content is fully visible, then no automatic scrolling may be necessary. If the relevant content is not fully visible (or is at least partially obscured) in the predetermined viewable area, then the relevant content may be scrolled in a second dimension to a state where the relevant content has increased visibility. By way of just one example, the relevant content in FIG. 138A is node 13802, which has focus in that illustration. After a user interacts with the content displayed in FIG. 138A (e.g., in step 13906) by moving a mouse pointer over or near node 13804, then node 13804 will receive focus and become the relevant content. Since node 13804 is at least partially non-visible (obscured) in the predetermined viewable area, the relevant content may be automatically scrolled in a horizontal dimension, as further described below. In another example, with respect to FIG. 136, if a user selected an expand widget corresponding to node 13610 causing sub-nodes 13608 to be only partially displayed in the viewable area, then the relevant content may comprise both the node 13610 and its sub-nodes 13608.

In step 13910, the performance of step 13912 is delayed for a predetermined amount of time. In various embodiments of the invention, the amount of the predetermined time period of delay can be zero or any other value greater than zero. For example, in FIG. 138A, a predetermined time period of delay of 100 ms may elapse before the folder tree control is dynamically scrolled horizontally by a predetermined distance, resulting in the view illustrated in FIG. 138B. One skilled in the art will appreciate that the amount of time delay set may vary as appropriate.

In step 13912, the content is automatically dynamically scrolled in a second dimension for a predetermined distance. For example, in the case of the folder tree control in FIG. 137, if the relevant node 13706 is found to be not entirely visible, then the folder tree control may be horizontally scrolled by a predetermined distance such that the end of the node descriptor (e.g., folder name) is approximately aligned with the right edge of the predetermined viewable area. One of skill in the art will recognize that in various instances it may be desirable to approximately align the relevant node with the left edge of the predetermined viewable area or to approximately align the relevant node at or near the center of the predetermined viewable area. In each of these cases, the node shall be construed to be approximately aligned with a predetermined edge of the viewable area. The predetermined distance in each instance may also vary accordingly. For example, with respect to FIG. 136, in response to a user selecting the expand widget corresponding to node 13610, the relevant content may be approximately aligned with the left edge of the predetermined viewable area such that sub-nodes 13608 are provided with increase visibility.

Furthermore, one should recognize that the use of the modifier, "second," should not be construed to mean that a first dimension is necessary or required. For example, if in step 13906 a user interacts with the content displayed in FIG. 138A by moving the mouse pointer so that it changes focus from node 13802 to node 13804, then in step 13912, the content may be automatically dynamically scrolled in a horizontal dimension. In that case, even though there was no initial scrolling in the vertical dimension, the "second dimension" would be the horizontal dimension.

Finally, in step 13914, the user is provided with an updated view of the content in the predetermined viewable area. For example, FIG. 138B is a scrolled content view of a folder tree resulting after step 13914. The updated view provides a user with increased visibility of relevant content (node 13808) in the narrow viewable area in FIG. 138B.

**Common File Dialog: Various aspects of the invention may communicate with other programs, systems, modules, or the like via one or more programming interfaces. A programming interface (or more simply, interface) may be viewed as any mechanism, process or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, regardless of whether the code segments are provided as source, intermediate, or object code, regardless of whether the code segments are utilized in a runtime system or process, regardless of whether they are located on the same or different machines or distributed across multiple machines, and regardless of whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface are encompassed within the definition of programming interface.

Figure 145A:
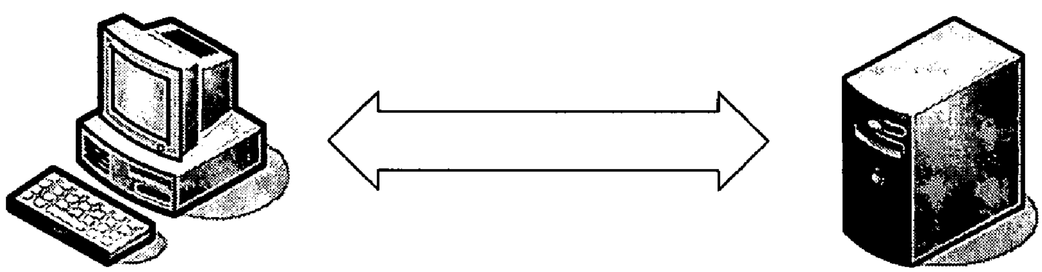
Figure 145B:
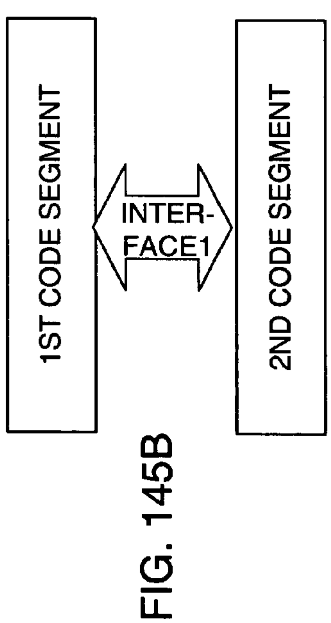
Figure 145C:
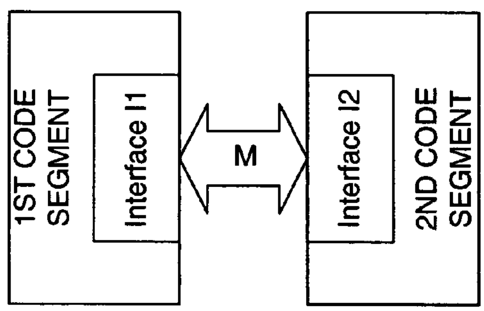

A programming interface may be viewed generically as shown in FIG. 145A, FIG. 145B or FIG. 145C. FIG. 145A illustrates an interface between two computers. FIG. 145B illustrates an interface Interface1 as a conduit through which first and second code segments communicate. FIG. 145C illustrates an interface as comprising interface objects I1 and I2 (which may or may not be part of the first and second code segments), which enable first and second code segments of a system to communicate via medium M. In the view of FIG. 145C, one may consider interface objects I1 and I2 as separate interfaces of the same system and one may also consider that objects I1 and I2 plus medium M comprise the interface. Although FIGS. 145A, 145B and 145C show bi-directional flow and interfaces on each side of the flow, certain implementations may only have information flow in one direction and/or may only have an interface object on one side.

Aspects of a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this description should be considered illustrative and non-limiting.

The concept of a programming interface is known to those skilled in the art. There are various other ways to implement a programming interface. Such other ways may appear to be more sophisticated or complex than the simplistic view of FIGS. 145B and 145C, but they nonetheless perform a similar function to accomplish the same overall result. Some illustrative alternative implementations of a programming interface are described in connection with FIGS. 145D-145M.

Figure 145D:
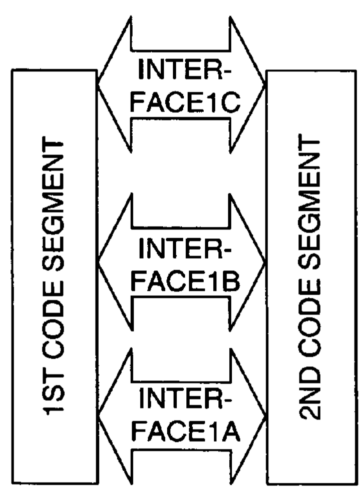
Figure 145E:
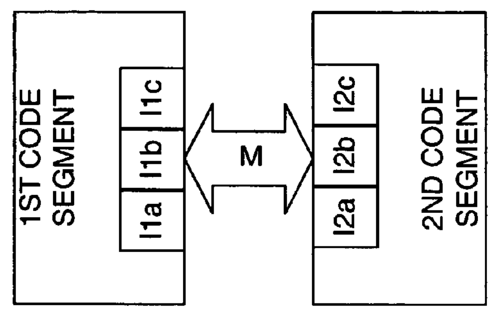

Factoring. A communication from one code segment to another may be accomplished indirectly by breaking the communication into multiple discrete communications. This is depicted schematically in FIGS. 145D and 145E. As shown, some interfaces can be described in terms of divisible sets of functionality. Thus, the interface functionality of FIGS. 145B and 145C may be factored to achieve the same result, just as one may mathematically provide 24, or 2 times 2 times 3 times 2. Accordingly, as illustrated in FIG. 145D, the function provided by interface Interface1 may be subdivided to convert the communications of the interface into multiple interfaces Interface1A, Interface1B, Interface1C, etc. while achieving the same result. As illustrated in FIG. 145E, the function provided by interface I1 may be subdivided into multiple interfaces I1*a*, I1*b*, I1*c*, etc. while achieving the same result. Similarly, interface I2 of the second code segment which receives information from the first code segment may be factored into multiple interfaces I2*a*, I2*b*, I2*c*, etc. When factoring, the number of interfaces included with the 1st code segment need not match the number of interfaces included with the 2nd code segment. In either of the cases of FIGS. 145D and 145E, the functional spirit of interfaces Interface1 and I1 remain the same as with FIGS. 145B and 145C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 145F:
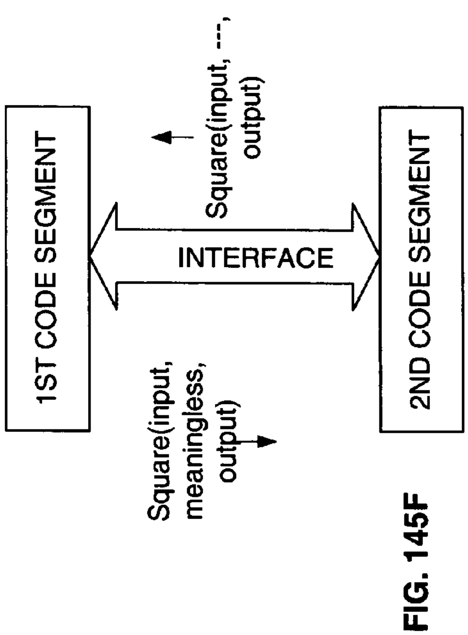
Figure 145G:
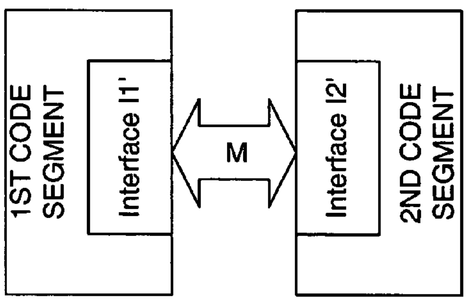

Redefinition. In some cases, it may be possible to ignore, add or redefine certain aspects (e.g., parameters) of a programming interface while still accomplishing the intended result. This is illustrated in FIGS. 145F and 145G. For example, assume interface Interface1 of FIG. 145B includes a function call Square (input, precision, output), a call that includes three parameters ("input," "precision" and "output") and which is issued from the 1st Code Segment to the 2nd Code Segment. If the middle parameter ("precision") is of no concern in a given scenario, and as shown in FIG. 145F, it could be ignored or replaced with another parameter. In either event, the functionality of Square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 145G, interface I1 is replaced by interface I1', redefined to ignore or add parameters to the interface. Interface I2 may similarly be redefined (as interface I2') to ignore unnecessary parameters, or parameters that may be processed elsewhere. As is clear from the foregoing, a programming interface may in some cases include aspects such as parameters which are not needed for some purpose, and which may be ignored, redefined, or passed on for processing elsewhere for other purposes.

Figure 145H:
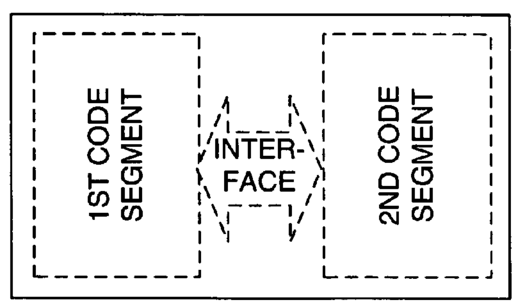
Figure 145I:
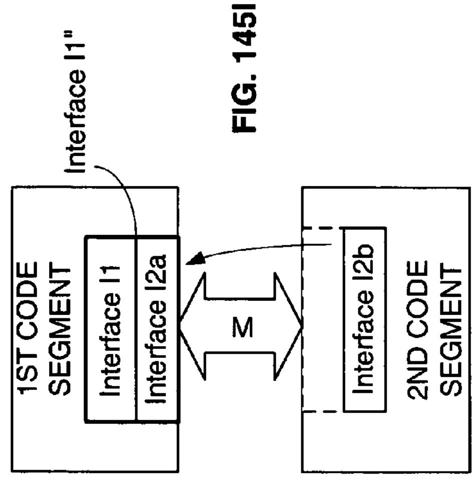

Inline Coding. It may also be feasible to merge some or all of the functionality of two separate code modules such that the "interface" between them changes form. For example, the functionality of FIGS. 145B and 145C may be converted to the functionality of FIGS. 145H and 145I, respectively. In FIG. 145H, the previous 1st and 2nd Code Segments of FIG. 145B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 145I, part (or all) of interface I2 from FIG. 145C may be written inline into interface I1 to form interface I1". As illustrated, interface I2 is divided into I2*a* and I2*b*, and interface portion I2*a* has been coded in-line with interface I1 to form interface I1".

Divorce. A communication from one code segment to another may be accomplished indirectly by breaking the communication into multiple discrete communications. This is depicted schematically in FIGS. 145J and 145K. As shown in FIG. 145J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1 st Code Segment, and so an intermediary is used to make the old and new interfaces compatible. Similarly, as shown in FIG. 145K, a third code segment can be introduced with divorce interface DI1 to receive the communications from interface I1 and with divorce interface DI2 to transmit the interface functionality to, for example, interfaces I2*a* and I2*b*, redesigned to work with DI2, but to provide the same functional result. Similarly, DI1 and DI2 may work together to translate the functionality of interfaces I1 and I2 of FIG. 145C to a new operating system, while providing the same or similar functional result.

Figure 145L:
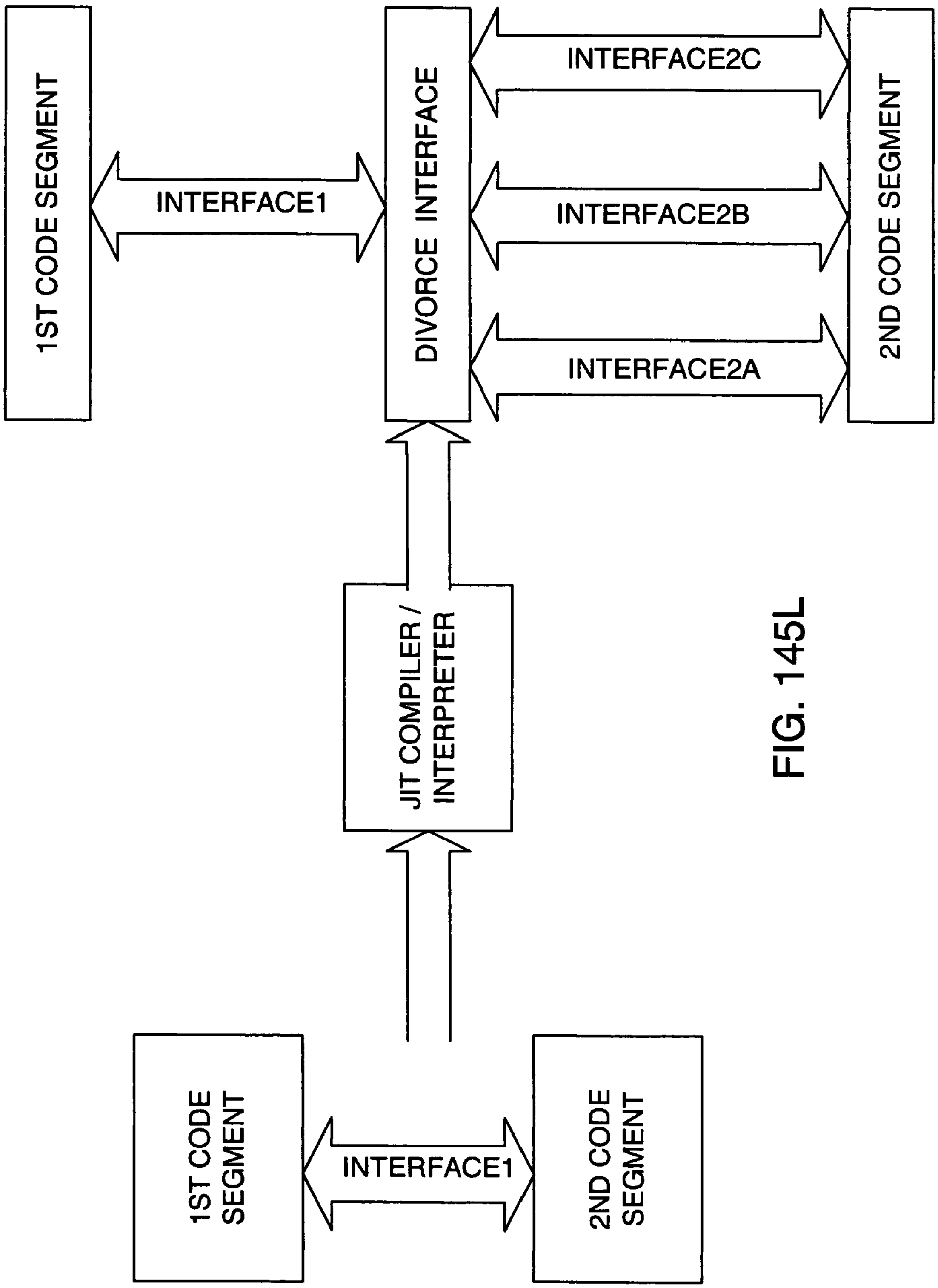
Figure 145M:
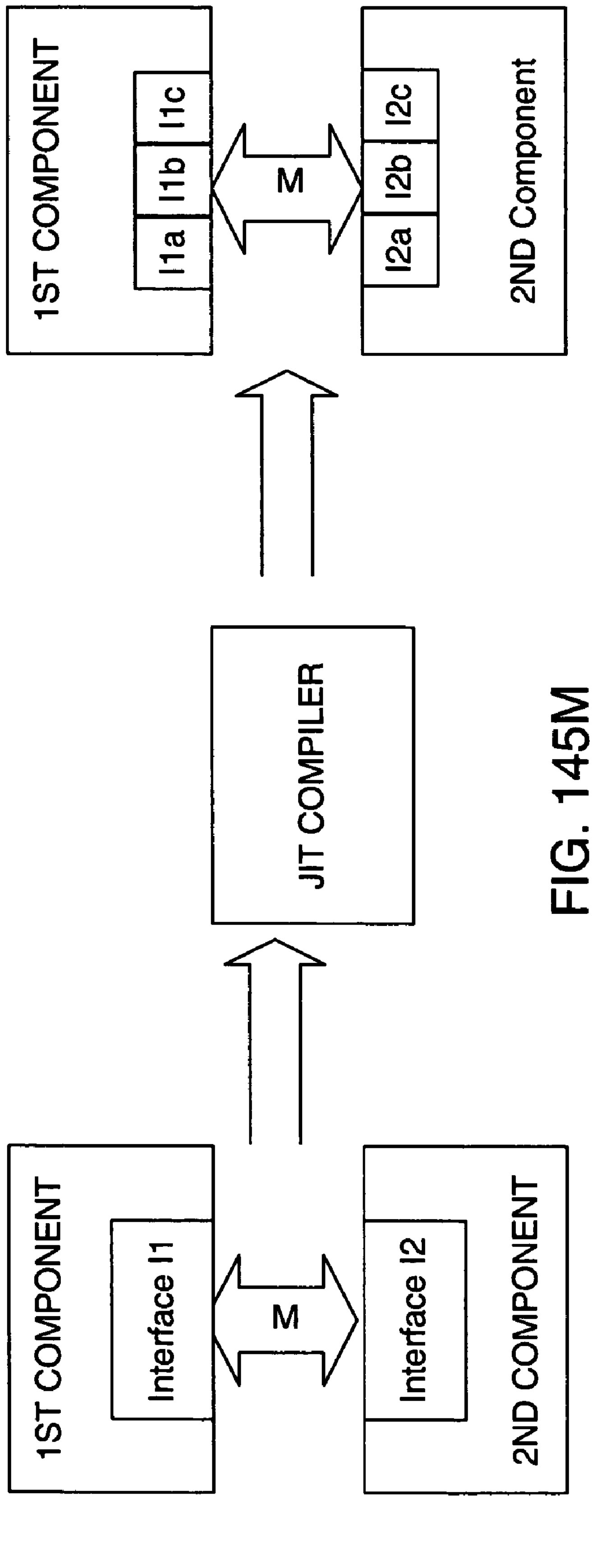

Rewriting. Yet another possible variant is to dynamically rewrite code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 145L and 145M. As can be seen in FIG. 145L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 145M, this approach of dynamically rewriting the interface(s) may be applied to dynamically factor or otherwise alter the interface(s), as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 145B and 145C. It is also noted that, as with most programming constructs, there are other similar ways of achieving the same or similar functionality of an interface which may not be described herein, but nonetheless are represented by the spirit and scope of the invention.

A "file dialog" may refer to a dialog created for the purpose of opening, saving or otherwise indicating a file is to be processed and/or how a file is to be processed. Although embodiments of the invention will be described by reference to examples of dialogs for opening and for saving files, the invention is not limited in this regard. Other examples of file dialogs include dialogs for inserting file attachments, for importing files, etc. As used herein, the word "file" is given a broad meaning and generally refers to a collection of information accessible by a computer. A file may include text, programming instructions and/or various other types of data. A file may be identified to a user as document, a photograph, or some other type of item for which the file contains data. A file may also be fragmented or otherwise stored in one or more physical locations on a disk or other storage medium.

The invention is not limited to files stored in conventional hierarchical file tree structures. In at least some embodiments, files may have multiple metadata attributes (alternatively referred to as "properties") as described above. Using values for those attributes, files may then be grouped into collections of interest to a user. By way of illustration, files on one computer may have metadata attributes such as file author, a customer to which the file pertains, and file type. User A then creates spreadsheet, word processing and slide show presentation files regarding customers X, Y and Z and stores all of those files in a directory subfolder "C:\Users\User_A\". User B creates spreadsheet, word processing and jpeg image files for those same customers. User B stores spreadsheet and word processing files in "C:\Users\User_B\", but stores image files in "C:\Media\Photos\". All of these files are then accessible based on lists. For example, a "Client X" list groups all spreadsheet, word processing, slide show and jpeg files for client X, regardless of author. By specifying the Client X list, the user is able to see a grouping of those files without having to separately navigate through multiple subdirectories. These "author," "customer" and "file type" metadata attributes are provided for purposes of illustration. Other examples include properties such as rating, comments, project, etc. A very large number of metadata attribute types can be implemented, and the invention is not limited by type of metadata attribute.

Shown in FIG. 146 is an "Open File" dialog 14600 according to at least some embodiments of the invention. Although the example dialogs in the drawings are shown as independent windows in a graphical user interface (GUI) generated by an OS (such as various versions of the WINDOWS OS), the invention is not limited in this regard. For example, a file dialog according to the invention might also be generated as a pane of (or frame within) a pre-existing window. Open File dialog 14600 is contained in a frame 14601 of a dialog window and has a title 14602. Controls 14603 respectively permit a user to minimize, maximize or close dialog 14600. Arrow 14604 is a "back" control which a user can select to return to file groupings which the user has previously viewed. Adjacent to title 14602 are a navigation bar 14605 and a search bar 14606, both of which are described below.

Open File dialog 14600 is divided into four regions 14607-14610. Browser region 14607 includes a places bar subregion 14611 and a pagespace subregion 14612. Entries in places bar 14611 correspond to lists, directory locations or other groupings of files, and represent "places" to which a user may navigate to locate files. Selecting one of the entries in places bar 14611 causes a corresponding display in pagespace region 14612. In some cases, that display may be a collection of icons corresponding to files in the selected place (e.g., the selected list or other grouping). In some cases, and similar to the WINDOWS EXPLORER component of the WINDOWS XP OS, selecting a particular places bar entry may display a collection of file icons together with icons for one or more folders, directories or other locations to which a user might navigate. One or more entries in places bar 14611 may be expandable to show sublists or other subgroupings of documents. For example, the "People" entry in FIG. 146 could be expandable to reveal lists of files pertaining to (i.e., having the appropriate metadata attribute values corresponding to) different individuals.

In the example of FIG. 146, the user has selected the places bar entry corresponding to a "Recent Photos" list, and is thus presented in pagespace 14612 with a collection of thumbnail images corresponding to files in that list. The user can then sort those files based on property values for file name, file size, location, event, or date of file creation by selecting "Name," "Size," "Location," "Event" or "Date" at the top of pagespace 14612. The categories by which files in pagespace 14612 can be sorted may change based on the selected entry on place bar 14611. Similarly, the manner in which files are shown in pagespace 14612 can vary based on file type. A text file may be represented as a thumbnail image of the first page of the document saved in that file. In some cases, a file might be represented by an icon corresponding to the application program which created the file (or with which the file is otherwise associated). A scroll bar 14613 allows the user to see additional files.

After selecting one of the files displayed in pagespace 14612, more detailed information for that file is provided in infopane region 14608. Displayed in infopane region 14608 is a larger preview (or "ghost") 14614 of the selected file, together with values 14615 for various metadata attributes. Although the example of FIG. 146 shows selection of an image file, the invention is not limited in this regard. For example, one or more of the files displayed in pagespace 14612 might be a text file. Upon selection of such a file, an image of the first page of that text file would be shown as ghost 14614. Of course, the properties and values shown in infopane region 14608 for a selected file can vary. Using the earlier example of User A and User B, selection of a file in a "Client X" list could show values for author and client in infopane region 14608.

Returning to navigation bar 14605, the user is provided with information indicating the "trail" which the user followed to reach the current pagespace display. In the example of FIG. 146, the user first navigated to a "Photos & Videos" list, and then to a "Recent Photos" sublist. The user can then use search bar 14606 to locate files, within the current pagespace, based on title or keyword values.

Below browser region 14607 and infopane region 14608 is an extensibility region 14609. As explained in more detail below, an extensibility region of a file dialog may contain any of a wide variety of user interface (UI) controls which may be specified by the developer of the software program which instantiates the dialog 14600. As used herein, a "UI control" includes various types of graphical elements which a user can select (by, e.g., hovering a cursor over the control and pressing a mouse button) so as to interact with the application (or other computer program) that instantiated the dialog. UI controls include, but are not limited to, push (or "command") buttons, "radio" buttons, check boxes, text input (or "edit") boxes, etc. UI controls also include graphical elements which only provide information to a user (i.e., which do not offer a user the chance to select something or otherwise provide input). Examples of such information-only UI controls include a block of text or a spacer dividing other UI controls. FIG. 146 only shows a set of radio button controls and a text label ("Options") for those radio buttons. Examples of other types of controls are described below. In at least some embodiments, extensibility region 14609 is optional, and a developer could omit it altogether.

Below extensibility region 14609 is command region 14610. Command region 14610 includes a text entry control 14616 which permits entry of the name of a file a user wishes to open. Although not shown, command region 14610 could also include a control allowing a user to input (or select from a drop-down list) the type of file which the user wishes to open. This control would be useful if, e.g., two files of different types have the same title (e.g., "report.DOC" and "report.PDF"). A view control 14617 allows a user to change the way in which files are shown in pagespace 14612. Instead of a collection of icons, for example, a user may instead wish to see files identified in a "details" mode (not shown) providing a table of file names, types, sizes, etc. In at least some embodiments, the view mode is based on a default view associated with the list or other location to which a user has navigated in browser region 14607. A developer can set the default view mode for any location, and a user may be permitted to override the view mode settings. When in "details" mode, the columns displayed are also based on the location to which a user has navigated, but a developer can specify (and a user can override) which columns are visible.

Control 14618 allows a user to change the appearance of dialog 14600 such that infopane region 14608 is not displayed (see FIG. 147), or if infopane region 14608 is already hidden, to show infopane region 14608. Command button 14619 permits a user to open a file which has been selected in pagespace 14607 or identified in control 14616. Command button 14620 permits a user to cancel dialog 14600. A developer may also override the default button labels and specify other text (e.g., change the "Open" button to "Check Out").

Shown in FIG. 148 is a "Save File" dialog 14800 according to at least some embodiments of the invention. Save File dialog 14800 is contained in a frame 14801 of a dialog window and has a title 14802. Controls 14803 and back arrow 14804 operate similar to controls 14603 and 14604 in Open File dialog 14600 of FIG. 146. Navigation bar 14805 and search bar 14806 function similar to navigation bar 14605 and search bar 14606 of Open File dialog 14600. Save File dialog 14800 also includes a browser region 14807 having places bar 14811 and pagespace 14812. As with Open File dialog 14600 (FIG. 146), selection of an entry in places bar 14811 results in display in pagespace 14812 of information about files associated with a list, directory folder or other file grouping, and/or a display of icons permitting navigation to other locations. Files displayed in pagespace 14812 can similarly be sorted using the controls ("Name," "Type," etc.) at the top of pagespace 14812.

Save File dialog 14800 further includes an infopane region 14808. In at least some embodiments, and as shown in FIG. 148, infopane regions for Save File dialogs are located beneath the browser region. Infopane region 14808 includes a ghost 14814 of the file to be saved. Depending on the type of file being saved, ghost 14814 may be a thumbnail image of the document, picture or other item stored in the file, may be an icon corresponding to an application associated with the file, or may be some other type of graphical representation. A file name control 14816 allows a user to enter a name for the file being saved. This field may have a file name suggested by an application program instantiating the File Save dialog (e.g., the first words of the file being saved). In some cases, the user may be replacing an existing file by selecting a file from pagespace 14812, in which case the filename for the replaced file may be automatically added to control 14816. In other cases, a user may be unsure about where a file should be stored. Using places bar 14811 (page space control), the user can navigate to one or more lists or other file groupings and find an appropriate location. As the user navigates through such groupings, he can see information in pagespace 14812 regarding other files in those groupings and use that information to determine if the current file should be saved to one of those groupings. In some cases, a ghost 14826 of the file being saved is also shown in pagespace 14812 as the user navigates through various possible locations for the file. In this manner, the user is provided with a visual indication of the location in which he or she can later find the file. The presence of ghost 14826 in pagespace 14812 also signals that the current list or other grouping is a valid save location.

Also shown in infopane region 14808 are fields 14815 for various metadata regarding the file being saved. In some cases, a user may select one or more of these fields to add a metadata value. For example, the user might select the "keywords" field and add words which might make the file easier to find in a future keyword search. In other cases, a value for one of the metadata fields may be populated (at least initially) by an application instantiating dialog 14800. In still other cases, a value of a metadata field might be automatically populated based on the selected storage location for the file. If, for example, a user saves a file in a "project X" list, a metadata field for "project" (not shown in the drawings) would be automatically populated with "X". As with Open File dialog 14600, the metadata categories and values shown in infopane region 14808 for a file can vary.

Below infopane region 14808 is an extensibility region 14809. Similar to extensibility region 14609 of Open File dialog 14600, the extensibility region of a Save File dialog may contain any of a wide variety of user interface (UI) controls which a software developer may specify. Although a pair of check boxes are shown in FIG. 148, other UI controls could be included. Extensibility region 14809 is optional in at least some embodiments. Stated differently, a developer would be free to create a Save File dialog without an extensibility region.

Below extensibility region 14809 is command region 14810. Command region 14810 contains a command button 14819 for saving a file to a selected location, as well as a command button 14820 for canceling Save File dialog 14800. Text for these buttons can be changed by a developer (e.g., changing "Save" to "Check In"). Also included in command region 14810 is a control 14821 for hiding browser region 14807. By selecting this control, and as shown in FIG. 149, browser region 14807 is no longer displayed. In this manner, a more compact Save File dialog can be provided. Navigation bar 14805 and search bar 14806, and/or the minimization and maximization arrows of controls 14803, may also be removed in a compacted Save File dialog. By reselecting control 14821 (the label for which has changed to "Show Browser" in FIG. 149), browser region 14807 is again displayed. A view selection control 14817 (FIG. 144) is visible when browser region 14807 is displayed, and functions similar to view selection control 14617 of Open File dialog 14600 (FIG. 146). As with Open File dialog 14600, the default view mode (e.g., icons vs. details) when the Save File browser is displayed is based on the list or other location to which a user has navigated. A developer can similarly set (and a user can override) a view mode setting and the columns shown when in the details view mode.

As seen by comparing FIGS. 146 and 148, the location of infopane region 14608 in Open File dialog 14600 is different from that of infopane region 14808 of Save File dialog 14800. This repositioning corresponds to the different purposes of these two types of dialogs. A user is typically looking for a particular file in an Open File dialog. A graphical depiction of the file contents is often more helpful than detailed metadata. Accordingly, the focus of the infopane region in an Open File dialog is typically on file preview, and the infopane is positioned to allow for a larger ghost image. The focus of the infopane region in a Save File dialog is on editing and on proper storage of a file for future retrieval. Thus, the infopane region of a Save File dialog is positioned to encourage entry and/or modification of metadata.

In at least some embodiments, metadata fields are displayed in an infopane region of both Open File and Save File dialogs based on a predetermined order. In particular, system-required metadata attributes (e.g., file name, file type, location for saving) are shown first. Next shown are metadata attributes required by an application instantiating the dialog, but which are not necessarily required in all applications (e.g., compression ratio, file protection). Remaining properties are then shown. The infopane region (and the entire dialog, if necessary) is automatically resized so as to show all system- and application-required properties. In at least some embodiments, an application program cannot specify what metadata is required, but the application can "promote" metadata types to have a priority such that corresponding fields will be displayed in a default-sized dialog.

Shown in FIGS. 146 and 148 are two of the various types of UI controls which a developer can place in an extensibility region of an Open File or a Save File dialog. A developer may include multiple controls of the same type and/or may combine controls of different types. FIG. 148 shows a pair of verification (or "check box") UI controls. Such a UI control can include text ("Option 1" and "Option 2") and may contain a label applicable to multiple check boxes ("Save Options"). A user can place a check in (or remove a check from) a check box with a mouse. The checked/unchecked state of the control is then returned to a program. In at least some embodiments implemented in LTR (left-to-right) languages, text for a check box control is left aligned and wraps to the column in which the control is located. Labels in an extensibility region may be automatically aligned with metadata field labels in an infopane region. As seen in FIG. 148, the "Save Options" label in extensibility region 14809 is aligned with "Save In" and "File Type" in infopane region 14808. As explained in more detail below, UI controls in an extensibility region may also be organized into one or more groups and displayed in multiple columns.

FIG. 146 shows a collection of radio button UI controls. Each radio button control typically displays one or more lines of text (e.g., "Open Original File") for a possible input option. Next to the text for each option is a small circle or other region which a user can select with a mouse. Once selected, the region is filled with a black dot or other indication of the selection. Typically, only one of the options can be selected. If a user selects one option and then selects another of the options, the black dot for the first selection is removed. Radio button controls may also include a label ("Options"). In at least some embodiments implements in LTR languages, text for a radio button control is left aligned and wraps to the column in which the control is located.

Figure 150:
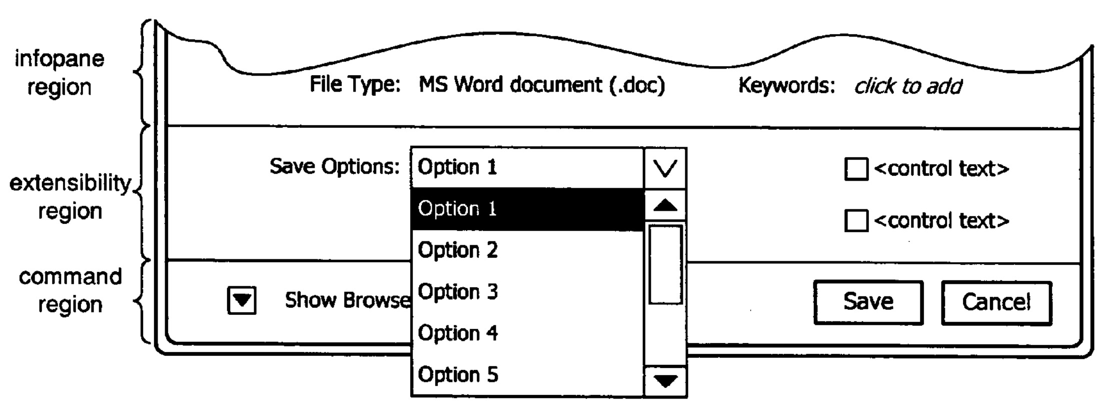
Figure 151:
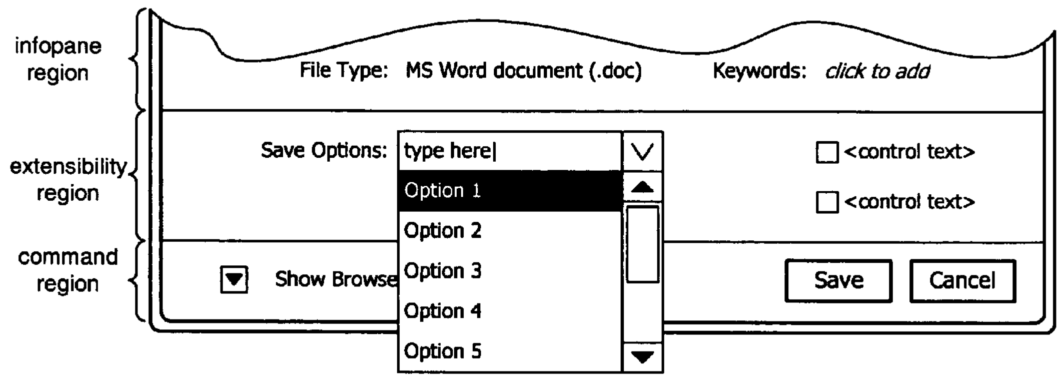

Shown in FIGS. 150-154B are various other types of UI controls which a software developer can specify for inclusion in an extensibility region. Although FIGS. 150-154B show these other types of UI controls in an extensibility region of a Save File dialog, these UI controls could also be included in an Open File dialog (or other type of file dialog) extensibility region. FIG. 150 shows a drop-down box control. As seen in FIG. 150, a drop-down box permits a user to expand a box to show a list of possible selections. An option selected from the drop-down list is then automatically placed in the box. FIG. 151 shows a combo-box control. This UI control allows a user to expand a box into a list of possible selections (similar to a drop-down box), but also permits the user to type text into the box (shown in FIG. 151 as "type here").

Figure 152:
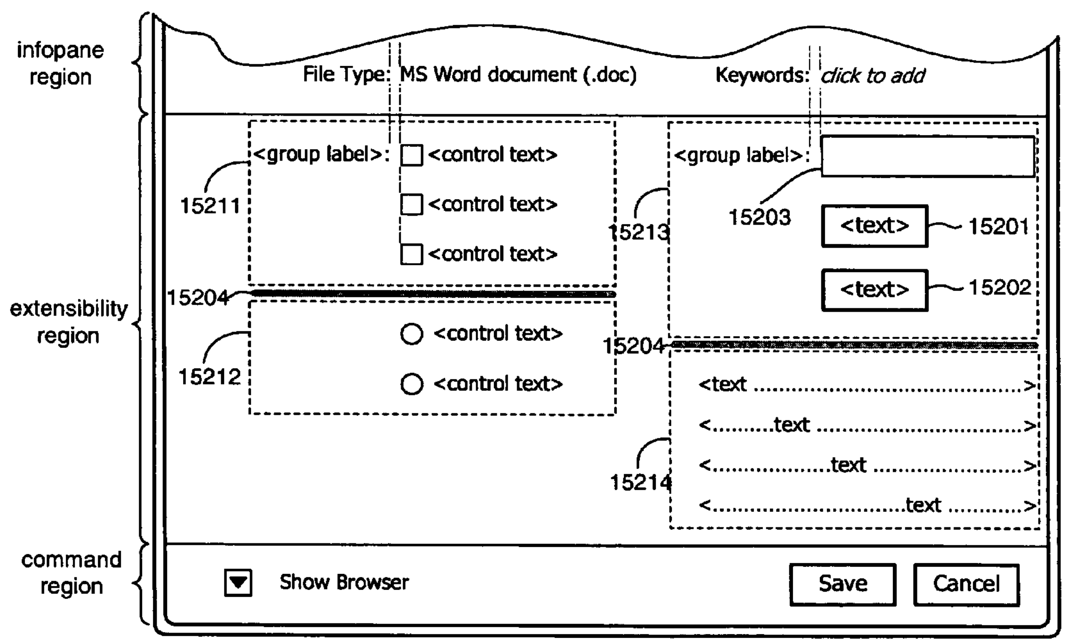

FIG. 152 shows push button UI controls 15201 and 15202, as well as edit box control 15203. Also illustrated in FIG. 152 is grouping of UI controls. In at least some embodiments, a control group can include one or more controls and a label applicable to controls in the group. In the example of FIG. 152, four groups are shown. Group 15211 contains a group label and three check box UI controls. Group 15212 does not have a group label, but does include two radio button UI controls. Group 15213 includes a group label, an edit box UI control 15203, and two push button UI controls 15201 and 15202. Group 15214 contains plain text, e.g., text not labeling or associated with a specific control. Although groups 15211-15214 are outlined in FIG. 152 for purposes of explanation, such outlines would not necessarily appear in an actual dialog. A separator 15204 can be specified for placement between control groups. In at least some embodiments, a separator only spans a single column, and is added as the last element of a group. Separators appearing as the first or last column element are hidden. In at least some embodiments, and as seen in FIG. 152, controls in a group are kept together in the same column of an extensibility region when the dialog is displayed. In some embodiments, and as also seen in FIG. 152, the right edges of UI control group labels in a Save File dialog extensibility region are automatically aligned with the right edges of metadata labels ("File Type" and "Keywords") in an infopane region. The left edges of UI controls in a Save File dialog extensibility region are similarly automatically aligned with the left edges of metadata value fields in the infopane region. Plain text is automatically left aligned and wraps to the column in which the text is contained.

Figure 153A:
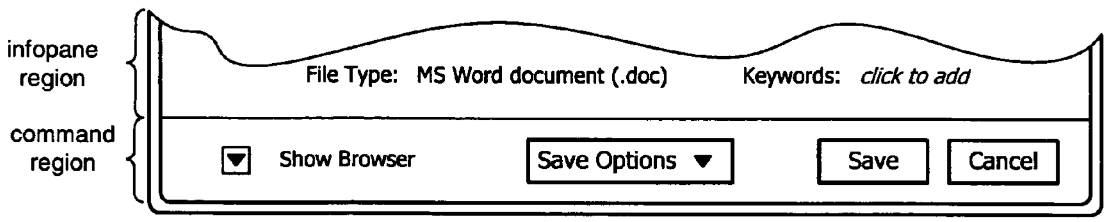
Figure 153B:
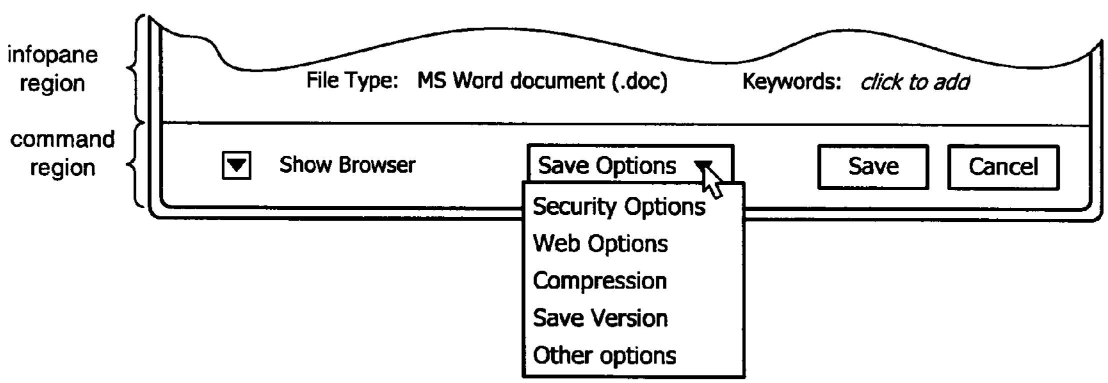
Figure 154A:
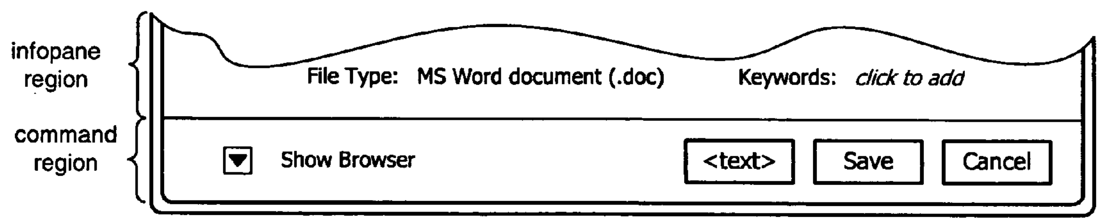
Figure 154B:
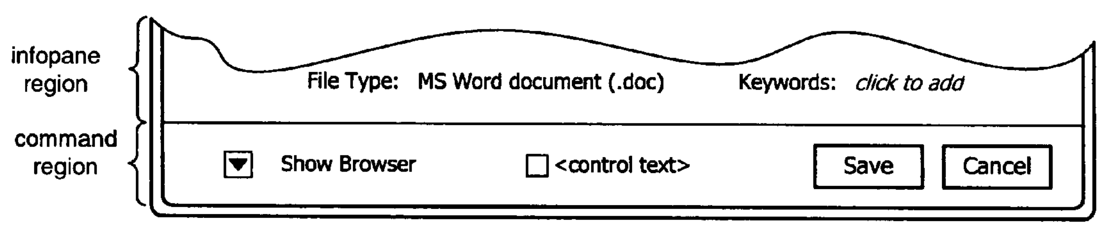

In some embodiments, a drop-down menu UI control can be included in a command region, as shown in FIGS. 153A and 153B. Selection of the menu reveals a list of selectable options. Selecting some options may result in display of submenus and/or other dialogs. In some cases, a drop-down menu and command button can be combined into a "split button" UI control, which can also be located in the command region. A split button UI permits a user to select an option in a drop-down menu. The split button is then relabeled with the selected option, and the user can then press the button to act on the selected option. Other controls can also be added to a command region, as shown in FIGS. 154A (push button UI control "<text>") and 154B (check box UI control). This may be desirable if a developer only needs to include a single specialized control, and avoids consuming display area for an extensibility region. In at least some embodiments, a developer is not able to add radio button groups and labels to a command region. Inclusion of a control in the command region also permits a developer to emphasize that control and/or to separate that control from controls in an extensibility region. Thus, a developer might specify certain controls for the extensibility region and a control for the command region. In other embodiments, however, no additional controls are placed in a command region if the extensibility region will be displayed (e.g., if there are to be two or more UI controls added), with the exception of menu UI controls. Menus often contain choices applicable to multiple dialogs instantiated by an application, and allowing a menu in the command region may be more efficient in some cases. In some embodiments, menus are always located in the command region.

In at least some embodiments, arrangement and appearance of UI controls in an extensibility region is automatic. The application instantiating the dialog simply identifies to the OS (via one or more programming interfaces) the UI controls and/or groups desired. The OS then controls the arrangement and appearance. A control not explicitly added to a group is treated as its own group. The OS places each group in the extensibility region based on the order in which the UI control or group is first identified in the programming interface(s). FIG. 155 illustrates the automatic layout of control groups in a Save File dialog. As seen in FIG. 155, the metadata field label/value pairs in a Save Dialog infopane region form two columns. Control groups are then added in the extensibility region, aligned with those columns, so as to minimize height of the extensibility region. Spacing between groups, as well as between individual controls within a group, is also automatic. In other words, an application developer need not precisely specify the position of each UI control. Similarly, the appearance of text for UI controls, group labels and plain text is automatically controlled by one or more OS theme files.

FIG. 156 shows automatic layout of UI controls in an Open File dialog according to at least some embodiments. As seen in FIG. 146, the infopane region of an Open File dialog is arranged differently than the infopane region of a Save File dialog. Accordingly, UI controls and UI control groupings in an Open File dialog extensibility region are aligned with the "File Name" label and corresponding text box control in the command region. If more than one control grouping is specified for an Open File dialog extensibility region, a second column is used. In at least some embodiments, and similar to Save File dialogs, an application instantiating an Open File dialog simply identifies the UI controls and/or groups to the OS via one or more programming interfaces. The OS then controls the arrangement and appearance of the UI controls. Control groups are added to an Open File dialog in the order in which those control groups were specified by the developer and are automatically laid out so as to minimize height of the extensibility region. Spacing, text font, etc. is controlled by one or more OS theme files.

In addition to specifying UI controls for inclusion in an extensibility region (and in some cases, a command region), an application developer can customize a file dialog in various other ways. Using appropriate programming interfaces (as discussed below), a developer can override the dialog titles (e.g., "Open File" title 14604 in FIG. 146, "Save File" title 14804 in FIG. 148) and cause some other title to be displayed. A developer can also make choices which will affect the locations to which a dialog will navigate when a dialog is opened. In particular, when a dialog such as shown in FIG. 146 or FIG. 148 is first opened, the dialog will often show a particular list or other file grouping as a suggested location in which to save (or from which to open) a file. In some embodiments, a file dialog first attempts to navigate to one of the following locations (listed in order of preference): (1) a location that the instantiating application specifies (e.g., the last location visited by the application), (2) last location to which a file was opened or saved by that application (as tracked by the OS), (3) a default location specified by the application, or (4) an OS-specified default location (e.g., a root directory, the desktop in the WINDOWS OS, etc.).

An application developer can also specify the initial browser mode. In some embodiments, for example, a Save File dialog automatically opens with the browser region hidden unless an application requests otherwise. In certain embodiments, Open File dialogs are always displayed with a browser region. An OS generating a file dialog in response to an application request may also render the dialog at a default size and in a default location on the screen. For example, the OS may automatically locate the dialog in the center of the display and limit the dialog and/or various regions of the dialog to certain sizes. An application developer can override these default values by specifying a size and/or location for the dialog. This may occur by explicitly supplying values for size and/or location. This may also occur implicitly. For example, an application may specify more controls for an extensibility region than can be contained within a default size.

As with other windows in a display, a user may also be able to move and/or resize the dialog. Similarly, a user can resize the browser region (if shown) and the infopane region. As the infopane region is expanded (by, e.g., selecting the edge of the infopane region with a mouse and pulling the edge across the screen), additional metadata property/value pairs become visible. As the infopane region is contracted, fewer property/value pairs can be seen. User changes to size or position of a dialog or dialog region (as well as changes to view mode, visible columns in a details view mode, etc.) can be persisted until the user completes or cancels the dialog. In some embodiments, some or all of such user changes may be persisted in subsequent dialogs.

FIGS. 157 and 158 are block diagrams illustrating differences between the manner in which an application requests generation of a file dialog according to embodiments of the invention and the manner in which a file dialog is requested in the prior art. FIG. 157 is a block diagram illustrating an existing manner in which an application program requests display of a file dialog from various versions of the WINDOWS OS. In FIG. 157, the application first creates a data structure ("DialgStr") corresponding to the dialog to be displayed. This structure contains values for numerous variables and flags that control the behavior of the dialog. In various versions of the WINDOWS OS, this structure is an "OPENFILENAME" structure. In order to instantiate a dialog, the application then calls an OS function that has a pointer to the DialgStr structure as an argument. Specifically, the application calls the "GetOpenFileName" function to instantiate a dialog for opening a file and the "GetSaveFileName" function to instantiate a dialog for saving a file. For simplicity, these functions are shown generically in FIG. 157 as "GetFN(pDialgStr)". In response to this function call, the OS then generates a window containing a default dialog.

If an application developer wishes to customize a default dialog so as to include custom UI controls, additional steps are needed. Specifically, the developer must create a custom template for the portion(s) of the default dialog that define the region(s) to hold the customized UI controls. A pointer to that template is then included in the DialgStr structure. The OS retrieves data from the custom template and uses that data to create the customized controls within a child window of the default dialog.

At first glance, the procedure of FIG. 157 seems straightforward. However, the custom template must specify all the desired custom UI controls and their positions, how the controls will be displayed, etc. Creating a custom template can be a significant effort for the application developer. Moreover, the developer must also create callback functions to deal with user input received by the custom UI controls.

The procedure of FIG. 157 also poses problems to the OS developer. Few limits are imposed upon what an application developer may include in a customized region of a default dialog. Similarly, few limits are imposed on where an application developer may place a customized region within a default dialog. Although FIG. 157 shows all the customized controls inside a single contiguous block, this is not always the case. A custom template can specify numerous custom controls to be placed in multiple child windows of the default dialog, and the customized region(s) may have various shapes. In view of all these factors, it is difficult (if not impossible) for the OS developer to know all of the ways in which various applications customize default dialogs. In turn, this increases the difficulties in upgrading the OS. For example, a change to the default dialog format that adds a new element in a particular location may be incompatible with applications instantiating dialogs with customization in the same location.

FIG. 158 is a block diagram illustrating creation of a file dialog according to embodiments of the invention. The application developer creates an object which corresponds to the dialog to be displayed. The object is an instantiation of an object class made available by the OS. Once created, the object automatically includes methods which the application can call in order to display the dialog, to add controls to the dialog, and to otherwise set the behavior of the dialog. This is shown schematically in FIG. 158, where the application has called various methods of an instantiated dialog object in order to add certain controls to the dialog (e.g., "AddControl1( )", etc.). Other methods are called (and/or specified variable values and/or flags included in those calls) to control other aspects of the dialog's appearance and behavior. Set forth below are examples of actions that a developer can perform via calls to these methods.

Add a dropdown box.
Enable opening a dropdown menu.
Add a menu.
Add a command button.
Add a combo box.
Add radio buttons.
Add a check box.
Add a text entry box.
Add a separator.
Add text.
Group controls.
Set a label for controls.
Retrieve a control state.
Set a control state.
Retrieve text in a text entry box.
Set text in a text entry box.
Add a control (e.g., to an already displayed dialog).
Make a control more prominent.
Remove a control item.
Set the files types that the dialog can open or save (for Open File dialogs, the file types can be used to filter the view for the user; for Save File dialogs, the file types can determine which extension to be appended to a user-specified file name).
Set the currently selected file type.
Retrieve the currently selected file type.
Attach an event handler to listen for events from the dialog.
Set flags to control dialog behavior, including:
- whether to prompt a user for confirmation before overwriting a file (Save File dialogs),
- whether to require that the file extension for a file name returned by a user match that of a currently selected file type (Save File dialogs),
- whether to require that an item name returned by a user be a file system item,
- whether a user can select multiple files for opening,
- whether a user is required to specify a file in an existing folder,
- whether a file to be opened must already exist,
- whether a user is prompted to create an item identified by the user (e.g., folder or list) that does not already exist, and
- behavior on detecting a sharing violation.

Retrieve the current settings on various flags.
Set a folder or other location in which the dialog will open.
Retrieve the user's current selection(s) in the dialog.
Retrieve the current folder which the dialog is showing or to which the dialog will open (if the dialog is not currently displayed).
Retrieve the current text in the file name text box UI control.
Set the title of the dialog.
Set the text of the "Open" or "Save" button.
Set text of the label next to the file name text box UI control.
Retrieve a choice a user has made in a displayed dialog.
Add a place to the places bar.
Set a default extension for file names typed by a user.
Close the dialog.
Associate an identifier with the state of a dialog (e.g., last visited folder, position, size) so that the state will persist.
Clear a persisted state for a dialog.
Set a name that will initially appear in a file name field.
Specify metadata attribute values to be collected in a save dialog.
Set a property store for a file being saved.
Specify whether an application can retrieve the current metadata values in an infopane region or must wait and receive a final set of values after the dialog has closed.
Apply a set of properties to a file.
Prevent a dialog from closing (if, e.g., a user has entered an invalid choice).

Based on the methods called (shown as arrows from the dialog object in FIG. 158), the OS creates the requested dialog. As previously discussed, the arrangement of UI controls is set by the OS. Accordingly, detailed placement information for the UI controls (e.g., specifying pixel x and y offsets from a reference location) need not be provided by the application developer. Because dialog customization is facilitated by calls to methods within the dialog object, and because the manner in which those methods can customize a file dialog are known to the OS developer, the OS developer is more able to know how OS modifications will affect applications. In particular, customized controls are limited to those which can be specified via one of the method calls. Because those UI controls will be placed within a known region of a dialog, the OS can later be modified to change other parts of the dialog.

In addition, a number of dialog object methods can be called by the OS to inform the application of various events. The application can then perform desired actions in response. For example, user selection of a control corresponding to password protection of a specified file could result in the application taking appropriate steps to protect that file (either directly or via a programming interface to the OS or to another application). Set forth below are examples of events about which the OS can inform an application via calls to such methods.

The dialog is about to close.
The user has navigated (or is navigating) to a new folder.
A help button has been pressed.
A user view selection has been made.
A file sharing violation has occurred.
A file type selection has changed.
The user has indicated a file should be overwritten.
A new selection has been made in a combo box, in a collection of radio buttons or a menu.
A command button has been pressed.
A check box state has changed.
A drop down menu on a button is about to be opened.

Although specific examples of carrying out the invention have been described, those skilled in the art will appreciate that there are numerous other variations and permutations of the above described systems and techniques. As but one such variation, some or all of the UI controls in the extensibility region or elsewhere in the dialog may be selectable using a keyboard. For example, a user might press a tab key to highlight a particular control and then activate that control by pressing the "Enter" key. As another example, a particular control may have a corresponding key combination (e.g., "Alt+S"). In at least some embodiments, an application developer can modify aspects of how a user accesses a dialog via a keyboard. There might also be multiple simultaneous instances of file dialogs for a given application. Embodiments of the invention also include a computer-readable medium having instructions recorded thereon which, when executed by a processor, perform steps of a method and/or that implement a software architecture. As used in the claims, the phrase "data indicative of" includes pointers or other references to data located elsewhere, as well as the actual data itself.

While the preferred embodiment of the invention has been illustrated and described, it will be appreciated that various changes can be made therein without departing from the spirit and scope of the invention. For example, it will be appreciated that the locations of the various UI features that are shown herein are illustrative and may be altered, and that different placements of the various UI features will still fall within the spirit and scope of the invention. Furthermore, the different aspects of the invention described herein may be formed in various combinations, also without departing from the spirit and scope of the invention. In addition, the various steps in the described processes may be rearranged, modified, and/or deleted as desired to implement a selected subset of features described herein. Also, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A file system shell browser defined by computer-executable instructions stored on one or more computer-readable storage media, said file system shell browser navigable by a user to manage a plurality of data items, said file system shell browser comprising:

a page space control navigable by the user to identify a first set of data items having at least one common metadata;

a virtual address bar identifying a virtual path to the first set of data items by referencing the first set of data items according to the at least one common metadata, wherein the virtual path is comprised of a first interactive segment that references one or more of the plurality of data items according to a corresponding filter that applies a user-selected metadata value and selects one or more of the plurality of data items or other content, and wherein the virtual path is further comprised of one or more additional interactive segments that further restrict the one or more of the plurality of data items referenced by the preceding interactive segments;

a primary view pane presenting a first display of the first set of data items; and a preview pane presenting information corresponding to one of the first set of data items.

2. The file system shell browser of claim 1, wherein said page space control comprises a hierarchical tree of metadata values.

3. The file system shell browser of claim 1, wherein the virtual address bar comprises a plurality of hierarchical elements, each element, when selected by a user, presenting a list of hierarchically equivalent metadata values selectable by a user.

4. The file system shell browser of claim 3, wherein when the user selects one of the hierarchically equivalent metadata values, the primary view pane presents a second display of a second set of data items corresponding to the one of the hierarchically equivalent metadata values.

5. The file system shell browser of claim 1, wherein the primary view pane presents one data item of the first set of data items in iconic form indicating a number of further data items corresponding to the one data item.

6. The file system shell browser of claim 5, wherein the iconic form comprises a stack whose height is based on the number of further data items corresponding to the one data item.

7. The file system shell browser of claim 2, wherein a node of the hierarchical tree represents a virtual folder, said virtual folder defined by a scope of storage locations and one or more criteria of meta data values.

8. The file system shell browser of claim 1, further comprising a list view slider selectably changeable by the user to select a presentation style of the first set of data items in the primary view pane.

9. The file system shell browser of claim 8, wherein said list view slider comprises preset presentation styles including an iconic presentation style and a list presentation style.

10. The file system shell browser of claim 1, further comprising a virtual folder builder wherein a user defines a scope comprising one or more explicit inclusions and one or more explicit exclusions.

11. The file system shell browser of claim 1, further comprising a list builder exposing functionality for a user to build a static list.

12. The file system shell browser of claim 1, wherein the page space control is configured to dynamically scroll horizontally based on a user vertically scrolling the page space control.

13. The file system shell browser of claim 1, wherein, when a user selects any of the items in the first set of data items, the file system shell browser performs a launch activity corresponding to the selected item.

14. The file system shell browser of claim 1, wherein, when a user provides input focus to any of the data items in the first set of data items, the file system shell browser exposes in a commands module a set of commands corresponding to the data item having input focus.

15. The file system shell browser of claim 14, wherein the commands module comprises the virtual address bar.

16. One or more computer-readable storage media storing computer-executable instructions providing a user-navigable file system shell browser executable within an operating system of a data processing device, said file system shell browser exposing a user interface comprising:

a first pane presenting a hierarchical tree of metadata properties and property values;

a second pane presenting a sequential list of metadata values identifying a virtual path, wherein said second pane reflects a user-selected property value of a metadata property from said first pane, wherein the virtual path is comprised of a first interactive segment that references one or more of a plurality of data items according to a corresponding filter that applies a user-selected metadata value and selects one or more of the plurality of data items or other content, and wherein the virtual path is further comprised of one or more additional interactive segments that further restrict the one or more of the plurality of data items referenced by the preceding interactive segments; and a third pane presenting a display of a first set of the plurality of data items corresponding to the virtual path, wherein one or more of the first set of data items are stored in different locations in a computer file system.

17. The computer readable media of claim 16, wherein the file system shell browser further comprises a preview pane presenting information corresponding to a user-selected one of the first set of the plurality of data items.

18. The computer-readable media of claim 16, wherein each metadata value in said second pane corresponds to a list of hierarchically equivalent metadata values selectable by a user, and wherein when the user selects one of the hierarchically equivalent metadata values, the third pane presents a display of a second set of the plurality of data items corresponding to the selected virtual path.

19. The computer readable media of claim 16, wherein a node of the hierarchical tree represents a virtual folder, said virtual folder defined by a scope of storage locations and one or more criteria of metadata values, and wherein said virtual folder corresponds to all items stored within the scope and matching the one or more criteria.

20. The computer readable media of claim 16, wherein said file system shell browser further comprises a list view slider selectably changeable by the user to select a presentation style of the first set of the plurality of data items in the list pane.

21. The computer readable media of claim 16, wherein said file system shell browser further comprises a virtual folder builder wherein a user defines a virtual folder scope comprising one or more explicit inclusions and one or more explicit exclusions.

22. The computer readable media of claim 16, wherein said file system shell browser further comprises a list builder exposing functionality for a user to build a static list.

23. The computer readable media of claim 16, wherein the first pane is configured to dynamically scroll horizontally based on a user vertically scrolling the hierarchical tree.

24. The computer readable media of claim 16, wherein, when a user selects any of the items in the first set of the plurality of data items, the file system shell browser performs a launch activity corresponding to the selected item.

25. A user interface stored as computer-executable instructions on one or more computer-readable storage media, said user interface corresponding to a file system shell browser, and said user interface comprising:

a primary view pane for displaying one or more of a plurality of data items or a plurality of content items corresponding to a presently selected virtual path, wherein the plurality of content items includes one or more of system devices, system services, or Internet locations;

a virtual address bar module identifying the virtual path of the one or more of the plurality of data items or the plurality of content items displayed in the primary view pane, wherein the virtual path is comprised of a first interactive segment that references one or more of the plurality of data items according to a corresponding filter that applies a user-selected metadata value and selects one or more of the plurality of data items or other content, and wherein the virtual path is further comprised of one or more additional interactive segments that further restrict the one or more of the plurality of data items referenced by the preceding interactive segments; and two or more functional modules displayed corresponding to each other, said functional modules selected from the set of a page space control module, said page space control module providing a hierarchical tree of metadata properties and value, said tree navigable by a user to identify a selected metadata value, thereby causing corresponding items to be displayed in the primary view pane;

a list view slider module providing a selectably changeable display element to allow a user to select a presentation style of the one or more of plurality of data items or the plurality of content items in the primary view pane;

a virtual folder builder module exposing functionality for a user to define a virtual folder scope comprising one or more explicitly included storage locations and one or more explicitly excluded storage locations; and a preview module for displaying metadata corresponding to a selected one or more of one of the plurality of data items or one of the plurality of content items displayed in the primary view pane, wherein the preview module exposes a user interface through which a user can edit at least a portion of the metadata corresponding to the selected one of the plurality of data items.

26. The user interface of claim 25, wherein the virtual path is presented as a sequential list of metadata values.

27. The user interface of claim 26, wherein each metadata value in said sequential list corresponds to a list of hierarchically equivalent metadata values selectable by a user to alter a display of elements in the list pane module.

28. The user interface of claim 25, wherein one of the two elements is the page space control module, wherein the other of the elements is the virtual folder builder module, and wherein a first node of the hierarchical tree represents a virtual folder, said virtual folder corresponding to all items stored within the virtual folder scope and matching one or more user specified metadata criteria.

29. The user interface of claim 25, wherein one of the two elements is the page space control module, and wherein the page space control module is configured to dynamically scroll horizontally based on a user vertically scrolling the hierarchical tree.

30. The user interface of claim 25, wherein the primary view pane presents a first data item of the plurality of data items in an iconic form indicating a number of further data items corresponding to the one data item.

31. The user interface of claim 30, wherein the iconic form comprises a stack whose height is based on the number of further data items corresponding to the one data item.

32. The user interface of claim 25, wherein one of the two modules is the list view slider module, and wherein said selectably changeable display element comprises preset presentation styles including an iconic presentation style and a list presentation style.

33. The user interface of claim 25, wherein, when a user selects any data item displayed in the primary view pane, the file system shell browser performs a launch activity corresponding to the selected item.

34. The user interface of claim 25, wherein the set from which the two or more functional modules are selected further includes a list builder module exposing functionality for the user to build a static list.

35. The user interface of claim 25, wherein the set from which the two or more functional modules are selected further includes a search module exposing functionality for the user to search for data items within the plurality of data items that match a user-provided metadata value.

36. The user interface of claim 25, wherein one of the two modules is the page space control module and the other of the two modules is the preview module, and wherein, upon the user editing a metadata variable in the preview module by inputting a previously unused metadata value, the user interface updates the page space control module to include the previously unused metadata value.

37. One or more computer-readable storage media storing computer-executable instructions providing a user-navigable file system shell browser executable within an operating system of a data processing device, said file system shell browser exposing a user interface, comprising:

a first pane presenting a sequential list of metadata values identifying a virtual path, wherein the sequential list of metadata values is comprised of a first interactive segment that references one or more of a plurality of data items according to a corresponding filter that applies a user-selected metadata value and selects the one or more of the plurality of data items or other content, and wherein the virtual path is further comprised of one or more additional interactive segments that further restrict the one or more of the plurality of data items reference by the preceding interactive segments;

a second pane presenting a hierarchical tree of metadata properties and property values, wherein said second pane reflects a selected property value from said first pane; and a third pane presenting a display of a first set of the plurality of data items corresponding to the virtual path.

* * * * *